United States Patent [19]

Hamilton

[11] Patent Number: 5,016,277

[45] Date of Patent: May 14, 1991

[54] ENCRYPTION KEY ENTRY METHOD IN A MICROCOMPUTER-BASED ENCRYPTION SYSTEM

[75] Inventor: Scott B. Hamilton, Kirkland, Wash.

[73] Assignee: The Exchange System Limited Partnership, Bellevue, Wash.

[21] Appl. No.: 283,444

[22] Filed: Dec. 9, 1988

[51] Int. Cl.[5] .......................... H04L 9/02; H04K 1/00

[52] U.S. Cl. ........................................ 380/49; 380/24; 380/25; 380/50

[58] Field of Search ......................... 380/24, 25, 49, 50

[56] References Cited

U.S. PATENT DOCUMENTS 4,203,166 5/1980 Ehrsam et al. .
4,386,234 5/1983 Ehrsam et al. .
4,500,750 2/1985 Elander et al. .
4,771,459 9/1988 Jansen .

*Primary Examiner*—Stephen C. Buczinski
*Attorney, Agent, or Firm*—Seed and Berry

[57] ABSTRACT

An improved multi-channel data encryption system is described. The multi-channel data encryption device of the present invention includes a plurality of data of encryption devices in a single unit wherein each of the data encryption devices are adapted for independent operation. The plurality of data encryption devices are coupled with a data bus wherein encryption key information may be programmed in the plurality of data encryption devices through the data bus. The present invention provides a means for assigning the data encryption devices to predefined groups wherein encryption key information may be simultaneously programmed into encryption devices within the assigned groups, thus eliminating the need for individually programming the data encryption devices.

7 Claims, 218 Drawing Sheets

Figure 8B
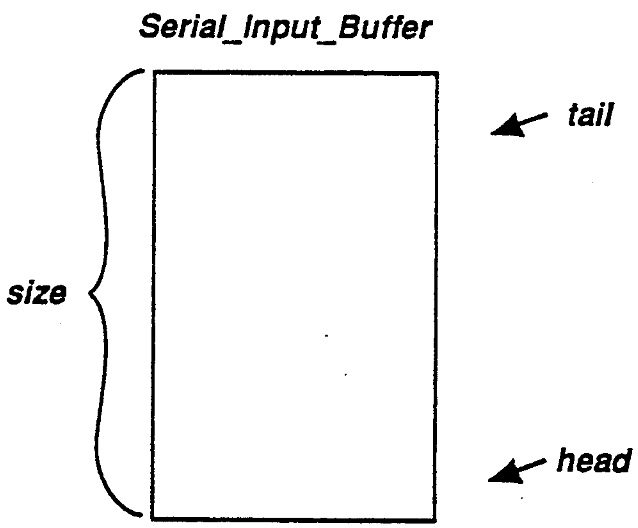
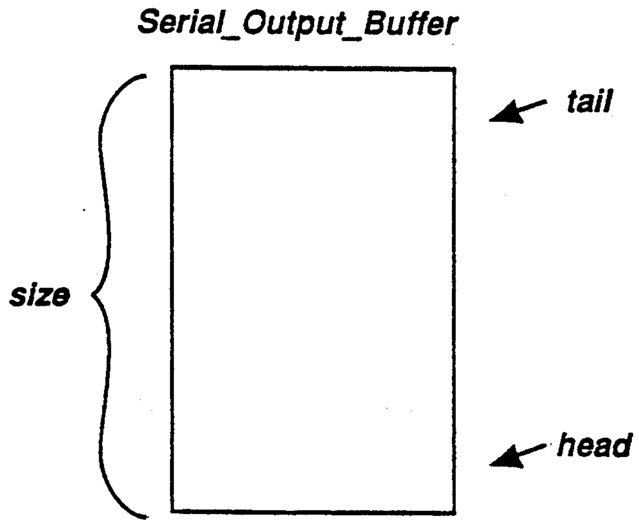

Figure 12
Figure 11
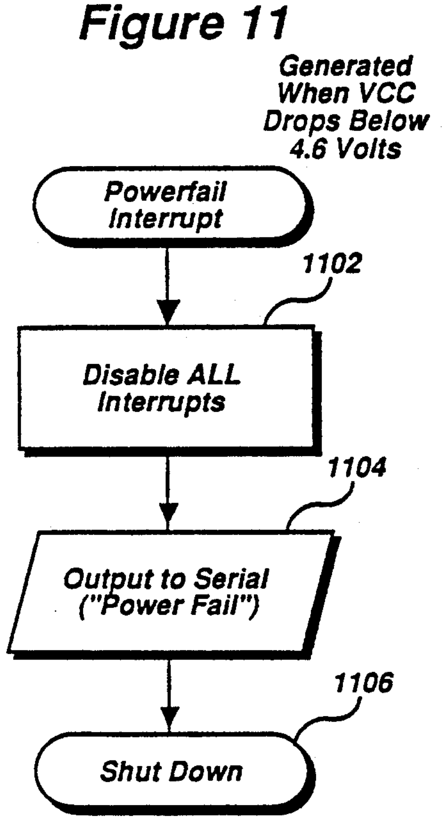
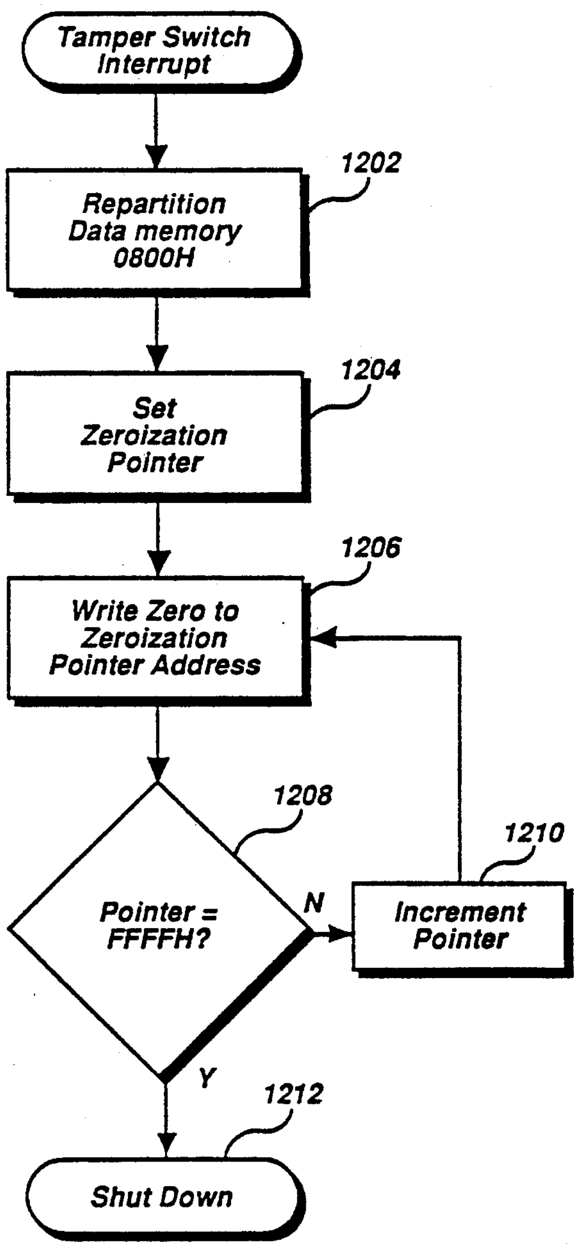

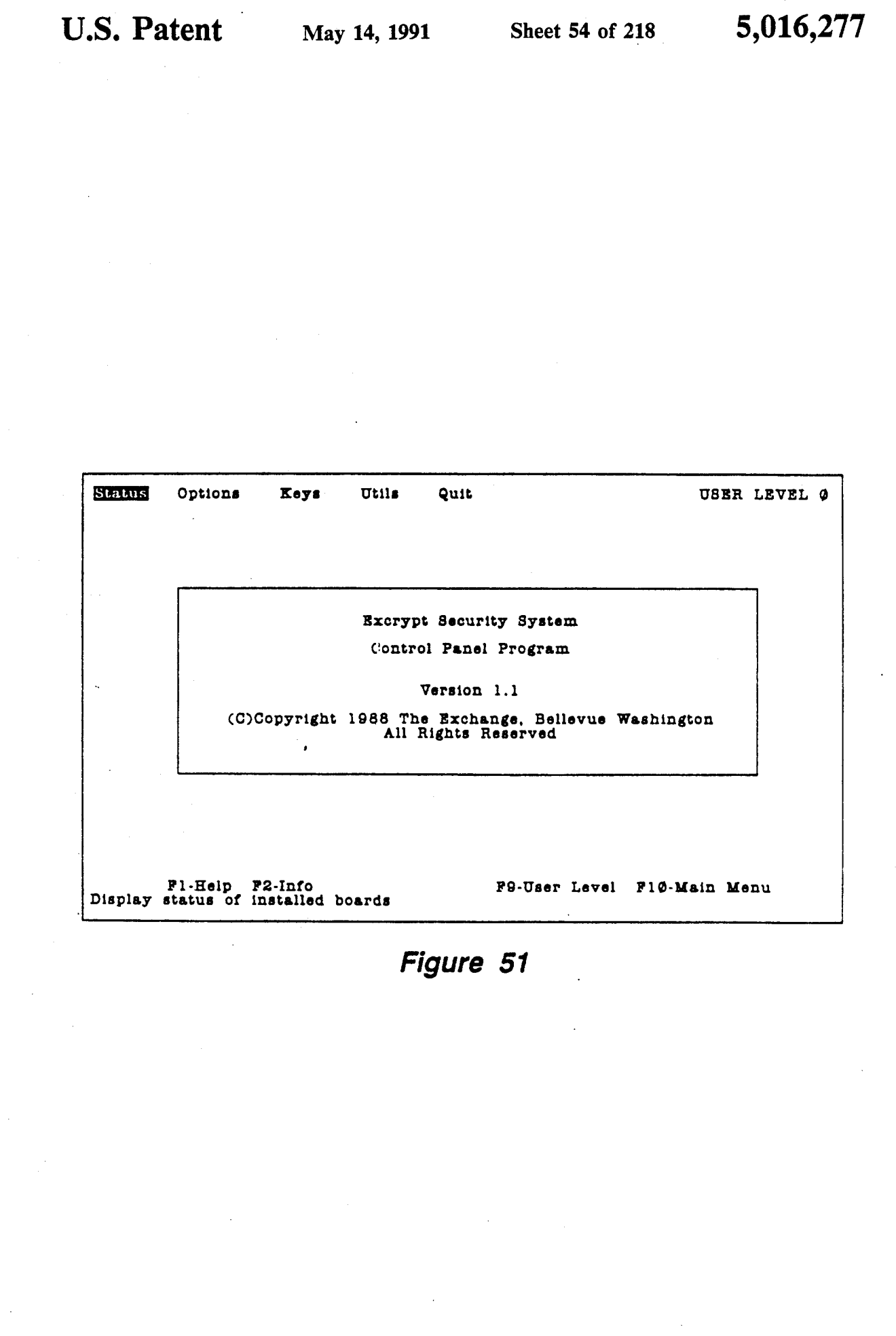

```
Status    Options    Keys    Utils    Quit                    USER LEVEL Ø

              Excrypt Security System
              Control Panel Program

                   Version 1.1

   (C)Copyright 1988 The Exchange, Bellevue Washington
               All Rights Reserved

      F1-Help  F2-Info                 F9-User Level  F1Ø-Main Menu
Display status of installed boards
```

*Figure 51*

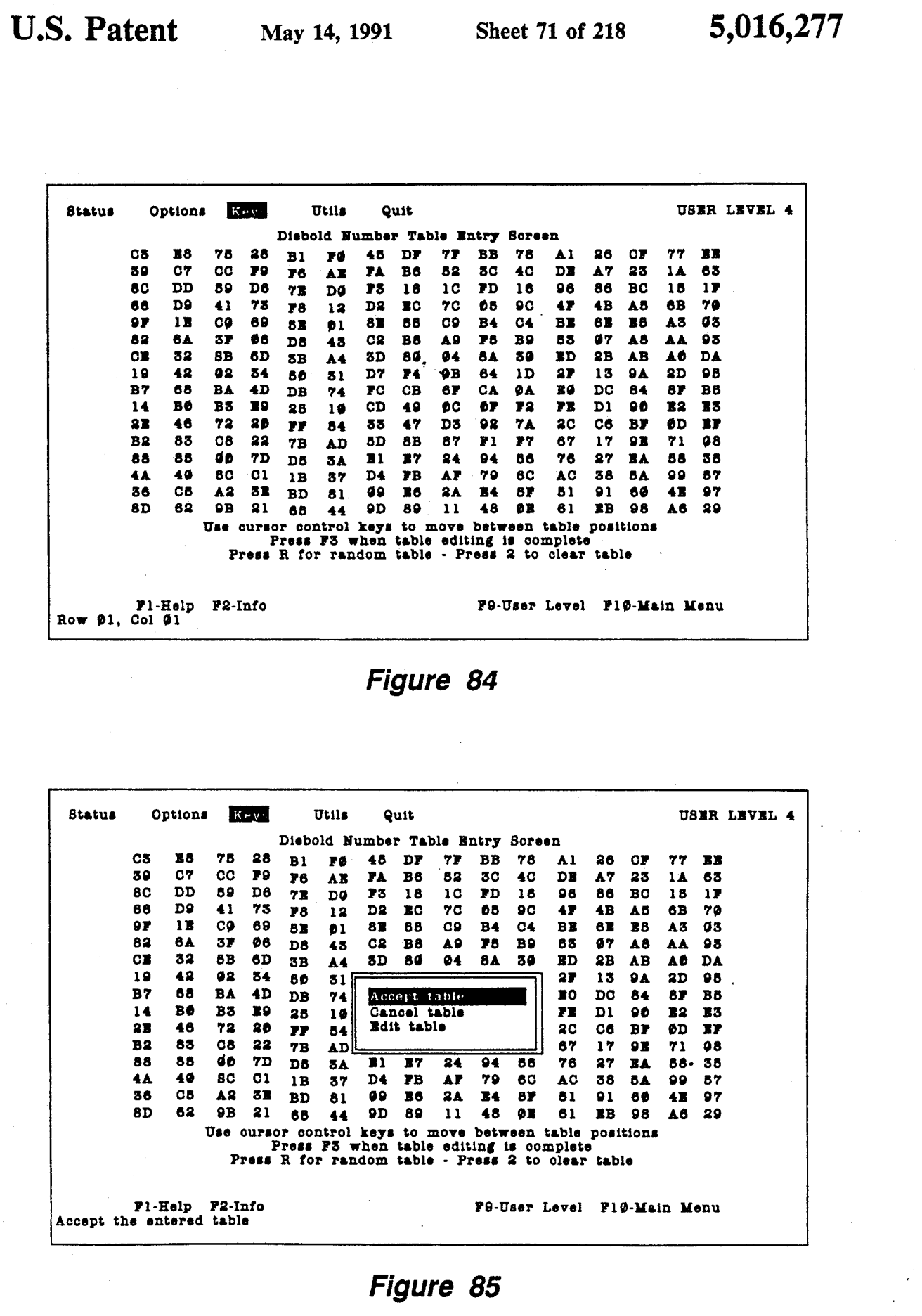

Status Options Key Utils Quit USER LEVEL 4

Diebold Number Table Entry Screen

| | | | | | | | | | | | | | | | |
|---|---|---|---|---|---|---|---|---|---|---|---|---|---|---|---|
| C5 | E8 | 75 | 28 | B1 | FØ | 45 | DF | 7F | BB | 78 | A1 | 26 | CF | 77 | EE |
| 39 | C7 | CC | F9 | F6 | AE | FA | B6 | 52 | 3C | 4C | DE | A7 | 23 | 1A | 63 |
| 8C | DD | 59 | D6 | 7E | DØ | F3 | 18 | 1C | FD | 16 | 96 | 86 | BC | 15 | 1F |
| 66 | D9 | 41 | 73 | F8 | 12 | D2 | EC | 7C | Ø5 | 9C | 4F | 4B | A5 | 6B | 7Ø |
| 9F | 1E | CØ | 69 | 5E | Ø1 | 8E | 55 | C9 | B4 | C4 | BE | 6E | E5 | A3 | Ø3 |
| 82 | 6A | 3F | Ø6 | D8 | 43 | C2 | B8 | A9 | F5 | B9 | 53 | Ø7 | A8 | AA | 93 |
| CE | 32 | 8B | 6D | 3B | A4 | 3D | 8Ø | Ø4 | 8A | 3Ø | ED | 2B | AB | AØ | DA |
| 19 | 42 | Ø2 | 34 | 5Ø | 31 | D7 | F4 | ØB | 64 | 1D | 2F | 13 | 9A | 2D | 95 |
| B7 | 68 | BA | 4D | DB | 74 | FC | CB | 6F | CA | ØA | EØ | DC | 84 | 8F | B5 |
| 14 | BØ | B3 | E9 | 25 | 1Ø | CD | 49 | ØC | ØF | F2 | FE | D1 | 9Ø | E2 | E3 |
| 2E | 46 | 72 | 2Ø | FF | 54 | 33 | 47 | D3 | 92 | 7A | 2C | C6 | BF | ØD | EF |
| B2 | 83 | C8 | 22 | 7B | AD | 5D | 8B | 87 | F1 | F7 | 67 | 17 | 9E | 71 | Ø8 |
| 88 | 85 | ØØ | 7D | D5 | 3A | E1 | E7 | 24 | 94 | 56 | 76 | 27 | EA | 58 | 35 |
| 4A | 4Ø | 8C | C1 | 1B | 37 | D4 | FB | AF | 79 | 6C | AC | 38 | 5A | 99 | 57 |
| 36 | C5 | A2 | 3E | BD | 81 | Ø9 | E6 | 2A | E4 | 5F | 51 | 91 | 6Ø | 4E | 97 |
| 8D | 62 | 9B | 21 | 65 | 44 | 9D | 89 | 11 | 48 | ØE | 61 | EB | 98 | A6 | 29 |

Use cursor control keys to move between table positions
Press F3 when table editing is complete
Press R for random table - Press 2 to clear table F1-Help F2-Info F9-User Level F1Ø-Main Menu Row Ø1, Col Ø1

*Figure 84*

Status Options Key Utils Quit USER LEVEL 4

Diebold Number Table Entry Screen

| | | | | | | | | | | | | | | | |
|---|---|---|---|---|---|---|---|---|---|---|---|---|---|---|---|
| C5 | E8 | 75 | 28 | B1 | FØ | 45 | DF | 7F | BB | 78 | A1 | 26 | CF | 77 | EE |
| 39 | C7 | CC | F9 | F6 | AE | FA | B6 | 52 | 3C | 4C | DE | A7 | 23 | 1A | 63 |
| 8C | DD | 59 | D6 | 7E | DØ | F3 | 18 | 1C | FD | 16 | 96 | 86 | BC | 15 | 1F |
| 66 | D9 | 41 | 73 | F8 | 12 | D2 | EC | 7C | Ø5 | 9C | 4F | 4B | A5 | 6B | 7Ø |
| 9F | 1E | CØ | 69 | 5E | Ø1 | 8E | 55 | C9 | B4 | C4 | BE | 6E | E5 | A3 | Ø3 |
| 82 | 6A | 3F | Ø6 | D8 | 43 | C2 | B8 | A9 | F5 | B9 | 53 | Ø7 | A8 | AA | 93 |
| CE | 32 | 8B | 6D | 3B | A4 | 3D | 8Ø | Ø4 | 8A | 3Ø | ED | 2B | AB | AØ | DA |
| 19 | 42 | Ø2 | 34 | 5Ø | 31 | | | | | | 2F | 13 | 9A | 2D | 95 |
| B7 | 68 | BA | 4D | DB | 74 | | | | | | EO | DC | 84 | 8F | B5 |
| 14 | BØ | B3 | E9 | 25 | 1Ø | | | | | | FE | D1 | 9Ø | E2 | E3 |
| 2E | 46 | 72 | 2Ø | FF | 54 | | | | | | 2C | C6 | BF | ØD | EF |
| B2 | 83 | C8 | 22 | 7B | AD | | | | | | 67 | 17 | 9E | 71 | Ø8 |
| 88 | 85 | ØØ | 7D | D5 | 3A | E1 | E7 | 24 | 94 | 56 | 76 | 27 | EA | 58· | 35 |
| 4A | 4Ø | 8C | C1 | 1B | 37 | D4 | FB | AF | 79 | 6C | AC | 38 | 5A | 99 | 57 |
| 36 | C5 | A2 | 3E | BD | 81 | Ø9 | E6 | 2A | E4 | 5F | 51 | 91 | 6Ø | 4E | 97 |
| 8D | 62 | 9B | 21 | 65 | 44 | 9D | 89 | 11 | 48 | ØE | 61 | EB | 98 | A6 | 29 |

Accept table
Cancel table
Edit table

Use cursor control keys to move between table positions
Press F3 when table editing is complete
Press R for random table - Press 2 to clear table F1-Help F2-Info F9-User Level F1Ø-Main Menu Accept the entered table

*Figure 85*

ENCRYPTION KEY ENTRY METHOD IN A MICROCOMPUTER-BASED ENCRYPTION SYSTEM

DESCRIPTION

1. Field of the Invention

This invention relates to the field of electronic transaction processing and more specifically to an encryption key entry method in a multichannel encryption unit.

2. Background of the Invention

Electronic fund transfer processing systems are widely used for communicating financial transaction information between banks and remote terminals, such as point of sale terminals (POS) and automated teller machines (ATM).

In today's systems, information is transmitted between respective nodes over telecommunication lines which may be intercepted by an adversary. Though the intercepted electronic data is not immediately readable, it can be made readable through the use of a typical home computer. With this data and readily available hardware, counterfeit plastic cards can be produced and used to fraudulently withdraw funds from legitimate customer accounts.

Since the information transmitted over these systems must be maintained under intense security, and the interception of messages cannot realistically be prevented, the information or data is typically encoded or encrypted prior to transmission over the system.

Data encryption is the coding of data to render it unreadable to anyone who does not possess the proper decoding information. In an ATM transaction, a customers personal identification number (PIN) is transmitted along with a transaction request to allow the customer's financial institution to verify that the person making the request is authorized to do so. If the customer's PIN is not encrypted before transmission, it is readily available to an eavesdropper for use with counterfeit or stolen cards.

However, if the PIN is encrypted before it is transmitted, this type of theft can be prevented. Even if the encrypted PIN is intercepted, the encrypted PIN would be unintelligible. Without a usable PIN, a counterfeit card would be useless. While many financial transactions travel directly from a remote terminal to a financial institution over secure telecommunication lines, the trend today is toward large, shared networks in which transaction requests entered on a remote terminal are relayed through several network nodes before they arrive at the customer's financial institution.

The first link in a typical network arrangement, after the remote terminal, is the financial institution which has contracted to acquire transactions from the terminal. This institution is called the "acquirer." The acquirer forwards the request to a regional switch which receives transactions from many acquirers. The switch then forwards the request to an institution which verifies the PIN and authorizes or rejects the transaction. This institution may be the institution which issued the card or it may be an agent of the card issuer.

The use of data encryption to protect PINs in this environment requires that each remote terminal have the ability to encrypt PINs before transmitting them in a transaction request, and that each card issuer have the information necessary to decrypt the PINs upon receiving them for verification.

This would be a relatively simple matter if all PINs were encrypted under the same encryption method. If such were the case, PINs encrypted at remote terminals would remain encrypted until they arrived at the card issuer for verification. The card issuer could decrypt all PINs, regardless of which terminal they came from, because all remote terminals would use the same PIN-encrypting method.

However, this scenario is too simplistic to be effective. While providing a slightly higher level of security than if the PINs were not encrypted at all, there would be a huge security risk in that literally hundreds of thousands of PINs would be encrypted under the same method and each transaction acquirer and card issuer in the network would need to have knowledge of the method in order to perform their function in the transaction process. Such widespread knowledge of an encryption method would expose such a large number of PINs as to present an unacceptable level of network security risk. For this reason, the encryption method used today is necessarily more complex. In cases where the information or data is transmitted through one or more institutions, the information or data is typically decrypted at each institution and re-encrypted prior to transmission to the next institution.

While a variety of encryption methods are in use today, the most common encryption method is referred to as the "Data Encryption Standard (DES) algorithm." The DES algorithm has been recommended by the American National Standards Institute (ANSI) as the encryption standard for financial institutions.

The DES algorithm encrypts electronic data, such as a PIN entered at a remote terminal keypad or an account number taken from the magnetic strip on the back of a plastic debit card, by performing a complex series of processes which transform the original data into a completely unrecognizable string of characters.

What makes it possible to use only one encryption method industry-wide and still maintain data security is the fact that the DES algorithm incorporates encryption "keys" which enable users to customize or personalize the algorithm for their own application. Decrypting data which has undergone DES encryption under a specific key requires knowledge of both the algorithm and the key. Attempting to decrypt the data with a different key or with no key at all would produce unreadable gibberish. Therefore, even though the whole network possesses the encryption algorithm, only those parties which possess the specific encryption key are able to decrypt the data.

In a process which will be further discussed below, the customer's PIN is encrypted at the remote terminal under a key which is used exclusively to encrypt PINs for transmission to the transaction acquirer. The encrypted PIN is then sent to the acquirer, where it is translated for delivery to the switch. PIN translation at the acquirer involves decrypting the PIN under the remote terminal key, then reencrypting it under a key which is used exclusively to encrypt PINs for transmission to the switch.

From the transaction acquirer, the PIN is transmitted to the switch, where a similar process is used to translate the PIN for delivery to the card issuer. Finally, at the card issuer, the PIN is translated for verification. Therefore, for each of these translations, a reliable data encryption/decryption device must be employed to convert the PIN information into a form which can be understood by the next link in the system.

Another threat to message security comes in the form of message tampering, such as the alteration of existing messages or the substitution of counterfeit messages for authentic messages.

For example, in an EFT message, a sophisticated eavesdropping or wiretapping organization could replace various elements in the message to redirect funds or fraudulently authorize transactions.

Therefore, just as data encryption protects against PIN theft, so does message authentication protect against message tampering. With message authentication, selected segments of a message are passed through the DES algorithm under a special authentication key. Rather than encrypting the data though, the algorithm calculates a code value from the data and appends this value to the end of the message. The receiver of the message runs the message through the algorithm under the same key used by the sender and arrives at a code value. The receiver then compares the just-calculated value against the value that was appended to the message by the sender. If the message has been tampered with, the two values will not be the same. If, on the other hand, the code values are equal, the message is authentic.

This would effectively foil a message-tampering scheme because the ATM, upon arriving at a message authentication value for the return message, would automatically deny the transaction, in spite of the authorization code. This would happen because the substitution of the authorization segment to the denial segment would cause the authentication value to change. The ATM would sense the disparity between the two values and would refuse to dispense the cash. The perpetrator could not effectively alter the authentication value because he would not have the proper key used by the sender and the receiver to arrive at the value.

While the DES algorithm and the message authentication scheme described above provide a large measure of security, the security of the system is totally dependant upon the security of the DES keys under which data is encrypted or authenticated. If an adversary were to come into possession of the key used between two links in the network, that adversary would have free access to all the transaction data which passed between links. For example, if he knew the key used by an ATM to encrypt PINs, he would be able to decrypt the PIN of every customer who used the ATM. If he possessed the key used to authenticate messages between any two links in the network, he could freely substitute messages or parts of messages to fraudulently redirect funds.

Therefore, in this type of system, good key management practices are essential in maintaining the security of the system. One element of maintaining the security of key information is to perform all key operations, such as key entry, key storage, encryption, and translation, within a physically and logically secure module. Since, at various points in the encryption process, keys may exist in the clear, it would be possible for an adversary to penetrate the network link's software and extract encryption keys. Maintaining the circuitry which processes this information in secrecy prevents system security breaches.

Present data encryption devices for use with secure networks are known to have many limitations. For example, in present encryption devices, key management is cumbersome. In one widely used encryption system, secure data is retained in a security module which cannot be modified or reprogrammed externally. In order to modify key data retained within the security module, the security module must be physically removed from the encryption device and reprogrammed with a dedicated programming unit. As a consequence, the encryption unit must be taken out of service while any key modification is performed. Since effective system security requires that key information is changed regularly, the above technique results in inefficient utilization of the system. Current data encryption devices do not provide an easy and efficient means of updating secure information without physically disturbing the data encryption device or removing the data encryption device from the system.

Furthermore, current systems rely on a dedicated encryption device for each data communication channel. In systems which require fault-tolerant operation, a plurality of discrete devices are required, each under the control of a remote processor. With this type of system, a host processor communicates with each encryption device individually. If fault-tolerant operation is required, duplicate encryption devices are coupled to parallel channels of the host processor. The host processor then monitors the operation of the primary encryption device, and if communications with that device are lost, the host processor initiates communication with the secondary encryption device. Systems which employ this configuration are subject to the loss of data in transit when one communication channel fails. Any data transmitted to a failed unit before the detection of a failure by a host must be retransmitted to a secondary device for reprocessing, thus degrading the performance of the system. No data encryption device is known which provides a fault-tolerant data encryption channel which requires only a single data communication channel and provides fault-tolerant operation without the need for monitoring by a host processor. Furthermore, no data encryption device is known which provides for automatic recovery from hardware failures.

In yet another aspect of present system configurations, the operating statistics of an encryption unit are unknown to the operator of a system. For example, a large number of denied transactions may be attributable to a failing encryption unit. If such statistics were of interest to a system operator, the main processing computer of the system would have to compile them, thus increasing the processing overhead and the overall cost of the system. Present data encryption devices are not provided with any means by which a user can visually monitor the operating status of the device, thereby allowing a user to detect a problem before a catastrophic failure occurs.

Finally, present systems are increasingly required to communicate with a variety of communication protocols and key verification techniques. Currently, dedicated encryption devices are required for implementing each type of encryption scheme. No device is known which supports data encryption using a variety of communications protocols.

SUMMARY OF THE INVENTION

Briefly described, the present invention contemplates an improved method and means of configuring data encryption devices in a data encryption system. In accordance with the present invention, a plurality of data encryption devices are coupled to a computer bus which allows the transmission of key data to the encryption devices. Each of the data encryption devices is then assigned to distinct groups based on a user's specific application. The present invention then simultaneously loads each board in the preassigned group, thereby facilitating the rapid entry of key information in a number of data encryption devices.

Accordingly, it is an object of the present invention to provide a multichannel encryption unit compatible with a plurality of encryption schemes.

It is another object of the present invention to provide a fault-tolerant device for use with data processing systems.

It is another object of the present invention to provide a fault-tolerant encryption device for use in an electronic fund transfer system.

It is another object of the present invention to provide a fault-tolerant processor arrangement.

It is another object of the present invention to provide a multichannel processor arrangement which is resistant to power supply failures.

It is another object of the present invention to provide an encryption device protocol which may be used universally with all known encryption schemes.

It is another object of the present invention to provide a tokenized communication protocol for communicating with a plurality of processing units.

It is another object of the present invention to provide an efficient and user-friendly means of entering and updating key information in a data encryption unit.

It is another object of the present invention to provide an efficient, secure and user-friendly means of entering and updating key information in a data encryption unit.

It is another object of the present invention to provide a menu-driven controller for use with a multichannel data encryption device.

It is another object of the present invention to substantially reduce the cost of a data encryption device.

It is another object of the present invention to provide improved security in a data encryption device while improving the ease of entry of key information.

It is another object of the present invention to provide a display device for use with a multichannel encryption unit.

It is another object of the present invention to provide a method and means for recording and displaying operating statistics in a data encryption unit.

It is another object of the present invention to provide a method of altering the software of a data encryption device display and control unit without disturbing the operation of associated data encryption devices.

It is another object of the present invention to provide a method of updating the control software in a data encryption device without physically disturbing the data encryption unit.

It is another object of the present invention to provide an improved means for updating software in a multiprocessor computer system.

It is another object of the present invention to provide a user-friendly front end control unit which controls access to data encryption devices.

It is another object of the present invention to provide an efficient and effective means of providing password protection in data encryption devices.

It is another object of the present invention to provide a fault-tolerant microcomputer arrangement.

It is another object of the present invention to provide a menu-driven key management interface for use data encryption devices.

BRIEF DESCRIPTION OF THE DRAWINGS

These and other objects will be fully appreciated through the description below and the accompanying Figures of drawing in which:

FIGS. 5A through 13 are flow diagrams detailing the operation of the monitor software portion for each of the encryption devices used in conjunction with the present invention, wherein:

FIG. 5A is a flow diagram of the encryption device power-on initialization routine.

FIG. 6 is a flow diagram detailing the operation of the "F_INIT1" subroutine called by the routine of FIG. 5A.

FIG. 7 is a flow diagram detailing the operation of the "F_INIT2" subroutine called by the routine of FIG. 7.

FIG. 8B is a memory map of the serial input and output buffers.

FIG. 9 is a flow diagram of the encryption device bus interrupt routine.

FIG. 11 is a flow diagram of the encryption device "POWERFAIL_INTERRUPT" subroutine.

FIG. 12 is a flow diagram of the encryption tamper switch interrupt routine.

FIG. 13 is a flow diagram of the encryption device F_WATCHDOG subroutine.

FIGS. 14 through 50 are flow diagrams detailing the operation of the application software portion for each of the encryption devices used in conjunction with the present invention, wherein:

FIG. 15 is a continuation of the routine of FIG. 14.

FIG. 19 is a flow diagram of the "STAT" routine branched to by the routine of FIG. 17A.

FIG. 21 is a flow diagram of the "PROCESS" message routine jumped to from the routine of FIG. 16.

FIG. 22 is a flow diagram of the "CATC" message routine jumped to from the routine of FIG. 21.

FIG. 23 is a flow diagram of the "CKTA" message routine called by the routine of FIG. 21.

FIG. 24 is a flow diagram of the "CLWA" message routine called by the routine of FIG. 21.

FIG. 25 is a flow diagram of the "CRYP" message routine called by the routine of FIG. 21.

FIG. 26 is a flow diagram of the "CWKS" message routine called by the routine of FIG. 21.

FIG. 27 is a flow diagram of the "DDAT" message routine called by the routine of FIG. 21.

FIG. 28 is a flow diagram of the "DES" message routine called by the routine of FIG. 21.

FIG. 29 is a flow diagram of the "DKTE" message routine called by the routine of FIG. 21.

FIG. 30 is a flow diagram of the "ECHO" message routine called by the routine of FIG. 21.

FIG. 31 is a flow diagram of the "EDAT" message routine called by the routine of FIG. 21.

FIG. 32 is a flow diagram of the "EFIT" message routine called by the routine of FIG. 21.

FIG. 33 is a flow diagram of the "EPIN" message routine called by the routine of FIG. 21.

FIG. 34 is a flow diagram of the "GWKS" message routine called by the routine of FIG. 21.

FIG. 35 is a flow diagram of the "IKEY" message routine called by the routine of FIG. 21.

FIG. 36 is a flow diagram of the "LATM" message routine called by the routine of FIG. 21.

FIG. 37 is a flow diagram of the "LCDT" message routine called by the routine of FIG. 21.

FIG. 38 is a flow diagram of the "LENT" message routine called by the routine of FIG. 21.

FIG. 40 is a flow diagram of the "LKEY" message routine called by the routine of FIG. 21.

FIG. 41 is a flow diagram of the "RKEY" message routine called by the routine of FIG. 21.

FIG. 42 is a flow diagram of the "SKEY" message routine called by the routine of FIG. 21.

FIG. 43 is a flow diagram of the "TDLY" message routine called by the routine of FIG. 21.

FIG. 44 is a flow diagram of the "TPIN" message routine called by the routine of FIG. 21.

FIG. 45 is a flow diagram of the "TWKD" message routine called by the routine of FIG. 21.

FIG. 46 is a flow diagram of the "F_DELAY" message routine called by various subroutines of the present invention.

FIG. 47 is a flow diagram of the "TWKL" message routine called by the routine of FIG. 21.

FIG. 48 is a flow diagram of the "VKTE" message routine called by the routine of FIG. 21.

FIG. 50 is a flow diagram of the "ERROR" routine called by the routine of FIG. 16.

FIGS. 51 through 97 are diagrams of screen displays of the menu-driven, user-friendly interface of the present invention, wherein:

FIG. 51 is a diagram of the opening status screen displayed to the user upon system power-up.

FIG. 52 is a representative sample of the opening help screen displayed to the user when activated from a preselected function.

FIG. 53 is a diagram of the master status screen displayed to the user when the status display mode is selected.

FIG. 54 is a diagram of the status screen displayed to the user when resetting board statistics.

FIG. 55 is a diagram of the status screen displayed to the user under an alarm condition.

FIG. 56 is a diagram of the master "OPTIONS_MENU" displayed to the user when the options mode is selected.

FIG. 57 is a diagram of the screen displayed to the user when option "Status Interval" is selected.

FIG. 58 is a diagram of the screen displayed to the user when option "Sample Interval" is selected.

FIG. 59 is a diagram of the screen displayed to the user when option "Threshold Values" is selected.

FIG. 60 is a diagram of the screen displayed to the user when option "New Password" is selected.

FIG. 61 is a diagram of the screen displayed to the user when option "Configure" is selected.

FIG. 62 is a diagram of the screen displayed to the user when option "Configure" is selected at a first "level" and a particular board is selected at a second level.

FIG. 63 is a diagram of the screen displayed to the user when option "Configure" is selected at a first level, a particular board is selected at a second level, and the "Board Description" menu is selected at a third level.

FIG. 64 is a diagram of the screen displayed to the user when option "Configure" is selected at a first level, a particular board is selected at a second level, and the "Board Description" menu is selected at a third level.

FIG. 65 is a diagram of the screen displayed to the user when option "Configure" is selected at a first level, a particular board is selected at a second level, and the "Group" menu is selected at a third level.

FIG. 66 is a diagram of the screen displayed to the user when option "Configure" is selected at a first level, a particular board is selected at a second level, and the "Mode" menu is selected at a third level.

FIG. 67 is a diagram of the screen displayed to the user when option "Configure" is selected at a first level, a particular board is selected at a second level, and the "Communications" menu is selected at a third level.

FIG. 68 is a diagram of the screen displayed to the user when option "Configure" is selected at a first level, a particular board is selected at a second level, the "Communications" menu is selected at a third level, and "Baud Rate" is selected at the fourth level.

FIG. 69 is a diagram of the screen displayed to the user when option "Configure" is selected at a first level, a particular board is selected at a second level, the "Communications" menu is selected at a third level, and "Parity" is selected at the fourth level.

FIG. 70 is a diagram of the screen displayed to the user when option "Configure" is selected at a first level, a particular board is selected at a second level, the "Communications" menu is selected at a third level, and "Data Bits" is selected at the fourth level.

FIG. 71 is a diagram of the screen displayed to the user when option "Configure" is selected at a first level, a particular board is selected at a second level, the "Communications" menu is selected at a third level, and "Frame Timer" is selected at the fourth level.

FIG. 72 is a diagram of the screen displayed to the user when option "Configure" is selected at a first level, a particular board is selected at a second level, and "Serial Support" is selected at a third level.

FIG. 73 is a diagram of the master screen displayed to the user when "Keys" is selected on the menu bar.

FIG. 74 is a diagram of the screen displayed to the user when Key menu item "Load MFK" is selected at a first level and "ENTER_KEY Part 1" is displayed at a second level.

FIG. 75 is a diagram of the screen displayed to the user when Key menu item "Load MFK" is selected at a first level, "ENTER_KEY Part 1" is selected at a second level, a key part has been entered, and the system is requesting verification of the key part.

FIG. 76 is a diagram of the screen displayed to the user when Key menu item "Load MFK" is selected at a first level, all key parts have been entered, and the system is requesting acceptance of the key parts.

FIG. 77 is a diagram of the screen displayed to the user when Key menu item "generate PVK cryptogram" is selected at a first level, the key parts are entered at the second level, and the key parts were accepted at a third level.

FIG. 78 is a diagram of the screen displayed when a user has instructed the system to load a cryptogram.

FIG. 79 is a diagram of the screen displayed when a user has instructed the system to load a cryptogram and the system is prompting a user to enter a table position.

FIG. 80 is a diagram of the screen displayed when a key table position has been entered and the system is requesting verification of the entered value.

FIG. 81 is a diagram of the screen displayed when the entered key table position value has been verified by the user and the key table position has been loaded in the system.

FIG. 82 is a diagram of the screen displayed when the menu option "Random Key generation" is selected by the user.

FIG. 83 is a diagram of the opening screen displayed to the user when the Key menu item "LOAD_DIEBOLD_TABLE" is selected.

FIG. 84 is a diagram of the screen displayed to the user when the Key menu item "LOAD_DIEBOLD_TABLE" is selected and the user editing mode is active.

FIG. 85 is a flow diagram of the screen displayed when the user has selected the menu item "LOAD_DIEBOLD_TABLE" is selected, a table has been entered and the "F3" key has been pressed and the system is prompting the user to accept or cancel the table or return to the table editing mode.

FIG. 86 is a diagram of the screen displayed to the user when the Key menu item "LOAD_DIEBOLD_TABLE" is selected and the Diebold table has been accepted.

FIG. 87 is a diagram of the screen displayed to the user when the Key menu "LOAD_DIEBOLD_TABLE" is selected, the Diebold table has been accepted, a table position has been entered, and a duplicate table value has been entered.

FIG. 88 is a diagram of the master screen displayed to the user when "Utils" is selected on the menu bar.

FIG. 89 is a diagram of the screen displayed to the user when "Utils" is selected on the menu bar, "Backup" has been selected under the "Utils" menu, and a board has been selected to Backup.

FIG. 90 is a diagram of the screen displayed to the user when "Utils" is selected on the menu bar, "Backup" has been selected under the "Utils" menu, and the system is prompting the user to insert a diskette in the system.

FIG. 91 is a diagram of the screen displayed to the user when "Utils" is selected on the menu bar, "Backup" has been selected under the "Utils" menu, a board has been selected to Backup, and the backup drive was not ready.

FIG. 92 is a diagram of the screen displayed to the user when "Utils" is selected on the menu bar, "Backup" has been selected under the "Utils" menu, a board has been selected to Backup, the backup has been completed, and the backup description is displayed.

FIG. 93 is a diagram of the screen displayed to the user when "Utils" is selected on the menu bar and "Restore" has been selected under the "Utils" menu.

FIG. 94 is a diagram of the screen displayed to the user when "Utils" is selected on the menu bar, "Restore" has been selected under the "Utils" menu, and a restore file is loaded in the system.

FIG. 95 is a diagram of the screen displayed to the user when "Utils" is selected on the menu bar, "Restore" has been selected under the "Utils" menu, a restore file is loaded in the system, and a restore file has been selected.

FIG. 96 is a diagram of the screen displayed to the user when "Utils" is selected on the menu bar and "Clear Board Statistics" has been selected under the "Utils" menu.

FIG. 97 is a diagram of the master screen displayed to the user when "Quit" is selected on the menu bar.

FIGS. 98 through 160 are a series of flow diagrams detailing the operation of the monitor control processor for controlling the user-friendly interface and for communicating with the above-described encryption devices, wherein:

FIG. 100C is a continuation of the flow diagram of FIG. 100B.

FIG. 100D is a continuation of the flow diagram of FIG. 100C.

FIG. 101 is a flow diagram of the "INIT" subroutine called by the routine of FIG. 99.

FIG. 102A is a flow diagram of the "OPEN_DEBS" subroutine called by numerous subroutines of the present invention.

FIG. 102B is a continuation of the flow diagram of FIG. 102A.

FIG. 103 is a flow diagram of the "CLOSE_DEBS" subroutine called by numerous subroutines of the present invention.

FIG. 104A is a flow diagram of the "SYSTEM_STATUS" subroutine called by the subroutine of FIG. 100B.

FIG. 104B is a continuation of the subroutine of FIG. 104A.

FIG. 104C is a continuation of the flow diagram of FIG. 100B.

FIG. 105 is a flow diagram of the "STATUS3" subroutine called by the routine of FIG. 104B.

FIG. 106 is a flow diagram of the "WRITE_FREEZE" subroutine called by the subroutine of FIG. 104B.

FIG. 107 is a flow diagram of the "NEXT_BOARD" subroutine called by the subroutine of FIG. 104B.

Figure 104A:
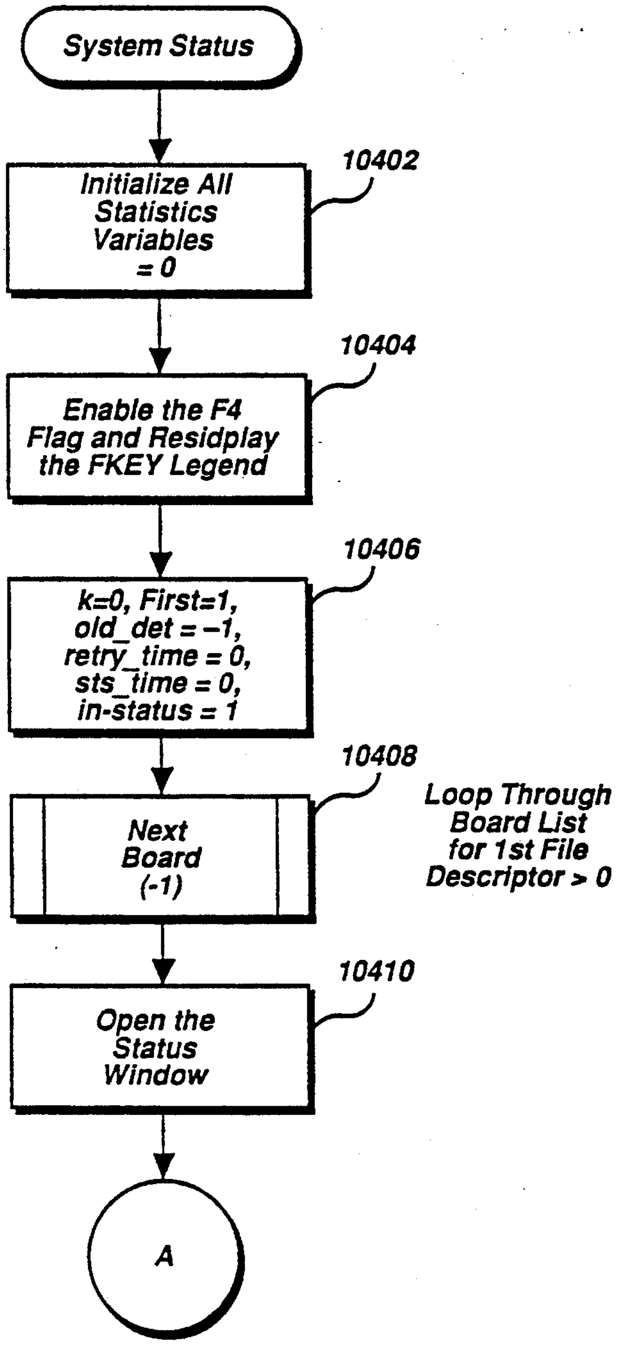
Figure 104B:
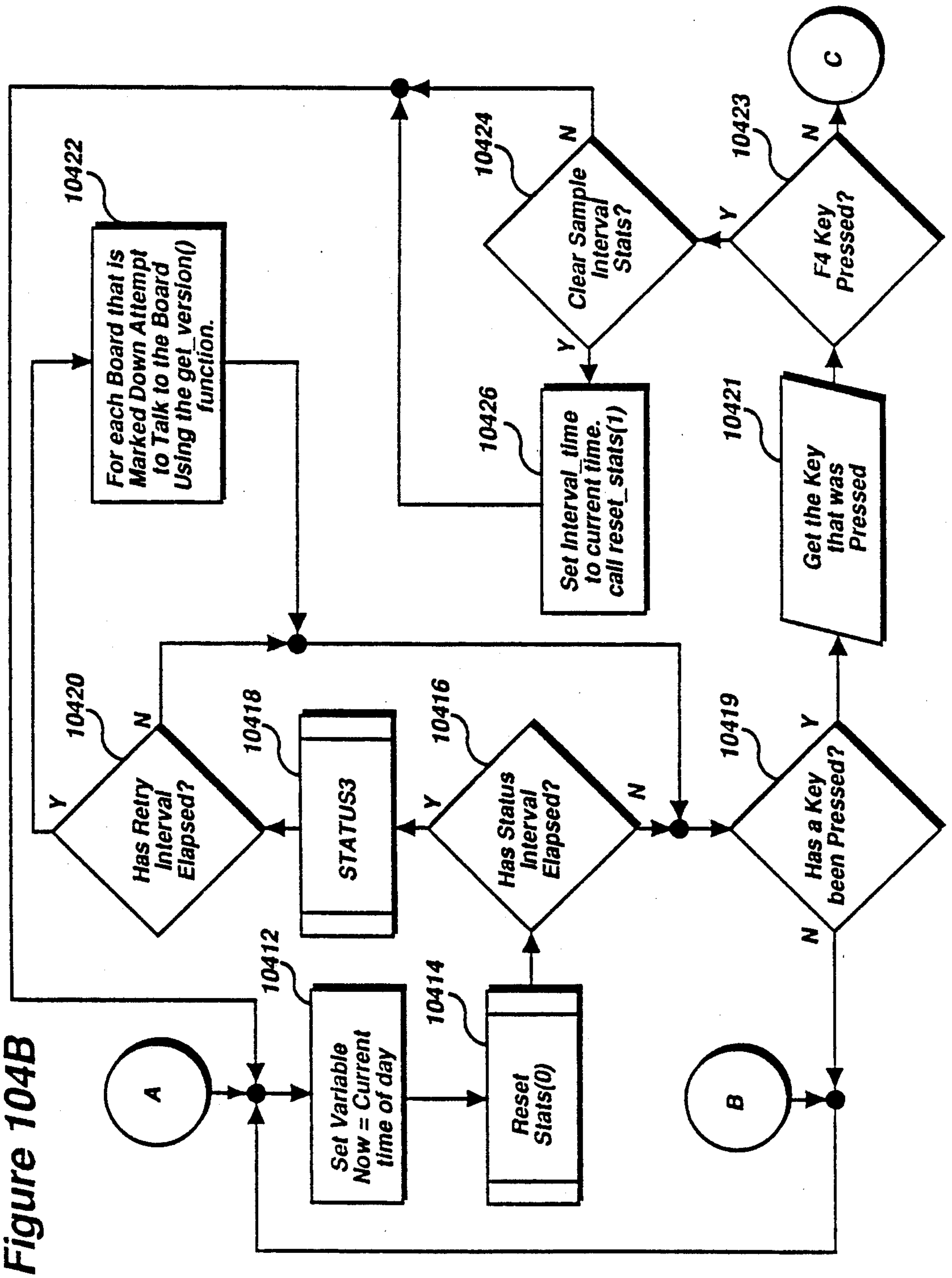
Figure 104C:
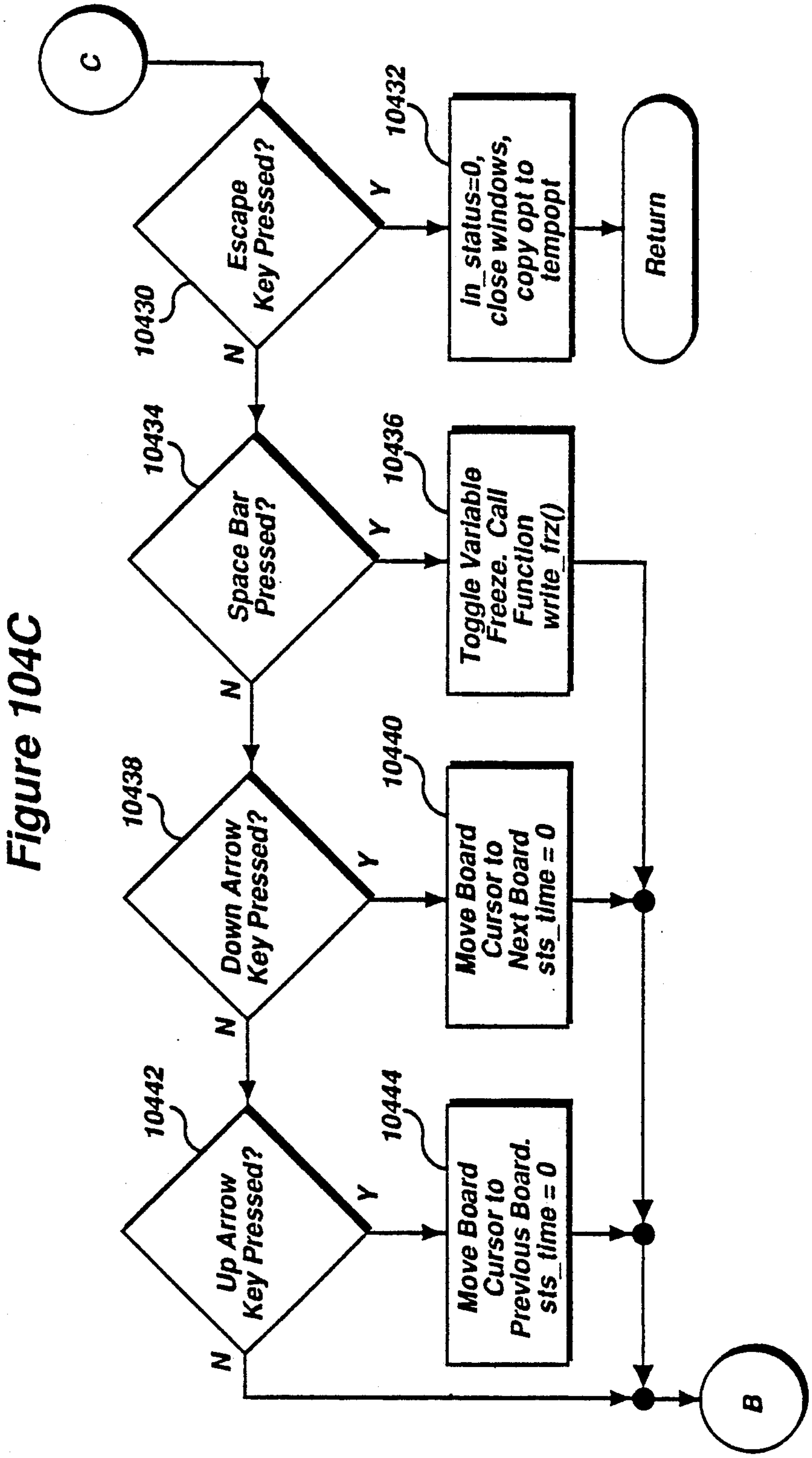
Figure 108:
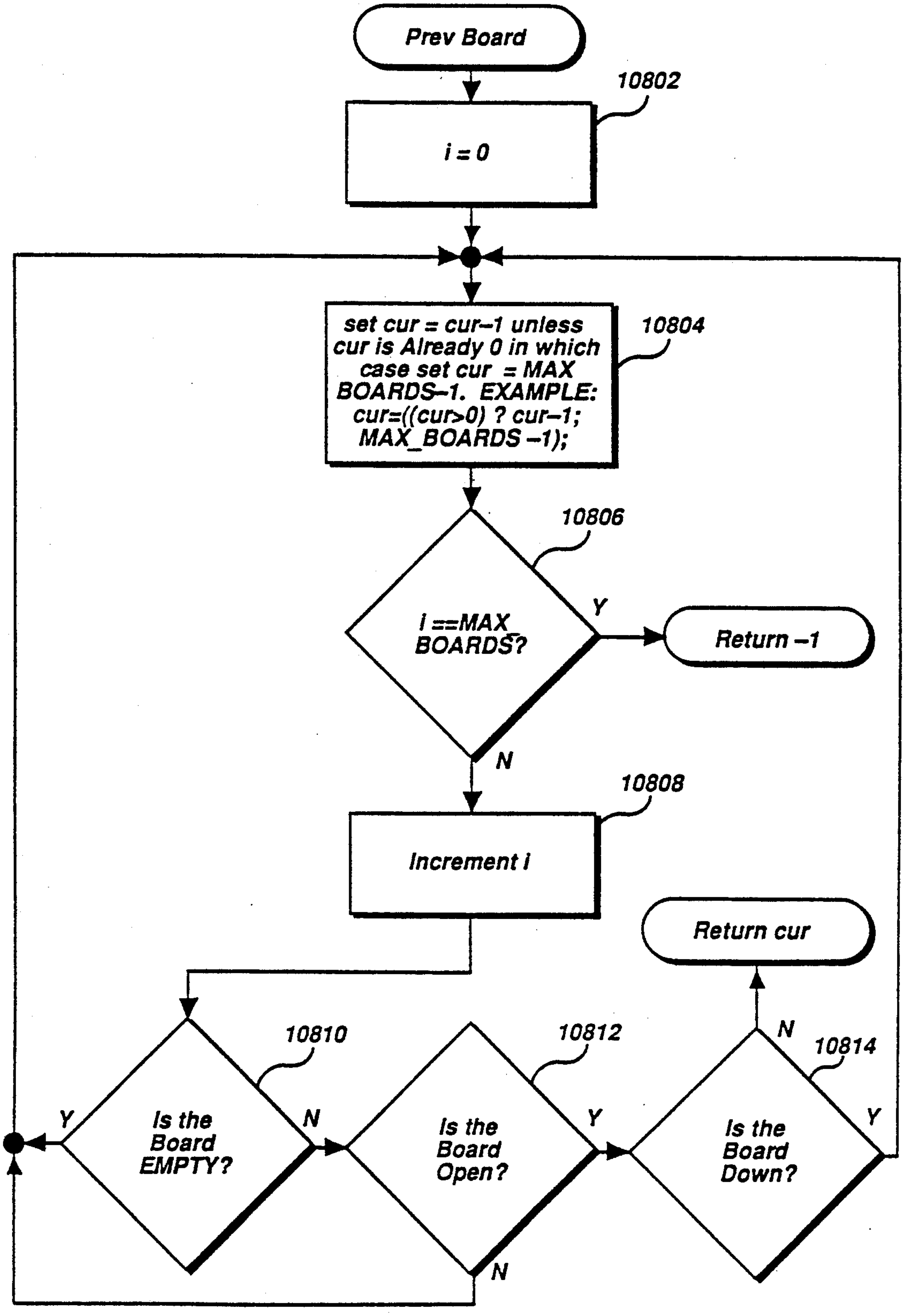

FIG. 108 is a flow diagram of the "PREV_BOARD" subroutine called by the subroutine of FIG. 104B.

Figure 105:
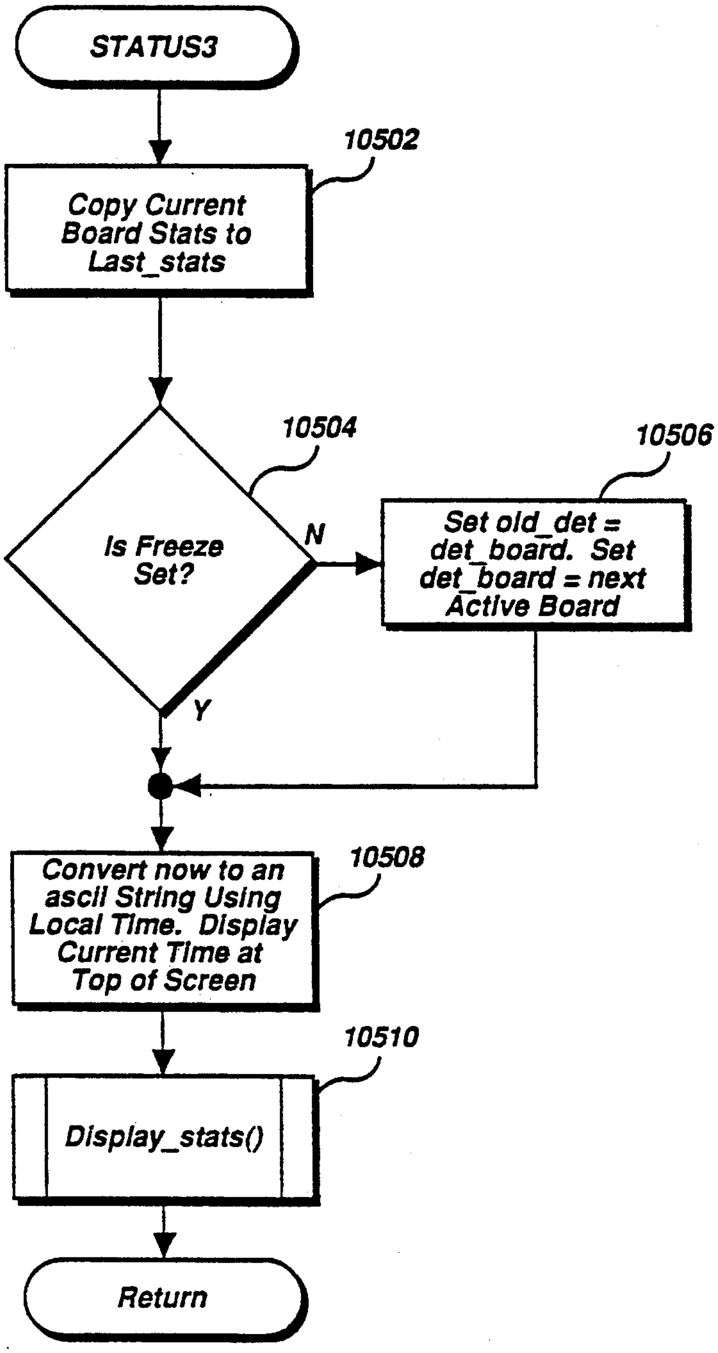
Figure 109A:
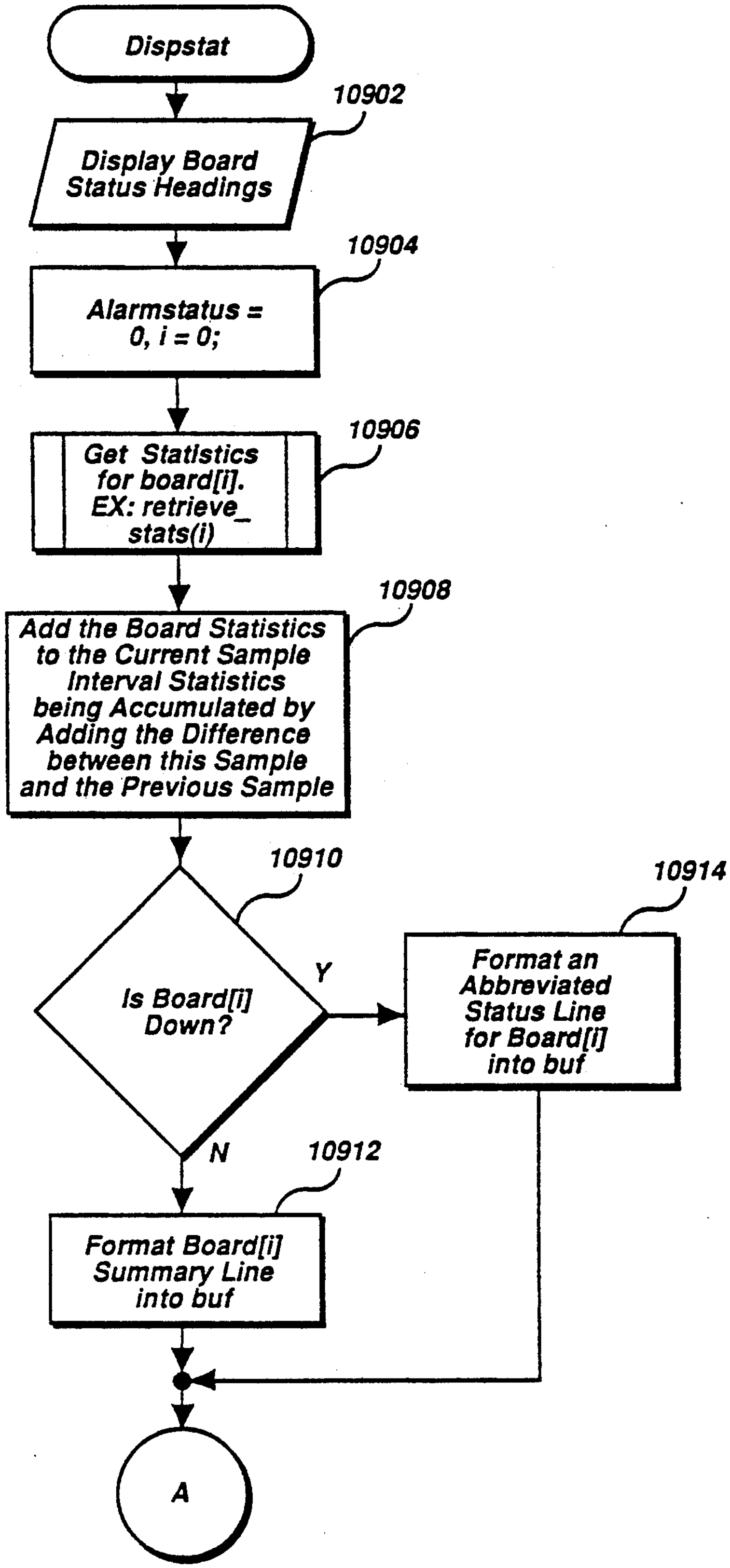

FIG. 109A is a flow diagram of the "DISPSTAT" subroutine called by the subroutine of FIG. 105.

Figure 109B:
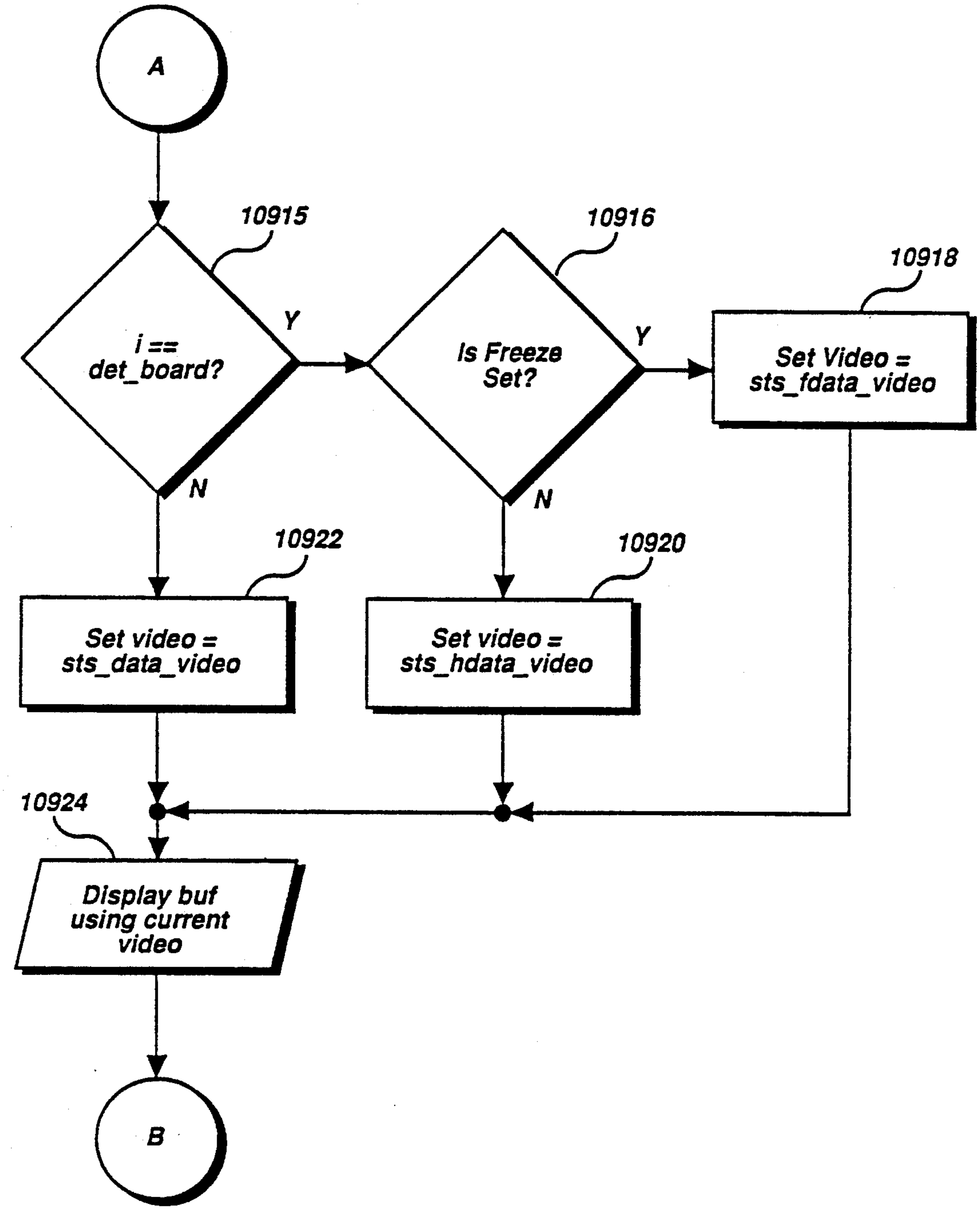

FIG. 109B is a continuation of the flow diagram of FIG. 109A.

Figure 109C:
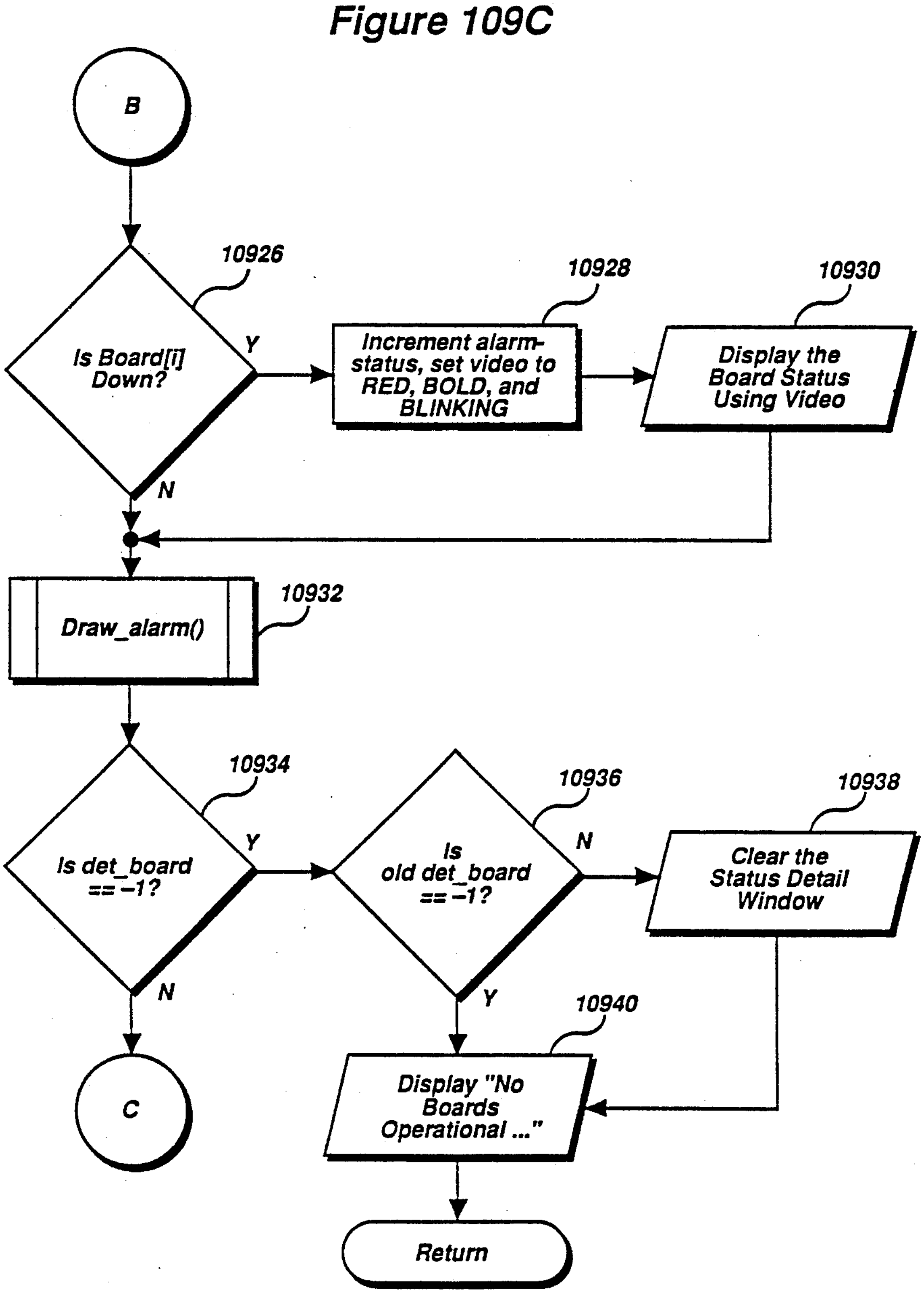

FIG. 109C is a continuation of the flow diagram of FIG. 109B.

Figure 110:
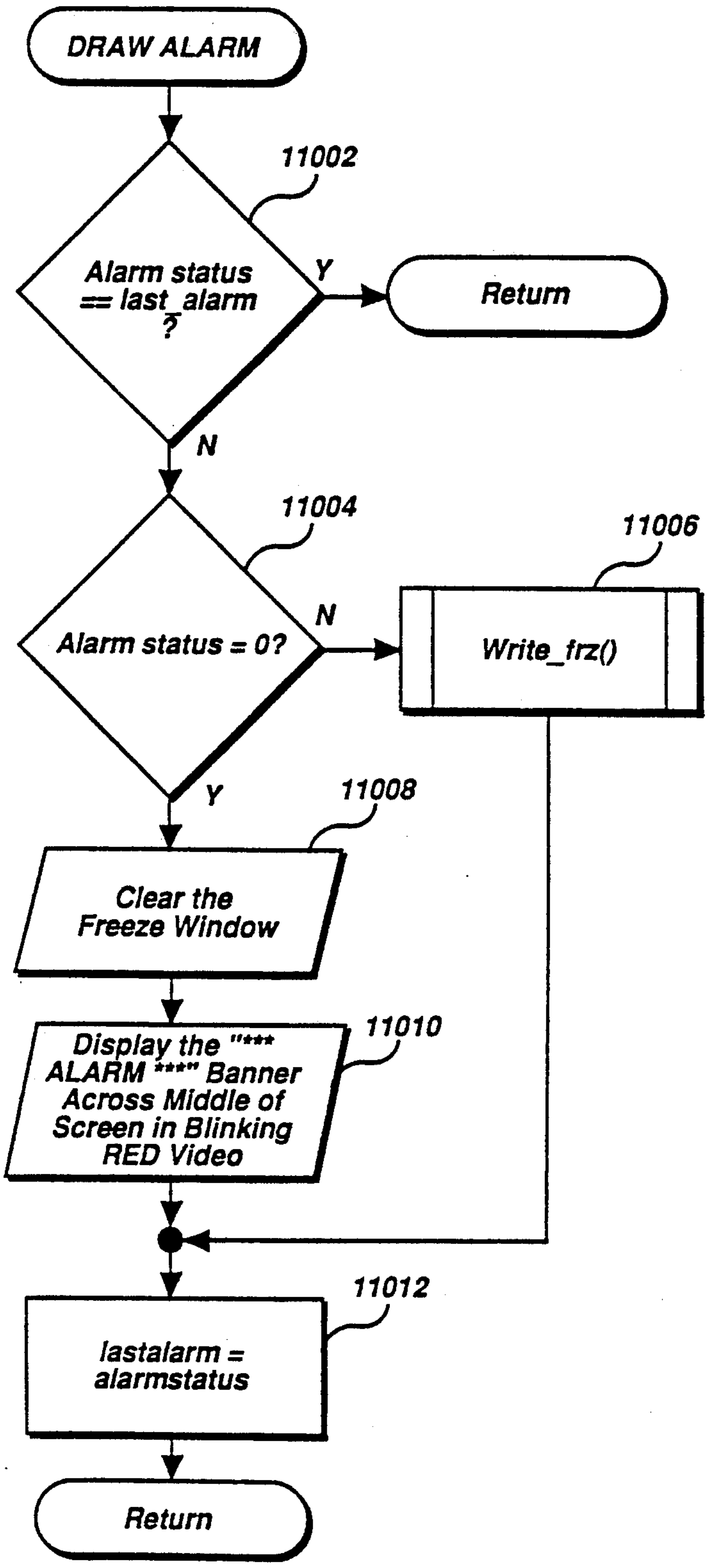

FIG. 110 is a flow diagram of the "DRAWALARM" subroutine called by the subroutine of FIGS. 109A-109C.

Figure 111:
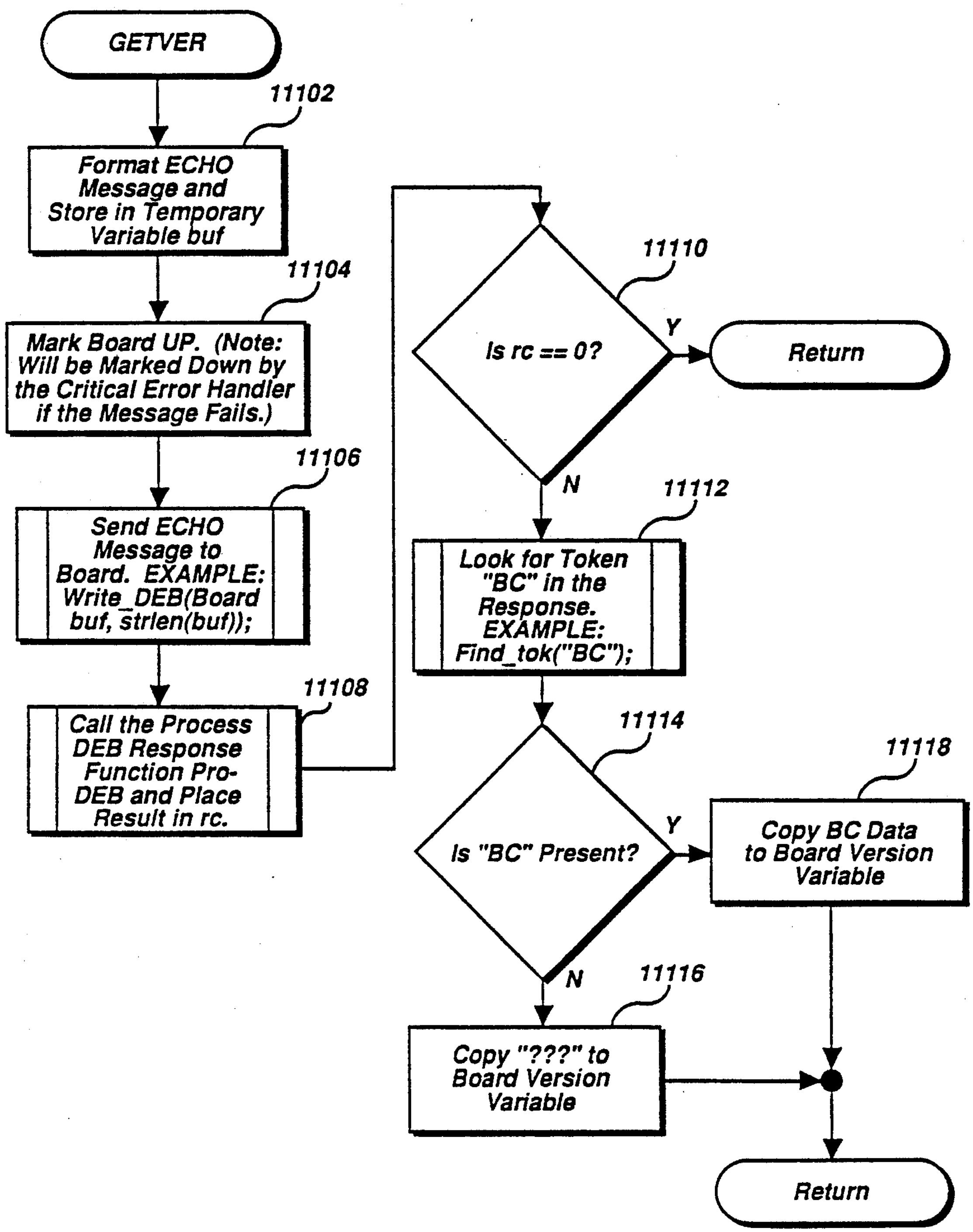

FIG. 111 is a flow diagram of the "GETVER" subroutine called by various subroutines of the present invention.

Figure 100A:
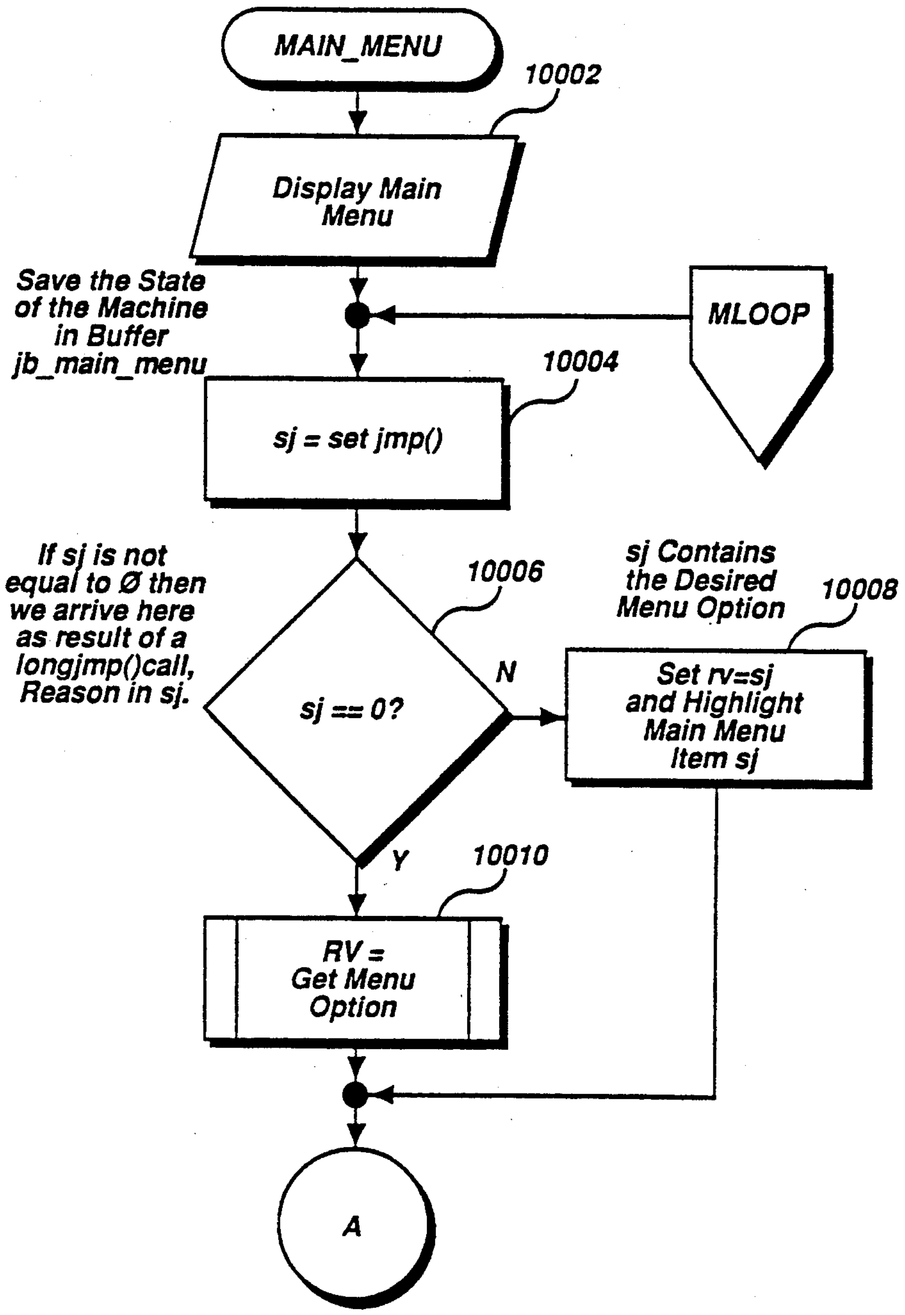
FIG. 100A is a flow diagram of the main menu subroutine called by the routine of FIG. 100A.
Figure 100B:
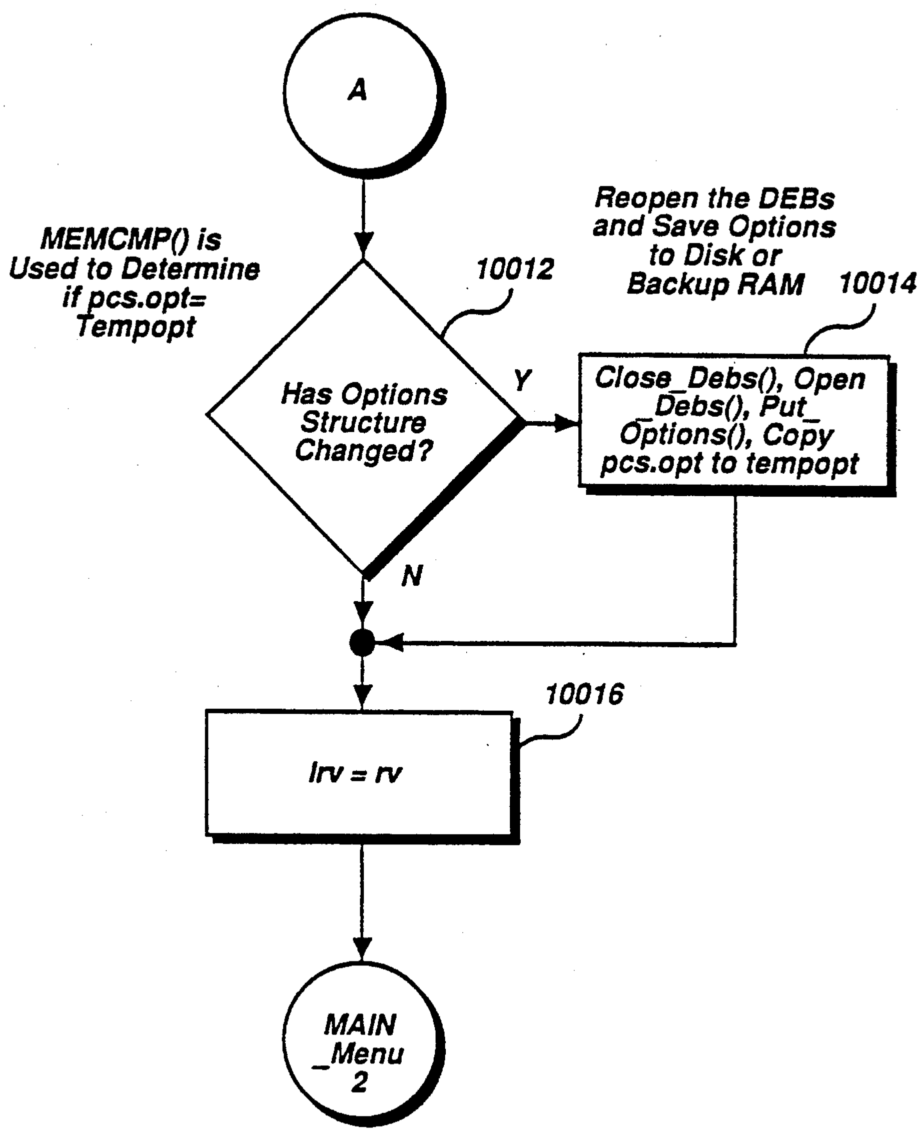
FIG. 100B is a continuation of the flow diagram of FIG. 100A.
Figure 112A:
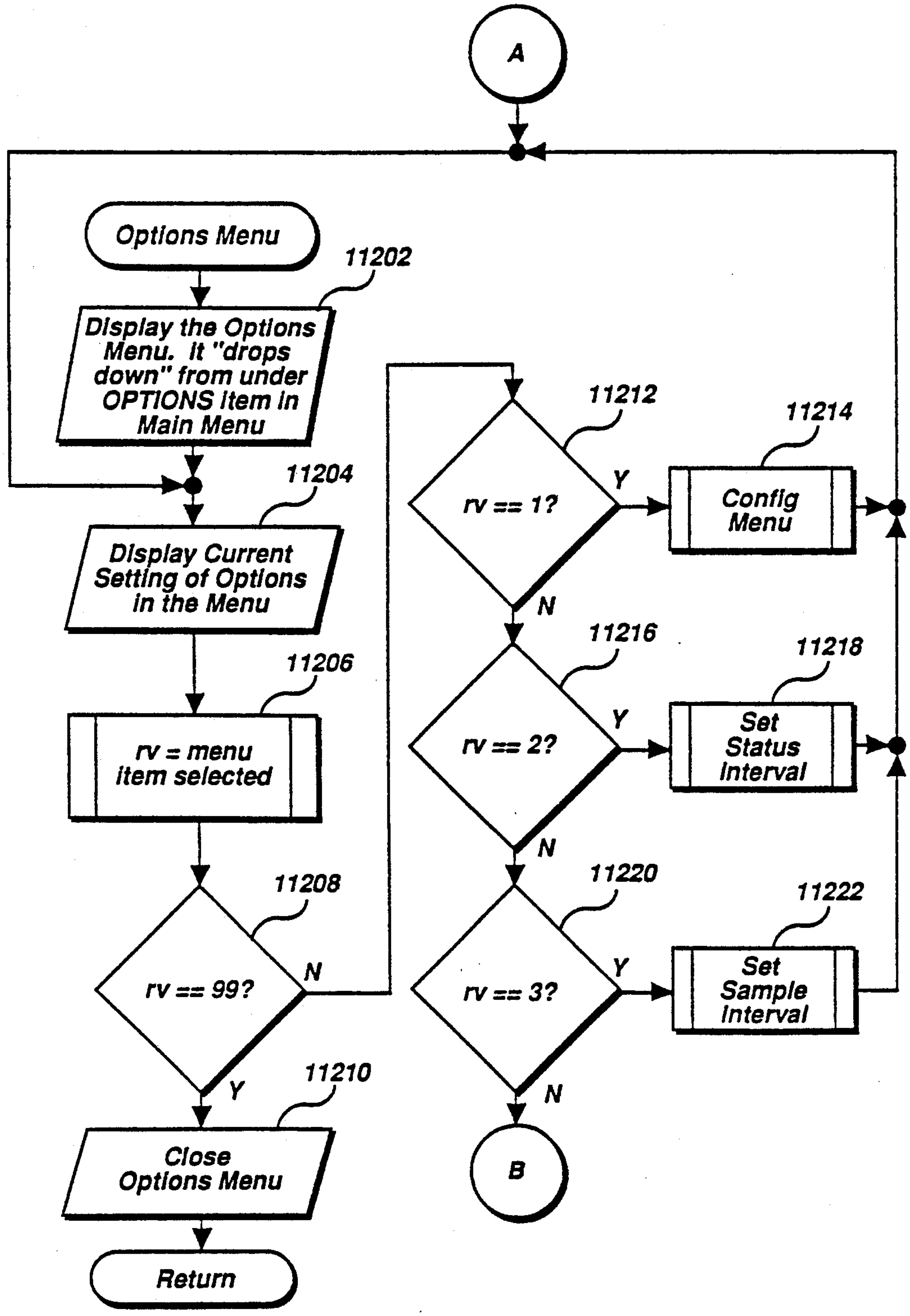

FIG. 112A is a flow diagram of the "OPTIONS_MENU" subroutine called by the subroutine of FIG. 100B.

Figure 112B:
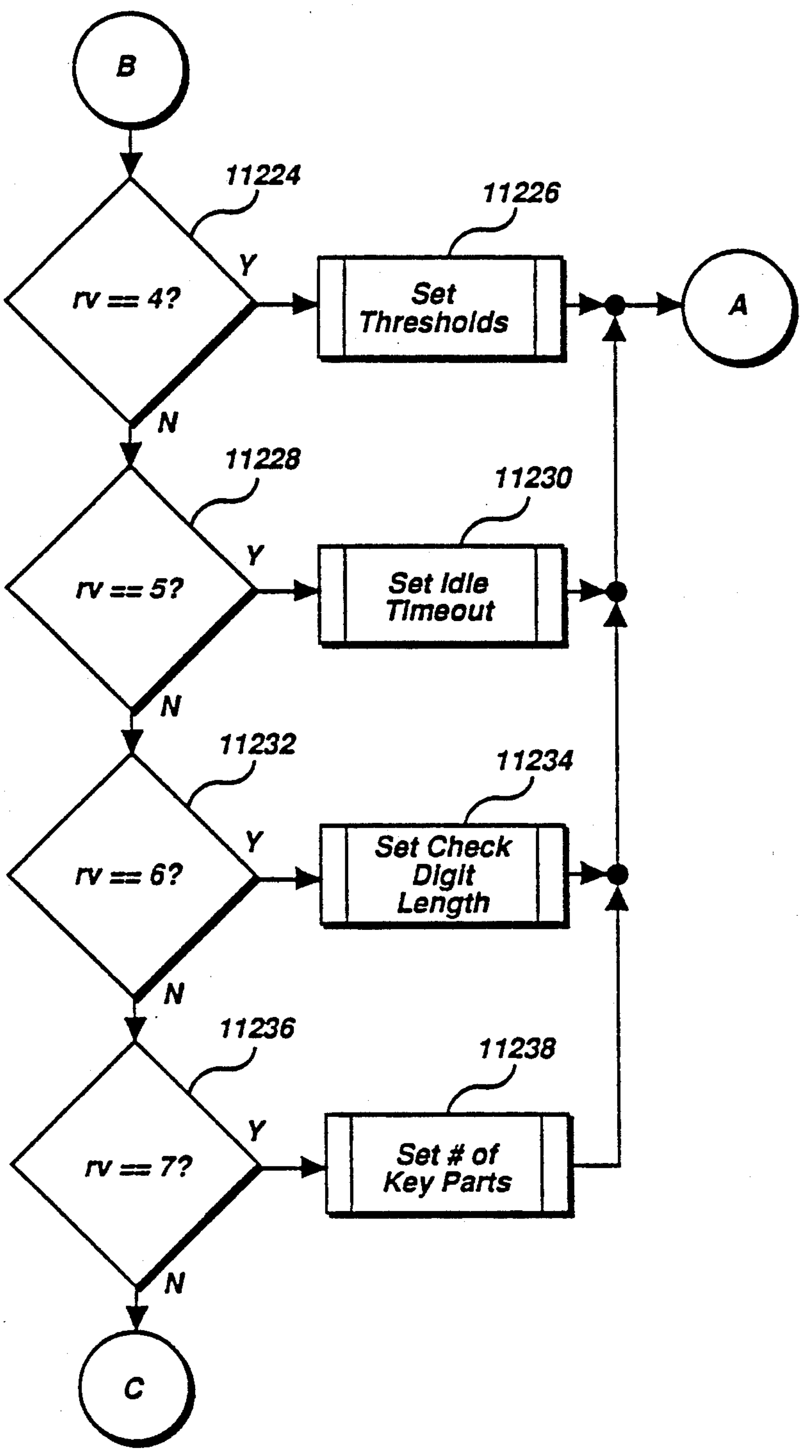

FIG. 112B is a continuation of the subroutine of FIG. 112A.

Figure 112C:
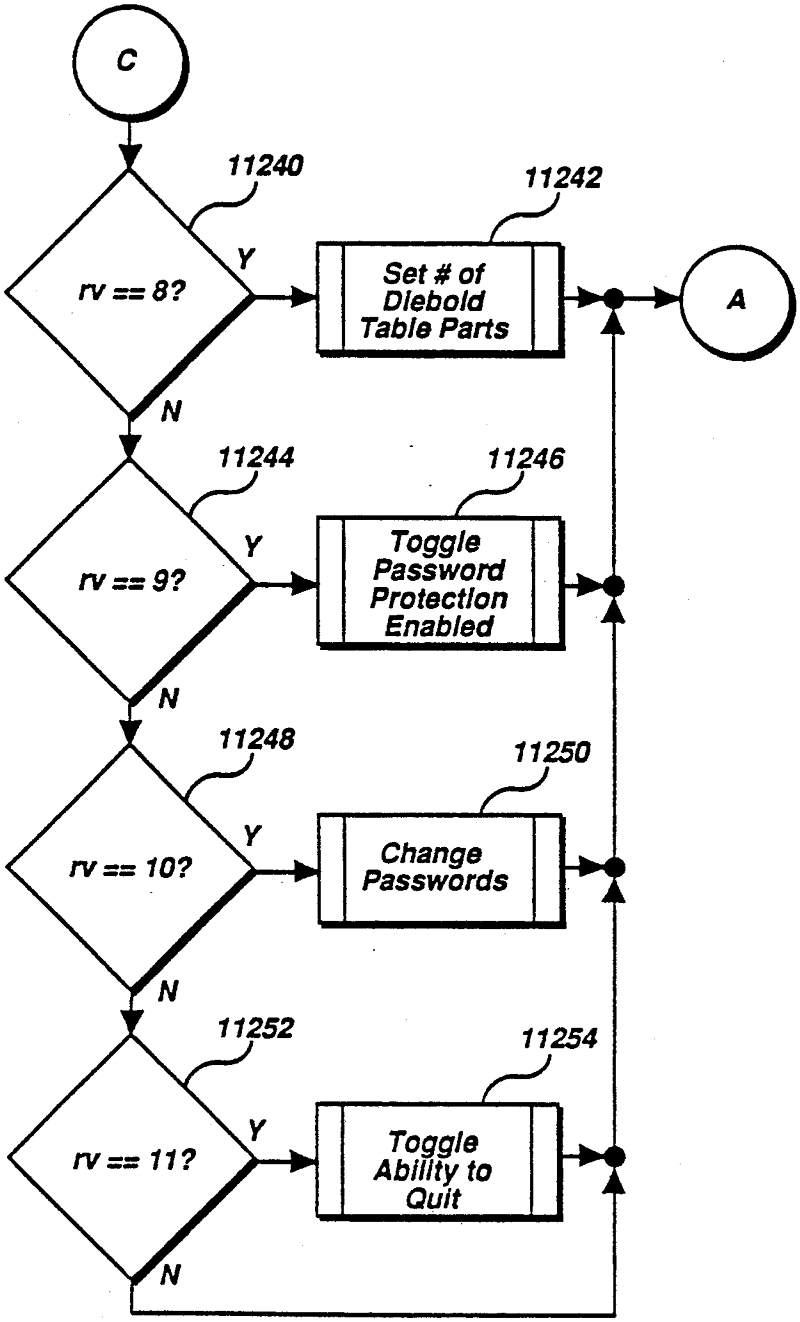

FIG. 112C is a continuation of the subroutine of FIG. 112B.

Figure 113:
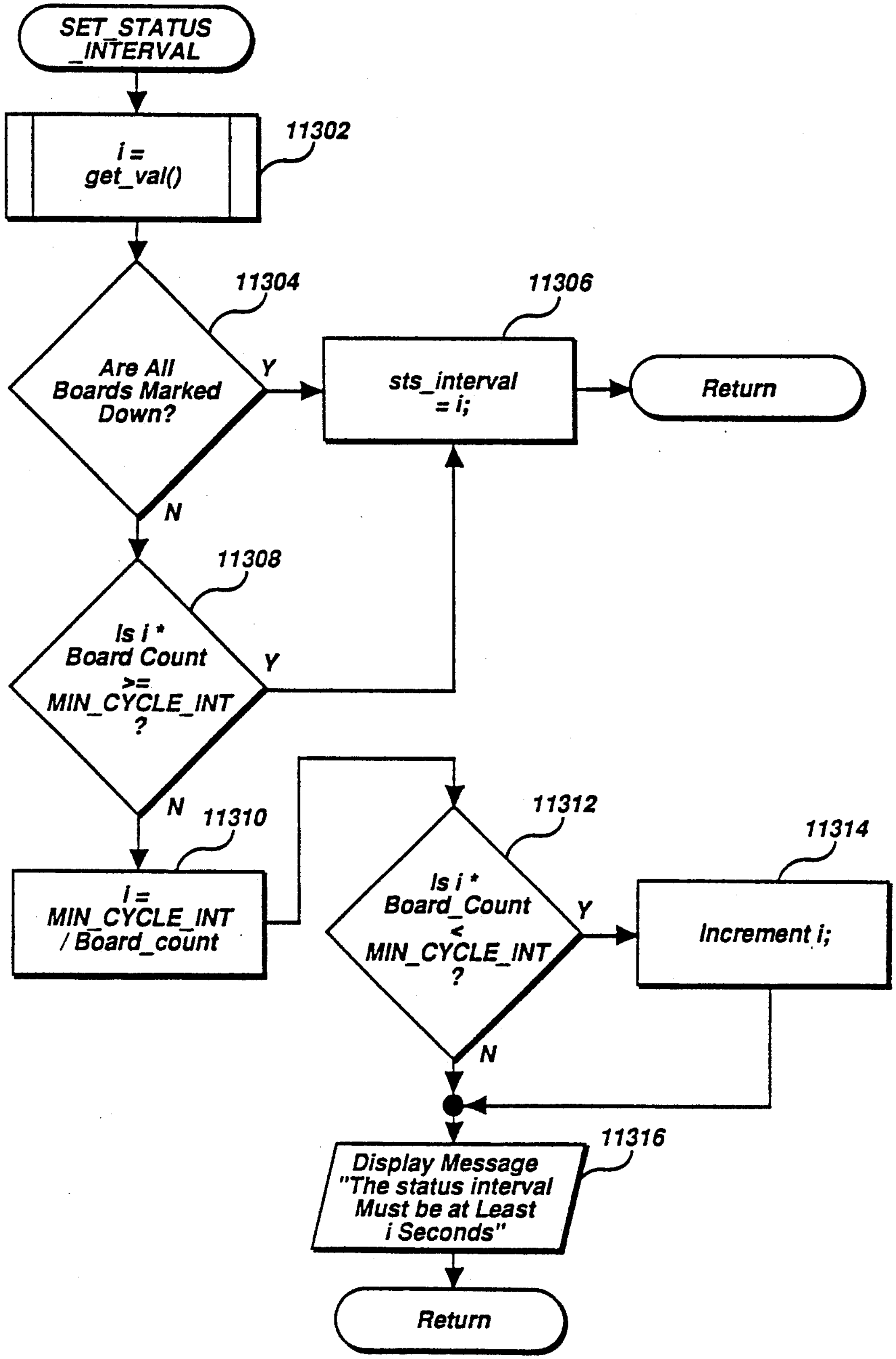

FIG. 113 is a flow diagram of the "SET_STATUS_INTERVAL" subroutine called by the subroutine of FIG. 112.

Figure 114:
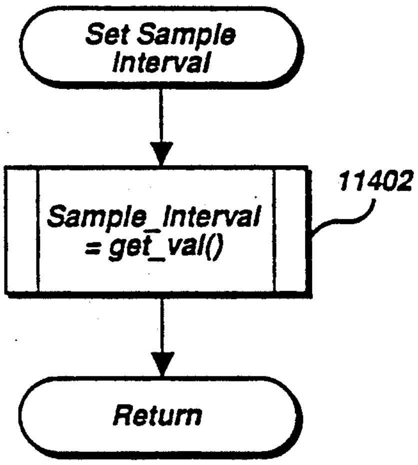

FIG. 114 is a flow diagram of the "SET_SAMPLE_INTERVAL" subroutine called by the subroutine of FIG. 112.

Figure 115:
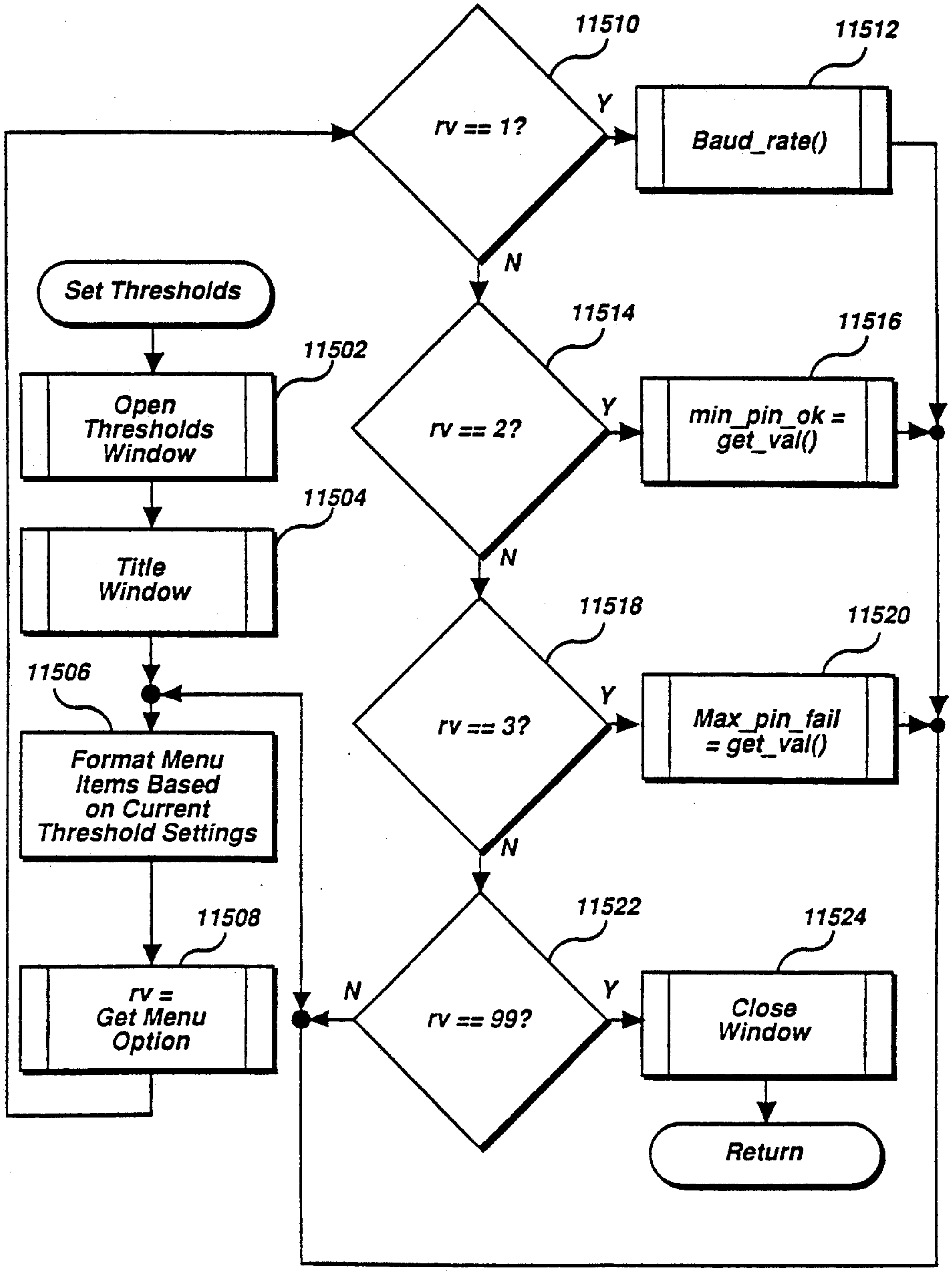

FIG. 115 is a flow diagram of the "SET_THRESHOLDS" subroutine called by the subroutine of FIG. 112.

Figure 116:
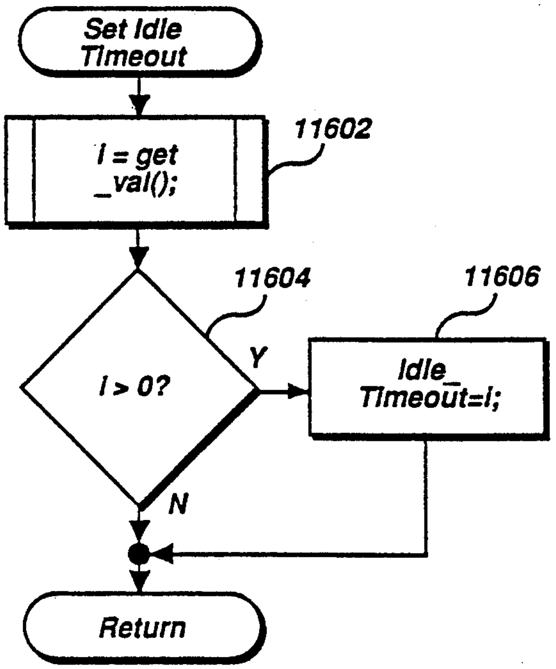

FIG. 116 is a flow diagram of the "SET_IDLE_TIMEOUT" subroutine called by the subroutine of FIG. 112.

Figure 117:
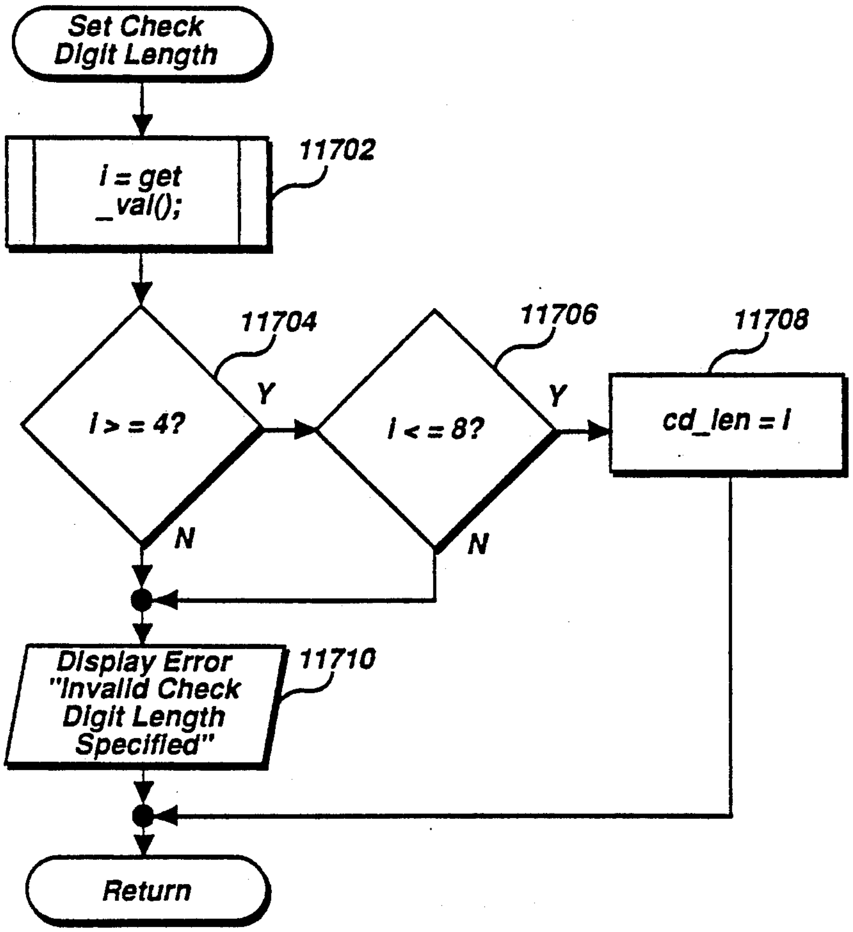

FIG. 117 is a flow diagram of the "SET_CHECK_DIGIT_LENGTH" subroutine called by the subroutine of FIG. 112.

Figure 118:
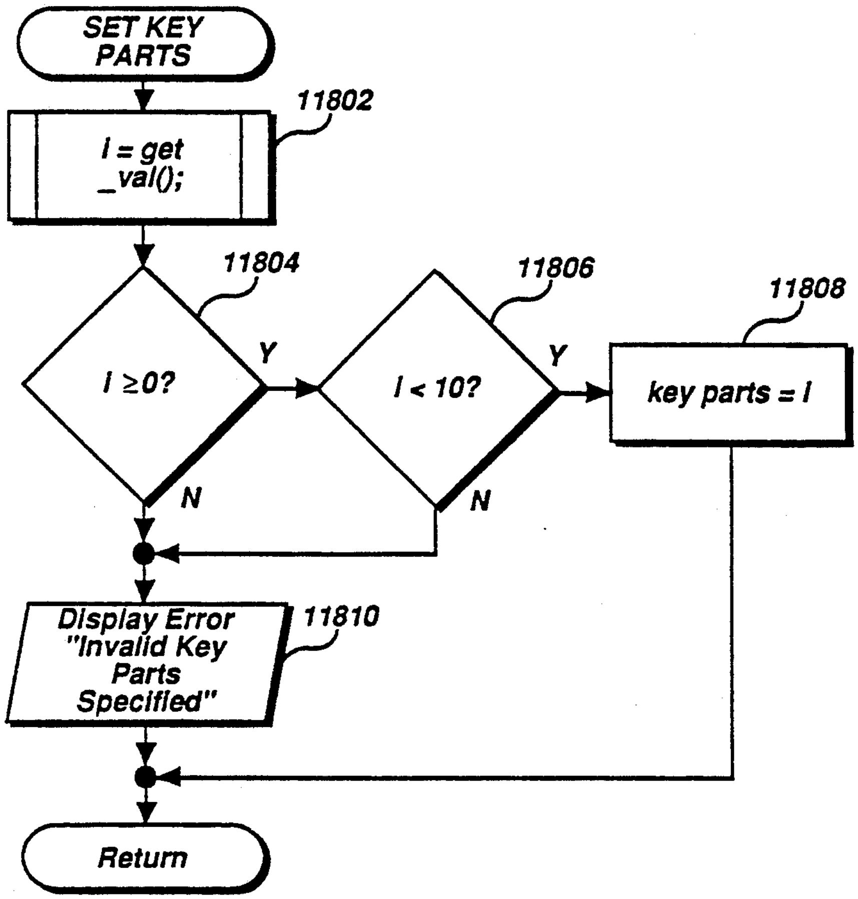

FIG. 118 is a flow diagram of the "SET_KEY_PARTS" subroutine called by the subroutine of FIG. 112.

Figure 119:
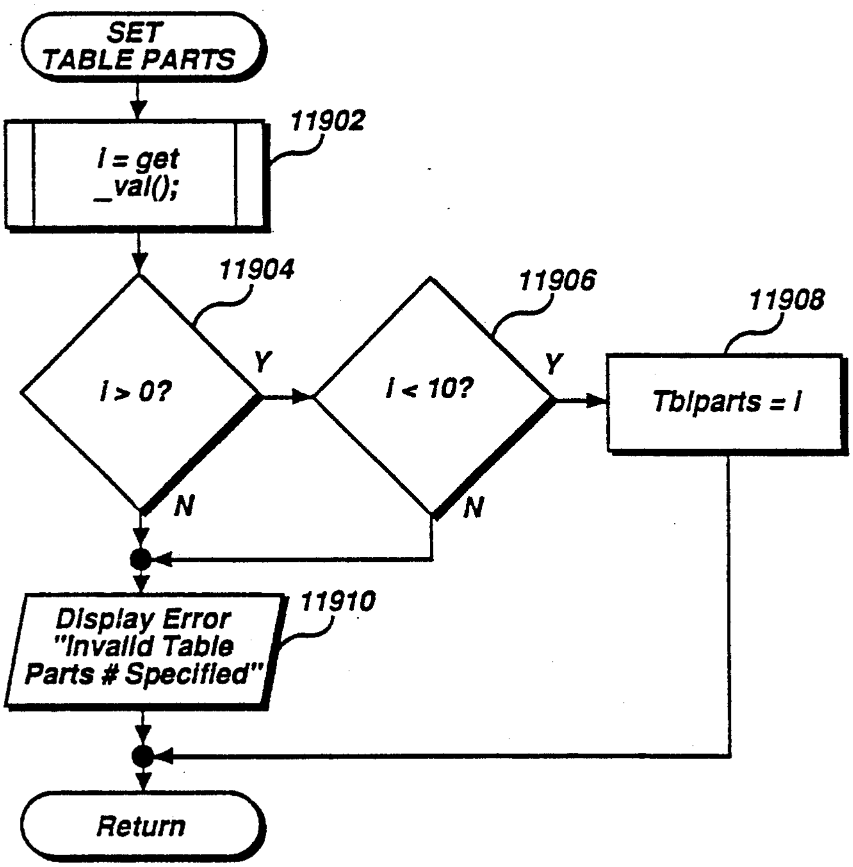

FIG. 119 is a flow diagram of the "SET_TABLE_PARTS" subroutine called by the subroutine of FIG. 112.

Figure 120:
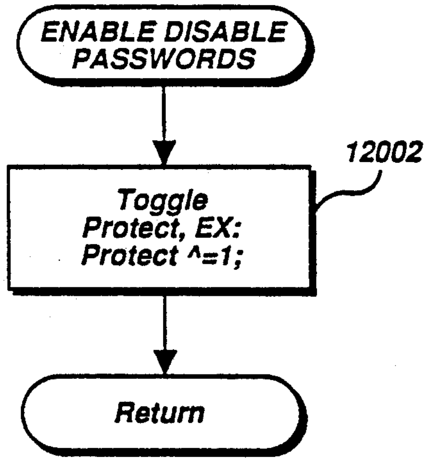

FIG. 120 is a flow diagram of the "ENABLE/DISABLE_PASSWORDS" subroutine called by the subroutine of FIG. 112.

Figure 121:
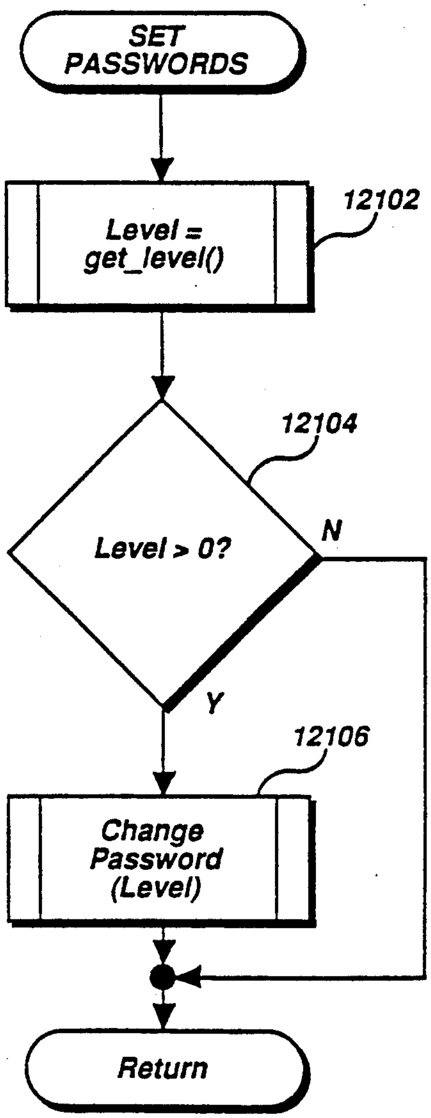

FIG. 121 is a flow diagram of the "SET_PASSWORDS" subroutine called by the subroutine of FIG. 112.

Figure 122:
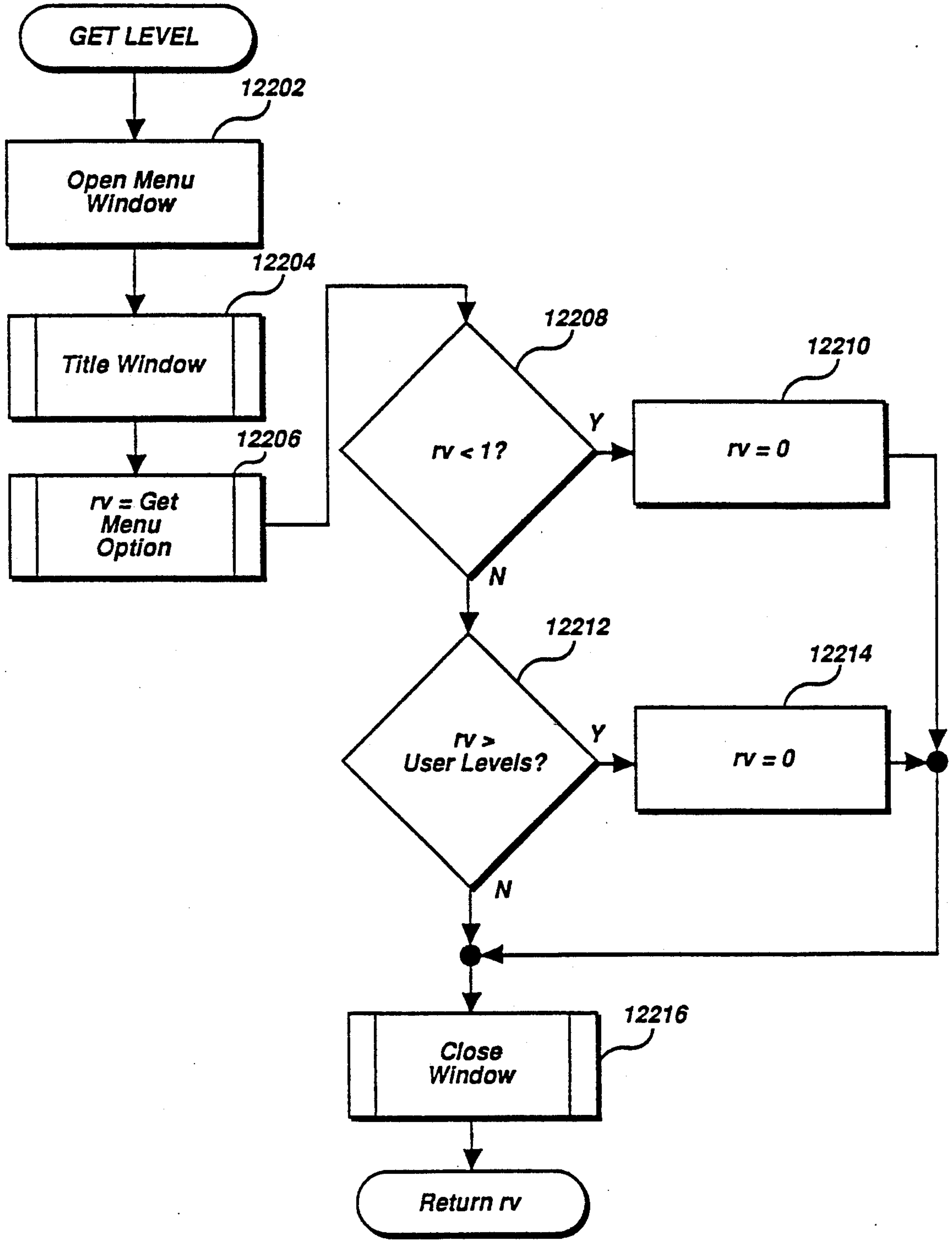

FIG. 122 is a flow diagram of the "GET_LEVEL" subroutine called by the subroutine of FIG. 121.

Figure 123A:
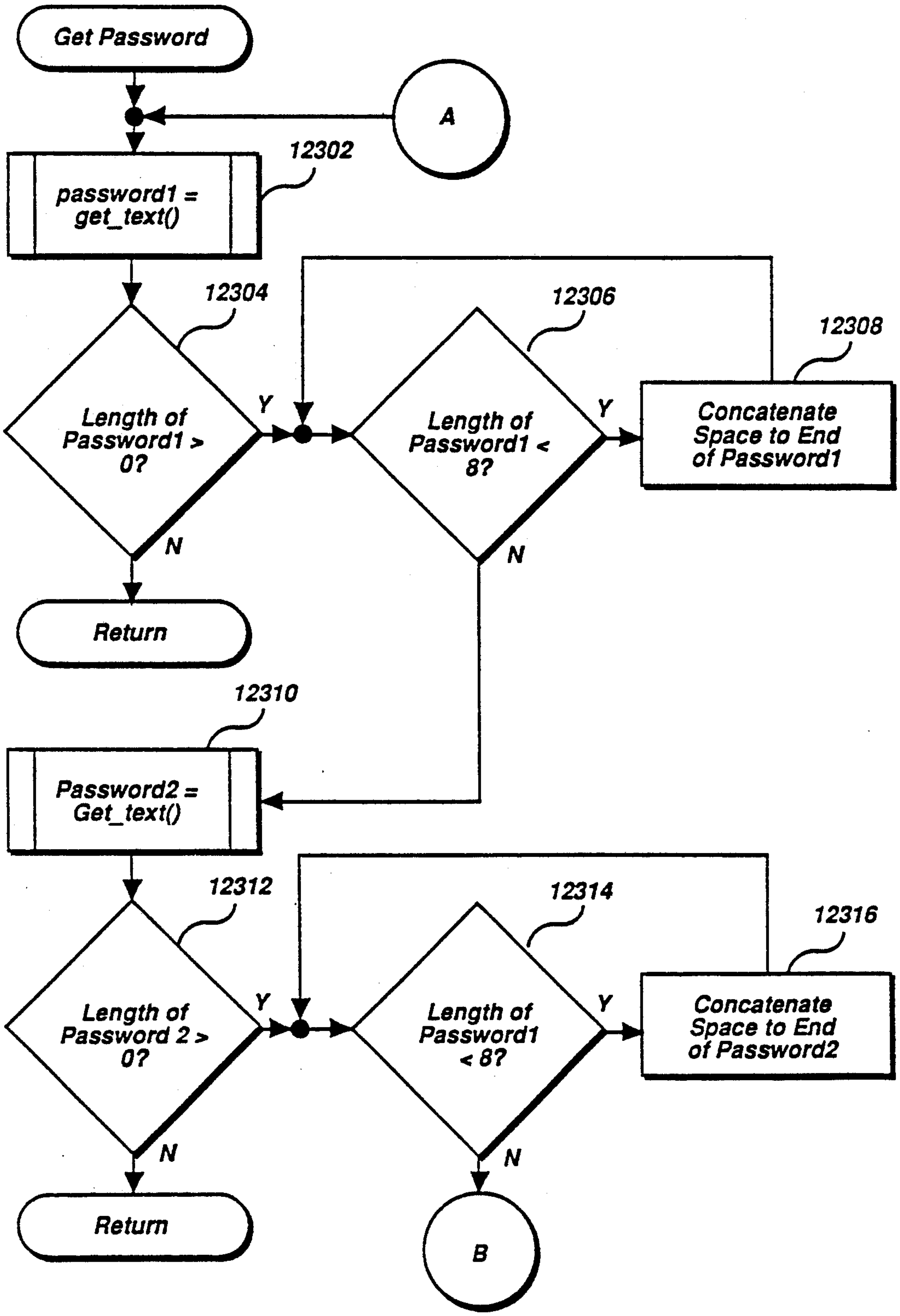

FIG. 123A is a flow diagram of the "GET_PASSWORD" subroutine called by the subroutine of FIG. 121.

Figure 123B:
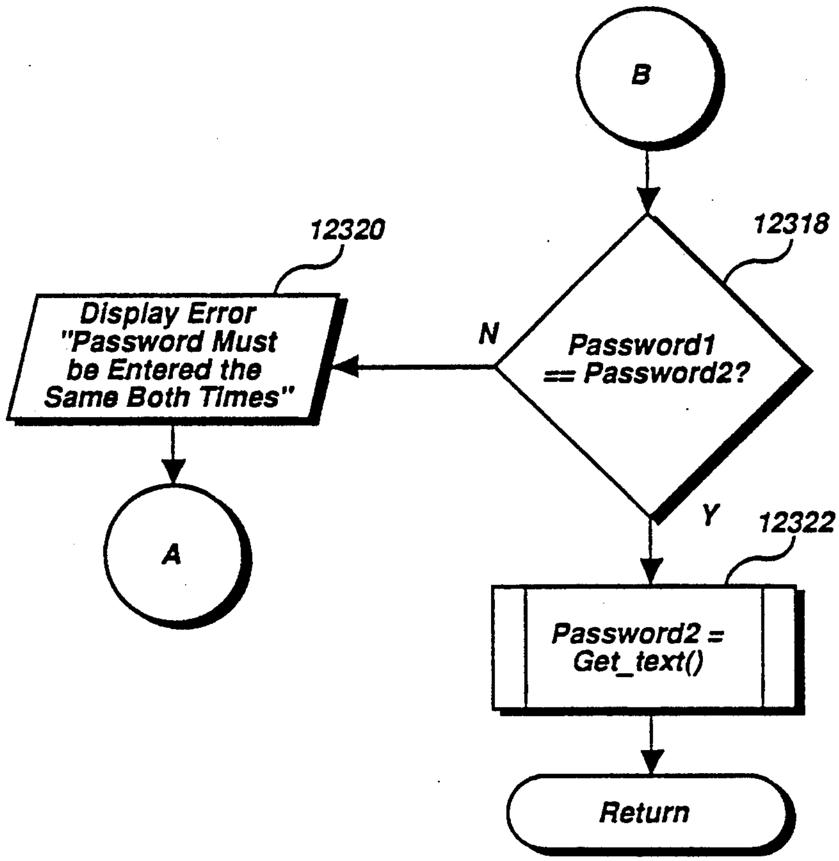
Figures 124A, 124B:
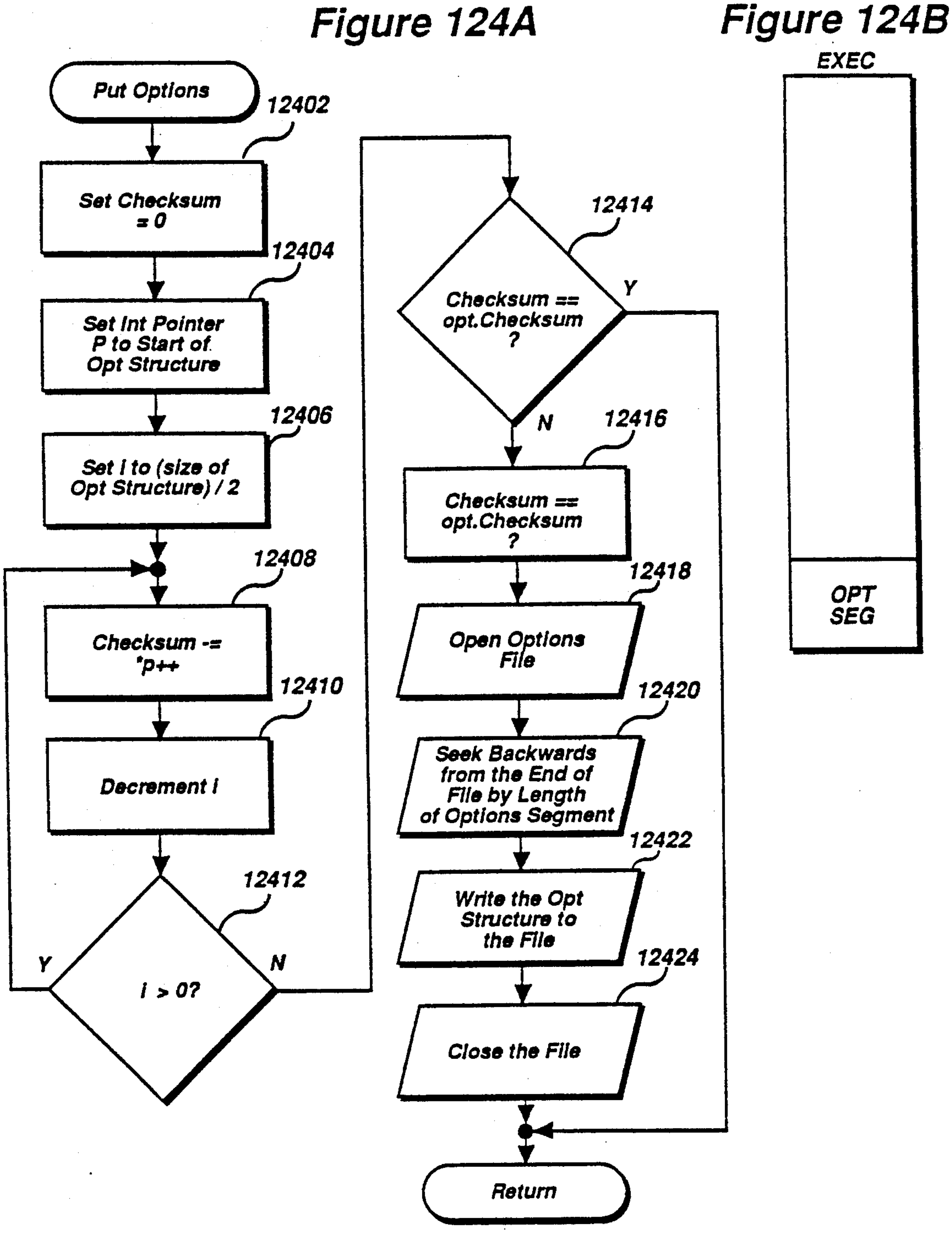

FIG. 123B is a continuation of the flow diagram of FIG. 124B.

Figure 99:
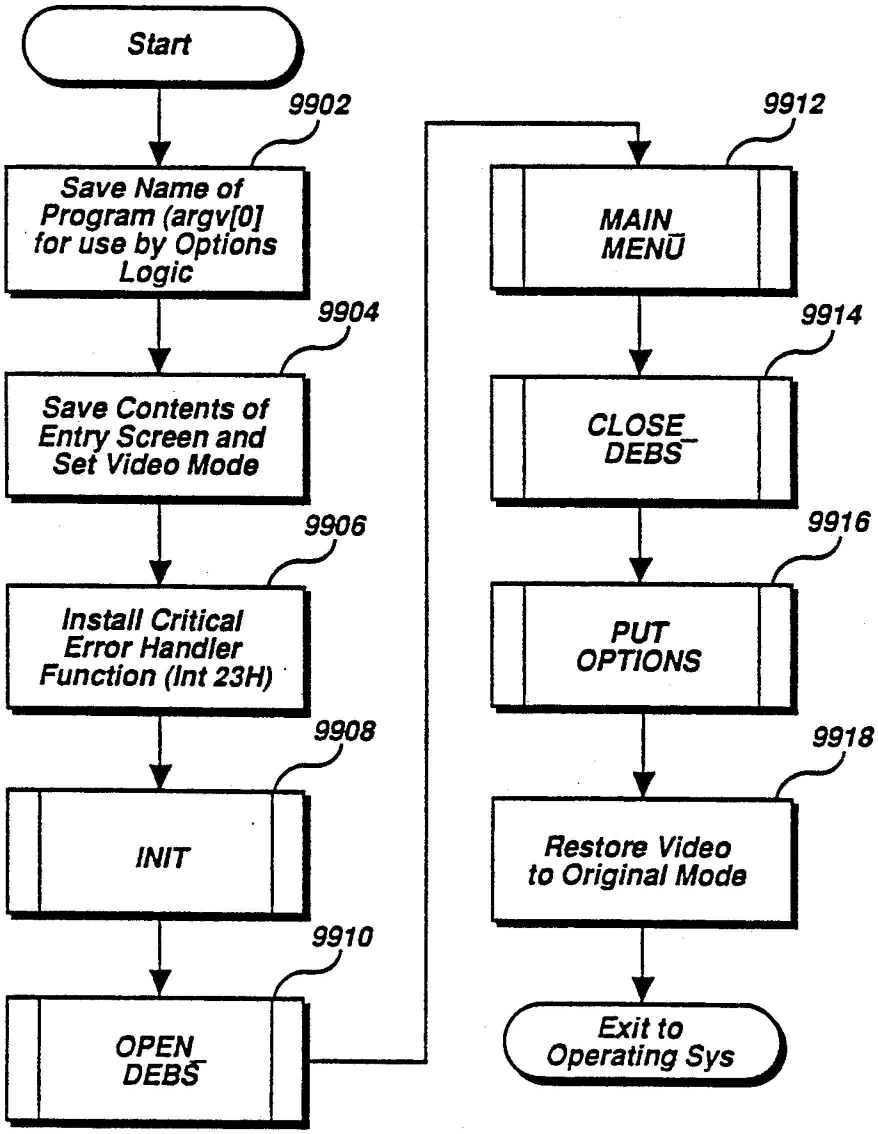
FIG. 99 is a flow diagram of the startup routine of the display control processor.

FIG. 124A is a flow diagram of the "PUT_OPTIONS" subroutine called by the subroutine of FIG. 99.

FIG. 124B is a memory map showing the file structure of the executive portion and options portion of the control software of the monitor and control processor of the present invention.

Figure 101:
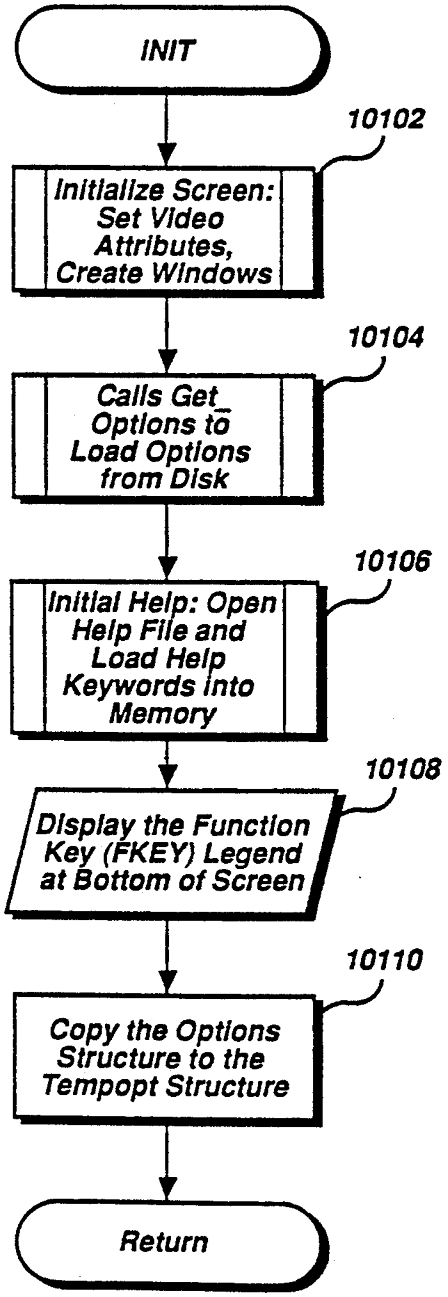
Figure 125A:
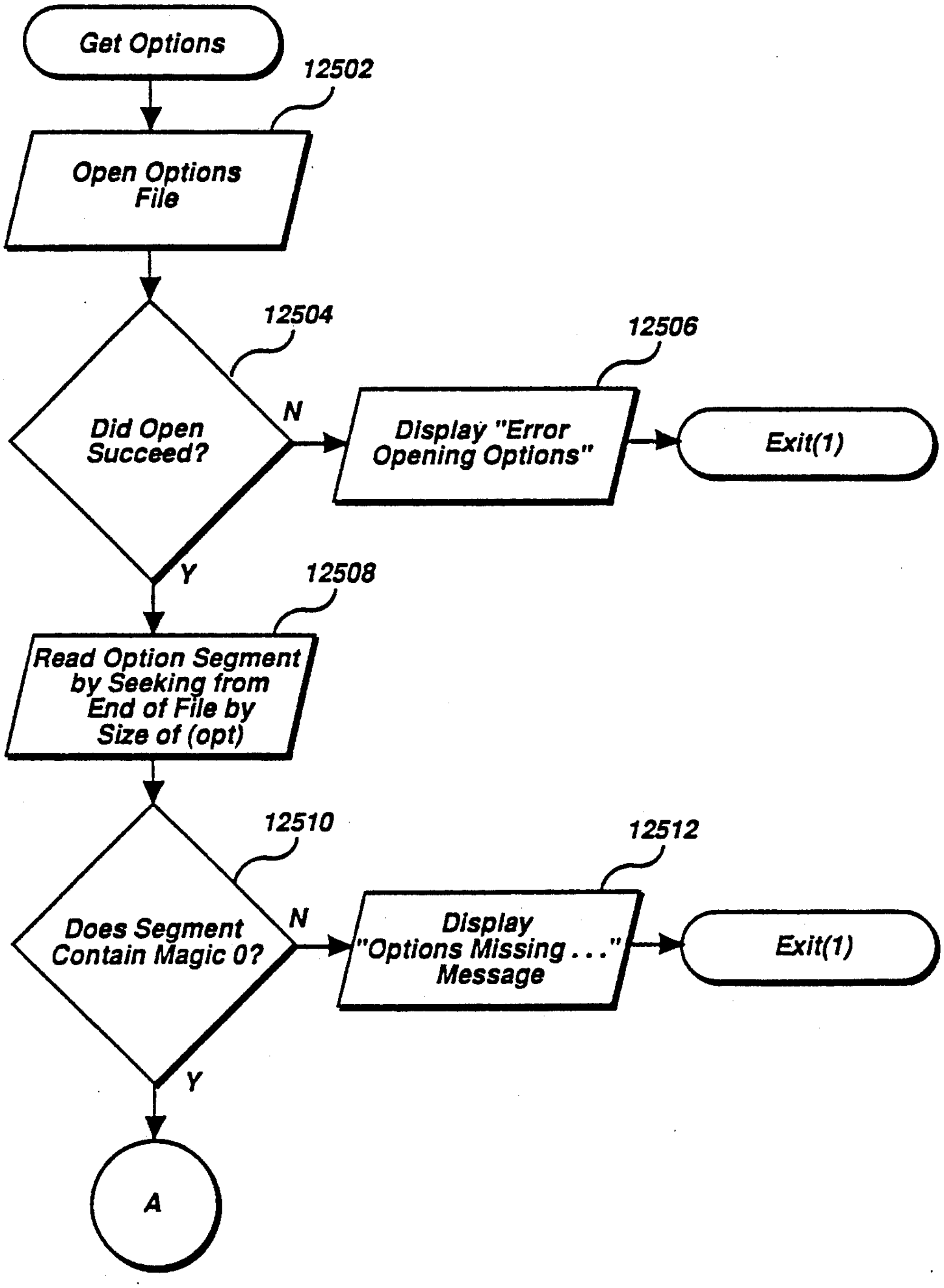

FIG. 125A is a flow diagram of the "GET_OPTIONS" subroutine called by the subroutine of FIG. 101.

Figure 125B:
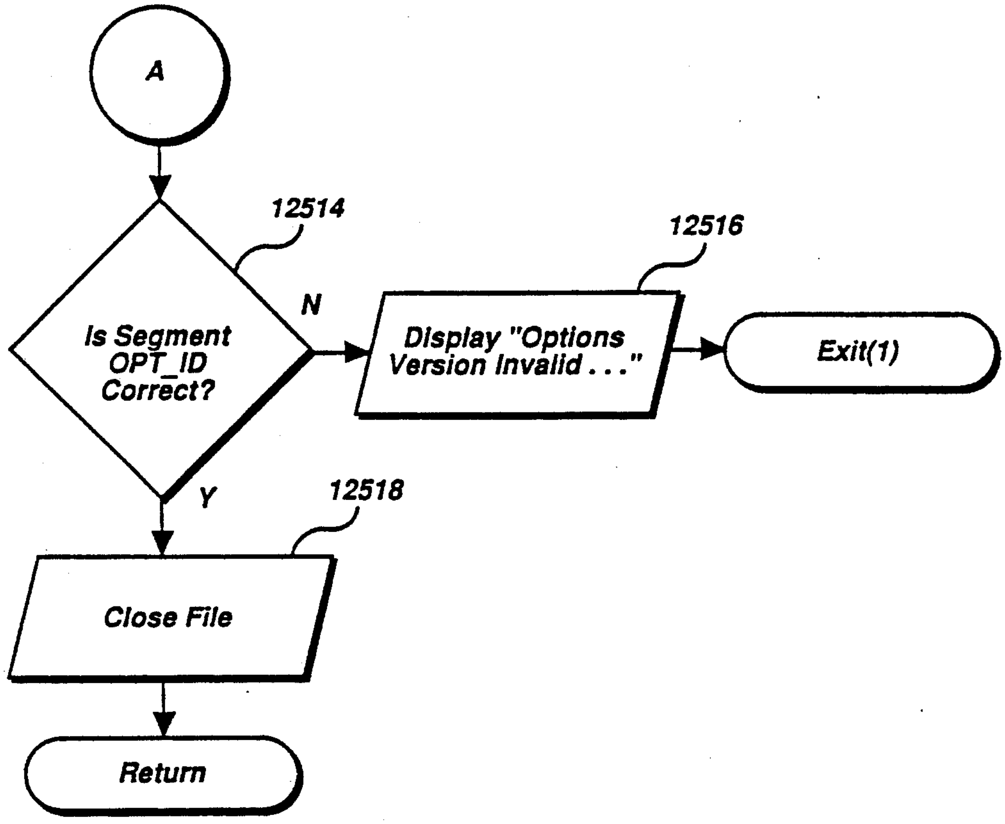

FIG. 125B is a continuation of the flow diagram of FIG. 125A.

Figure 126:
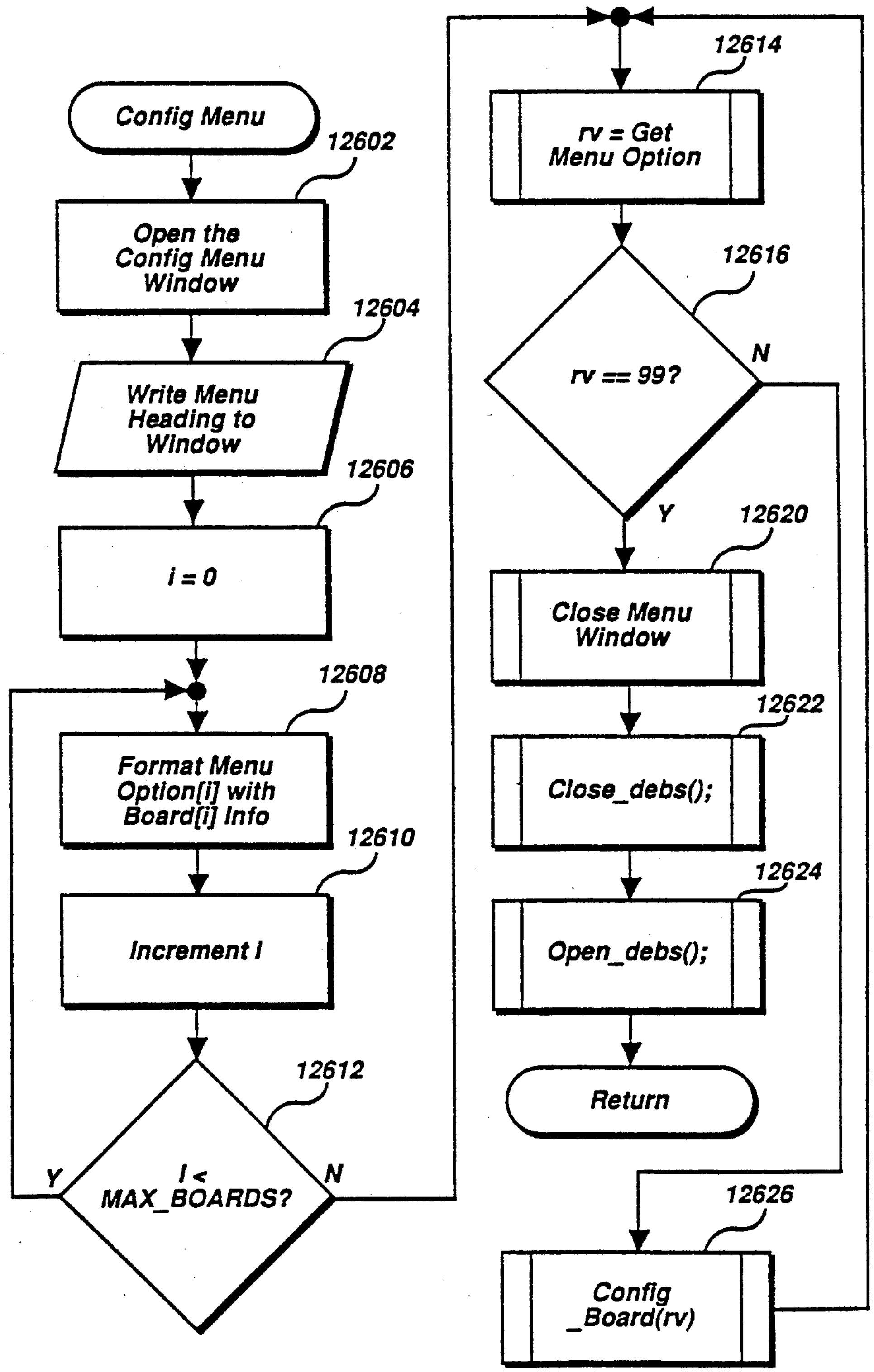

FIG. 126 is a flow diagram of the "CONFIG_MENU" subroutine called by the subroutine of FIG. 112.

Figure 127:
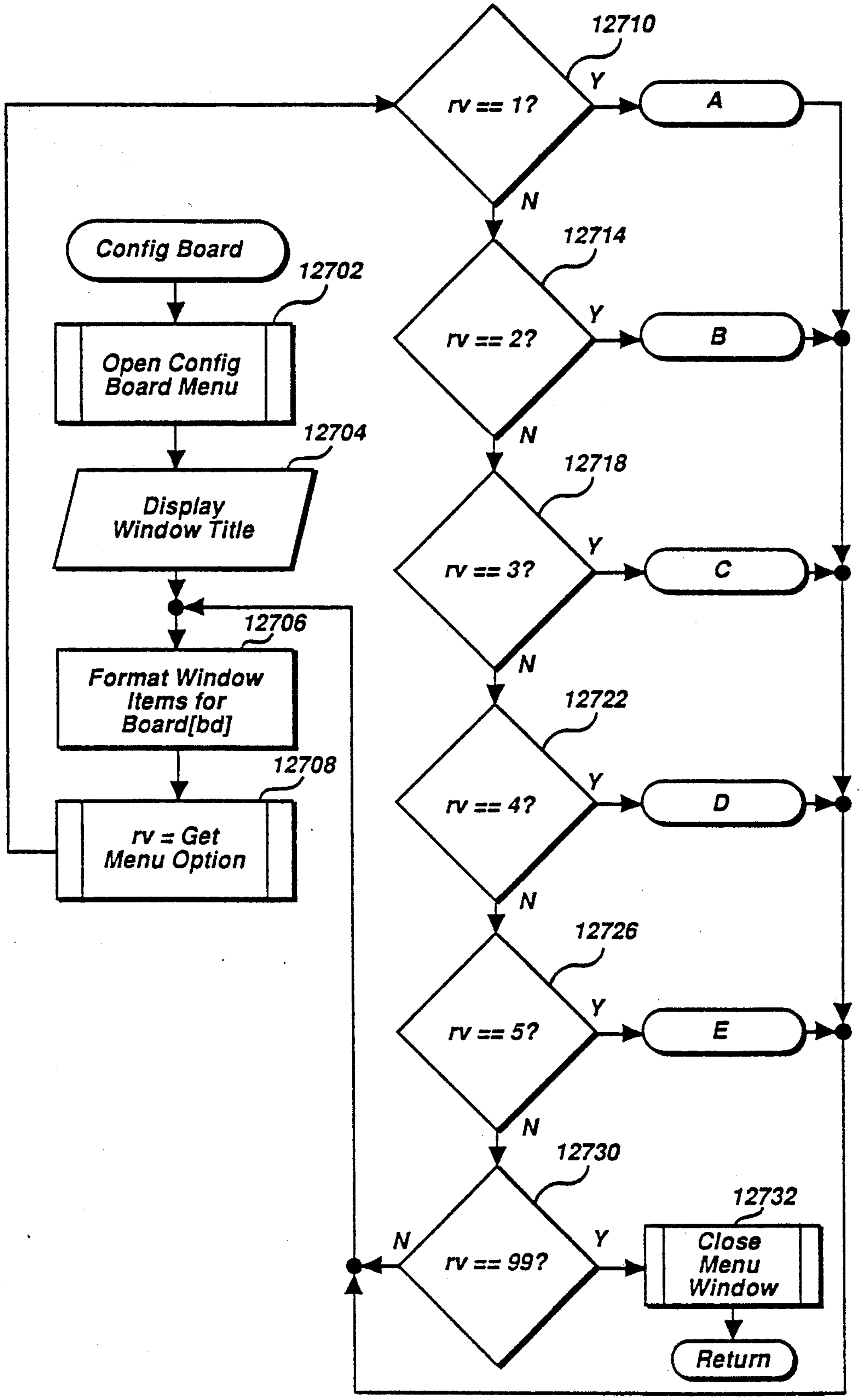

FIG. 127 is a flow diagram of the "CONFIG_BOARD" subroutine called by the subroutine of FIG. 126.

Figure 128:
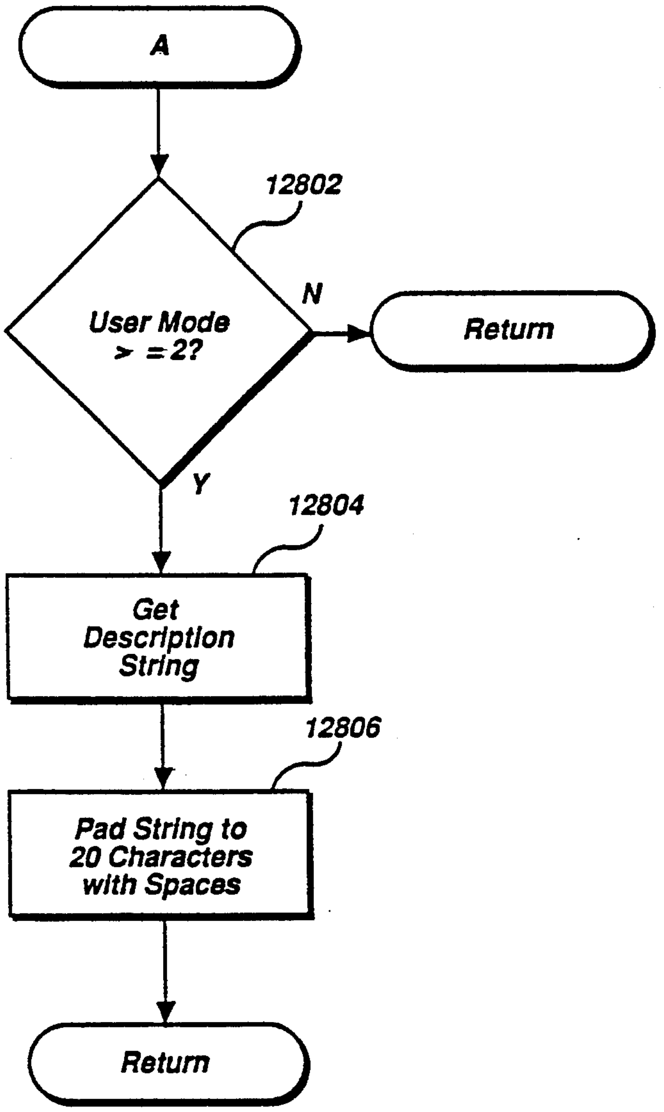

FIG. 128 is a flow diagram of subroutine "A" called by the subroutine of FIG. 127.

Figure 129:
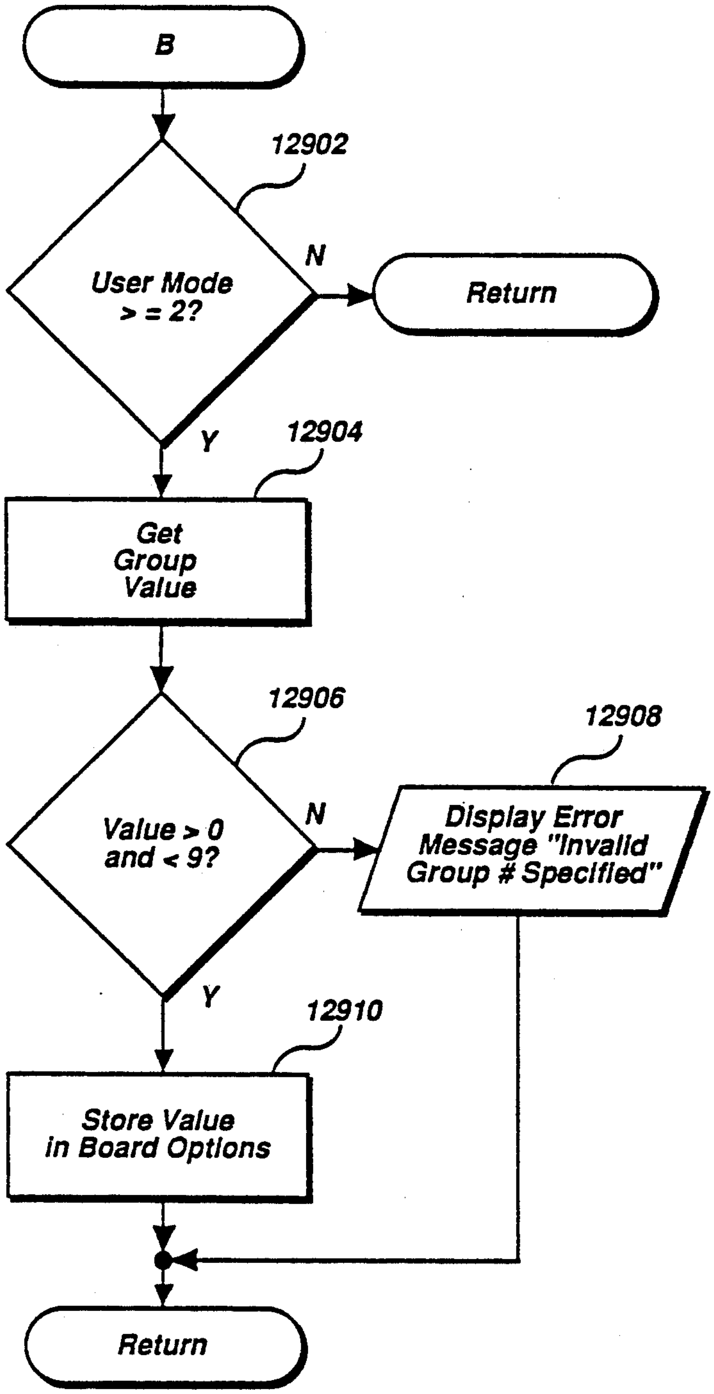

FIG. 129 is a flow diagram of subroutine "B" called by the subroutine of FIG. 127.

Figure 130:
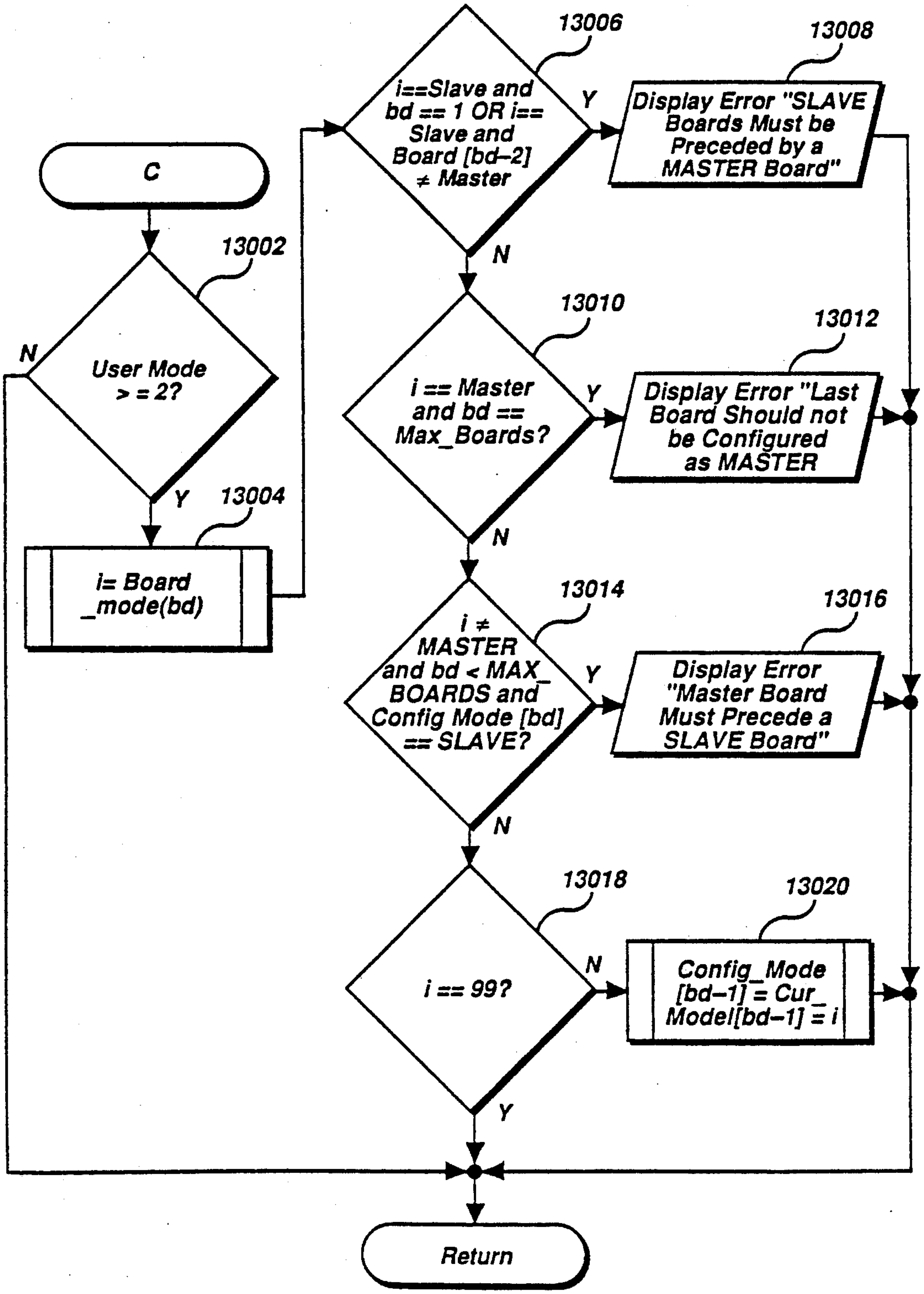

FIG. 130 is a flow diagram of subroutine "C" called by the subroutine of FIG. 127.

Figure 131:
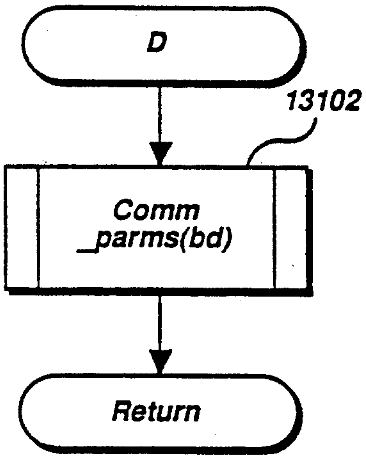

FIG. 131 is a flow diagram of subroutine "D" called by the subroutine of FIG. 127.

Figure 132:
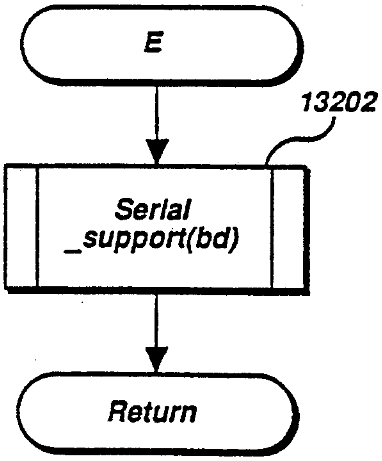

FIG. 132 is a flow diagram of subroutine "E" called by the subroutine of FIG. 127.

Figure 133A:
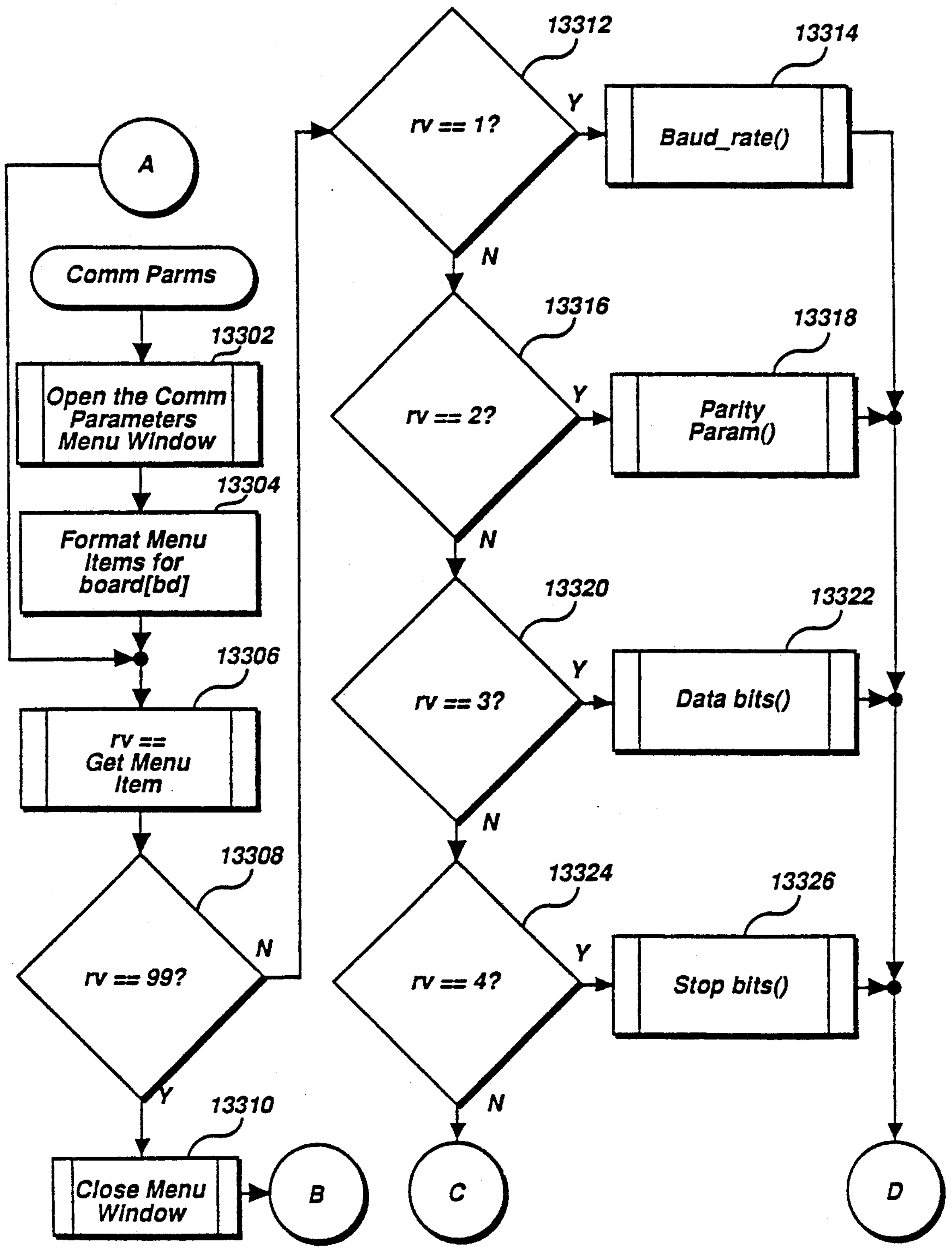

FIG. 133A is a flow diagram of the "COMM_PARMS" subroutine called by the subroutine of FIG. 131.

Figure 133B:
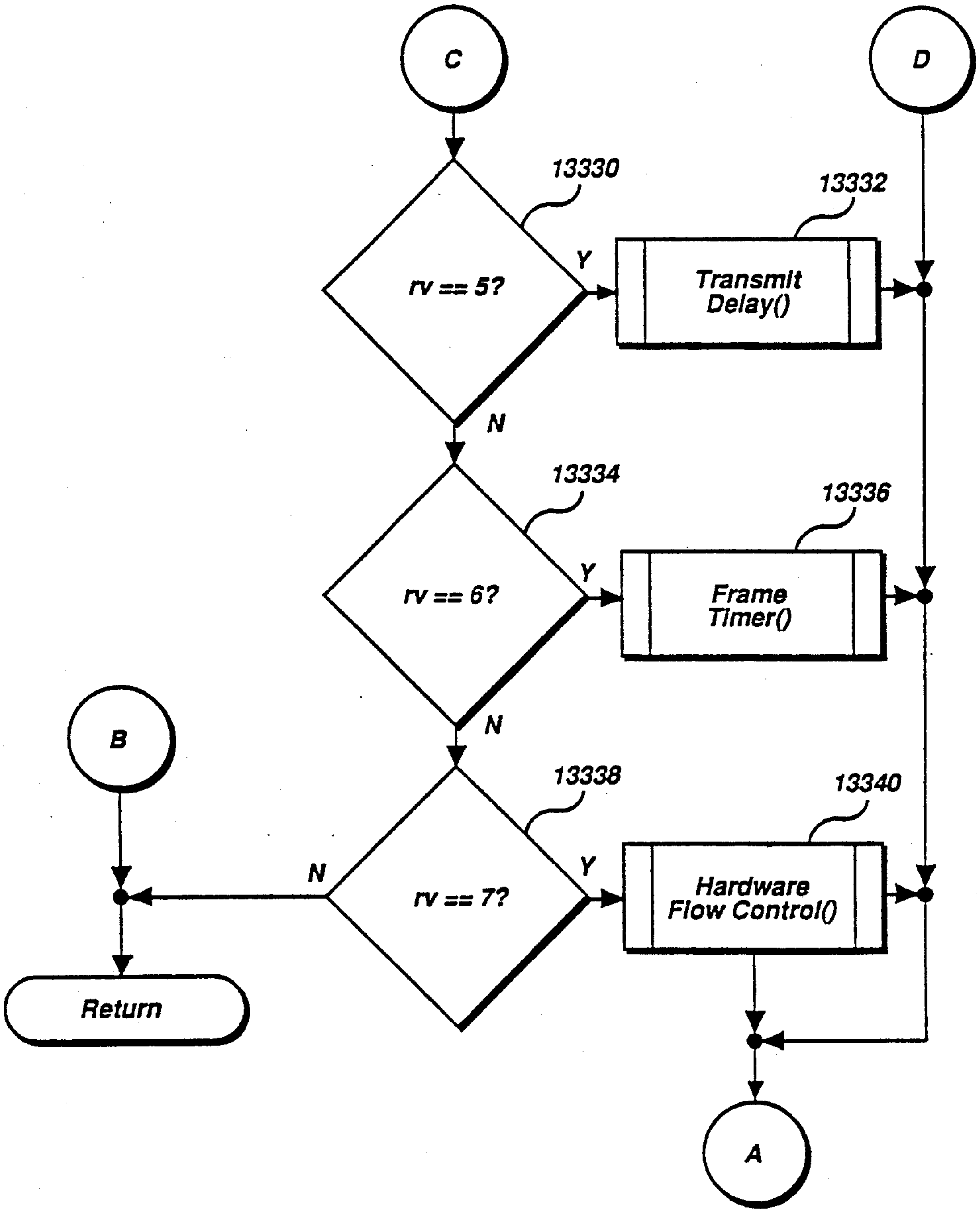

FIG. 133B is a continuation of the flow diagram of FIG. 133A.

Figure 134:
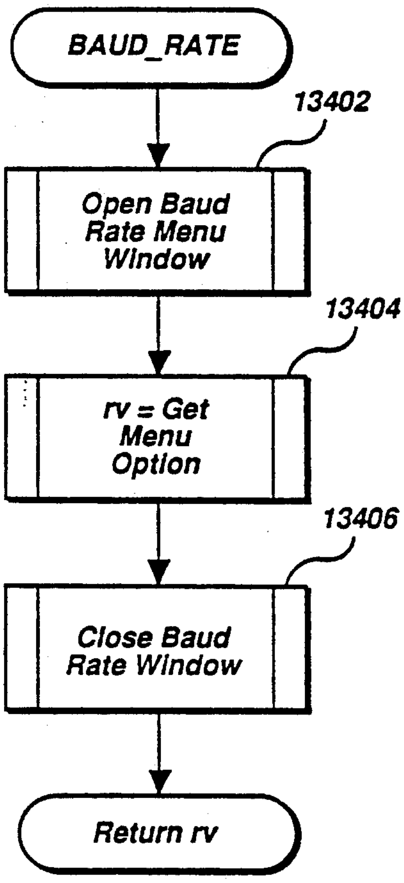

FIG. 134 is a flow diagram of the "BAUD_RATE" subroutine called by the subroutine of FIG. 133.

Figure 135A:
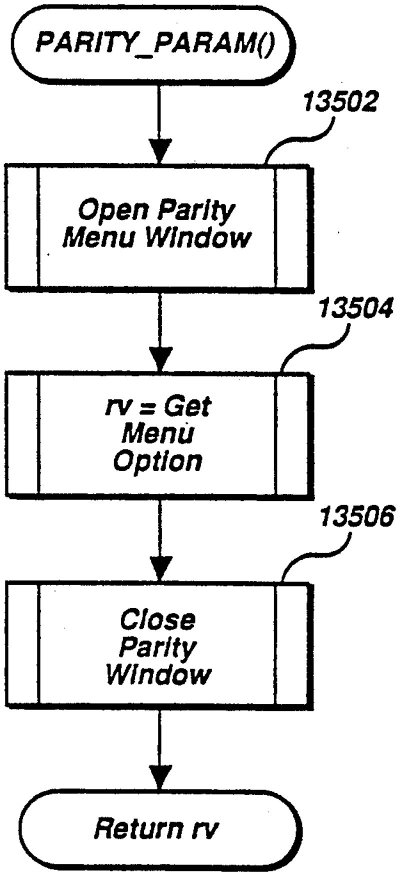

FIG. 135A is a flow diagram of the "PARITY_PARAM" subroutine called by the subroutine of FIG. 133.

Figure 135B:
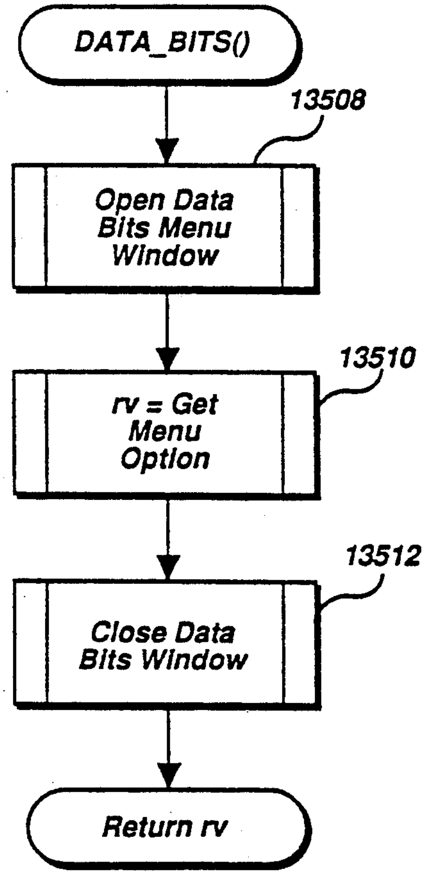
Figure 136:
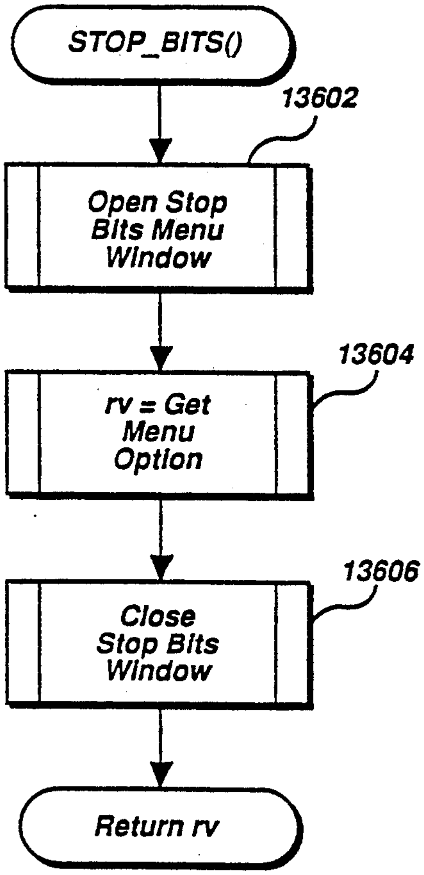

FIG. 135B is a flow diagram of the "DATA_BITS" subroutine called by the subroutine of FIG. 133. FIG. 136 is a flow diagram of the "STOP_BITS" subroutine called by the subroutine of FIG. 133.

Figure 137:
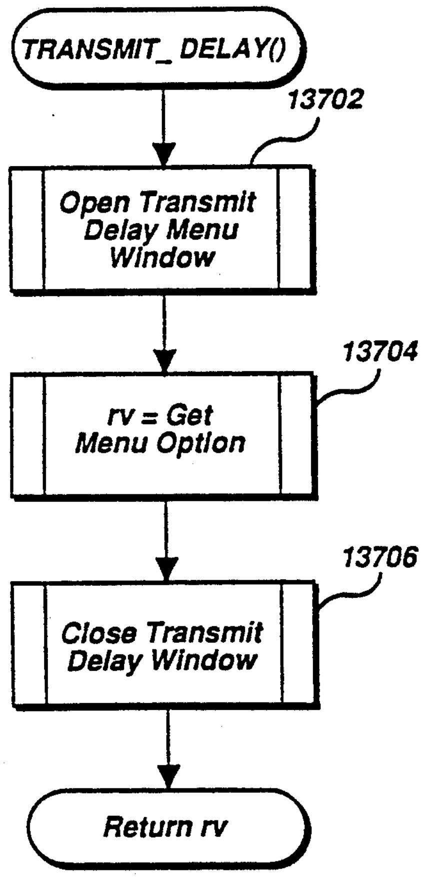

FIG. 137 is a flow diagram of the "TRANSMIT_DELAY" subroutine called by the subroutine of FIG. 133.

Figure 138:
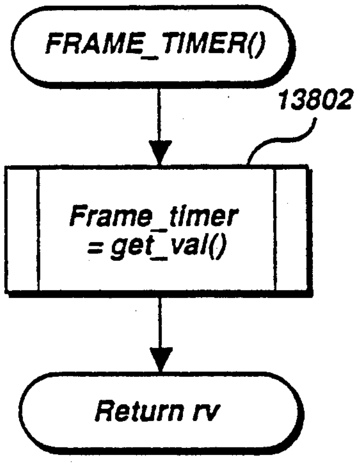

FIG. 138 is a flow diagram of the "FRAME_TIMER" subroutine called by the subroutine of FIG. 133.

Figure 139:
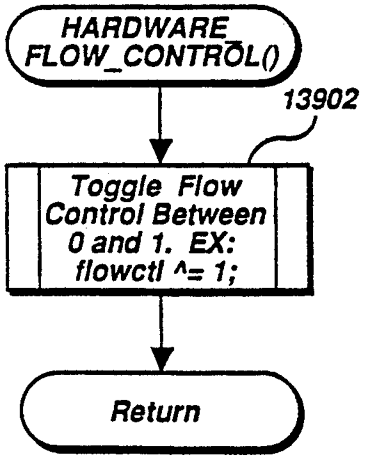

FIG. 139 is a flow diagram of the "HARDWARE_FLOW_CONTROL" subroutine called by the subroutine of FIG. 133.

Figure 140A:
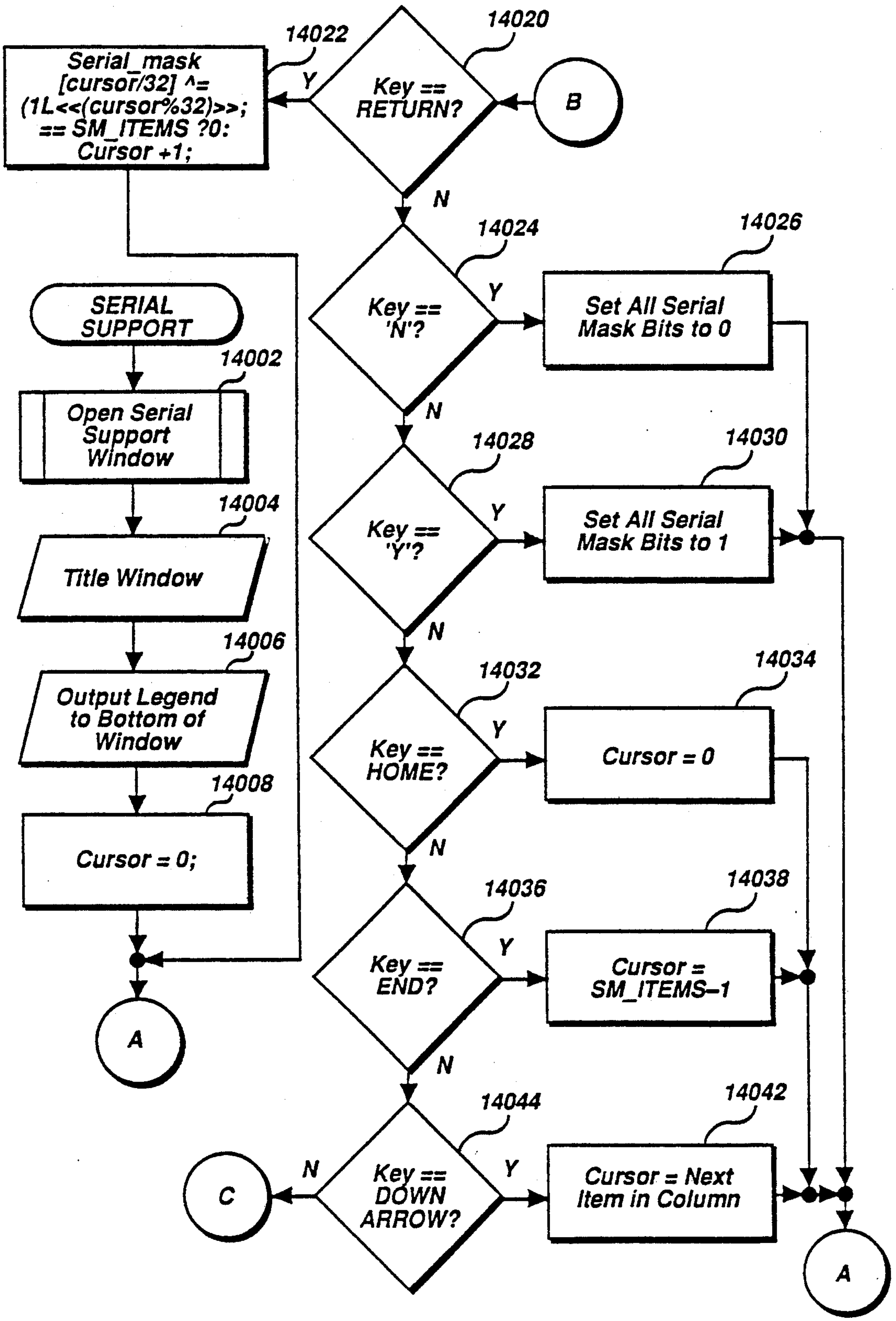

FIG. 140A is a flow diagram of the "SERIAL_SUPPORT" subroutine called by the subroutine of FIG. 132.

Figure 140B:
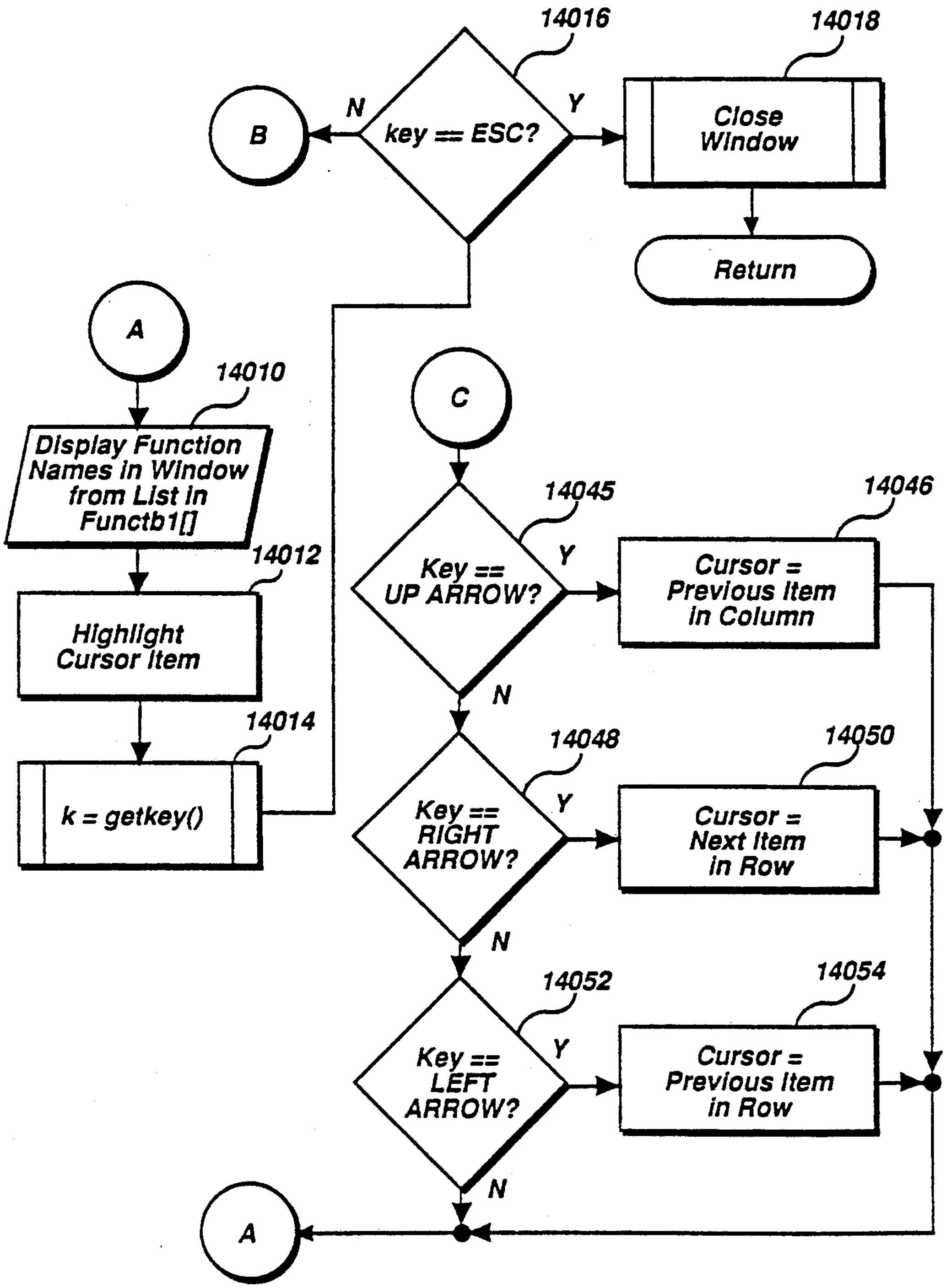

FIG. 140B is a continuation of the flow diagram of FIG. 140A.

Figure 141:
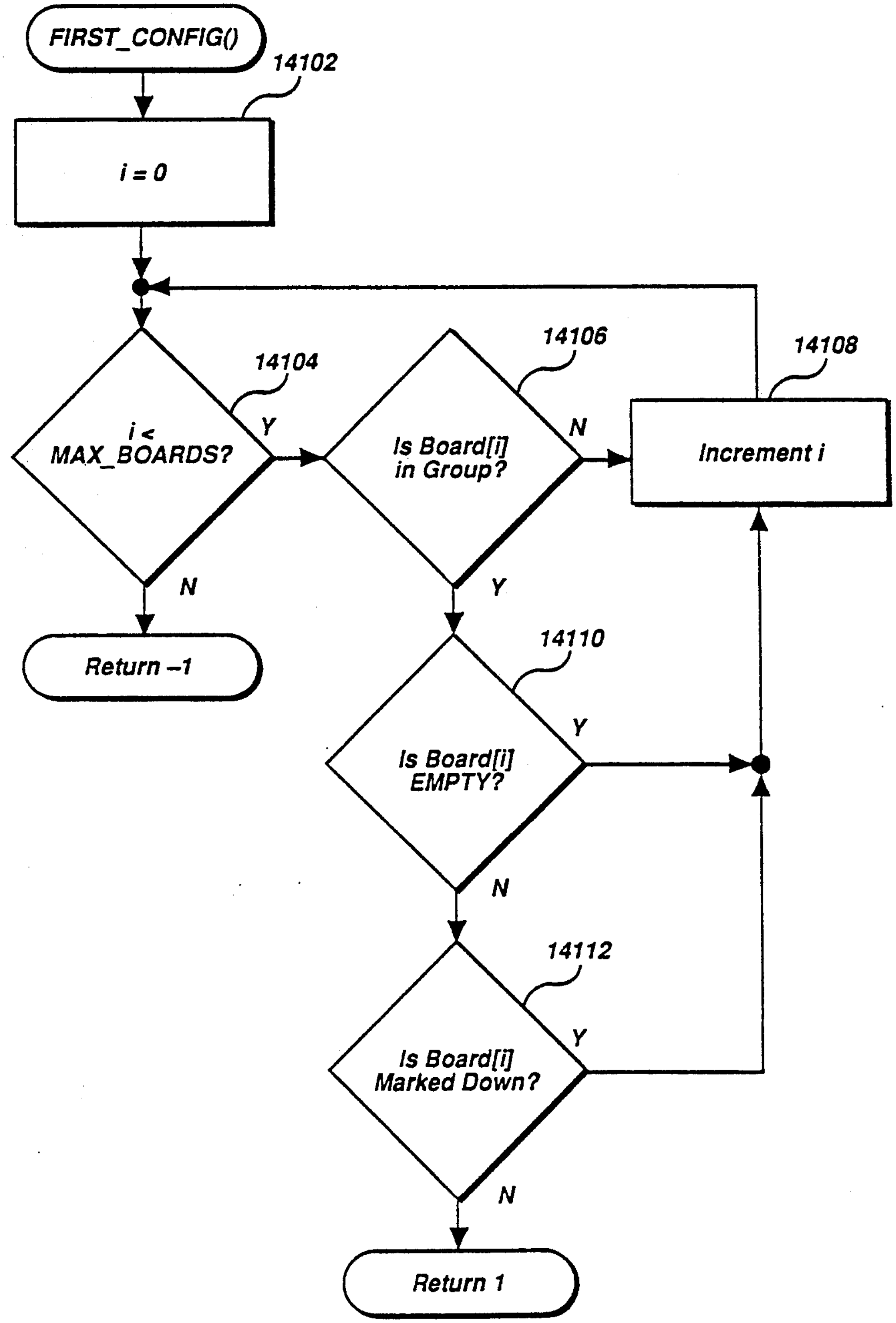

FIG. 141 is a flow diagram of the "FIRST_CONFIG" subroutine called by various subroutines of the present invention.

Figure 142:
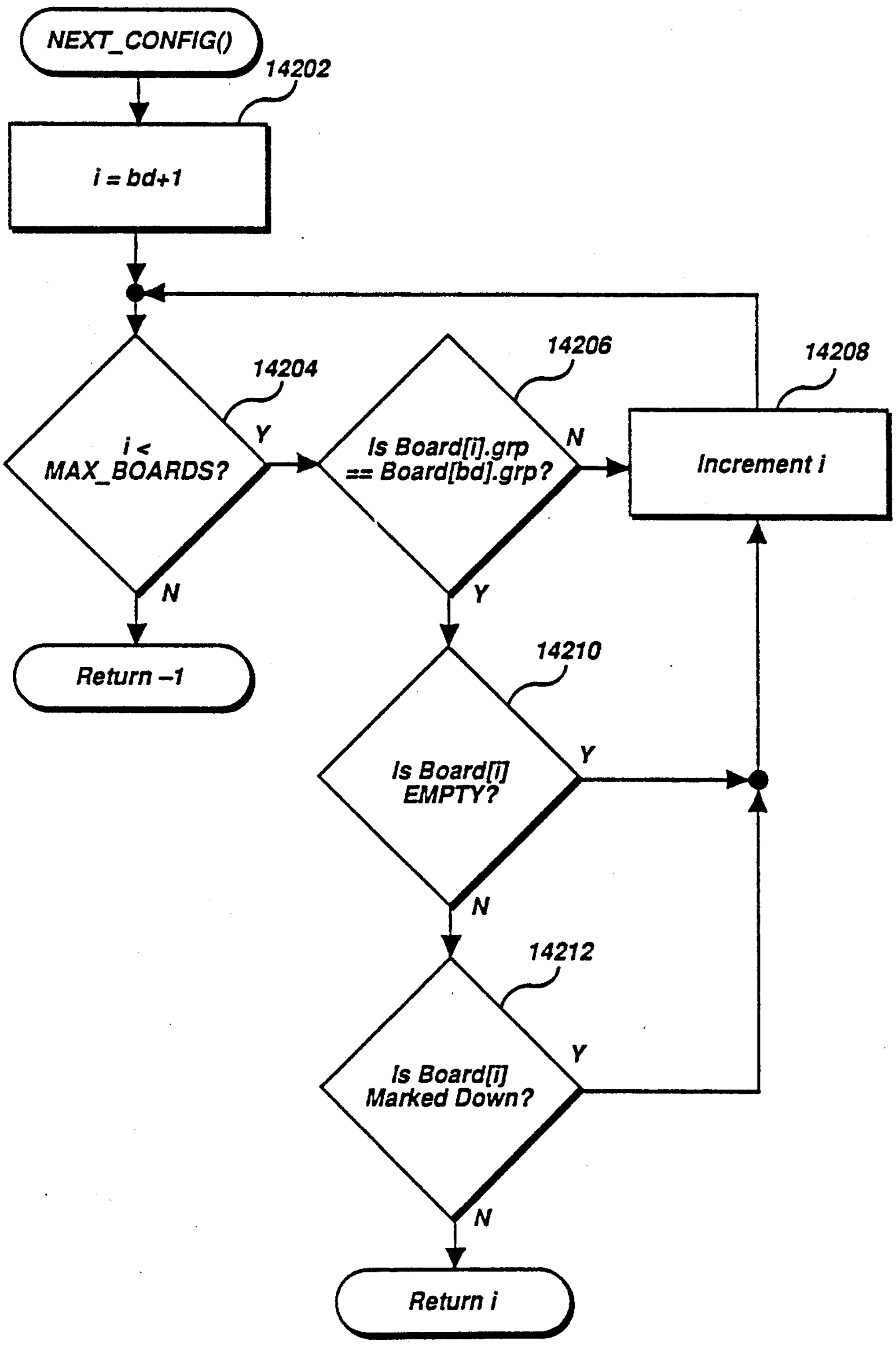

FIG. 142 is a flow diagram of the "NEXT_CONFIG" subroutine called by various subroutines of the present invention.

Figure 143A:
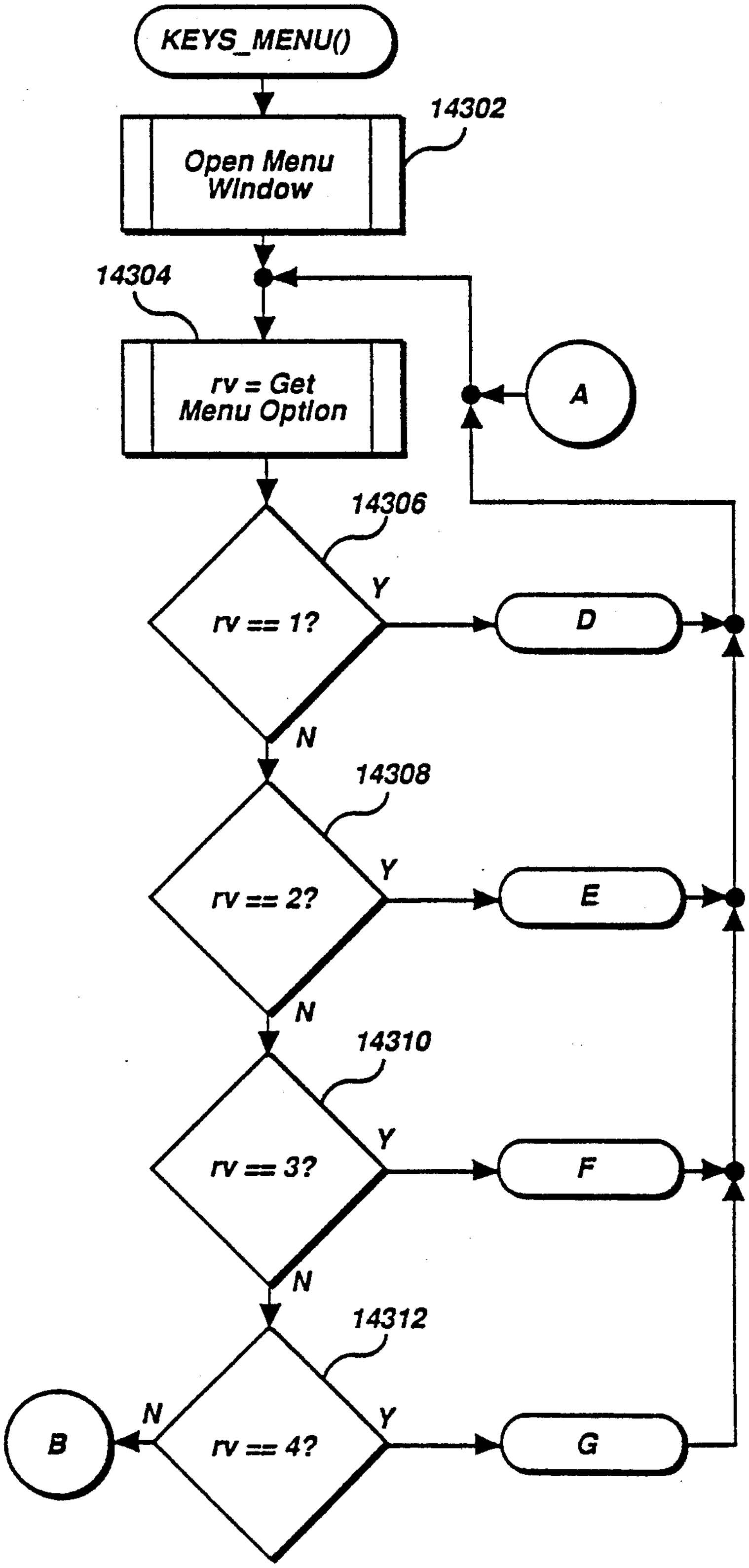

FIG. 143A is a flow diagram of the "KEYS_MENU" subroutine called by the subroutine of FIG. 100.

Figure 143B:
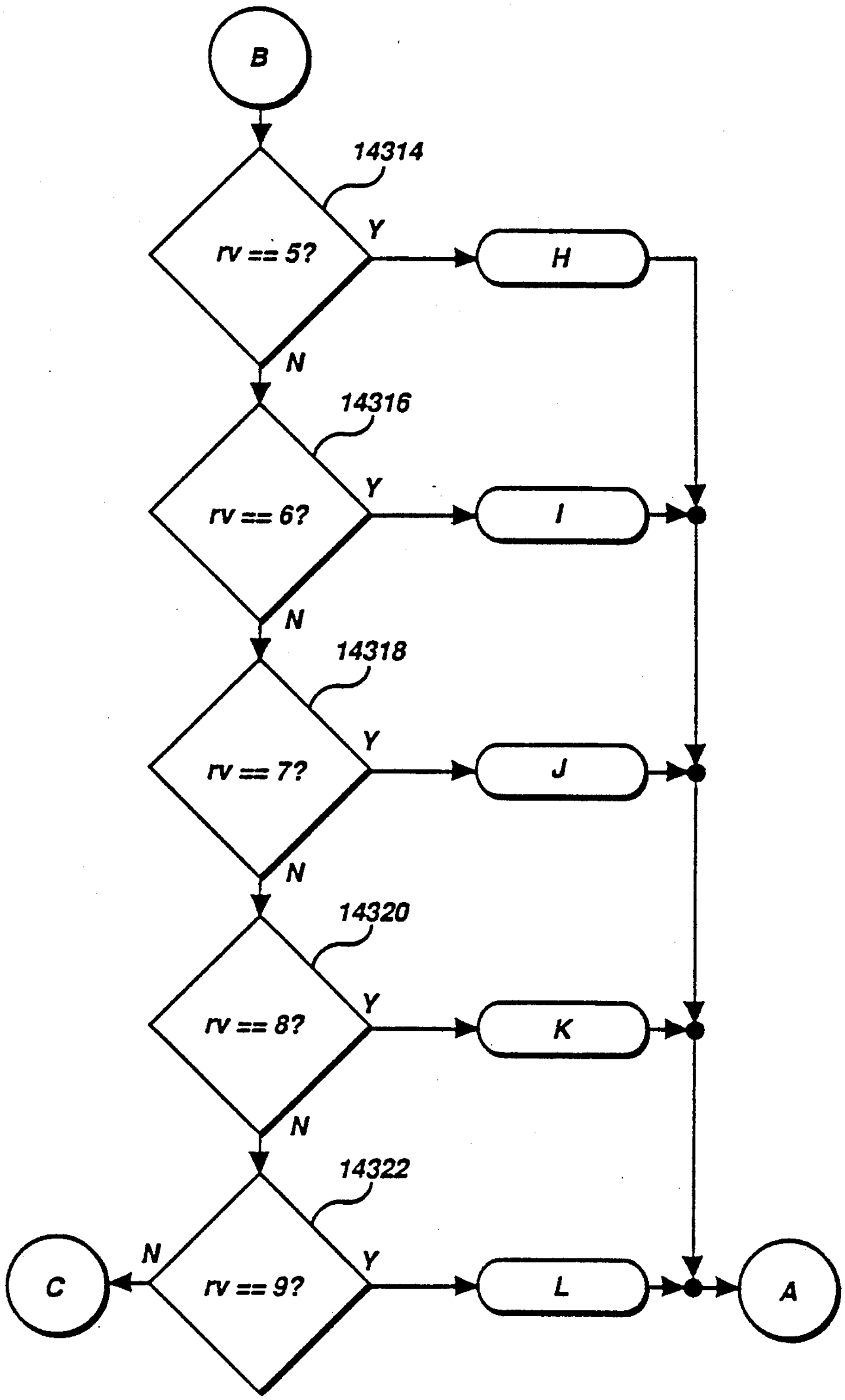

FIG. 143B is a continuation of the flow diagram of FIG. 143A.

Figure 143C:
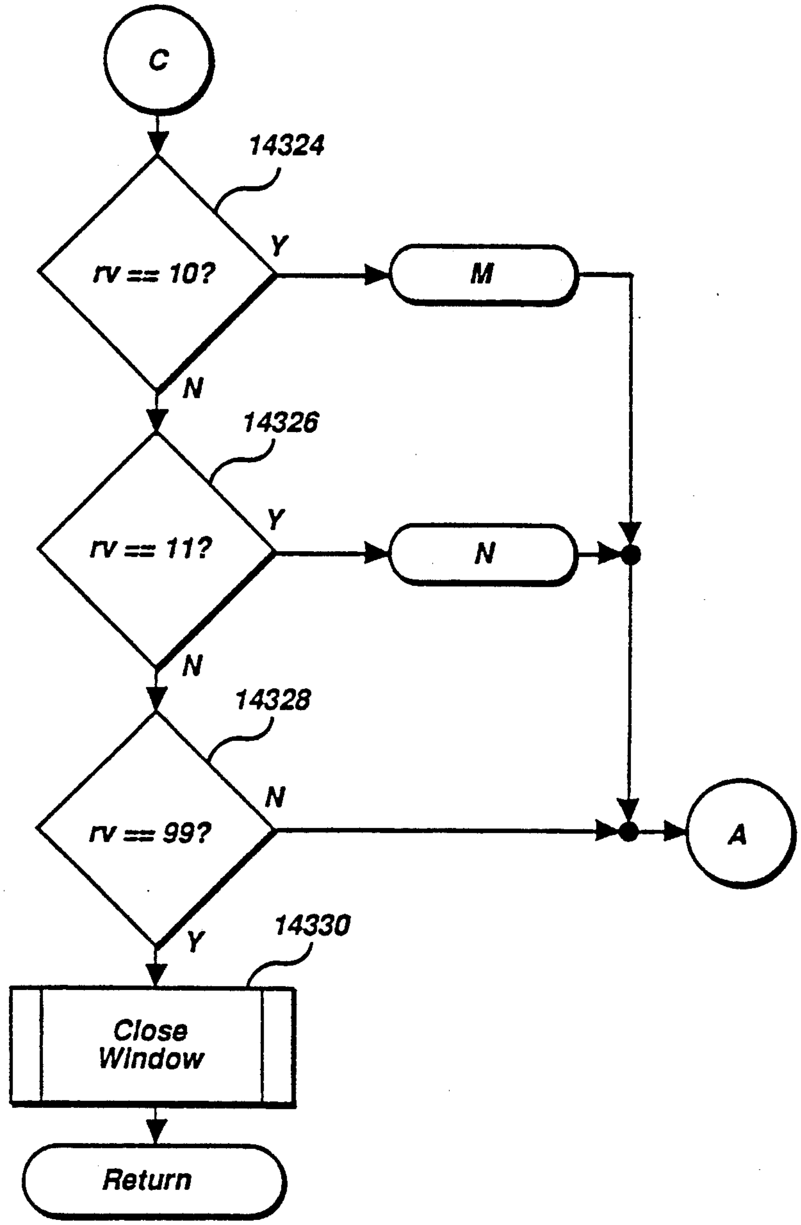

FIG. 143C is a continuation of the flow diagram of 143B.

Figure 144:
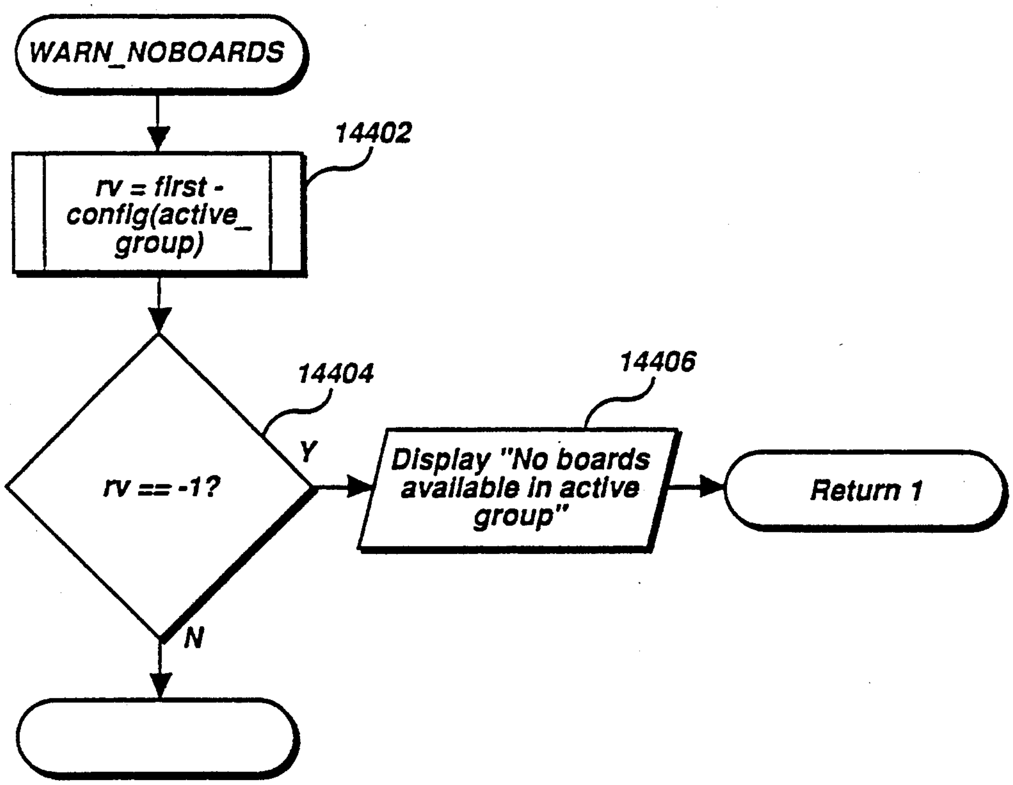

FIG. 144 is a flow diagram of the "WARN_NOBOARDS" subroutine called by various subroutines of the present invention.

Figure 145A:
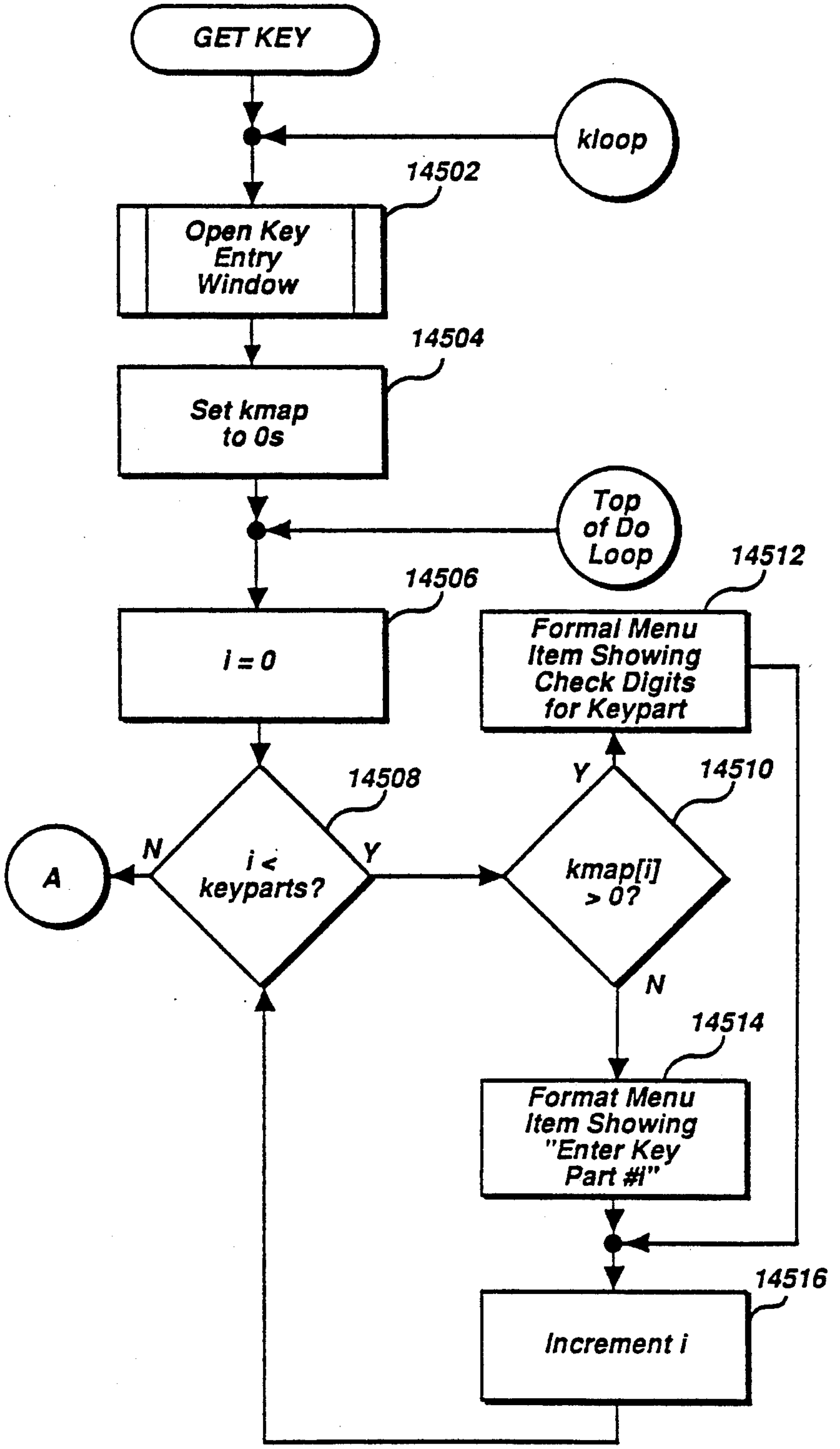
Figure 206:
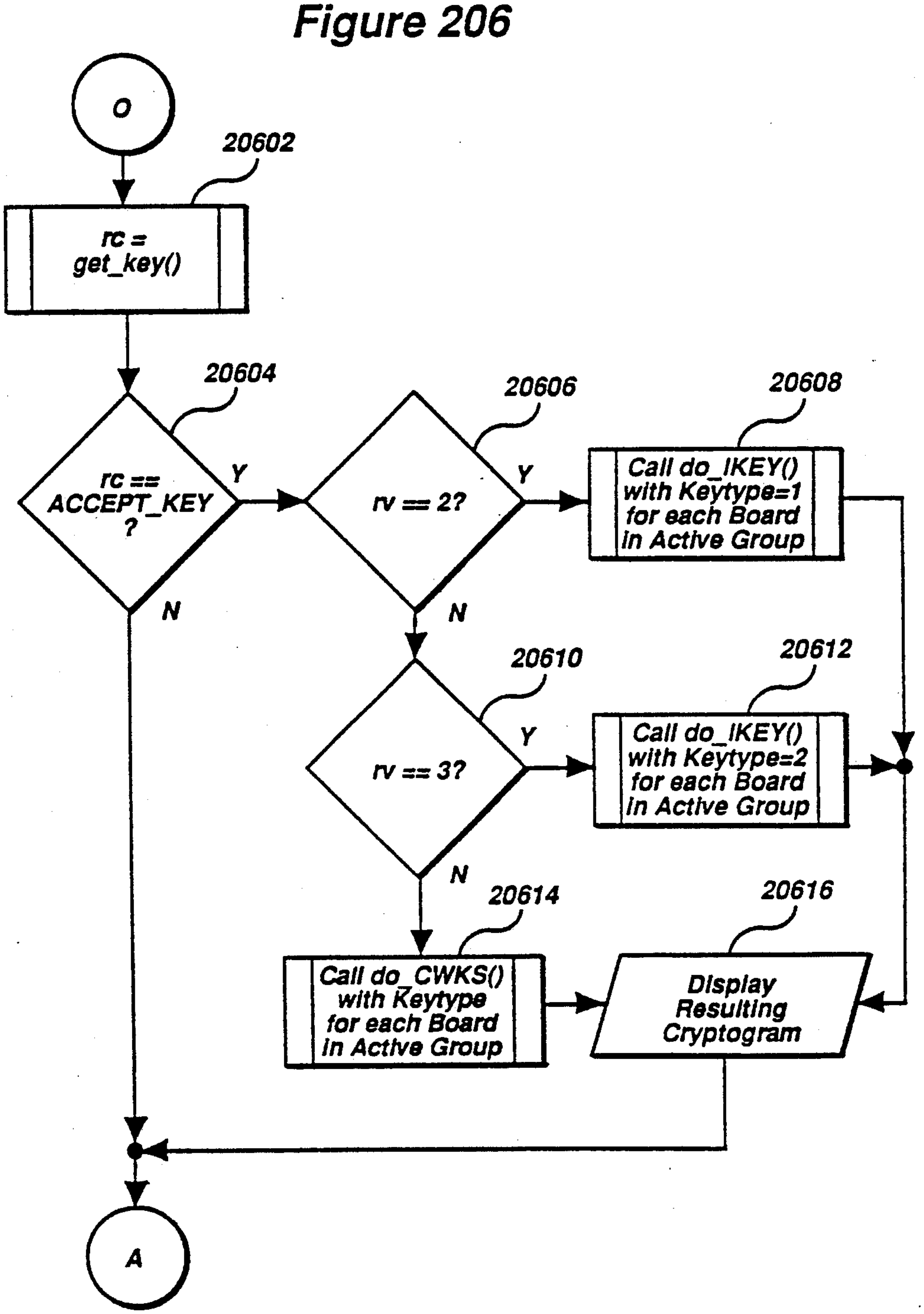

FIG. 145A is a flow diagram of the "GET_KEY" subroutine called by the subroutine of FIG. 206.

Figure 145B:
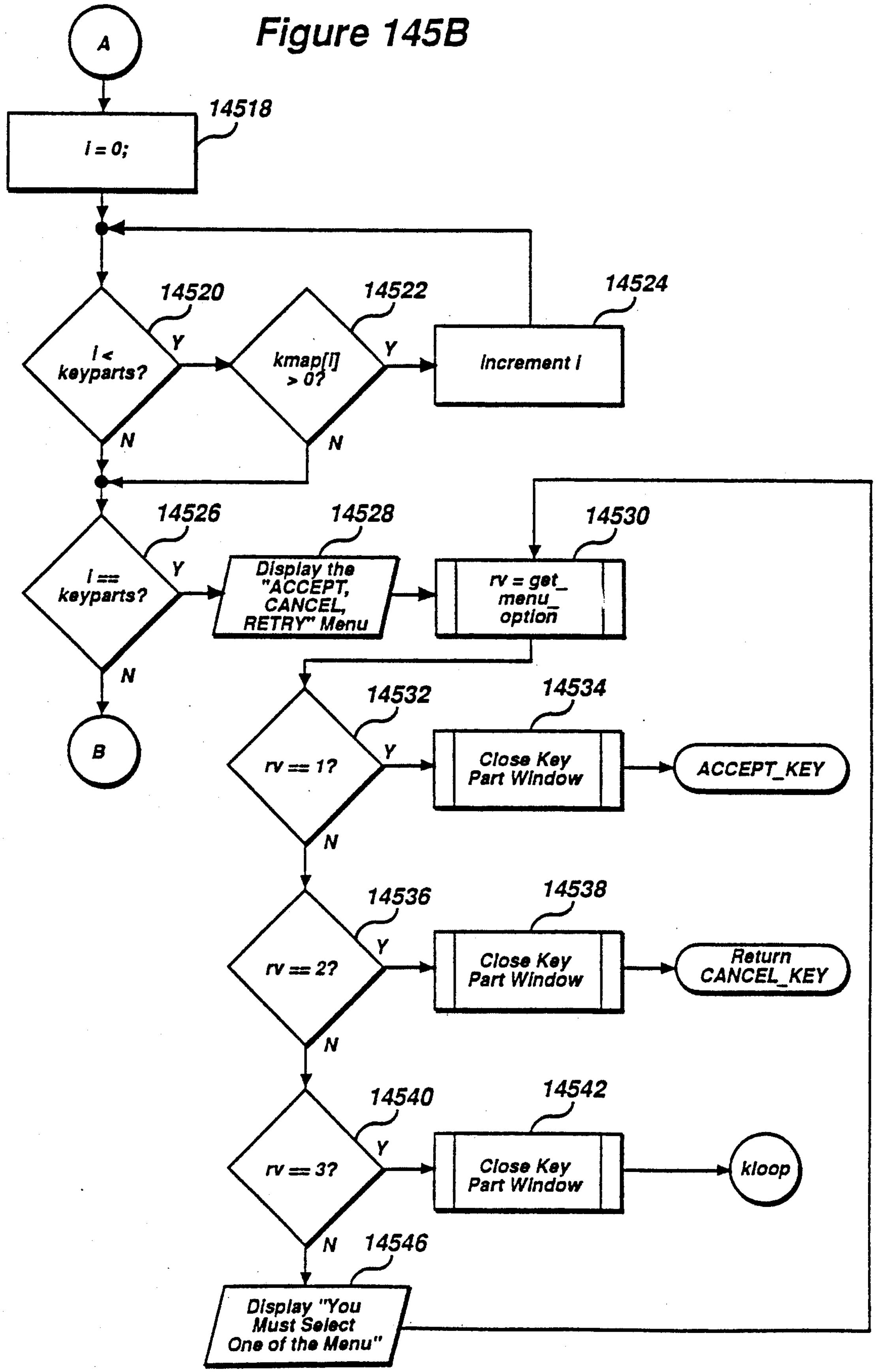

FIG. 145B is a continuation of the flow diagram of FIG. 145A.

Figure 145C:
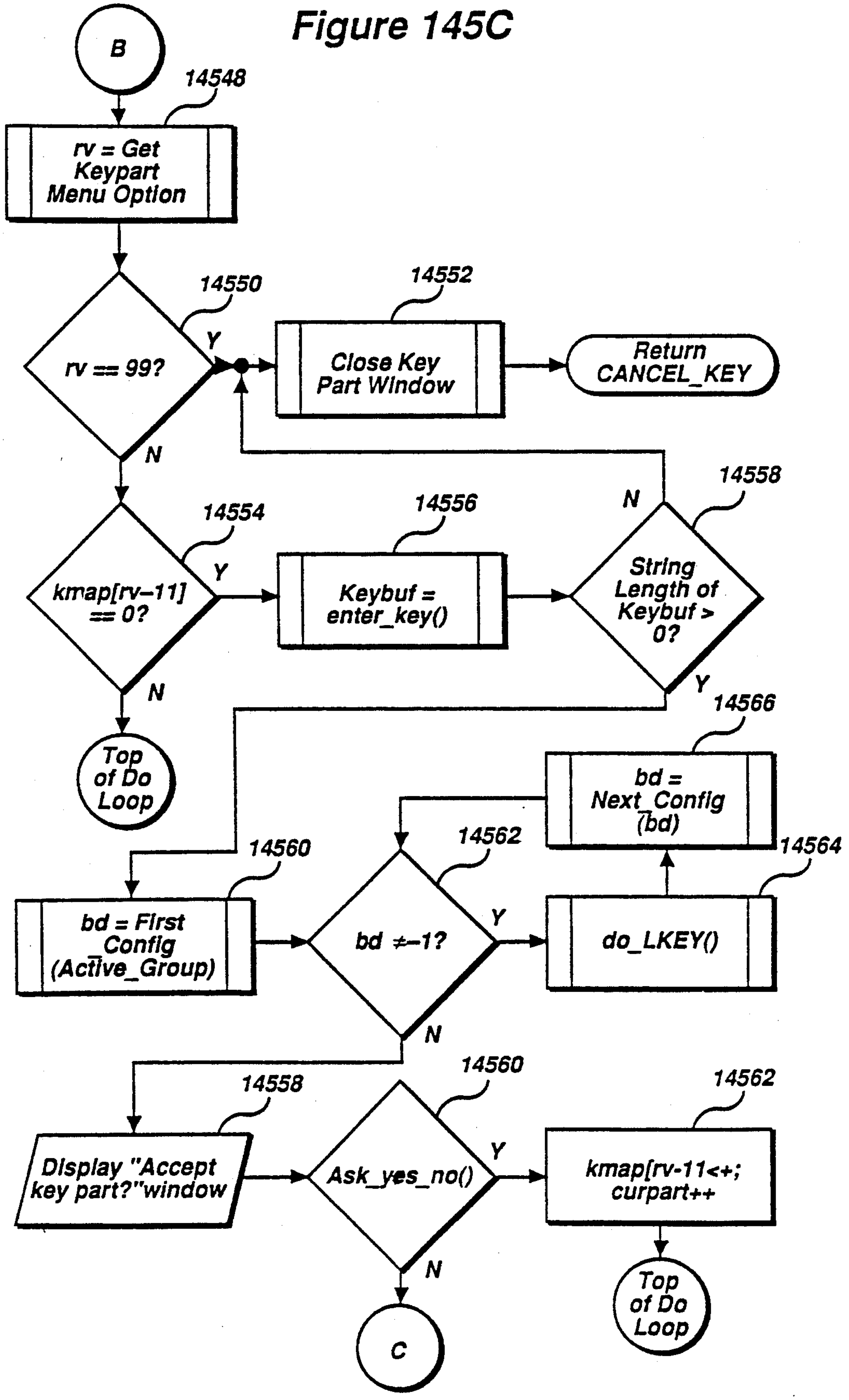

FIG. 145C is a continuation of the flow diagram of FIG. 145B.

Figure 146:
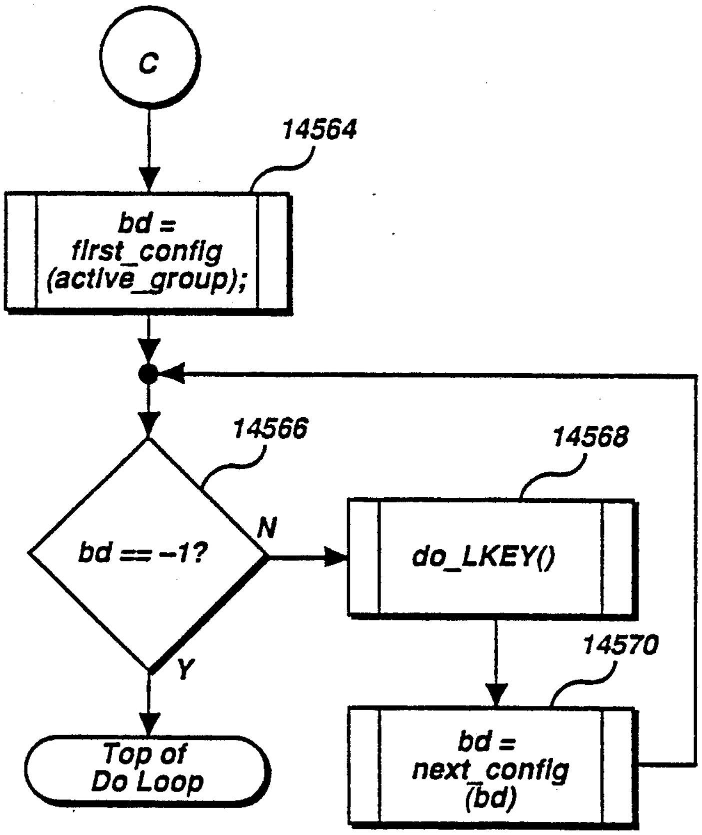

FIG. 146 is a continuation of the flow diagram of FIG. 145C.

Figure 147A:
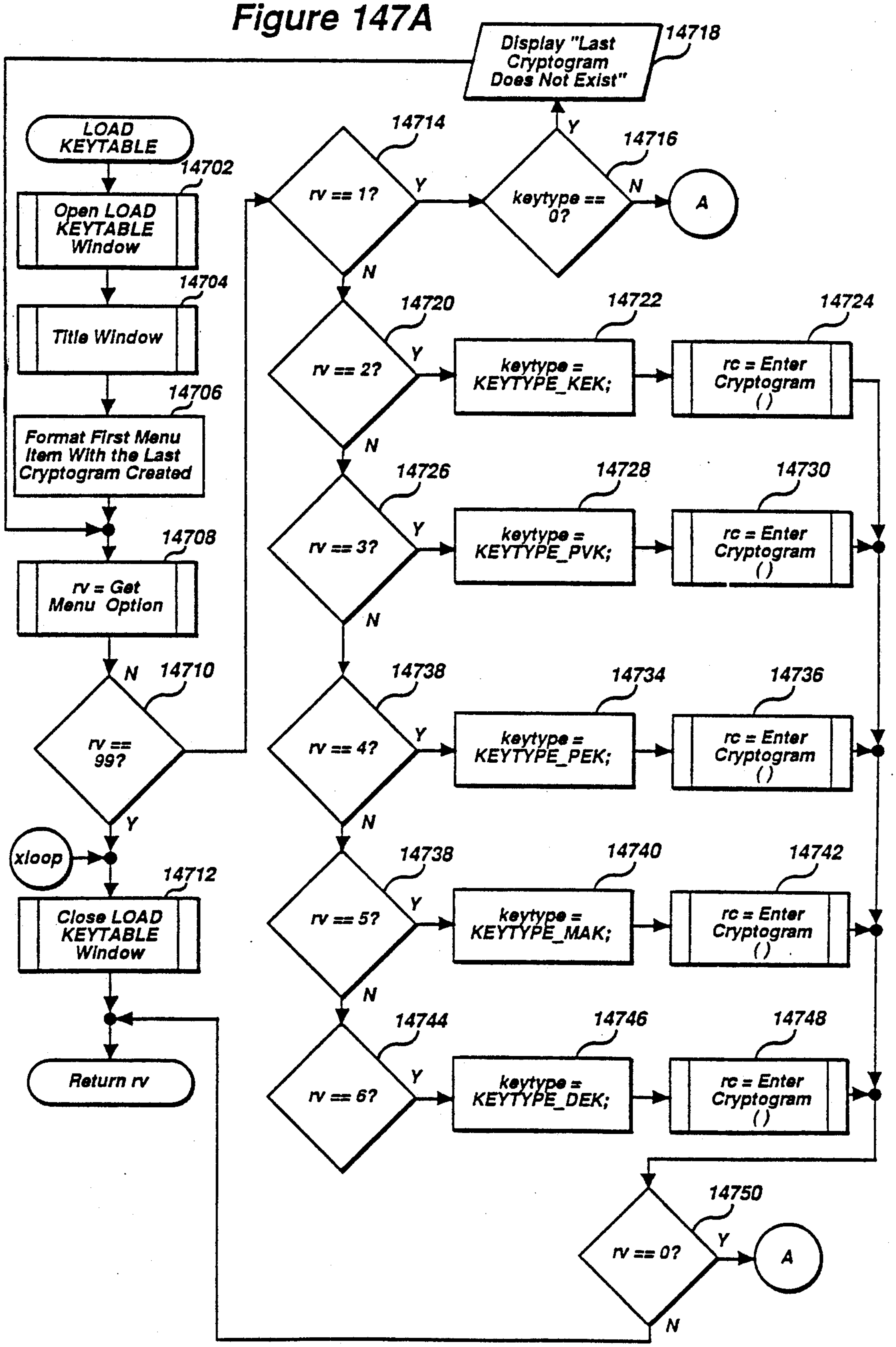
Figure 203:
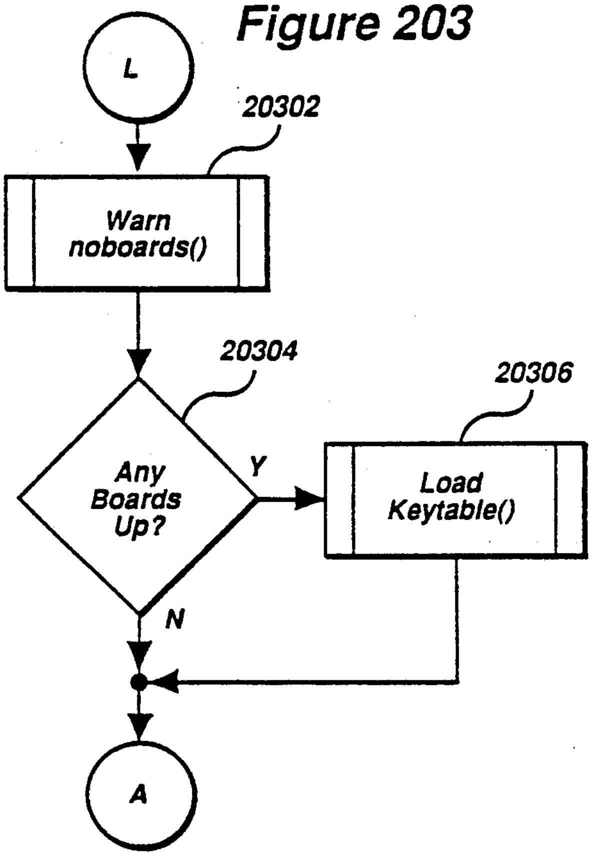

FIG. 147A is a flow diagram of the "LOAD_KEYTABLE" subroutine called by the subroutine of FIG. 203.

Figure 147B:
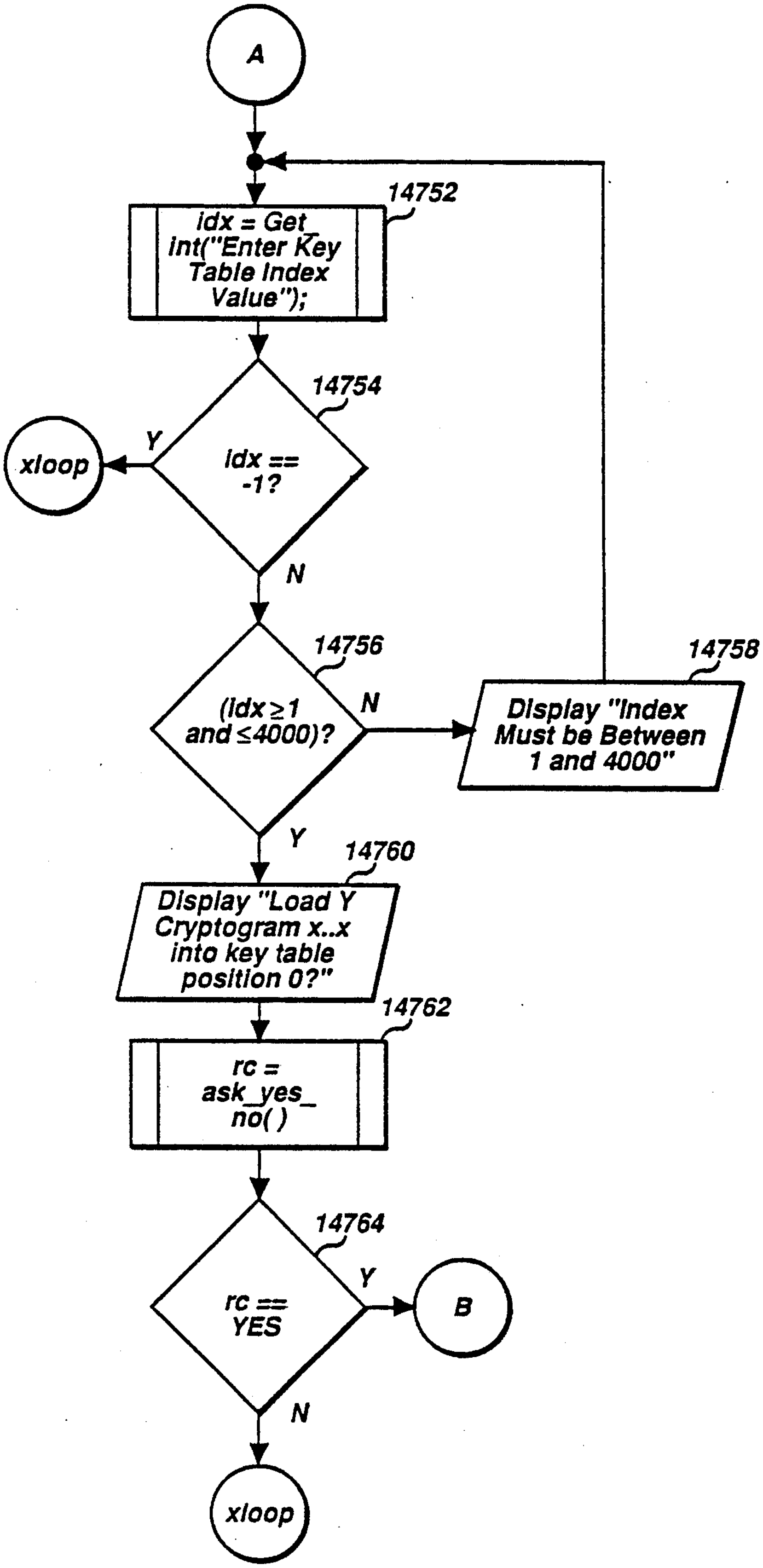

FIG. 147B is a continuation of the flow diagram of FIG. 147A.

Figure 147C:
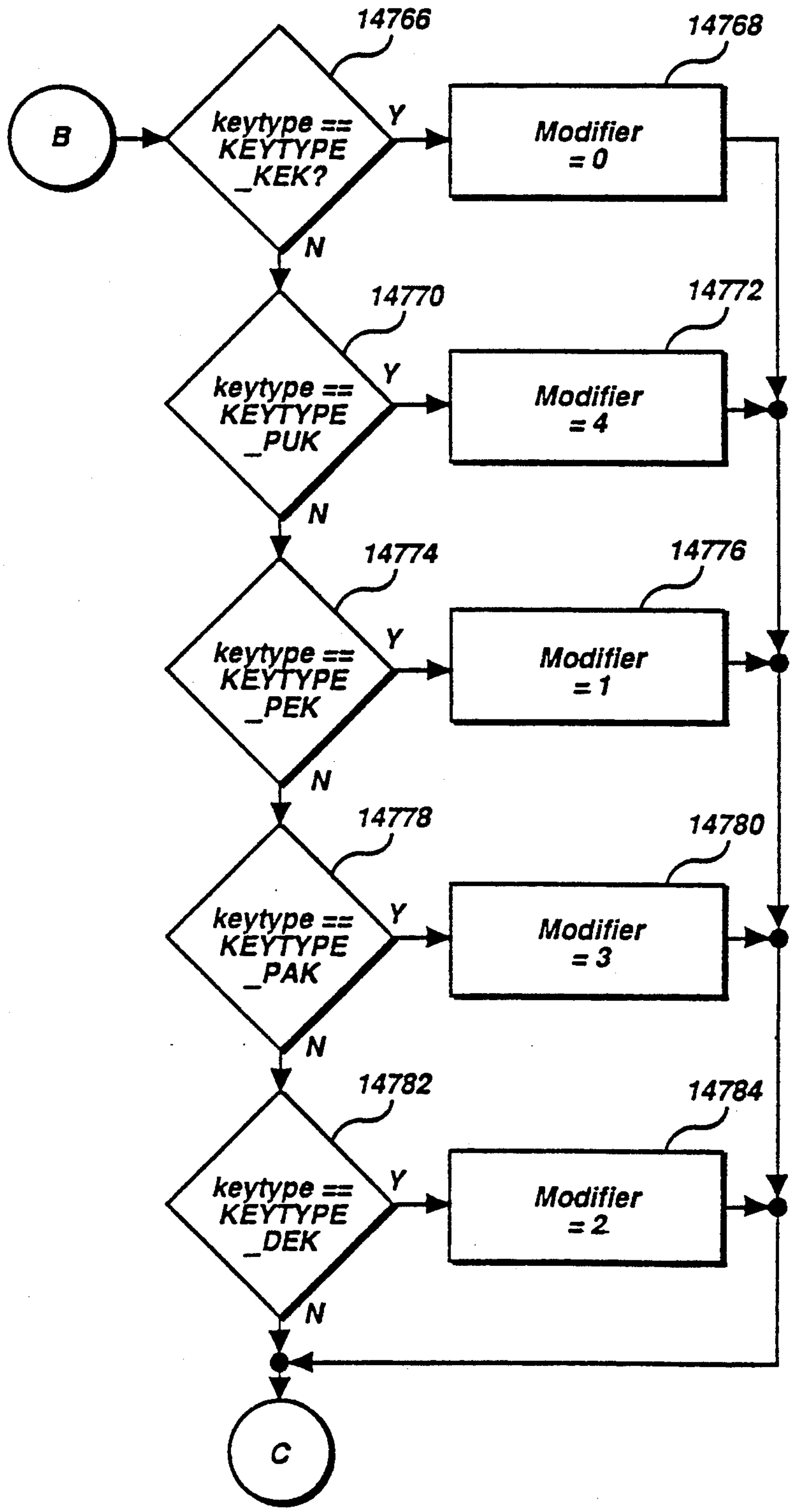

FIG. 147C is a continuation of the flow diagram of FIG. 147B.

Figure 147D:
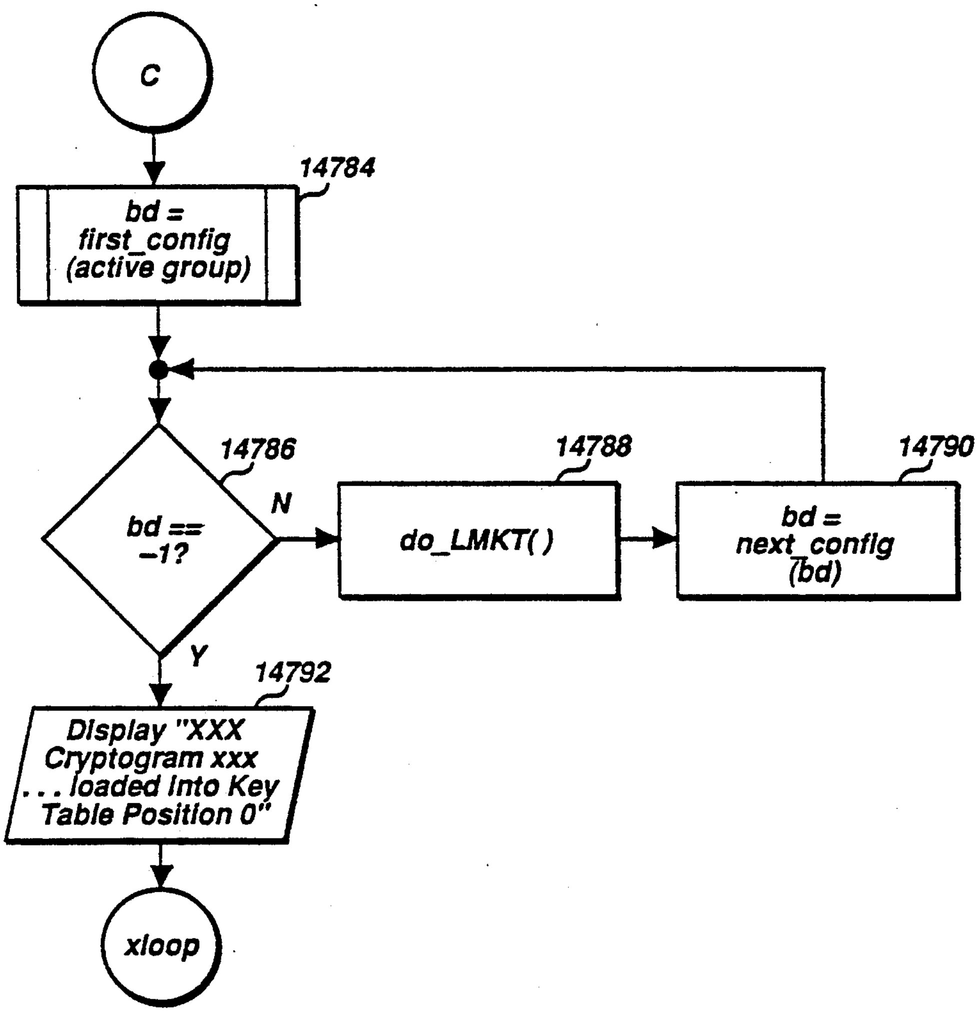

FIG. 147D is a continuation of the flow diagram of FIG. 147C.

Figure 148:
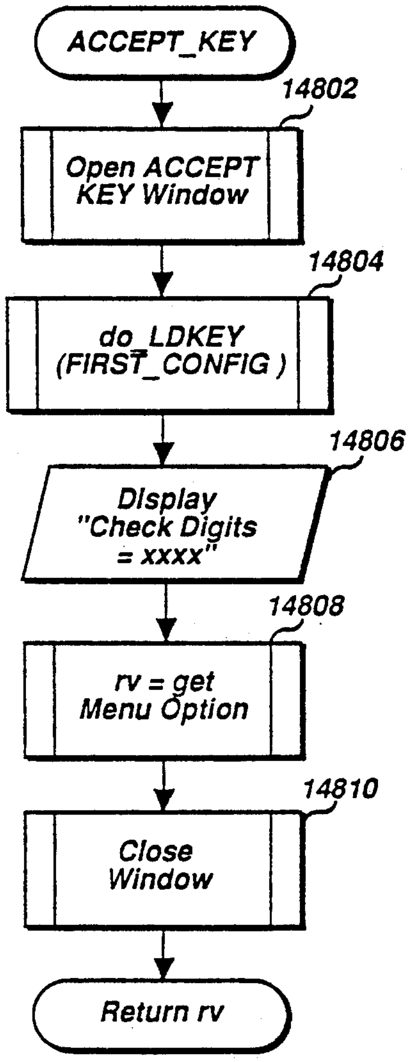

FIG. 148 is a flow diagram of the "ACCEPT_KEY" subroutine called by the subroutine of FIG. 206.

Figure 149:
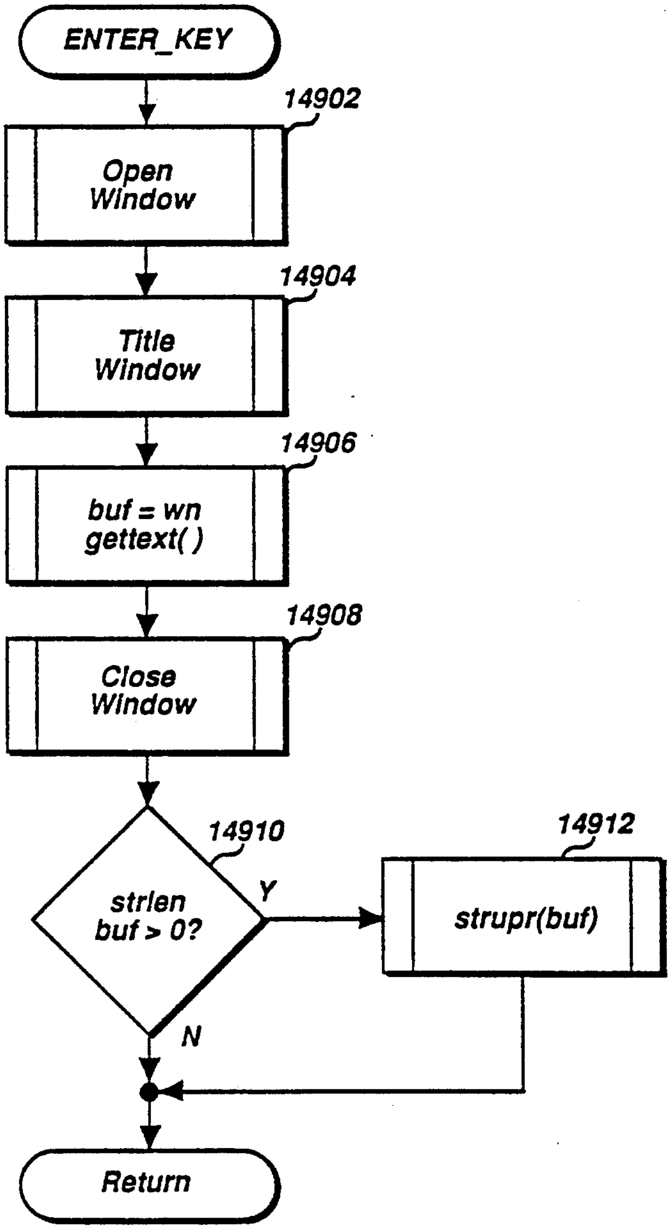

FIG. 149 is a flow diagram of the "ENTER_KEY" subroutine called by the subroutine of FIG. 145C.

Figure 150:
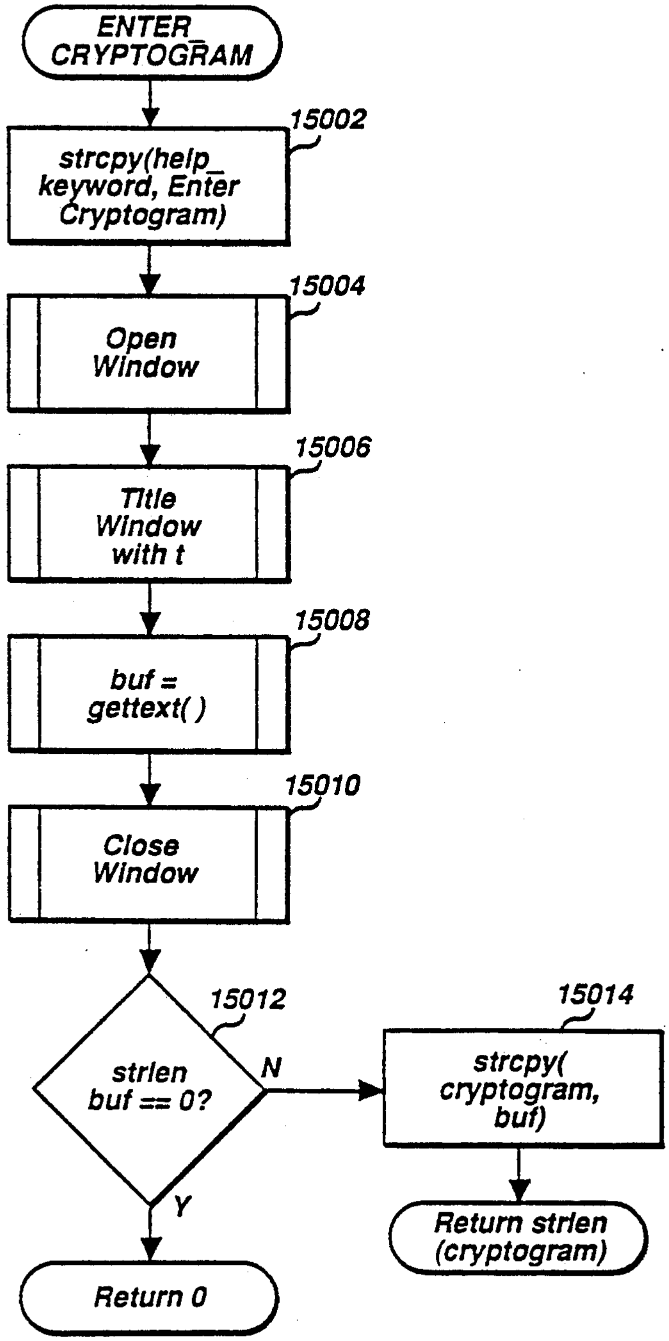

FIG. 150 is a flow diagram of the "ENTER_CRYPTOGRAM" subroutine called by the subroutines of FIG. 147.

Figure 151A:
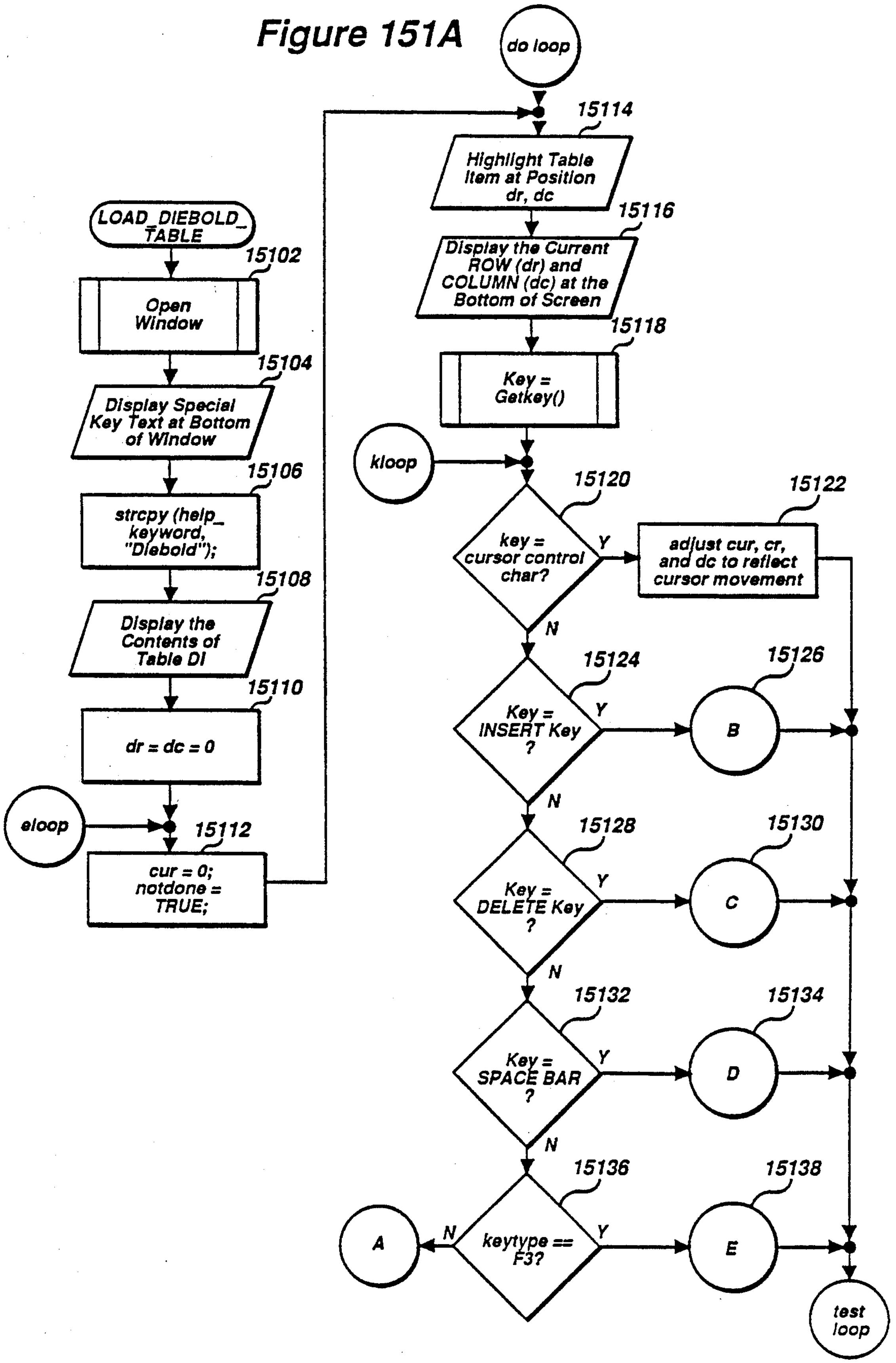
Figure 204:
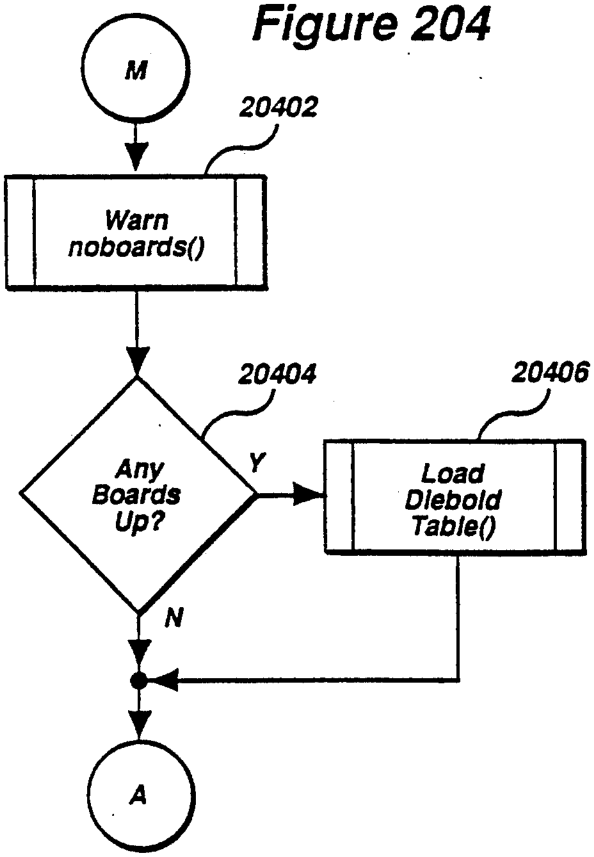

FIG. 151A is a flow diagram of the "LOAD_DIEBOLD_TABLE" subroutine called by the subroutine of FIG. 204.

Figure 151B:
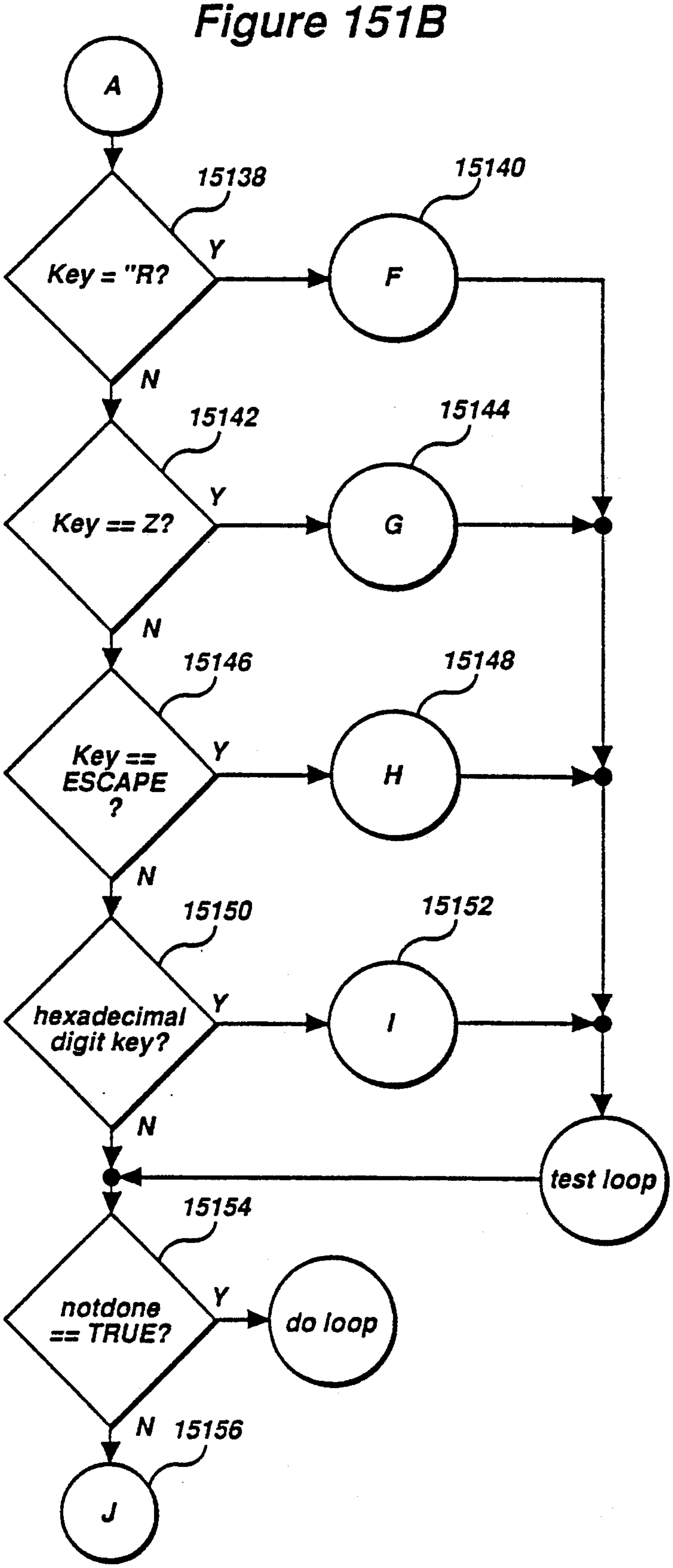

FIG. 151B is a continuation of the flow diagram of FIG. 151A.

Figure 151C:
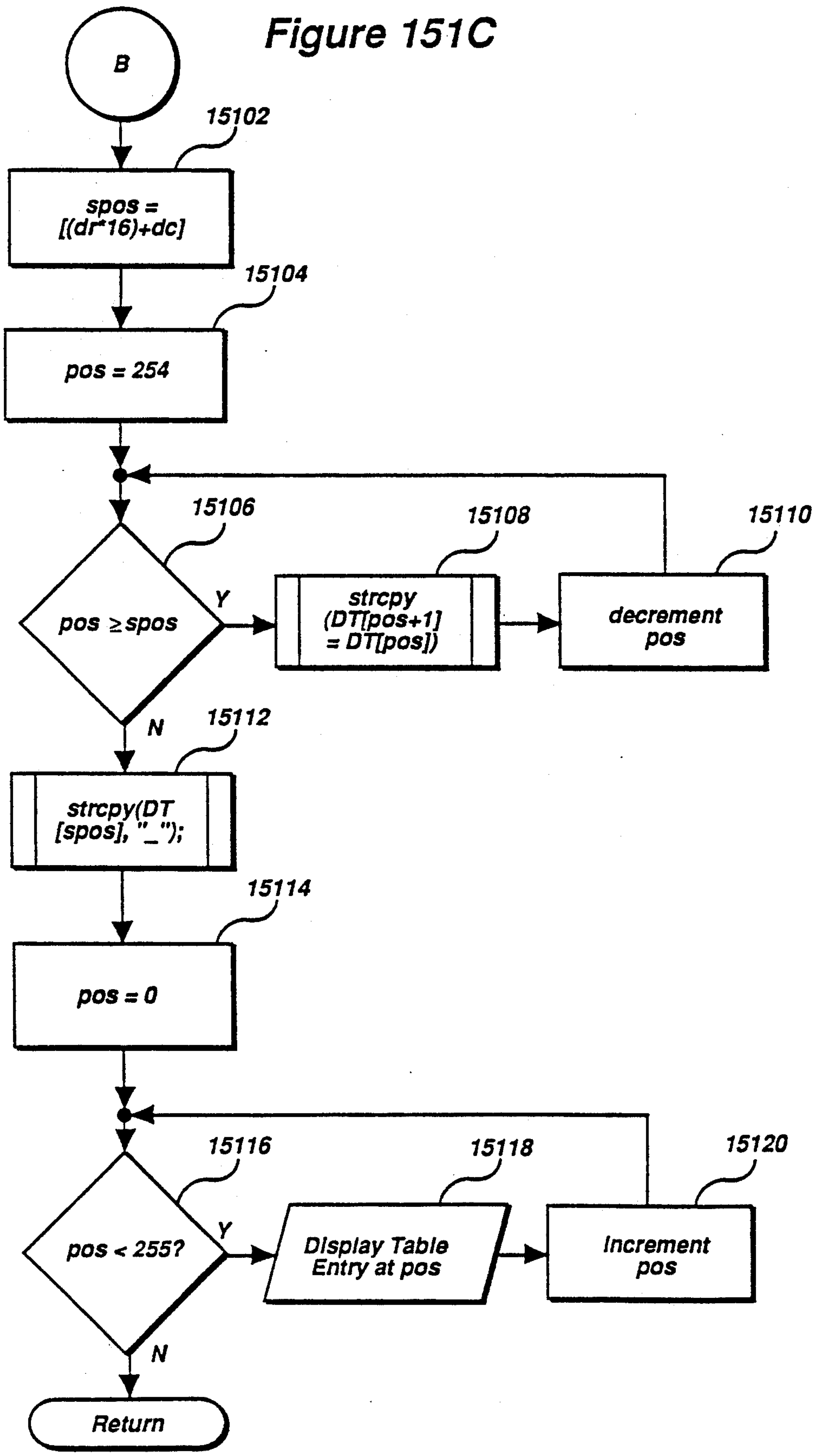

FIG. 151C is a continuation of the flow diagram of FIG. 151B.

Figure 152:
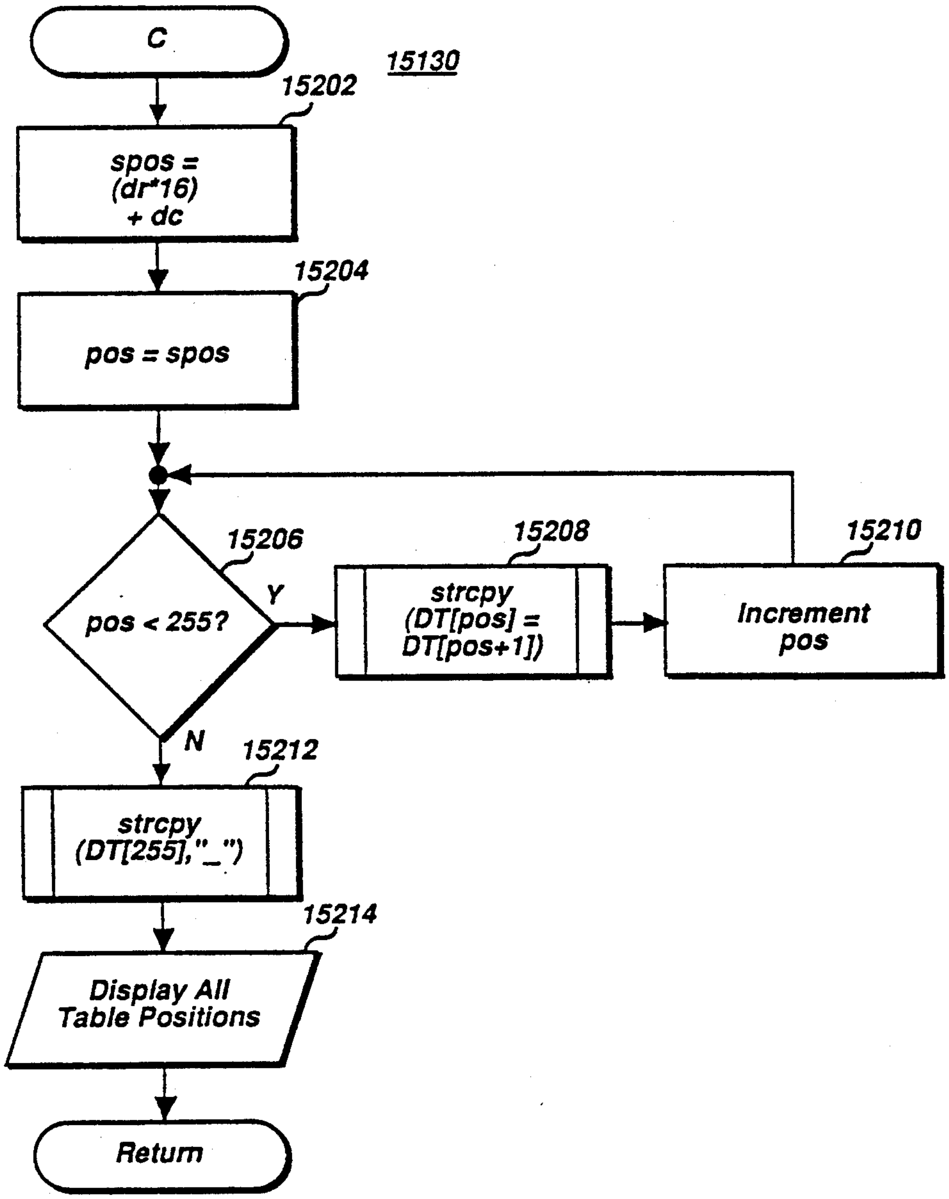

FIG. 152 is a flow diagram of subroutine "C" called by the subroutine of FIG. 151.

Figure 153:
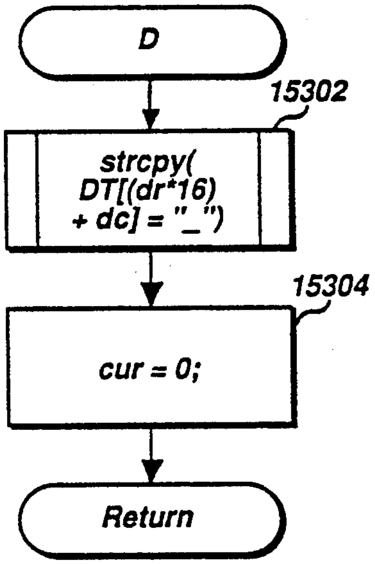

FIG. 153 is a flow diagram of subroutine "D" called by the subroutine of FIG. 151.

Figure 154:
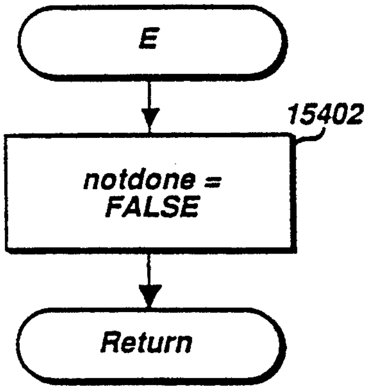

FIG. 154 is a flow diagram of subroutine "E" called by the subroutine of FIG. 151.

Figure 155:
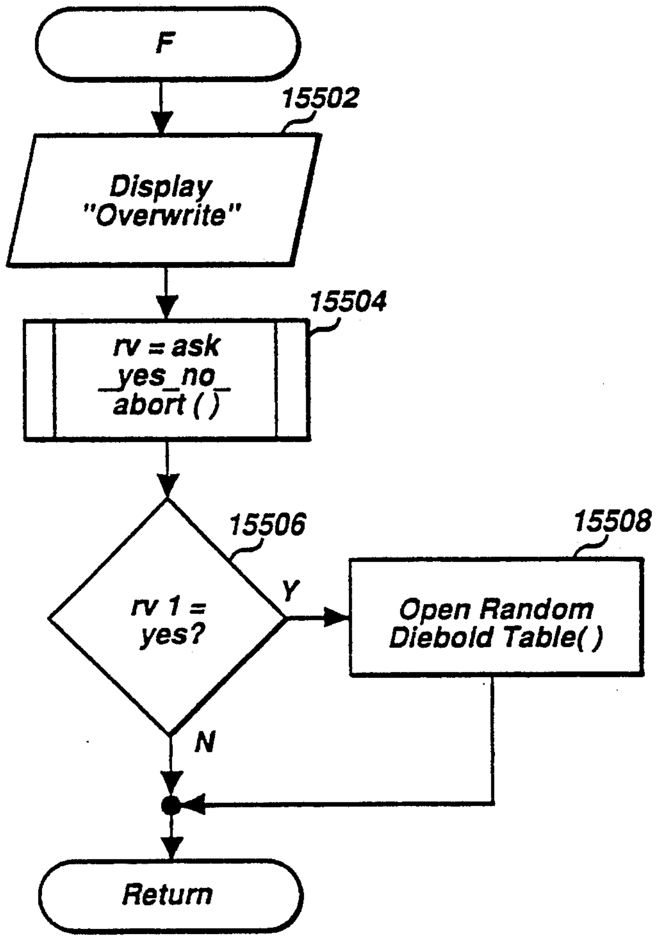

FIG. 155 is a flow diagram of subroutine "F" called by the subroutine of FIG. 151.

Figure 156:
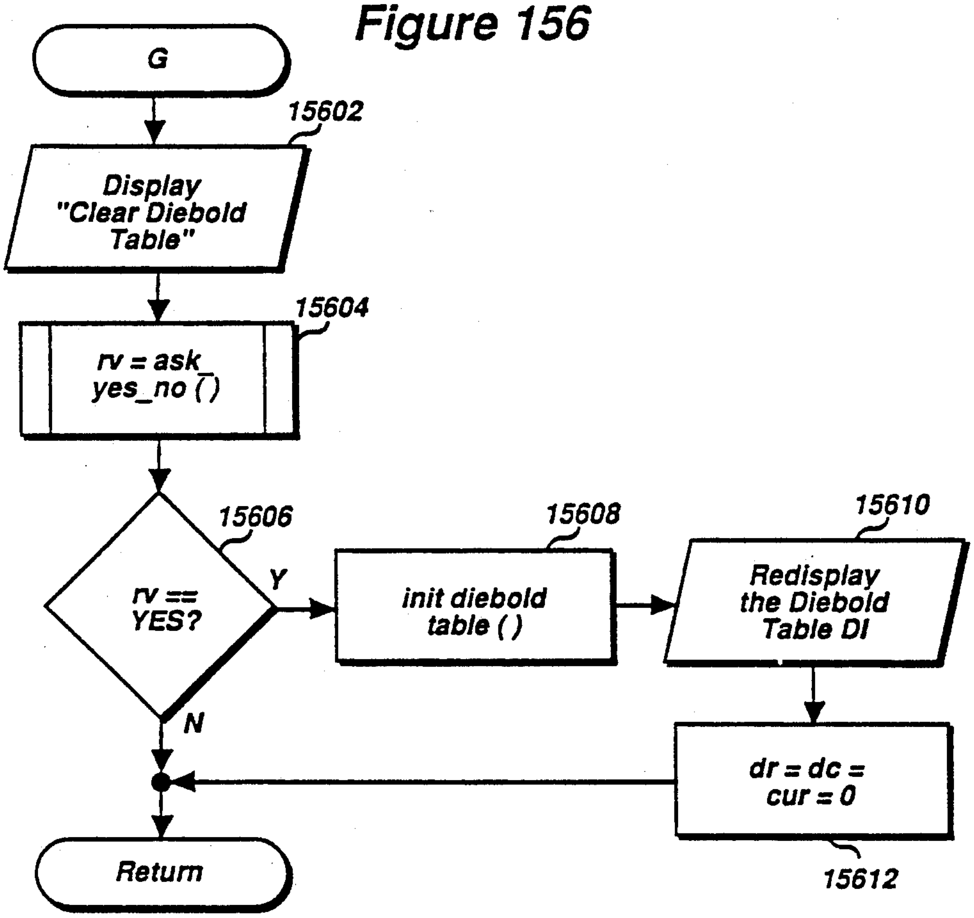

FIG. 156 is a flow diagram of subroutine "G" called by the subroutine of FIG. 151.

Figure 157:
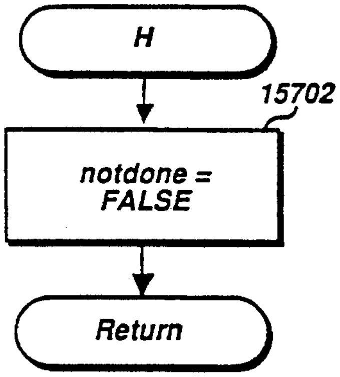

FIG. 157 is a flow diagram of subroutine "H" called by the subroutine of FIG. 151.

Figure 158:
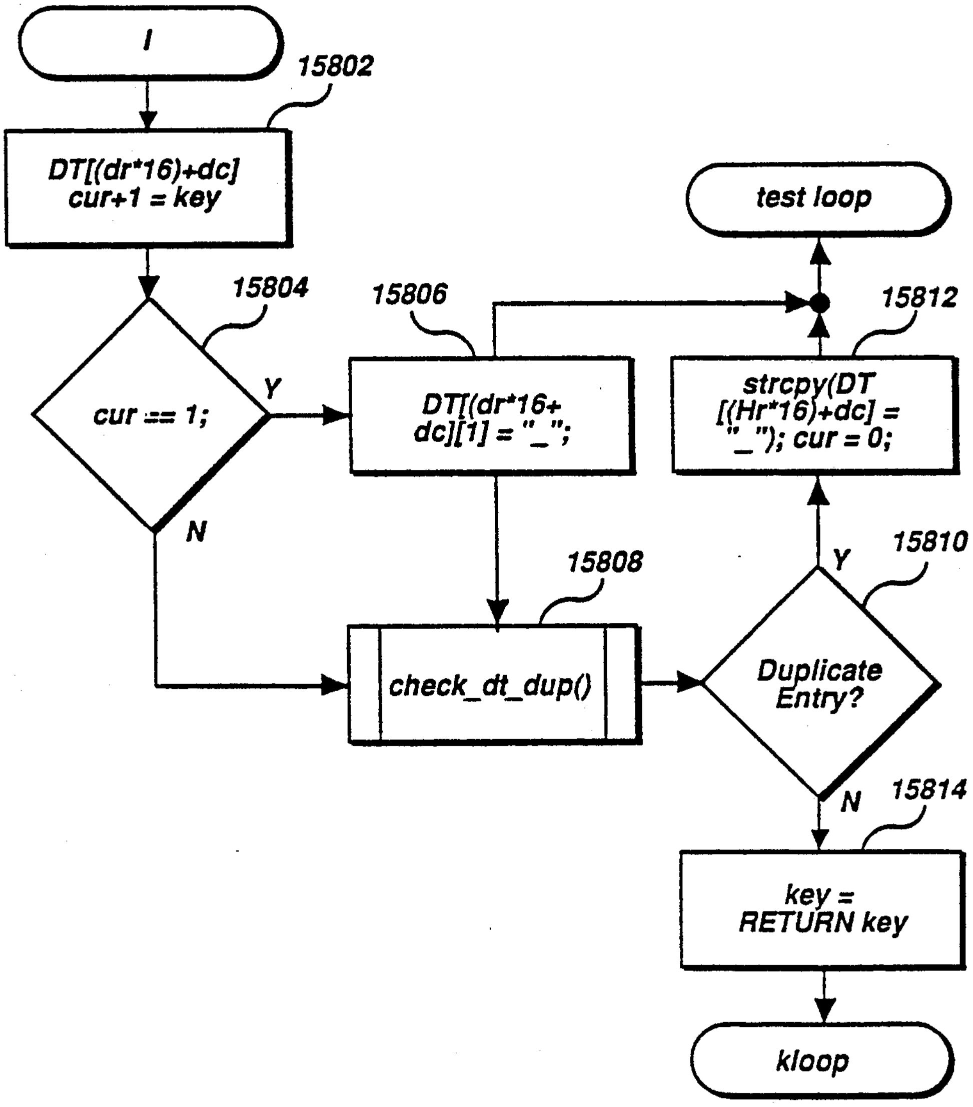

FIG. 158 is a flow diagram of subroutine "I" called by the subroutine of FIG. 151.

Figure 159:
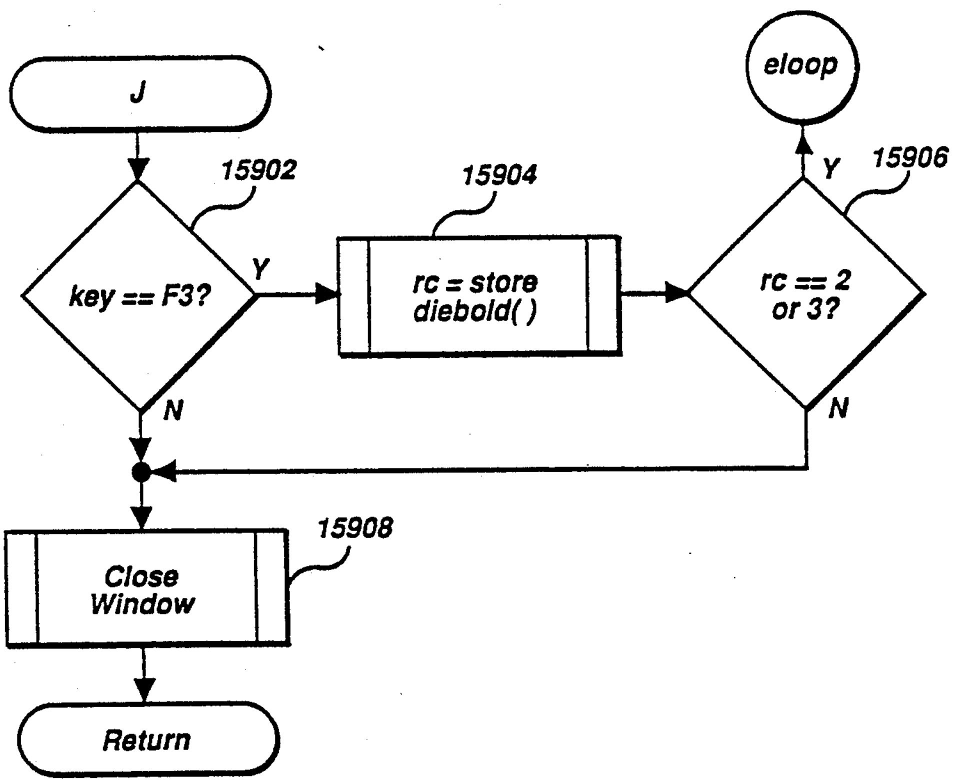

FIG. 159 is a flow diagram of subroutine "J" called by the subroutine of FIG. 151.

Figure 160A:
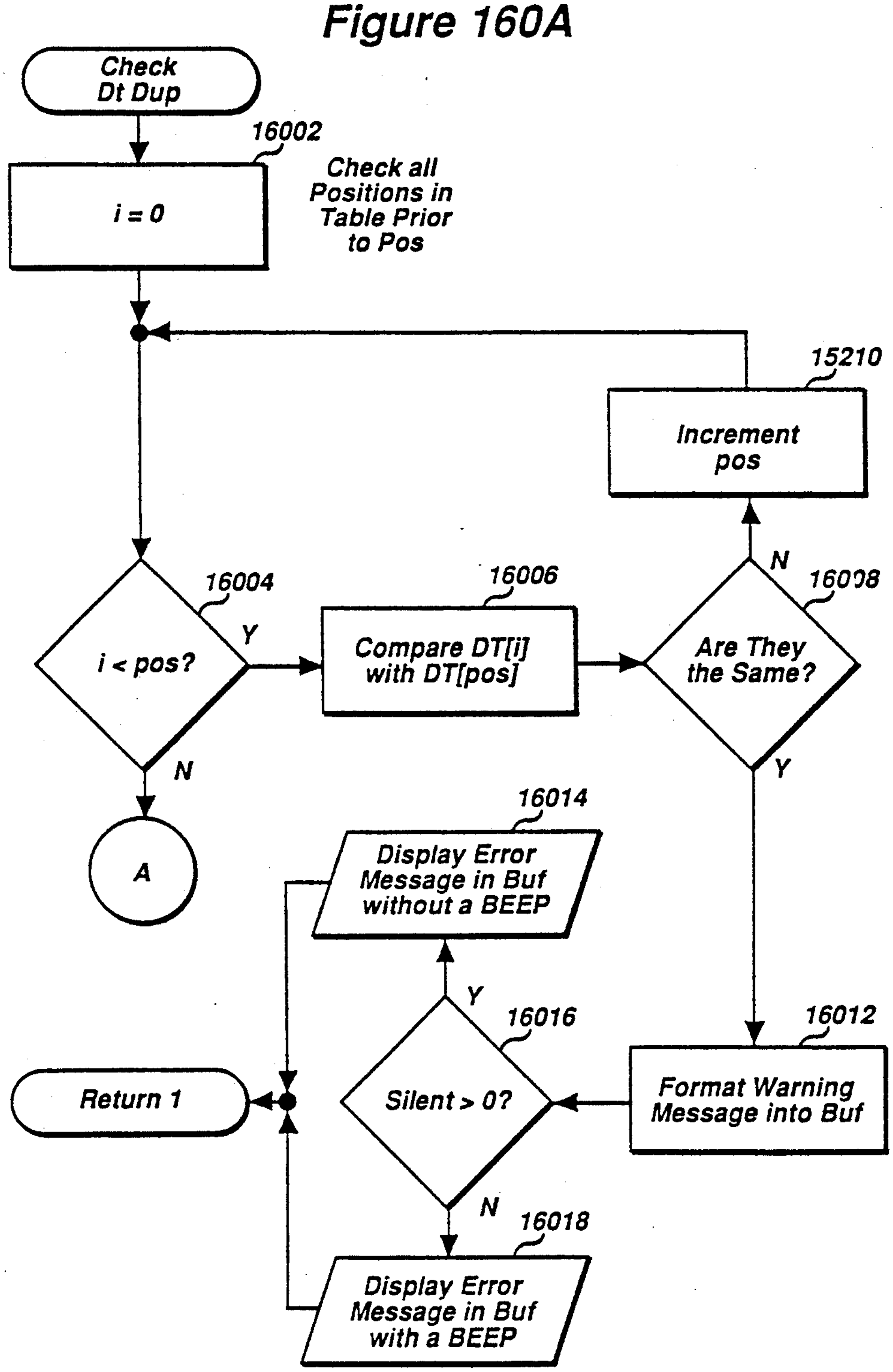

FIG. 160A is a flow diagram of the CHECK_Dt_DUP subroutine called by the subroutine of FIG. 158.

Figure 160B:
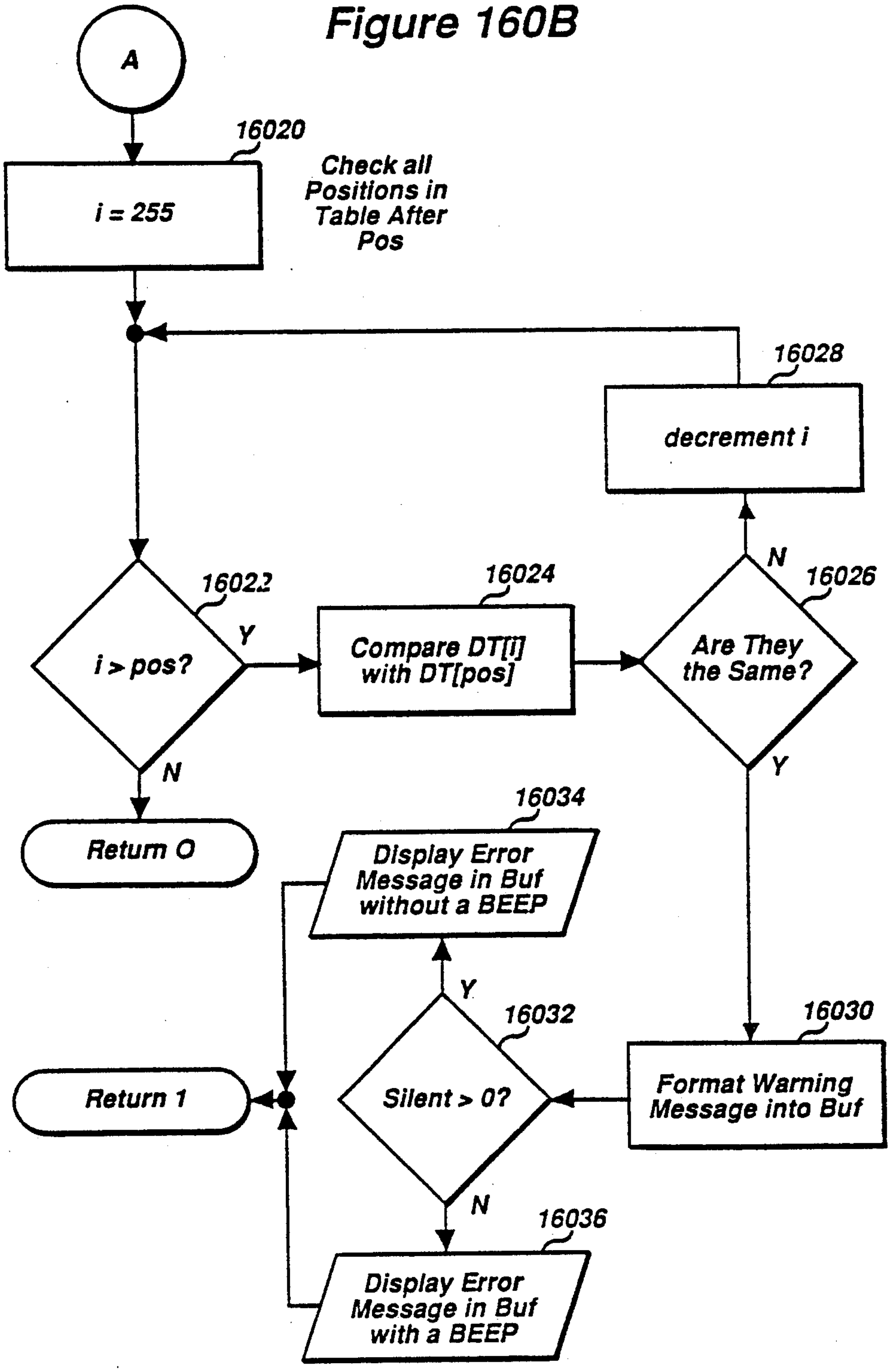

FIG. 160B is a continuation of the flow diagram of FIG. 160A.

Figure 161:
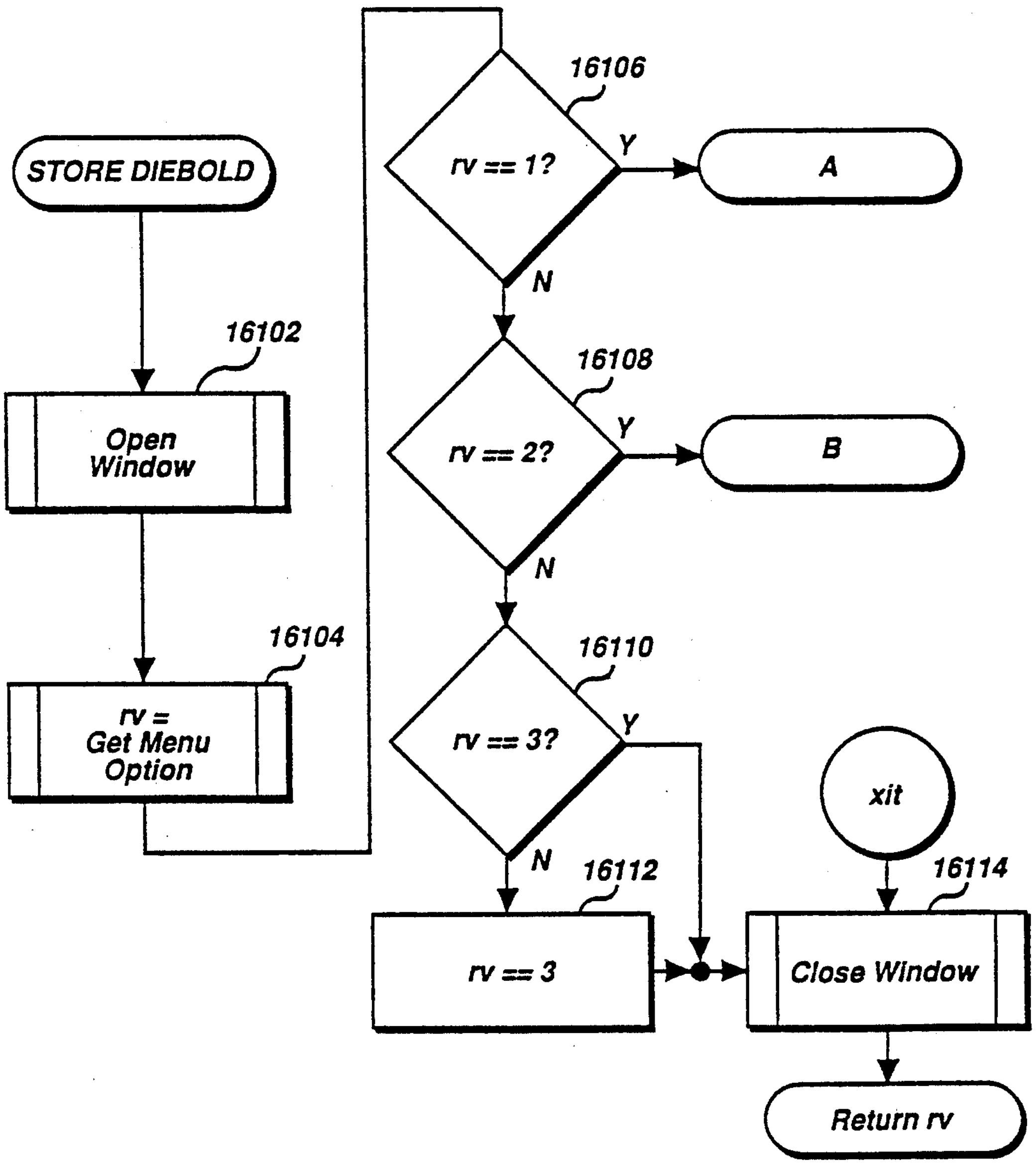

FIG. 161 is a flow diagram of the "STORE_DIEBOLD" flow diagram called by the subroutine of FIG. 159.

Figure 162A:
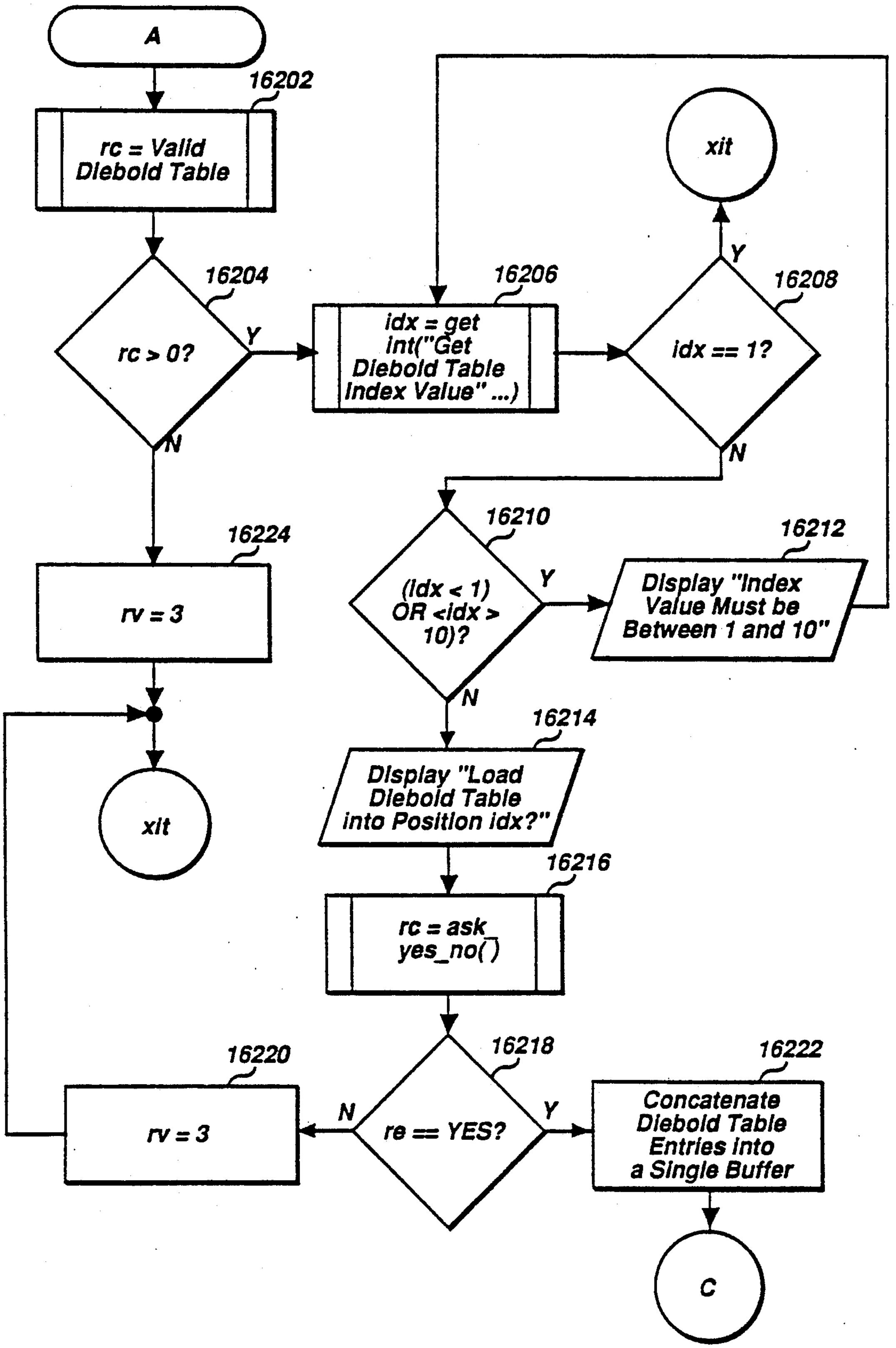

FIG. 162A is a flow diagram of subroutine "A" called by the subroutine of FIG. 161.

Figure 162B:
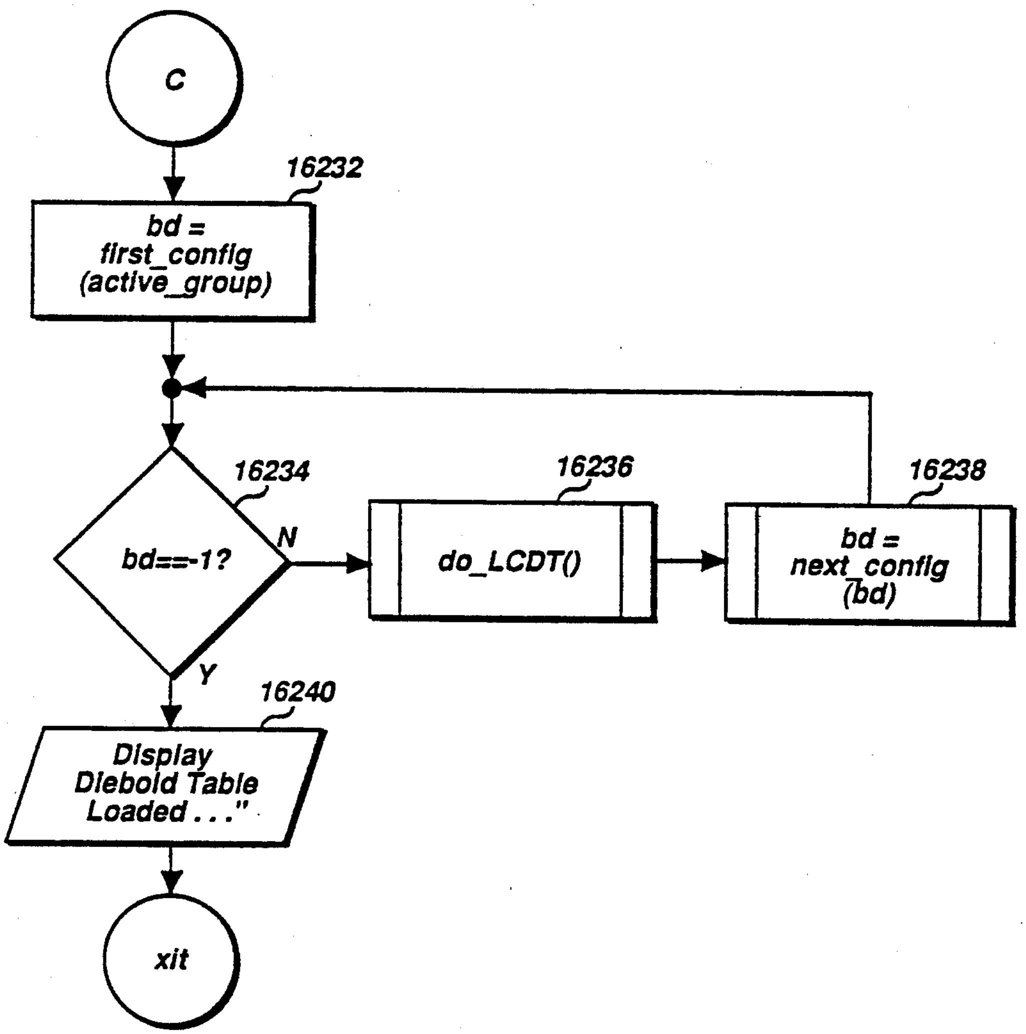

FIG. 162B is a continuation of the flow diagram of FIG. 162A.

Figure 163:
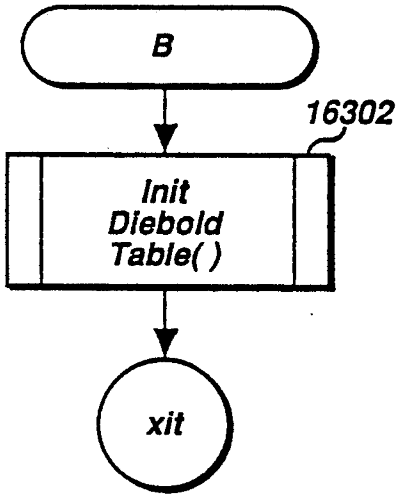

FIG. 163 is a flow diagram of subroutine "B" called by the subroutine of FIG. 161.

Figure 164:
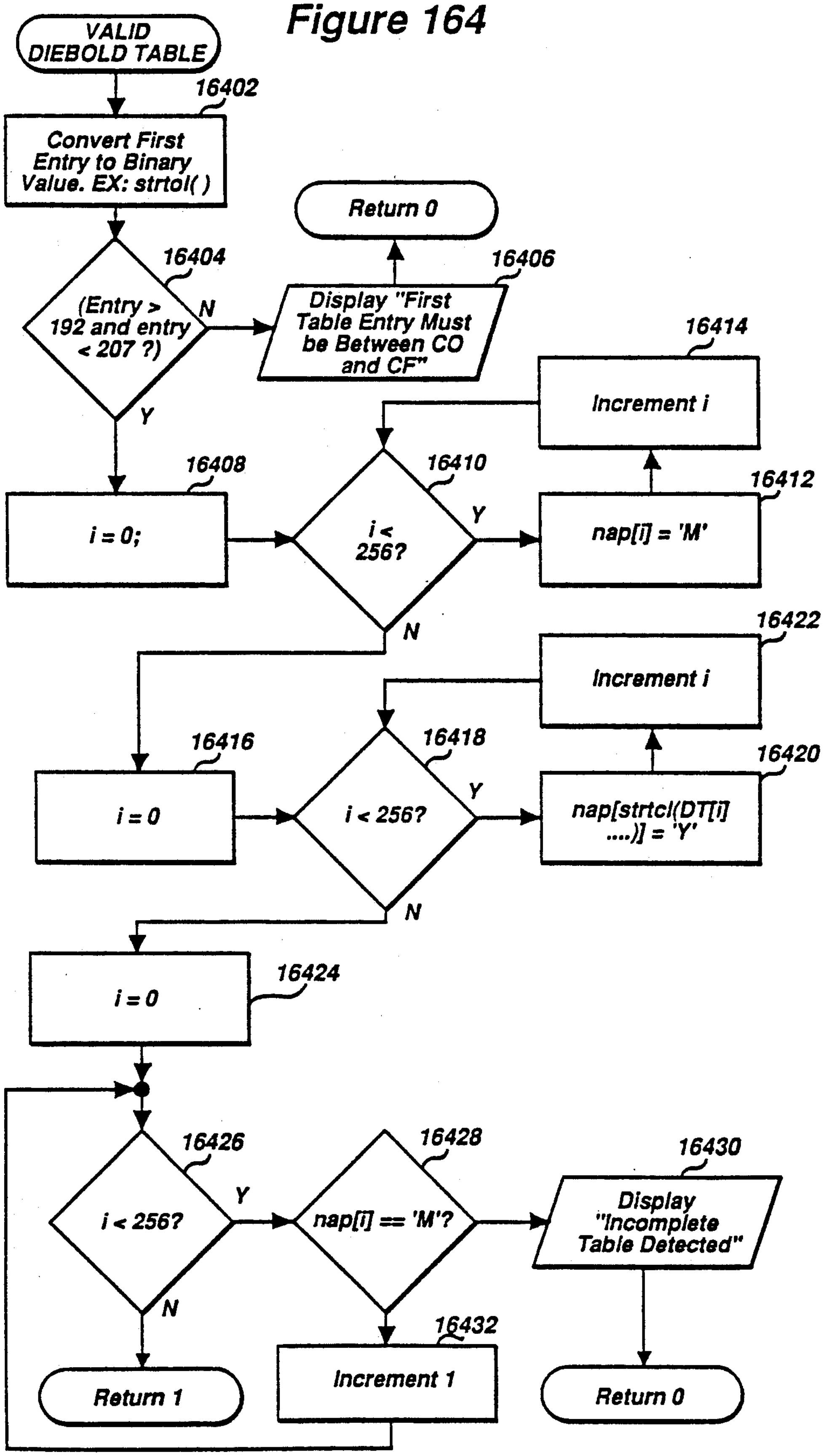

FIG. 164 is a flow diagram of the "VALID_DIEBOLD TABLE" called by the subroutine of FIG. 162A.

Figure 165:
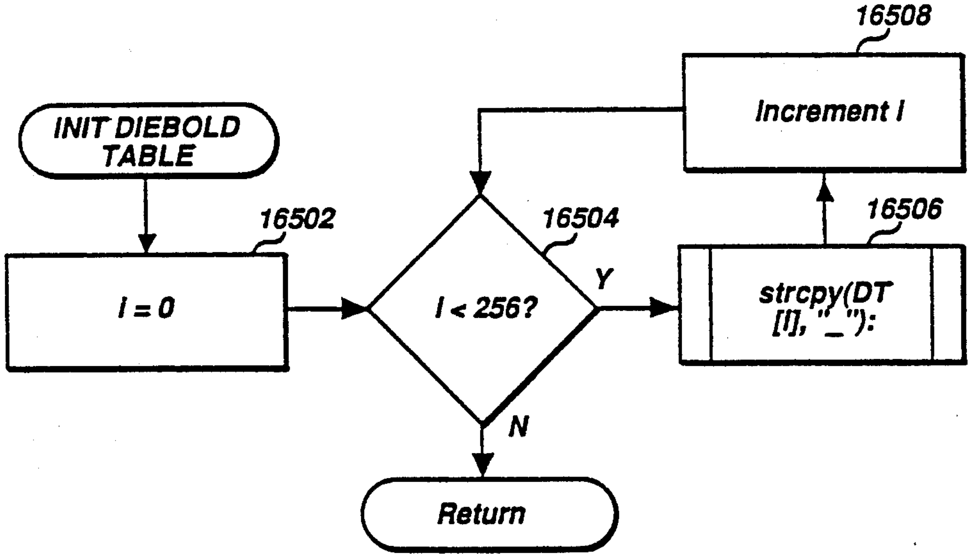

FIG. 165 is a flow diagram of the "INIT_DIEBOLD_TABLE" called by the subroutine of FIG. 156.

Figure 166A:
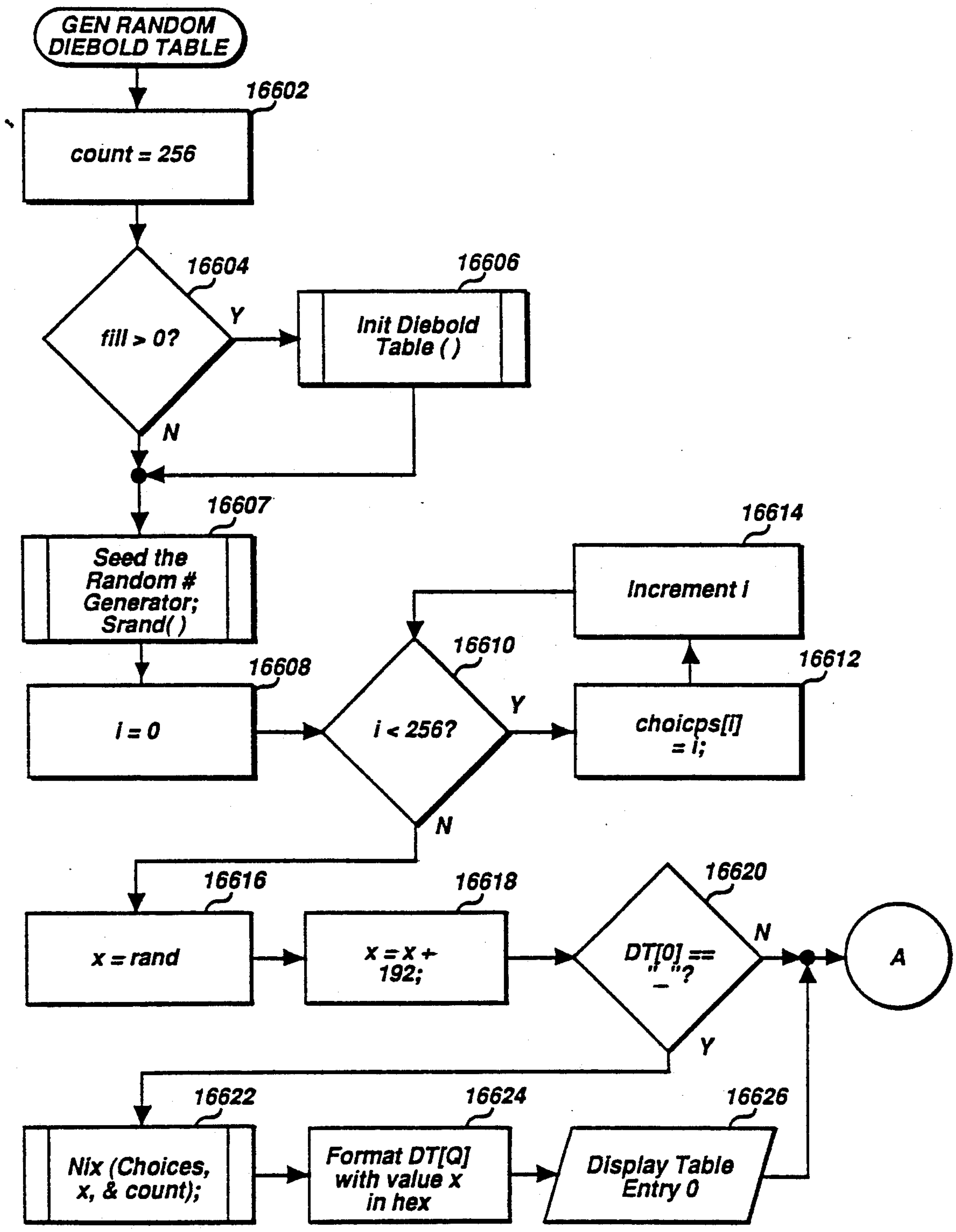

FIG. 166A is a flow diagram of the "GEN_RANDOM_DIEBOLD_TABLE" subroutine called by the subroutine of FIG. 155.

Figure 166B:
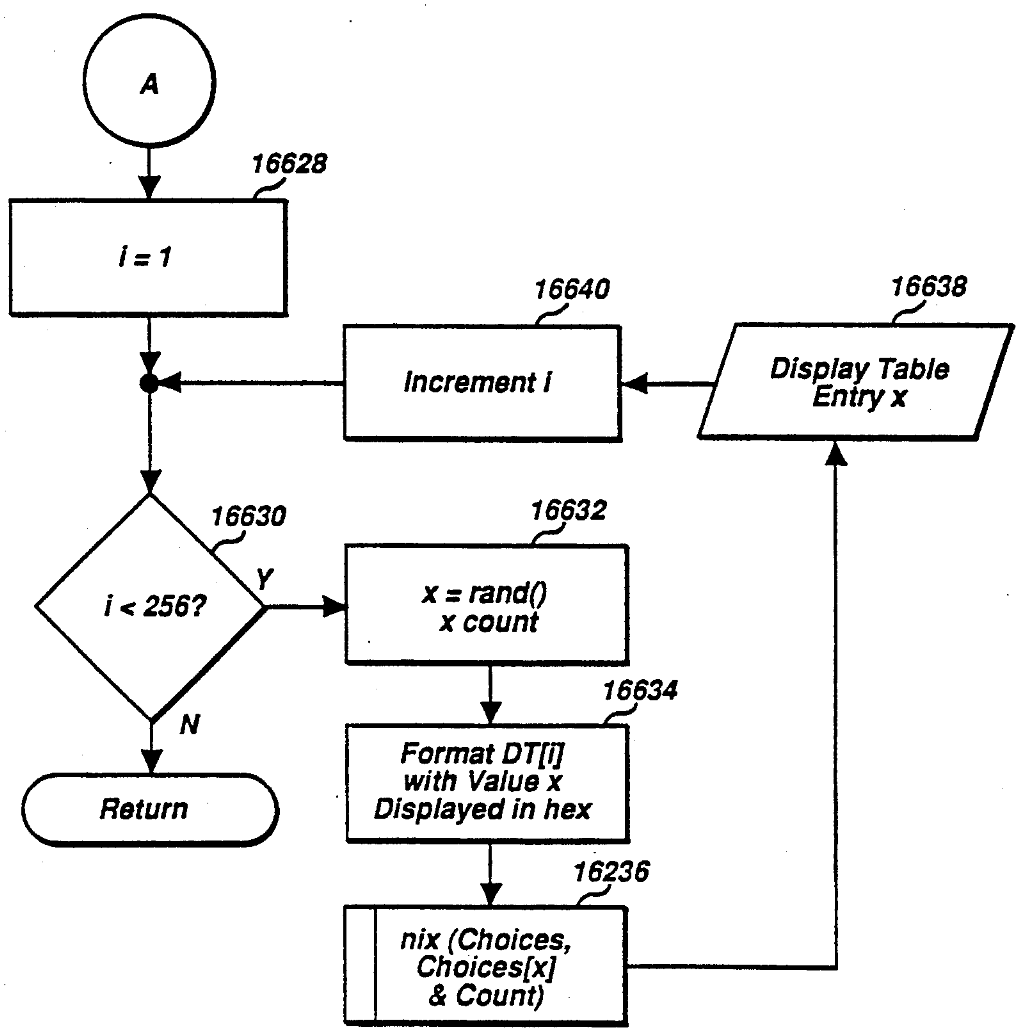

FIG. 166B is a continuation of the flow diagram of FIG. 166A.

Figure 167:
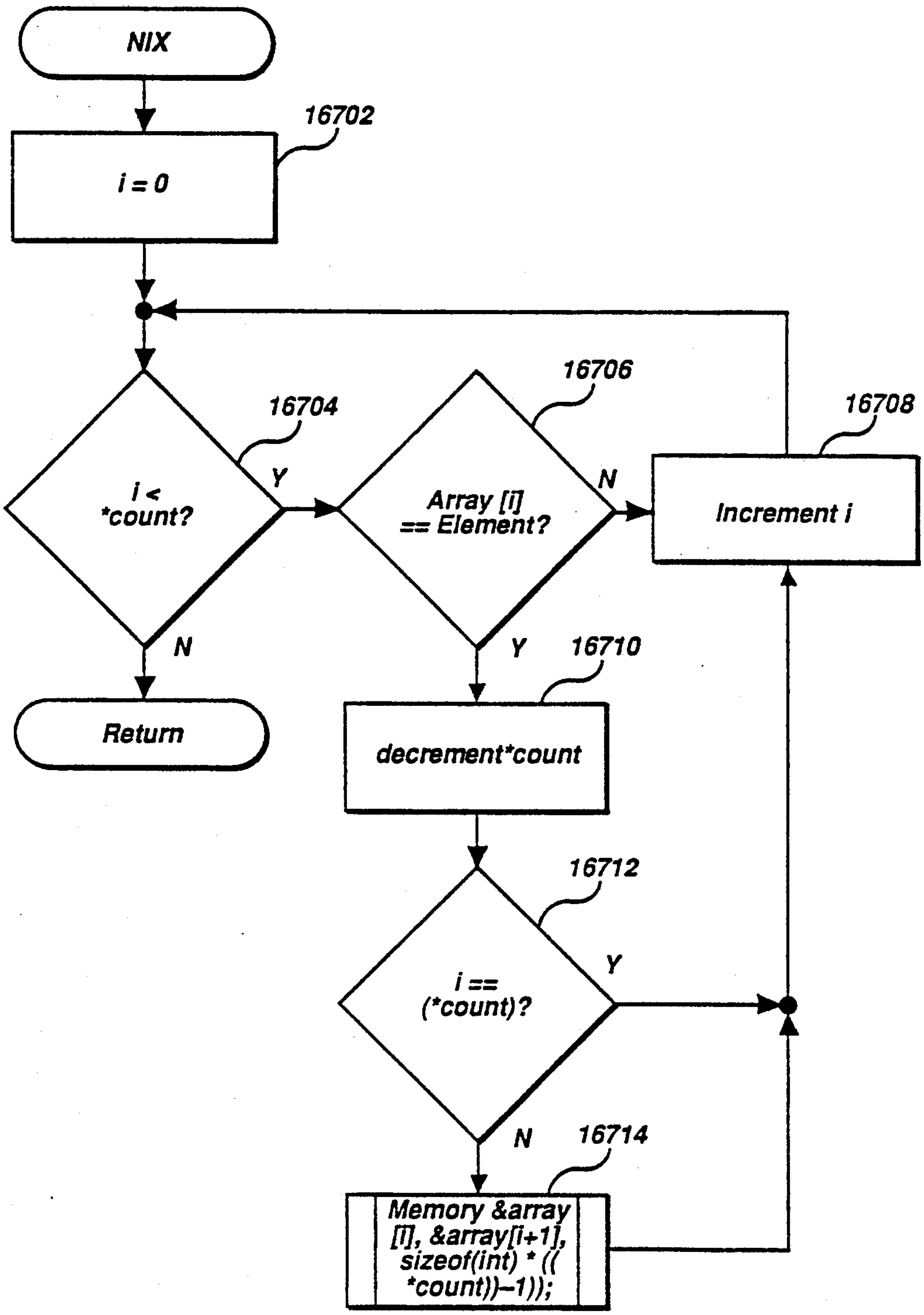

FIG. 167 is a flow diagram of the "NIX" subroutine called by the subroutine of FIG. 166B.

Figure 168A:
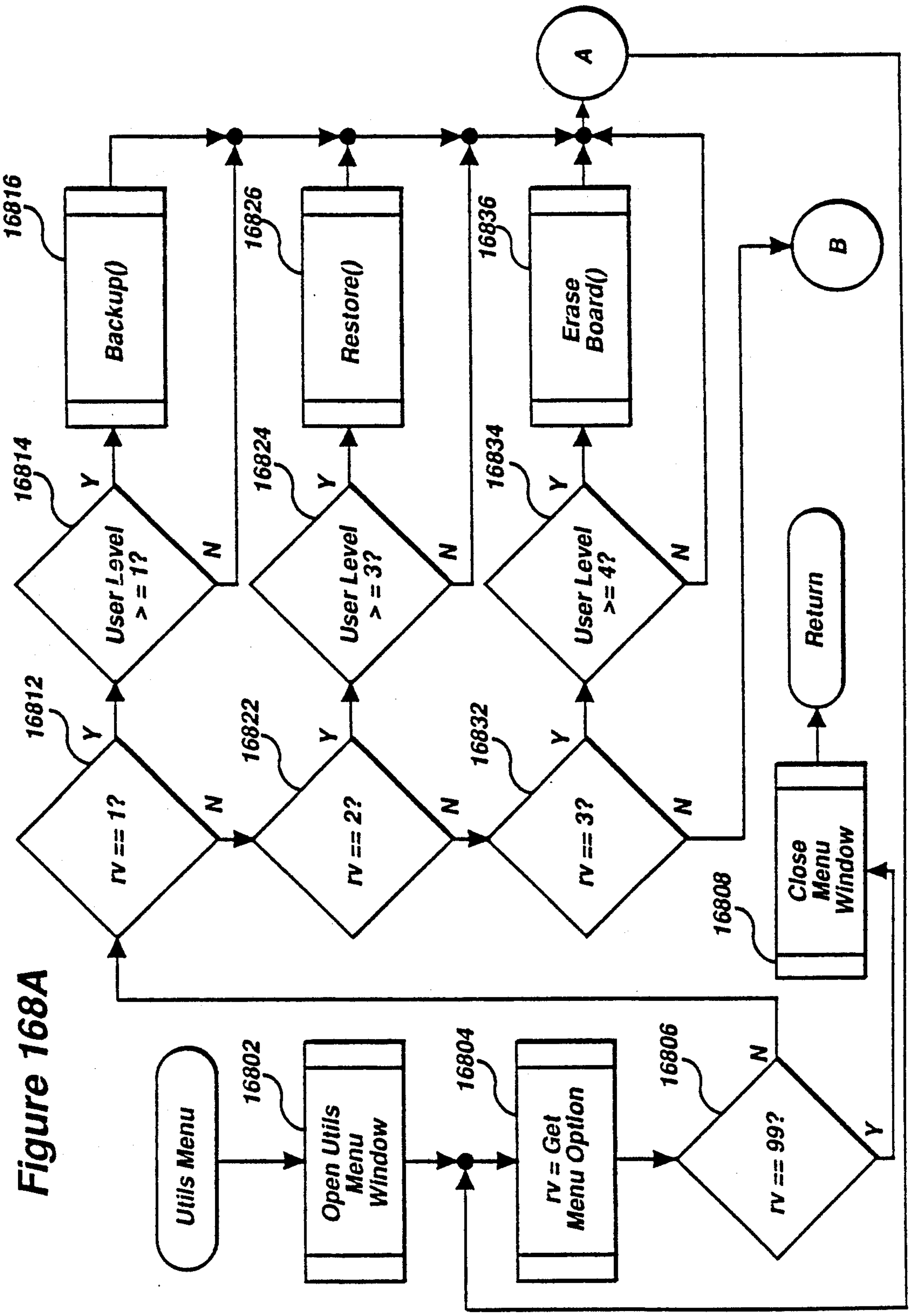
Figure 168B:
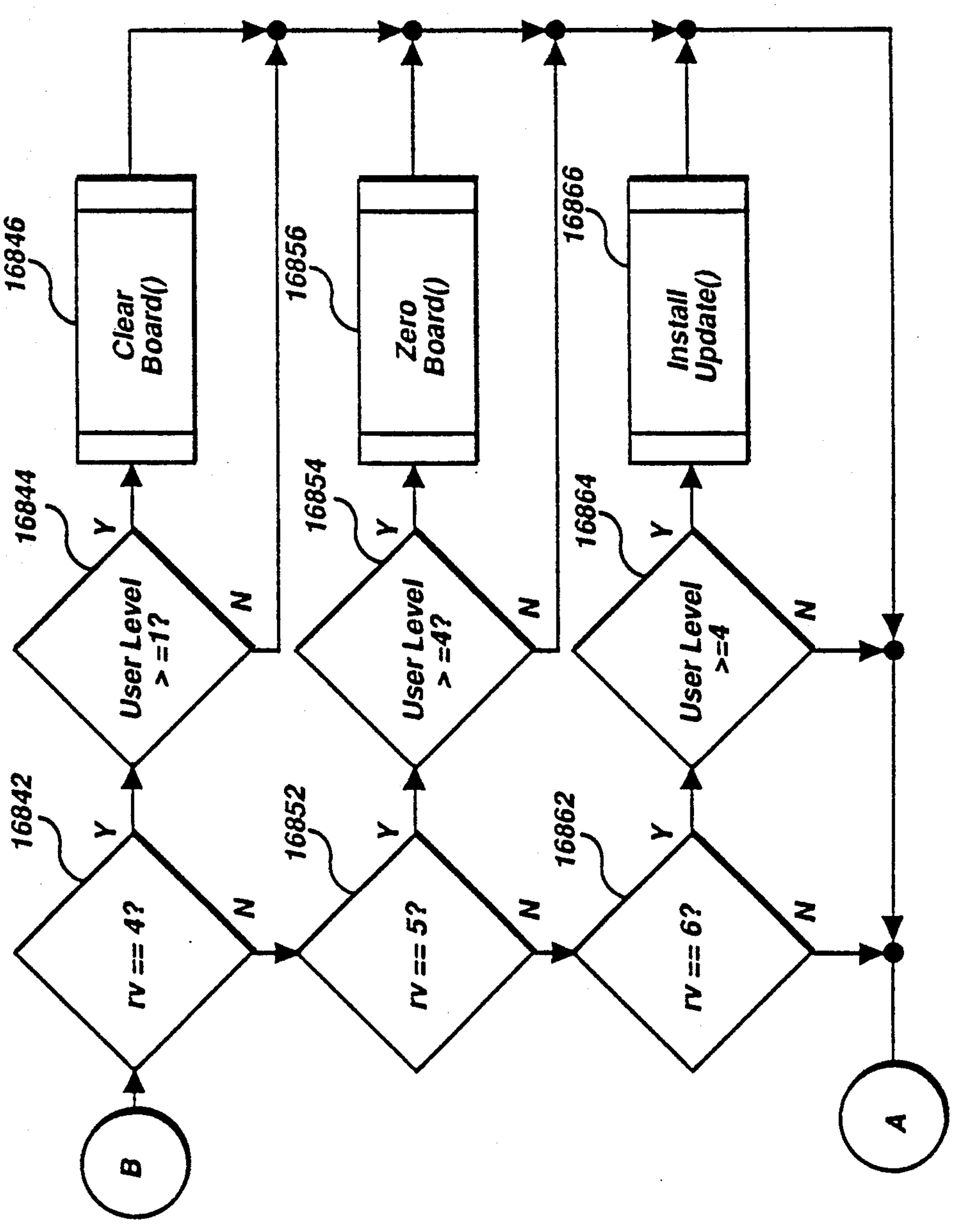

FIGS. 168A and 168B are flow diagrams of the "UTILS_MENU" subroutine called by the subroutine of FIG. 100.

Figure 169A:
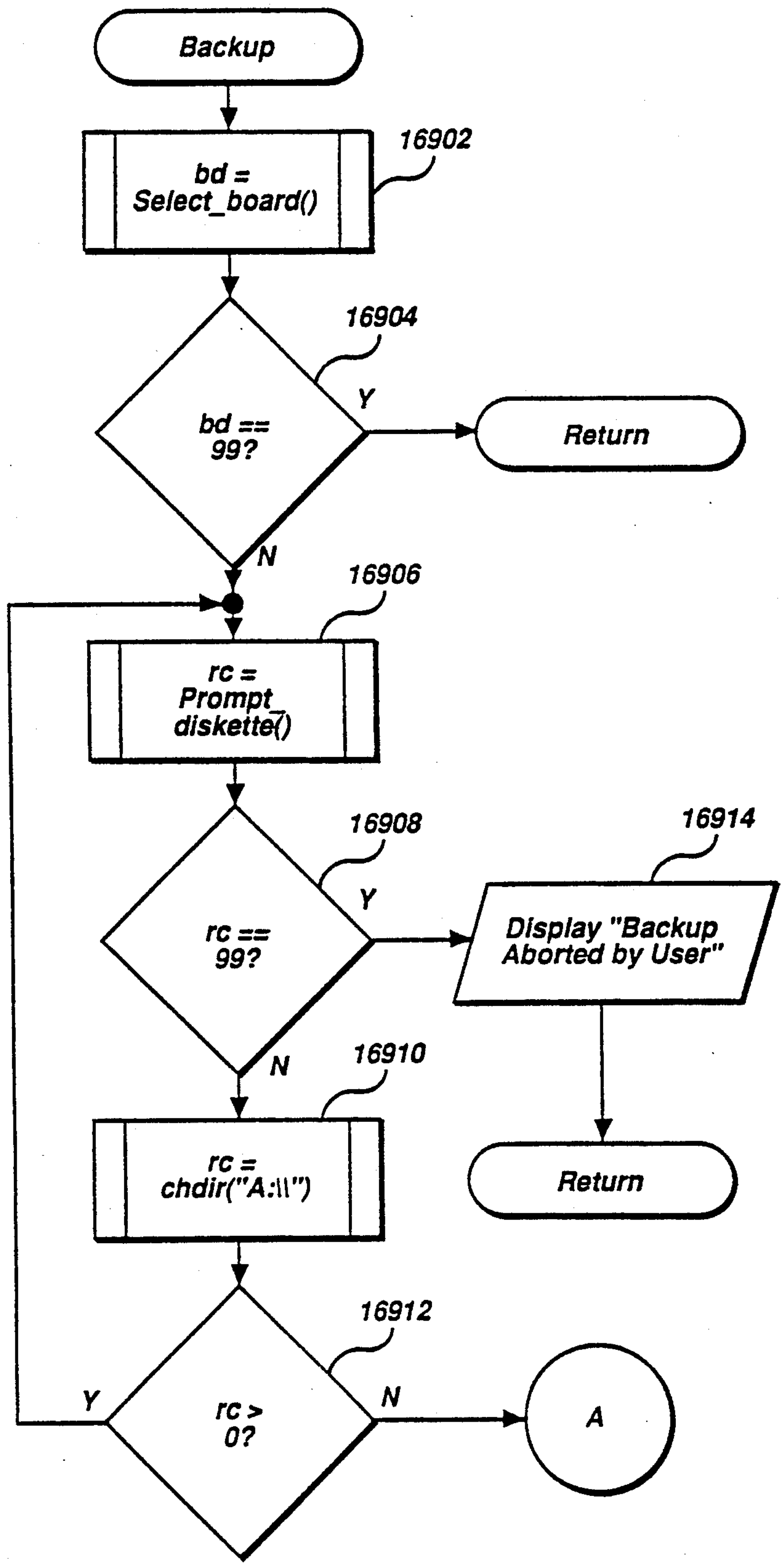

FIG. 169A is a flow diagram of the "BACKUP" subroutine called by the subroutine of FIG. 168.

Figure 169B:
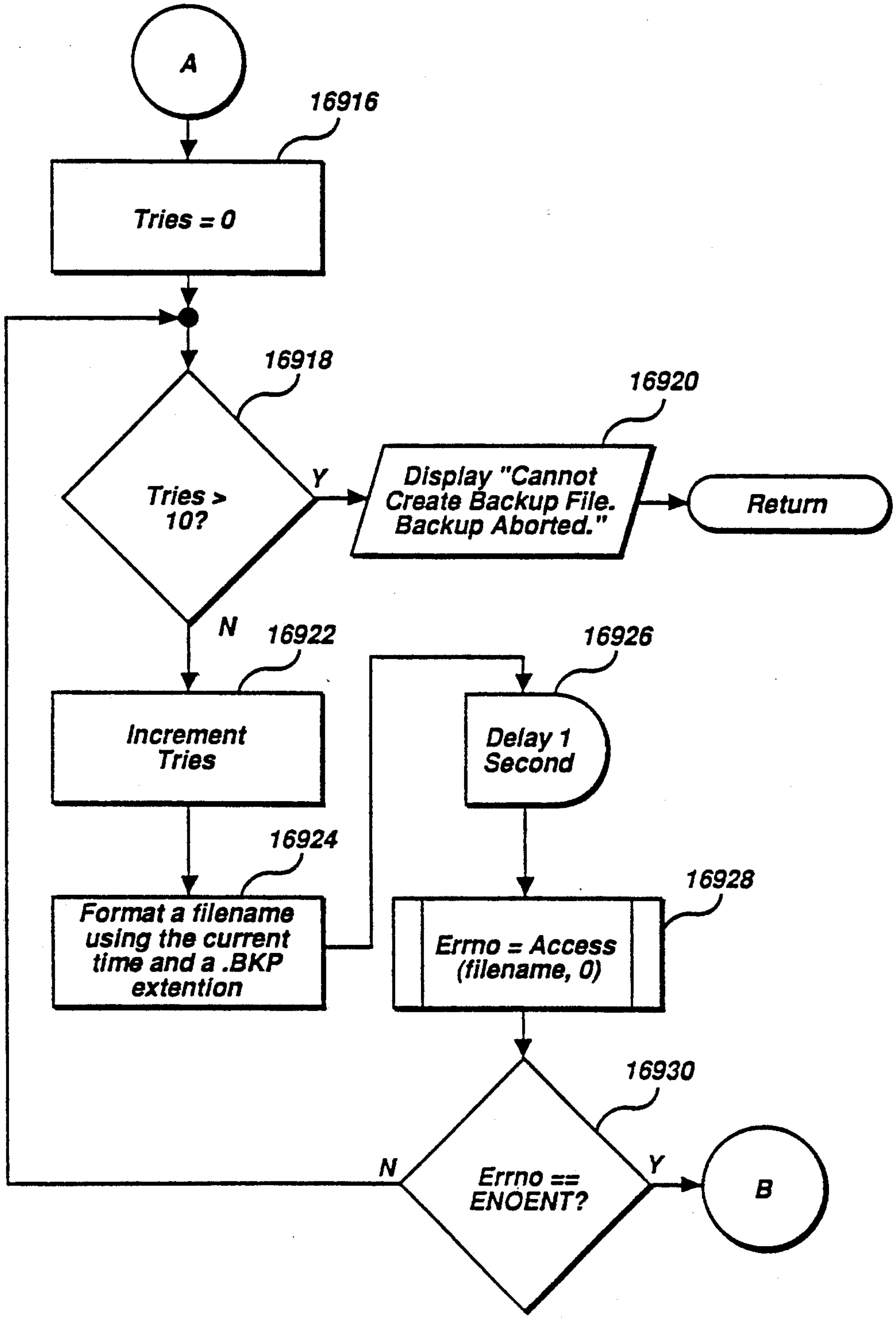

FIG. 169B is a continuation of the flow diagram of FIG. 169A.

Figure 169C:
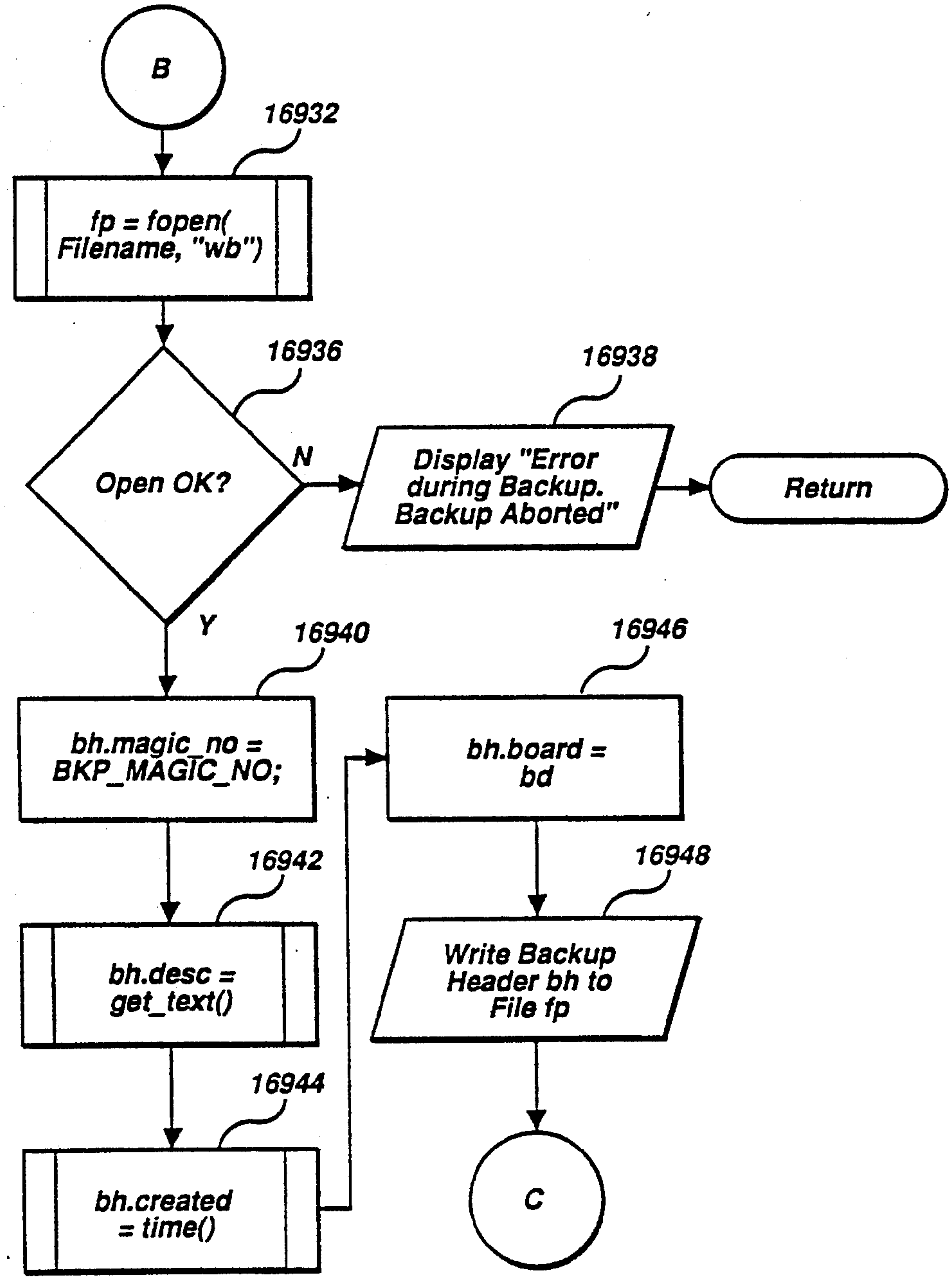

FIG. 169C is a continuation of the flow diagram of FIG. 169B.

Figure 169D:
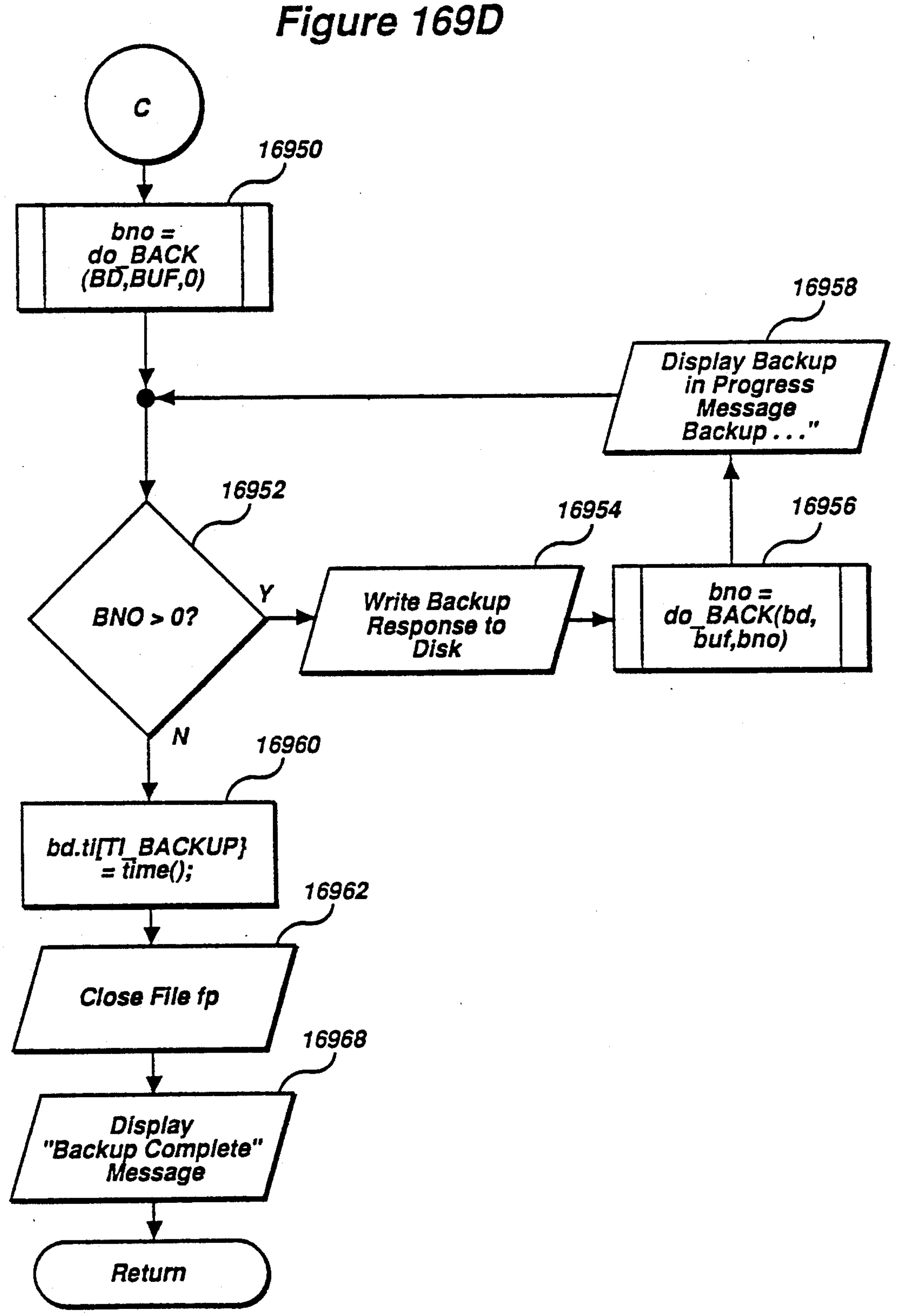

FIG. 169D is a continuation of the flow diagram of FIG. 169C.

Figure 170A:
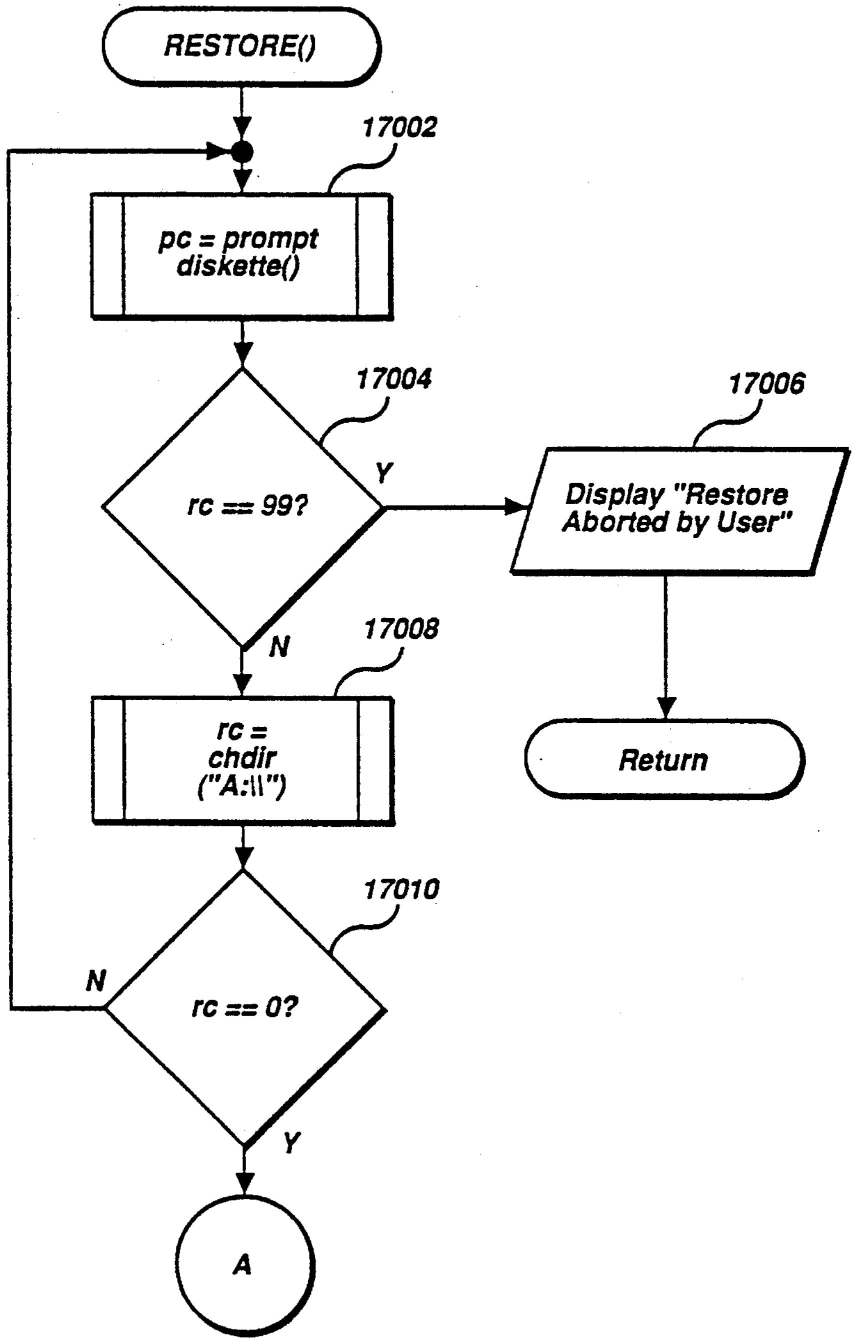

FIG. 170A is a flow diagram of the "RESTORE" subroutine called by the subroutine of FIG. 160A.

Figure 170B:
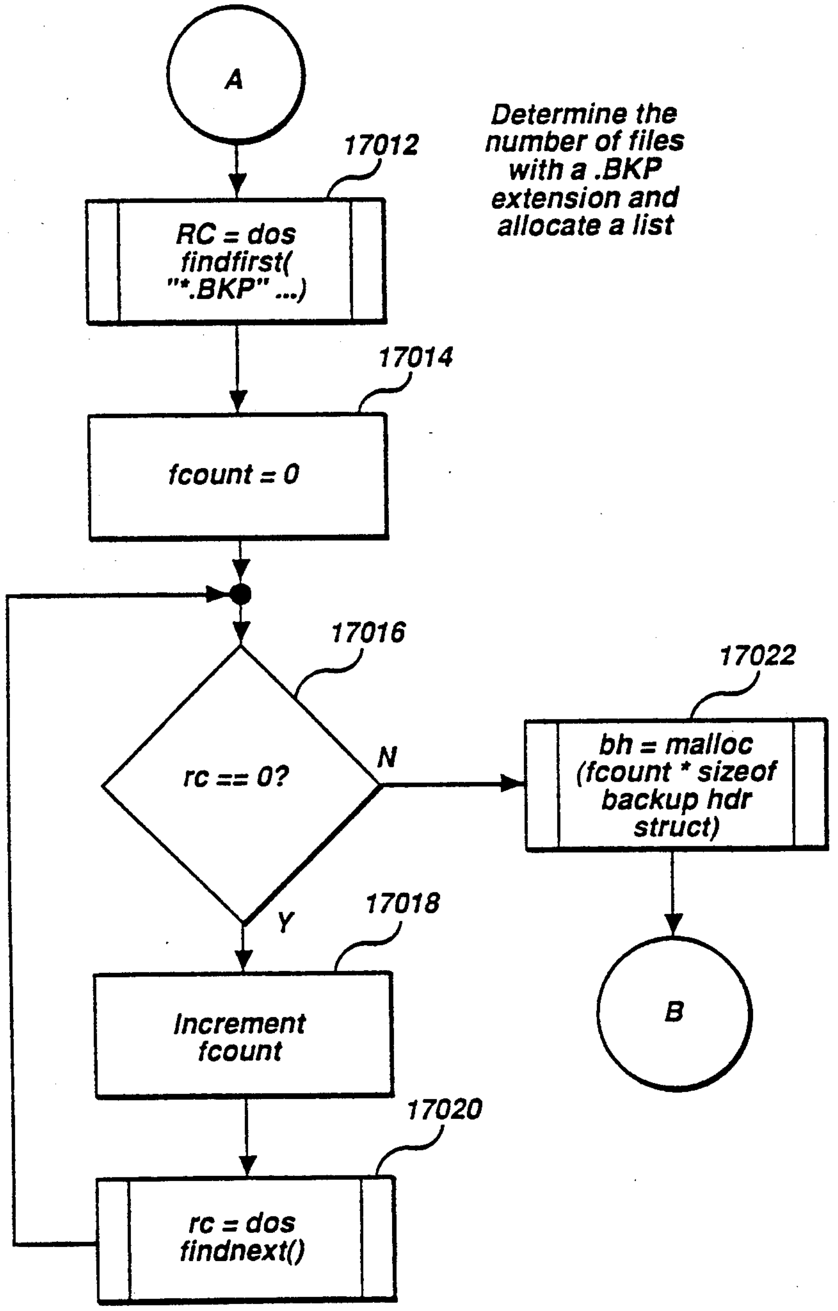

FIG. 170B is a continuation of the flow diagram of FIG. 170A.

Figure 170C:
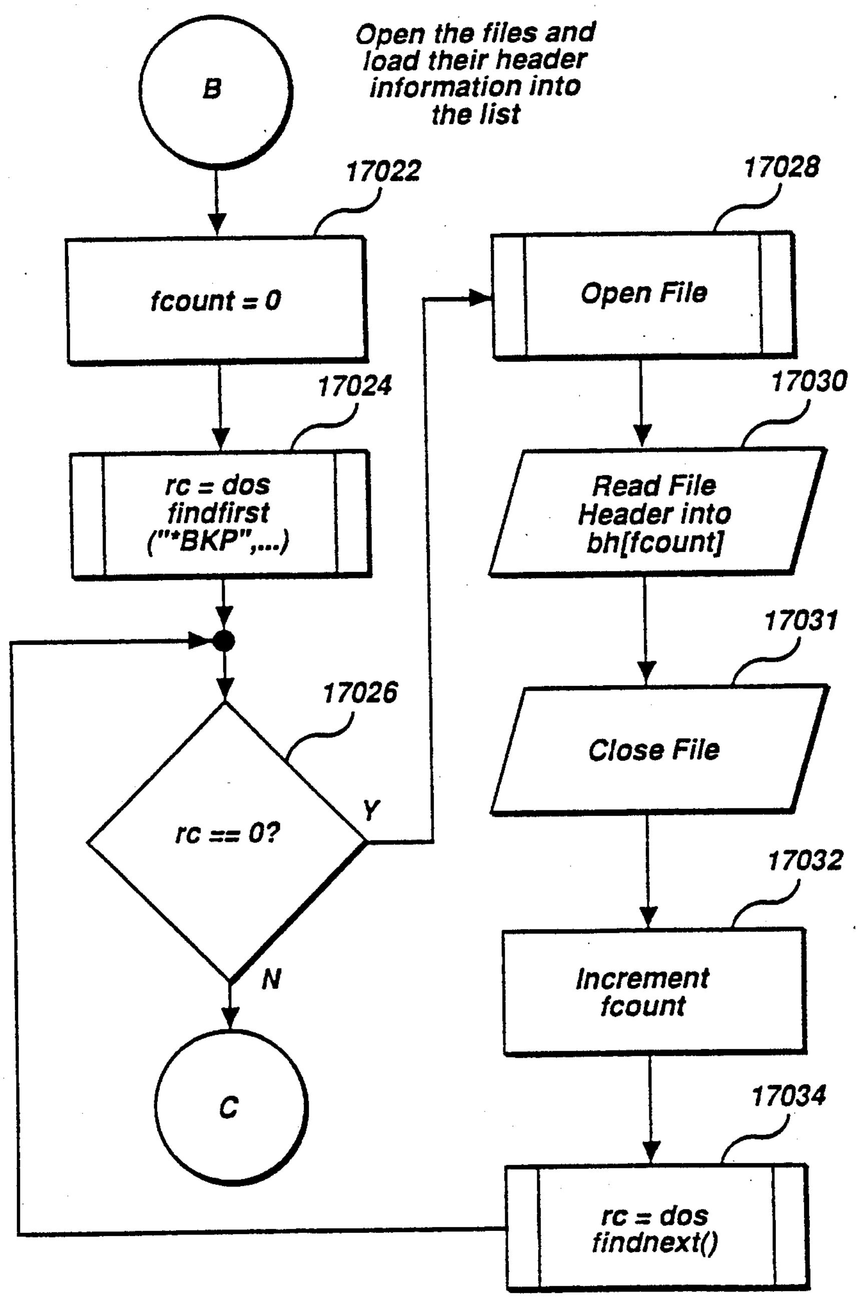

FIG. 170C is a continuation of the flow diagram of FIG. 170B.

Figure 170D:
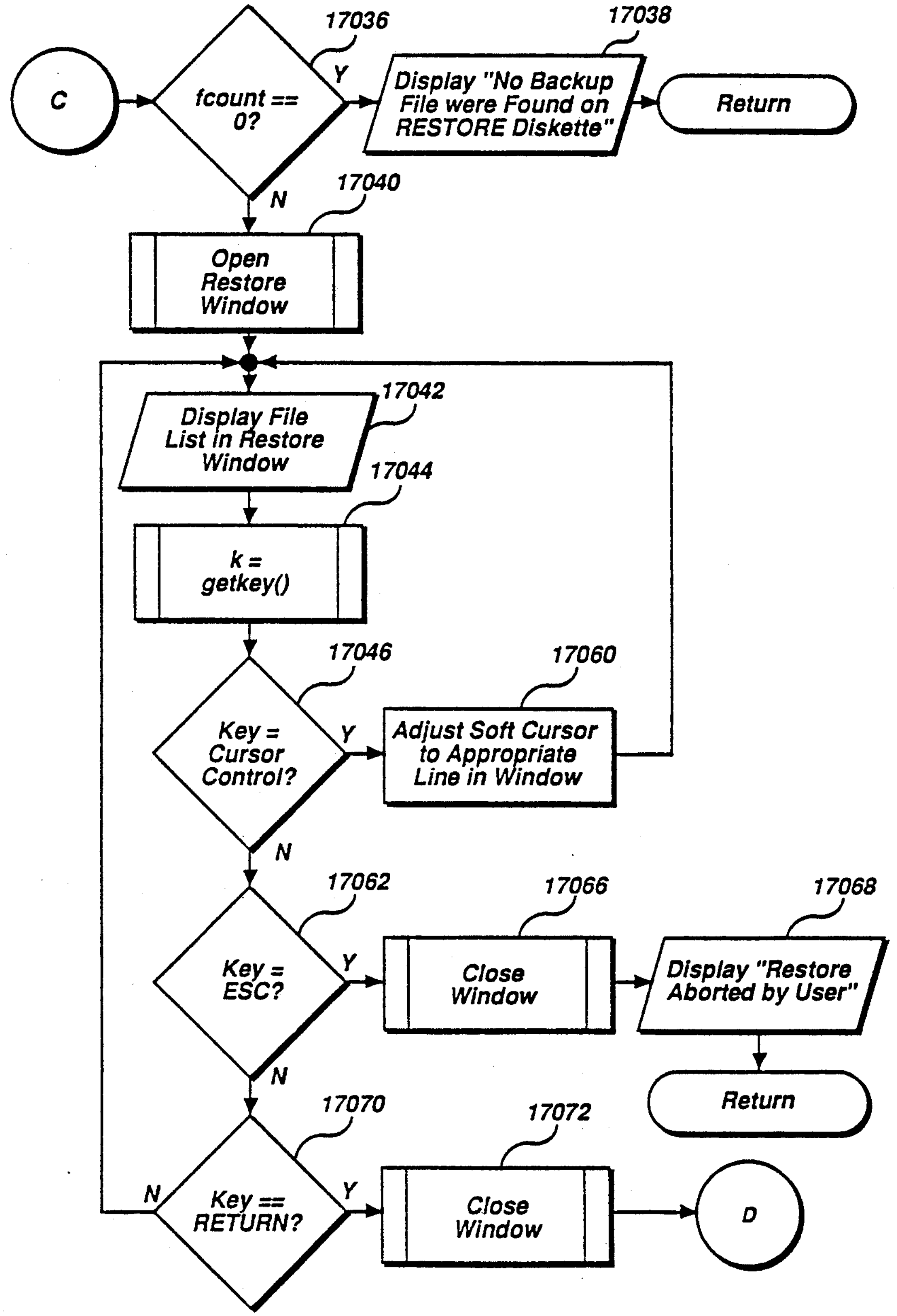

FIG. 170D is a continuation of the flow diagram of FIG. 170C.

Figure 170E:
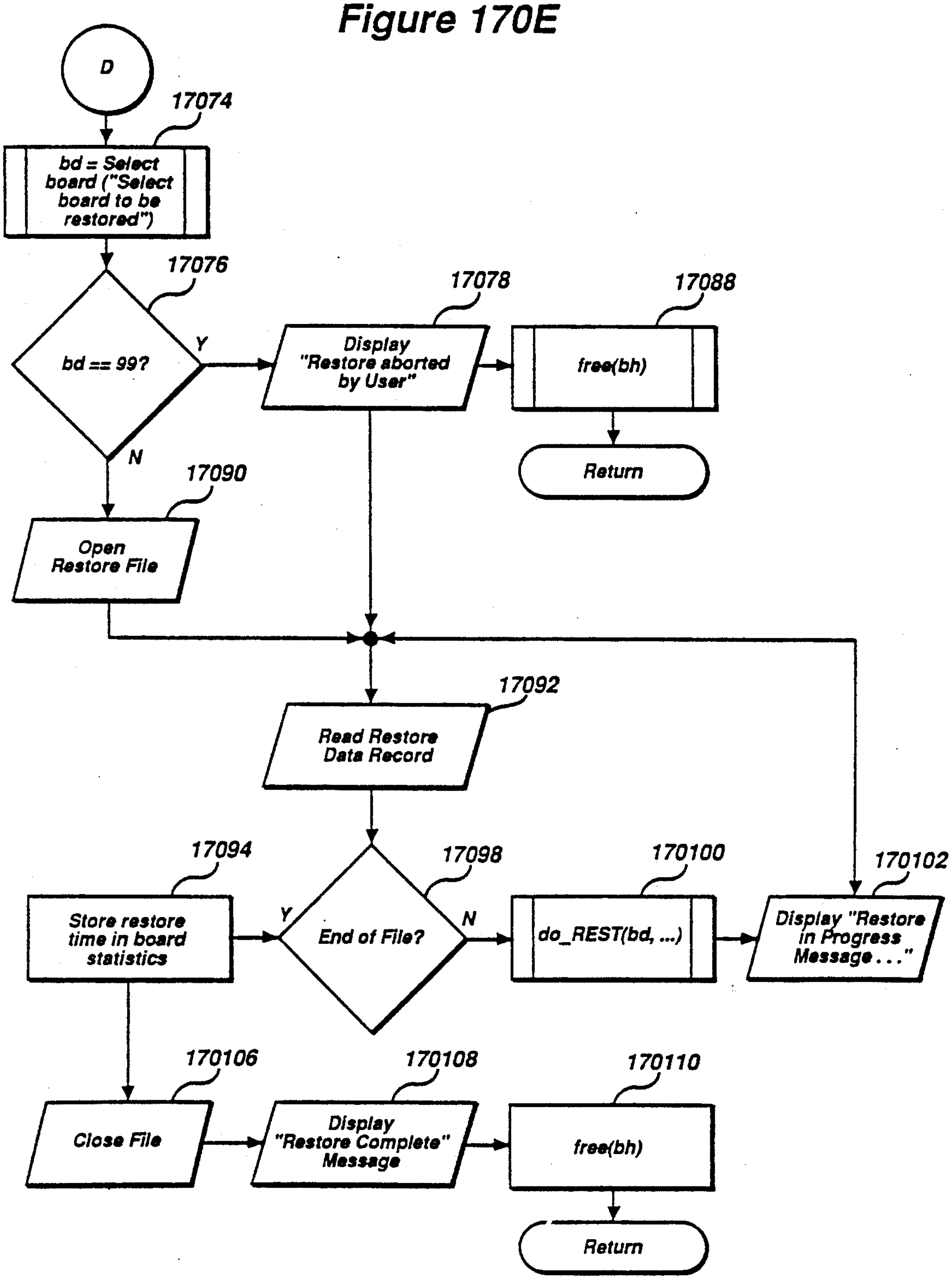

FIG. 170E is a continuation of the flow diagram of FIG. 170D.

Figure 171:
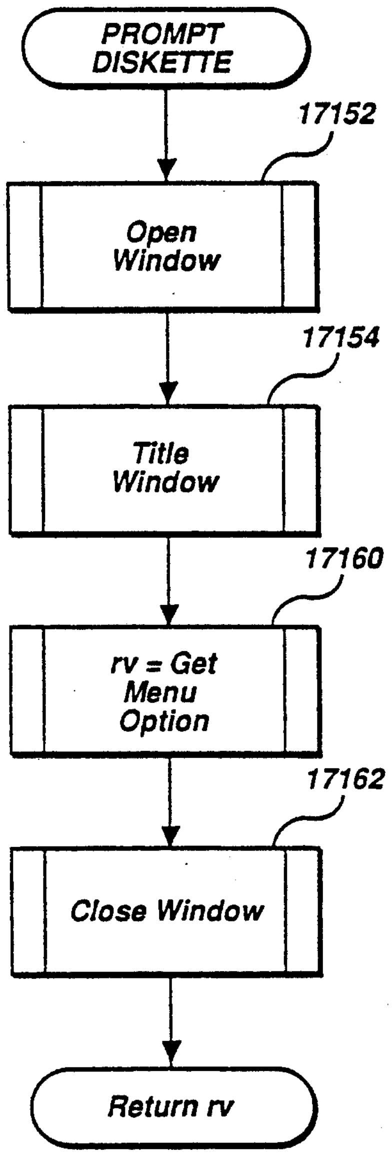

FIG. 171 is a flow diagram of the "PROMPT_DISKETTE" subroutine called by the subroutines of FIGS. 169A and 170A.

Figure 172:
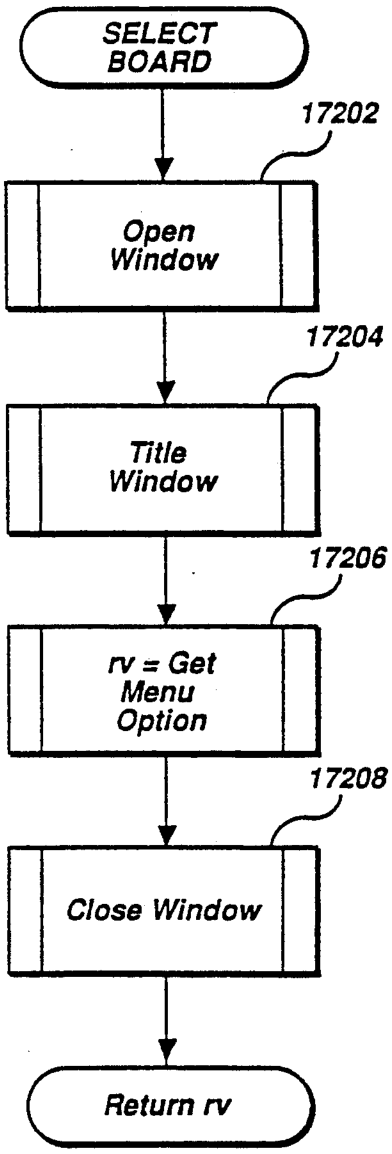

FIG. 172 is a flow diagram of the "SELECT_BOARD" subroutine called by the subroutines of FIGS. 169A and 170E.

Figure 173:
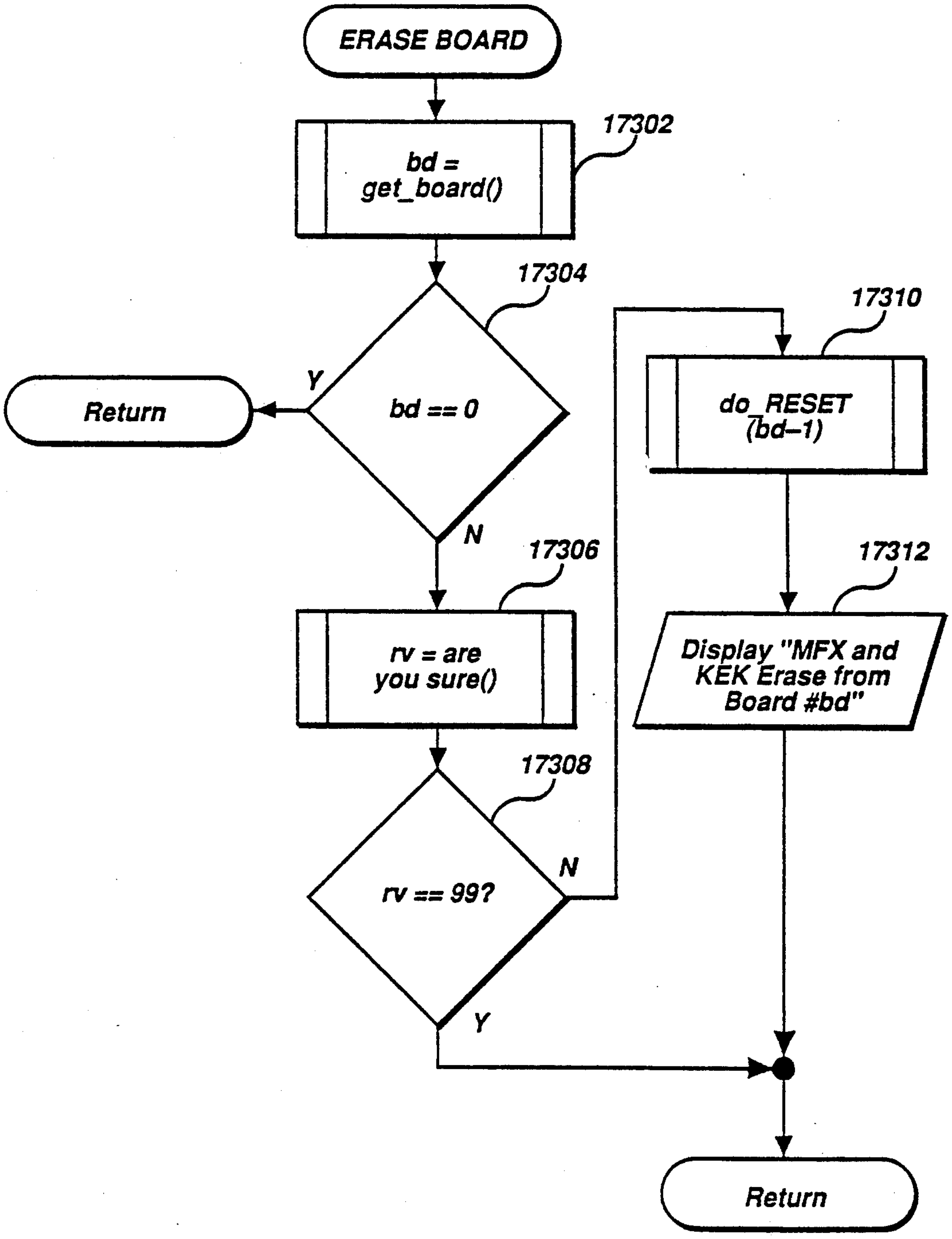

FIG. 173 is a flow diagram of the "ERASE_BOARD" subroutine called by the subroutine of FIG. 168.

Figure 174:
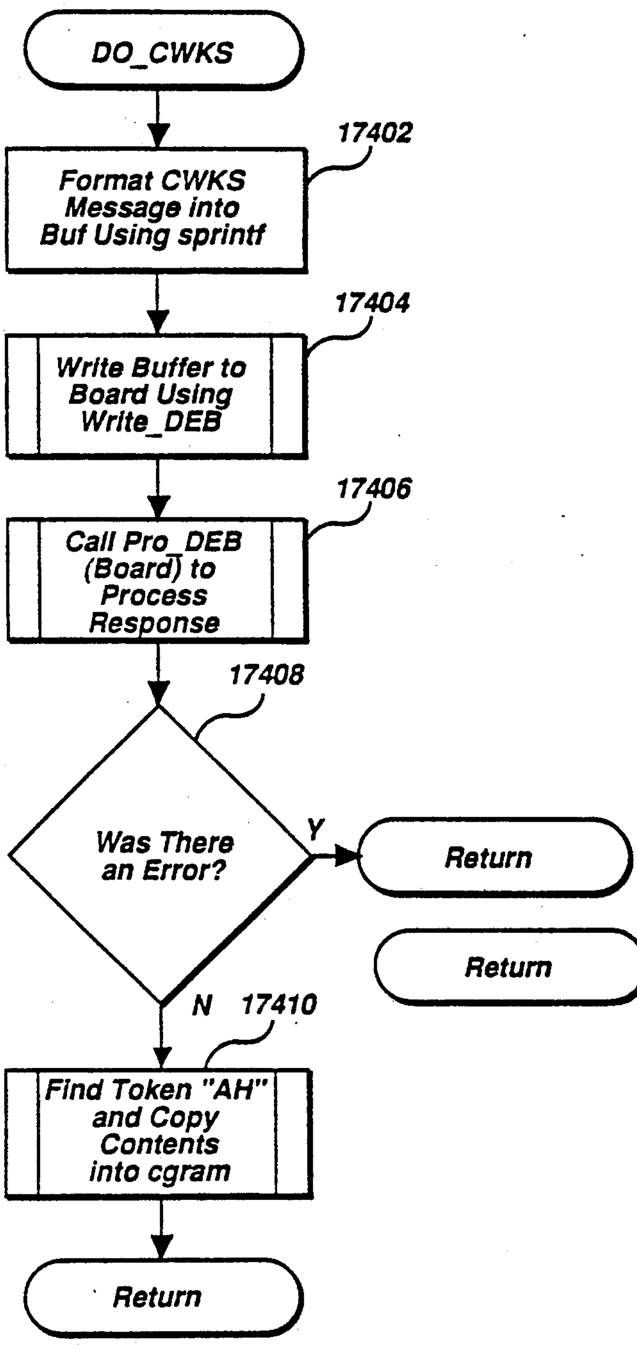

FIG. 174 is a flow diagram of the "DO_CWKS" subroutine called by various subroutines of the invention.

Figure 175:
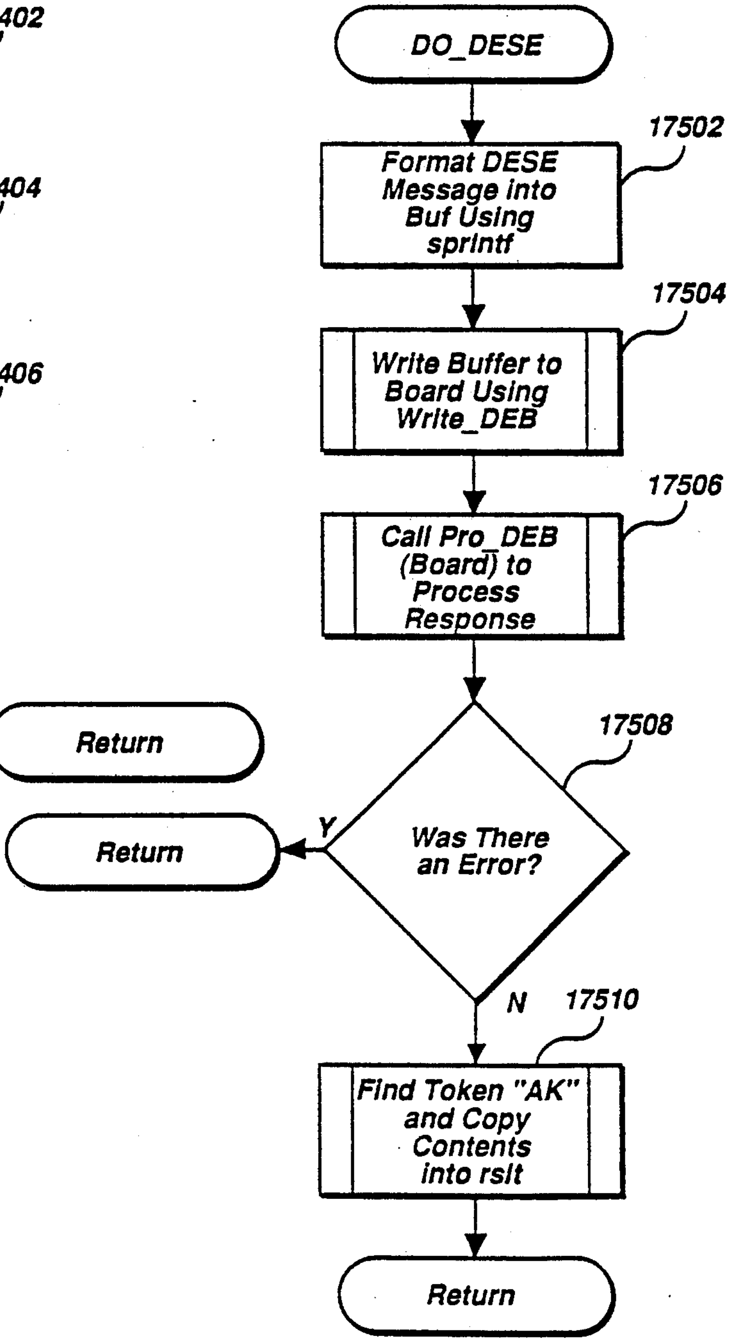

FIG. 175 is a flow diagram of the "DO_DESE" subroutine called by various subroutines of the present invention.

Figure 176:
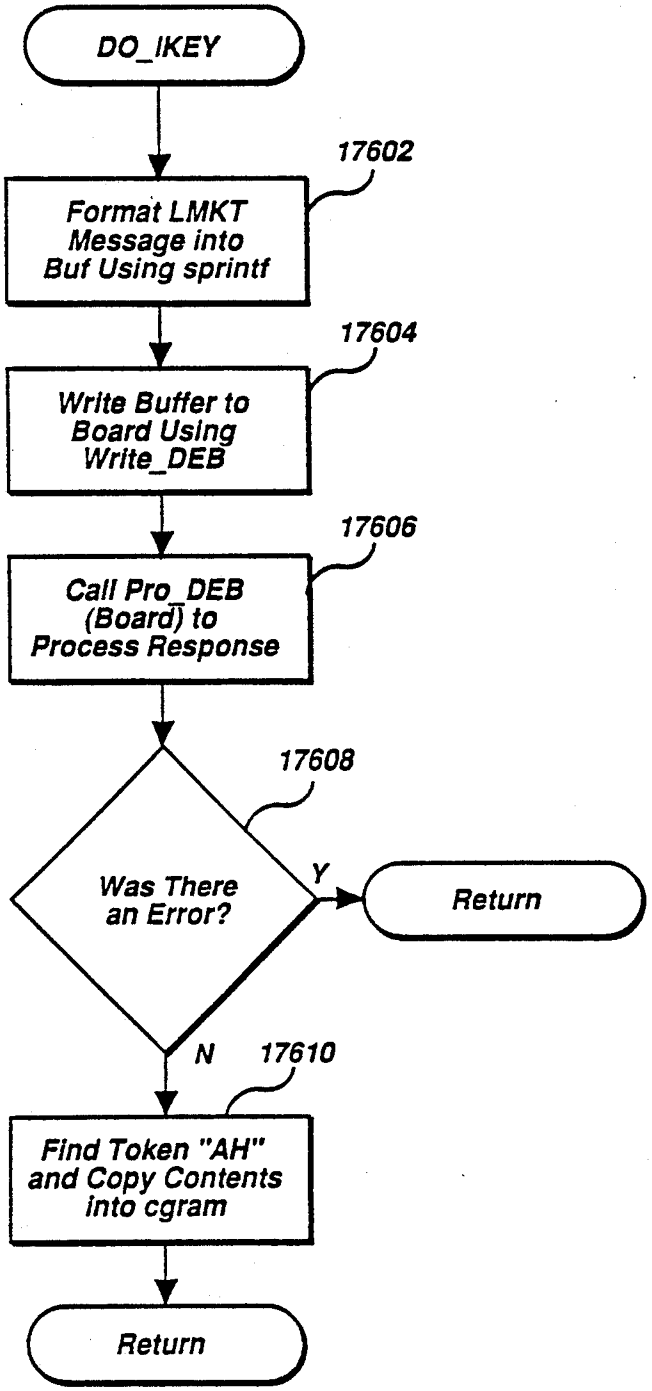

FIG. 176 is a flow diagram of the "DO_IKEY" called by various subroutines of the present invention.

Figure 177:
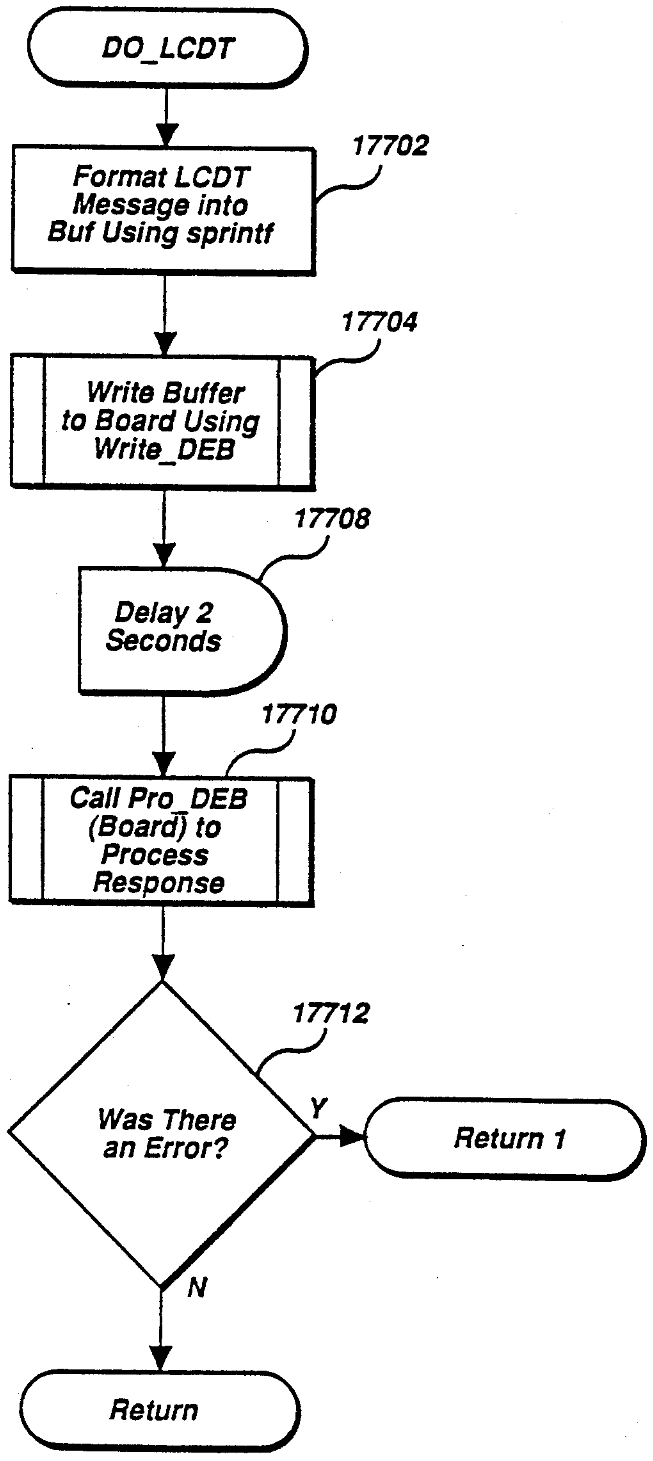

FIG. 177 is a flow diagram of the "DO_LCDT" subroutine called by various subroutines of the present invention.

Figure 178:
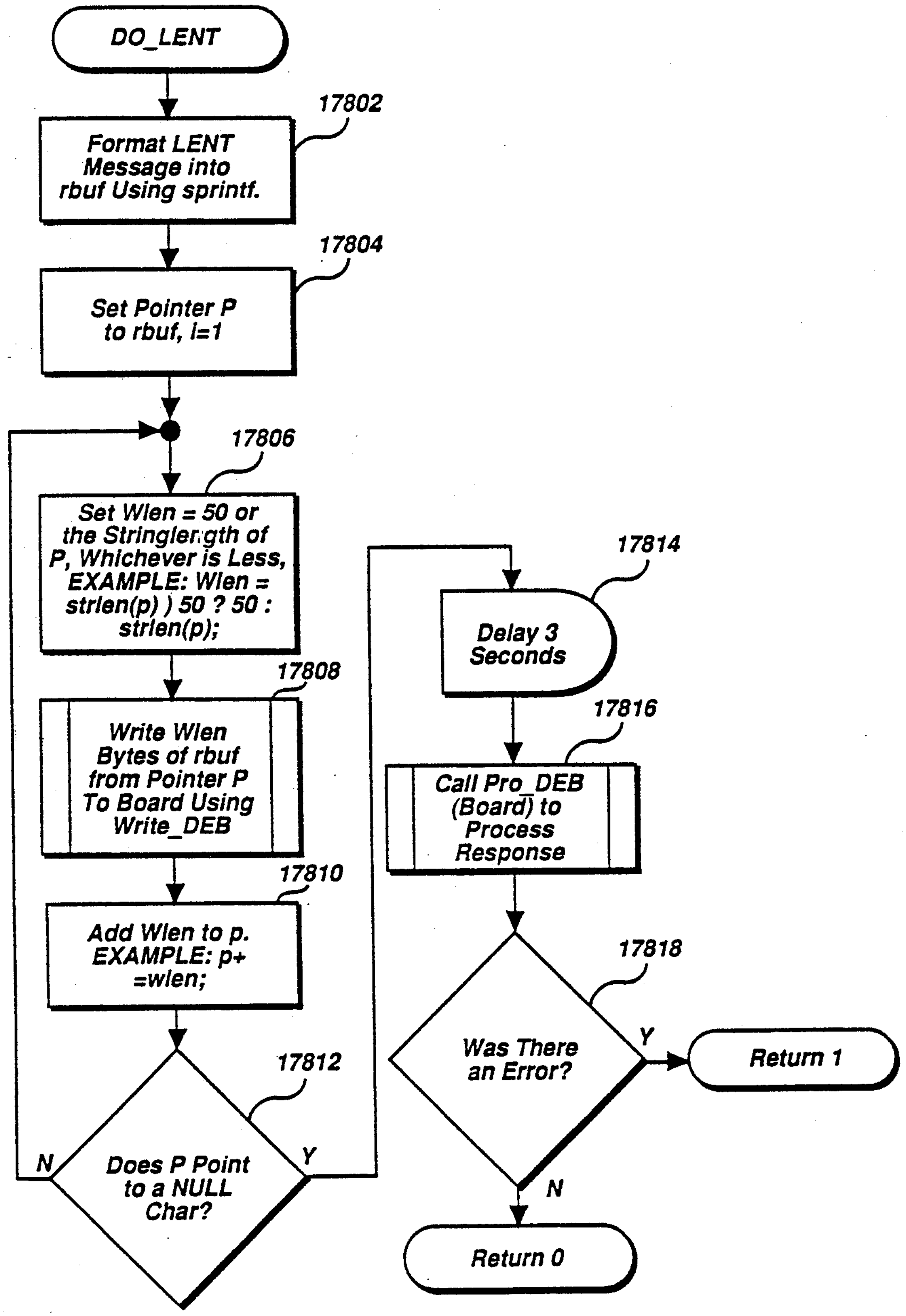

FIG. 178 is a flow diagram of the "DO_LENT" subroutine called by various subroutines of the present invention.

Figure 179:
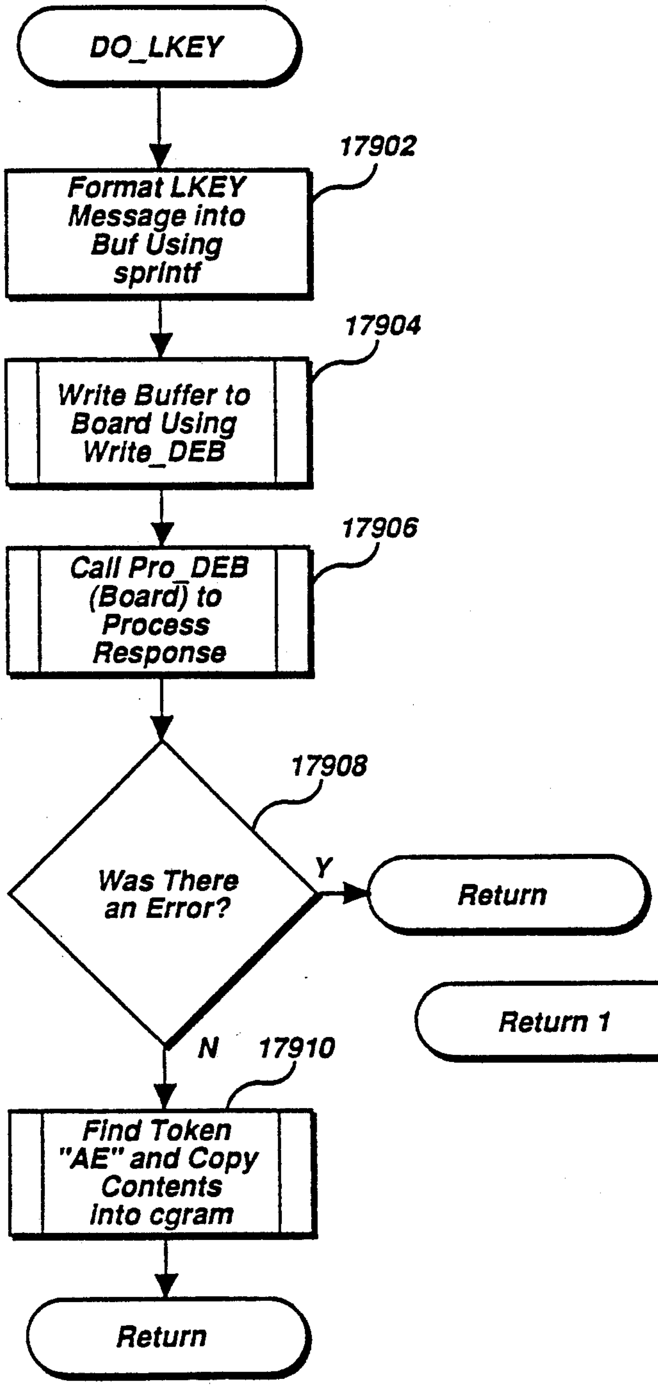

FIG. 179 is a flow diagram of the "DO_LKEY" subroutine called by various subroutines of the present invention.

Figure 180:
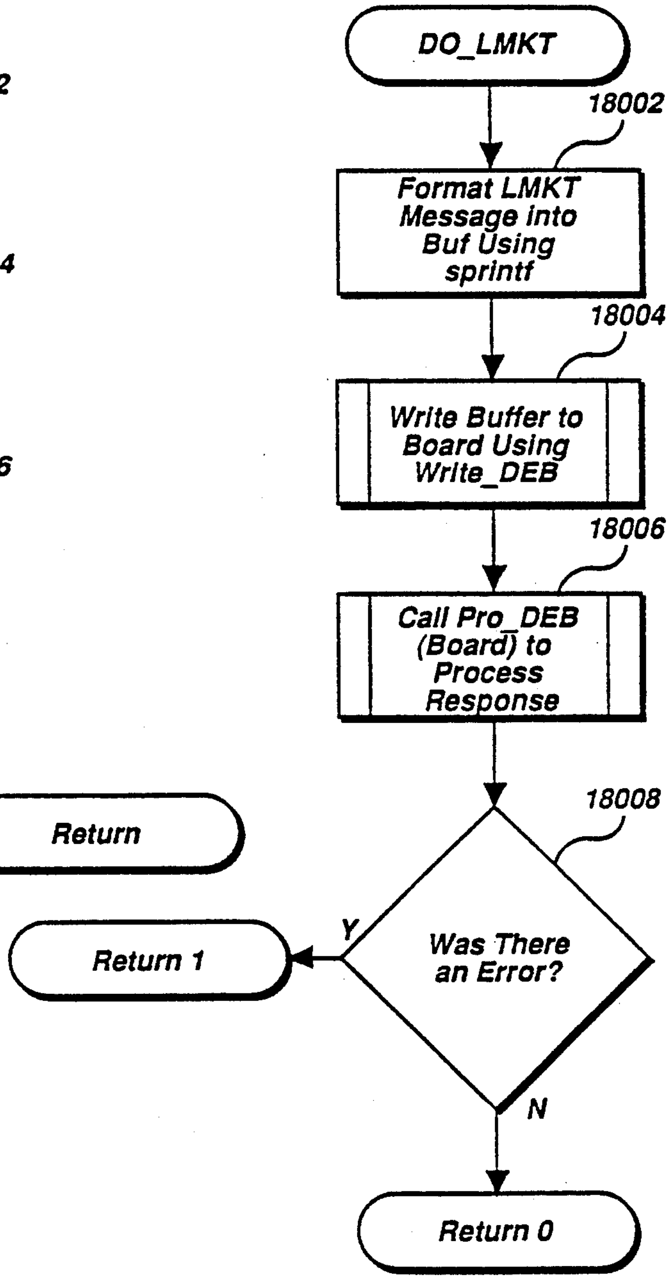

FIG. 180 is a flow diagram of the "DO_LMKT" subroutine called by various subroutines of the present invention.

Figure 181:
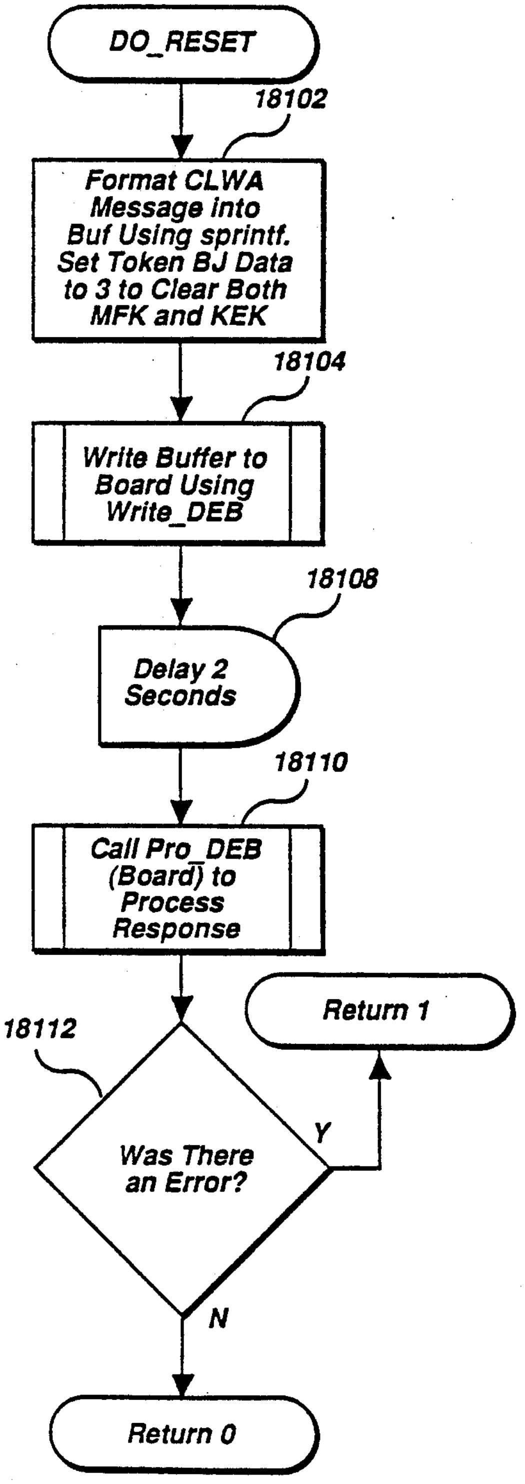

FIG. 181 is a flow diagram of the "DO_RESET" subroutine called by various subroutines of the present invention.

Figure 182:
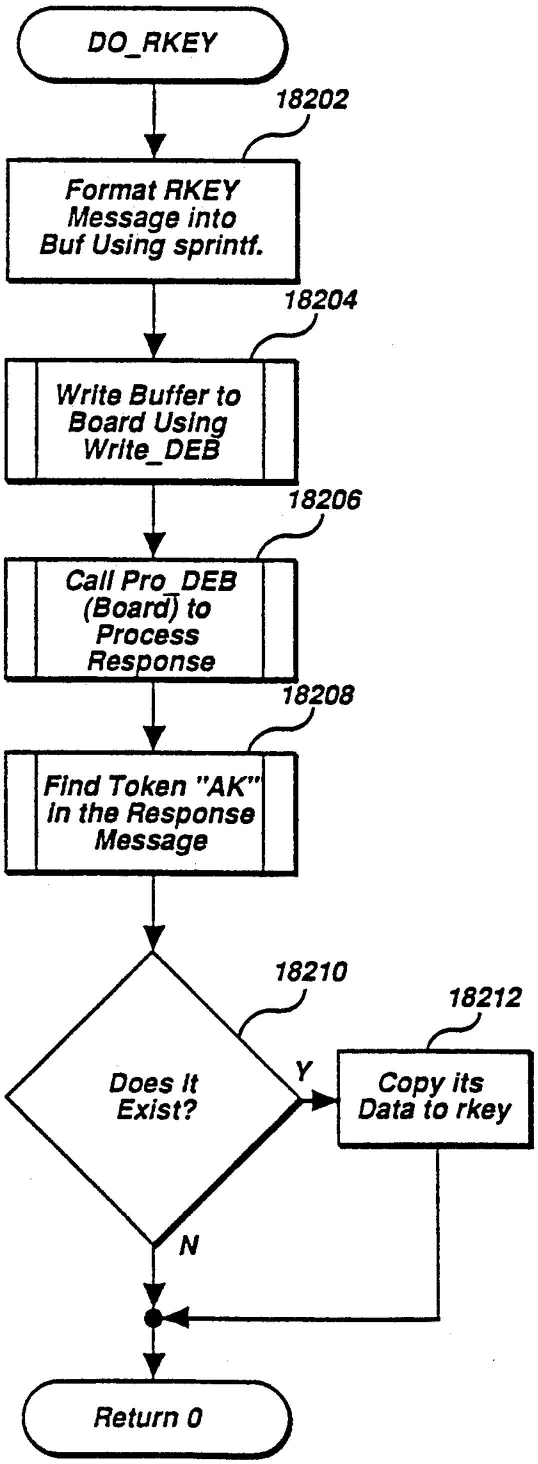

FIG. 182 is a flow diagram of the "DO_RKEY" subroutine called by various subroutines of the present invention.

Figure 183:
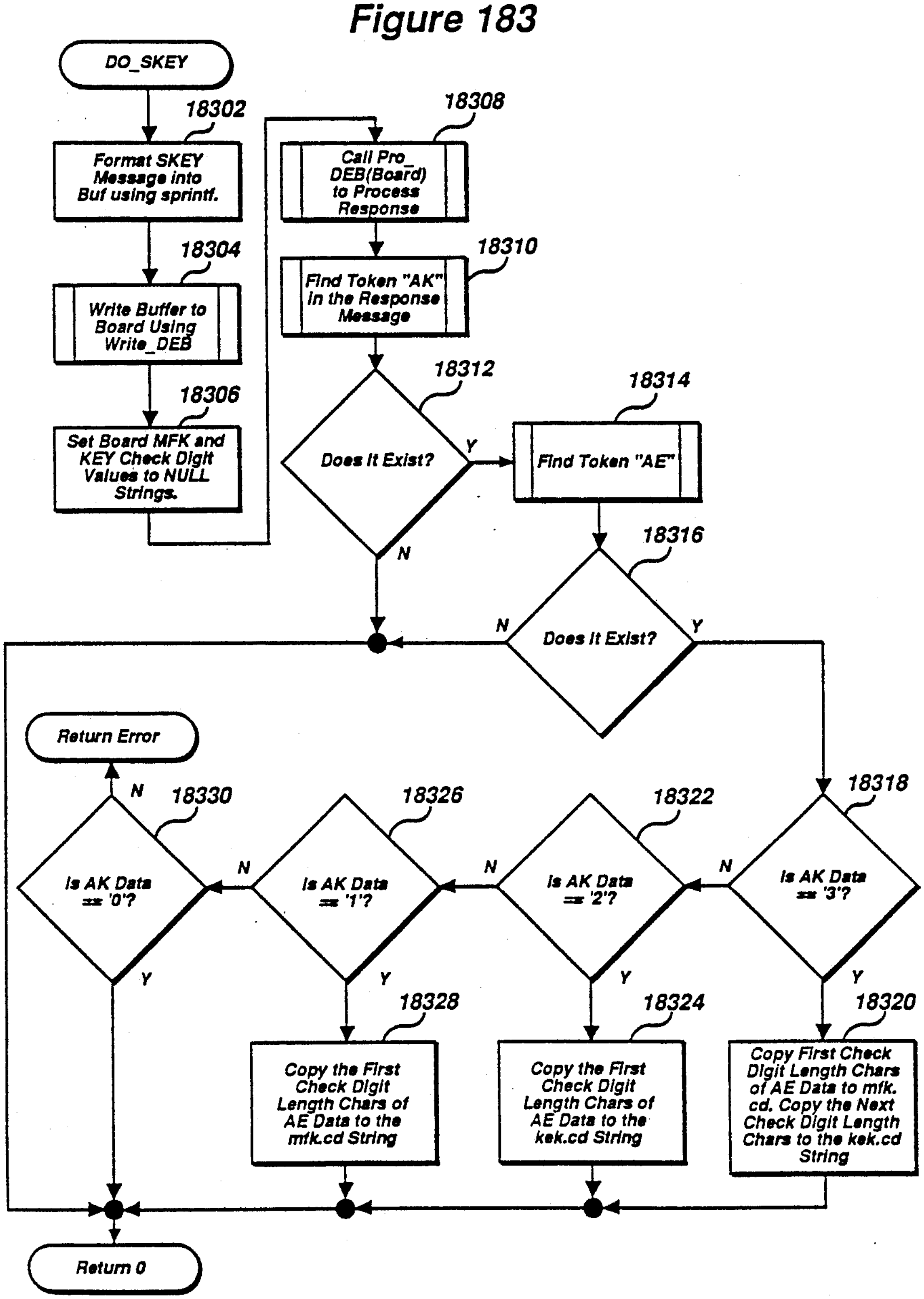

FIG. 183 is a flow diagram of the "DO_SKEY" subroutine called by various subroutines of the present invention.

Figure 184A:
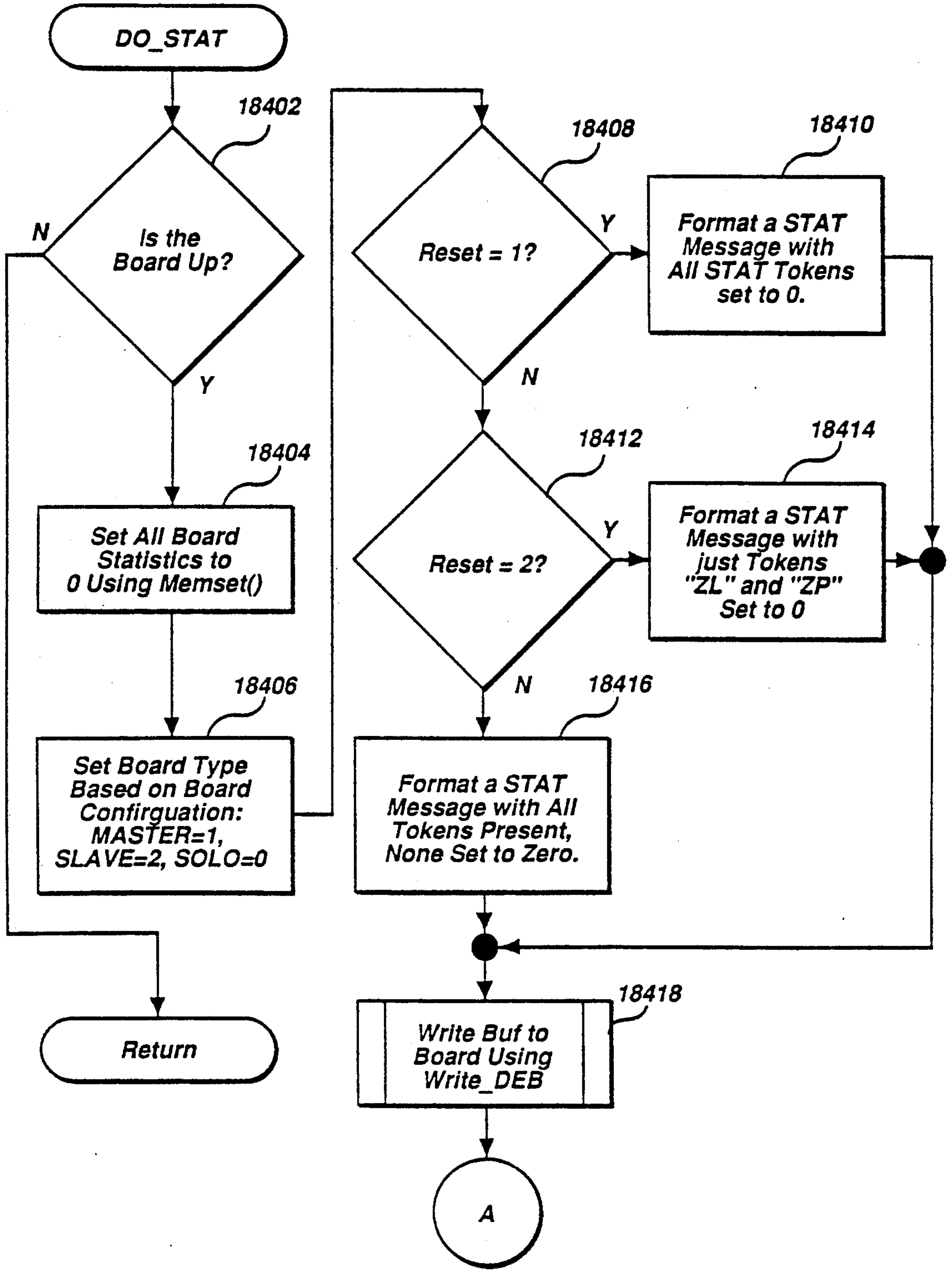

FIG. 184A is a flow diagram of the "DO_STAT" subroutine called by various subroutines of the present invention.

Figure 184B:
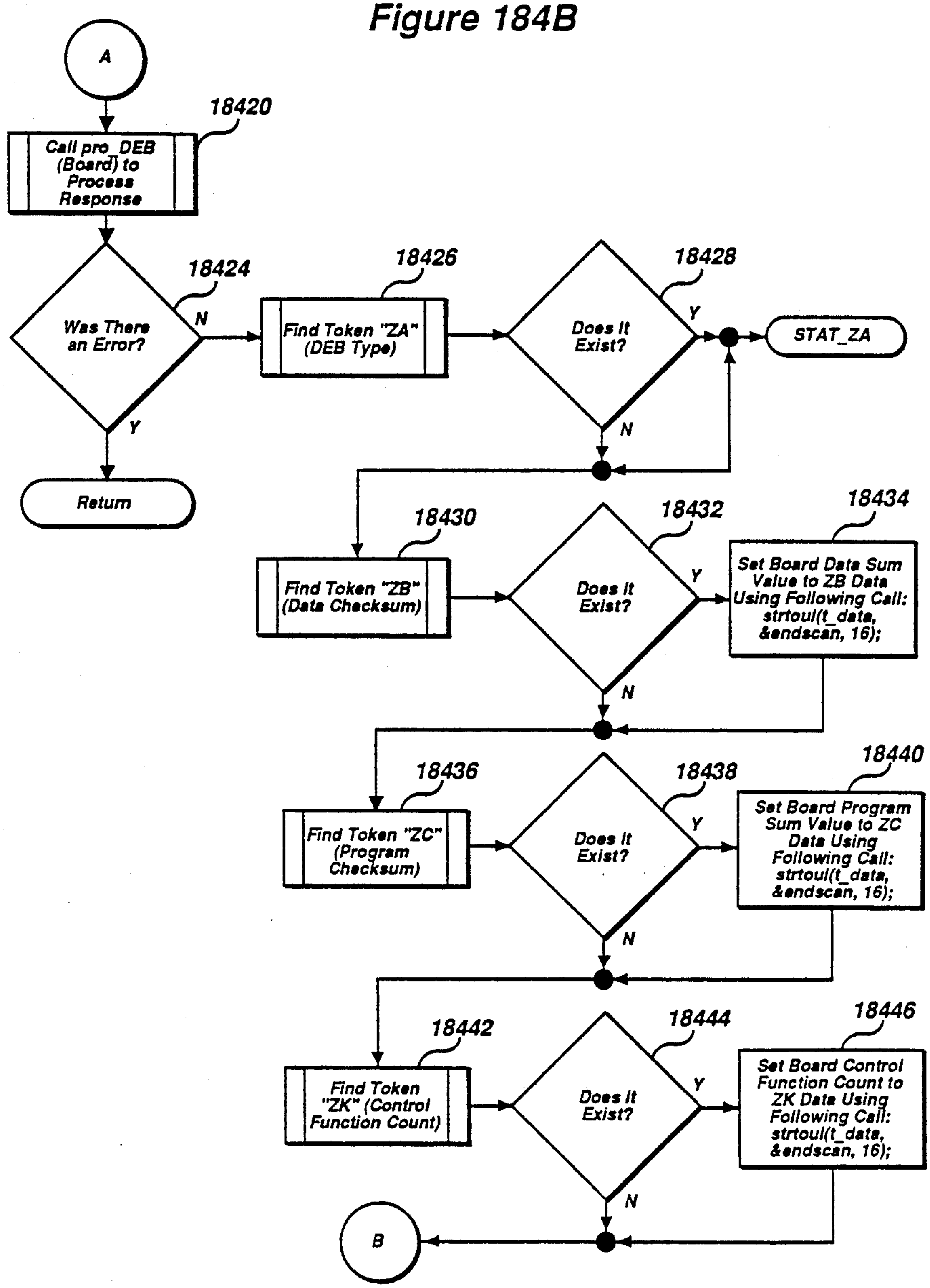

FIG. 184B is a continuation of the subroutine of FIG. 184A.

Figure 184C:
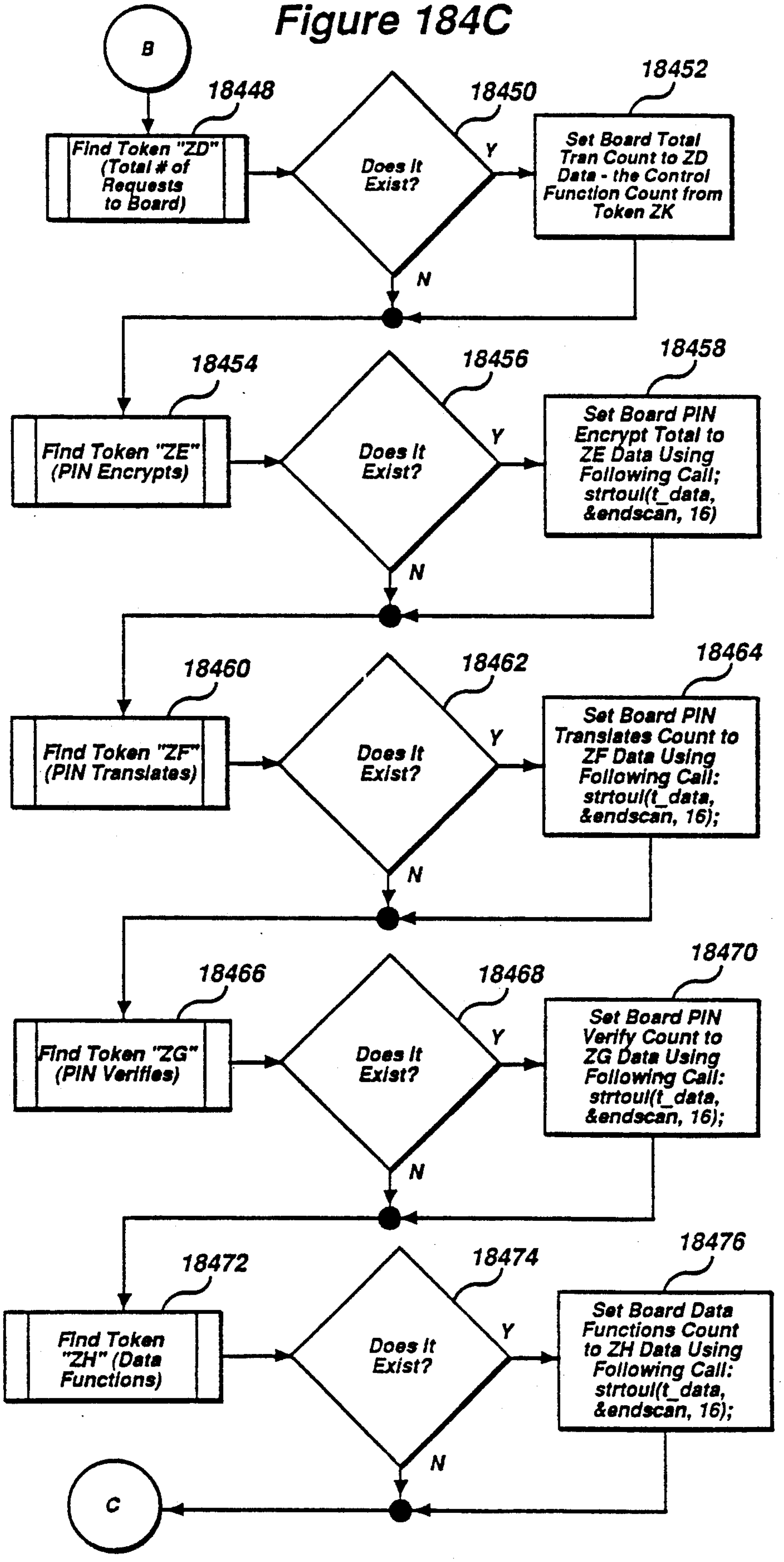

FIG. 184C is a continuation of the subroutine of the flow diagram of FIG. 184B.

Figure 184D:
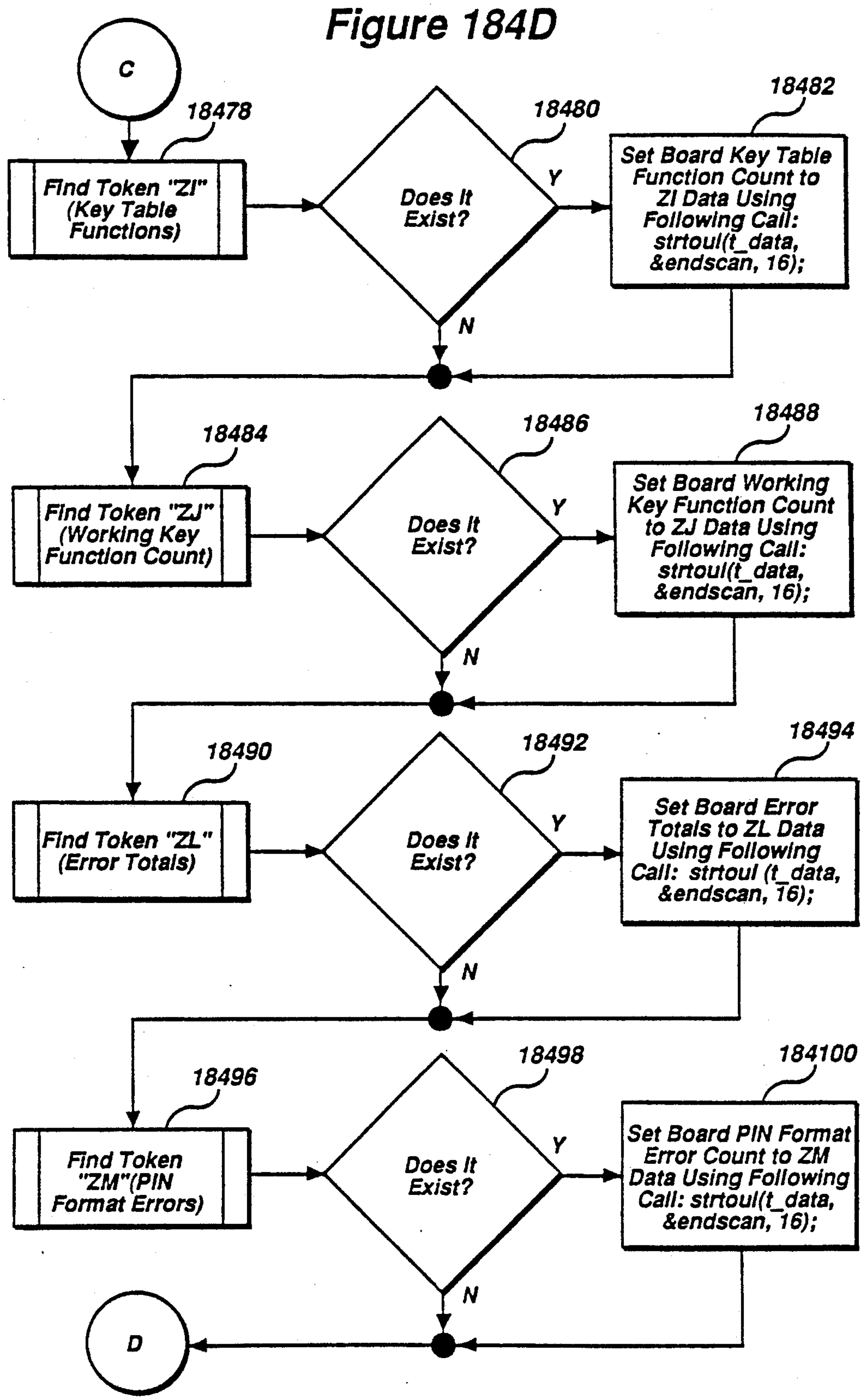

FIG. 184D is a continuation of the flow diagram of FIG. 184C.

Figure 184E:
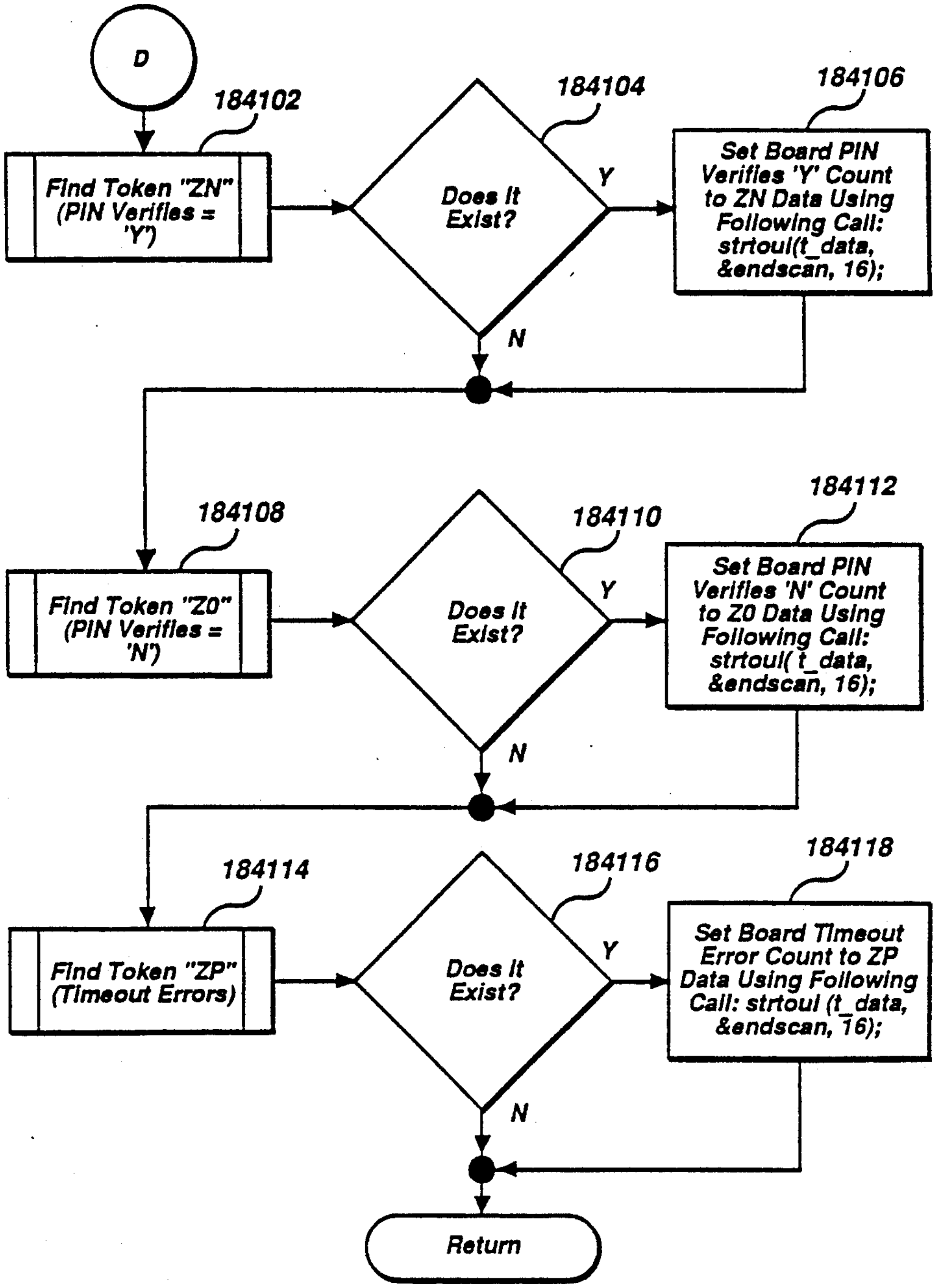

FIG. 184E is a continuation of the flow diagram FIG. 184D.

Figure 184F:
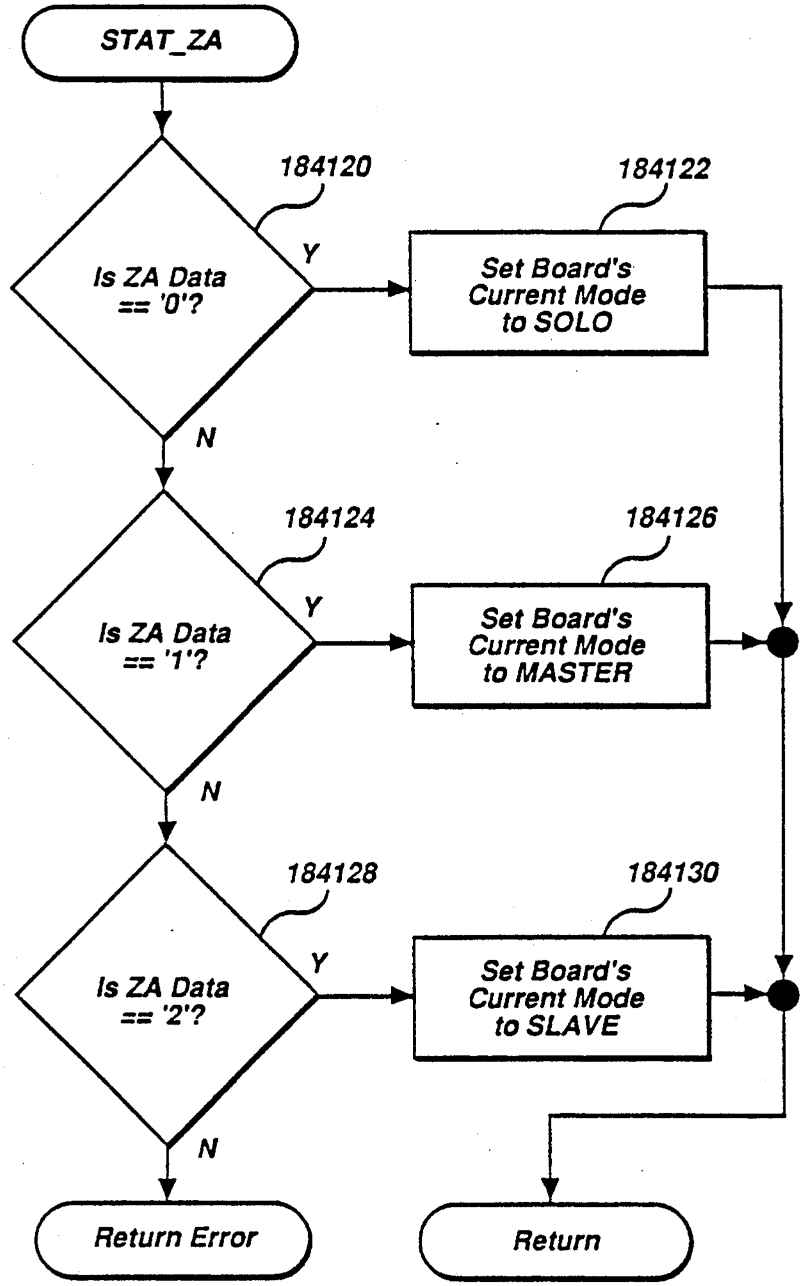

FIG. 184F is a continuation of the flow diagram of FIG. 184D.

Figure 185:
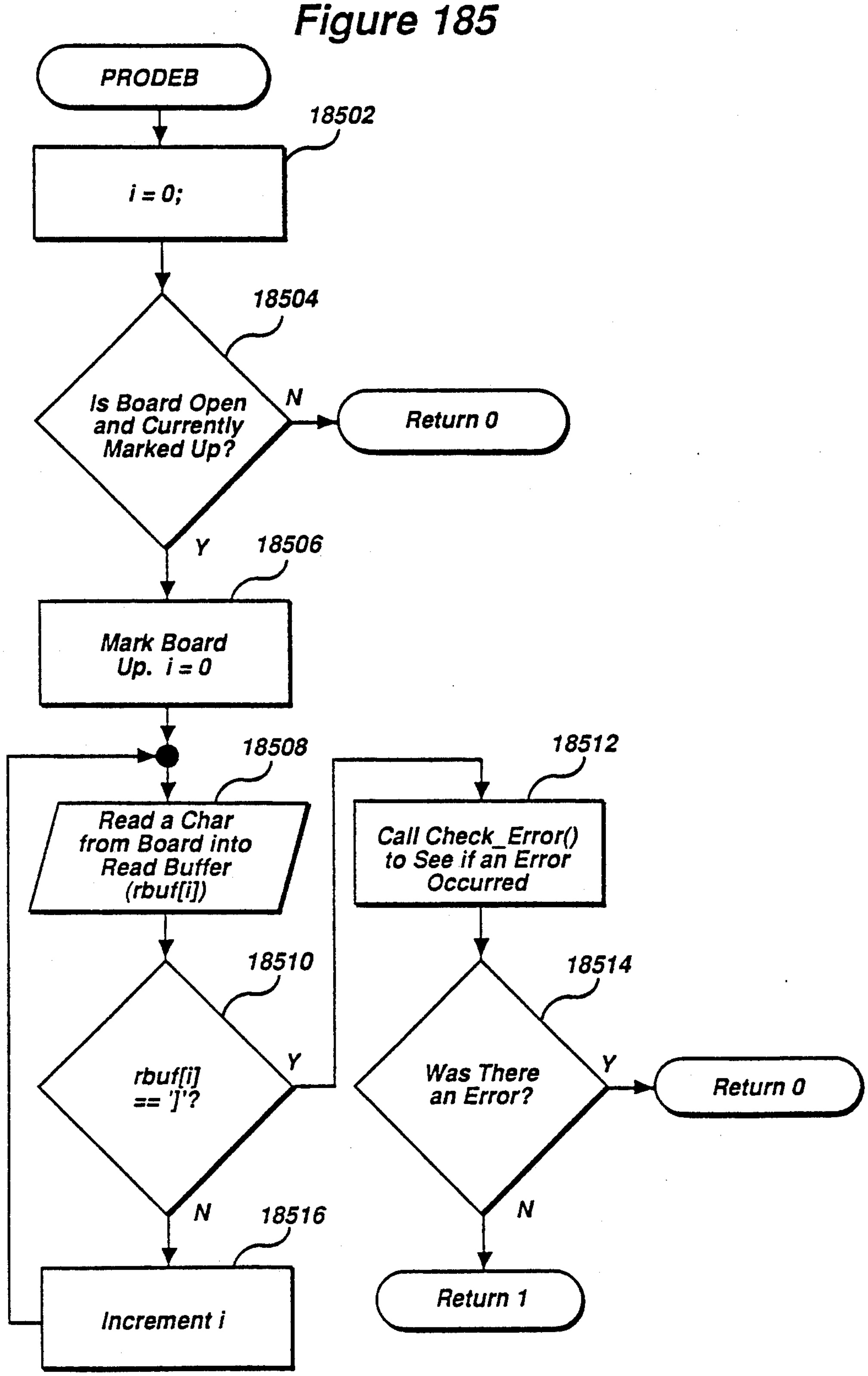

FIG. 185 is a flow diagram of the "PRO_DEB" subroutine called by various subroutines of the present invention.

Figure 186:
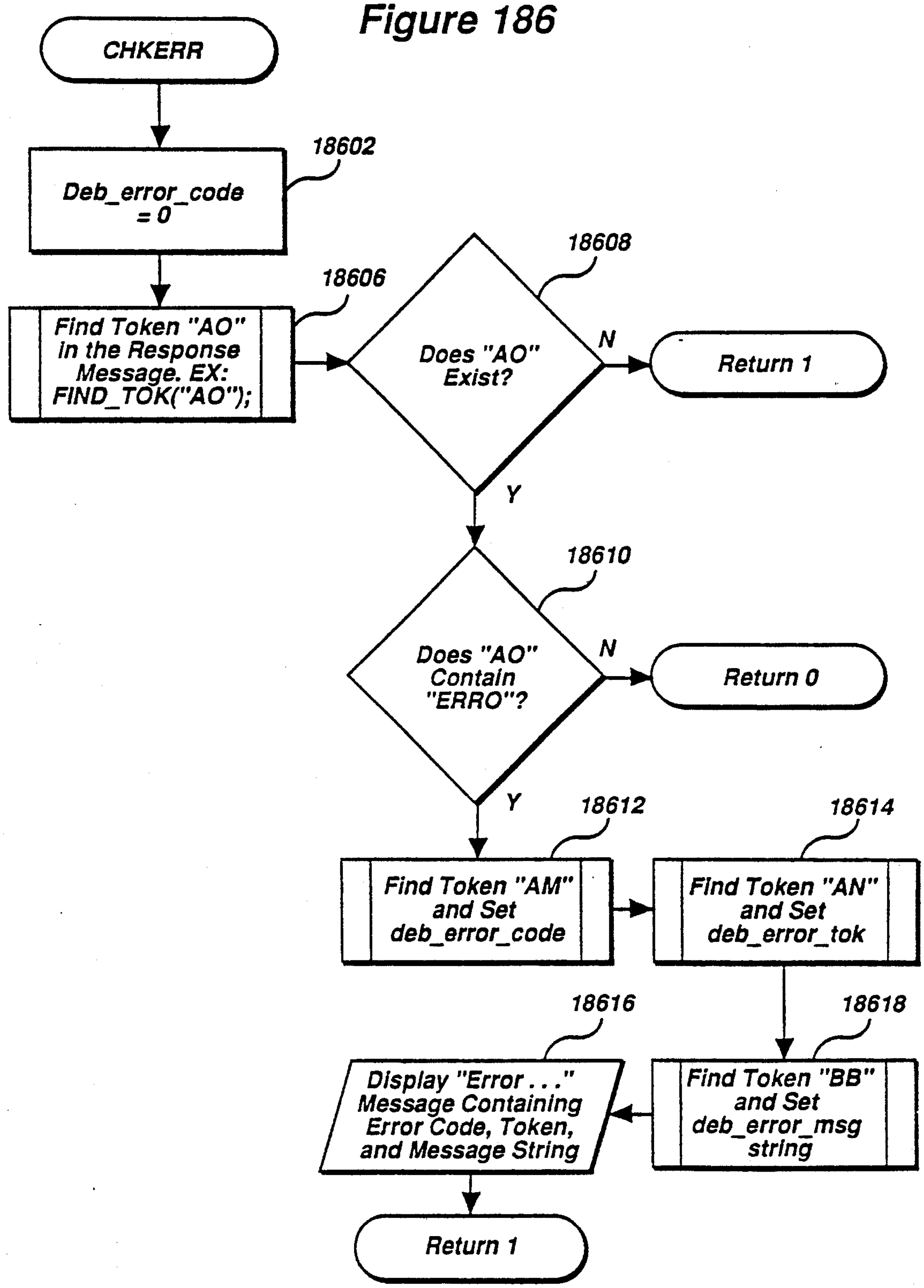

FIG. 186 is a flow diagram of the "CHKERR" subroutine called by the subroutine of FIG. 185.

Figure 187A:
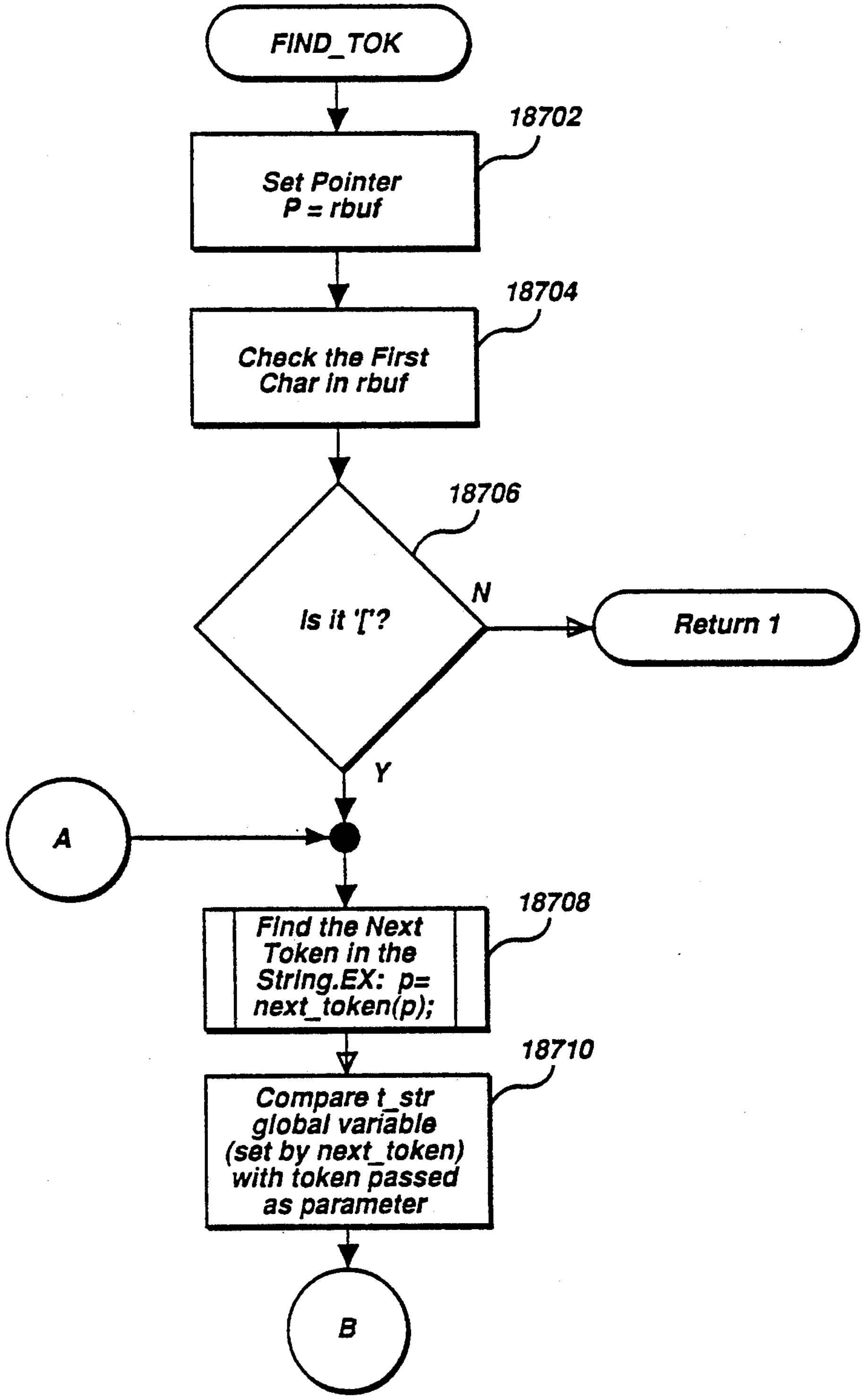
Figure 187B:
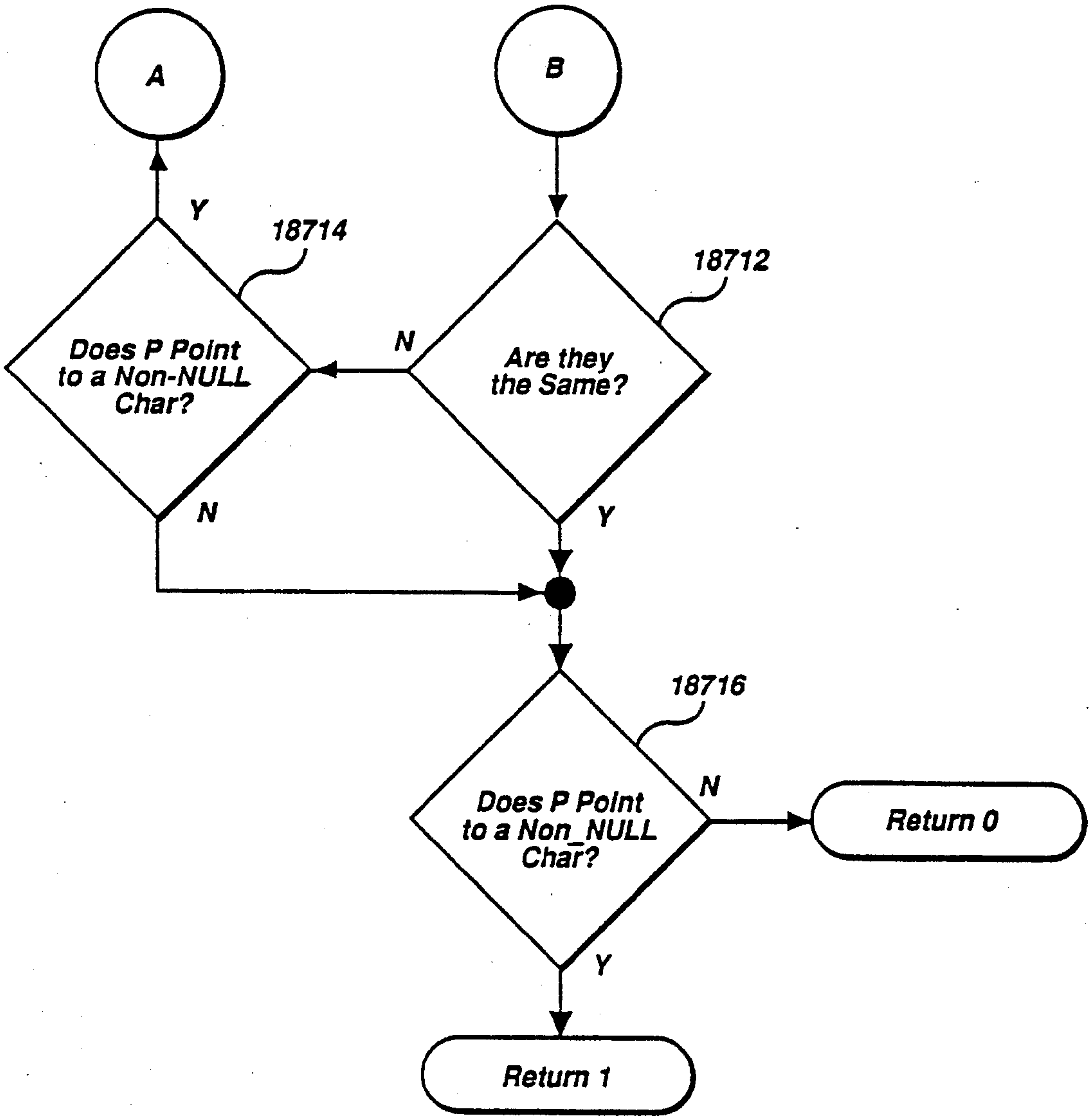

FIG. 187 is a flow diagram of the "FIND_TOK" subroutine called by the various subroutines of the present invention.

Figure 188:
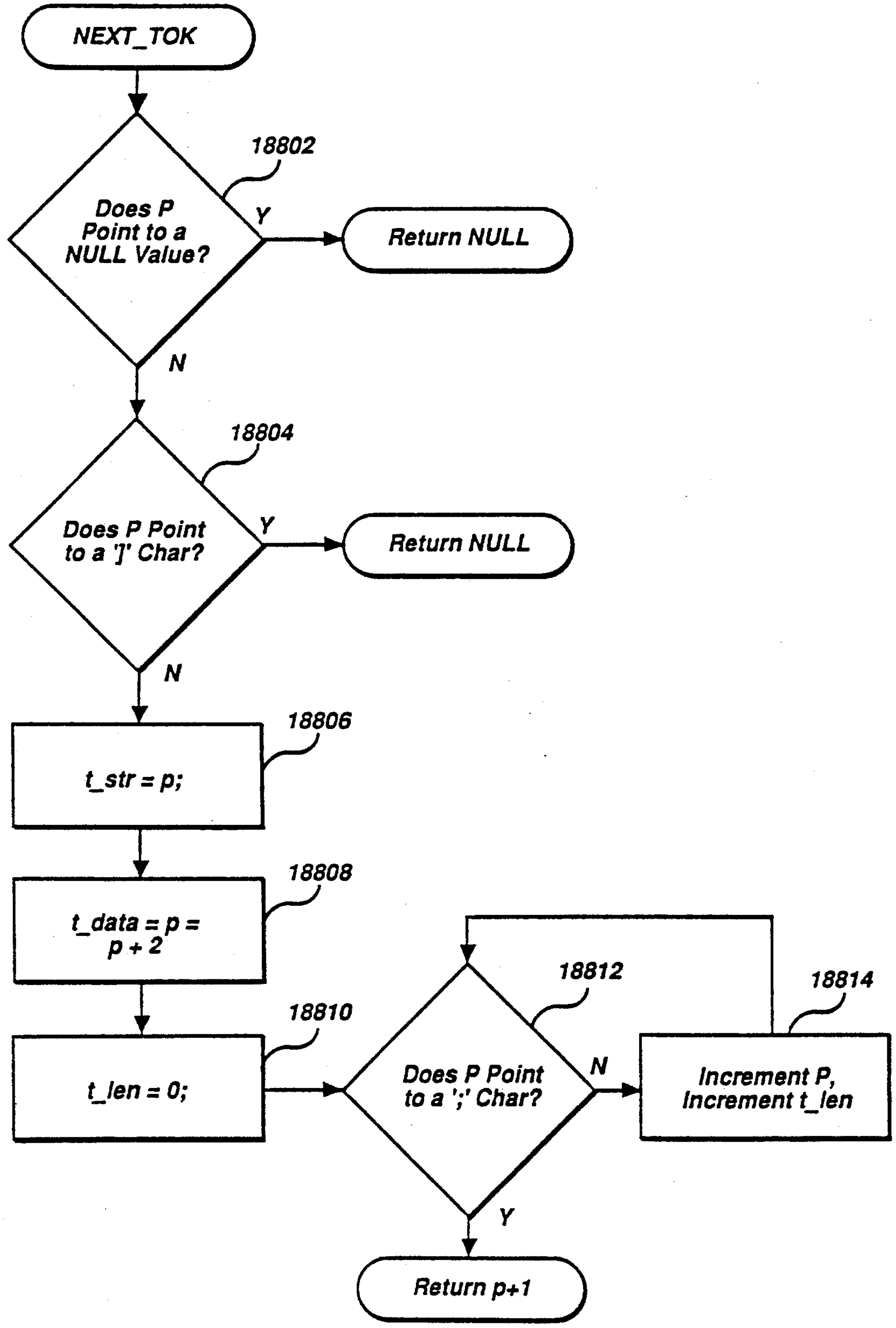

FIG. 188 is a flow diagram of the "NEXT_TOK" subroutine called by the subroutine of FIG. 187.

Figure 189:
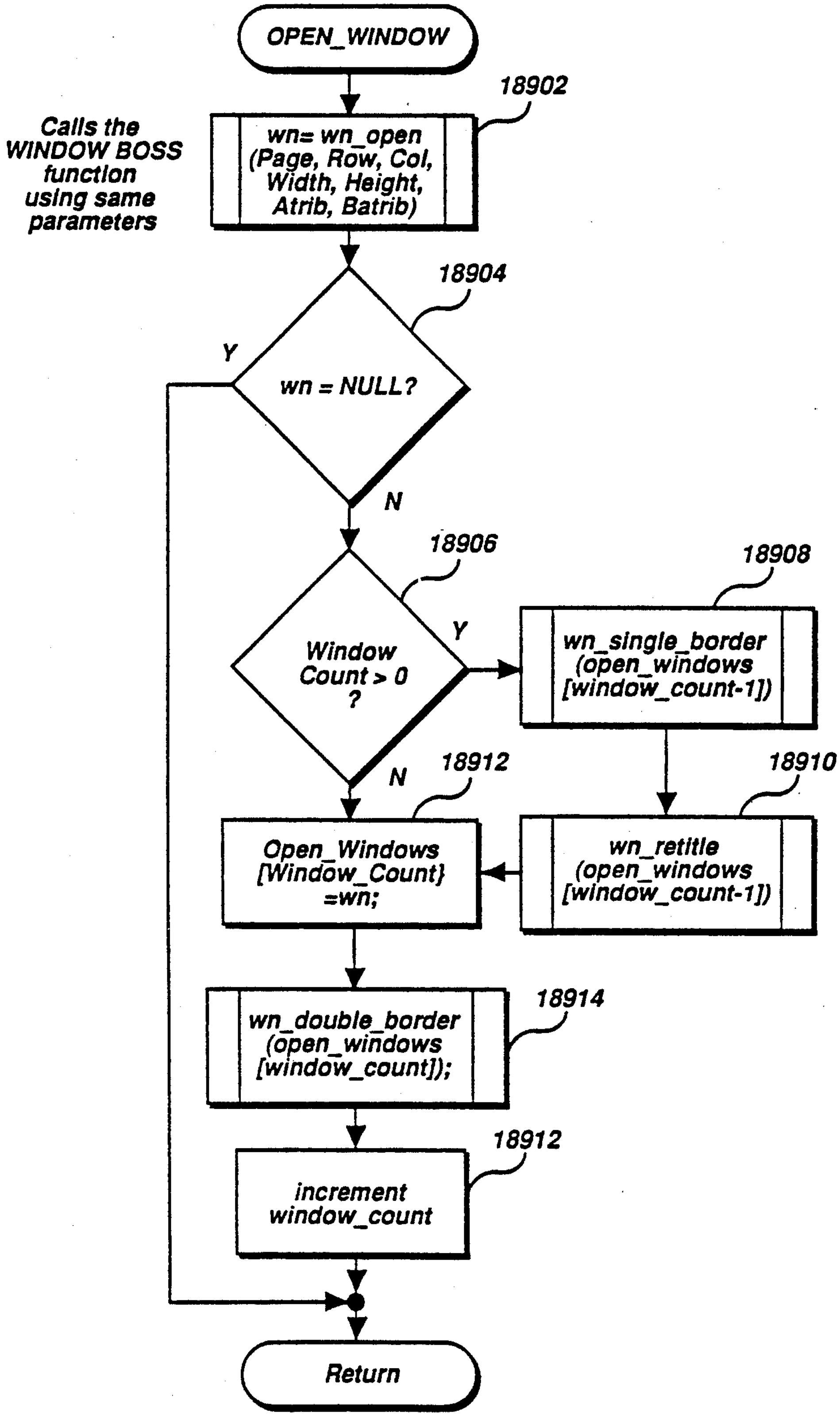

FIG. 189 is a flow diagram of the "OPEN_WINDOW" subroutine called by various subroutines of the present invention.

Figure 190:
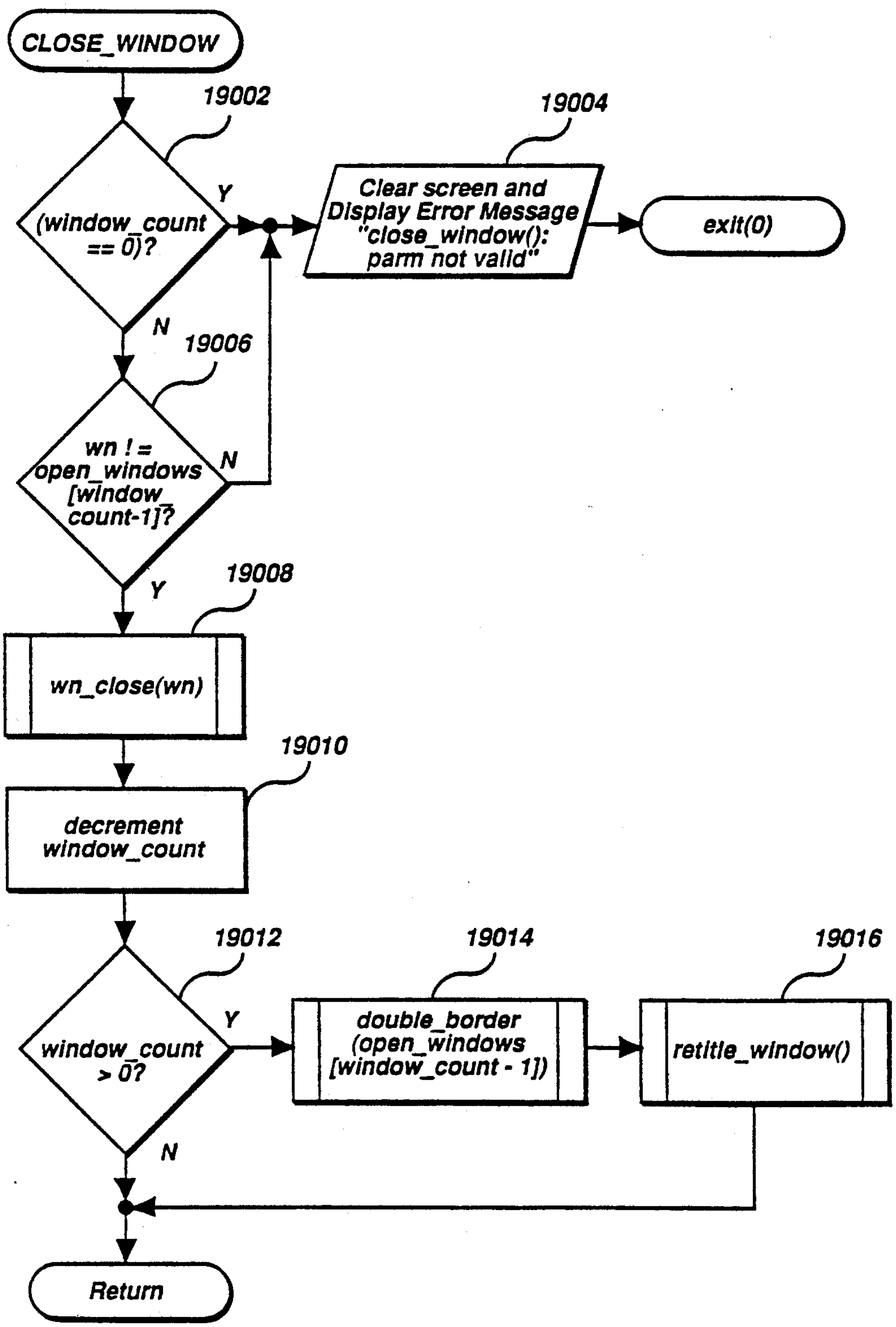

FIG. 190 is a flow diagram of the "CLOSE_WINDOW" subroutine called by various subroutines of the present invention.

Figure 191:
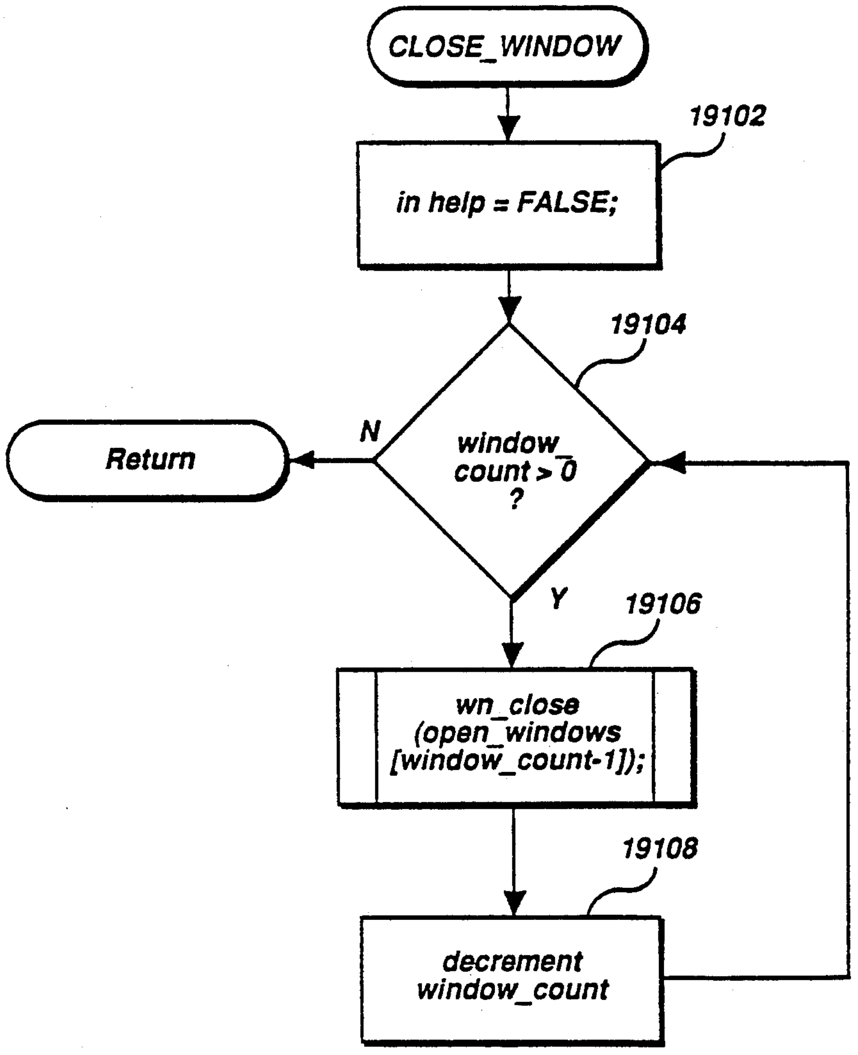

FIG. 191 is a flow diagram of the "CLOSE_WINDOWS" subroutine called by various subroutines of the present invention.

Figure 192:
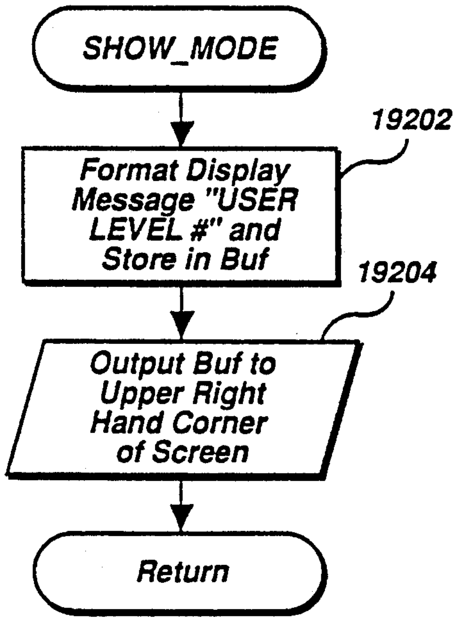

FIG. 192 is a flow diagram of the "SHOW_MODE" subroutine called by various subroutines of the present invention.

Figure 193:
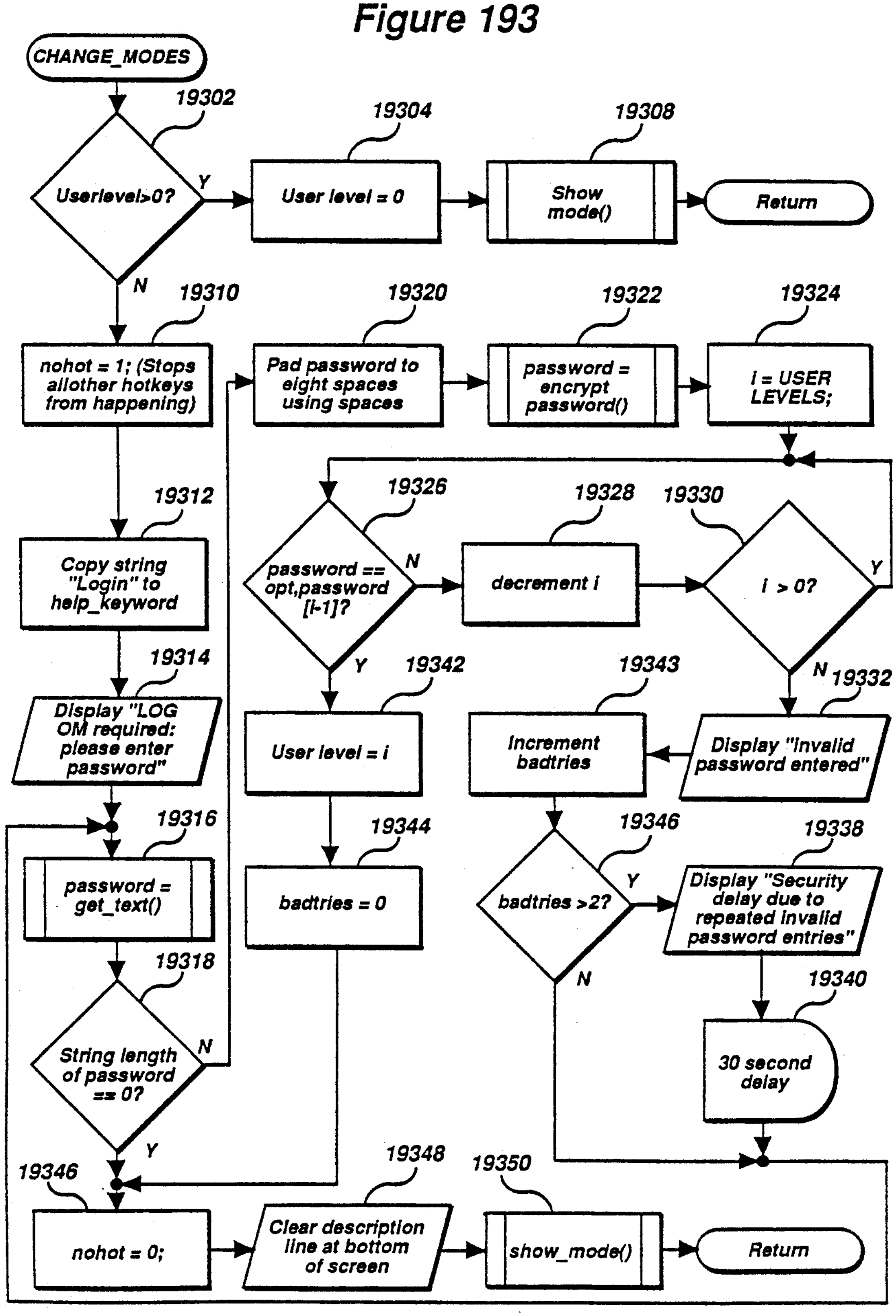
Figure 194A:
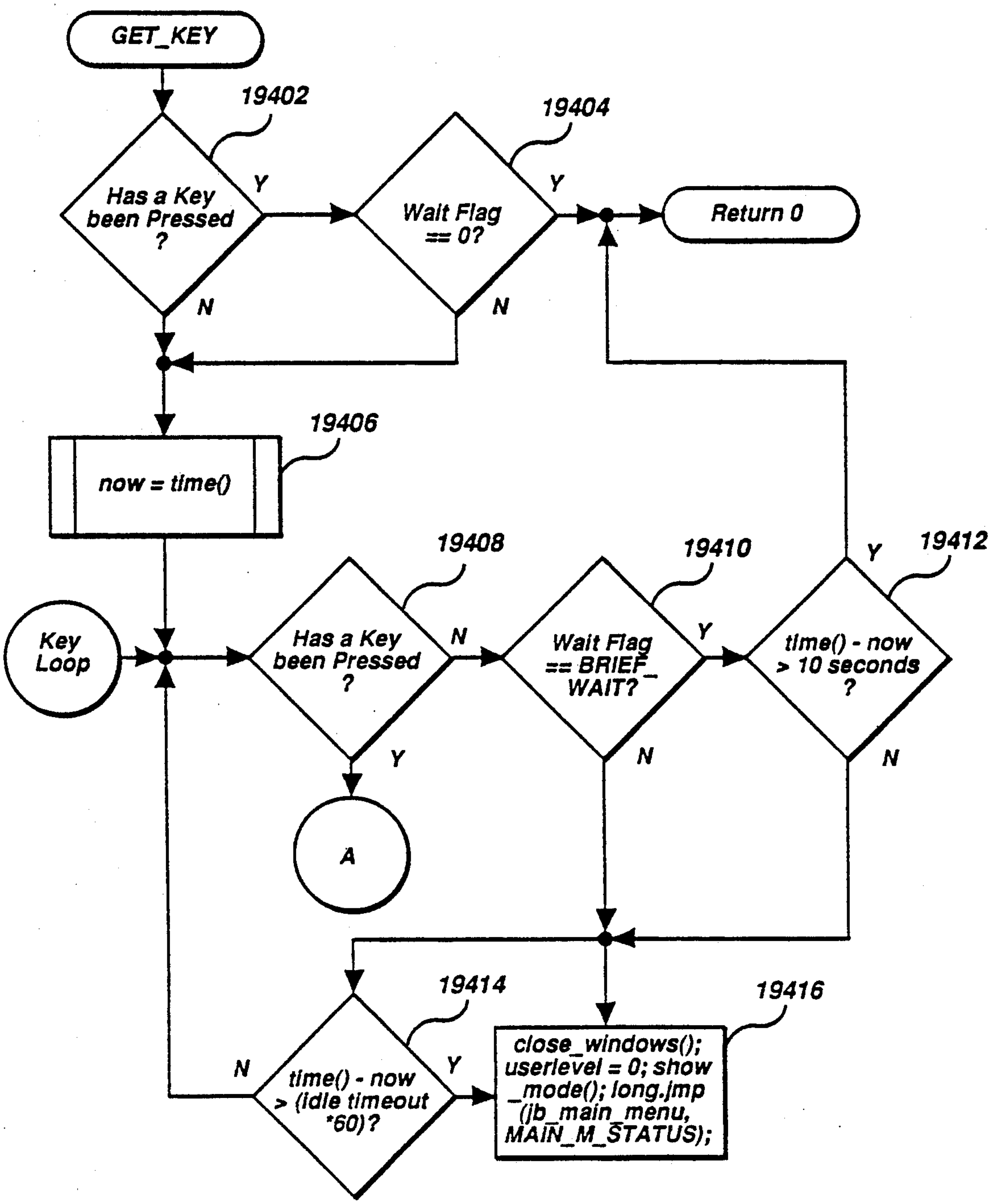
Figure 194B:
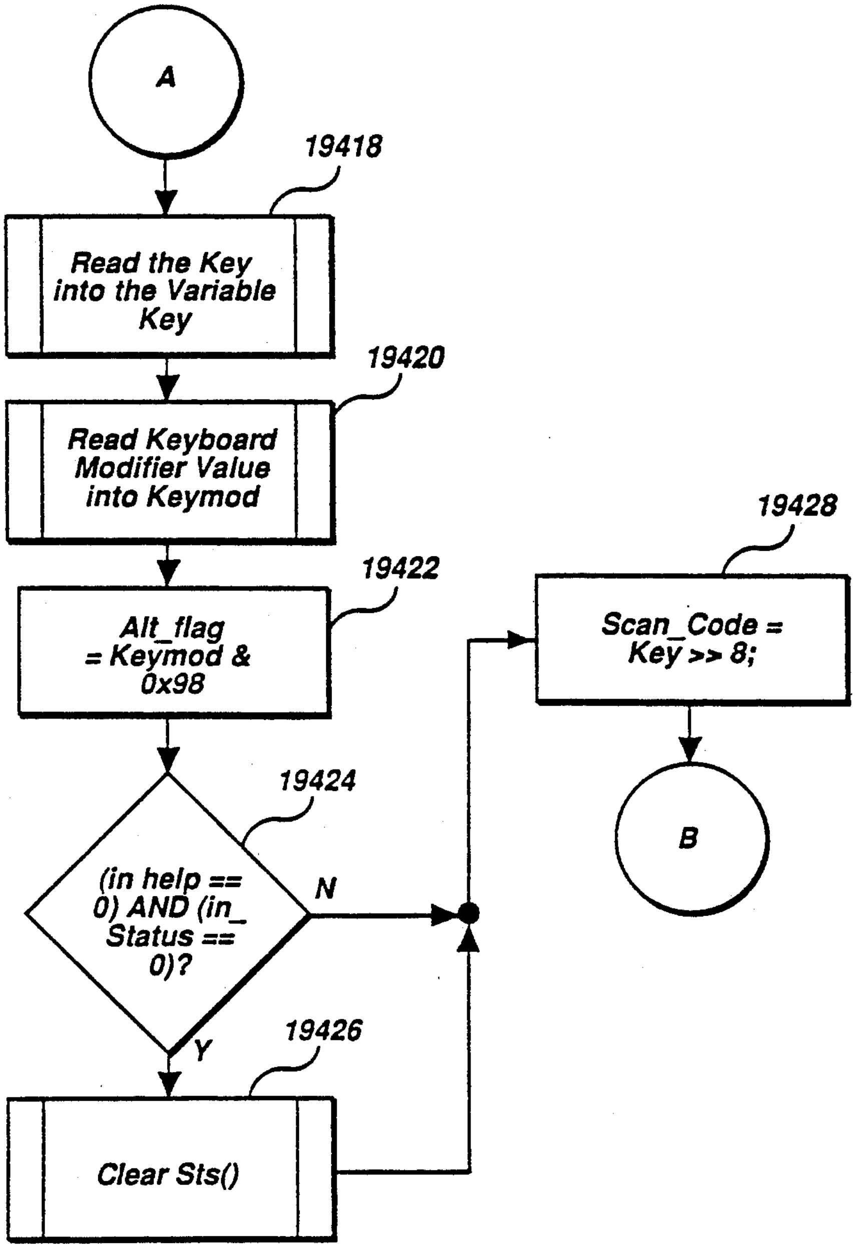
Figure 194C:
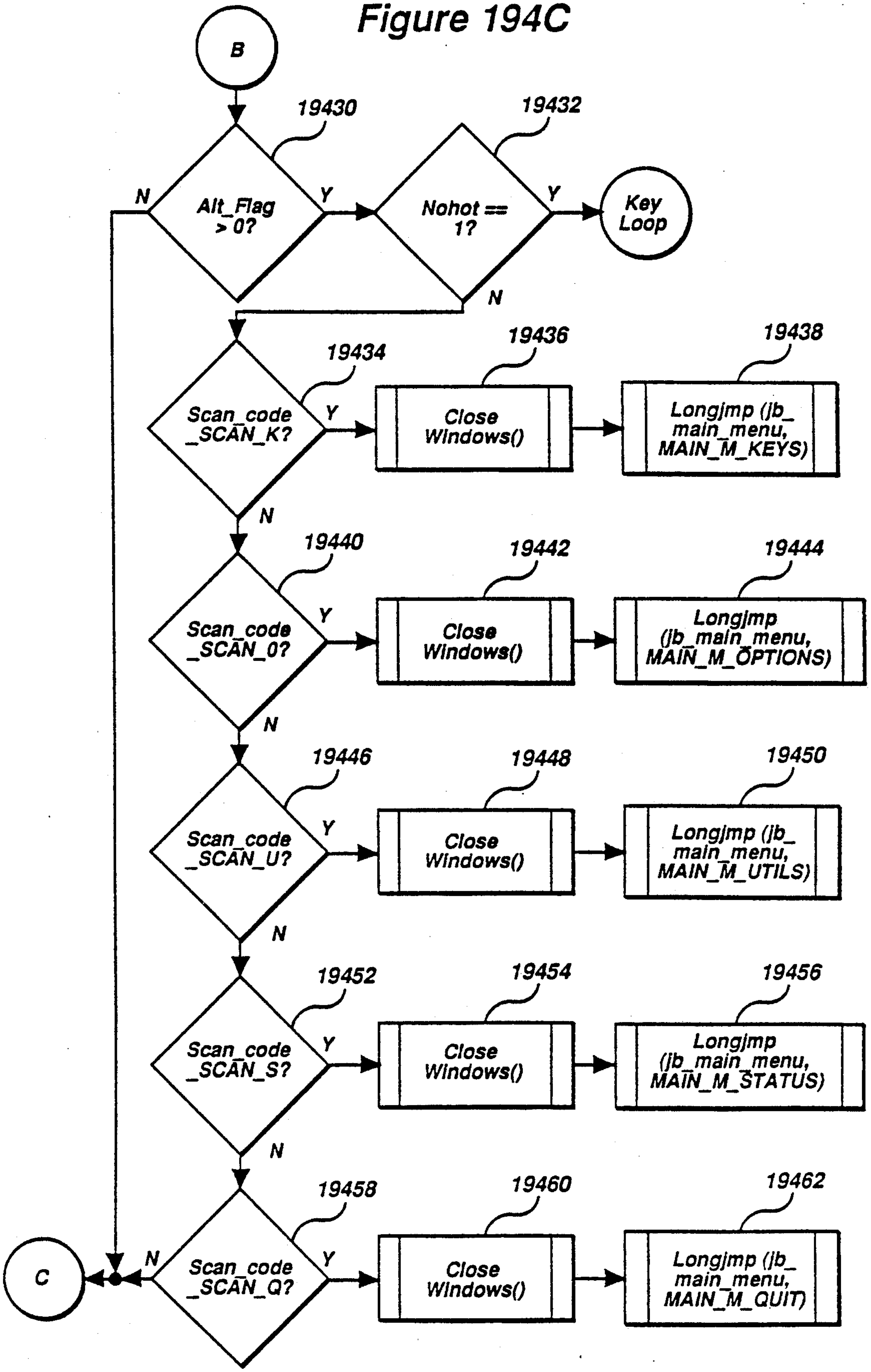
Figure 194D:
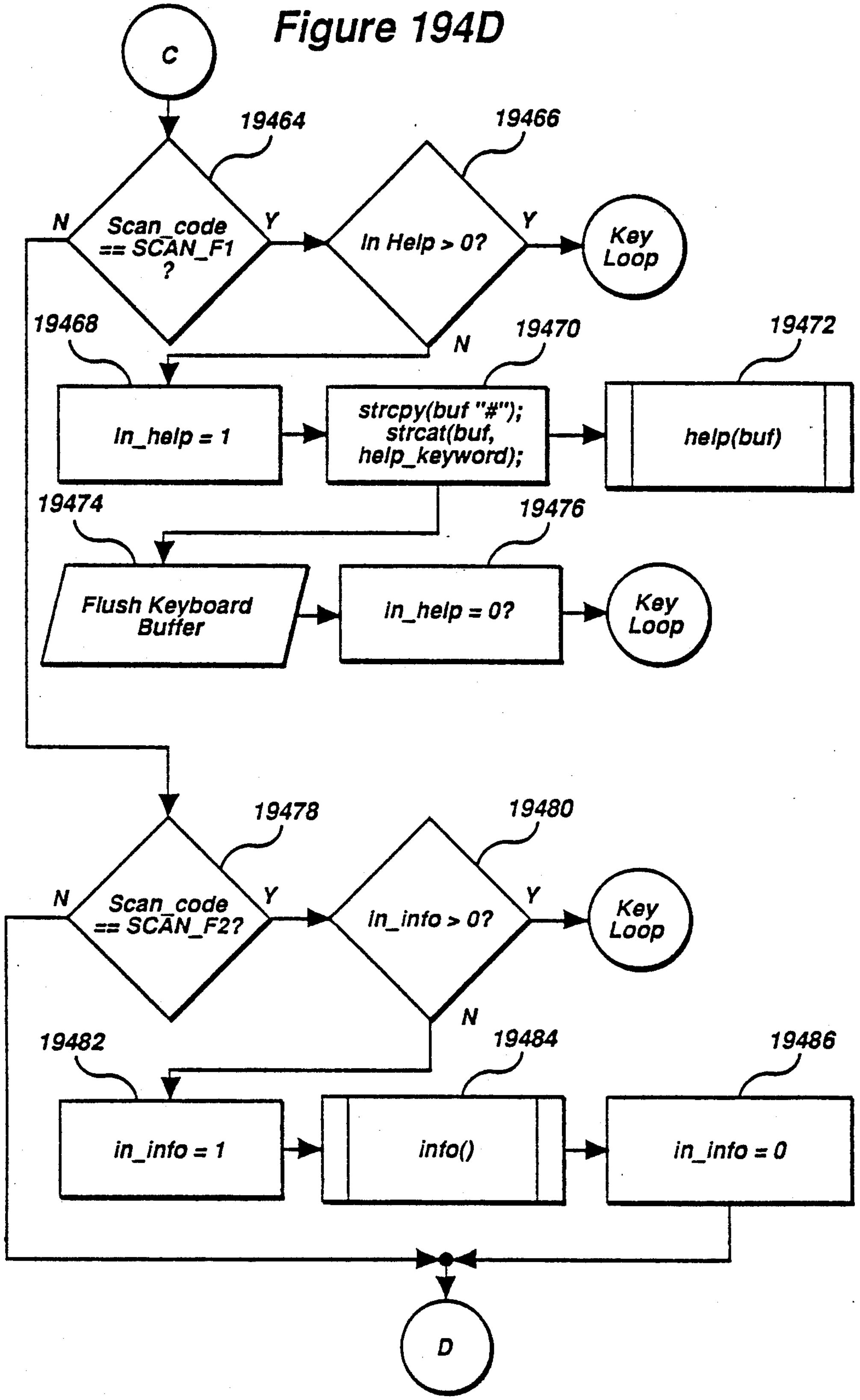
Figure 194E:
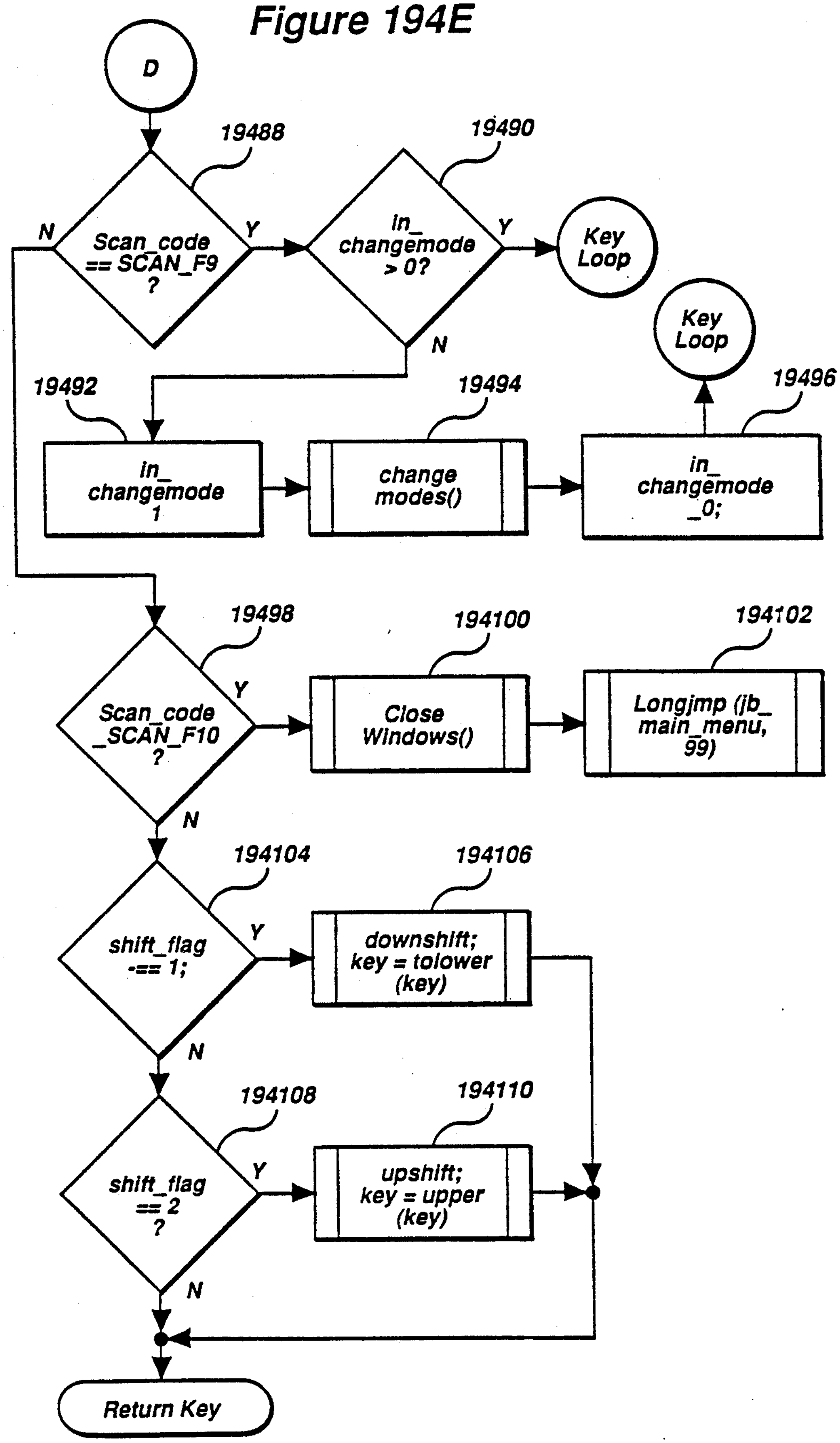

FIG. 193 is a flow diagram of the "CHANGE_MODES" subroutine called by the subroutine of FIG. 194E.

FIG. 194A is a flow diagram of the "GETKEY" subroutine called by various subroutines of the present invention.

FIG. 194B is a continuation of the flow diagram of FIG. 194A.

FIG. 194C is a continuation of the flow diagram of FIG. 194B.

FIG. 194D is a continuation of the flow diagram of FIG. 194C.

FIG. 194E is a continuation of the flow diagram of FIG. 194D.

Figure 195:
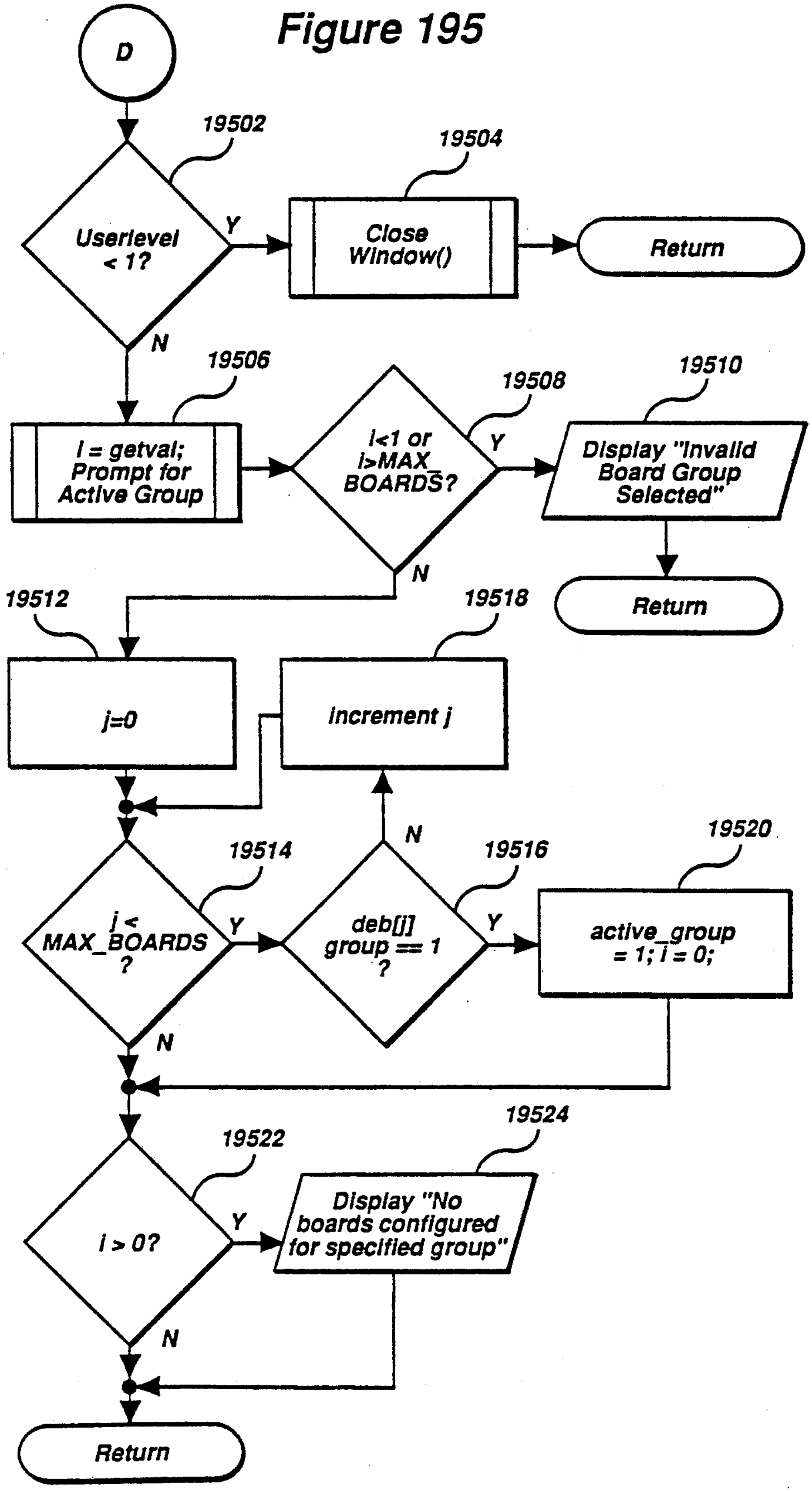

FIG. 195 is a flow diagram of subroutine "D" called by the subroutine of FIG. 143.

Figure 196:
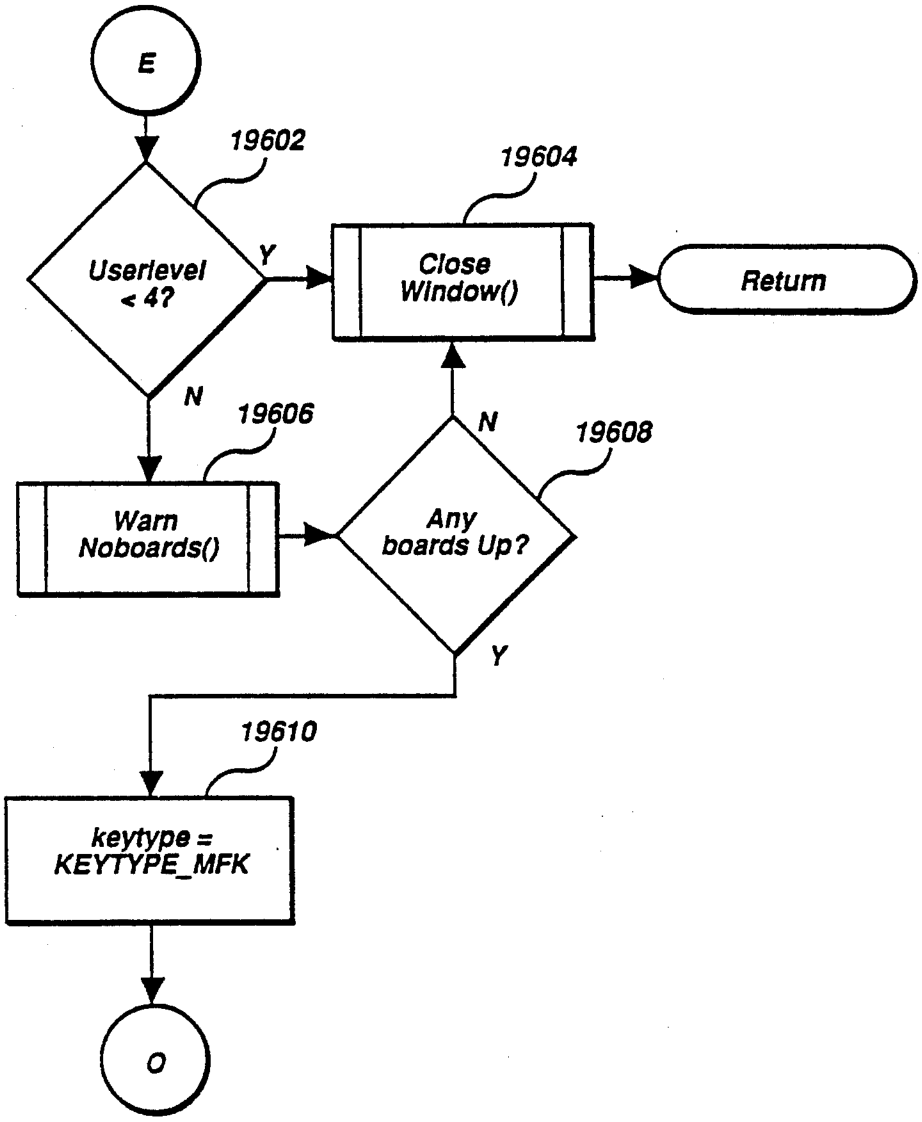

FIG. 196 is a flow diagram of subroutine "E" called by the subroutine of FIG. 143.

Figure 197:
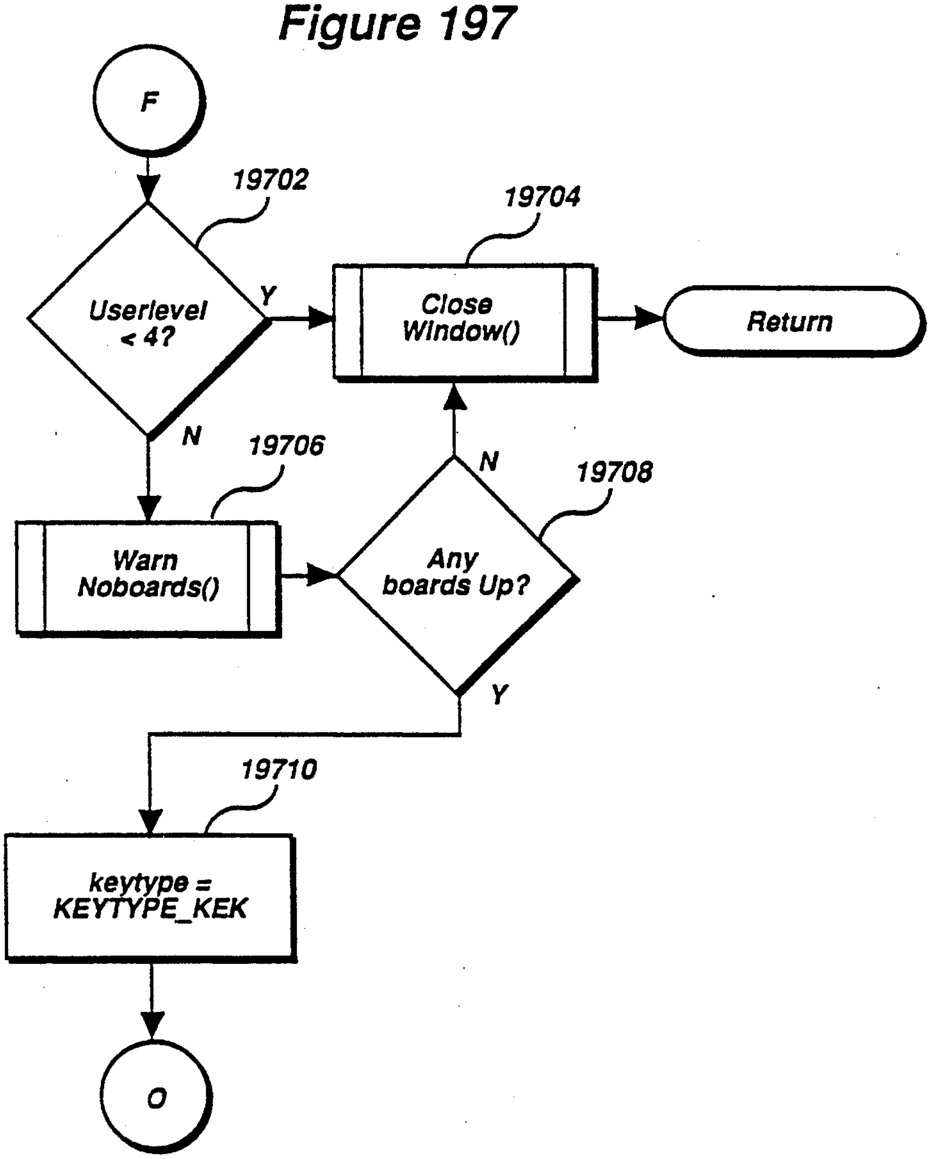

FIG. 197 is a flow diagram of subroutine "F" called by the subroutine of FIG. 143.

Figure 198:
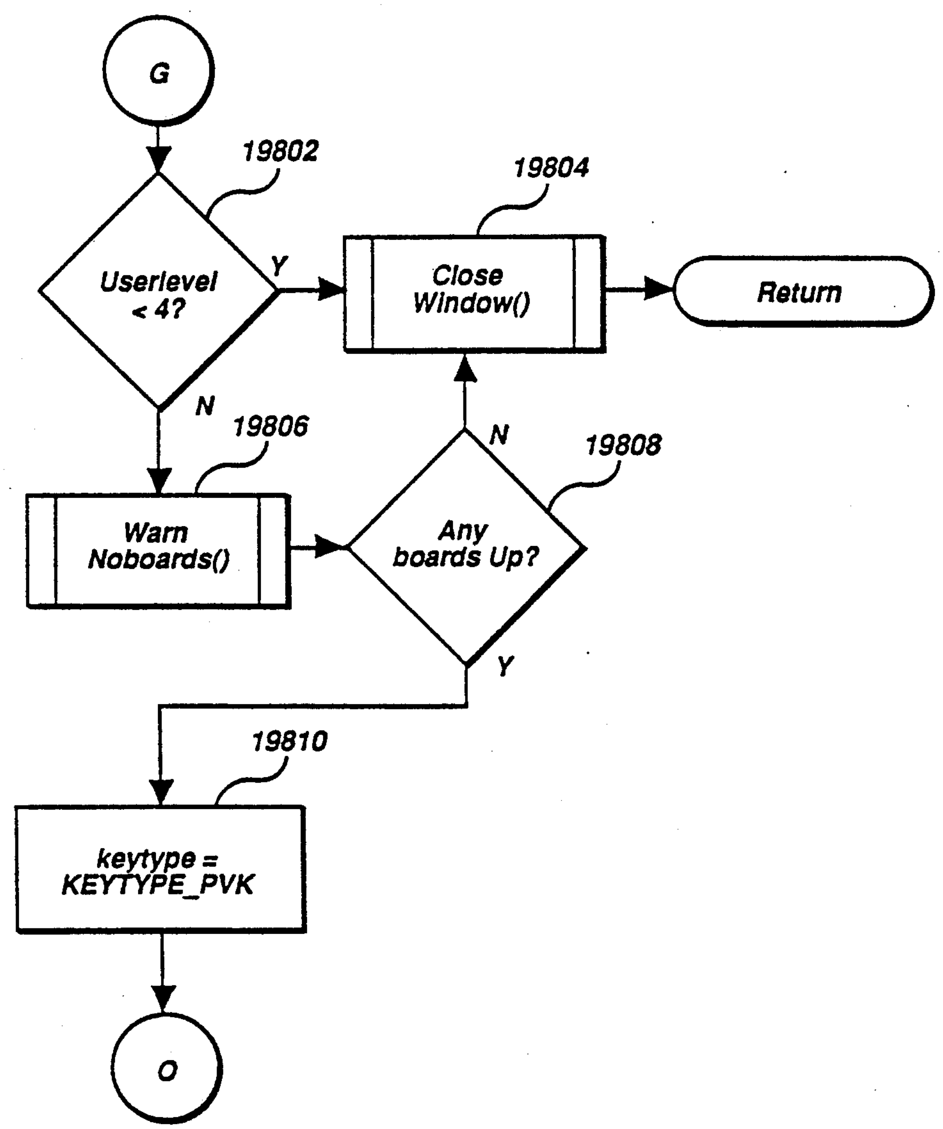

FIG. 198 is a flow diagram of subroutine "G" called by the subroutine of FIG. 143.

Figure 199:
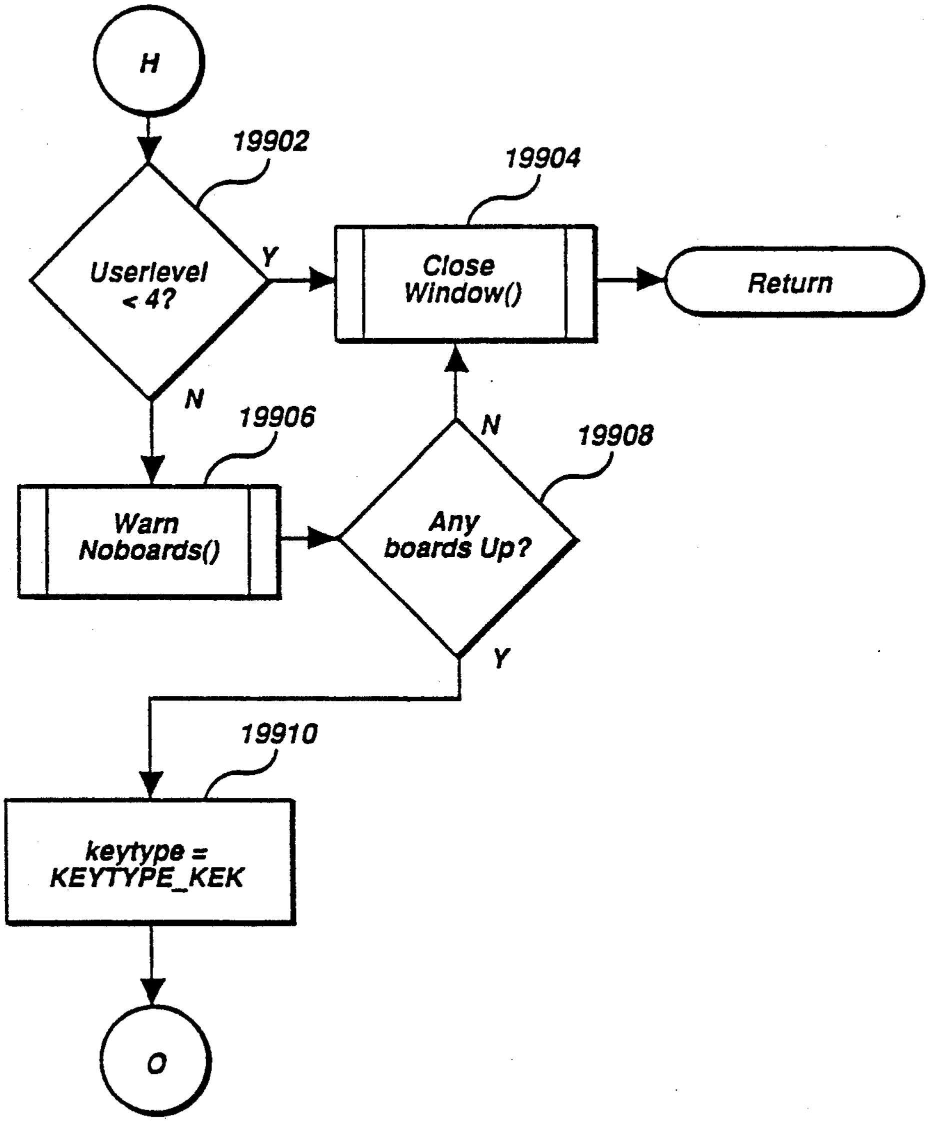

FIG. 199 is a flow diagram of subroutine "H" called by the subroutine of FIG. 143.

Figure 200:
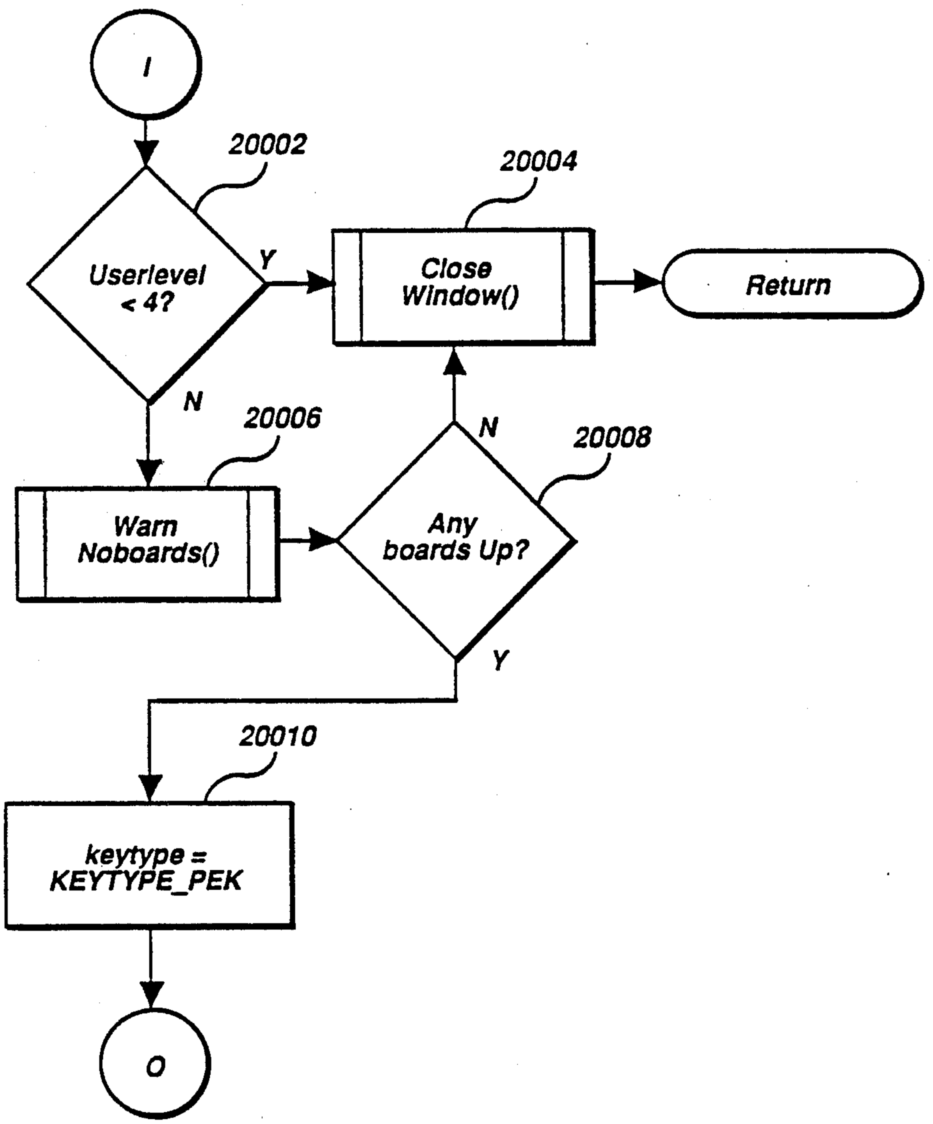

FIG. 200 is a flow diagram of subroutine "I" called by the subroutine of FIG. 143.

Figure 201:
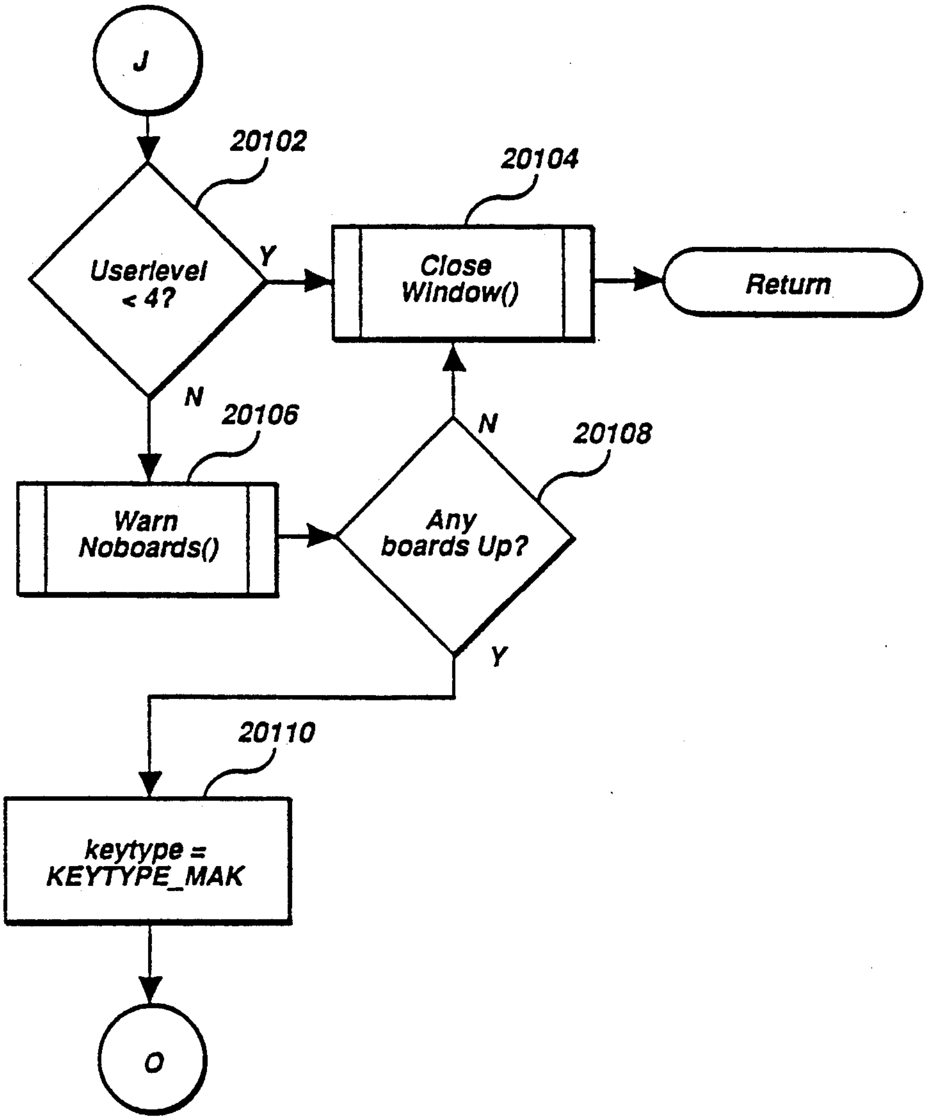

FIG. 201 is a flow diagram of subroutine "J" called by the subroutine of FIG. 143.

Figure 202:
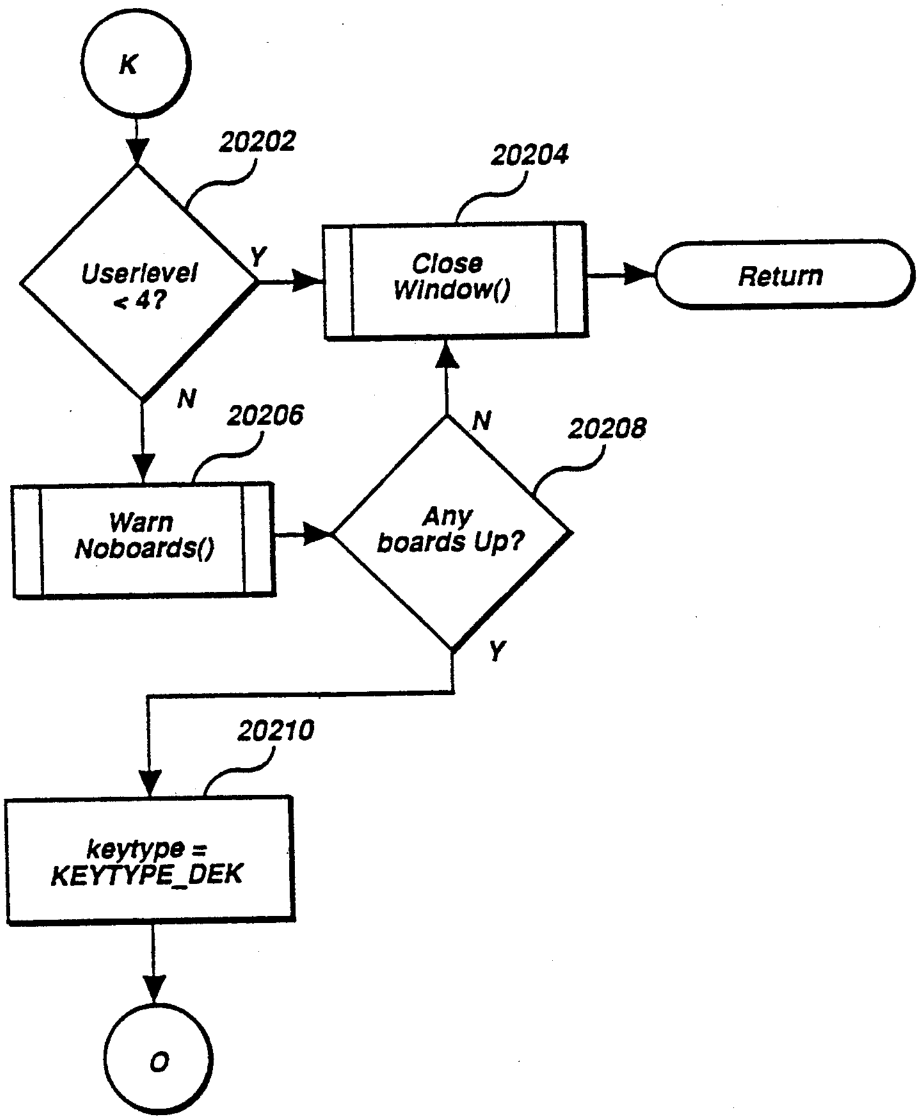

FIG. 202 is a flow diagram of subroutine "K" called by the subroutine of FIG. 143.

FIG. 203 is a flow diagram of subroutine "L" called by the subroutine of FIG. 143.

FIG. 204 is a flow diagram of subroutine "M" called by the subroutine of FIG. 143.

Figure 205:
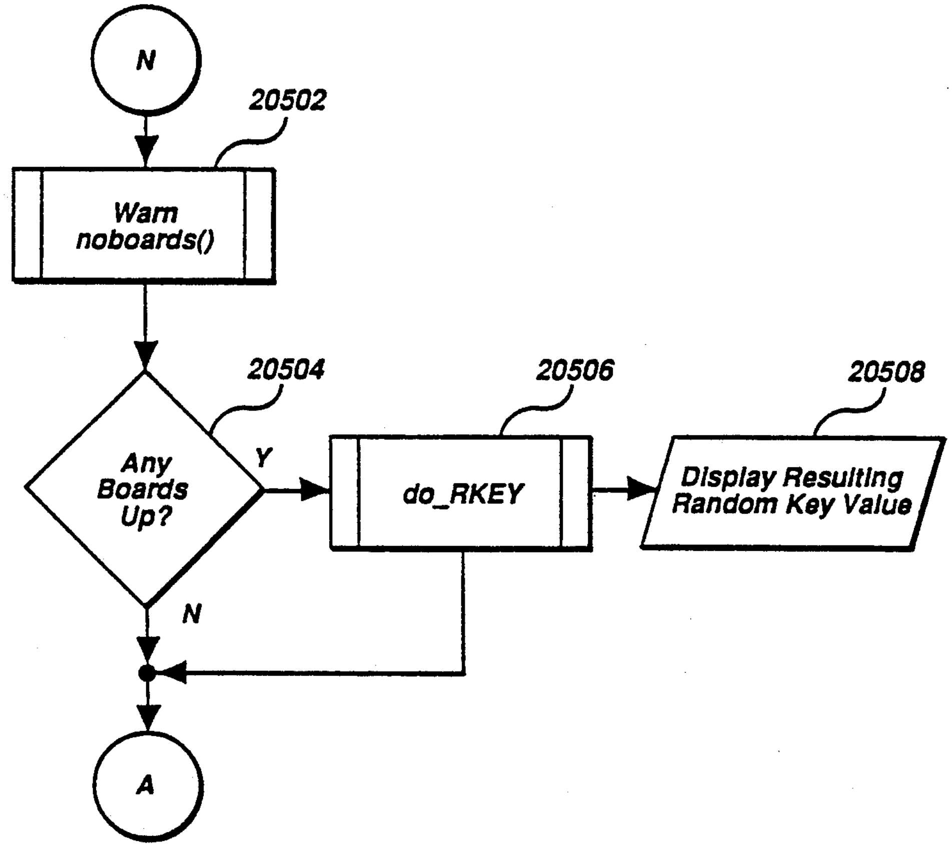

FIG. 205 is a flow diagram of subroutine "M" called by the subroutine of FIG. 143.

FIG. 206 is a flow diagram of subroutine "O" called by the subroutine of FIG. 143.

DETAILED DESCRIPTION OF THE INVENTION

Figure 1:
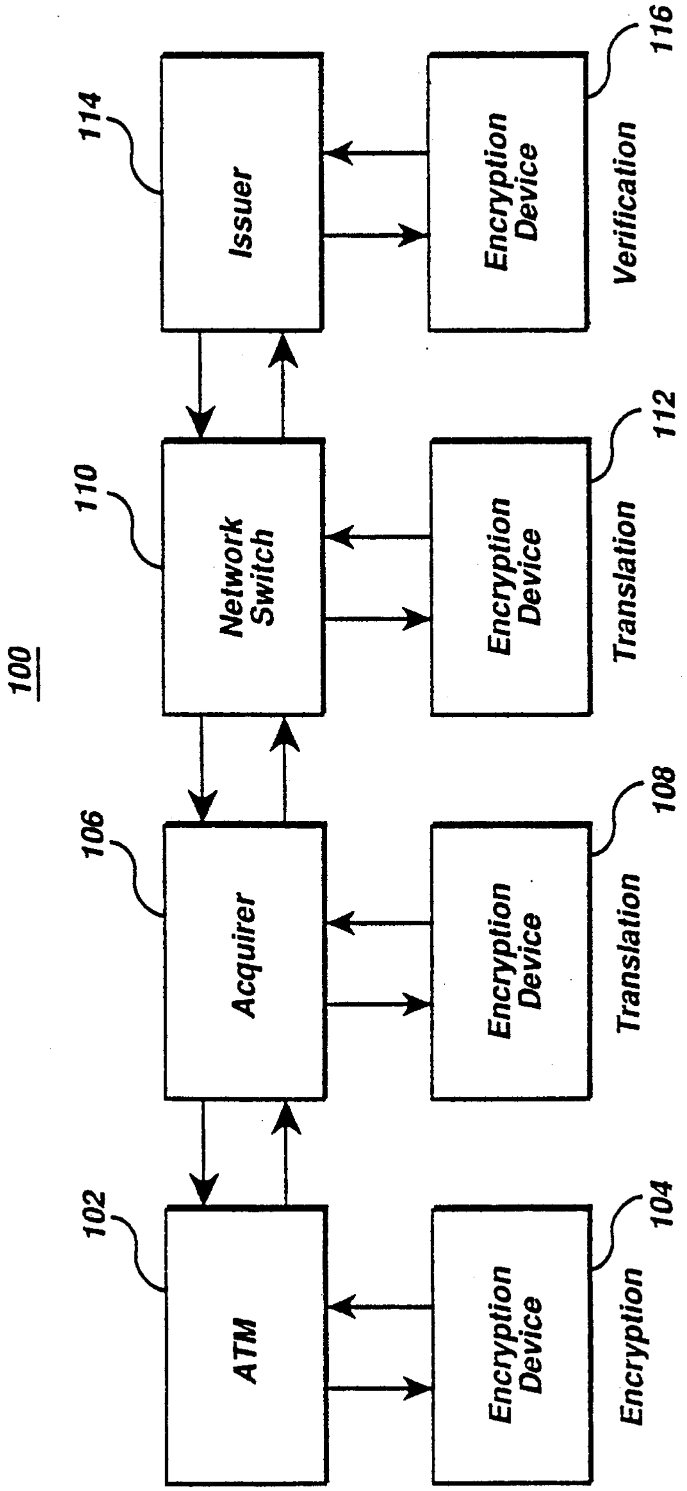
FIG. 1 is a block diagram showing a typical shared network for an electronic fund transfer system.

Modern electronic fund transfer systems are increasingly configured as shared networks wherein a number of financial institutions are networked to a number of POS or ATM terminals through a network switch. A typical shared network using the DES encryption scheme is shown in FIG. 1. The DES algorithm encrypts electronic data, such as PIN information entered on a keypad or account number information taken from a magnetic strip on the back of a plastic card, by performing a complex series of processes which transform the original data into a completely unrecognizable string of characters.

The DES algorithm allows a large number of users to use a shared network by incorporating "Keys" which enable users to customize or personalize the algorithm for their own application. Decrypting data which has undergone DES algorithm requires knowledge of both the algorithm and the key. Attempting to decrypt the data with a different key or with no key at all would generate useless data. Only those parties having the specific encryption key are able to decrypt the data.

In a shared network using the DES algorithm, a card holder inserts a plastic card having magnetically encoded account information into a remote ATM terminal 102. The ATM terminal 102 reads the PIN information and the user enters a transaction request into the ATM terminal. This information is encrypted under the ATM terminal's encryption key by an associated encryption device 104 using key information unique to the encryption device 104. The encrypted PIN and transaction request is then transmitted to an acquiring institution 106 where the encrypted PIN and transaction request is translated by the encryption device 108. The translation process involves decrypting the PIN and transaction request using the PIN encryption key of the ATM and re-encrypting the PIN and transaction request under a network switch key. The translated PIN and transaction request is then transmitted to the network switch 110. The network switch 110 receives the transmission from the acquirer and translates the PIN and transaction request by decrypting the PIN and transaction request under the acquirer key and re-encrypting the key under the card issuer key with the encryption device 112. The translated PIN and transaction request is then sent to the issuer which receives the transmission from the switch and decrypts the PIN and transaction request with the encryption device 116 for verification. Once the PIN and transaction request is verified, the card issuer generates a verification message which is encrypted and re-routed through the network in the reverse direction.

Each of the encryption devices of the present invention employ a security module which retains all sensitive key information as well as the DES algorithm (along with any other encryption algorithm supported by the system). The following information is securely stored in the encryption devices of the present invention:

(1) The DES Algorithm: The DES Algorithm is a well-known algorithm which is widely used in the data processing industry. The DES algorithm is used in conjunction with various DES keys to encrypt and decrypt data, such as customer's PINs or working keys, and to generate message authentication codes.

(2) The Master File Key (MFK): This key is used to encrypt all keys that are to be stored locally outside the security module. When an externally stored key (cryptogram) is required during PIN processing, it is retrieved from its storage area, decrypted under the security module's MFK, and injected into the DES algorithm along with the data which is being processed.

(3) The Key Storage Table: All of the various keys that a network link uses to encrypt or decrypt data (except MFK), perform the message authentication process and communicate keys to other network links may be stored on the Key Storage Table. Alternatively, a network link may choose to store its keys outside the security module. In this case, the keys are encrypted under the security module's Master File Key and stored as cryptograms.

The following DES keys are stored on the Key Storage File:

Key Exchange Key (KEK): Key Exchange Keys are used to encrypt working keys that are to be transmitted to another link in the network. For example, a switch may need to change a key that a transaction acquirer uses to encrypt PINs for transmission to the network switch 110. The network switch 110 normally would create the new key and inject it to its Key storage Table or immediately encrypt it under its MFK.

However, if the switch 110 sent the key to the transaction acquirer encrypted under the network switches MFK, the acquirer would require knowledge of the switch's MFK in order to translate the new key to encryption under its own MFK. As a general rule, the MFK is never divulged outside the particular network link because of its importance to a link's overall data security.

Therefore, a separate key is required to encrypt working keys for transmission between EFT network lines. This key is referred to as the Key Exchange Key. KEKs are held jointly by the two links between which DES keys are transmitted and are used solely for transmission of working keys. A network link may have a separate KEK for each type of working key, and will have a separate set of KEKs for each network link with which it has direct communication.

Pin Encrytion Key (PEK): The Pin Encryption Key (PEK) is used to encrypt a PIN for transmission between links in the network. The PIN is encrypted initially at the ATM or POS terminal for transmission to the transaction acquirer. The acquirer uses another PEK to transmit the PIN to the network switch. The switch uses yet another PEK to transmit the PIN to the card issuer. PEKs are changed regularly, either automatically or manually to prevent the system from being compromised.

Pin Verification Key(PVK): There are various methods for generating customer PINs. One method involves running the customer's Personal Account Number (PAN) through the DES algorithm under a key referred to as the Pin Verification Key, and then paring the resultant number down to four or twelve digits to arrive at the customer PIN. When this method is used to generate the PIN, the same method is used to verify the PIN when it arrives in a transaction request. The PIN verifying institution decrypts the customer-entered PIN that arrived in the transaction request (PIN 1). Then it compares this PIN against the one created by running the PAN (also received in the transaction request) through the DES algorithm under the PVK (PIN2). If the two PINs match, the transaction request is valid.

Data Encryption Key (DEK): Some types of EFT transactions require both PIN information and other types of message data to be encrypted. The Data Encryption Key is used to encrypt data other than the PIN or another working key. The Data Encryption Key, like the PIN Encryption Key, must be held jointly by the two links in the network between which the encrypted data is to be transmitted.

Message Authentication Key (MAK): The Message authentication key is used to create a message authentication Code which is appended to the end of a message to enable the message receiver to verify that the message content has not been altered in any way between the message originator and the receiver.

The MAK can also be used to guard against other tampering schemes such as intercepting and removing messages between network links, injecting messages at some point between the terminal and the transaction authorizing institution, and recording and replaying previously approved transactions.

The present invention provides a user-friendly menu-driven front end for the selection of DES keys, periodic DES key changes as well as providing for the display of the operational status of the data encryption devices of the present invention. Since the knowledge of entire keys allow an individual access to the EFT network, the present invention provides for the split entry of keys wherein only parts of keys are known by any one individual. The present invention also allows the user to define the number of keyparts used and the random generation of keyparts.

Figure 2A:
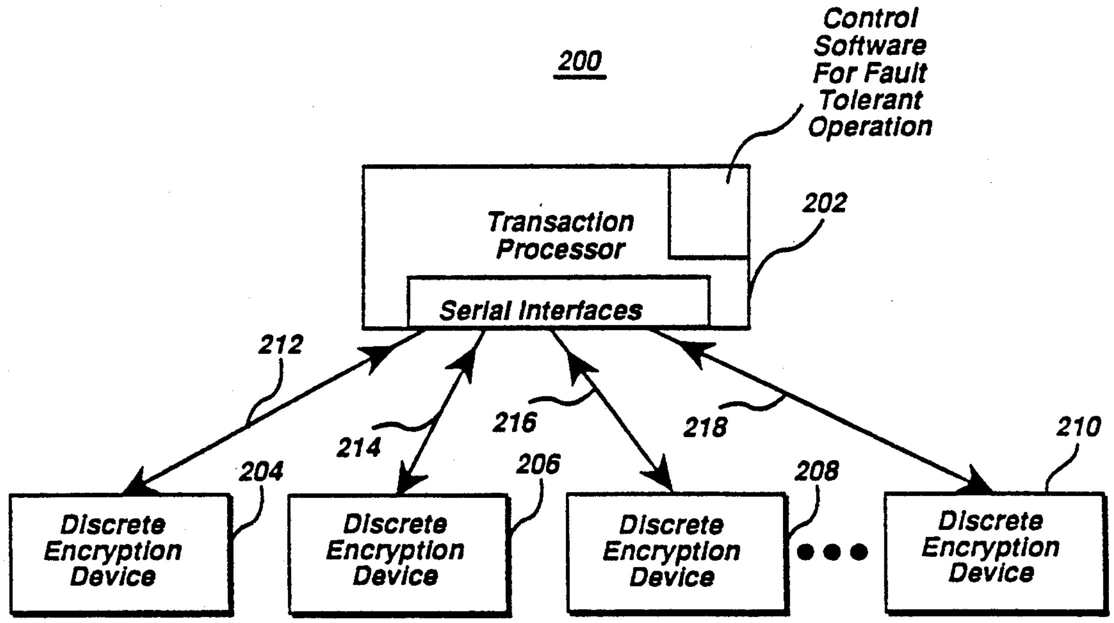
Figure 2A Prior Art
FIG. 2A is a block diagram of a prior art encryption device and mainframe computer arrangement.

A typical prior art transaction processor and data encryption device arrangement is shown in FIG. 2A. This arrangement is typical of an EFT processing node wherein a plurality of data encryption channels are supported. In the system 200, a host transaction processor 202 communicates with a plurality of discrete encryption devices 204, 206, 208, 210 through serial interfaces 212, 214, 216 and 218, respectively. Each of the encryption devices functions independent of the others. Therefore, if fault-tolerant operation is desired, control software for fault-tolerant operation must be resident on the EFT transaction processor. In operation, the transaction processor monitors each of the serial interfaces 212, 214, 216 and 218, and if one of the encryption devices fails, the transaction processor routes messages to an alternate encryption device. Therefore, any "in flight" transaction must be reprocessed by another device. Furthermore, since the transaction processor must monitor each encryption device for proper operation, processing overhead is increased and system performance is degraded.

Figure 2B:
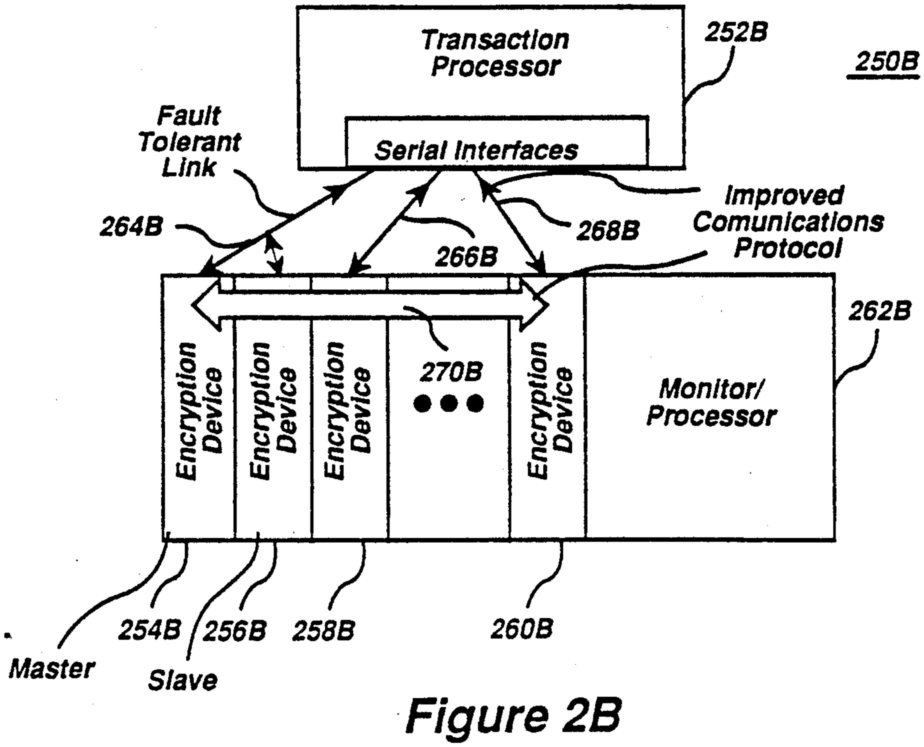
FIG. 2B is a block diagram of the encryption device and mainframe computer arrangement of the present invention.

FIG. 2B is a block diagram of an improved electronic fund transfer system 250B constructed in accordance with the teachings of the present invention. The present invention provides a multichannel encryption device which may be operated in a fault-tolerant mode. For example, encryption devices 254B and 256B may be coupled as fault-tolerant devices while encryption devices 258B and 260B may operate independently. Each of the encryption devices of the present invention may be operated either in a fault-tolerant mode or may be configured as a solo device.

In operation, fault tolerant encryption devices 254B and 256B communicate with transaction processor 252B over a single communication channel or serial interface 264B. The encryption devices 254B, 256B are grouped in a master/slave relationship wherein each encryption device is adapted to receive processing requests from the transaction processor and each encryption device processes the request in its entirety. Under normal operation the master encryption device will respond to the processing request from the transaction processor. However, if the master device does not respond to the host within a predetermined period of time, the slave encryption device responds, thus preventing any loss of critical information. The fault-tolerant operation of encryption devices 254B and 256B operate in a fault-tolerant manner which is totally transparent to the transaction processor 252B. Therefore, fault-tolerant data encryption device operation is provided without adding any processing overhead to the transaction processor while preventing the loss of "in-flight" data. Solo encryption devices 258B and 260B communicate with the transaction processor 252B through serial interfaces 266B, 268B in a manner which is similar to the operation of the discrete encryption devices of FIG. 2A. However, in one aspect of the present invention, the respective encryption devices are disposed in a single unit coupled by a bus to a display and control processor 262B. The display and control processor 262B provides access to each of the encryption devices 254B, 256B, 258B or 260B, etc., for entering and updating key information in the respective devices.

The present invention provides means for entering data in each of the encryption devices either individually or in groups. While the system of FIG. 2B is shown with four encryption devices, the present invention is adapted to support virtually any number of encryption devices.

In another aspect of the present invention, means are provided for locally displaying statistical data on the operation of each encryption device in the system. The encryption devices of the present invention are provided with a means of recording the number of failed transactions, verifications and other statistics over predefined intervals to provide information regarding system reliability, and performance. The display and control processor 262B periodically retrieves this information from each respective encryption device in the system and displays the statistical information from each encryption device to a user. If a particular encryption device exceeds predetermined statistical thresholds, a visual alarm is displayed to the user.

In another aspect of the present invention, communications between the transaction processor 252B and the display and control processor 262B are supported by a unique communications protocol particularly adapted for communicating in an EFT network. The communications protocol of the present invention provides for the transfer of key information among a plurality of data encryption devices over parallel or serial interfaces, as well as providing for the transfer of system operating characteristics to a display and control processor.

Figure 2C:
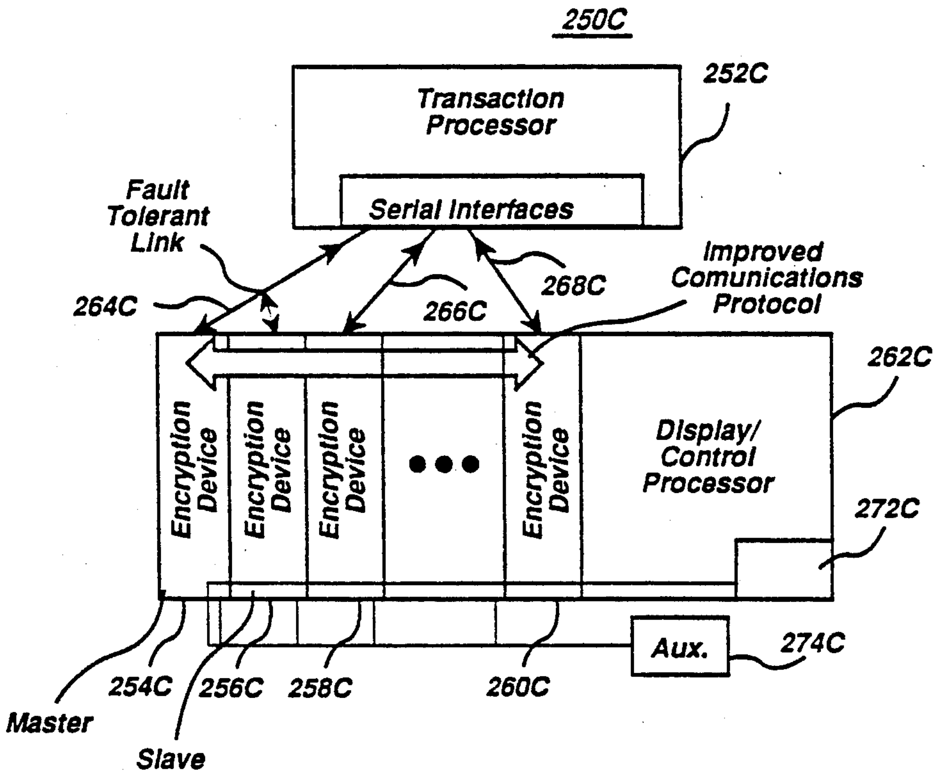
FIG. 2C is a block diagram of the fault tolerant power supply arrangement of the present invention.

In yet another aspect of the present invention, a fault-tolerant, power supply arrangement is provided, as shown in FIG. 2C. This system is identical to the system 250B with the addition of a fault-tolerant, power supply arrangement. In this aspect of the present invention, each of the elements of the system 250C are powered by a main power supply 272C. Additionally, an auxiliary power supply 274C is coupled to each of the respective encryption devices. Both power supplies are always active wherein the data encrypting devices normally receive power from the auxiliary power supply. However, if the auxiliary power supply fails, the data encryption boards derive power from the main power supply. Therefore, in cases where the auxiliary power supply fails, critical encryption functions are not affected. This feature also allows the Display and Control processor to be turned-off for servicing without affecting critical encryption functions.

Figure 3A:
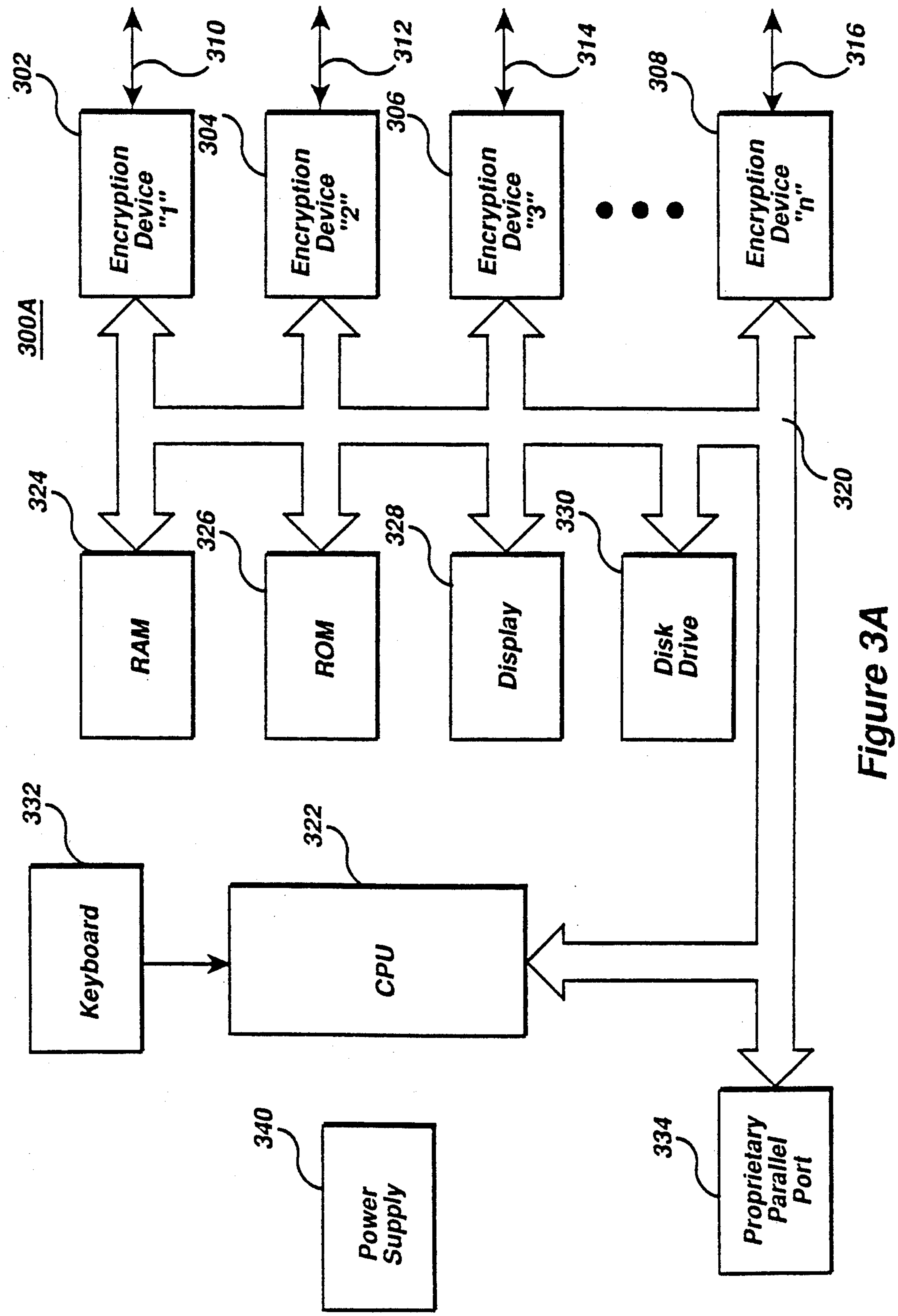
FIG. 3A is a block diagram of the basic configuration of the multichannel, microcomputer-based encryption system of the present invention.

FIG. 3A is a block diagram of a first embodiment of the data encryption system of the present invention. In the system 300A, encryption devices 302, 304, 306 and 308, communicate with a transaction processor through serial interfaces 310, 312, 314, and 316, respectively. In this aspect of the present invention, each of the encryption devices is adapted to operate independently of the other devices when communicating with a transaction processor.

The encryption devices 302, 304, 306 and 308 are further coupled to a parallel bus 320, which is also coupled between CPU 322, RAM 324, ROM 326, display 328, disk drive 330 and a proprietary parallel port interface 334. A keyboard 332 provides a means of entering alphanumeric or keyboard function data into CPU 332. In this embodiment of the present invention, a power supply 340 provides power to all devices in the system. The display and control processor may suitably comprise an 8085 microprocessor available from Intel. The RAM 324, ROM 326, display, 328 and disk drive 330 may be any of a number of well-known devices adapted for use with the 8085 microprocessor.

The operation of the system 300 is similar to most general purpose computers with the exception of the messages communicated between the CPU 332 and the encryption devices 302, 304, 306, and 308. The control software of the CPU 322 and the respective encryption devices of the present invention are discussed in detail below. In addition, the various keyboard and display functions provided by the present invention are discussed in detail below. The CPU 322, display 328 and keyboard 332 provide an efficient and user-friendly means of interfacing user inputs to the various encryption devices in the system. In addition, the system of the present invention provides a means of recording and displaying the operating statistics of the encryption devices as will be discussed in detail below.

The disk drive 330A and/or proprietary port 334 provide a means of backing up system software as well as providing an external source of data for updating system software. Those skilled in the art will appreciate that the disk drive may be omitted in systems offering a parallel port interface or vice versa.

Figure 3B:
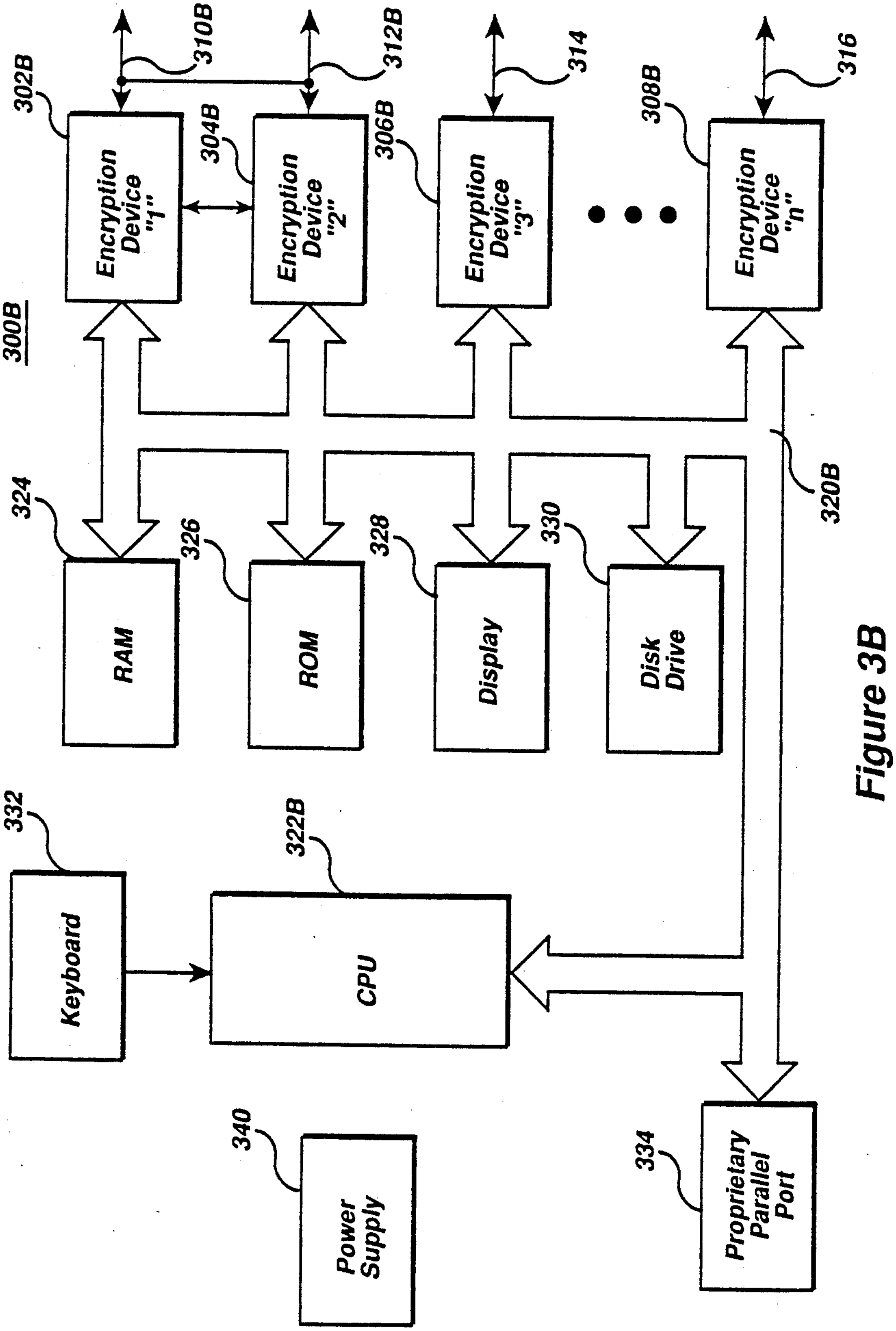
FIG. 3B is a block diagram of an embodiment of the multichannel, microcomputer-based encryption system of the present invention having a fault-tolerant encryption or processing device arrangement.

Referring now to FIG. 3B, an alternate embodiment of the present invention is shown. The system 300B incorporates all of the elements of the system 300A. However, in this aspect of the present invention, encryption devices 302B and 304B are coupled in a fault-tolerant arrangement wherein encryption device 302B functions as a master and encryption device 304B functions as a slave. In this aspect of the present invention, encryption devices 302B and 304B communicate through a single serial interface 310B with an associated transaction processor. In this configuration, encryption devices 302B and 304B receive processing requests from a transaction processor and each encryption device processes the request in its entirety. The slave encryption device then determines whether the master encryption device 302B responds within a predetermined period of time and if the master encryption device does not respond, the slave encryption device 304B responds to the transaction processor. The present invention provides the capability of supporting a number of master/slave pairs and further supports encryption devices operating in a solo mode along with master/slave pairs in the same system.

Figure 3C:
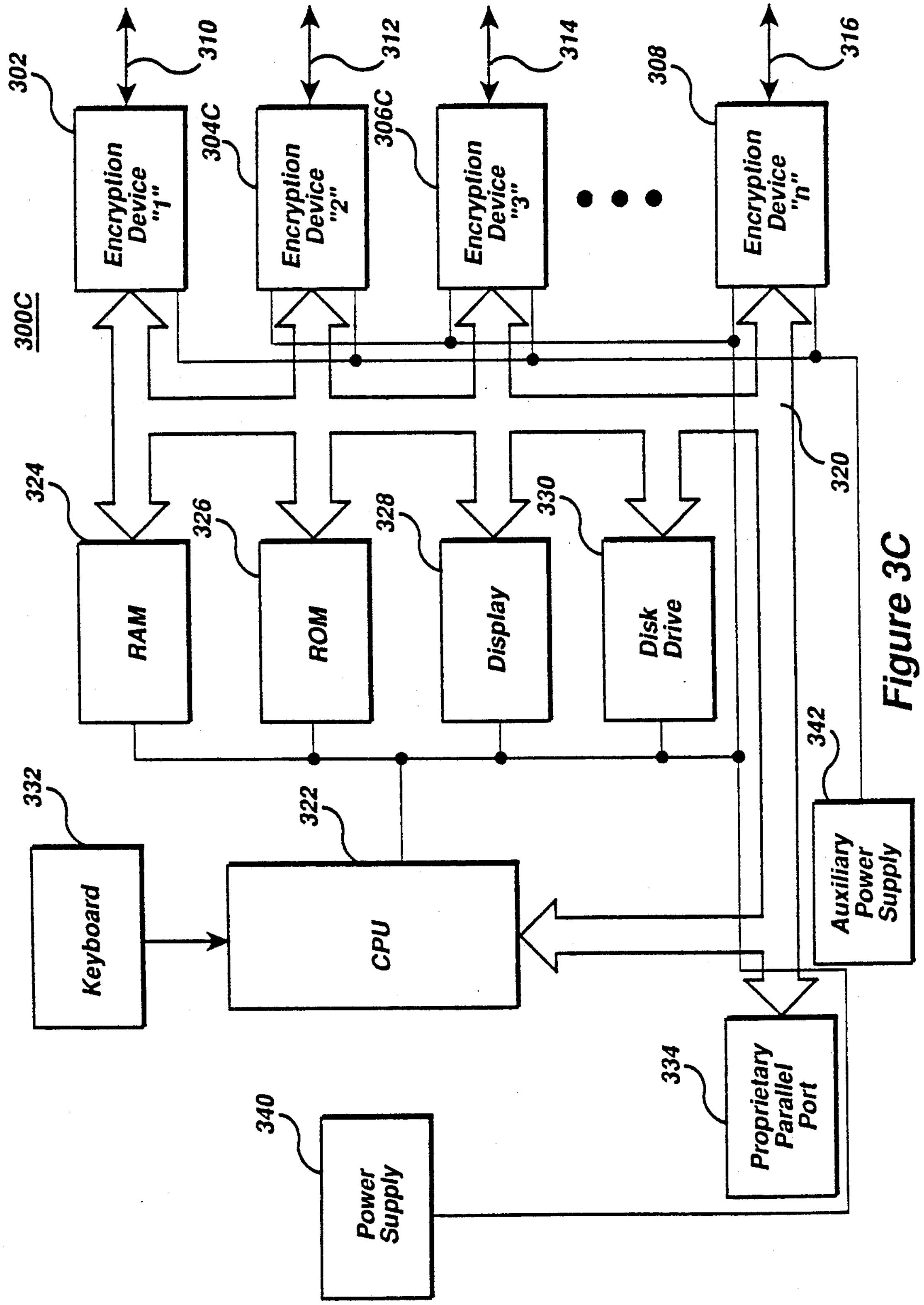
FIG. 3C is a block diagram of an embodiment of the multichannel, microcomputer-based encryption system of the present invention having a fault-tolerant power supply arrangement.

FIG. 3C is an alternate embodiment of the encryption system of FIG. 3A. The system 300C is similar to the system 300A. However, in this aspect of the present invention, an auxiliary power supply 342 is provided. In the system 300C, the main power supply provides power to all the components in the system. In addition, an auxiliary power supply 342 is coupled to the respective encryption devices 302, 304, 306 and 308. In normal operation, the display and control circuitry derive power from main power supply and the data encryption devices derive power from the auxiliary power supply. However, if the auxiliary power supply fails, the respective encryption devices derive power from the main power supply. Therefore, the encryption devices remain operational, thus preserving critical encryption functions. This feature is also useful when maintenance of the display or input system is required, as the main power supply may be shut off for servicing without disturbing the operation of the encryption devices.

Figure 3D:
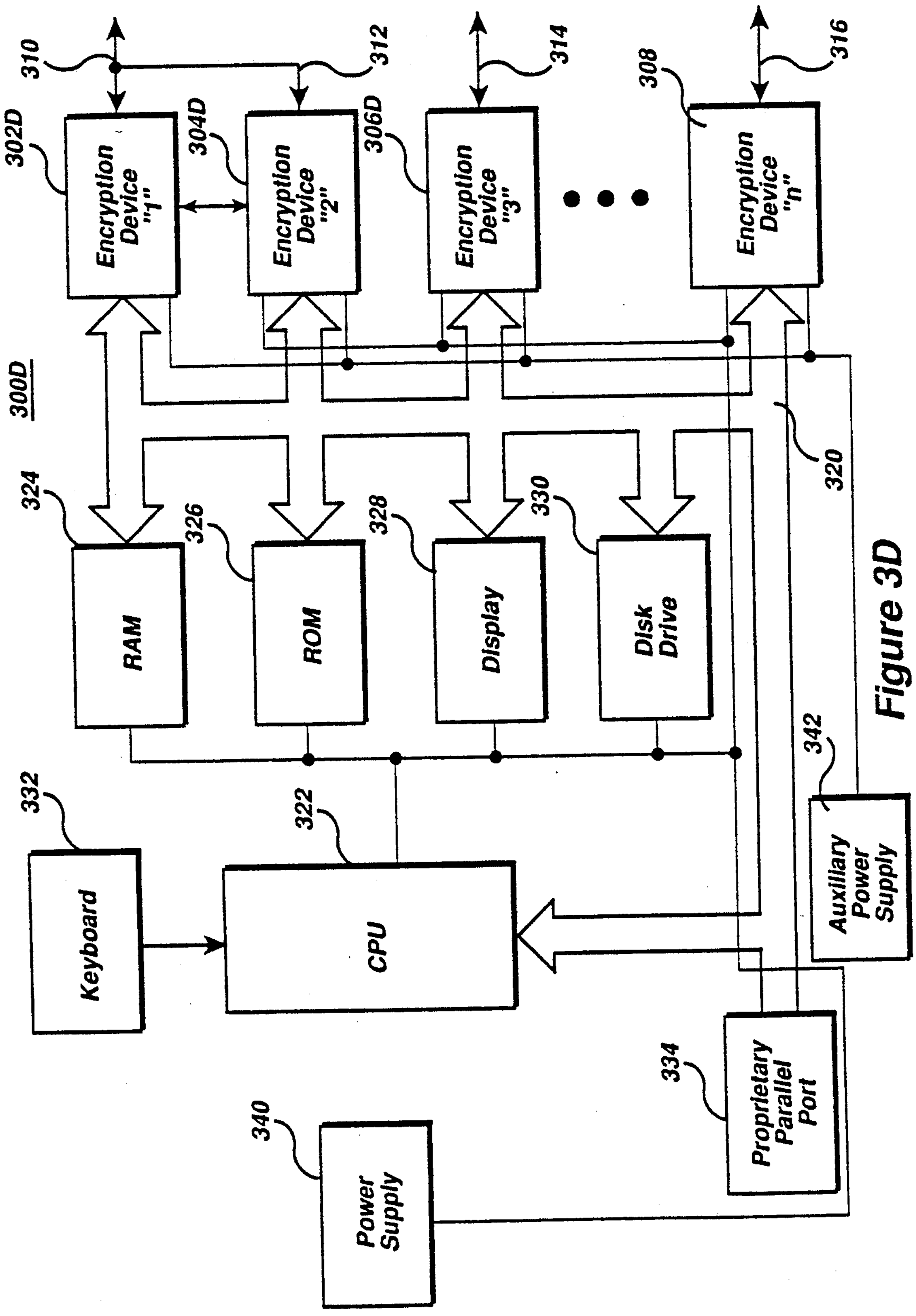
FIG. 3D is a block diagram of an embodiment of the multichannel, microcomputer-based encryption system of the present invention having a fault-tolerant encryption or processing device arrangement and a fault-tolerant power supply arrangement.

FIG. 3D is a block diagram of an alternate embodiment of the system of FIG. 3B. The system 300D is similar to the system 300B. However, in the system 300D, fault-tolerant encryption devices 302D and 304D are provided as well as the fault-tolerant power supply arrangement provided by power supplies 340 and 342. The other function aspects of the system 300D are identical to the system configurations described above.

Figure 4A:
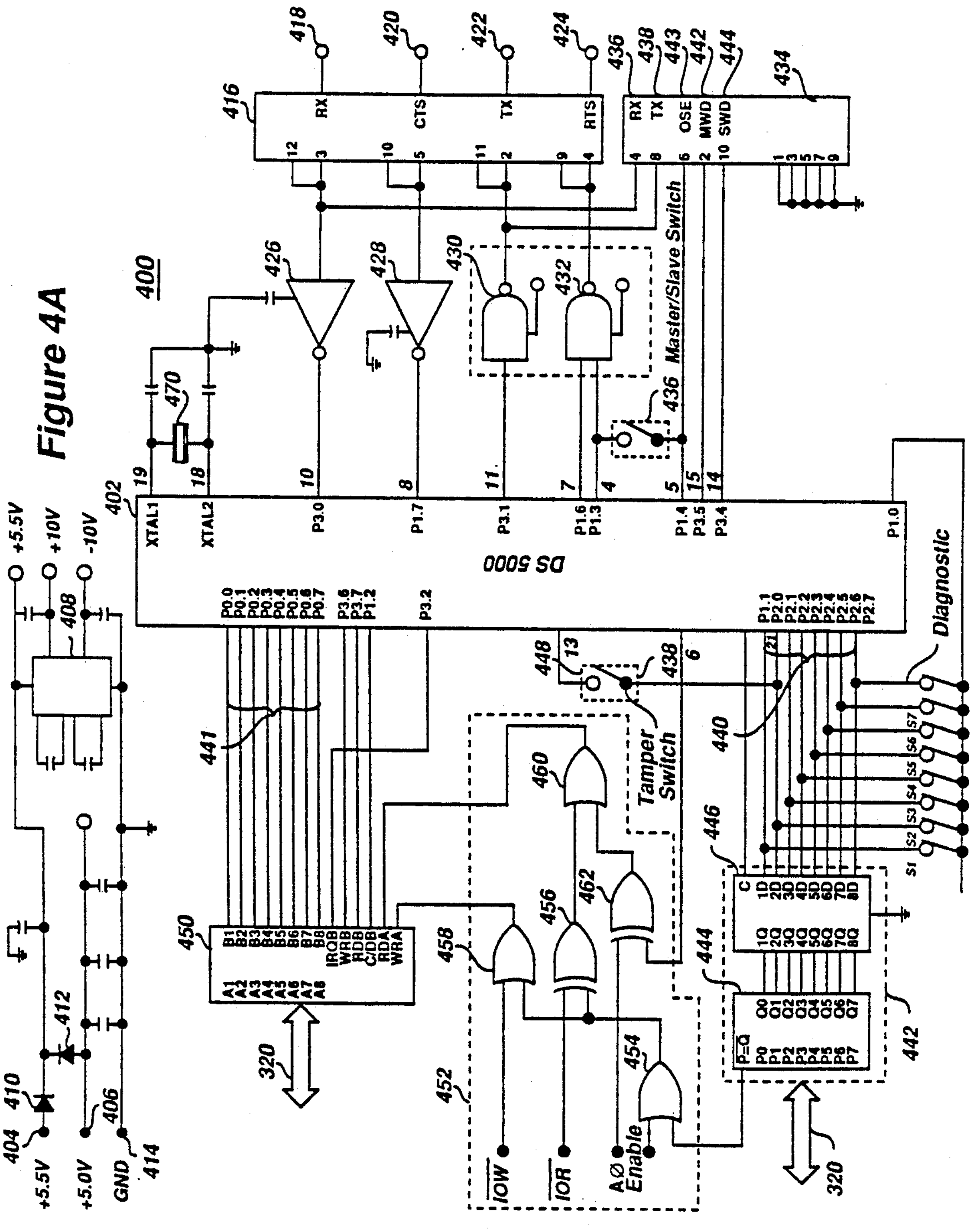
FIG. 4A is schematic diagram of an encryption device adapted for use with the system of FIG. 3A or 3C.

FIG. 4A is a schematic diagram of the encryption device of the present invention. The data encryption device 400 is adapted for implementation on a single printed circuit board and a fully configured encryption device board is herein below referred to as a data encryption board (DEB). The data encryption device 400 is implemented on the microcomputer 402, which is preferably a DS5000 microcomputer available from Dallas Semiconductor. The DS5000 microcomputer is provided with on-board ROM and RAM as well as being provided with battery backed-up RAM for non-volatile storage of data. The DS5000 microcomputer is further provided with on-board data encryption functions. While the discussion below refers to a specific implementation of a data encryption device using the DS5000 microcomputer, those skilled in the art will appreciate that other microprocessor-based systems could be substituted therefor without departing from the teachings of the present invention.

Power is provided to the data encryption device 400 through lines 404 and 406 which are coupled to the main power supply 340 and the auxiliary power supply 342, respectively. Power supply terminal 404 is coupled to the positive voltage input terminal of voltage doubler 408 through diode 410. Power supply terminal 406 is coupled to the positive voltage input terminal of voltage doubler 408 through diode 412. The ground terminal of voltage doubler 408 is coupled to terminal 414. Under normal operation, diode 412 is reverse-biased and power for the voltage doubler 408 is derived through terminal 404. However, if power is removed from terminal 404, diode 412 becomes forward-biased and power is derived through terminal 406. The voltage doubler 408 may suitably comprise a MAX680 available from MAXIM. The microcomputer 402 is coupled to the voltage doubler 408 in accordance with the manufacturer's specification for these components.

The data encryption device 400 communicates with an associated transaction processor through the RS232 connector 416 wherein the "RX" RS-232 signal is coupled to terminal 418, the "CTS" RS-232 signal is coupled to terminal 420, the "TX" RS-232 signal is coupled to terminal 422, and the "RTS" RS-232 signal is coupled to terminal 424. Terminals 418 and 420 are coupled to pins 10 and 8 of the DS5000 through RS 232 receivers 426 and 428, respectively. Pin 11 of the DS5000 is coupled to terminal 422 through inverter 430. Pins 7 and 4 of the DS5000 are coupled to the inputs of a two-input NAND gate 432 wherein the output of NAND gate 424 is coupled to terminal 424.

The data encryption device 400 is further provided with a fault-tolerant interface connector 434 wherein terminals 436 and 438 are coupled to terminals 418 and 422, respectively; terminal 443 is coupled to pin 5 of the DS5000; terminal 442 is coupled to pin 15 of the DS5000; and terminal 444 is coupled to pin 14 of the DS5000, wherein terminal 442 is coupled to a master watchdog signal and terminal 444 is coupled to a slave watchdog signal. The master/slave device designation is controlled by switch 436 which is coupled between pins 4 and 5 of the DS5000. Master and slave devices and the master and slave watchdog signals are discussed in further detail below.

The address lines 440 of microcomputer 402 are coupled to the bus 320 through address decoder 442 which comprises a comparator 444 and latch 446 coupled in a well-known configuration. The switches 51–56 are used to control the address of the DEB. For example, if switch 2 is closed, the board designation is board 2. In operation, the DEB first reads the switch to determine board number. The DEB monitor program then writes the DEB address to latch 446 and latches the data in latch 446 by strobing pin 2 of the DS5000. The address lines are then pulled high by the DS5000.

The data encryption device 400 is provided with a tamper switch 448 which is coupled between pins 13 and 21 of the DS5000 wherein pin 21 of the DS5000 corresponds to an address input as well as a tamper switch output of the DS5000. The tamper switch 438 provides a method of detecting whether an adversary is trying to gain access to the security module of the data encryption device 400 and, if so, the tamper switch 438 is activated and the contents of the memory in the DS5000 are automatically erased. In operation, the tamper switch is normally closed, thus holding the INIT1 input of the DS5000 high and if the tamper switch opens, INIT1 goes low and the DS5000 erases the data stored therein.

The data lines 441 of microcomputer 402 are coupled to bus 320 through a bidirectional first-in/first-out (BIFIFO) buffer 442. The BIFIFO 450 is of the type 67C4701 available from Advanced Micro Devices. BIFIFO is a bidirectional first-in/first-out 512 byte buffer, which is coupled to the DS5000 in accordance with the manufacturer's instructions.

Data flow in and out of the DEB 400 is controlled by the I/O_R/W logic 452, which comprises OR gates 454, 458, 456, and 462 and exclusive-OR gate 462. One input of OR gate 454 is coupled to the address enable line of bus 320. The least significant bit of the bus (line AO) is coupled to one input of exclusive-OR gate 462. The other input of exclusive-OR is coupled to pin 6 of the DS5000, which controls whether the BIFIFO responds to the bit AO or is enabled to read a slave device. One input of OR gate 458 is coupled to the bus I/O write signal. The other input of OR gate 458 is coupled to the output of OR gate 454. One input of OR gate 456 is coupled to the bus I/O read signal. The other input of OR gate 456 is coupled to the output of OR gate 454. The inputs of OR gate 460 are coupled to the output of OR gate 456 and exclusive-OR gate 462, respectively. The output of OR gate 458 is coupled to the write/enable input of BIFIFO 450. The output of OR gate of the read enable input of BIFIFO 450. This arrangement allows for asyncronous reading and writing from the BIFIFO without DS5000 interaction.

The clock signal of the DS5000 is generated internally and the frequency of the clock signal is controlled by crystal 470, which is coupled to pins 18 and 19 of the DS5000.

Figure 4B:
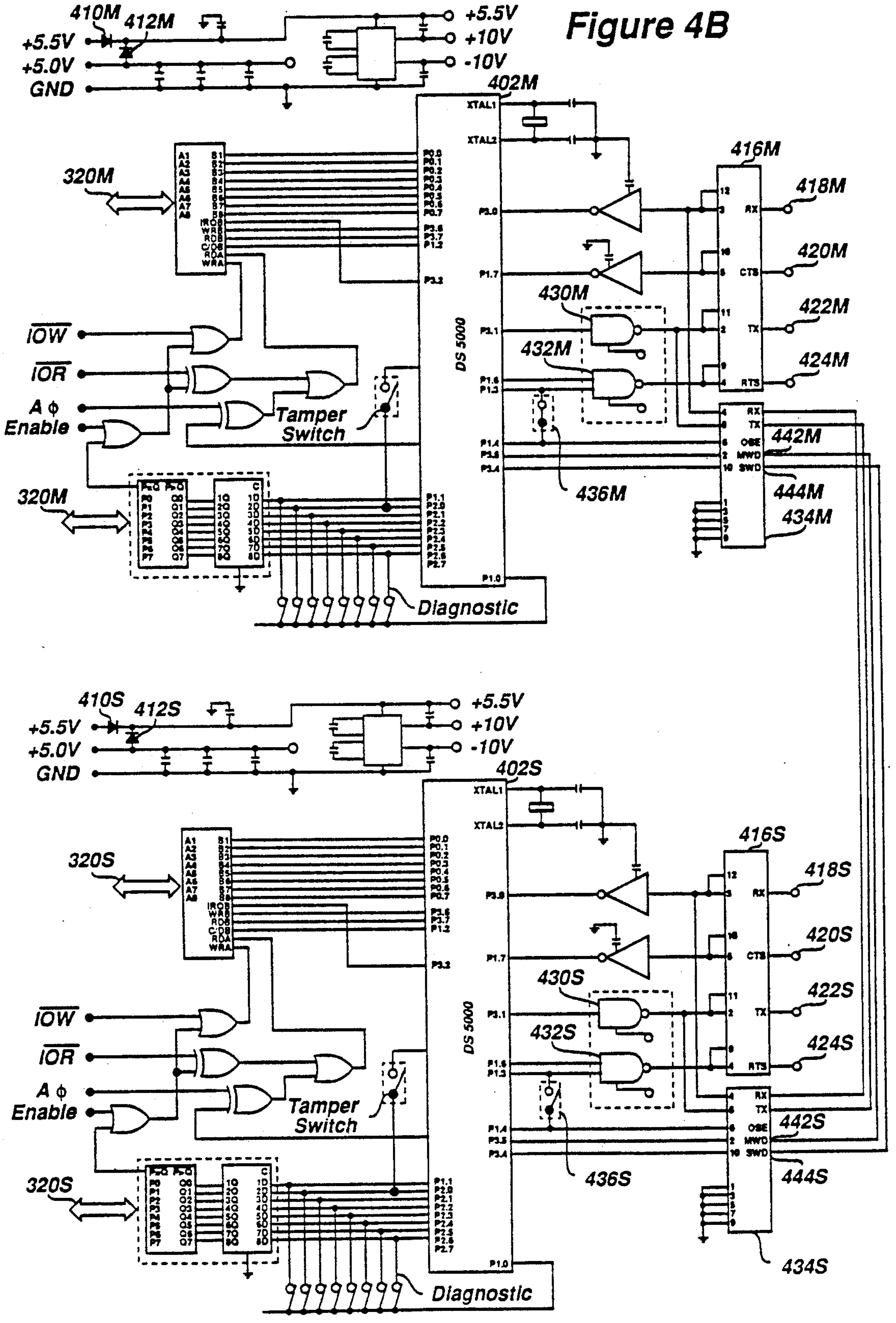
FIG. 4B is schematic diagram of an encryption device arrangement adapted for use with the system of FIG. 3B or 3D.

Referring now to FIG. 4B, the fault-tolerant data encryption device arrangement of the present invention is shown in schematic form. This aspect of the present invention incorporates two identical data encryption devices 400M and 400S wherein the master/slave switch 436M of data encryption device 400M is set in a closed position to indicate the encryption device 400M is a master and wherein the master/slave switch of data encryption device 400S is set in an open position to indicate the encryption device 400S is a slave. In addition, the fault-tolerant connectors 434M and 434S are coupled in parallel. The RS232 connector 416M is coupled to the serial interface of an associated transaction processor, and the RS232 connector 416S may be coupled to an associated device.

In operation, the master and slave watchdog timer signals are generated internally in the microcomputers 402M and 402S. The respective watchdog timer signals are periodic signals which reset an internal timer in the microcomputers 402M and 402S to indicate that the system is functioning normally. The loss of either the master watchdog timer signal or the slave watchdog timer signal indicates that the respective master or slave microcomputer 402M or 402S has failed. The signal present on terminals 440M and 440S determines whether the master data encryption device 402M or slave encryption device 402S responds to a processing request from the associated transaction processor. When the output select signal is "high", the output of microcomputer 402M is enabled through transmitter 432M. The microcomputer 402S is continually monitoring the master watchdog reset signal present on terminal 442M. If the slave microcomputer 402B determines the master has failed, the slave microcomputer 402S disables the master's output by forcing the OSE signal low, thus turning off transmitters 430 and 432.

FIGS. 5-50 are flow diagrams which describe the operation of the software that controls the operation of the data encryption devices (DEBS) of the present invention. The data encryption device control software is divided into two sections: the monitor program and the application program.

The Monitor is a program that provides many application program dependent services. These services include system initialization, interrupt servicing, application program loading, and watchdog timing. Moreover, the Monitor program is designed to operate in a fault-tolerant mode.

In the fault-tolerant mode, two DEBs operate in parallel. One DEB is designated as the master and the other DEB is designated as a slave by setting a switch on the respective DEBs. Both DEBs have the same bus address so that they receive the same data input through the BIFIFO. Similarly, both DEBs receive the same serial input from an associated transaction processor. Both DEBs are loaded with the same Monitor and Application programs.

While operating in a fault tolerant mode, the programs on both DEBs process all input data. The Monitor on the slave DEB, however, inhibits its BIFIFO and serial output unless the slave detects that the master is malfunctioning.

The slave DEB detects a malfunction in the master DEB as follows. The DEBs periodically send a watchdog reset signal to each other. The transmit interrupt routines of the slave Monitor program checks whether the master DEB has sent a signal since the last transmit interrupt occurred. If the master has not signaled, then the Monitor program on the slave DEB enables its outputs. Similarly, if the program monitor program of the master DEB determines that it is malfunctioning then the master DEB shuts down.

The Monitor and the Application programs are designed to detect the occurrence of certain hardware or software malfunctions. To ensure the integrity of its processing, the DEB shuts down when a program detects a problem. The Monitor and Application programs use the Watchdog Timer of the DS5000 to accomplish this detection. Upon initialization, the Monitor sets the Watchdog Timer. Both the Monitor and Application programs are designed to reset the Watchdog Timer periodically to prevent a timeout. If the Watchdog Timer does timeout because not reset within a prescribed period (e.g., the Application program in an infinite loop), then the DS5000 performs a reset. Upon reset, the DS5000 jumps to a predefined program location in the Monitor. If the master Monitor program determines that reset was due to problems in the software or hardware, then the Monitor invokes the stop mode of the DS5000 to effect a master DEB shutdown.

In application loading, the Monitor receives a signal from the BIFIFO, through the mailbox interrupt of the DS5000, indicating that a new Application program is to be downloaded. The Monitor clears the Appl_Present flag, to indicate that no Application program is in memory. The Monitor program prepares to receive the new Application program through the BIFIFO. The Monitor loads the Application program into the application area of DEB memory. When the Monitor has received the entire application program, the Monitor program sets the Appl_Present flag and jumps to the Appl_Start location.

The Monitor comprises several major routines. These routines include the Initial Program Load (IPL), the serial port interrupt routine, the BIFIFO (parallel port) interrupt routine, the power fail interrupt routine, the tamper switch interrupt routine, the load application routine, and the Watchdog Timer routine.

Figure 5A:
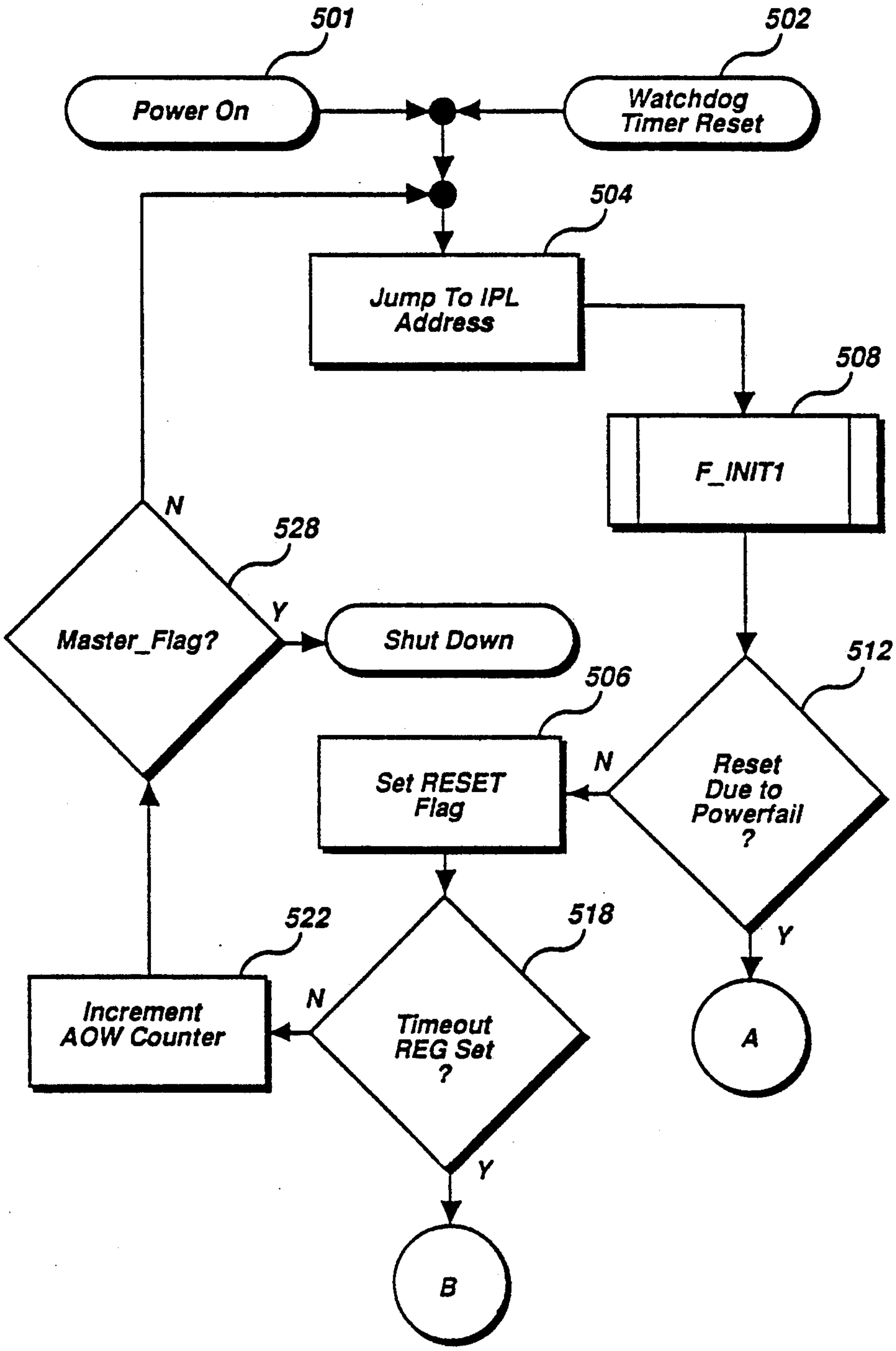
Figure 5B:
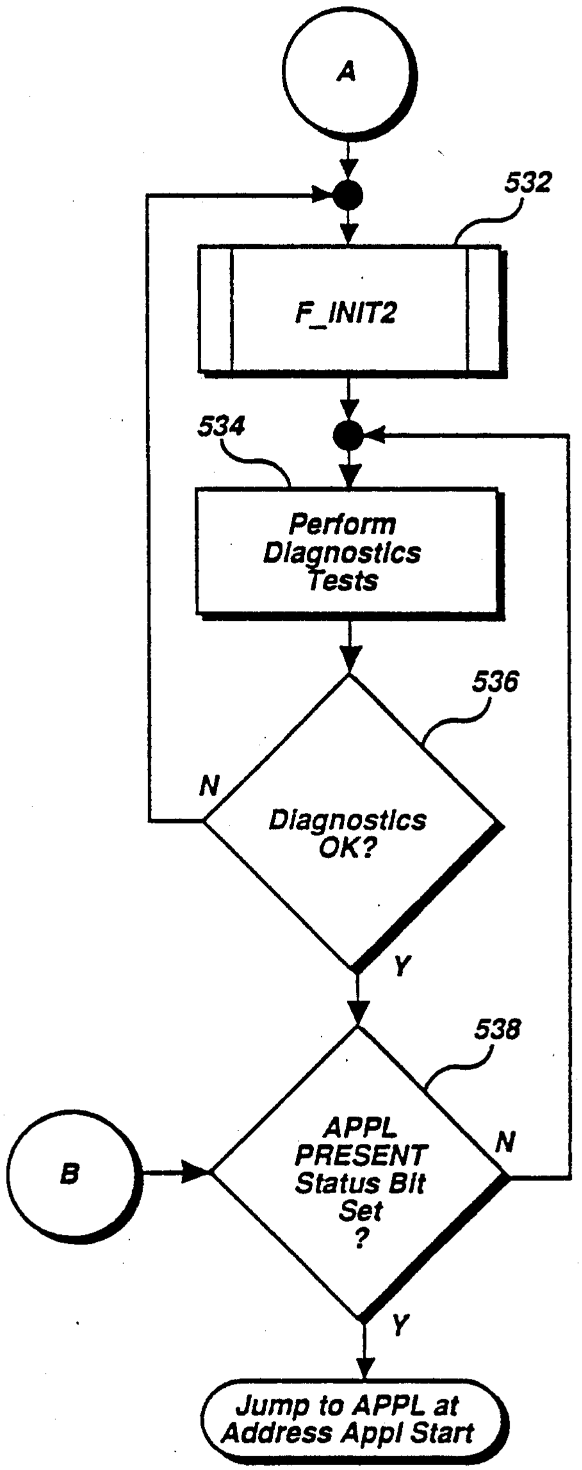
FIG. 5B is a continuation of the flow diagram of FIG. 5A.

FIGS. 5A and 5B are flow diagrams of the Monitor program that are executed when the DS5000 resets. The Monitor program determines whether the reset was due to a power on condition, or a Watchdog Timer timeout. If the reset is due to a power on condition, then the Monitor program performs a cold boot, otherwise it performs a warm boot. During a cold boot, the Monitor program performs diagnostics and initializes the I/O devices, the timers, and the interrupt routines. During a warm boot, power has not been lost since the last cold boot. Therefore, the devices, timers, and routines are already initialized.

Item 504 represents the DS5000 reset entry point. As indicated by entry points 500 and 502, the reset occurs at power up or when the Watchdog Timer times out. The DS5000 resets by starting executing at location memory 0000H.

In subroutine block 508, the Monitor calls the F_INIT1 subroutine, which is explained in detail below. Decision 512 then determines if the DS5000 reset was caused by a power on reset as indicated by the Power Control Register. If so, the Monitor program calls subroutine 532. Otherwise, the Monitor continues at item 506.

Referring now to FIG. 5B, subroutine 532 comprises the cold boot initialization routine, F_INIT2. When completed, item 534 performs diagnostic tests, such as a memory check, to ensure that the hardware is functioning properly. During the diagnostic tests of item 534, the Monitor calls the watchdog subroutine, F_WATCHDOG, which resets the Watchdog Timer and sends reset signals to the parallel master or slave DEB. The F_WATCHDOG subroutine is described in more detail below. Decision 536 determines whether the diagnostics indicate that the hardware is functioning correctly. If so, Decision 538 determines whether the Appl_Present flag is set. Otherwise, the Monitor Decision loops to subroutine 532.

Figure 14A:
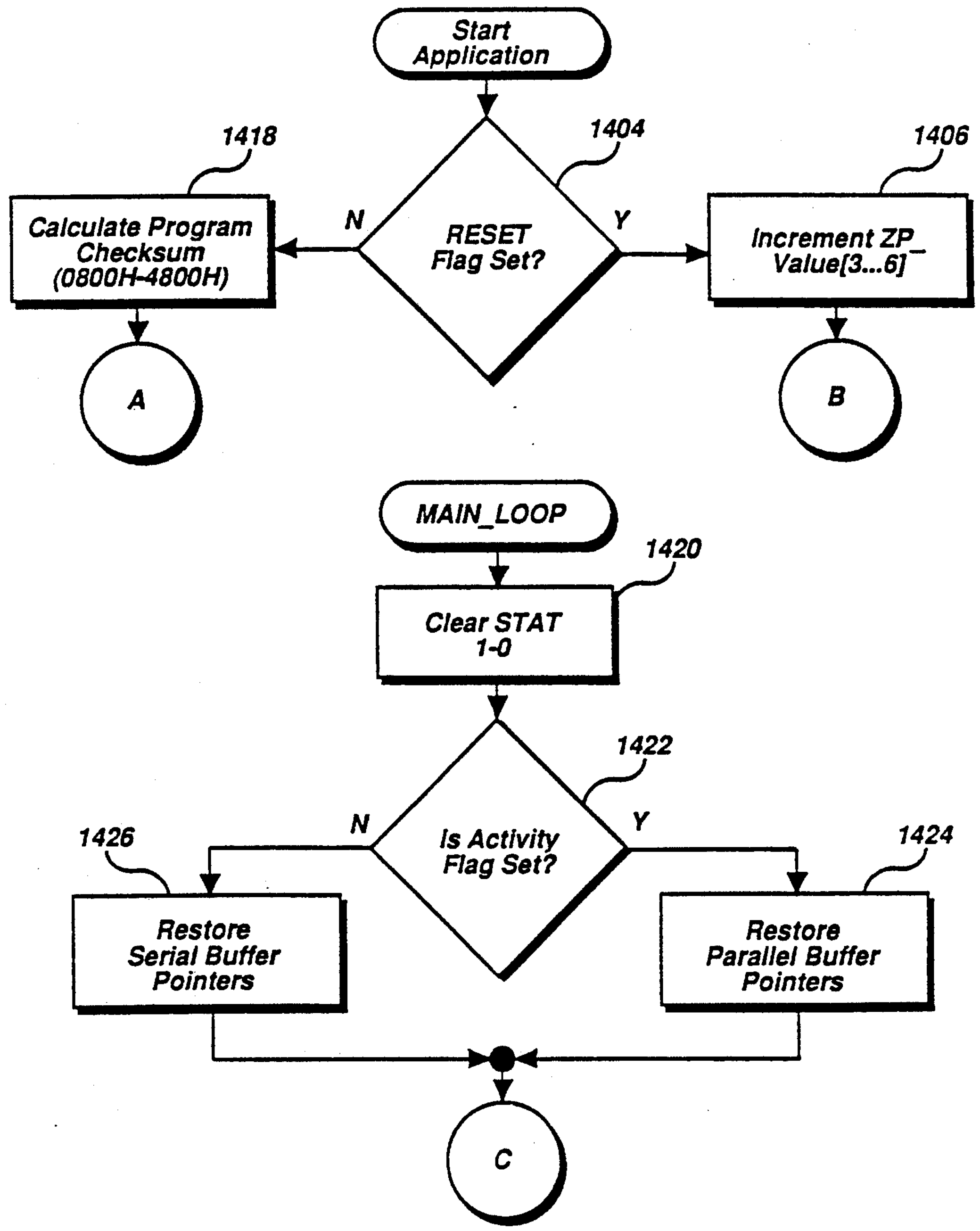
FIGS. 14A and 14B are flow diagrams of the encryption device "START_APPLICATION" routine.

If decision 538 determines that the Appl_Present flag is set, an Application program is in memory and the Monitor program jumps to the Appl_Start routine of FIG. 14A. Otherwise, the Monitor loops to item 534. The Monitor thus performs diagnostics until an Application program is loaded.

When invoked, the Appl_Start routine executes the application at the Appl_Start address. Preferably, the Monitor program resides in a memory location less than memory location 0800H, the Application program resides in memory locations 0800H through 7FFFH, and the Data resides in memory locations 8000H and above. The Appl_Start address is suitably 0802H.

Referring again to FIG. 5A, in item 506 the Monitor sets the Reset_Flag. The Reset_Flag indicates that a Watchdog Timer timeout occurred. Decision 518 determines whether the Timeout Register is set. If so, the Monitor was in the process of waiting for a message when the Watchdog Timer timeout occurred, which reset the DS5000, and the Monitor continues to decision 538 in FIG. 5B. Otherwise, there is a software or hardware problem and the Monitor continues at item 522.

In item 522, the Monitor increments the AOW counter. The AOW counter keeps count of the number of software or hardware errors that are detected as a result of the Watchdog Timer timeout. Decision 528 determines whether the Master_Flag is set, which is a diagnostic switch on the data encryption board. If so, then the Monitor program causes the DS5000 to enter the stop mode to effect a shutdown. Otherwise, the Monitor program is operating as a slave and the Monitor program loops to item 504.

The Monitor includes several subroutines and interrupt routines, which are described hereinbelow.

Figure 6:
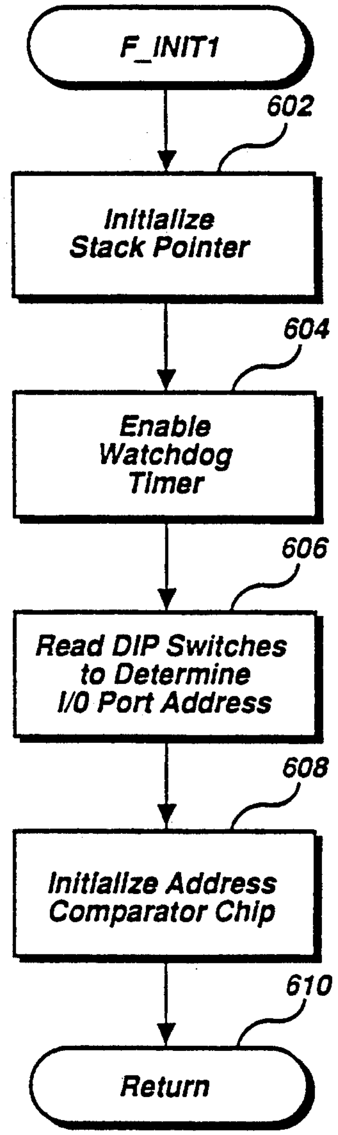

FIG. 6 is a flow diagram of the F_INIT1 subroutine, which performs warm boot initialization of the DEB. This subroutine initializes the bus address for the BIFIFO and internal pointers and timers. When initialized, item 602 initializes the stack pointer of the DS5000. Item 604 then enables the DEB Watchdog Timer. In item 606, the Monitor program reads the bus address of the parallel port as indicated by the switches coupled to the DEB address decoder circuitry 442. Item 608 then enables the address register associated with the DS5000. This latches the bus address into the address register. The BIFIFO is thereby setup to respond to the bus address stored in the user programmable switches. Subroutine F_INIT1 then returns.

Figure 7:
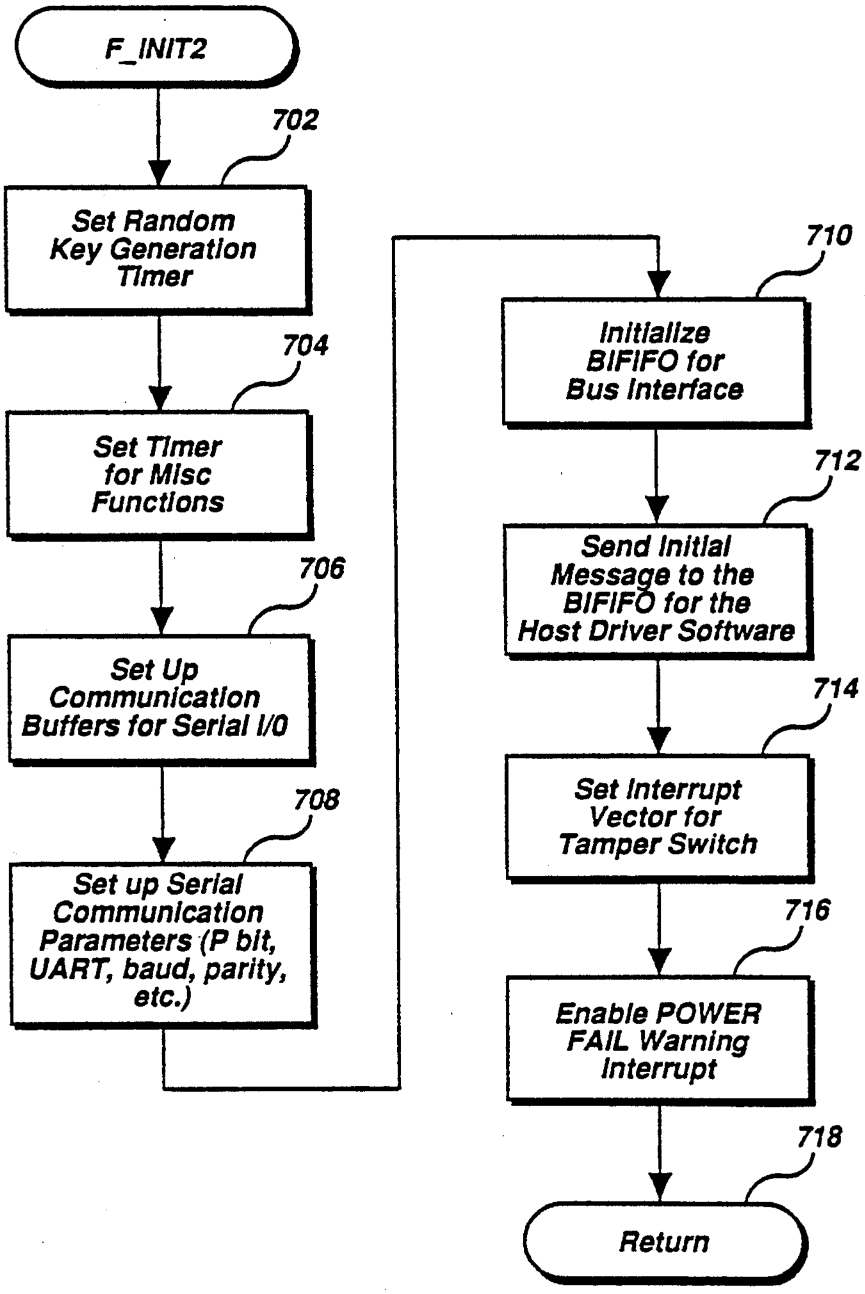

FIG. 7 is a flow diagram of the F_INIT2 subroutine, which performs cold boot initialization of a DEB. This subroutine initializes timers, I/O ports, and interrupt routines. When invoked, item 702 sets a random key generation timer for use by the Application program, and the baud rate timer. Item 704 then sets the timer for miscellaneous functions. Program control then passes to item 706, which initializes the serial I/O buffers by setting the head and tail buffer pointers for the I/O ring buffers. The operation of the serial I/O and the use of ring buffers is explained further below.

Item 708 initializes the DEB serial port communications parameters. These parameters include the baud rate, stop bits, and parity for the DEB serial port. Item 710 initializes the BIFIFO to receive data in a FIFO mode. Item 712, then transmits a message to the BIFIFO to indicate that the DEB is ready for communication with an associated transaction processor. When complete, item 714 sets the interrupt vector for the tamper switch to point to the DEB tamper switch interrupt routine. The tamper switch interrupt routine is described in more detail below. Program control then passes to item 716, which enables the Power Fail Warning interrupt so that an interrupt will occur at the start of a power failure. This interrupt allows the Monitor enough time perform an orderly shutdown and transmit a message indicating a power fail shutdown. The Power Fail interrupt routine is described in further detail below. The F_INIT2 subroutine then returns.

Figure 8A:
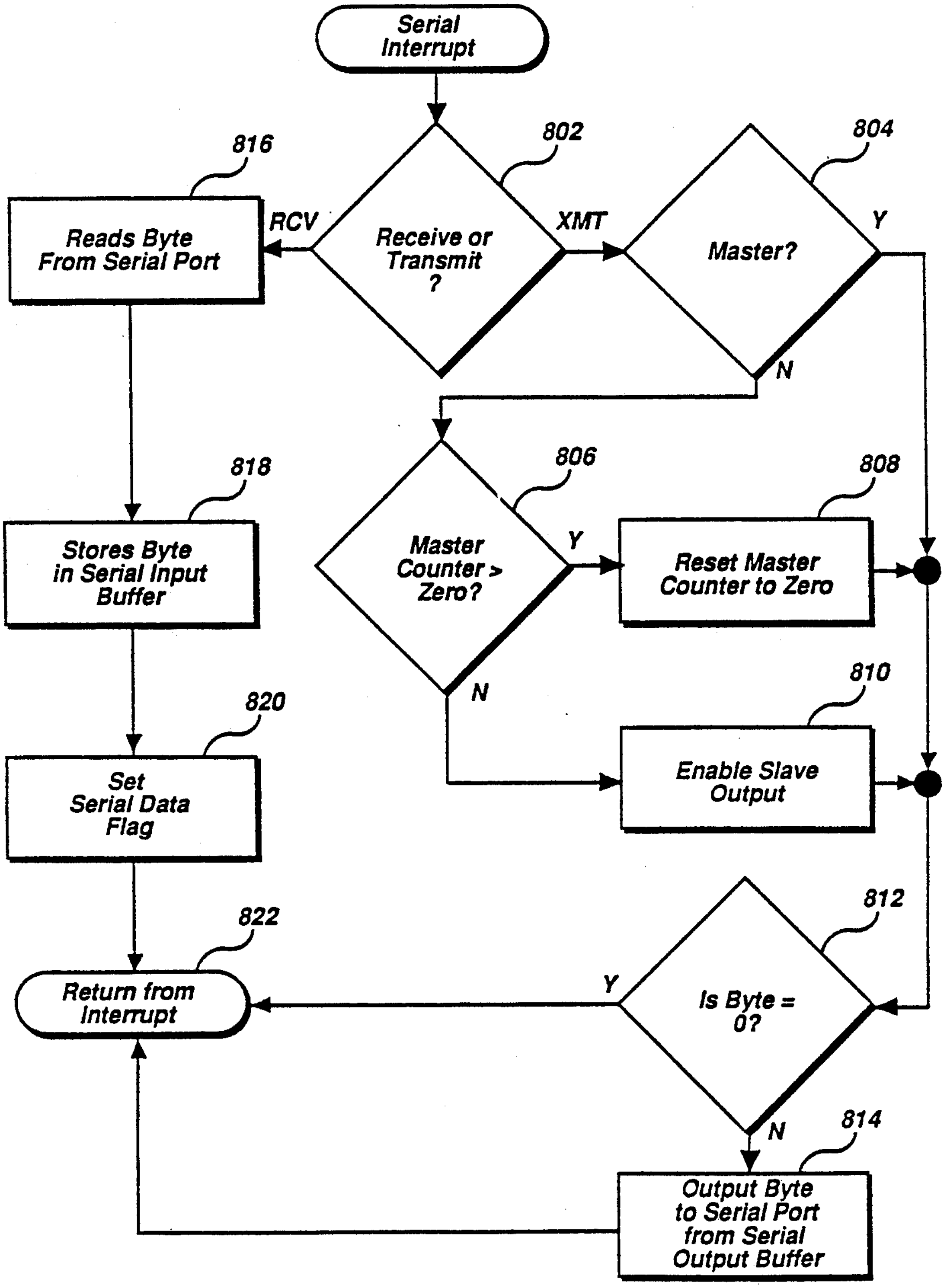
FIG. 8A is a flow diagram of the encryption device serial interrupt routine.

FIG. 8A is a flow diagram of the SERIAL_INTERRUPT routine, which is invoked whenever data is received by a DEB. The DS5000 is provided with an on-chip full duplex serial I/O port, which functions like a universal asynchronous transmitter/receiver (UART). The Monitor program provides an interrupt routine for processing serial I/O interrupts. The Monitor and Application programs transmit data to, and receive data from, the SERIAL_INTERRUPT routine through communications buffers of the respective DEBS of the present invention.

The Monitor program maintains two serial I/O buffers: one for inputs and the other for outputs (see FIG. 8B). The SERIAL_INTERRUPT routine stores the data it receives in a serial input buffer, and retrieves the data it transmits from a serial output buffer. Analogously, the Monitor and Application programs retrieve data from serial input buffers, and store data in serial output buffers.

The SERIAL_INTERRUPT routine is entered at decision 802 when a serial I/O port interrupt occurs. A serial interrupt occurs whenever data is received at a serial port of a DEB. In other words, Serial I/O port interrupts occur when the port completes the reception of a byte of data (receive interrupt) or when the port completes the transmission of a byte of data (transmit interrupt). When a serial interrupt occurs, decision 802 determines whether the serial interrupt is a transmit interrupt. If so, then the routine continues to decision 804. Otherwise the routine proceeds to item 816.

Flow diagram elements 804 through 814 represent the processing of a transmit interrupt. If the Monitor is in slave mode (Master_Flag is clear), then the routine will not actually transmit the data unless the master DEB is malfunctioning. If the serial interrupt routine of the slave DEB determines that the TO counter of the DS5000 is zero, then the serial interrupt of the slave routine assumes the master DEB is malfunctioning and thus enables the slave's DEB output. If decision 804 determines the DEB is in master mode, the routine continues to decision 812. Otherwise the routine continues to decision 806.

If decision 806 determines that the TO counter is greater than zero, then the master DEB is functioning and the routine continues to item 808. Otherwise the routine continues to item 810. Item 808 resets the TO counter so that a subsequent signal from the master DEB will make the master counter nonzero.

In item 810, the SERIAL_INTERRUPT routine in slave mode with a malfunctioning master DEB enables its output to effect fault-tolerant operation.

If the result of decision 802 is negative, the SERIAL_INTERRUPT routine retrieves the next byte to be transmitted from the serial output buffer and updates the buffer pointers. The strings stored in the serial output buffer are delimited by an end of string character (e.g., a null character). If decision 812 determines that the next byte is the end of string character, then the entire string has to be transmitted and the routine proceeds to retire 822. Otherwise the routine continues with item 814. Item 814 outputs the next byte to the serial I/O port and proceeds to item 822.

Items 816 through 820 represent the processing of receive interrupt, which involve the storing of the received byte in the serial input buffer. Item 816 reads a byte from the serial I/O port. Item 818 stores the byte in the DEB serial input buffer. Program control then passes to item 820, which sets the Serial_Flag, which indicates to the Monitor or Application programs that data has been received and has been loaded in the serial input buffer. The routine continues to return 822.

In block 822, the routine completes the interrupt processing and returns from the interrupt.

Figure 9:
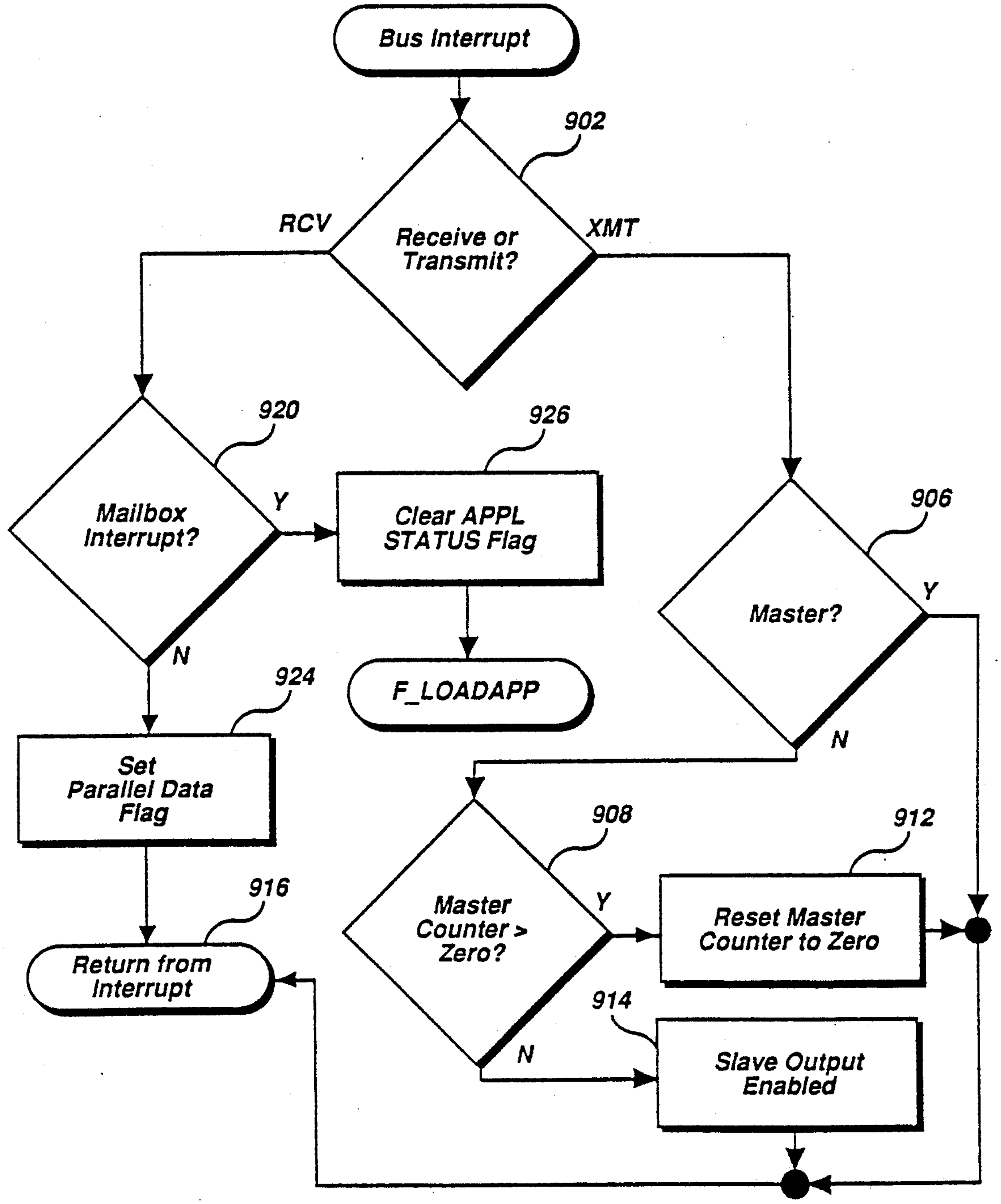
Figure 10A:
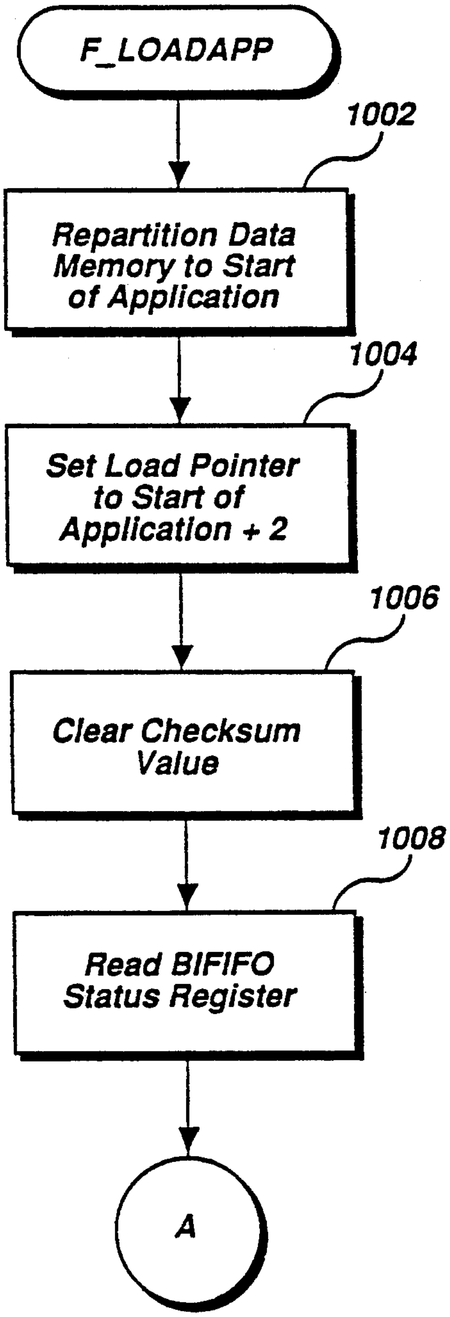
FIG. 10A is a flow diagram of the "F_LOADAPP" subroutine called by the subroutine of FIG. 9.
Figure 10B:
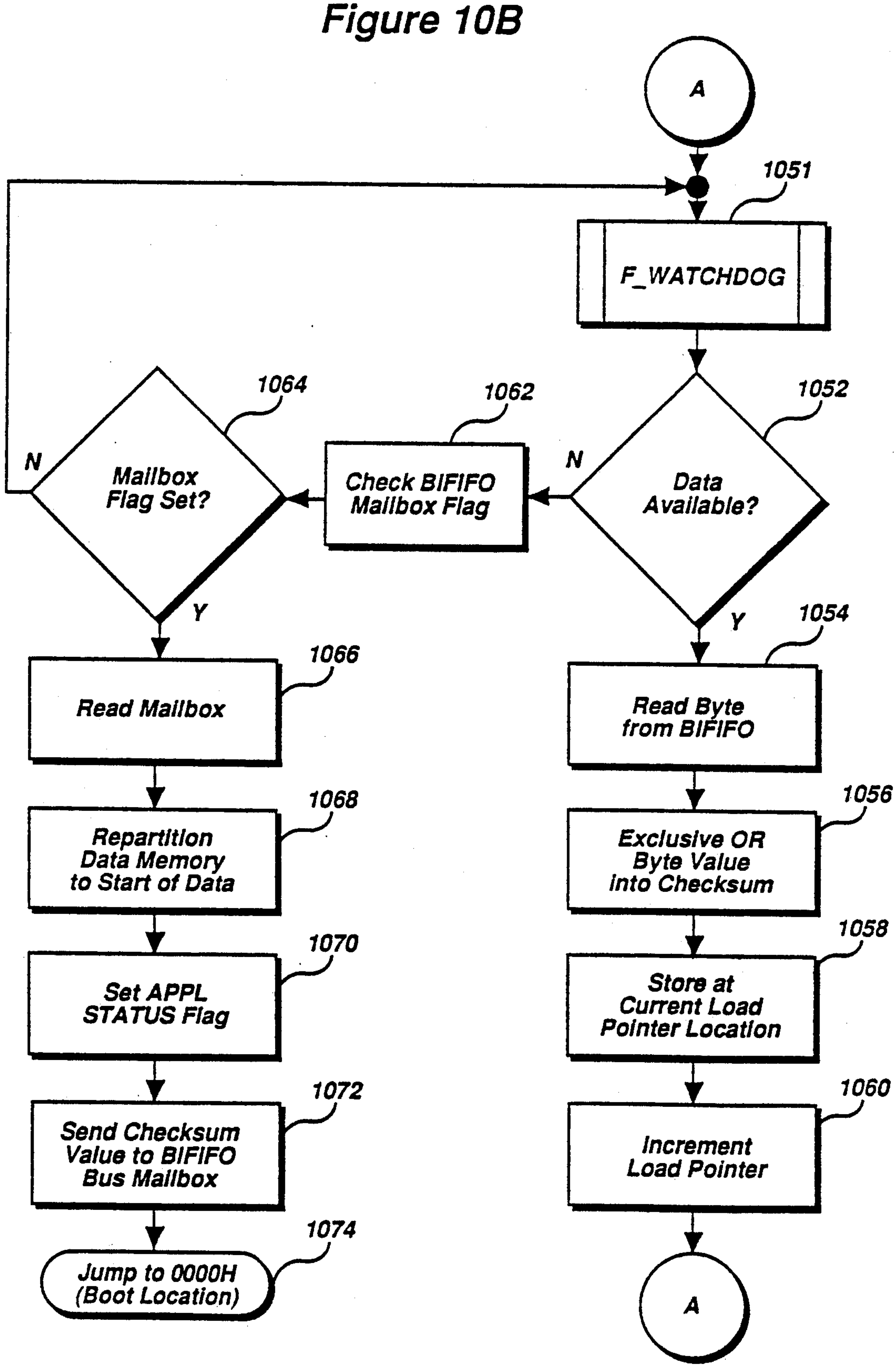
FIG. 10B is a continuation of the flow diagram of FIG. 10A.

FIGS. 9, 10A and 10B are a flow diagrams of the PARALLEL_BUS_INTERRUPT routine of the present invention. The respective DEBs of the present invention utilize bi-directional FIFO devices (BIFIFOs). A BIFIFO provides parallel communications with a predefined bus interface. In accordance with the teachings of the present invention, a BIFIFO sends an interrupt request to the DS5000 whenever the status of the BIFIFO changes. In particular, the BIFIFO generates an interrupt when data is received from the predefined bus or is transmitted to the predefined bus. The Monitor and Application programs transmit data directly to and receive data directly from the BIFIFO and do not use communications buffers in the DS5000 memory. The FIFOs of the BIFIFO function directly as communication buffers.

The PARALLEL_BUS_INTERRUPT routine also supports the downloading of an Application program from the bus. This routine enters a special processing mode while a new application is being downloaded. The Display and Control Processor initiates a download through the 8-bit mailbox of the DS5000 supported through the BIFIFO. The DS5000 goes into the special processing mode when it receives a mailbox message. In this special processing mode, the routine without using interrupts retrieves the application program from the DEB BIFIFO as it is transmitted by the Display and Control Processor. The routine stores the application in the Data Memory of the DS5000. When the transmission is complete, the routine partitions memory so that the downloaded program is part of Program Memory. The routine then effects a warm boot by preferably jumping to location 0000H.

This interrupt routine is typically entered at decision 902 when a parallel I/O port interrupt occurs. Parallel I/O port interrupts occur when the port completes the reception of a byte of data (receive interrupt) and when the port completes the transmission of a byte of data (transmit interrupt). Decision 902 determines whether the interrupt is a transmit interrupt. If so, the routine continues to decision 906. Otherwise the routine continues to decision 920.

Decisions 906 and 908 and items 912 and 914 represent the processing of a bus transmit interrupt. The processing in these blocks is analogous to the processing that is represented by decisions 804 and 806 and items 808 and 810 of the SERIAL_INTERRUPT routine of FIG. 8A. Because the communications buffers are located on the BIFIFO, this interrupt routine does not actually send transmit data to the BIFIFO because the Monitor and the Application programs place the data directly in the BIFIFO.

Decision 920 and items 924–926 represent the processing of a receive interrupt. The routine 900 first determines whether a mailbox interrupt has occurred. A mailbox interrupt indicates that a new application program is to be downloaded. If decision 920 interrupt is a mailbox interrupt, then a new application program is to be downloaded and the routine continues at block 926, otherwise the routine continues at block 924.

In item 926, the routine enters the special processing mode by clearing the Appl_Present flag and jumping to the load application routine, F_LOADAPP, shown in FIGS. 10A and 10B. The Appl_Present flag indicates whether or not an application is present in Program Memory. The F_LOADAPP routine does not perform a typical subroutine return. Rather, the subroutine effects a warm boot after it downloads the program.

The routine process a non-mailbox interrupt in item 924. In item 924, the routine sets the Parallel_Flag, which indicates that the data is available in the BIFIFO.

In item 916, the routine completes the interrupt processing by returning from the BUS_INTERRUPT.

FIGS. 10A and 10B represent the F_LOADAPP routine. This routine downloads an application program from the bus through the BIFIFO. The DS5000 cannot write to Program Memory. Consequently, this routine stores the program in Data Memory. Upon completion of the download, the routine partitions memory so that the downloaded program resides in Program Memory.

This routine calculates a checksum of the downloaded program. The checksum is a byte which represents the Exclusive-OR of each byte in the program. Upon completion of the download, the routine transmits the checksum value to the bus. If the system that sent the program determines that the checksum value is incorrect, then an error occurred in transmission and the system would typically retransmit the application program.

Referring to FIG. 10A, in block 1002, the routine partitions the Data Memory space to include the area in which the Application program is to be loaded. This partitioning is necessary because the DS5000 prohibits writing to Program Memory. In item 1004, the routine sets the Load_Pointer to point to the location, within the Data Memory space, at which the application program is to be loaded. In item 1006, the routine clears the checksum value in preparation of calculating the checksum of the downloaded program.

Referring FIG. 10B, the display and control processor 322 signifies that the download is complete by sending a message to the BIFIFO mailbox. The routine loops checking whether the input FIFO is empty. If the input FIFO is empty and if a mailbox message is present, then the download is complete Otherwise, the routine loops retrieving data from the BIFIFO and storing the data in memory.

In process 1051, the routine calls F_WATCHDOG to signal the parallel DEB that the DEB performing the download is not malfunctioning. Decision 1052 determines whether input data is available at the BIFIFO. If so, the routine downloads the data by continuing at item 1054. Otherwise the download may be complete and the routine continues at item 1062.

In item 1054, the routine reads a byte from the BIFIFO. In item 1056, the routine sets the checksum value to the exclusive-OR of the checksum value and the byte. In item 1058, the routine stores the byte at the location pointed to by the Load_Pointer. In item 1060, the routine increments the Load_Pointer and loops to process 1051 to retrieve the next byte in the program.

In decision 1064, the routine determines if the download is complete. If the mailbox flag is set, then the application program download is complete and the routine continues at block 1066. Otherwise the routine continues at process 1051 to retrieve the next byte in the program.

In items 1066 through 1074, the routine completes the download processing by partitioning memory, sending the checksum to the bus, and effecting a warm boot. In item 1066, the routine reads the mailbox to clear the mailbox. In item 1068, the routine partitions memory so that the Application program is in Program Memory. In item 1070, the routine sets the Appl_Present flag to indicate that an application is in the DS5000 memory. In item 1072, the routine transmits the checksum value to the bus through the BIFIFO mailbox. In block 1074, the routine has completed the download and effects a warm boot by jumping to 0000H.

FIG. 11 is a flow diagram of the POWERFAIL_INTERRUPT routine. The DS5000 detects when its input voltage drops below a threshold value and generates a Power Fail Warning interrupt. The POWERFAIL_INTERRUPT routine processes this interrupt.

This routine sends a message out the serial I/O port and sets the DS5000 to stop mode. In item 1102, the routine disables all interrupts. I/O step 1104, then outputs the power fail message to the serial I/O port. In block 1106, the routine puts the DS5000 in the stop mode.

Figure 13:
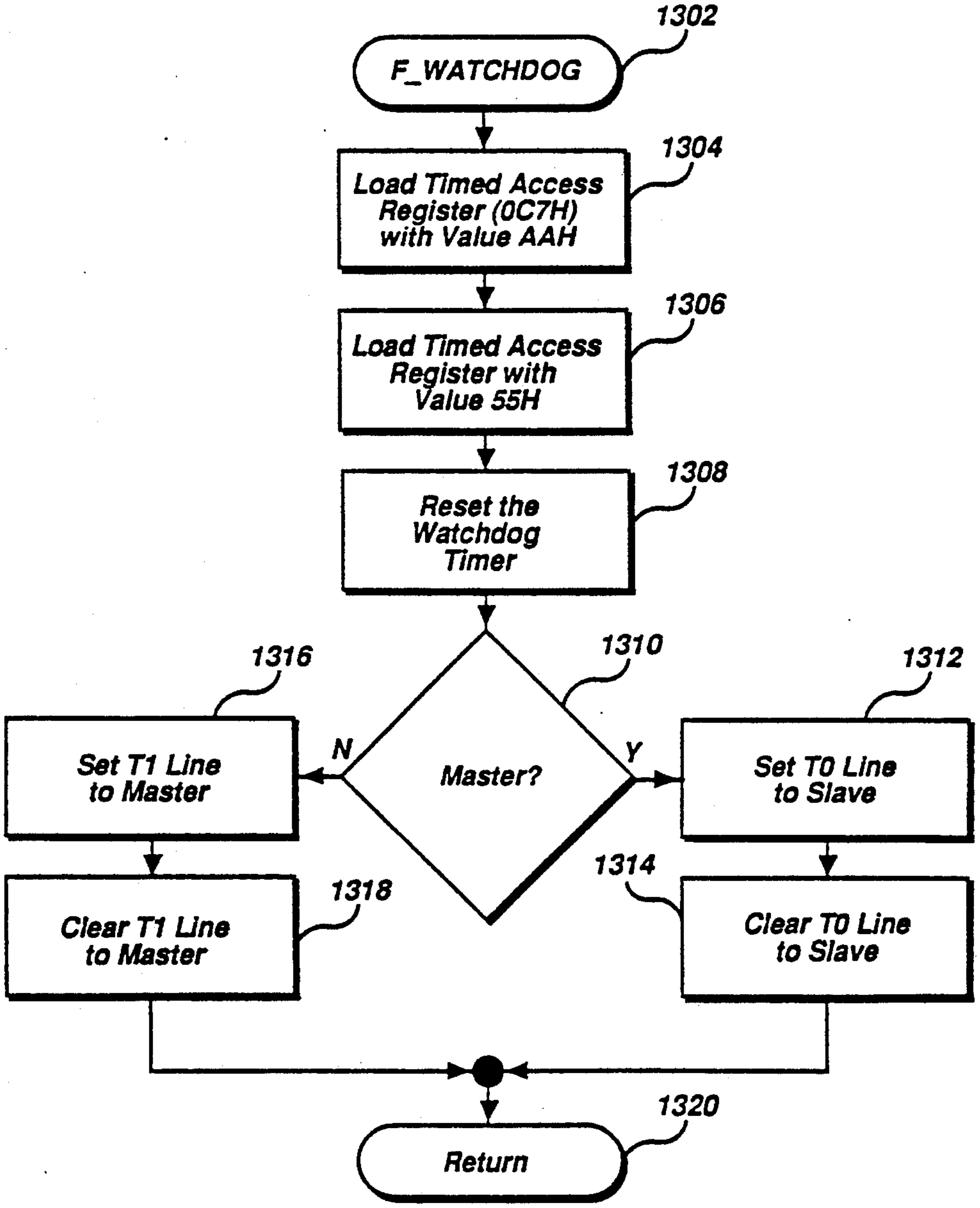

FIG. 12 is a flow diagram of the TAMPER_SWITCH_INTERRUPT routine. The DS5000 generates an interrupt when the contents of its RAM are being tampered with, as when the encapsulation module has been broken. When this occurs, the tamper switch 436 opens and interrupts the DS5000. This interrupt is referred to as the tamper switch interrupt. The TAMPER_SWITCH_INTERRUPT routine processes such an interrupt. When the tamper switch interrupt occurs, the routine zeros out the application program and data portions of memory. In item 1202, the routine partitions Data Memory to include the portion of memory that contains the Application program. In block item 1204, the routine sets a pointer to the first location to be filled with zeros. In item 1206, the routine writes a zero to the location indicated by the pointer. Decision 1208 determines whether the pointer is equal to FFFFH. If so, the routine has filled the entire Application program and data portions with zeros and the routine continues at 1212. Otherwise the routine continues at item 1210. In item 1210, the routine increments the pointer and loops to item 1206. In block 1212, the routine puts the DS5000 in stop mode to effect a shutdown FIG. 13 is a flow diagram of the F_WATCHDOG subroutine. The F_WATCHDOG subroutine performs two functions. First, the subroutine resets the Watchdog Timer to prevent a timeout. Second, the subroutine outputs a signal to signify that the DEB is functioning properly. In the fault-tolerant mode, the signal triggers a counter in the slave DEB. If the slave DEB determines that the master DEB is not signaling, that is, malfunctioning, then the slave DEB enables its outputs to effect fault tolerance. The Monitor and Application programs call this subroutine throughout their processing.

Referring to FIG. 13, in items 1302, 1304, and 1306, the subroutine resets the Watchdog Timer. The resetting of the Watchdog Timer occurs through the Timed Access Register of the DS5000. In item 1304, the subroutine loads the Timed Access Register with AAH. In item 1306, the subroutine loads the Timed Access Register with 55H. In item 1306, the subroutine sets the Reset Watch-Timer bit of the Interrupt Priority Register to effect the reset.

Decision 1310 and item 1312 through 1320 represent the signaling to the slave DEB. If the DEB is a master, then the subroutine outputs its signal on the TO line of microcomputer 402, which is coupled to terminal 442. If the DEB is a slave, then the subroutine outputs its signal on the T1 line of microcomputer 402 which is coupled to terminal 404. In decision 1310, if the DEB is in master mode (Master_Flag is set), then the subroutine continues at item 1312. Otherwise the subroutine continues at item 1316.

In items 1312 and 1314, the subroutine sets the T0 line and then clears the T0 line. This effects the sending of signal to the slave. The subroutine then continues at block 1320.

In items 1316 and 1318, the subroutine sets the T1 line and then clears the T1 line. This effects the sending of a signal to the master DEB. The subroutine then continues at block 1320.

In block 1320, the resetting of the Watchdog Timer and the signaling of the parallel DEB is complete and the subroutine returns.

The Application receives messages from either the parallel or serial ports. The Application reads in an entire message and then processes the message. (The Application processes a message containing the STAT function differently.)

Figure 14B:
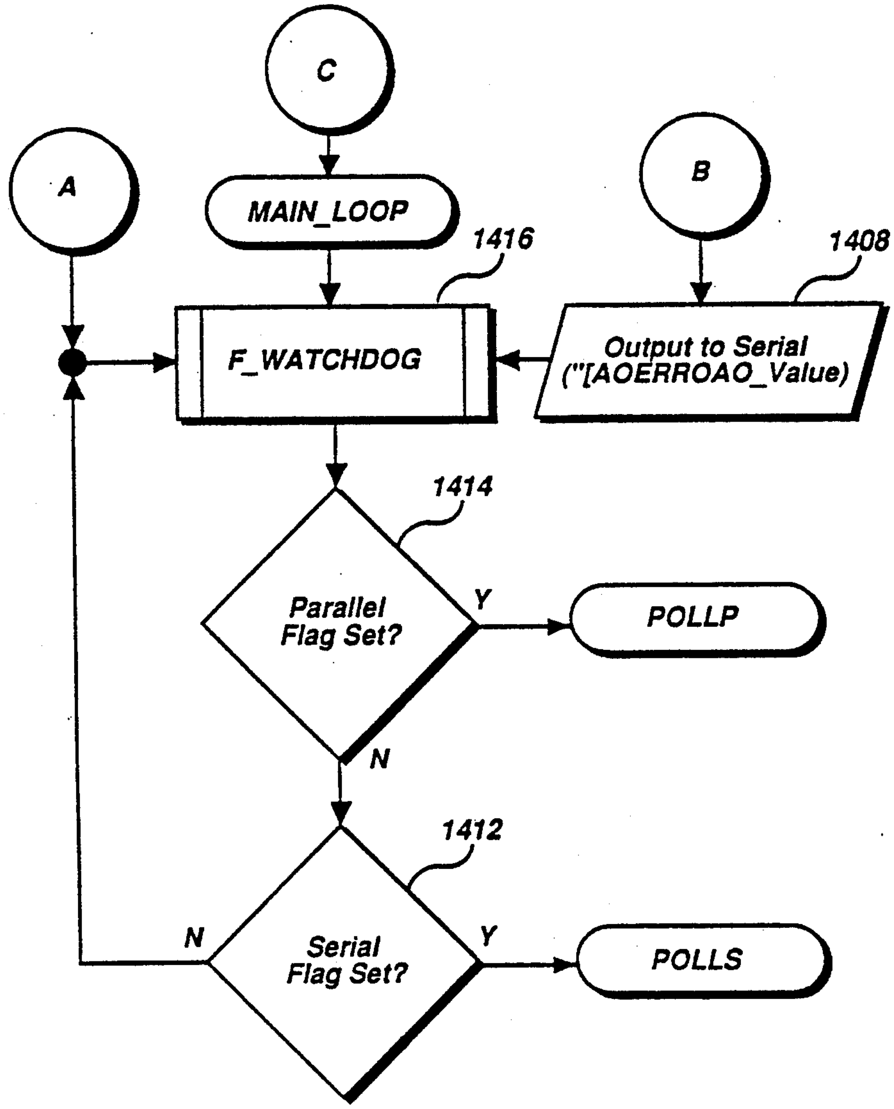

FIGS. 14A and 14B are flow diagrams of the main processing loop of the Application. The Application loops waiting for data input from either the parallel or the serial I/O ports. When data is received, the Application then proceeds to process the data. In decision 1404, if the Reset_Flag is set, then a Watchdog Timer reset caused the Application to be restarted and the Application continues at item 1406, else the Application continues at subroutine 1418.

In item 1406, the Application increments ZP_Value[3..6], which contains the number of timeout errors. In I/O block 1408, the Application outputs an error message to the serial I/O port and continues at subroutine 1416.

In subroutine 1418, the Application calls PCHKSUM, which calculates the checksum of the Application Program and stores the result in ZC_Value, which contains the program checksum. PCHKSUM calls F_WATCHDOG. The application continues at subroutine 1416.

In subroutine 1416, the Application calls the F_WATCHDOG subroutine. In decision 1414, if the Parallel_Flag is set, then data has been received from the parallel port and the Application processes the data by continuing at item 1508, otherwise the Application continues to decision 1412. In decision 1412, if the Serial_Flag is set, then data has been received from the serial port and the Application processes the data by continuing at item 1518, otherwise no data has been received and the Application loops to subroutine 1416.

The Main_Loop entry point at item 1420 represents the point to which the Application returns upon completing the processing of a message. Blocks 1420 through 1426, reset flags and pointers. Item 1420 clears the Status_Flag. In decision 1422, if the Activity_Flag is set, then item 1424 restores the pointers to the parallel, otherwise item 1426 restores the pointers to the serial buffer. The Application then continues at subroutine 1416.

Figure 15:
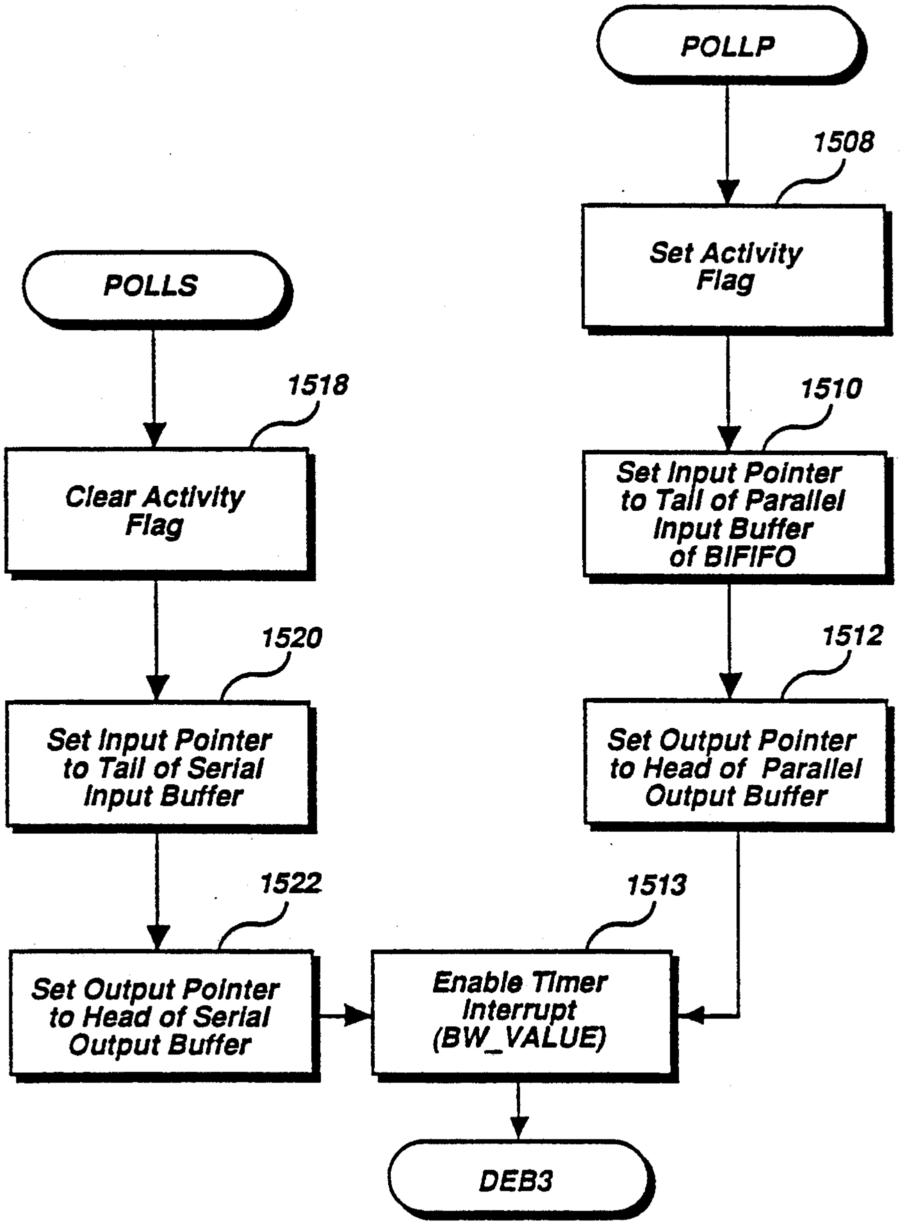
Figure 16A:
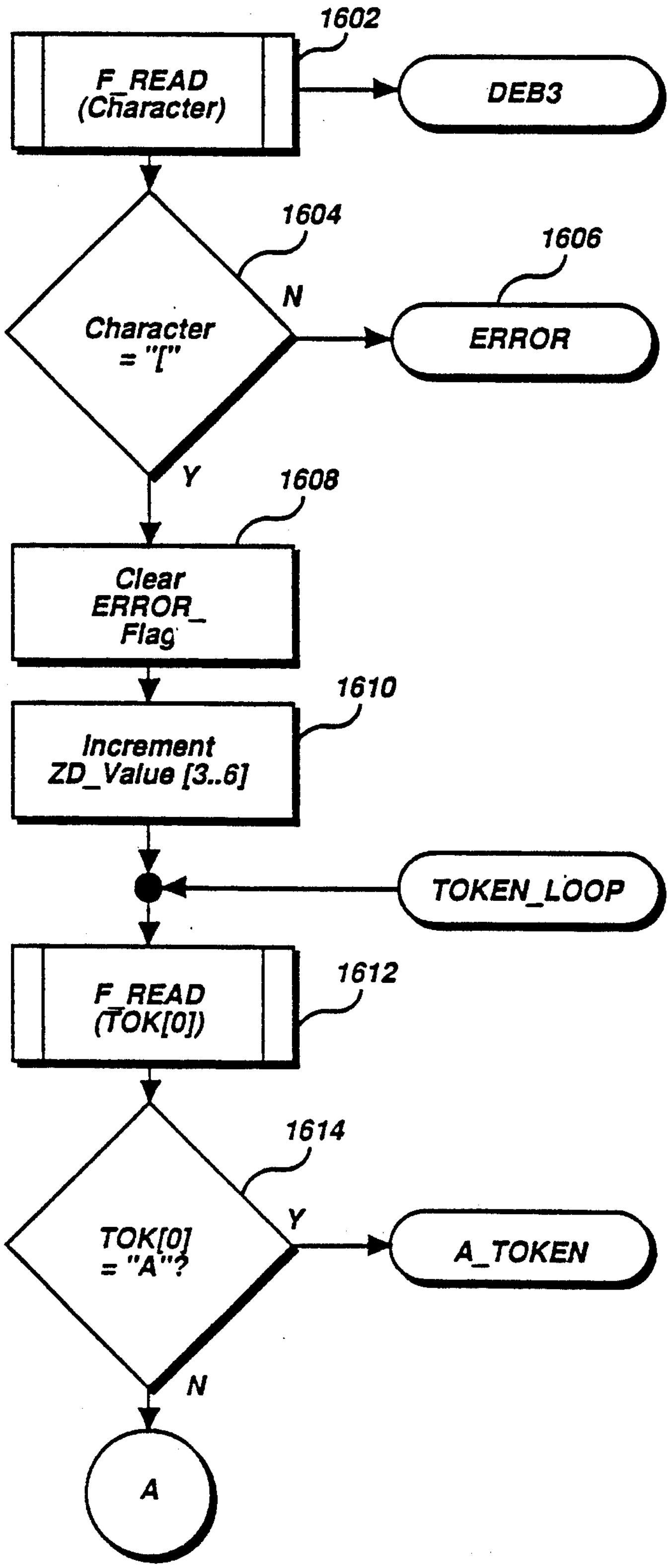
FIGS. 16A and 16B are continuations of the routine of FIG. 15.
Figure 16B:
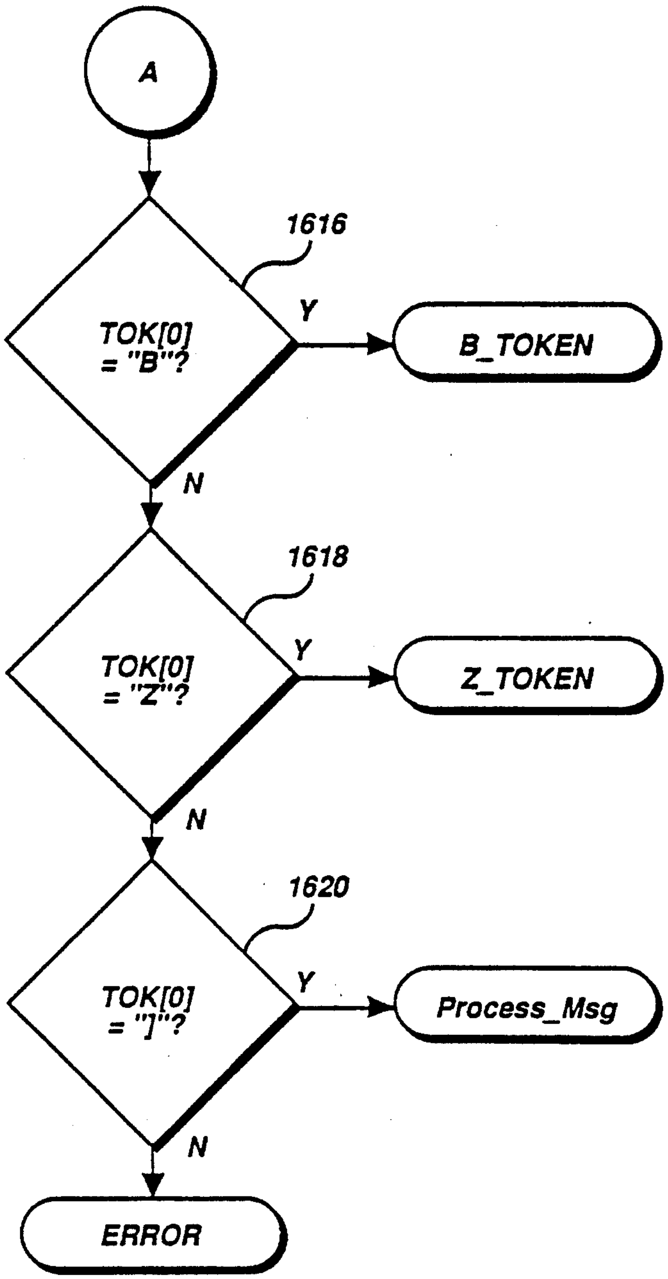

FIG. 15 and FIGS. 16A and 16B are flow diagrams of the loop that receives a message and prepares the Application data structures for processing the message. The Application processes an entire message from the interrupting port, serial or parallel, before servicing any messages on the other port. The Application initializes the input data pointers based upon the interrupting port. Items 1518 through 1522 represent the setup when the serial port interrupts, and items 1508 through 1512 represent the setup when the parallel port interrupts. The Input_Pointer and Output_Pointer variables are initialized. Each time the application inputs or outputs data during message processing it uses these pointers, which point to the serial or parallel port buffers. In item 1513, the Application enables the Timer Interrupt based upon the value in BW_Value.

FIGS. 16A and 16B are flow diagrams of the token processing loop. In subroutine 1602, the Application calls F_READ, which returns one character from the input buffer. In decision 1604, if the character is equal to "[", then the start of a message is encountered and the Application continues at item 1608, else the Application continues in block 1606 to report an error at FIG. 50. In item 1608, the Application clears the Error_Flag. In item 1610, the Application increments ZD_Value[3..6], which contains the total number of message requests, The tokenized message format of the present invention is shown in more detail in Appendix 1. Appendix 1 lists the various combinations of tokens which are utilized by the present invention along with the data fields associated with the tokens.

In blocks 1612 through 1620, the Application reads in a single token and stores the data in TOK[0] for processing when the end of message character ("]") is detected. The Application contains a token input routine for each token. These routines are logically grouped based upon the first character in the token (A, B, or Z).

Figure 17A:
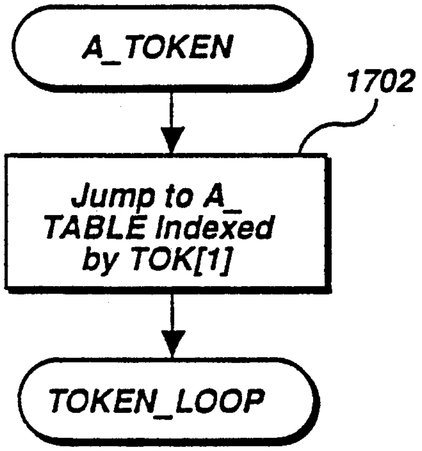
FIGS. 17A through 17C are flow diagrams of token input routines
Figure 17B:
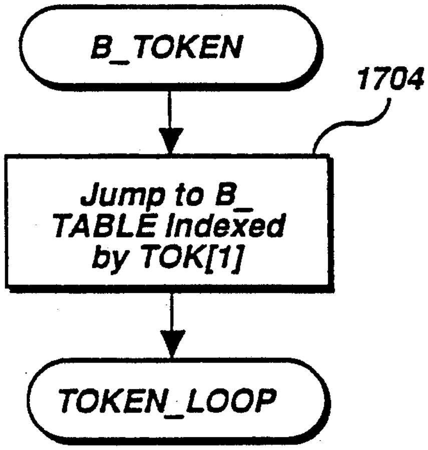
Figure 17C:
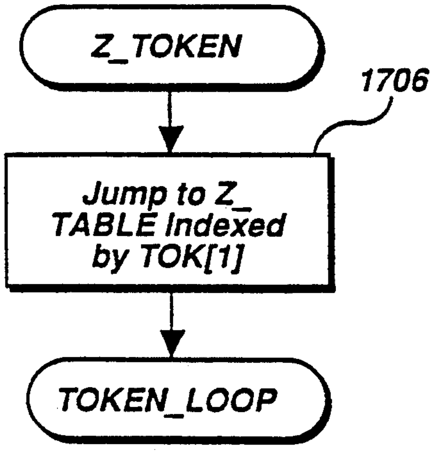
Figure 18A:
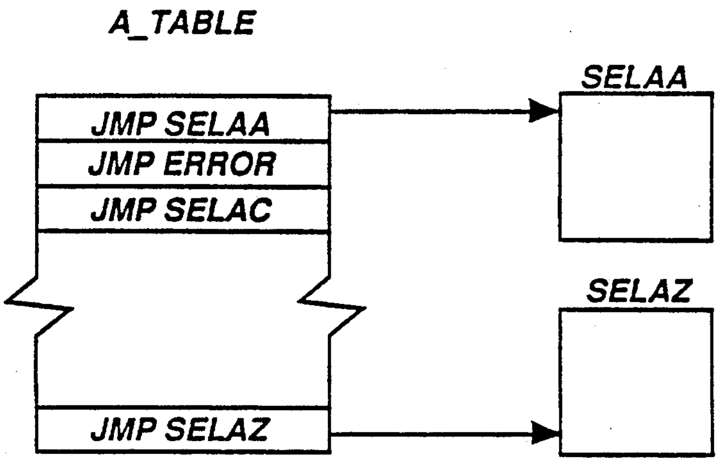
FIG. 18A is a jump table layout used by the routines of FIG. 17A.
Figure 18B:
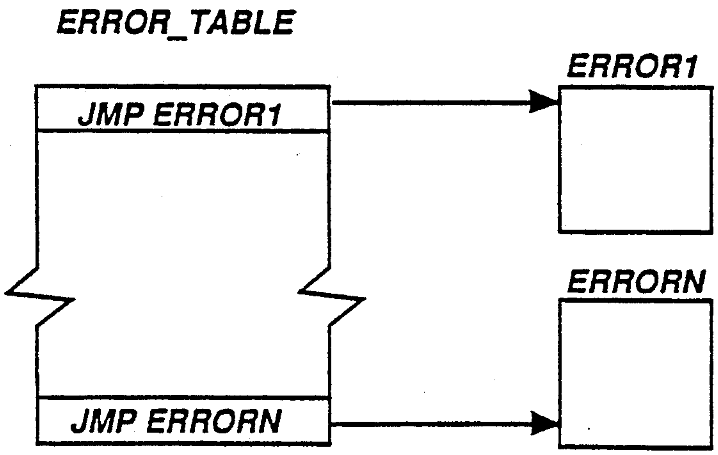
FIG. 18B is a jump table layout used by the error routine of FIG. 50.

FIG. 18A represents the grouping of the routines for tokens beginning with an "A." The Application contains a table for each of three token groupings, "A", "B", and "Z." Referring to FIG. 17A, when the Application identifies an "A" token, the Application continues at item 1702. In item 1702, the Application reads in the second character of the token and stores it in Tok[1]. The Application uses this second character as an index into the A_Table, FIG. 18A. The A_Table contains a series of jump instructions to token routines. For example, the A_Table contains as its first entry a jump to the routine named SELAA, which is the AA-token routine. The second entry contains a jump to the routine named ERROR, which is an error processing routine—no AB-token is valid. The Application processes the "B" and "Z" tokens in a similar manner. Each of the token input routines jump to the Token_Loop entry point of FIG. 16 when complete.

The Token Input Table shows the length of each token input and the allowable character type. The type "O-F" means any hexadecimal character is valid. The type "0-9" means any decimal character is valid. The type "x" means any character is valid. The type "BDIII" means the token is followed by the characters "BD" and one to three decimal digits.

The token input routines store the token input data as shown in the Token Storage Table. The description field indicates the processing that the token input routine performs before the value is stored in the Table. For example, the AA-Token input routine decrypts the AA-Input using the MFK with a modifier of 1. The term AA_Input refers to the data that is input with the AA-Token. The routine stores the result in AA_Value. The AD-token input routine store the input value in AD_Value without decrypting the value.

The token input routines also support the Key_Table processing. The Application maintains a table of keys, called Key_Table. Many of the token inputs are keys, which are 16 hexadecimal digits. Alternatively, the token inputs can be three to five digits. The input "BD" followed by up to three decimal digits indicates that a key value is to be retrieved from the Key_Table indexed by the decimal digits. This retrieved key is stored in the corresponding token value. For example, the AK-token can transmit either a 16-digit key or a "BD" followed by a 3-digit index into the Key_Table. If the AK-token input routine detects a "BD", then it uses the next three digits as in index into the Key_Table. The routine stores that Key_Table entry at AK_Value.

In a preferred embodiment, the data is stored in the Token Storage Table in packed format. The input data is received in ASCII format. However, the ASCII characters generally represent hexadecimal digits. In packed format, each two hexadecimal digits are stored in each byte. Analogously, the packed data is unpacked and converted to ASCII format before the data is output.

The Application processes the input for the AO-token specially, when the function "STAT" is received. The STAT function means that the Application is to transmit status information.

Figure 19:
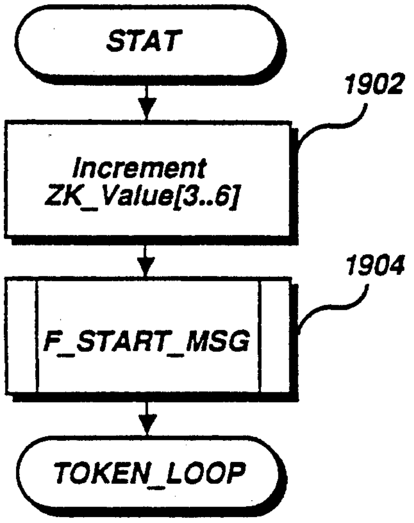

Referring to FIG. 19, in item 1902, the routine increments ZK_Value[3..6], which contains a count of control functions. The brackets indicate that bytes 3 through 6 of the value is used. In subroutine 1904, the routine calls F_START_MSG, which outputs the "[AOxxxx;" string. The routine then continues at Token_Loop to process the next token.

Figure 20A:
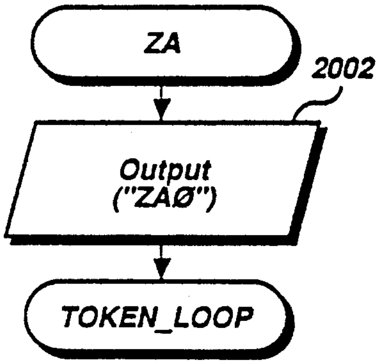
FIG. 20A is a flow diagram of the routine for processing the "ZA" token and is branched to by the routine of FIG. 17A.

Each of the tokens following the AO-token with the STAT function are Z-tokens. The Z-tokens indicate the status information the Application is to output. Referring to FIG. 20A, in item 2002, the ZA-token input routine outputs "ZA0". Throughout the description of the Application, the I/O blocks that contain the "Output" command implicitly append a ";", a token delimiter at the end of the output string. The routine then continues at Token_Loop.

Figure 20B:
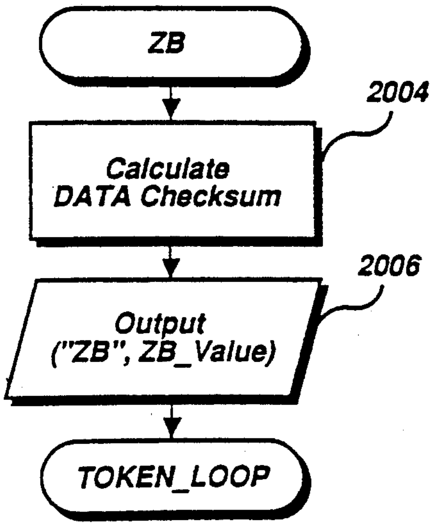
FIG. 20B is a flow diagram of the routine for processing the "ZB" token and is branched to by the routine of FIG. 17B.

Referring to FIG. 20B, in item 2004, the ZB-token input routine calculates the checksum of the Data Area and stores the result in ZB_Value. The Data Area includes the MFK, KEK, MFK_Flag, KEK_Flag, Key_Table, and the Diebold_Table. In I/O block 2006, the routine outputs "ZB" and ZB_Value. The routine continues at Token_Loop.

Figure 20C:
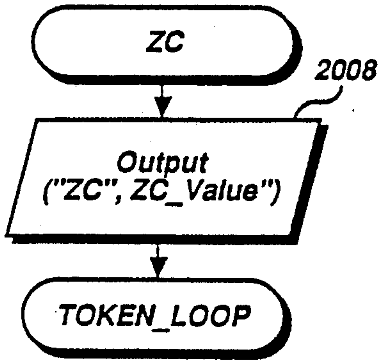
FIG. 20C is a flow diagram of the routine for processing the "ZC" token and is branched to by the routine of FIG. 17C.

Referring to FIG. 20C, in I/O block 2008, the ZC-token input routine outputs "ZP" and ZC_Value. The routine continues at Token_Loop.

Figure 20D:
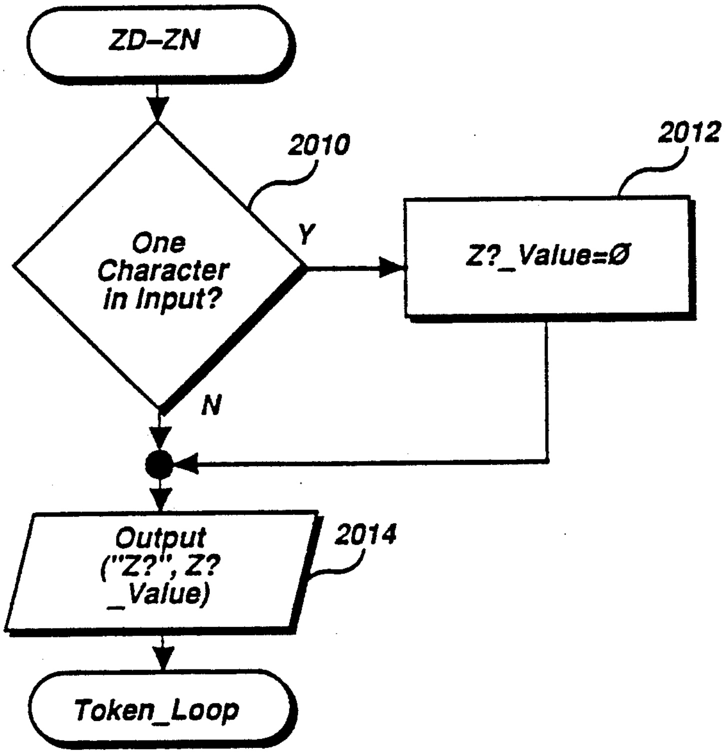
FIG. 20D is a flow diagram of the routine for processing the "ZD" through "ZP" tokens and is branched to by the routine of FIG. 17C.

FIG. 20D is a flow digram of the token input routines for tokens ZD through Zn. These routines are identical except that each routine uses the corresponding Z_Value. In decision 2010, if the input is only one character, then the routine continues at item 2012 to zero the corresponding Z_Value, else the routine continues at I/O block 2014. In I/O block 2014, the routine outputs "Z?" and Z?_Value, wherein the "?" corresponds to the second character of the token. The routine continues at Token_Loop.

TOKEN INPUT TABLE

| | Length | Character Type |
|---|---|---|
| AA | 16 | 0-F |
| AC | 16 | 0-F |
| AD | 1 | 4-C |
| AF | 4-12 | 0-9 |
| AG | 1-255 | x |
| AH | 16 | 0-F |
| AI | 5 | BDIII |
| | 16 | 0-F |
| AJ | 16 | 0-F |
| AK | 5 | BDIII |
| | 16 | 0-F |
| AL | 16 | 0-F |
| AO | 4 | x |
| AP | 5 | BDIII |
| | 16 | 0-F |
| AQ | 5 | BDIII |
| | 16 | 0-F |
| AS | 2 | 0-F |
| AT | 1 | A-F |
| AV | 1-20 | 0-F |
| AW | 1 | 1-5 |
| AX | 5 | BDIII |
| | 16 | 0-F |
| AY | 16 | 0-F |
| AZ | 16 | 0-F |
| BA | 3 | 1-9 |
| BB | 256 | x |
| BD | 3 | 1-9 |
| BE | 4-16 | 0-9 |
| BF | 1 | 2,5 |
| BG | 5 | BDIII |
| | 16 | 0-F |
| BH | 5 | BDIII |
| | 16 | 0-F |
| BJ | 1 | 0-9 |
| BK | 5 | BDIII |
| | 16 | 0-F |
| BL | 8 | 0-F |
| BO | 1-1024 | x |
| BR | 1-3 | 0-9 |
| BS | 5 | BDIII |
| | 16 | 0-F |
| BT | 5 | BDIII |
| | 16 | 0-F |
| BU | 2 | 0-9 |
| BW | 1-2 | 0-9 |
| ZA | 1 | x |
| ZB | 0-1 | x |
| ZC | 0-1 | x |
| ZD | 1 | x |
| | 8 | 0-F |
| ZE | 1 | x |
| | 8 | 0-F |
| ZF | 1 | x |
| | 8 | 0-F |
| ZG | 1 | x |
| | 8 | 0-F |
| ZH | 1 | x |
| | 8 | 0-F |
| ZI | 1 | x |
| | 8 | 0-F |
| ZJ | 1 | x |
| | 8 | 0-F |
| ZK | 1 | x |
| | 8 | 0-F |
| ZL | 1 | x |
| | 8 | 0-F |
| ZM | 1 | x |
| | 8 | 0-F |
| ZN | 1 | x |
| | 8 | 0-F |
| ZO | 1 | x |
| | 8 | 0-F |
| ZP | 1 | x |
| | 8 | 0-F |

TOKEN STORAGE TABLE

| Variable | Description |
|---|---|
| AA_Value | Decrypted AA_Input using Mod(MFK,1) |
| AC_Value | Decrypted AC_Input using Mod(MFK,4) |
| AD_Value | AD_Input |
| AF_Value | AF_Input |
| AG_Value | AG_Input |
| AH_Value | AH_Input |
| AI_Value | Decrypted AI_Input using Mod(MFK,2) or Key_Table[AI_Input] |
| AJ_Value | Decrypted AJ_Input using Mod(MFK,AS_Value[0]) |
| AK_Value | AK_Input or Key_Table[AK_Input] |
| AL_Value | AL_Input |
| AO_Value | AO_Input |
| AP_Value | Decrypted AP_Input using MFK or Key_Table[AP_Input] |
| AQ_Value | Decrypted AQ_Input using Mod(MFK,AS_Value[1]) Key_Table[AQ_Value] |
| AS_Value | Modifier AS_Input[0] |
| AT_Value | AT_Input |
| AV_Value | AV_Input |
| AW_Value | Mod(AW_Input,30H) |
| AX_Value | AX_Input or Key_Table[AX_Input] |
| AY_Value | AY_Input |
| AZ_Value | Decrypted AZ_Input using Mod(MFK,4) |
| BA_Value | BA_Input |
| BB_Value | BB_Input |
| BD_Value | BD_Input |
| BE_Value | BE_Input |
| BE_Len | Length of BE_Input |
| BF_Value | Mod(BF_Input,30H) or Key_Table[BF_Input] |
| BG_Value | Decrypted BG_Input using Mod(MFK,AS_Value[0]) Key_Table[BG_Input] |
| BH_Value | Decrypted BH_Input using Mod(KEK,AS_Value[0]) Key_Table[BH_Input] |
| BJ_Value | BJ_Input |
| BK_Value | Decrypted BK_Input using Mod(MFK,2) or Key_Table[BK_Input] |
| BL_Value | BL_Input |
| BO_Value | BO_Input |
| BR_Value | BR_Input |
| BS_Value | BS_Input or Key_Table[BS_Input] |
| BT_Value | Decrypt BT_Input using Mod(MFK,1) or Key_Table[BT_Input] |
| BU_Value | BU_Input |
| BW_Value | BW_Input |

Figure 21:
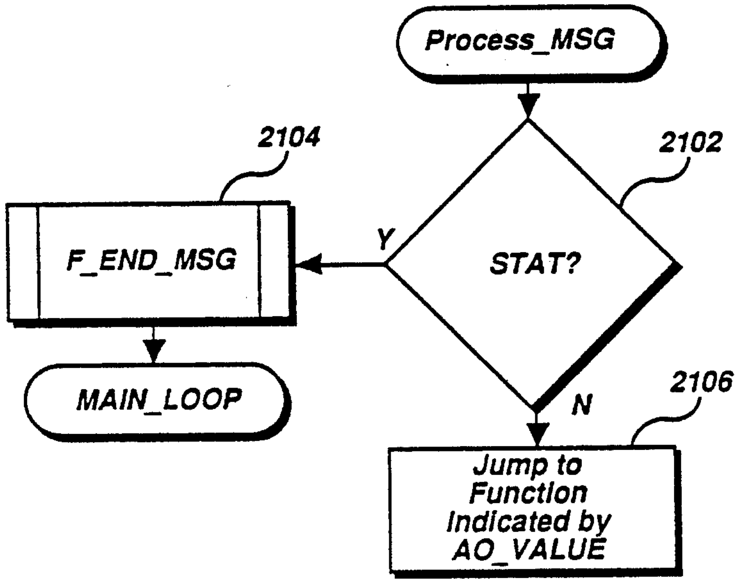

FIG. 21 is a flow diagram of the message processing loop. The Application jumps to decision 2102 from decision 1620 of FIG. 16B when the end of message character is input, "]". In decision 2102, if the AO_Value equals "STAT", then a STAT function was received in the message. Since the STAT function is processed specially as described above, the Application calls F_END_MSG to complete the response. Subroutine F_END_MSG is called by each token processing routine and is described below. When the subroutine returns, the Application continues at the Main_Loop to input and process the next message.

In decision 2102, if the AO_Value is not equal to "STAT", then the Application jumps to one of several function processing routines. The Application contains one function processing routine for each function, which are shown in FIGS. 22 through 49. In item 2106, the Application performs a series of "if-tests" to determine which processing routine to jump to. In a preferred embodiment, these "if-tests" are ordered according to the frequency at which a particular function is requested. Upon completion of each routine, the Application continues at Main_Loop to input and process the next message.

The subroutine F_END_MSG (not diagrammed), which is called at the completion of each function processing routine, performs two services. First, the subroutine outputs the message "AG" and AG_Value, if an AG-token was received in the input message. Second, the subroutine outputs a "]", the end of message character and returns.

Figure 50:
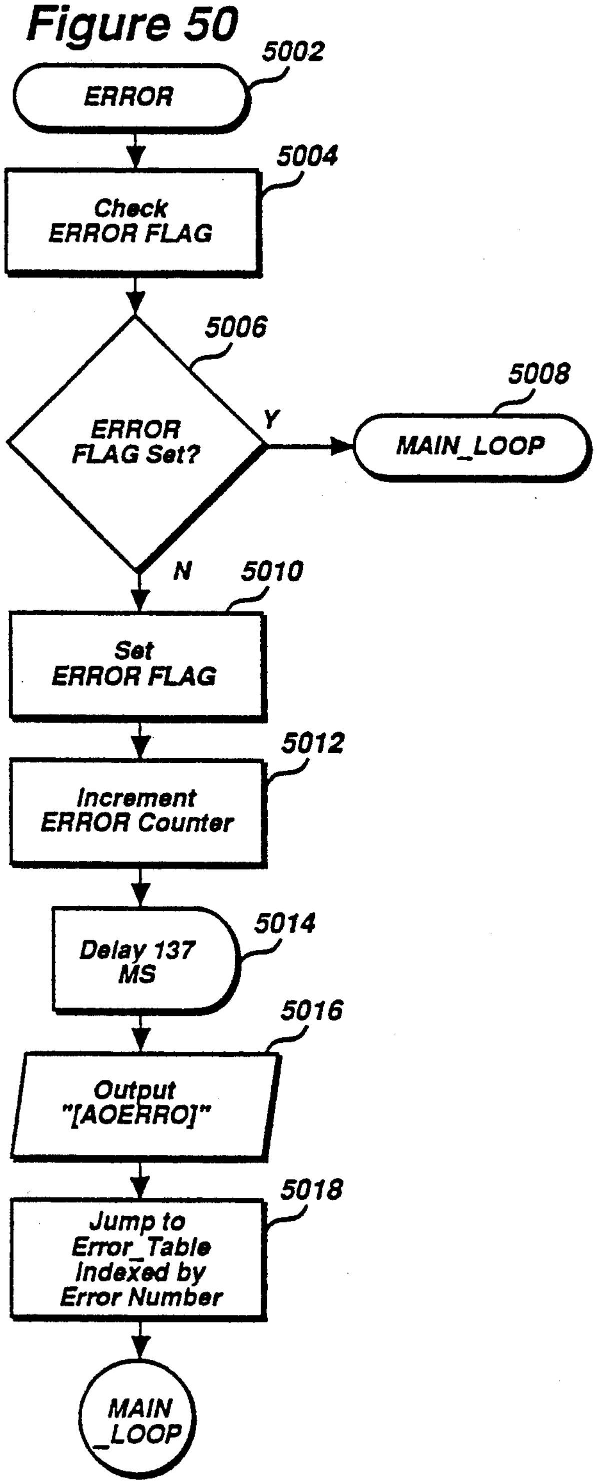

FIG. 50 is a flow diagram of the error routine. Several of the token processing routines jump to this routine when the routine detects an error. This routine outputs an error message and continues at the Main_Loop to process the next message. In decision 5006, if Error_Flag is set, then an error message has already been output for this input message and the routine continues at Main1_Loop on FIG. 14, otherwise the routine continues to item 5010. In item 5010, the routine sets Error_Flag. In item 5012, the routine increments ZL_Value, which contains a count of the errors. In item 5014, the routine delays before sending the error message. In I/O block 5016, the routine outputs the string "[AOERRO;". In item 5018, the routine uses the Error_Table, shown in FIG. 18B, to jump to an error message sending routine. Before the error routine is entered, the invoking routine sets Error_Number to indicate the error message to send. The routine uses the Error-Number as an index into the Error_Table. The routine jumps to the indexed location, which contains a jump to a routine to output the selected message. Each of these routines, upon completion, jumps to the Main_Loop.

Several of the token processing routines call the subroutines F_DES and F_DESE, which are the decryption and encryption routines. A description of algorithm is contained in the "Financial Institution Message Authentication X9.9" developed by the American National Standards Committee on Financial Services, published by the X9 Secretariat, American Bankers' Association, 1120 Connecticut Avenue, N.W., Washington, D.C. 20036, which is hereby incorporated by reference.

FUNCTIONS

CATC

Figure 22:
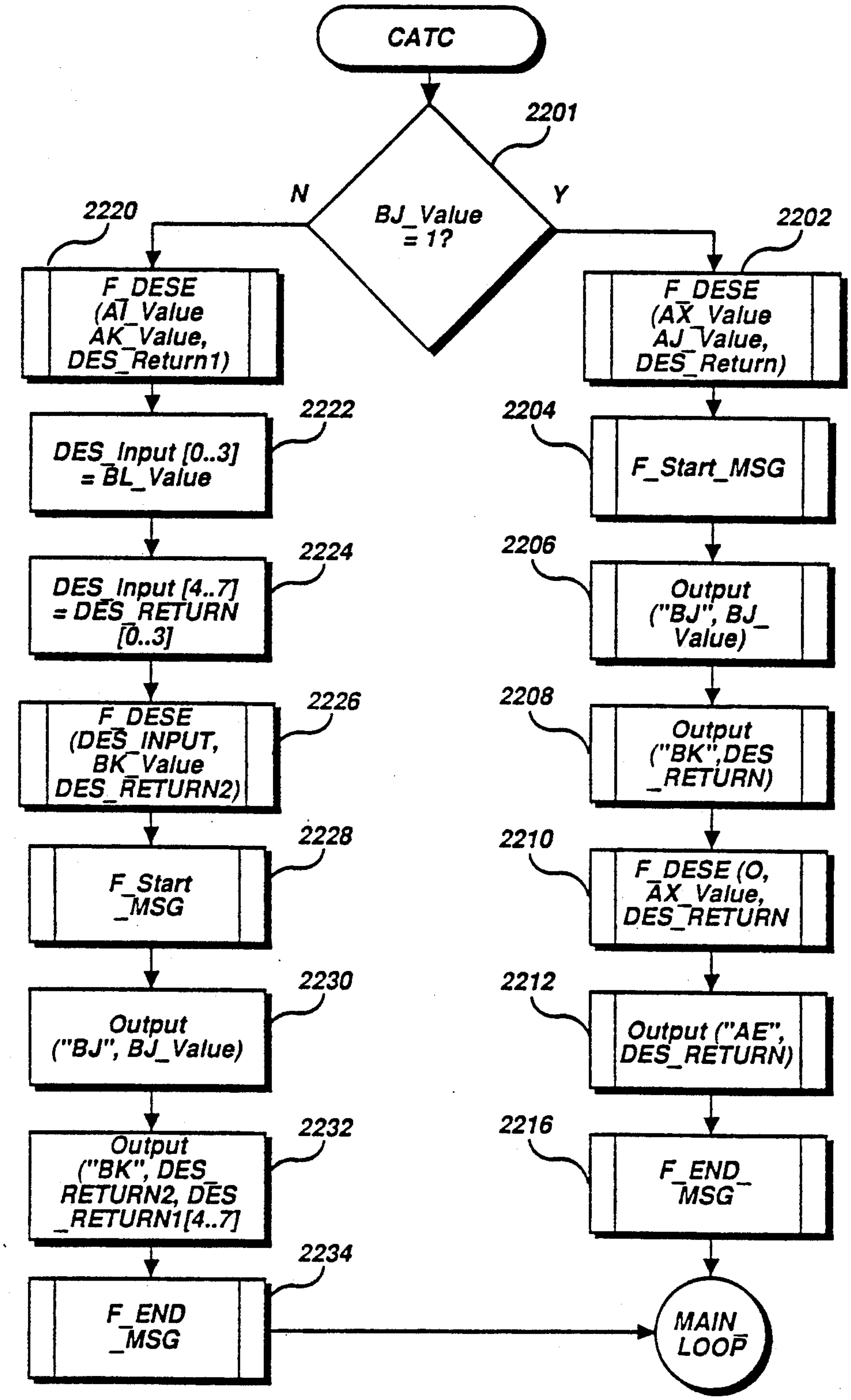

FIG. 22 is a flow chart of the CATC routine. This routine performs the CATC function. The routine encrypts the ATM Communications Key for downloading to a Diebold ATM or an IBM 3624 ATM.

In decision 2201, if the BJ-value is equal to a 1, then the Diebold ATM is specified and the routine continues at subroutine 2202, otherwise the IBM ATM is specified and the routine continues at subroutine 2220.

In blocks 2202 through 2216, the routine processes the Diebold ATM request. In subroutine 2202, the routine calls F_DESE, the encryption subroutine, with AX_Value as data and AJ_Value as key and the subroutine return the encrypted value in Des_Return. In subroutine 2204, the routine calls F_START_MSG to output the start of the output message. In I/O block 2206, the routine outputs "BJ" and the BJ_Value. In I/O block 2208, the routine outputs "BK" and Des_Return. In subroutine 2210, the routine calls F_DESE, the encryption subroutine, with zero as data and AX_Value as key and the subroutine returns the encrypted value in Des_Return. In I/O block, 2212, the routine outputs "AE" and Des_Return[0...1]. In subroutine 2216, the routine calls F_END_MSG to output the end of the output message. The routine then continues at the Main_Loop to process the next message.

In blocks 2220 through 2234, the routine processes the IBM ATM request by using the IBM double encryption algorithm. In subroutine 2220, the routine calls the F_DESE, the encryption subroutine, with the AI_Value as data and the AK_Value as key and the subroutine returns the encrypted value in Des_Return1. In items 2222 and 2224, the routine sets Des_Input[0...3] to BL_Value and Des_Input[4..7] to Des_Return1[0..3]. In subroutine 2226, the routine calls F_DESE, the encryption subroutine, with Des_Input as the data and BK_Value as the key and the subroutine returns the encrypted value in Des_Return2. In subroutine 2228, the routine calls the F_START_MSG routine to output the start of the output message. In I/O block 2230, the routine outputs "BJ" and BJ_Value. In I/O block 2232, the routine outputs "BK", Des_Return2[0..7], and Des_Return1[4..7]. In subroutine 2234, the routine calls F_END_MSG to output the end of the output message. The routine then continues at the Main13 Loop to process the next message.

CKTA

Figure 23:
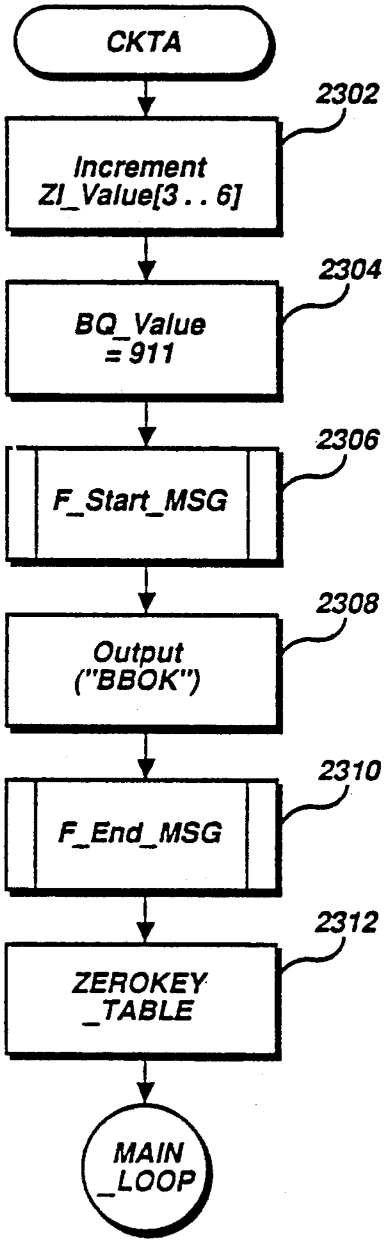

FIG. 23 is a flow chart of the CKTA routine. This routine performs the CKTA function. The routine zeros out Key_Table.

In item 2302, the routine increments the ZI_Value[3..6], which contains a count of the Key_Table functions. In item 2304, the routine sets BQ_Value to the number of entries in Key_Table. BQ_Value contains a count of the number of empty entries in Key_Table. In subroutine 2206, the routine calls F_START_MSG to output the start of the output message. In I/O block 2308, the routine outputs "BBOK". In subroutine 2310, the routine calls F_END_MSG to output the end of the output message. In item 2312, the routine places zeros throughout the Key_Table. The routine then continues at the Main_Loop to process the next message.

CLWA

Figure 24:
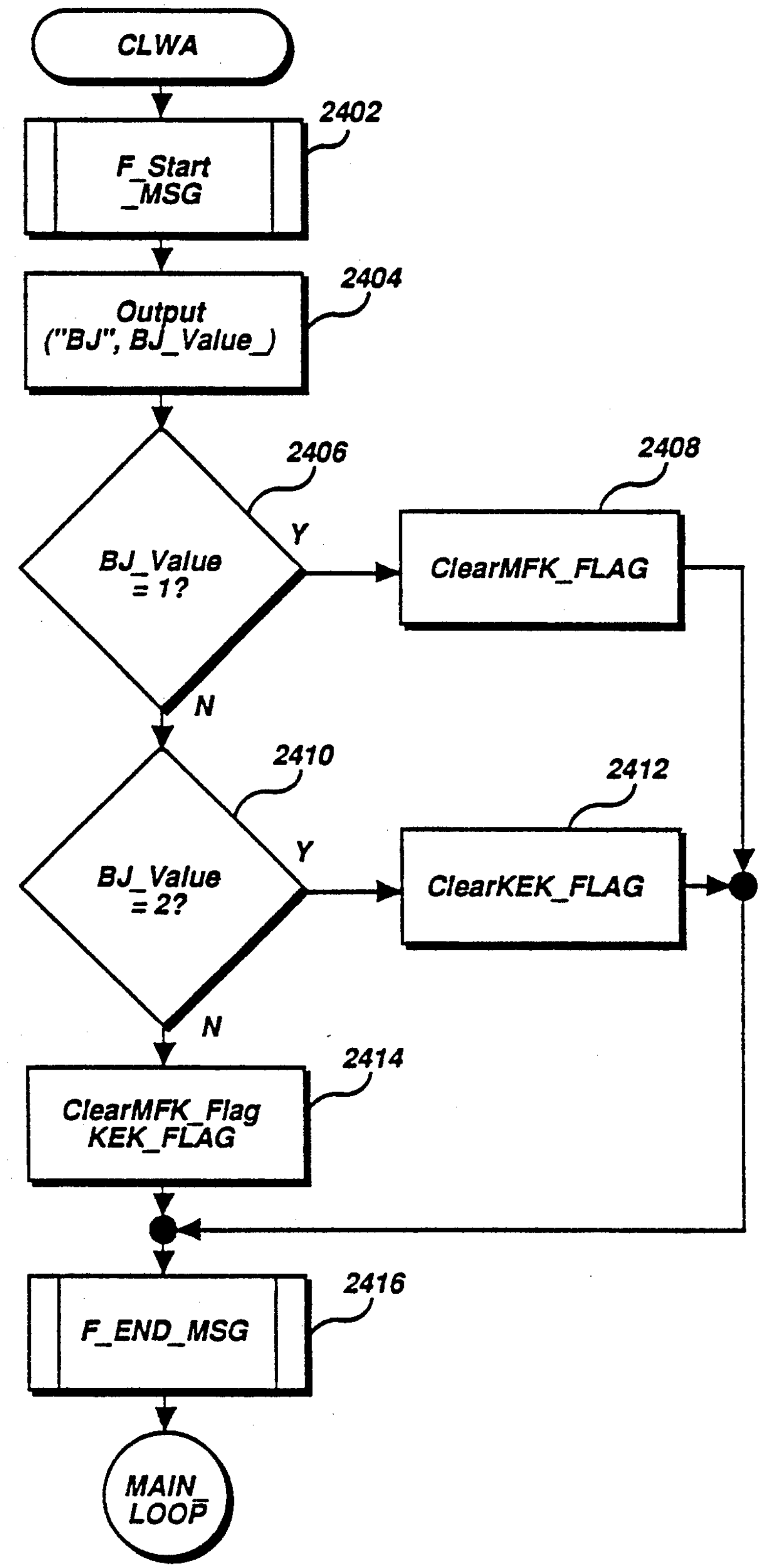

FIG. 24 is a flow chart of the CLWA routine. This routine performs a CLWA function. The routine clears the Master File Key (MFK), the Key Exchange Key (KEK), or both depending on the setting of BJ_Value.

In subroutine 2402, the routine calls F_START_MSG to output the start of the output message. In I/O block 2404, the routine outputs "BJ" and BJ_Value. In decision 2406, if BJ_Value is equal to a 1, then MFK is selected and the routine continues at item 2408, otherwise the routine continues at decision 2410. In item 2408, the routine clears MFK_Flag. In decision 2410, if BJ_Value equals 2, then clear KEK_Flag is selected and the routine continues at block 2412, otherwise the routine continues at item 2414. In item 2412, the routine clears the KEK_Flag. In item 2414, the routine clears both the MFK_Flag and the KEK_Flag. In subroutine 2416, the routine calls F_END_MSG to output the end of the output message. The routine then continues at the Main_Loop to process the next message.

CRYP

Figure 25:
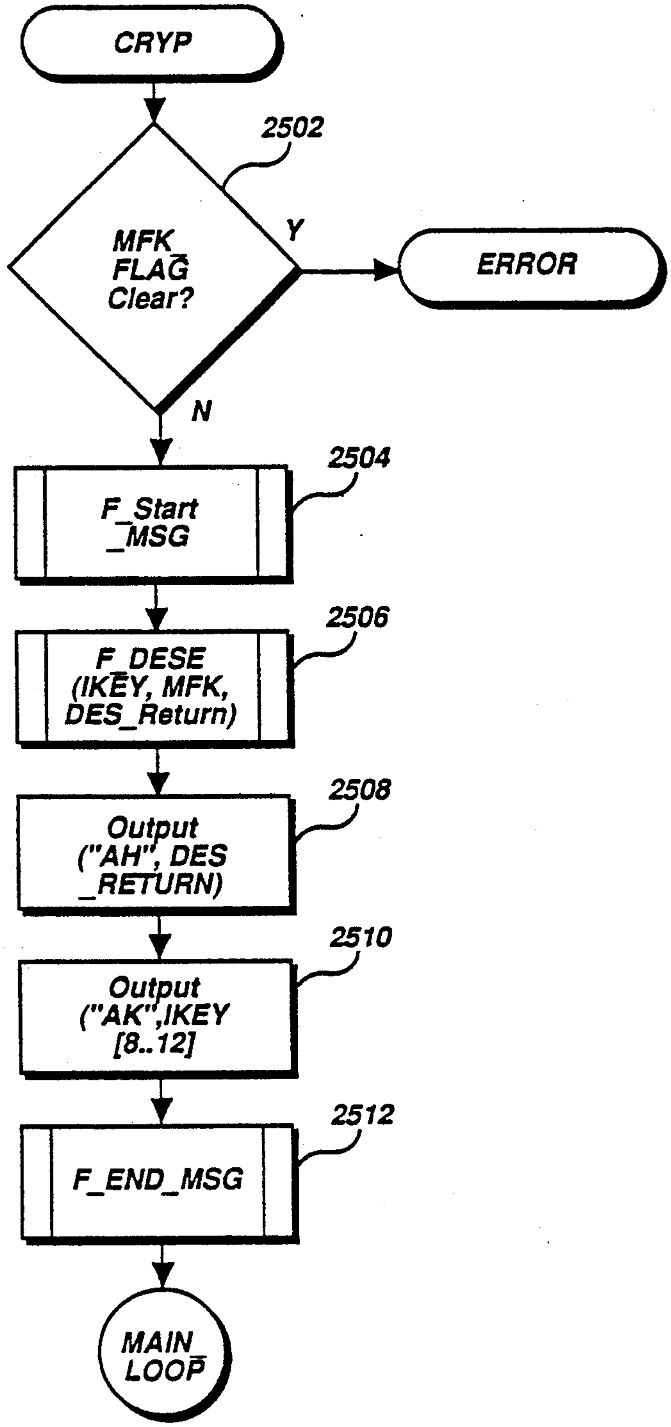

FIG. 25 is a flow chart of the CRYP routine. This routine performs the CRYP function. The routine outputs a cryptogram of the last key injected.

In decision 2502, if the MFK_Flag is clear, then a cryptogram cannot be formed and the routine processes an error, else the routine continues at subroutine 2504. In subroutine 2504, the routine calls F_START_MSG to output the start of the output message. In subroutine 2506, the routine calls F_DESE, the encryption subroutine, with IKEY as data and MFK as key and the subroutine returns the encrypted value in Des_Return. In I/O block 2508, the routine outputs "AH" and Des_Return. In I/O block 2510, the routine outputs "AK" and IKEY[8..12]. In subroutine 2512, the routine calls F_END_MSG to output the end of the output message. The routine then continues at the Main_Loop to process the next message.

CWKS

Figure 26:
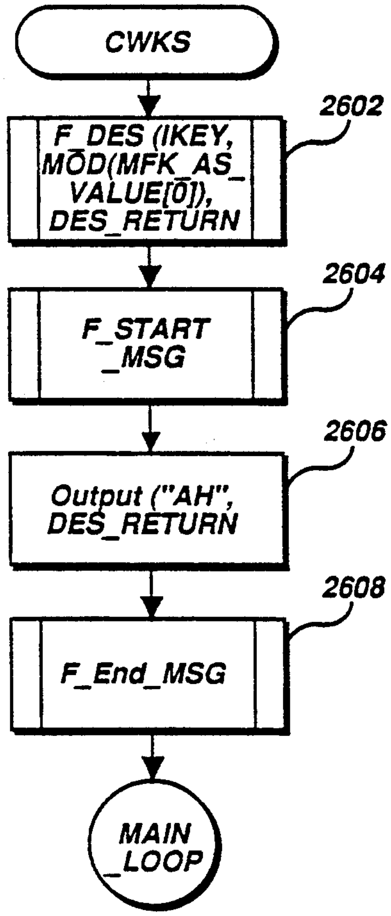

FIG. 26 is a flow chart of the CWKS routine. This routine performs a CWKS function. The routine outputs the encrypted key under a specified modifier.

In subroutine 2602, the routine calls F_DESE, the encryption subroutine, with IKEY as data and MFK modified by AS_Value[0] as key and the subroutine returns the encrypted value in Des_Return. In subroutine 2604, the routine calls F_START_MSG to output, the start of the output message. In output block 2606, the routine outputs "AH" and Des_Return. In subroutine 2608, the routine calls F_END_MSG to output the end of the output message. The routine then continues at the Main_Loop to process the next message.

DDAT

Figure 27:
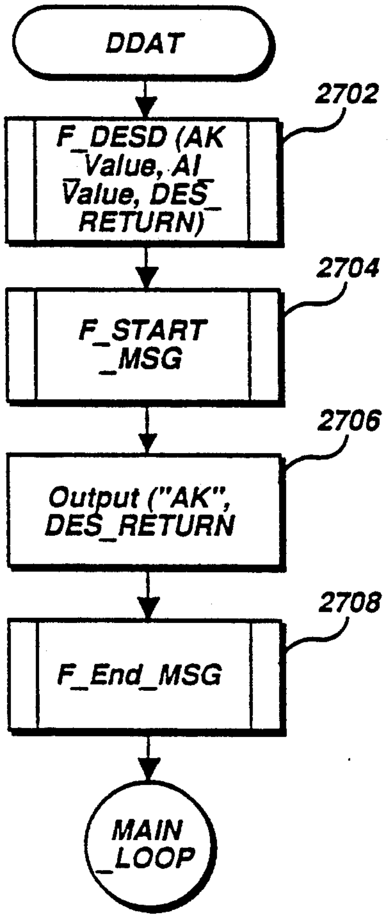

FIG. 27 is a flow chart of the DDAT routine. This routine performs the DDAT function. The routine decrypts data stored in the AK_Value.

In subroutine 2702, the routine calls F_DESD, the decryption subroutine, with AK_Value as data and AI_Value as key and the subroutine returns the decrypted data in Des_Return. In subroutine 2704, the routine calls F_START_MSG to output the start of the output message. In I/O block 2706, the routine outputs "AK" and Des_Return. In subroutine 2708, the routine calls F_END_MSG to output the end of the message. The routine then continues at the Main_Loop to process the next message.

DESD and DESE

Figure 28:
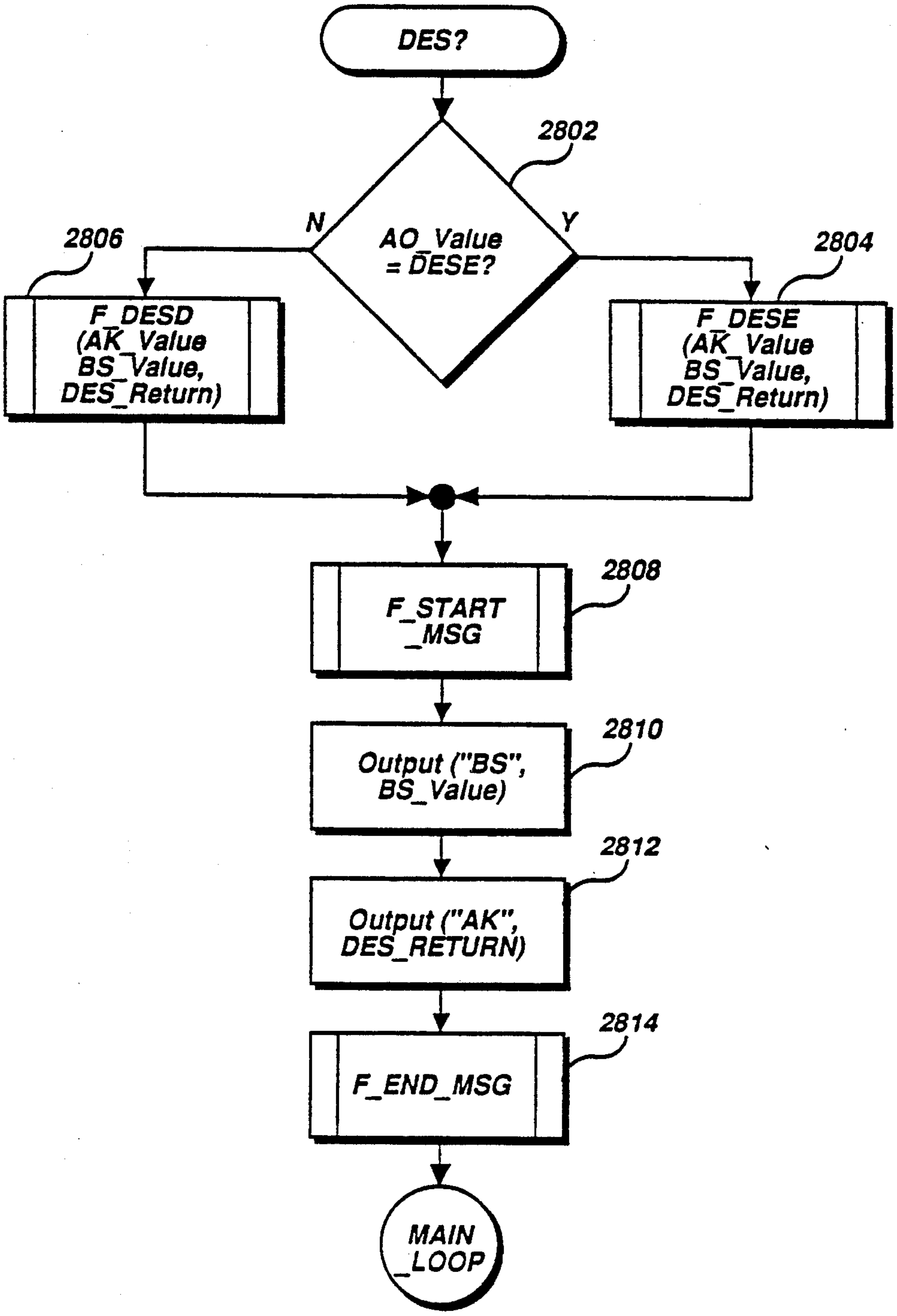

FIG. 28 is a flow chart of the DESD and DESE routines. These routines perform the DESD and DESE functions. This routine decrypts or encrypts the AK_Value depending upon whether encryption or decryption is selected.

In decision 2802, if AO_Value equals DESE, then encryption is selected and the routine continues to subroutine 2804, otherwise decryption is selected and the routine continues to subroutine 2806.

In subroutine 2804, the routine calls F_DESE, the encryption subroutine, with AK_Value as data and BS_Value as key and the subroutine returns the encrypted value in Des_Return. The routine then continues to subroutine 2808.

In subroutine 2806, the routine calls F_DESD, the decryption subroutine, with AK_Value as data and BS_Value as key and the subroutine returns the decrypted data in Des_Return. The routine then continues at subroutine 2808.

In subroutine 2808, the routine calls F_START_MSG to output the start of the output message. In I/O block 2810, the routine outputs "BS" and BS_Value. In I/O block 2812, the routine outputs "AK" and Des_Return. In subroutine 2814, the routine calls F_END_MSG to output the end of the output message. The routine then continues at the Main_Loop to process the next message.

DKTE

Figure 29:
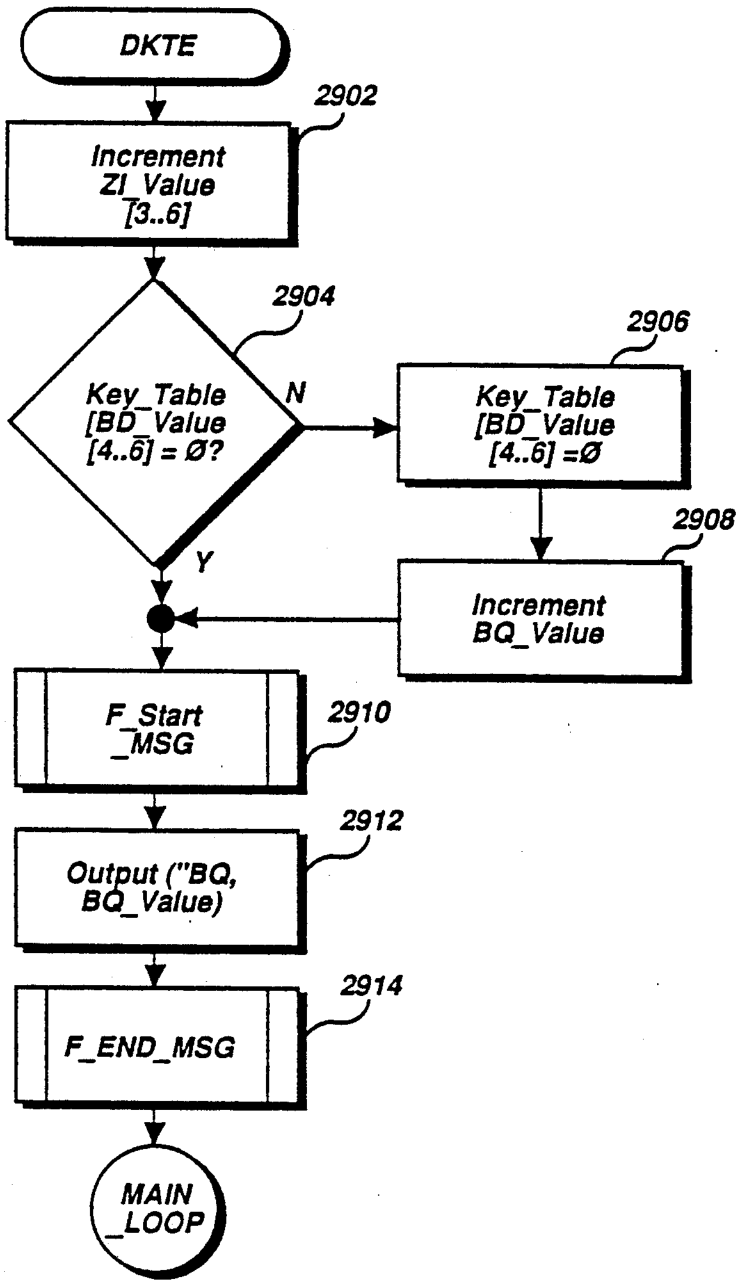

FIG. 29 is a flow chart of the DKTE routine. This routine performs the DKTE function. This routine deletes an entry from the Key Table indicated by the index stored in BD_Value[4..6].

In item 2902, the routine increments ZI_Value[3..6], which contains the number of Key_Table functions. In decision 2904, if the Key_Table entry at BD_Value [4...6] equals zero, then the table entry is empty and the routine continues at subroutine 2910, else the subroutine continues at item 2906. In item 2906, the routine zeros out the Key_Table entry specified by BD_Value[4..6]. In item 2908, the routine increments BQ_Value, which indicates the number of empty entries in Key Table. In subroutine 2910, the routine calls F_START_MSG to output the start of the output message. In I/O block 2912, the routine outputs "BQ" and BQ_Value. In subroutine 2914, the routine calls F_END_MSG to output the end of the output message. The routine then continues at the Main_Loop to process the next message.

ECHO

Figure 30:
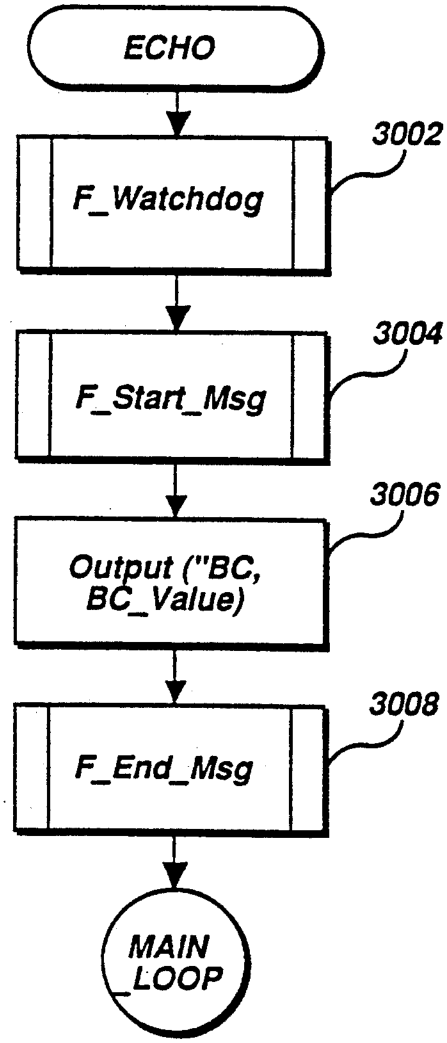

FIG. 30 is a flow chart of the ECHO routine. This routine performs the ECHO function. The routine outputs the BC_Value.

In subroutine 3002, the routine calls F_WATCHDOG. In subroutine 3004, the routine calls F_START MSG to output the start of the output message. In I/O block 3006, the routine outputs "BC" and BC_Value wherein BC_Value is the version number of the software. In subroutine 3008, the routine calls F_END_MSG to output the end of the output message. The routine then continues at the Main_Loop to process the next message.

EDAT

Figure 31:
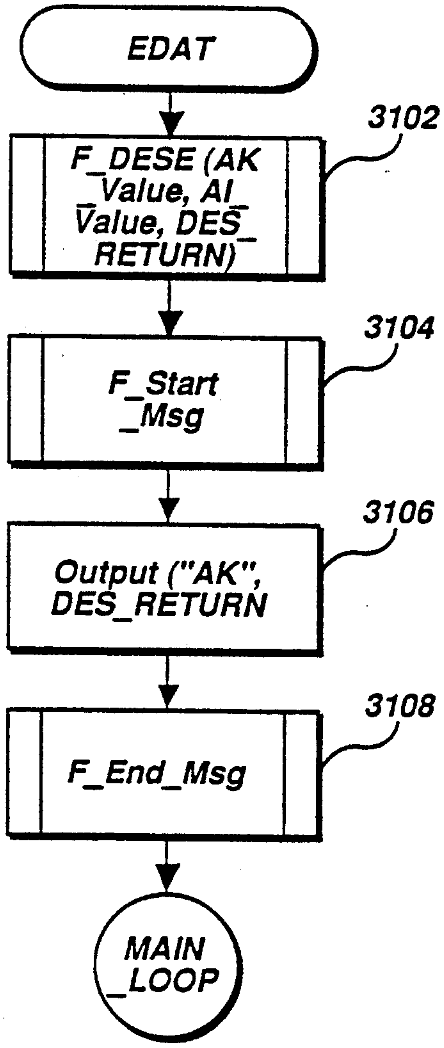

FIG. 31 is a flow chart of the EDAT routine. This routine performs the EDAT function. The routine encrypts the AK_Value.

In subroutine 3102, the routine calls F_DESE, the encryption subroutine, with AK_Value as data and AI_Value as key, and the subroutine returns the encrypted value in Des_Return. In subroutine 3104, the routine calls F_START_MSG to output the start of the output message. In I/O block 3108, the routine outputs "AK" and Des_Return. In subroutine 3110, the routine calls F_END_MSG to output the end of the output message. The routine then continues at the Main_Loop to process the next message.

EFIT

Figure 32:
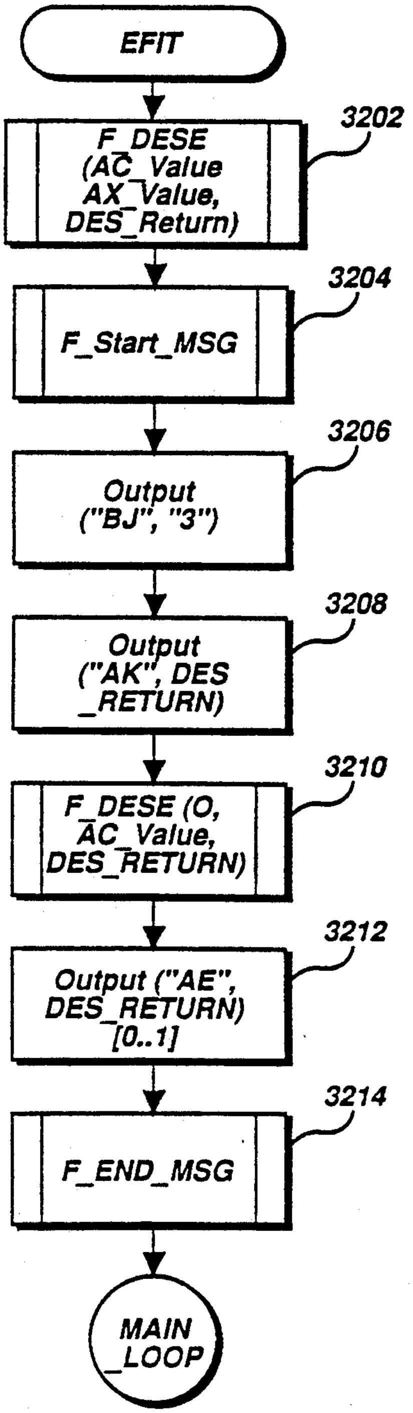

FIG. 32 is a flow chart of the EFIT routine. This routine performs the EFIT function. The routine encrypts the AC_Value and outputs that value and corresponding check digit.

In subroutine 3202, the routine calls F_DESE, the encryption subroutine, with AC_Value as data and AX_Value as key, and the subroutine returns the encrypted value in Des_Return. In subroutine 3204, the routine calls F_START_MSG to output the start of the output message. In I/O block 3206, the routine outputs "BJ" and "3". In I/O block 3208, the routine outputs "AK" and Des_Return. In subroutine 3210, the routine calls F_DESE, the encryption subroutine, with zero as data and AC_Value as key and the subroutine returns the encrypted value in Des_Return. In I/O block 3212, the routine outputs "AE" and Des_Return[0..1] check digit. In subroutine 3214, the routine calls F_END_MSG to output the end of the output message. The routine then continues at the Main_Loop to process the next message.

EPIN

Figure 33:
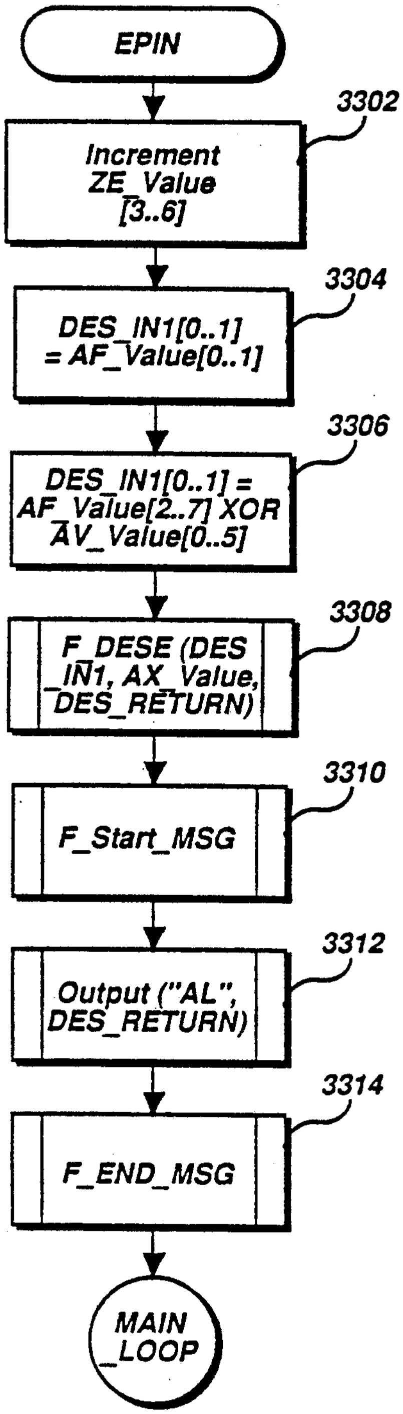

FIG. 33 is a flow chart of the EPIN routine. This routine performs the EPIN function. The routine encrypts a PIN.

In item 3302, the routine increments ZE_Value[3..6], which contains a count of the number of PIN encryptions. In items 3304 and 3306, the routine initializes a variable Des_In as the data parameter of the encryption subroutine. In item 3304, the routine sets Des_In1[0..1] equal to AF_Value[0..1]. In item 3306, the routine sets Des_In1[2..7] equal to the exclusive-OR of AF_Value[2..7] and AV_Value[0..5]. In subroutine 3308, the routine calls F_DESE, the encryption subroutine, with Des_In1 as data and AX_Value as key and the subroutine returns the encrypted value in Des_Return. In subroutine 3310, the routine calls F_START_MSG to output the start of the output message. In I/O block 3312, the routine outputs "AL" and Des_Return. In subroutine 3314, the routine calls F_END_MSG to output the end of the output message. The routine then continues at the Main_Loop to process the next message.

GWKS

Figure 34:
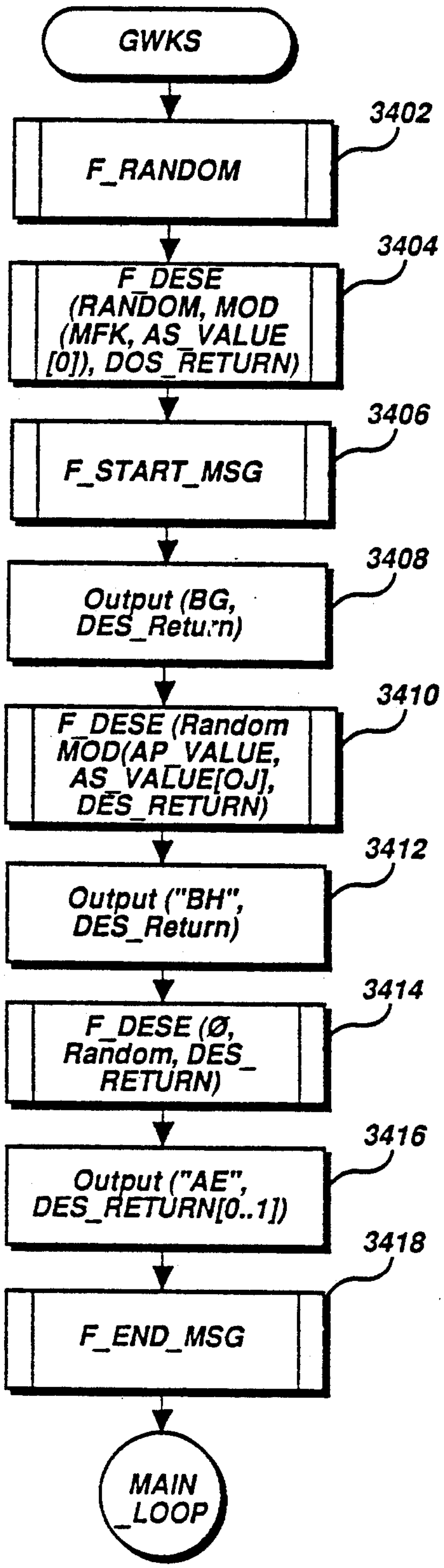

FIG. 34 is a flow chart of the GWKS routine. This routine performs the GWKS function. The routine generates a random key and outputs it in cryptogram form.

In subroutine 3402, the routine calls for F_RANDOM, the random number generation routine which returns a random number in the variable Random. In subroutine 3404, the routine calls F_DESE, the encryption subroutine, with Random as the data and MFK modified by AS_Value[0] as key and the subroutine returns the encrypted value in Des_Return. In subroutine 3406, the routine calls F_START_MSG to output the start of the output message. In I/O block 3408, the routine outputs "BG" and De_Return. In subroutine 3410, the routine calls F_DESE, the encryption subroutine, with Random as data and AP_Value modified by AS_Value[0] as key, and the subroutine returns the encrypted value in Des_Return. In I/O block 3412 the routine outputs "BH" and Des_Return. In subroutine 3414, the routine calls F_DESE, the encryption subroutine, with zero as data and Random as key, and the subroutine returns the encrypted value in Des_Return. In I/O block 3416, the routine outputs "AE" and Des_Return[0..1], the check digits. In subroutine 3418, the routine calls F_END_MSG to output the end of the output message. The routine then continues at the Main_Loop to process the next message.

IKEY

Figure 35:
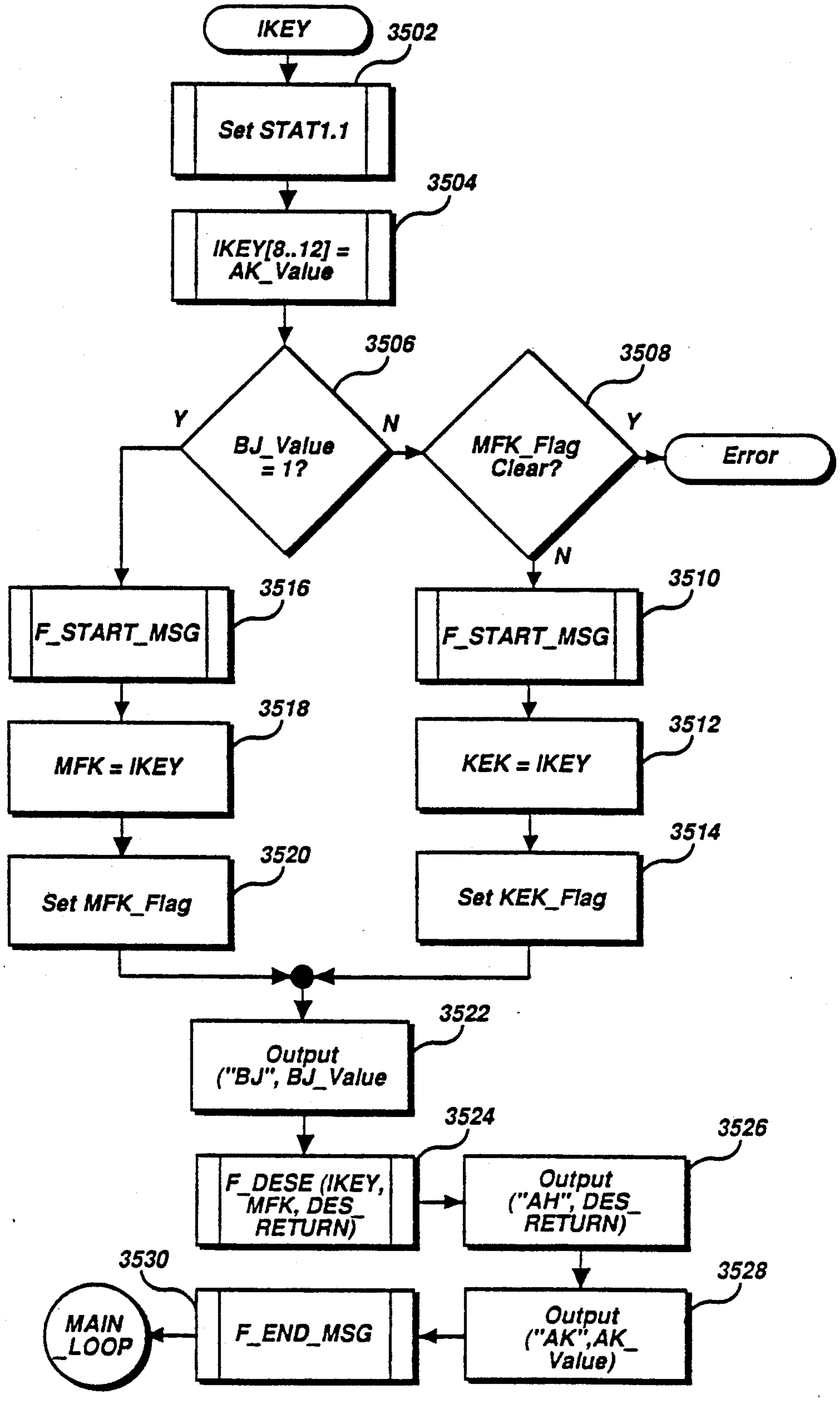

FIG. 35 is a flow chart of the IKEY routine. This routine performs the IKEY function. This routine takes the injected key value and stores it either in the MFK or the KEK, depending on the value in BJ_Value.

In item 3502, the routine sets Stat. 1.1, the Data_Checksum_Flag, to indicate the data Checksum needs to be recalculated. In item 3504, the routine sets IKEY[8..12] equal to AK_Value. In decision 3506, if BJ_Value equals 1, then the MF Key is to be injected and the routine continues to subroutine 3516, otherwise the KEK is to be injected and the routine continues to decision 3508.

In decision 3508, if MFK_Flag is clear, then the routine processes an error because there is no MFK to encrypt with, else the routine continues at subroutine 3510. In subroutine 3510, the routine calls F_STAR- T_MSG to output the start of the output message. In item 3512, the routine sets KEK equal to IKEY to inject the key. In item 3512, the subroutine sets KEK_Flag to indicate that the KEK is valid.

In subroutine 3516, the routine calls F_START_MSG to output the start of the output message. In item 3518, the routine sets MFK equal to IKEY to inject the key. In item 3520, the routine sets MFK_Flag to indicate that the MFK is valid.

In I/O block 3522, the routine outputs "BJ" and BJ_Value. In subroutine 3524, the routine calls F_DESE, the encryption subroutine, with IKEY as data and MFK as key, and the subroutine returns the encrypted value in Des_Return. In I/O block 3526, the routine outputs "AH" and Des_Return. In I/O block 3528, the routine outputs "AK" and AK_Value. In subroutine 3530, the routine calls F_END_MSG to output the end of the output message. The routine then continues at the Main_Loop to process the next message.

LATM

Figure 36:
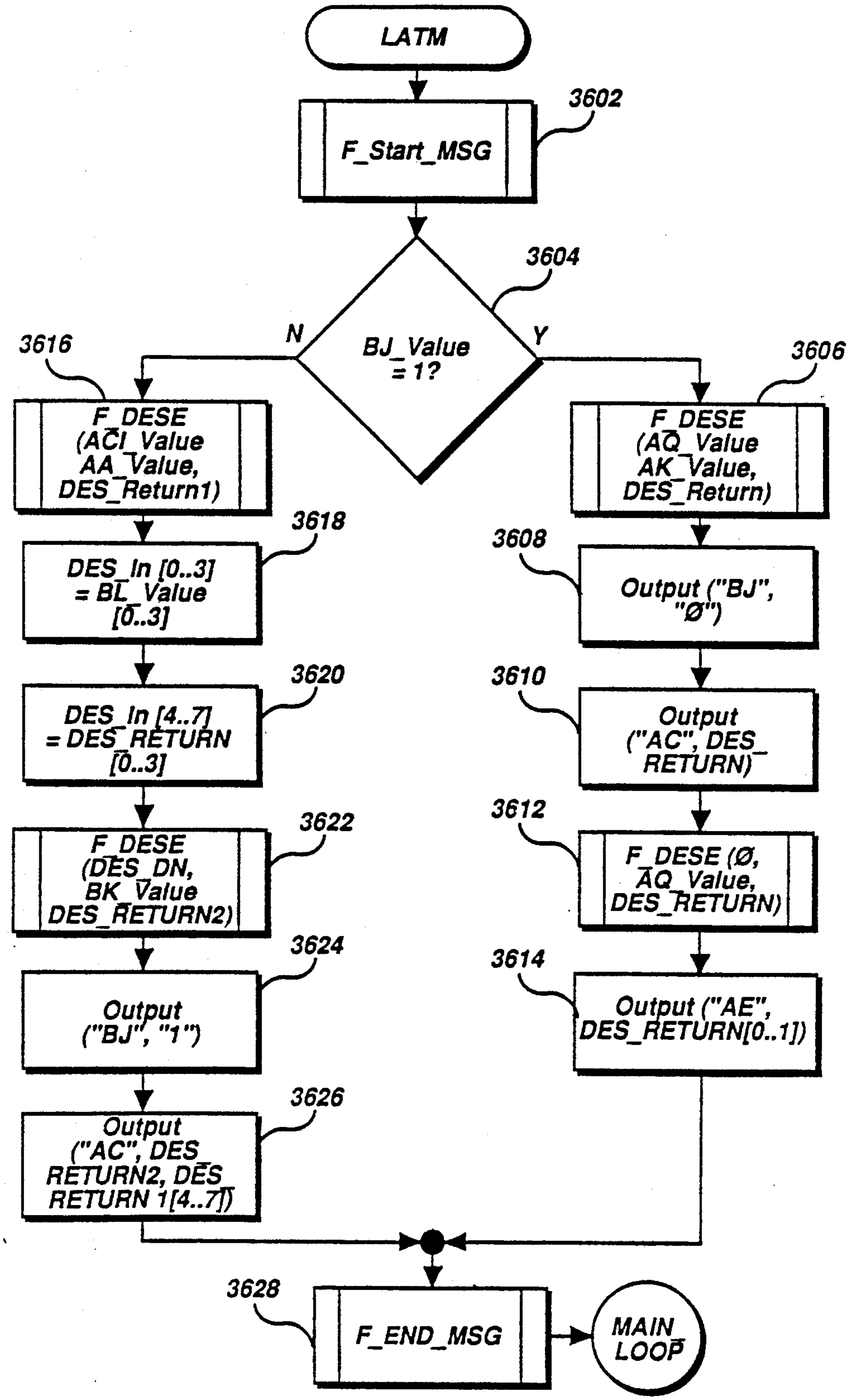

FIG. 36 is a flow chart of the LATM routine. This routine performs the LATM function which loads the ATM with a master key. The routine encrypts a master key for the Diebold or IBM formats depending on the value in BJ_Value.

In subroutine 3602, the routine calls F_START_MSG to output the start of the output message. In decision 3604, if BJ_Value equals 1, then Diebold format is requested and the routine continues to subroutine 3606, otherwise the IBM format is requested and the routine continues to subroutine 3616.

In subroutine 3606, the routine calls F_DESE, the encryption subroutine, with AQ_Value as data and AK_Value as key, and the subroutine returns the encrypted value in Des_Return. In I/O block 3608, the routine outputs "BJ" and "0". In I/O block 3610, the routine outputs "AC" and Des_Return. In subroutine 3612, the routine calls F_DESE, the encryption subroutine, with zero as data and AQ_Value as key, and the routine returns the encrypted value in Des_Return. In I/O block 3614, the routine outputs "AE" and Des_Return[0..1], the check digits. The routine then continues to subroutine 3628.

In subroutine 3616, the routine calls F_DESE, the encryption subroutine, with AC_Value as data and AA_Value as key, and the subroutine returns the encrypted value in Des_Return1. In items 3618 and 3620, the routine initializes Des_In as input into the encryption subroutine. In item 3618, the routine sets Des_[0..3] equal to BL_Value[0..3]. In item 3620, the routine sets Des_In[4..7] equal to Des_Return1[0..3]. In subroutine 3622, the routine calls F_DESE, the encryption subroutine, with Des_In as data and BK_Value as key, and the subroutine returns the encrypted value in Des_Return2. In I/O block 3624, the routine outputs "BJ" and "1". In I/O block 3626, the routine outputs "AC" and Des_Return2 and Des_Return1[4..7]. The routine then continues to block 3628.

In block 3638, the routine calls F_END_MSG to output the end of the output message. The routine then continues at the Main_Loop to process the next message.

LCDT

Figure 37:
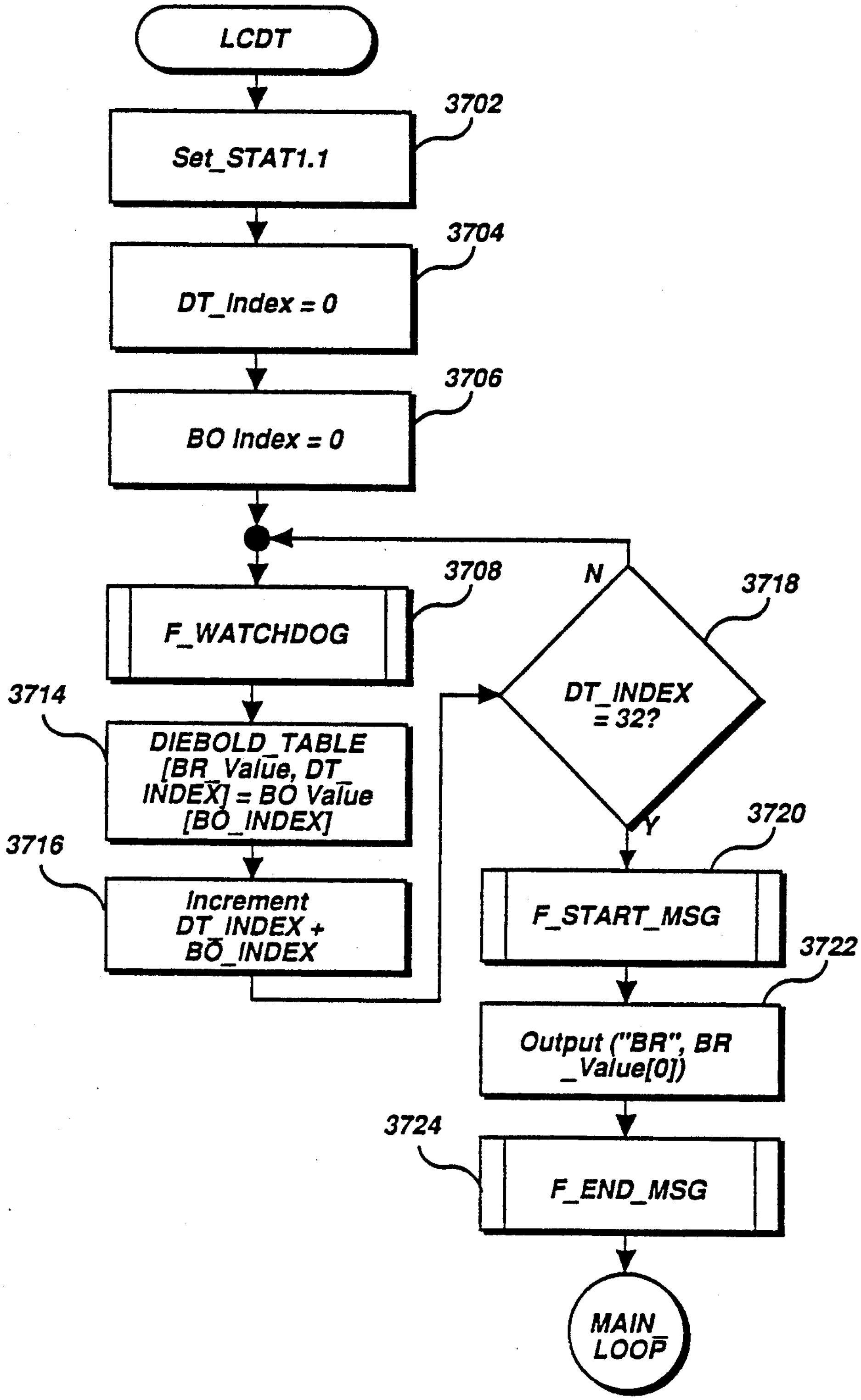

FIG. 37 is a flow chart of the LCDT routine. This routine performs the LCDT function. This routine loads the Diebold_Table indexed by the BR_Value with data from BO_Value. The Diebold_Table contains 32 entries of 8 values each. Each value is a 2-digit hexadecimal number.

In item 3702, the routine sets the Data-Checksum-Flag to indicate the data checksum needs to be recalculated. In items 3704 and 3706, the routine initializes DT_Index, which is an index into the Diebold_Table, and BO_Index, which is an index into BO_Value. In blocks 3708 through 3718, the routine performs a loop which loads the Diebold_Table entry with 16 hexadecimal digits at a time. In subroutine 3708, the routine calls F_WATCHDOG. In item 3714, the routine loads the Diebold_Table with the value from BO_Value indexed by BO_Index. In item 3716, the routine increments DT_Index and BO_Index. In decision 3718, if DT_Index equals 32, then the Diebold_Table entry has been loaded and the routine continues at subroutine 3720, else the routine loops to subroutine 3708. In subroutine 3720, the routine calls F_START_MSG to output the start of the output message. In I/O block 3722, the routine outputs "BR" and BR_Value[0]. In subroutine 3724, the routine calls F_END_MSG to output the end of the output message. The routine then continues at the Main_Loop to process the next message.

LENT

Figure 38:
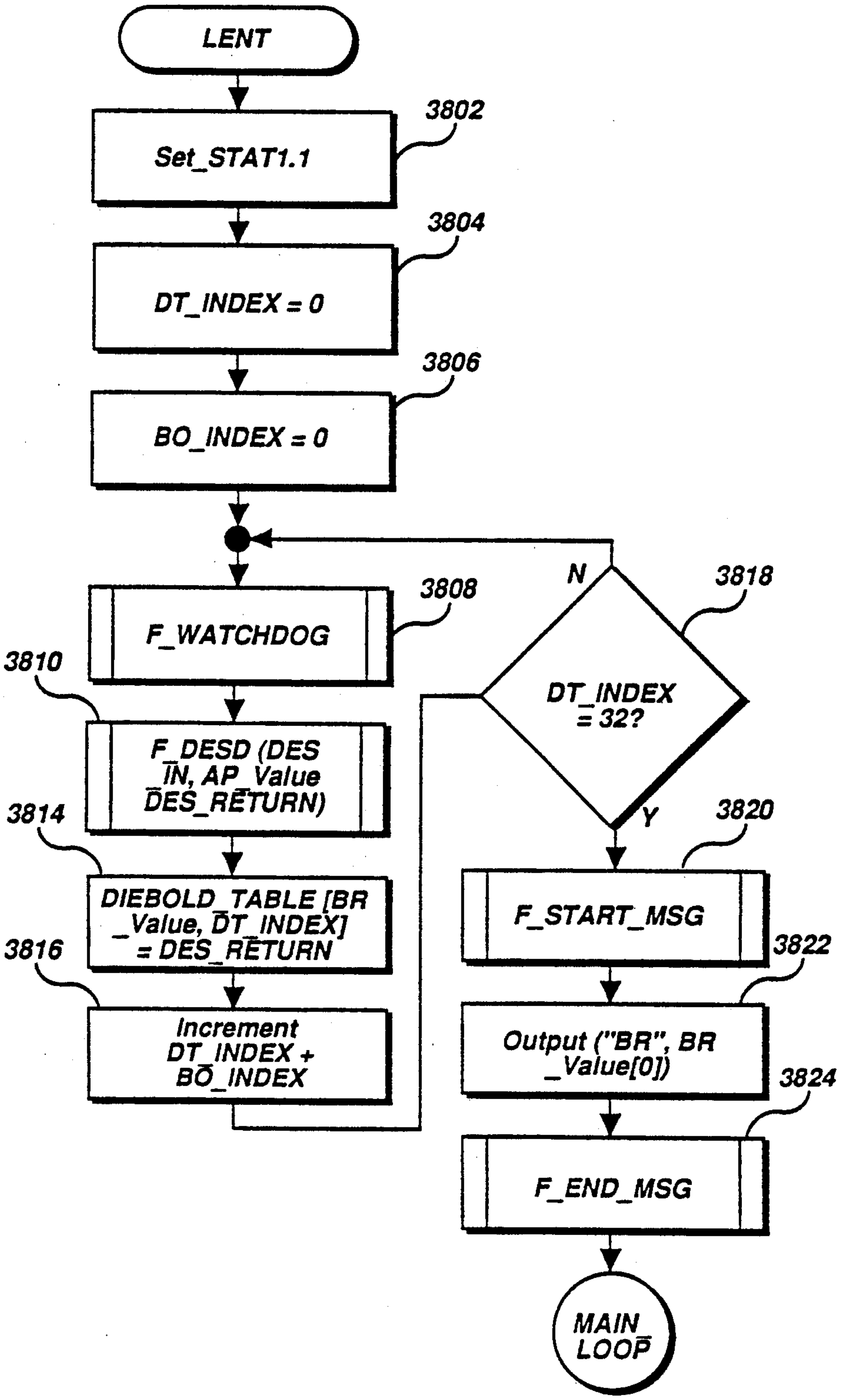

FIG. 38 is a flow chart of the LENT routine. This routine performs the LENT function. The routine loads the Diebold Table indexed by the BR_Value with data from BO_Value. This routine is similar to the LCDT routine except that this routine decrypts the BO_Value before storing it in the Diebold_Table.

In item 3802, the routine sets the Data_Checksum_Flag to indicate the data checksum needs to be recalculated. In items 3804 and 3806, the routine initializes DT_Index, which is an index into the Diebold_Table, and BO_Index, which is an index into the BO_Value. In blocks 3808 through 3818, the routine performs a loop which loads the decrypted BO_Value into the Diebold-Table entry with 16 hexadecimal digits at a time. In subroutine 3808, the routine calls F_WATCHDOG. In subroutine 3810, the routine calls F_DESD, the decryption subroutine, with BO_Value indexed by BO_Index as data and AP_Value as key, and the subroutine returns the decrypted data in Des_Return. In item 3814, the routine moves Des_Return into the Diebold_Table. In item 3816, the routine increments DT_Index and BO_Index. In decision 3818, if DT_Index equals 32, then the Diebold_Table entry has been loaded and the routine continues at subroutine 3820, else the routine loops to subroutine 3808.

In subroutine 3820, the routine calls F_START_MSG to output the start of the output message. In I/O block 3822, the routine outputs "BR" and BR_Value[0]. In subroutine 3824, the routine calls F_END_MSG to output the end of the output message. The routine then continues at the Main_Loop to process the next message.

LMKT

Figure 39A:
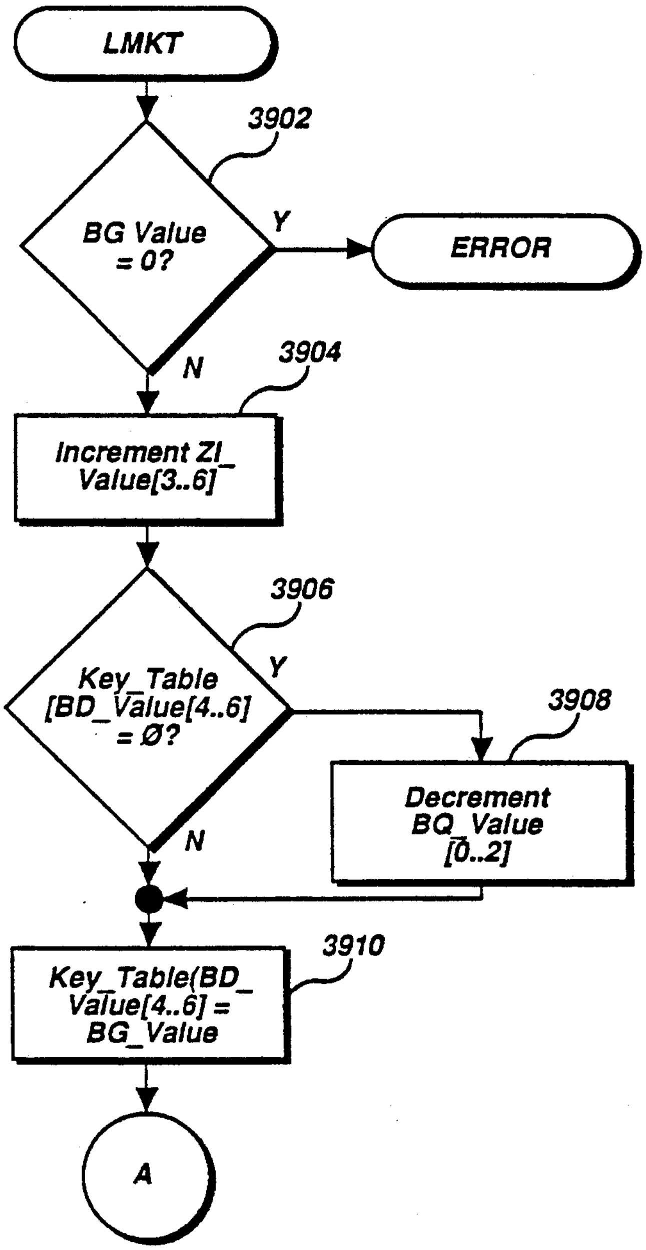
FIGS. 39A and 39B are flow diagrams of the "LMKT" message routine called by the routine of FIG. 21.
Figure 39B:
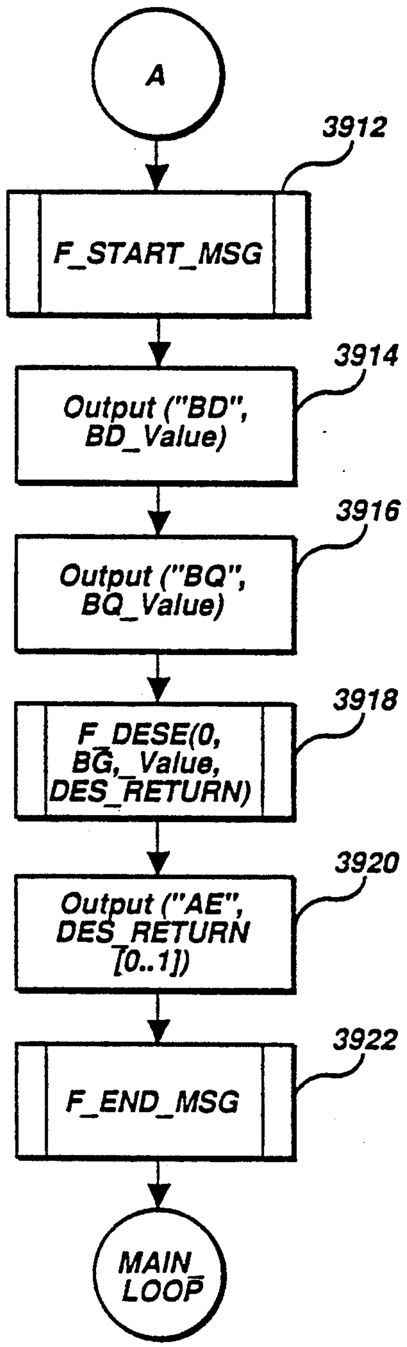

FIG. 39 is a flow chart of the LMKT routine. This routine performs the LMKT function. The routine loads the Key Table indexed by BD_Value[4..6] with the BG_Value.

In decision 3902, if BG_Value equals zero, then the routine processes an error, else the routine continues to item 3904. In item 3904, the routine increments ZI_Value[3..6], which contains the number of Key_Table functions. In decision 3906, if Key_Table indexed by BD_Value[4..6] equals zero, then a new entry is being made into the Hey Table and the routine decrements BQ_Value in item 3908. In item 3910, the routine sets Key Table indexed by BD_Value[4..6] equal to BG_Value. In subroutine 3912, the routine calls F_START_MSG to output the start of the output message. In I/O block 3914, the routine outputs "BD" and BD_Value. In I/O block 3916, the routine outputs "BQ" and BQ_Value. In subroutine 3918, the routine calls F_DESE, the encryption subroutine, with zero as data and BG_Value as key, and the subroutine returns the encrypted value in Des_Return. In I/O block 3920, the routine outputs "AE" and Des_Return[0..1], the check digits. In subroutine 3922, the routine calls F_END_MSG to output the end of the output message. The routine then continues at the Main_Loop to process the next message.

LKEY

Figure 40:
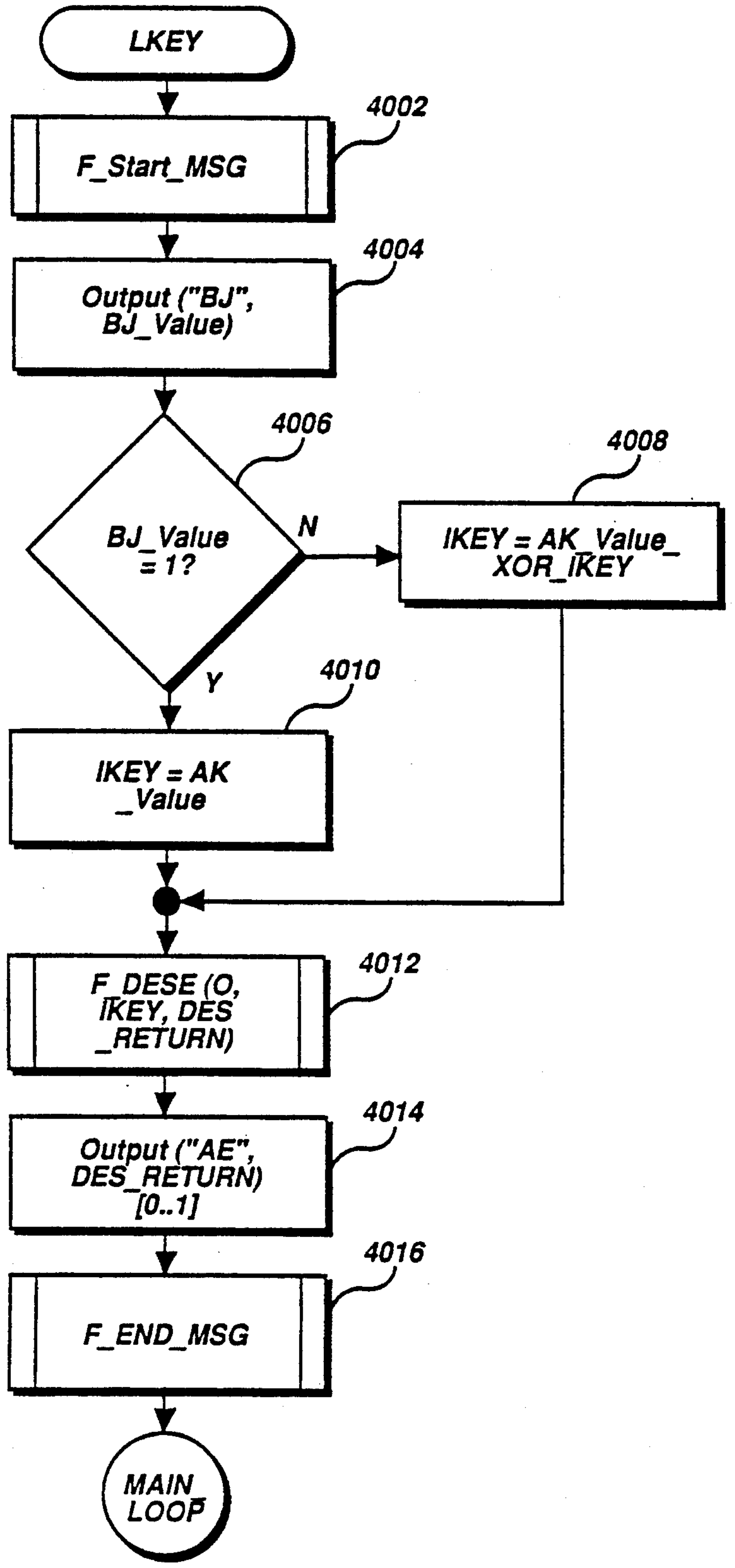

FIG. 40 is a flow chart of the LKEY routine. This routine performs the LKEY function. The routine loads IKEY with AK_Value or AK_Value exclusive-ORed with IKEY depending on BJ_Value.

In subroutine 4002, the routine calls F_START_MSG to output the start of the output message. In I/O block 4004, the routine outputs "BJ" and BJ_Value. In decision 4006, if BJ_Value equals 1, then the routine continues at item 4010, otherwise the routine continues at item 4008. In item 4008, the routine sets IKEY equal to AK_Value exclusive-ORed with the current value of IKEY. The routine then continues at subroutine 4012. In block 4010, the routine sets IKEY equal to AK_Value. The routine then continues to subroutine 4012.

In subroutine 4012, the routine calls F_DESE, the encryption subroutine, with zero as data and IKEY as key, and the subroutine returns the encrypted value in Des_Return. In I/O block 4014, the routine outputs "AE" and Des_Return[0..1], the check digits. In subroutine 4016, the routine calls F_END_MSG to output the end of the output message. The routine then continues at the Main_Loop to process the next message.

RKEY

Figure 41:
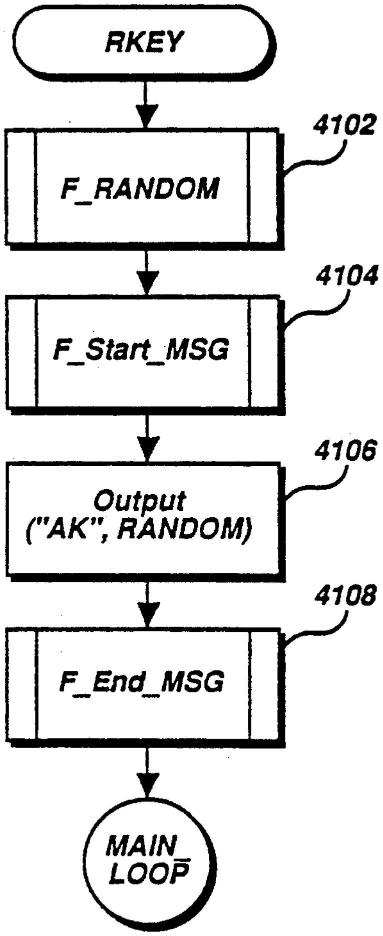

FIG. 41 is a flow chart of the RKEY routine. This routine performs the RKEY function. The RKEY routine outputs a random number.

In subroutine 4102, the routine calls F_RANDOM, which generates a random number and returns it in Random. In subroutine 4104, the routine calls F_START_MSG to output the start of the output message. In I/O block 4106, the routine outputs "AK" and Random. In subroutine 4108, the routine calls F_END_MSG to output the end of the output message. The routine then continues at the Main_Loop to process the next message.

SKEY

Figure 42:
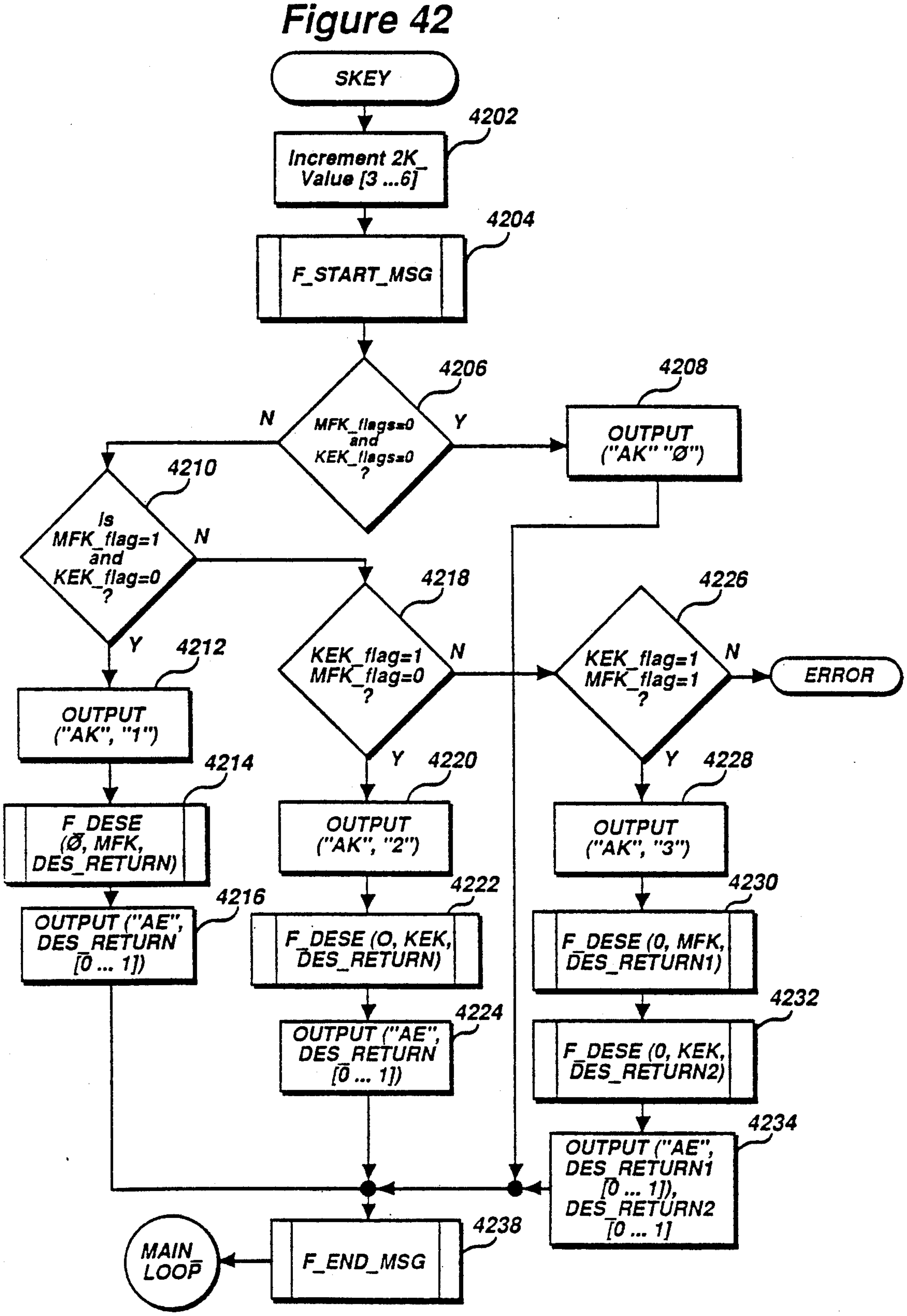

FIG. 42 is a flow chart of the SKEY routine. This routine performs the SKEY function. The routine outputs status of the MFK and KEK.

In item 4202, the routine increments ZK_Value[3..6], which contains a count of the control functions. In subroutine 4204, the routine calls F_START_MSG to output the start of the output message. In decision 4206, if MFK_Flag and KEK_Flag are cleared, then the routine continues at I/O block 4208, else the routine continues at decision 4210. In I/O block 4208, the routine outputs "AK" and 0. The routine then continues to subroutine 4238.

In decision 4210, if MFK_Flag is set and KEK_Flag is clear, then the routine continues at item 4212, otherwise the routine continues at decision 4218. In item 4212, the routine outputs "AK" and 1. In subroutine 4214, the routine calls F_DESE, the encryption subroutine, with zero as data and MFK as key, and the subroutine returns the encrypted data in Des_Return. In I/O block 4216, the routine outputs "AE" and Des_Return[0..1], the check digits. The routine then continues to subroutine 4238.

In decision 4218, if KEK_Flag is set and MFK_Flag is clear, then the routine continues at I/O block 4220, otherwise the routine continues at decision 4226. In I/O block 4220, the routine outputs "AK" and 2. In subroutine 4222, the routine calls F_DESE, the encryption routine, with zero as data and KEK as key, and the subroutine returns Des_Return. In I/O block 4224, the routine outputs "AE" and Des_Return[0..1], the check digits. The routine then continues at subroutine 4238.

In decision 4226, if KEK_Flag and MFK_Flag are set, then the routine continues at I/O block 4228, otherwise the routine processes an error. In I/O block 4228, the routine outputs "AK" and 3. In subroutine 4230, the routine calls F_DESE, the encryption subroutine, with zero as data and MFK as key and the subroutine returns the encrypted value Des_Return1. In subroutine 4232, the routine calls F_DESE, the encryption subroutine, with zero as data and KEK as key, and the subroutine returns the encrypted value Des_Return2. In I/O block 4234, the routine outputs "AE" and Des_Return1[0..1] and Des_Return2[0..1], the check digits.

In subroutine 4238, the routine calls F_END_MSG to output the end of the output message. The routine then continues at the Main Loop to process the next message.

TDLY

Figure 43:
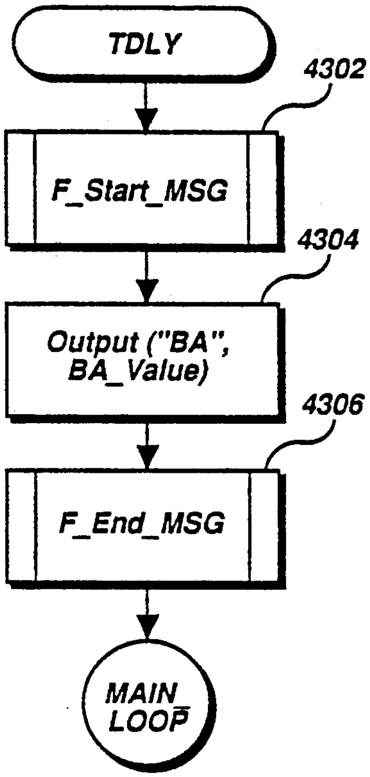

FIG. 43 is a flow chart of the TDLY routine. This routine performs the TDLY function which causes all outputs to be delayed a specified period. The routine outputs the BA_Value.

In subroutine 4302, the routine calls F_START_MSG to output the start of the output message. In I/O block 4304, the routine outputs "BA" and BA_Value. In subroutine 4306, the routine calls F_END_MSG to output the end of the output message. The routine then continues at the Main_Loop to process the next message.

TPIN

Figure 44:
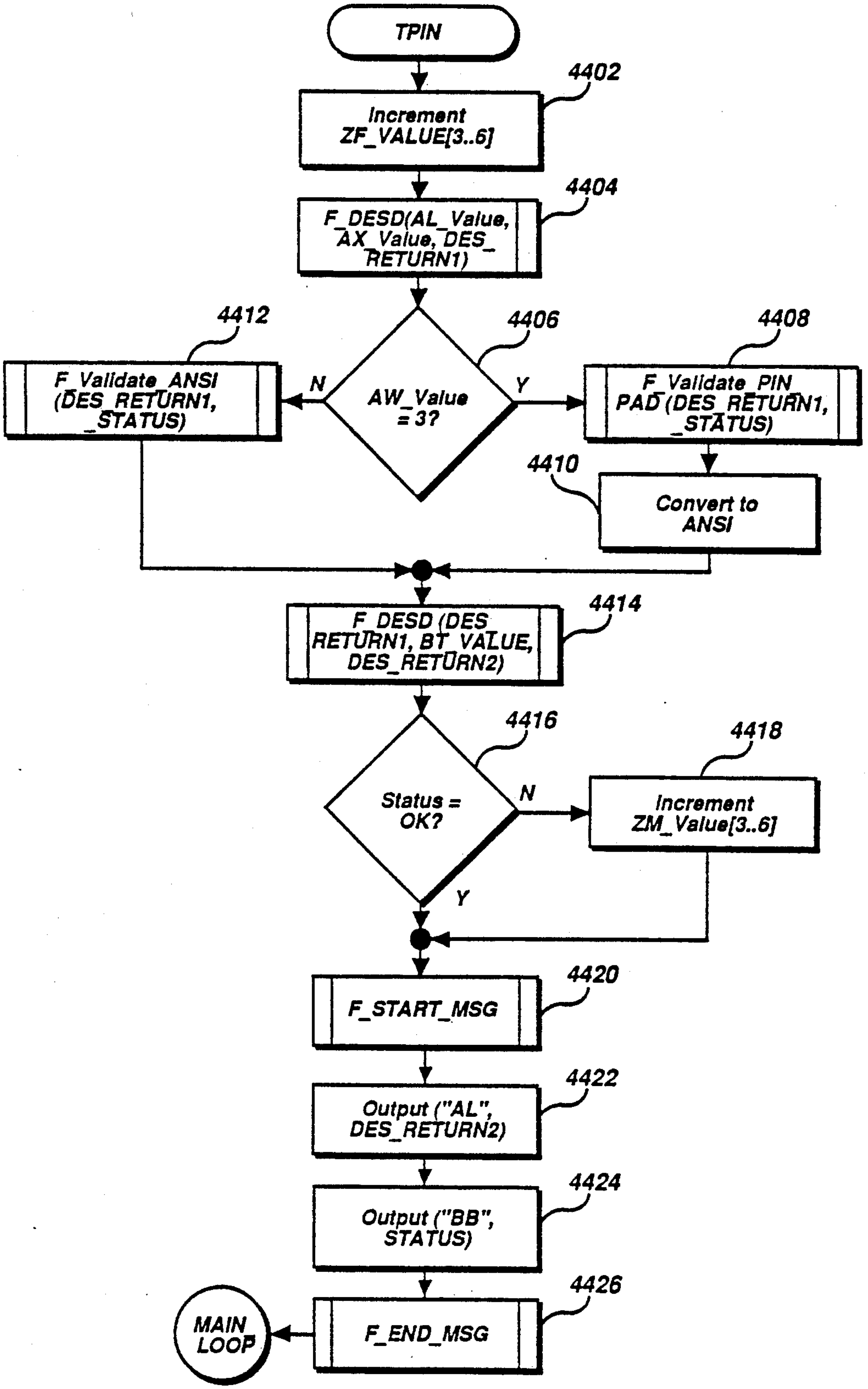

FIG. 44 is a flow chart of the TPIN routine. This routine performs the TPIN function. The routine translates PINs from one encryption key to another encryption key and optionally from one PIN format to ANSI format.

In item 4402, the routine increments ZF_Value[3..6], which contains the number of PIN translates. In subroutine 4404, the routine calls F_DESD, the decryption subroutine, with AL_Value as data and AX_Value as key and the subroutine returns the decrypted value in Des_Return1. In decision 4406, if AW_Value equals 3, then the data is in PIN PAD format, and the routine continues at subroutine 4408, otherwise the data is in ANSI format, and the routine continues at subroutine 4412. In subroutine 4408, the routine calls F_Validate_PIN_PAD (not described herein) to validate the format, of the PIN in ANSI PIN PAD format and the subroutine returns the status. In item 4410, the routine converts the PIN PAD format to the ANSI format. The routine then continues at subroutine 4414.

In subroutine 4412, the routine calls F_VALIDATE_ANSI (not described herein) to validate the format of the PIN in ANSI format, and the subroutine returns the status.

In subroutine 4414, the routine calls F_DESE, the encryption subroutine, with Des_Return1 as data and BT_Value as key, and the subroutine returns the encrypted value in Des_Return2. In decision 4416, if the status is okay, then the routine continues at subroutine 4420, else the routine continues at item 4418. In item 4418, the routine increments ZM_Value[3..6], which contains a count of PIN format errors. The routine then continues at subroutine 4420.

In subroutine 4420, the routine calls F_START_MSG to output the start of the output message. In I/O block 4420, the routine outputs "AL" and Des_Return2. In output block 4424, the routine outputs "BB" and status. In subroutine 4426, the routine calls F_END_MSG up at the end of the output message. The routine then continues at the Main_Loop to process the next message.

TWKD

Figure 45:
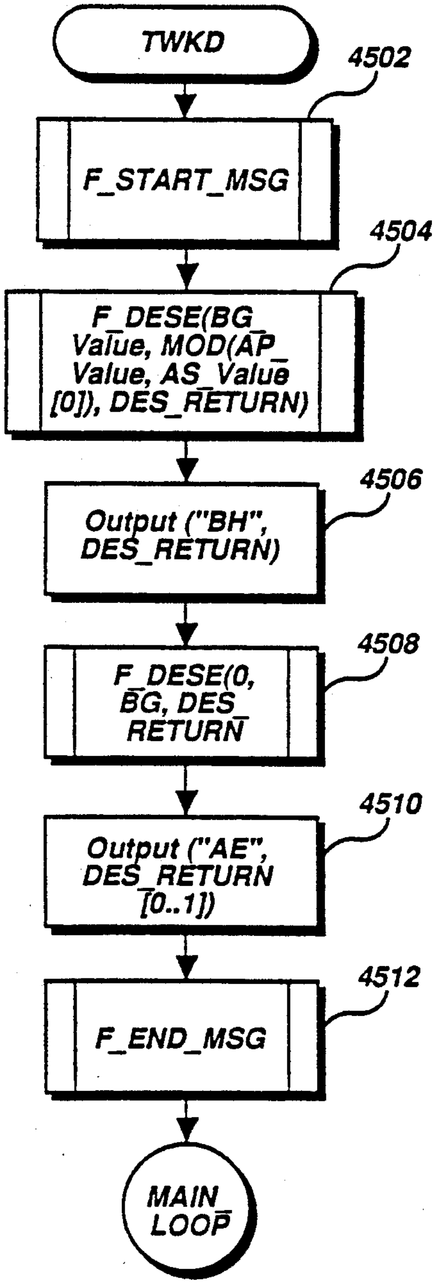

FIG. 45 is a flow chart of the TWKD routine. This routine performs, the TWKD function. The routine that translates working key for distribution.

In subroutine 4502, the routine calls F_START_MSG to output the start of the output message. In subroutine 4504, the routine calls F_DESE, the encryption subroutine, with BG_Value as data and AP_Value modified by AS_Value[0] as key, and the subroutine returns the encrypted value in Des_Return. In I/O block 4506, the routine calls outputs "BH" and Des_Return. In subroutine 4508, the routine calls F_DESE, the encryption subroutine, with zero as data and BG_Value as key and the subroutine returns the encrypted value in Des_Return. In I/O block 4510, the routine outputs "AE" and Des_Return[0..1], the check digits. In subroutine 4512, the routine calls F_END_MSG to output the end of the output message. The routine then continues at the Main_Loop to process the next message.

F_DELAY

Figure 46:
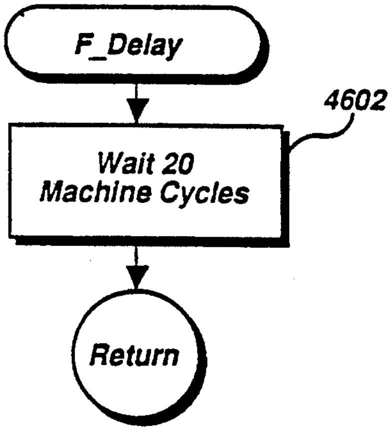

FIG. 46 is a flow chart of the F_DELAY routine. This routine performs the F_DELAY function. The routine generates a delay for 20 cycles.

In item 4602, the program delays for 20 cycles and then returns to MAIN_LOOP.

TWKL

Figure 47:
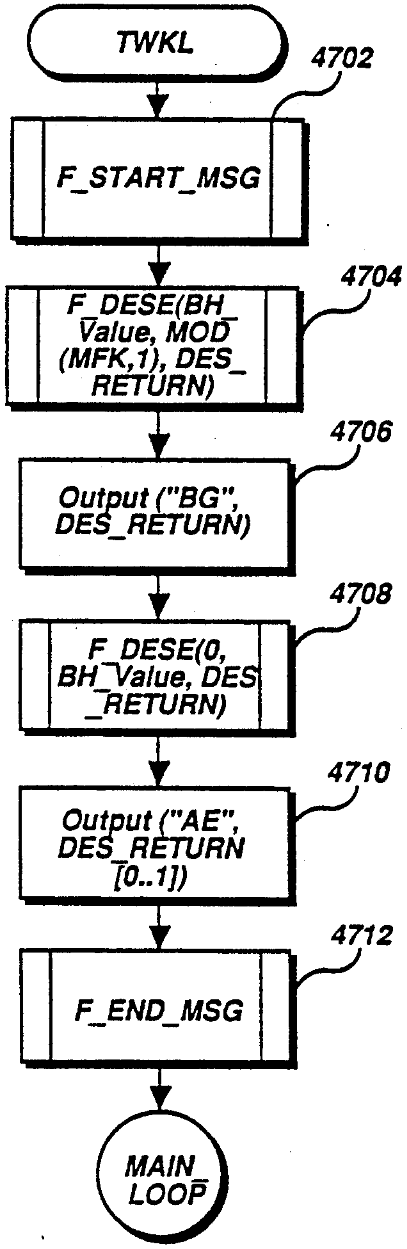
Figure 48:
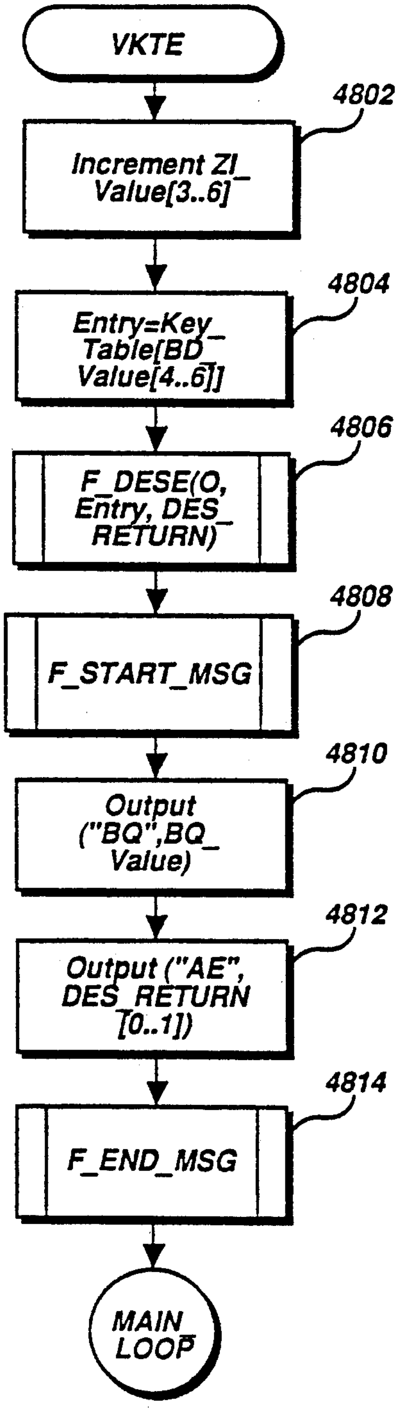

FIG. 47 is a flow chart of the TWKL routine. This routine performs the TWKL function. The TWKL routine translates the working key for local storage.

In subroutine 4702, the routine calls F_START_MSG to output the start of the output message. In subroutine 4704, the routine calls F_DESE, the encryption subroutine, with BH_Value as data and MFK modified by one as key, and the subroutine returns the encrypted value in Des_Return. In I/O block 4706, the routine outputs "BG" and Des_Return. In subroutine 4708, the routine calls F_DESE, the encryption subroutine, with zero as data and DH_Value as key, and the subroutine returns the encrypted value in Des_Return. In I/O block 4710, the routine outputs "AE" and Des_Return[0..1], the check digits. In subroutine 4712, the routine calls F_END_MSG to output the end of the output message. The routine then continues at the Main_Loop to process the next message.

VKTE

FIG. 22 is a flow chart of the VKTE routine. This routine performs the VKTE function. The routine outputs the check digit of the Key Table entry indexed by DB_Value[4..6].

In item 4802, the routine increments ZI_Value[3..6], which contains the number of Key-Table functions. In item 4804, the routine sets the variable entry equal to Key_Table indexed by BD_Value[4..6]. In subroutine 4806, the routine calls F_DESE, the encryption subroutine, with zero as data and entry as key, and the subroutine returns the encrypted value in Des_Return. In subroutine 4808, the routine calls F_START_MSG to output the start of the output message. In I/O block 4810, the routine outputs "BQ" and BQ_Value. In I/O block 4812, the routine outputs "AE" and Des_Return[0..1], the check digits. In subroutine 4814, the routine calls F_END_MSG to output the end of the output message. The routine then continues at the Main_Loop to process the next message.

VPIN

Figure 49A:
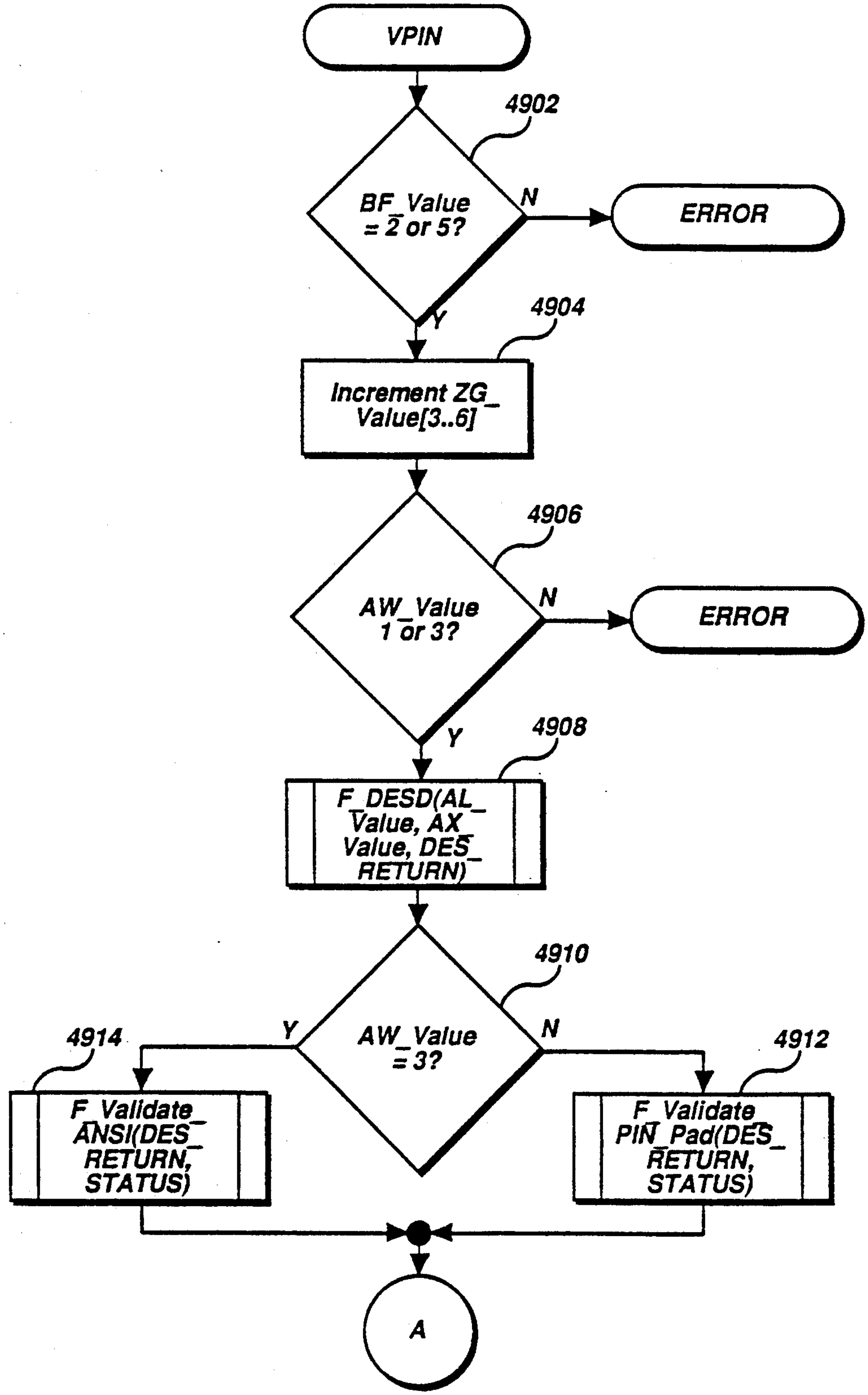
FIG. 49A is a flow diagram of the "VPIN" message routine called by the routine of FIG. 21.
Figure 49B:
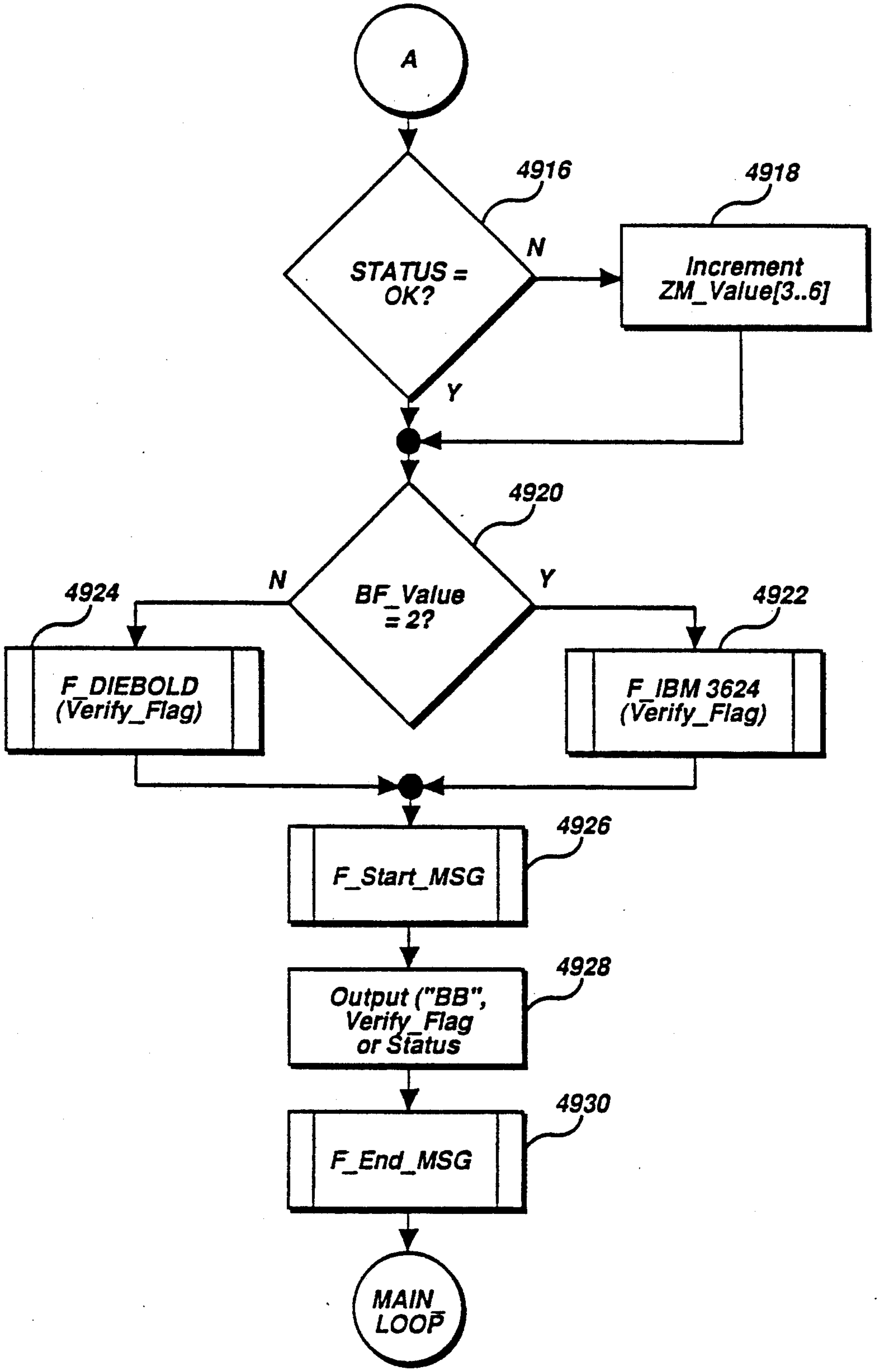
FIG. 49B is a continuation of the routine of FIG. 49A.

FIG. 49 is a flow chart of the VPIN routine. This routine performs the VPIN function. The routine validates a PIN in ANSI format or PIN PAD format depending upon the AW_Value and performs either the Diebold or the IBM PIN verification based on the BF_Value.

In decision 4902, if BF_Value equals 2 or 5, then the routine continues at item 4904, otherwise the routine processes an error. In item 4904, the routine increments ZG_Value[3..6], which contains a count of the PIN verifications. In decision 4906, if AW_Value equals 1 or 3, then the routine continues at subroutine 4908, otherwise the routine processes an error. In subroutine 4908, the routine calls F_DESD, the decryption subroutine, with AL_Value as data and AX_Value as key, and the subroutine returns the decrypted value in Des_Return. In decision 4910, if AW_Value equals 3, then the routine performs an ANSI validation by continuing at subroutine 4914, otherwise the routine performs a PIN PAD validation by continuing at subroutine 4912. In subroutine 4912, the routine calls F_VALIDATE_PIN_PAD, which returns the PIN PAD status. The routine then continues at decision 4916. In subroutine 4914, the routine calls F_VALIDATE_ANSI, and the routine returns the PIN PAD status. The routine then continues at decision 4916.

In decision 4916, if the PIN status is okay, then the routine continues at decision 4920, otherwise the routine continues at item 4918. In item 4918, the routine increments ZM_Value[3..6], which contains the count of the PIN format errors.

In decision 4920, if BF_Value equals 2, then the routine performs an IBM verification by continuing at subroutine 4922, otherwise the routine performs the Diebold verification by continuing at subroutine 4924. In subroutine 4922, the routine calls F_IBM_3624 (not described herein) which verifies the PIN and returns a Verify_Flag and then continues at subroutine 4926. In subroutine 4924, the routine calls F_Diebold (not described herein) which returns a Verify_Flag and then continues at subroutine 4926.

In subroutine 4926, the routine calls F_START_MSG to output the start of the output message. In I/O block 4928, the routine outputs "BB" and the Verify_Flag or the status. In subroutine 4930, the routine calls F_END_MSG to output the end of the output message. The routine then continues at Main_Loop to process the next message.

The present invention incorporates a sophisticated, user-friendly, menu-driven interface for communicating with a user and providing a control structure for entering and modifying system control characteristics and key values. As exemplary examples of the user interface of the present invention, diagrams of the following screen displays are provided. The low-level routines of this aspect of the present invention are based on a readily available package, such as "Window Boss," which provides "pop-up" menu drivers in "C" source code.

FIG. 51 is a diagram of the opening status screen displayed to the user upon system power-up. From this opening menu, the user selects desired functions by moving the cursor left or right. The selected command is then highlighted. Once a particular menu is selected, commands within that command may be activated by cursor control or by entering the capital letter associated with each command.

Figure 52:
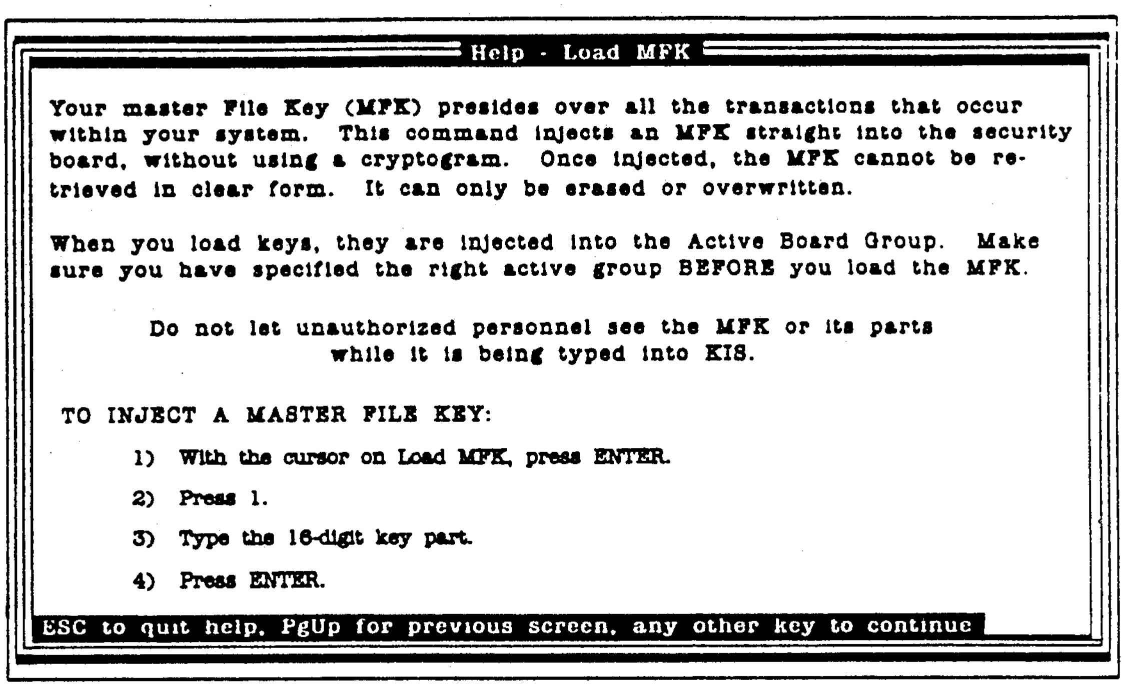

FIG. 52 is a representative sample of the opening help screen displayed to the user when activated from a preselected function. The present invention is provided with a context-sensitive help function so that whenever the user depresses the F1 function key provided with the system, the current screen is replaced with a help screen related to the function which was active when F1 was depressed. This function is achieved through a global variable known as the "help key word," which contains the subject to be brought up when help is selected. The "help key word" is continuously updated by the menu routine for each menu item. Therefore, the global "help key word" always contains a string related to the menu item currently selected.

Figure 53:
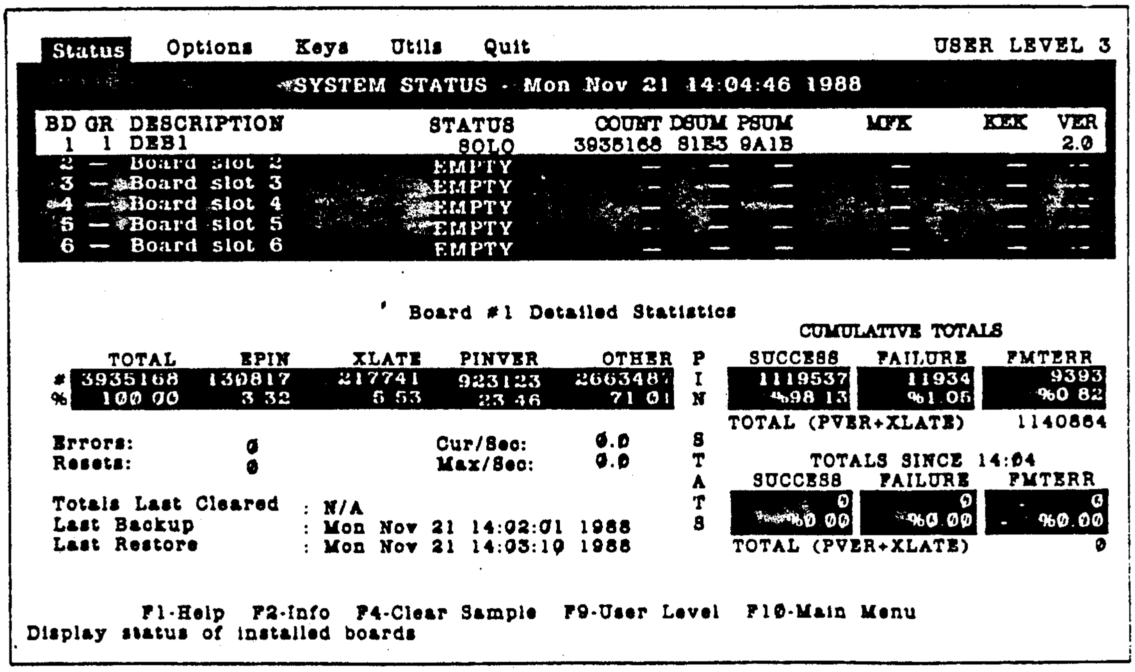

FIG. 53 is a diagram of the master status screen displayed to the user when the status display mode is selected. The Status Window displays pertinent information about the Data Encryption Boards, so the user can verify that each one is on line and working properly. It also enables the user to see detailed statistics about each board, such as: (1) the total number of transactions handled, (2) the subtotal of PINs translated, (3) the subtotal of PINs verified, (4) the subtotal of PINs rejected as incorrectly entered, (5) the subtotal of PINs that failed to pass routine formatting checks, and (6) the last time the transaction counter for a given board was reset. This screen is activated from the main menu when a user enters an "S" from the keyboard or enters "return" from the keyboard while the cursor is over the status menu item. The main status screen contains several fields, wherein the main field describes which encryption device is currently selected, and wherein the upper portion of the screen displays all board positions available and further displays which encryption device of the system is selected. The column labeled "BD." describes the encryption devices accessible to the user. The column labeled "GR." describes a logical group number associated with each particular encryption device wherein group numbers are assigned under the "Config" or configure menu discussed in further detail below. Each description is up to a 20-character description, which allows a user to identify a particular encryption device which is identified to the switch processing computer under a defined nomenclature. In accordance with the present invention, encryption devices can be configured in several ways. "Empty" signifies that a designated encryption device location is empty. "Solo" indicates that the encryption device is operating in a non-fault-tolerant, stand-alone mode. "Master" and "Slave" indicate that the encryption device is operating in a paired configuration with another board. In one aspect of the present invention, when the system is operated with a color display, if a particular encryption device is malfunctioning, the portion of the display corresponding to the description field for the device flashes in a predefined color, preferably red. In monochrome displays, the description field simply flashes.

"Count" indicates the number of messages of any type sent to each encryption device, either through the parallel or serial port. "DSUM" is a checksum of the data area of a encryption device and includes various keys and keytables. This statistic allows a user to determine whether identical key information has been loaded in individual encryption devices. "PSUM" is the program checksum and is used to indicate whether system firmware has been corrupted or tampered with. The "KEK" and "MFK" fields contain a 4- to 8-digit checksum related to the respective keys and may be used to verify key information loaded in the system.

Figure 55:
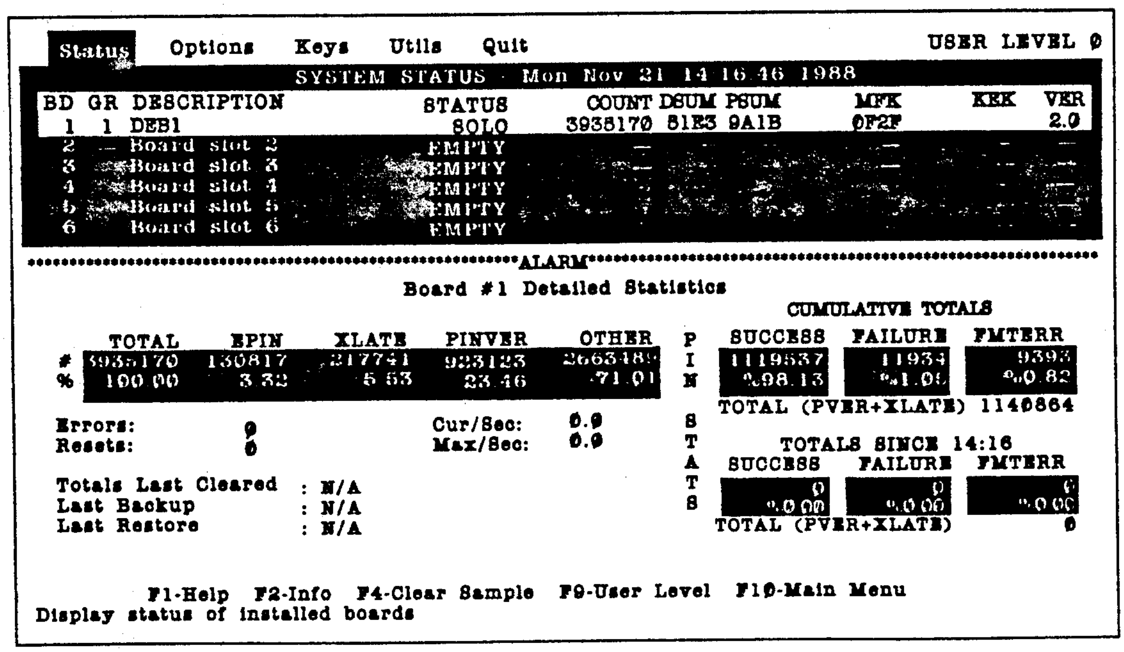

In the lower portion of the display, the heading displays which encryption device is selected. In the preferred practice of the present invention, fields may be selected by using cursor control. In addition, fields are also selected periodically in rotation. The fields EPIN, TRANSLATE, PINVER, SUCCESS, FAILURE, and FORMAT ERROR are cumulative totals which represent totals since the encryption device totals were last reset to zero, which may be the first day the encryption device was put into service or when the encryption device was last reset manually. The field "TOTAL" represents 100% of the transactions since the encryption device was put into service and functions as a verification of proper system operation. "EPIN" is the number of PIN encryption functions performed. "XLATE" or translate shows the number of PIN translation functions performed. "PINVER" shows the number of PIN verification functions performed. "OTHER" represents all other functions performed by the encryption device. On the other side of the display, "SUCCESS", "FAILURE", and "FMTERR" are subtotals of the PIN verify and PIN translate functions. The lower portion of the totals on the right portion of the display are a statistical sample of the volume of transactions performed by the encryption device and are reset to zero every time the status display is selected. If the status screen remains selected, it is reset to zero once every interval wherein the interval is user-definable and may typically be in the range of one hour. This allows the network switch to display encryption devices to determine whether a particular device is denying an abnormal number of PINs. Therefore, a relatively short interval period is desirable so that deviations in system performance are more readily apparent. Each of the fields "SUCCESS", "FAILURE" and "FMTERR" blinks and/or changes color whenever the number displayed in the field exceeds a user-defined threshold limit. In addition, the word "ALARM" is displayed when a user-defined threshold is exceeded, as shown in FIG. 55.

In one aspect of the present invention, the display is provided with a blue background, the text is blue on white, and cyan is used as a cursor to highlight selected functions.

On the lower left-hand portion of the display the fields "ERRORS" and "RESETS" are provided. "ER- RORS" represents the number of messages received by an encryption device that did not conform to the message format of the present invention, which may indicate a problem with communication lines or may indicate tampering with the encryption device. "RESETS" indicates the number of Watchdog Timer resets, which may indicate a malfunctioning processor associated with each encryption device or may indicate that incomplete messages are being received by the encryption device. The fields "CUR/SEC" and "MAX/SEC" indicate the rate at which messages are being received by an encryption device. "CUR/SEC" indicates the average rate per second of transactions over the last status interval. "MAX/SEC" indicates the maximum value of "CUR/SEC" over a predefined period and may be used as an indication of overloading an encryption device or may be used to ensure that the system is evenly loaded (in a system having a number of encryption devices).

Figure 54:
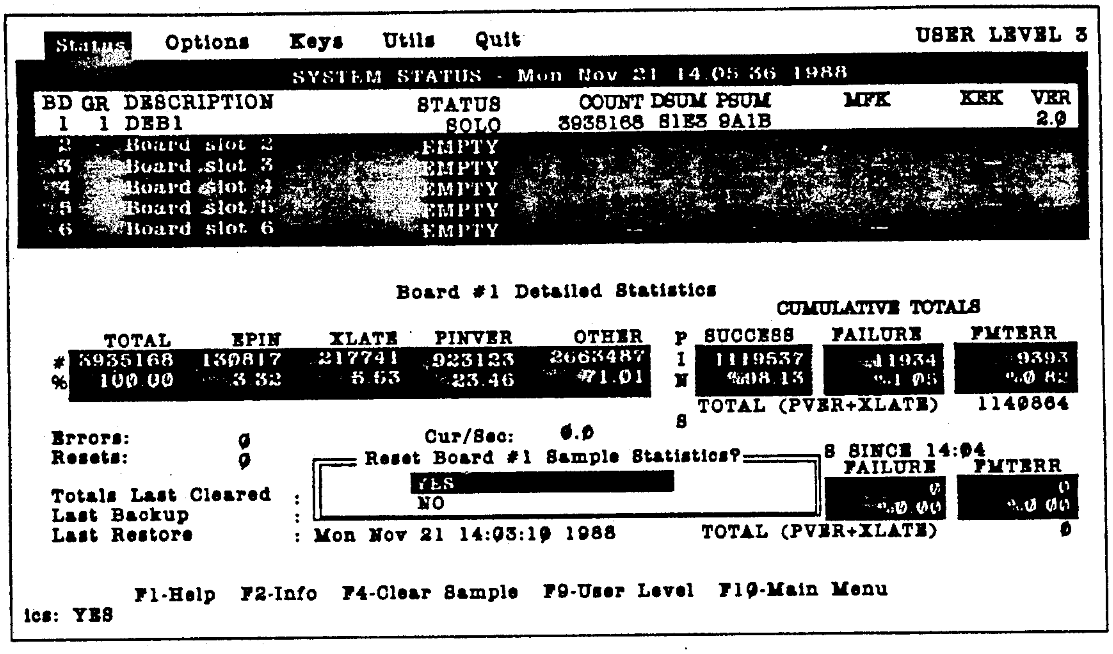

The totals "LAST BACKUP", "TOTALS LAST CLEARED" and "LAST RESTORE" are time stamps which indicate when each of the functions last took place. For each of the above fields, depressing the F4 function key resets the Success, Fail and Format ERROR total fields in the lower right-hand corner of the screen independent of the status interval reset. When the F4 function key is depressed, the display shown in FIG. 54 is displayed. For each of the screen displays, the escape key causes the system to revert to the prior display screen, which was active when the current display was activated. The status screen under an alarm condition is shown in FIG. 55. In cases when an alarm threshold is exceeded and the value of concern returns to a value below threshold, the alarm displayed on the screen is removed when the value of concern drops below threshold; however, fields will not automatically be reset while an alarm condition exists. The F4 key can be used to reset total during any alarm condition.

Figure 56:
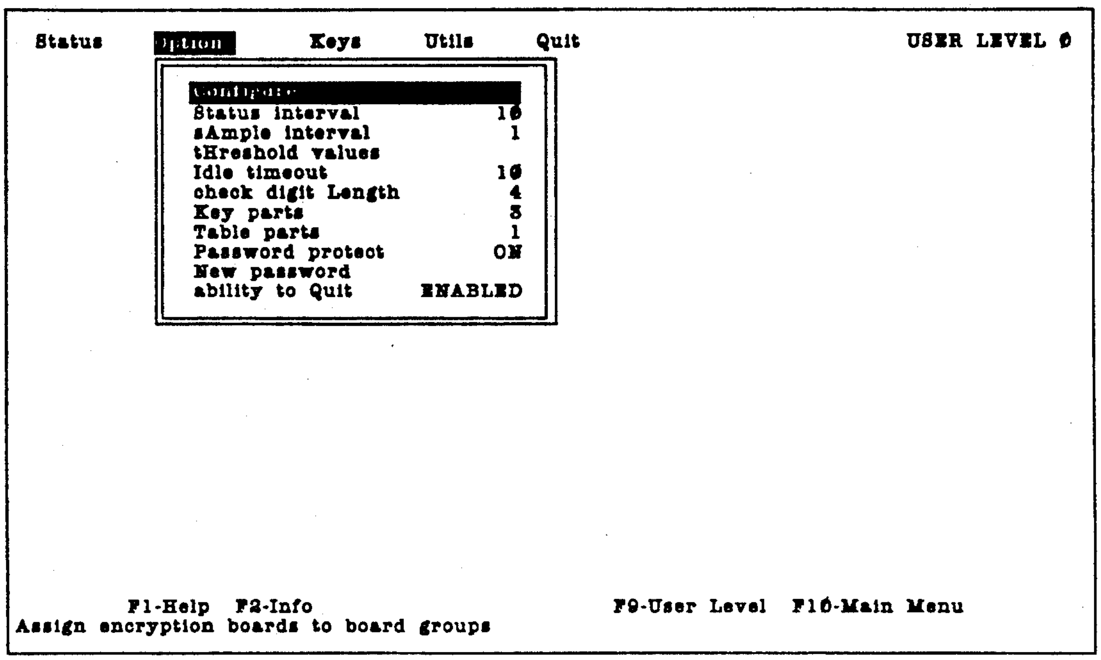

FIG. 56 is a diagram of the master OPTIONS_MENU displayed to the user when the options mode is selected. Using the Options Menu commands, the user can alter certain aspects of the way the user operates the system. Some of the commands set operating parameters, and the others enhance the security of the system itself. This menu enables the user to: (1) configure board descriptions, groupings, and modes; (2) set the number of seconds to elapse before Exclude automatically checks and displays board statuses; (3) define how many characters comprise a check digit; (4) establish how many component key parts make one complete key; (5) protect supervisory functions by requiring a password; (6) define the password required to access supervisory functions; and (7) prevent unauthorized users from exiting Exclude and entering the authorized user's operating system. This display is activated from the main menu by selecting options with the cursor control keys.

When selected, the options sub-menu displays each option available to the user, and the right-hand portion of the display shows the currently entered value for each option. The menu option "Ability To Quit" allows the user to quit the application and return to the operating system in disk-based systems and may be deleted in ROM-based systems. The menu function "Configure" activates another sub-menu discussed further below. The menu function "Status Interval" controls the number of seconds between display updates. The menu function "Sample Interval" controls the number of hours between updating the total fields for threshold checking. The menu function "Threshold Values" controls percentage values for activating an alarm. The menu function "Idle Timeout" controls a time, set in minutes, for controlling the amount of time the keyboard is idle before the system reverts to the main status screen and resetting the user level to level zero. This feature prevents an unattended unit from remaining at a high user level, thus providing access to sensitive key information. The menu function "Check Digit Length" controls the number of check digits to verify, thus providing compatibility with a number of alternate system configurations. The menu function "Key Part" controls the number of key segments prompted for during key entry and can be any value from one to nine. The menu function "Table Parts" controls the number of parts entered in a Diebold table entry sequence. The menu function "New Password" allows the user to specify passwords for each user level. The menu function "password protect" allows users to override the system password protection scheme for servicing and may be deleted in secure systems.

Figure 57:
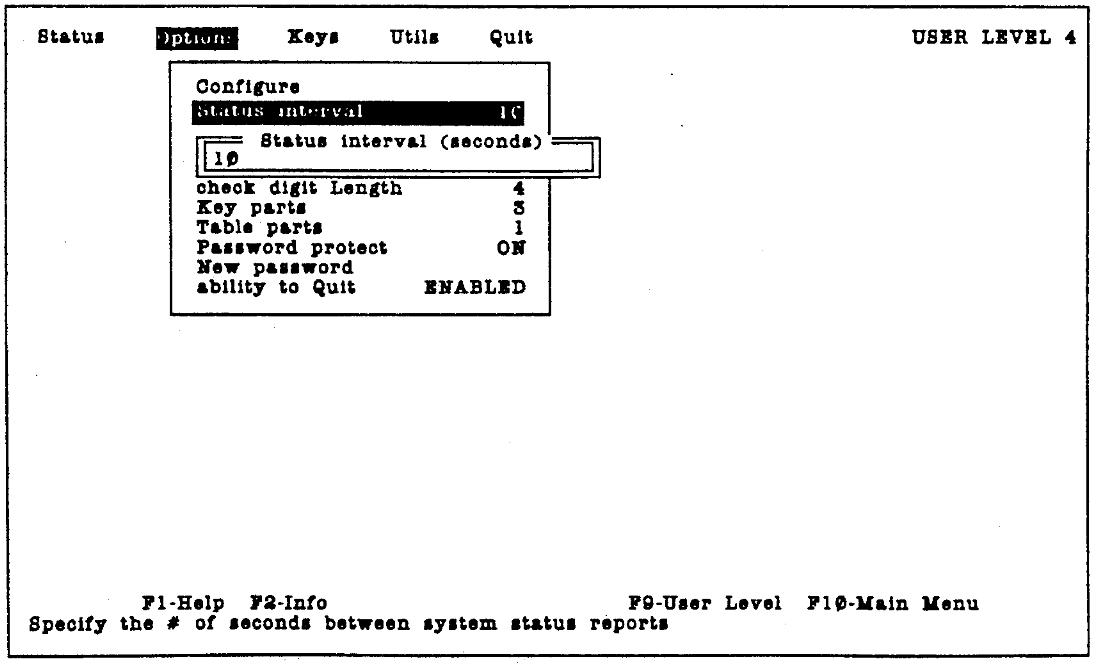

FIG. 57 is a diagram of the screen displayed to the user when option "Status Interval" is selected. In this mode, a second window is displayed for the entry of new Status Interval information. This screen display is exemplary of screen displays wherein simple values are being entered.

Figure 58:
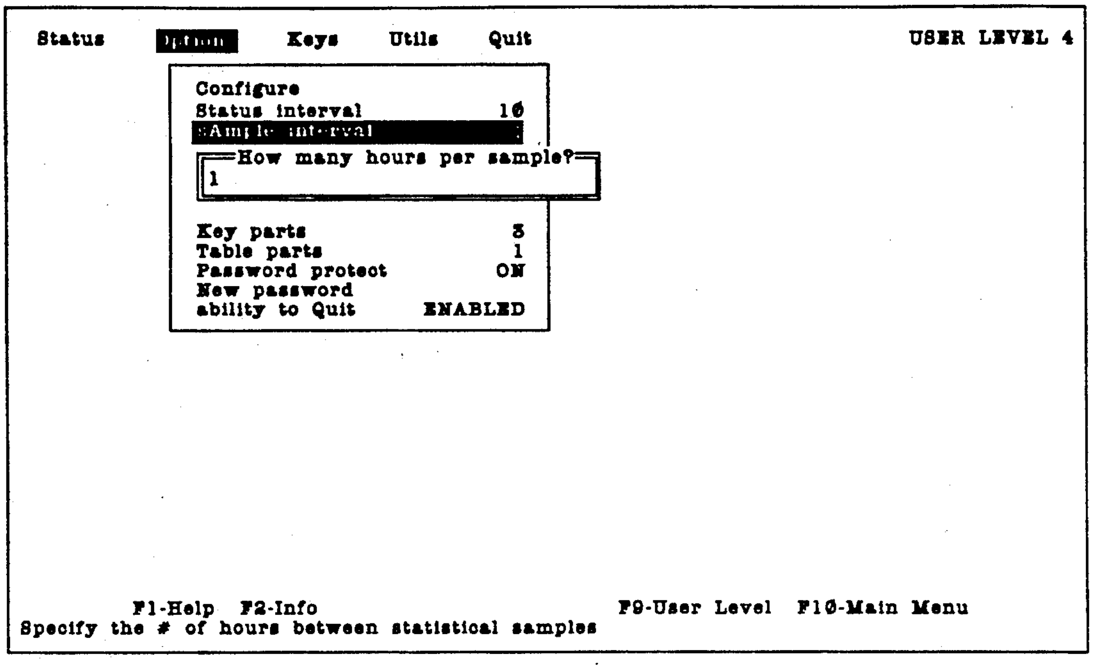

FIG. 58 is a diagram of the screen displayed to the user when option "Sample Interval" is selected. As above, in this mode, a second window is displayed for the entry of new Sample Interval information.

Figure 59:
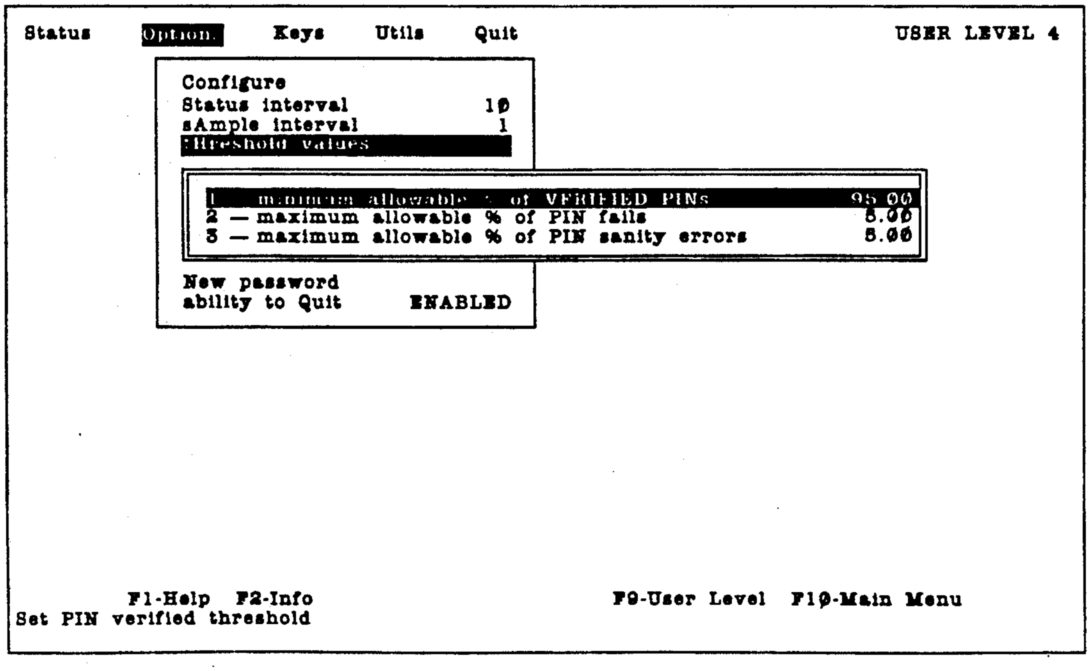

FIG. 59 is a diagram of the screen displayed to the user when option "Threshold Values" is selected. For each of the fields displayed at this level, a value between zero and one hundred may be entered by the user.

Figure 60:
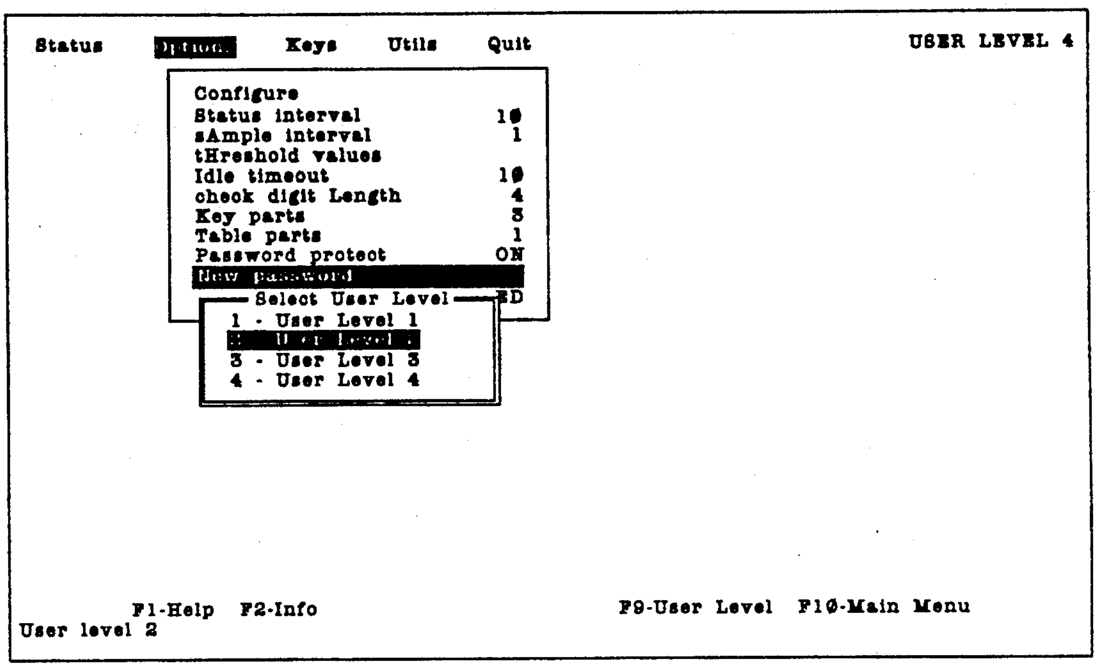

FIG. 60 is a diagram of the screen displayed to the user when option "New Password" is selected. At this level, the user is prompted to enter a user level to specify which password to modify. A user must be logged on the system at a user level at least as high as the user level selected in order to modify the user password for that level. In the preferred practice of the present invention, level four has two distinct passwords associated with it which will presumably be maintained by separate individuals. User level four must be activated to change key information. Level one is used for relatively low priority tasks, such as modifying alarm thresholds and status intervals, etc. Any task of a security nature is done at a high user level.

Figure 61:
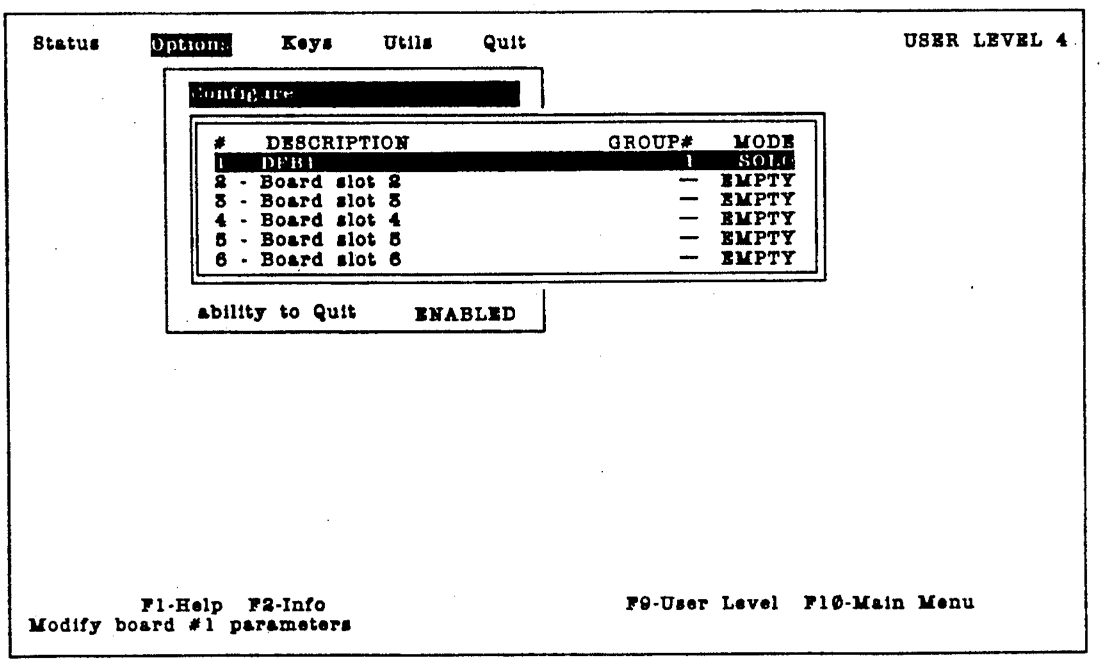

FIG. 61 is a diagram of the screen displayed to the user when option "Configure" is selected. When "Configure" is selected, the first window displayed shows each encryption device available to the system and also shows the basic settings for the encryption devices. To select a particular encryption device, a user enters one through six or may select boards under cursor control.

Figure 62:
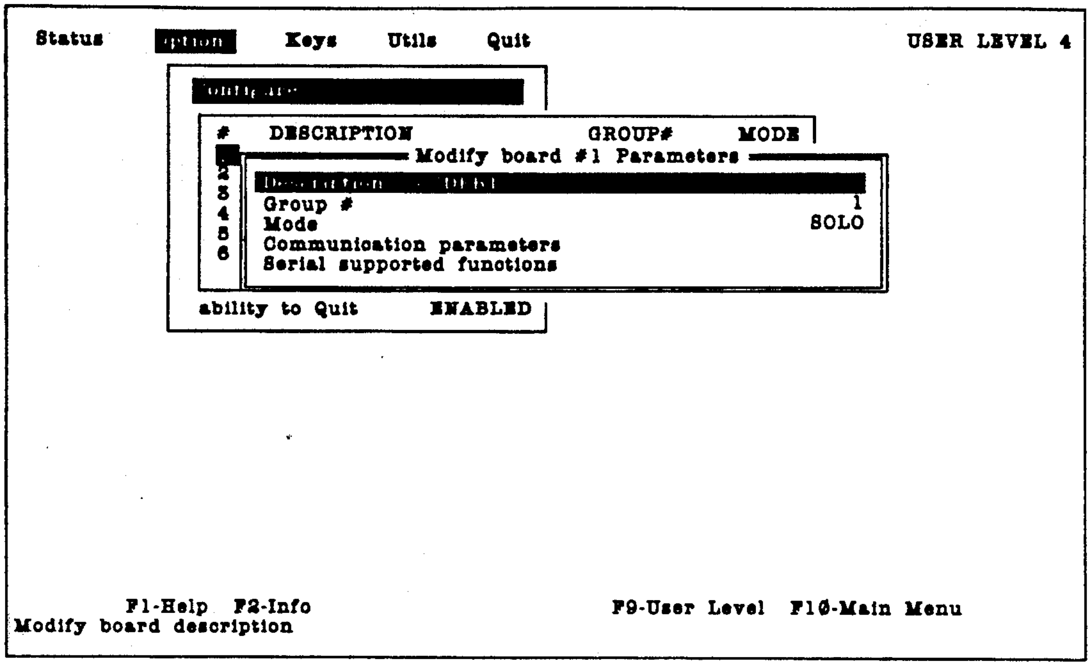

FIG. 62 is a diagram of the screen displayed to the user when option "Configure" is selected at a first level and a particular board is selected at a second level. In this mode, the board identifiers, such as description, group, mode: either master, slave or solo, communication parameters and serial supported functions may be modified by selecting the appropriate menu selection.

Figure 63:
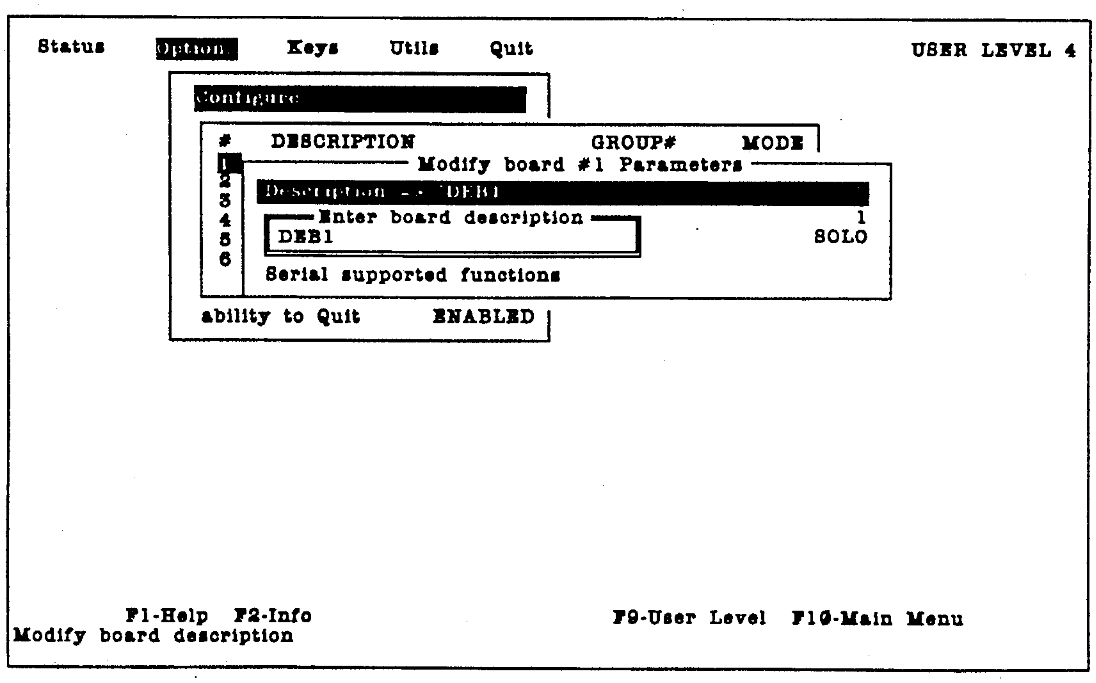

FIG. 63 is a diagram of the screen displayed to the user when option "Configure" is selected at a first level, a particular board is selected at a second level, and "Description" is selected at a third level. In this mode, the user is prompted to enter a string of characters corresponding to the new board description.

Figure 64:
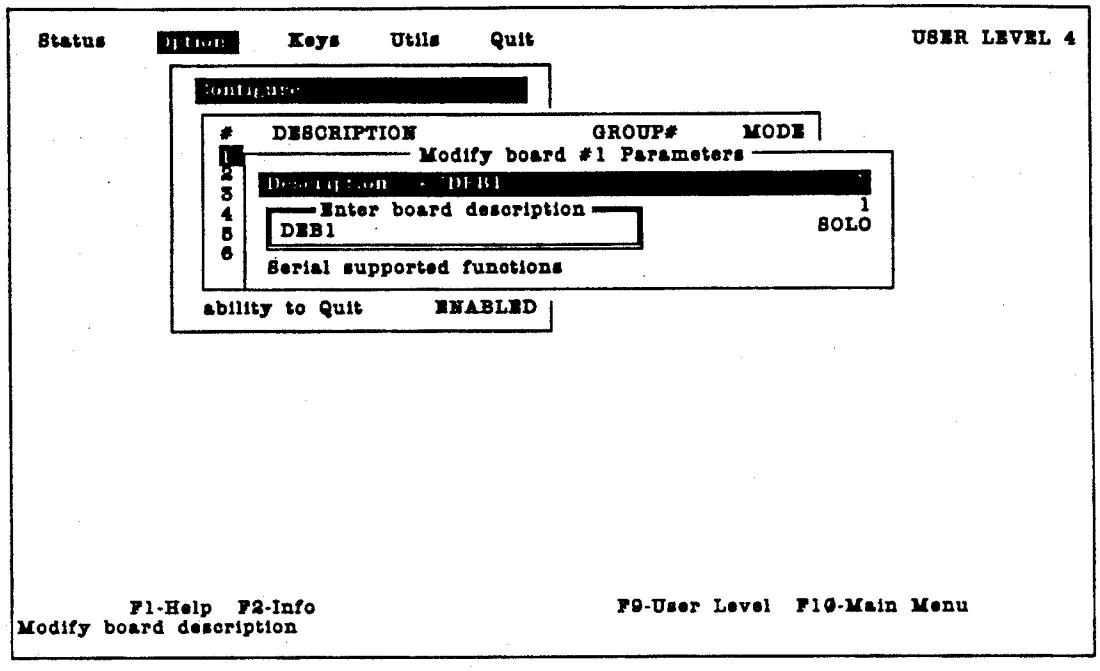

FIG. 64 is a diagram of the screen displayed to the user when option "Configure" is selected at a first level, a particular board is selected at a second level, and "Description" is selected at a third level. In this mode, the user is prompted to enter a string of characters corresponding to the new board description.

Figure 65:
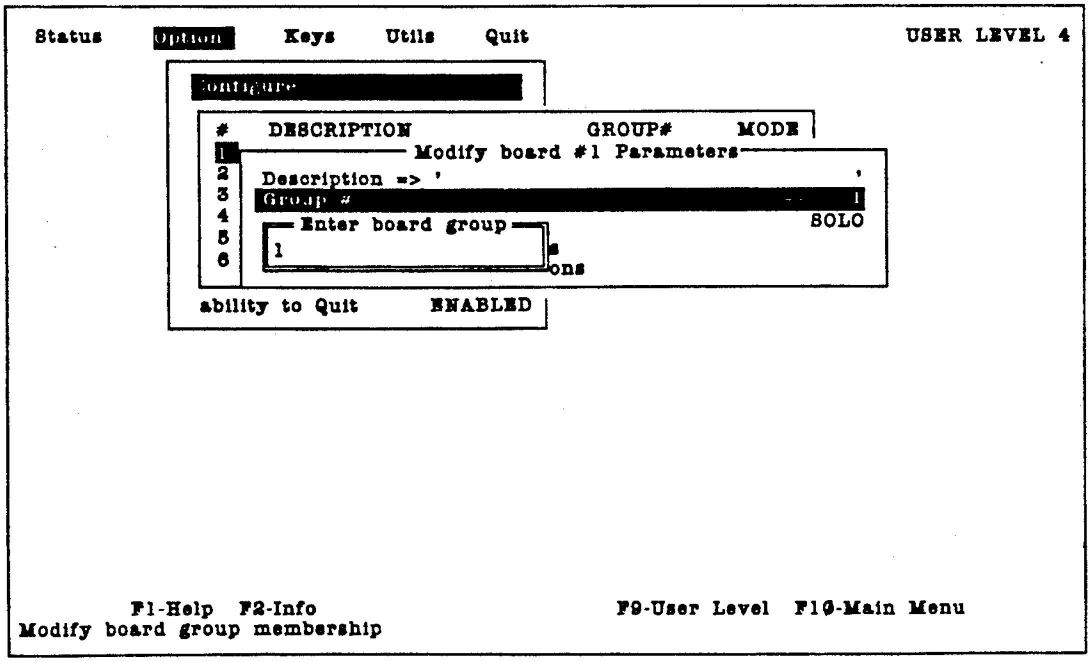

FIG. 65 is a diagram of the screen displayed to the user when option "Configure" is selected at a first level, a particular board is selected at a second level, and "Group" is selected at a third level. In this mode, the user enters a value of between one and six corresponding to the designated group for the selected board.

Figure 66:
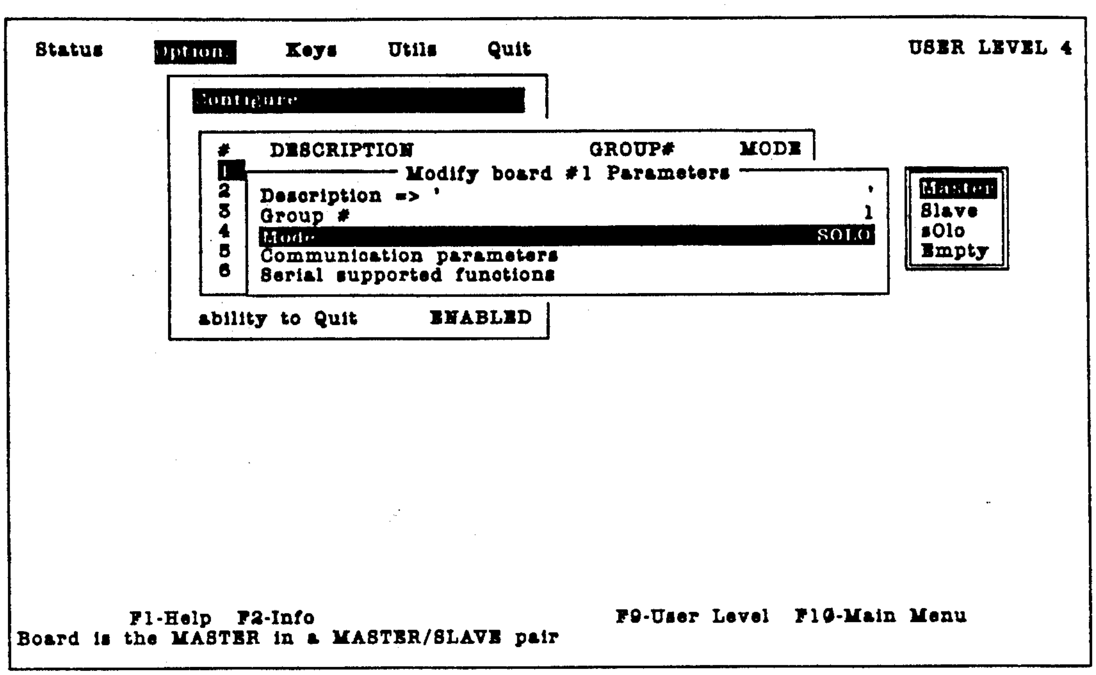

FIG. 66 is a diagram of the screen displayed to the user when option "Configure" is selected at a first level, a particular board is selected at a second level, and "Mode" is selected at a third level. In this mode, a window is displayed which allows the mode of the encryption device to be switched between master, slave, or solo. In addition, an encryption device may be removed from the system by designating the device as empty. One feature of the present invention ensures that encryption devices are logically grouped. For example, slave devices always follow master devices, and the mode of a master device cannot be changed to slave if a slave device is associated with it. In the preferred practice of the present invention, active windows are surrounded with a double bar and inactive windows are surrounded by a single bar. Higher level windows are closed when a lower level window is selected.

Figure 67:
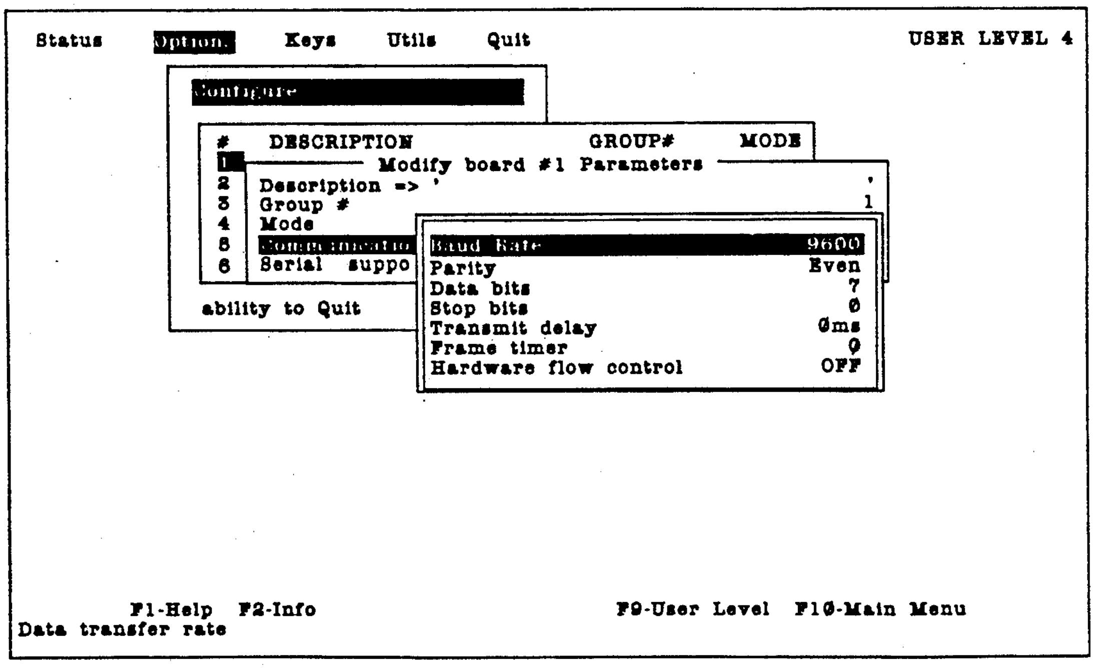

FIG. 67 is a diagram of the screen displayed to the user when option "Configure" is selected at a first level, a particular board is selected at a second level, and "Communication Parameters" is selected at a third level. The communication parameters displayed correspond to the communication parameters used by individual encryption devices for communicating with an associated host computer through its associated serial port. The communication parameters include BAUD_RATE, PARITY_PARAM, DATA_BITS, STOP_BITS, TRANSMIT_DELAY, Frame Timer and HARDWARE_FLOW_CONTROL support. The BAUD_RATE, PARITY_PARAM, DATA_BITS, and STOP_BITS parameters are well-known communication parameters. TRANSMIT_DELAY is the amount of time an encryption device waits from the last byte of a request message before responding to the requesting computer. The frame timer is a BAUD_RATE-dependent value between 1 and 99, which indicates the amount of time allowed between the beginning and end of a message. HARDWARE_FLOW_CONTROL refers to conventional RS-232 hardware handshake controls.

Figure 68:
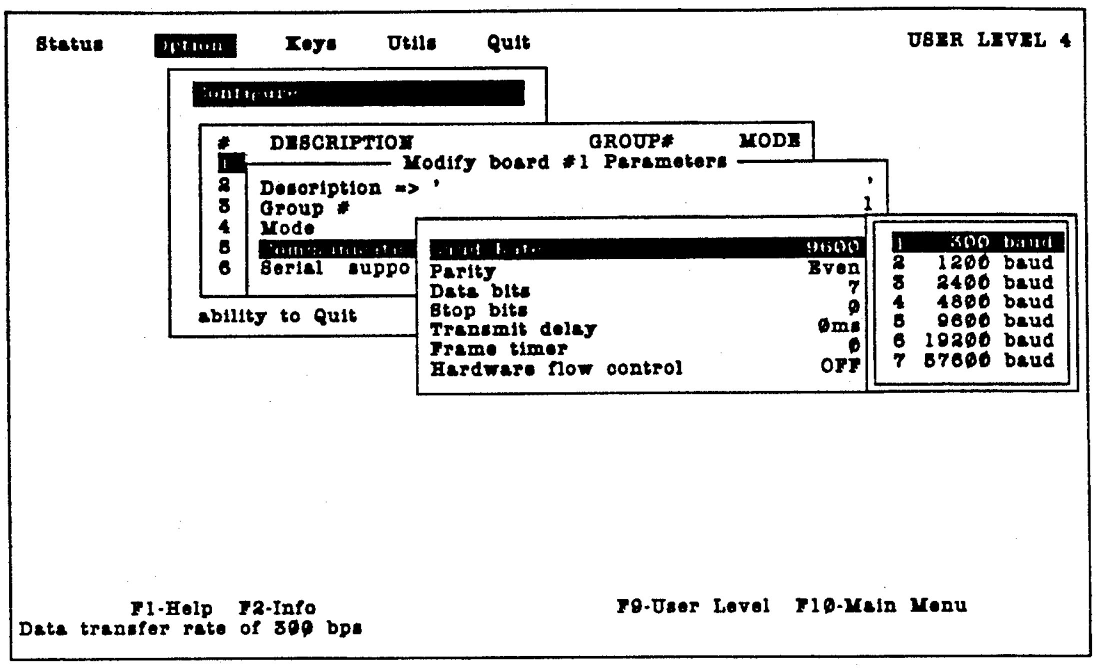

FIG. 68 is a diagram of the screen displayed to the user when option "Configure" is selected at a first level, a particular board is selected at a second level, "Communication Parameters" is selected at a third level, and "BAUD_RATE" is selected at the fourth level. In this mode, an additional window is displayed showing the BAUD_RATE options available to the system. A new BAUD_RATE is selected by entering a number 1-7 corresponding to a desired BAUD_RATE or by selecting the BAUD_RATE with cursor control and depressing the return key.

Figure 69:
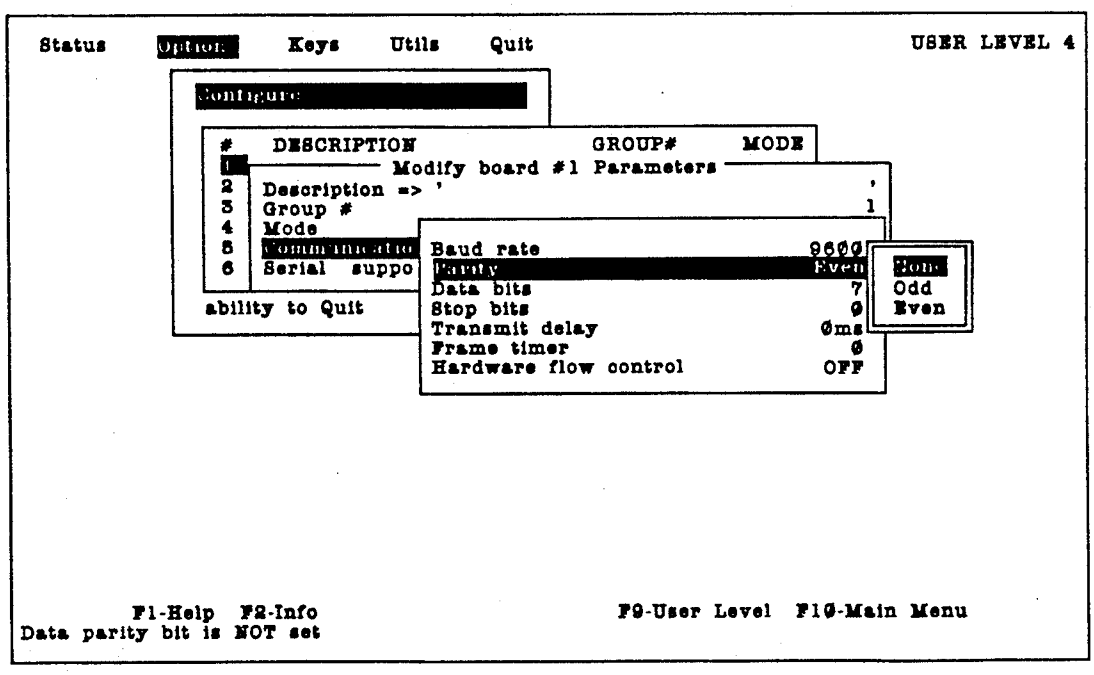

FIG. 69 is a diagram of the screen displayed to the user when option "Configure" is selected at a first level, a particular board is selected at a second level, "Communication Parameters" is selected at a third level, and "PARITY_PARAM" is selected at the fourth level. In this mode, the PARITY_PARAM options of none, odd and even are displayed to the user and a new choice is entered by selecting an option with cursor control or by pressing N,O or E and depressing the return key.

Figure 70:
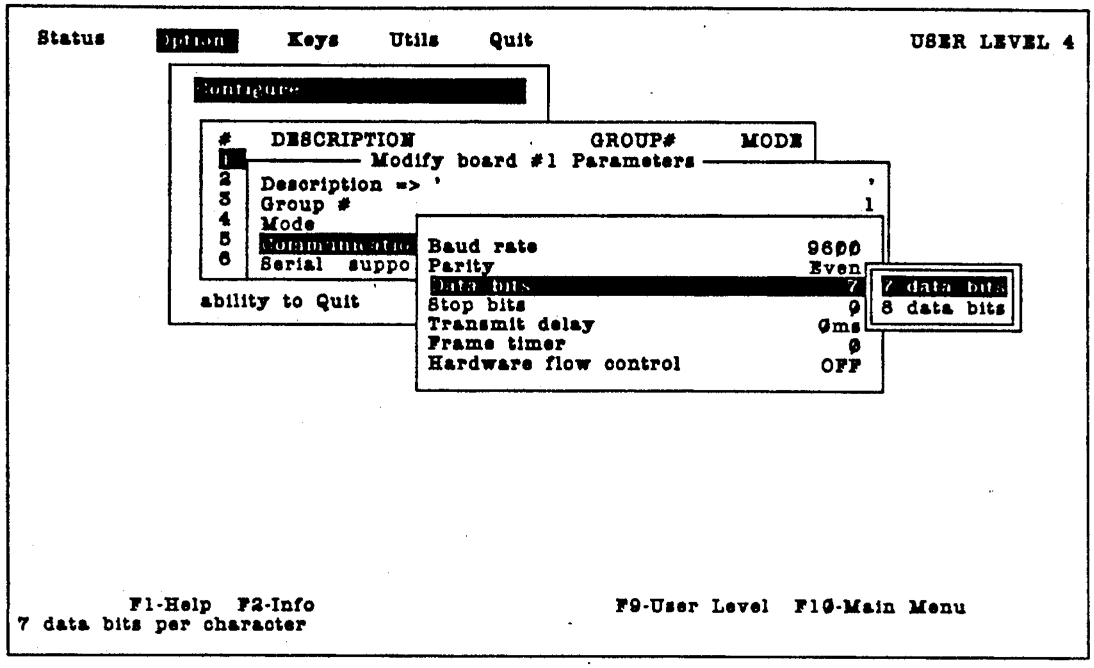

FIG. 70 is a diagram of the screen displayed to the user when option "Configure" is selected at a first level, a particular board is selected at a second level, "Communication Parameters" is selected at a third level, and "DATA_BITS" is selected at the fourth level. In this mode, the options of 7 or 8 DATA BITS are displayed to the user and a new setting is selected in the manner described above.

Figure 71:
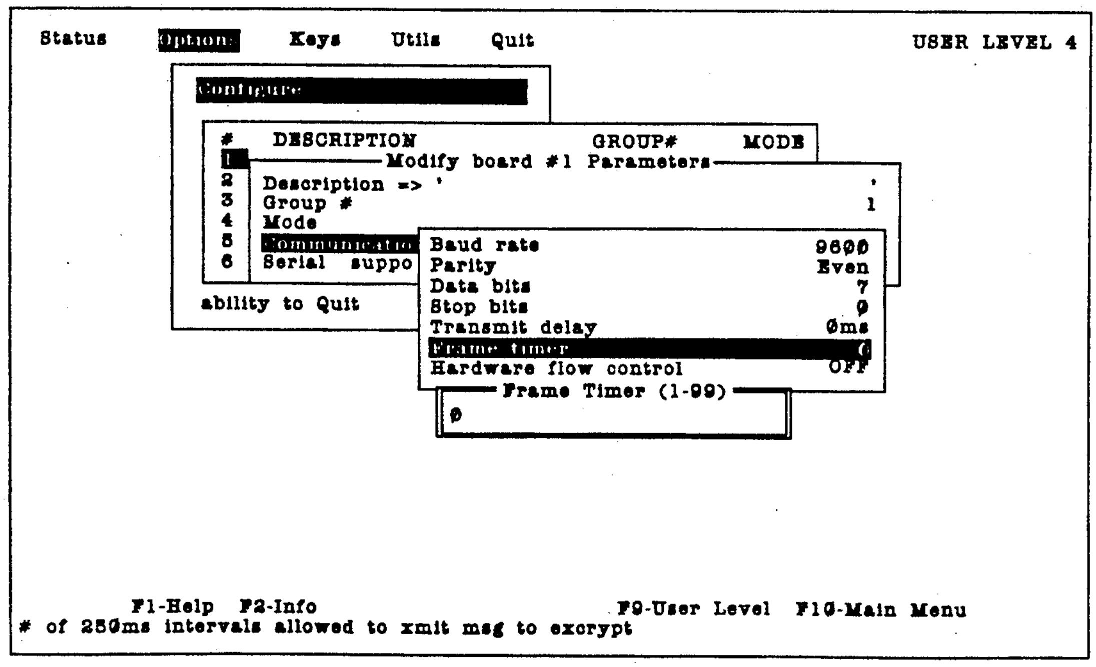

FIG. 71 is a diagram of the screen displayed to the user when option "Configure" is selected at a first level, a particular board is selected at a second level, "Communication Parameters" is selected at a third level, and "Frame Timer" is selected at the fourth level. In this mode, a Frame Timer window is displayed and a new value is entered directly in this window. The HARDWARE_FLOW_CONTROL variable is entered in an identical manner; however, instead of entering a value, the system toggles this function on or off.

Figure 72:
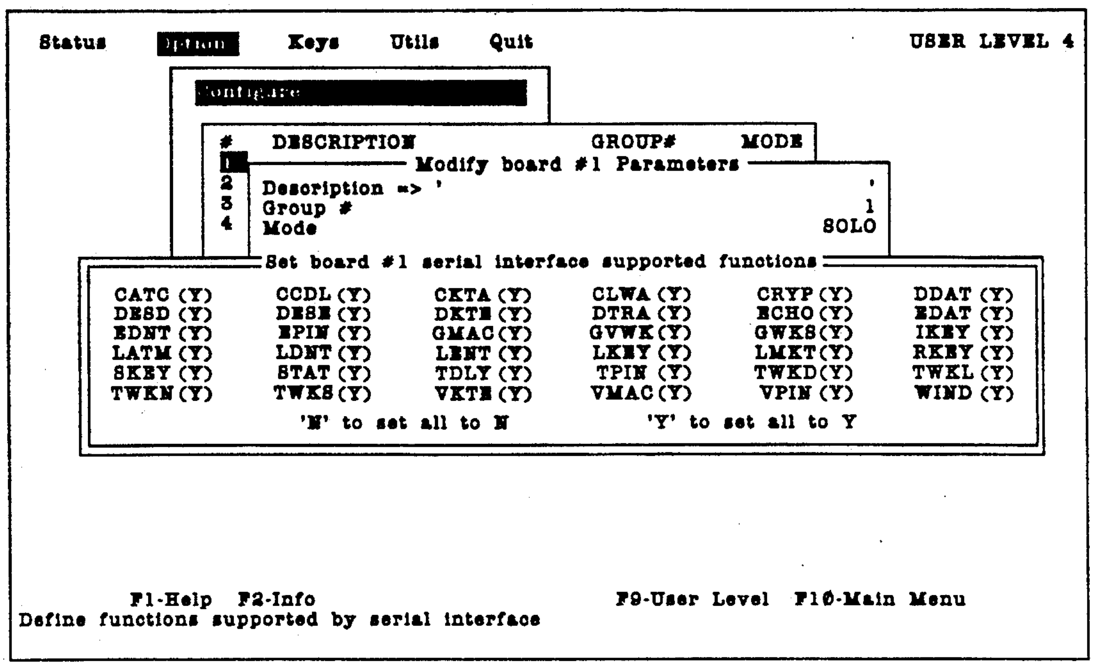

FIG. 72 is a diagram of the screen displayed to the user when option "Configure" is selected at a first level, a particular board is selected at a second level, "Communication Parameters" is selected at a third level, and "SERIAL_SUPPORT" is selected at the fourth level. In this mode, all serial support functions supported by the system are displayed to the user, wherein functions are enabled by selecting a particular function with the cursor and entering lower case "y" in the appropriate field. Similarly, a function is disabled by entering lower case "n" in the appropriate field. Pressing the Enter Key toggles the state of an entry between Y and N. As shown in FIG. 72, all serial functions may be enabled or disabled by entering capital "Y" or "N" without any individual serial function selected. As will be discussed in more detail below, each of the serial functions shown in FIG. 72 corresponds to a function controlled by the function select token incorporated in the signaling protocol of the present invention. Utilizing this feature, individual encryption devices may be programmed to accept only certain commands supported by the system since the serial port is not inherently secure, and it lacks password protection. Therefore, in some environments it is desirable to restrict access to critical device functions. Furthermore, in many applications, only certain functions are provided. Therefore, it is desirable to limit the functions available through the serial port to ensure unauthorized users cannot access or control the encryption device.

Figure 73:
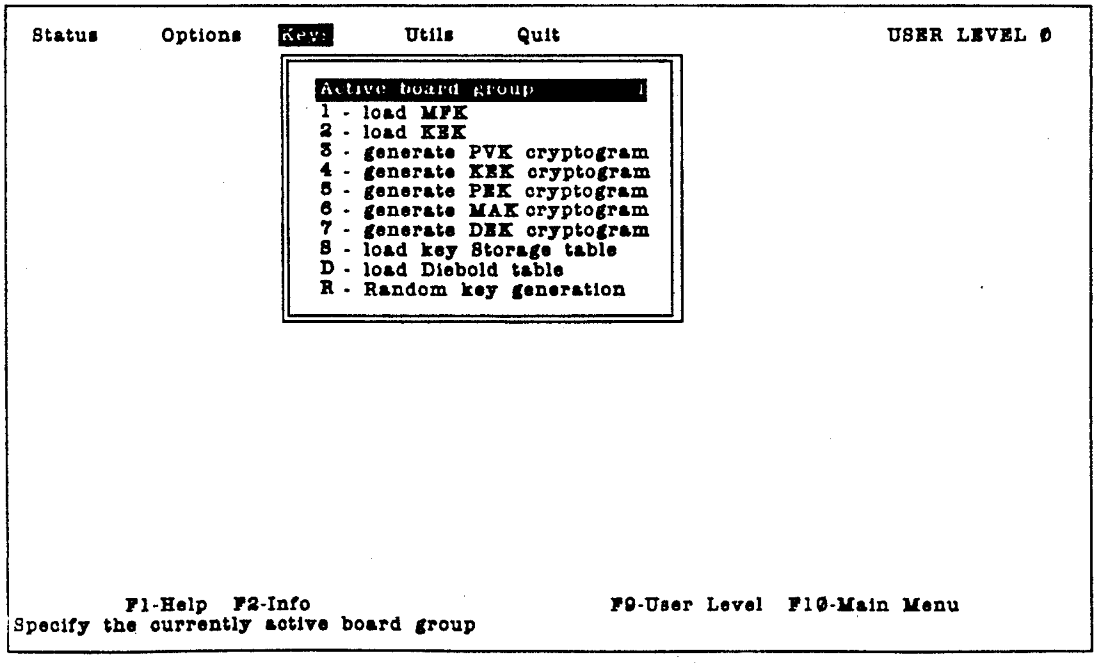

FIG. 73 is a diagram of the master screen displayed to the user when "Keys" is selected on the menu bar. The Keys Menu allows the user to inject a Master File Key (MFK) and a Key Encryption Key (KEK) into the security board. Once injected, the MFK and KEK can never again emerge as clear text. The Keys Menu enables the user to: (1) set which board (or board group) the user loads keys into, (2) generate cryptograms for various kinds of keys, (3) securely store keys that the user uses to communicate with other businesses, (4) randomly generate Diebold tables, (5) securely store a Diebold table, and (6) randomly generate keys whether created by the user or by Exclude. At this level, all key functions are displayed with the top line displaying the currently active board group, and the left column displays the "Hot Keys" for selecting each option. Each board group is selected at the top line of the display. When performing key functions, boards may be assigned to logical encryption device groups such that encryption devices within a group are modified simultaneously.

Figure 74:
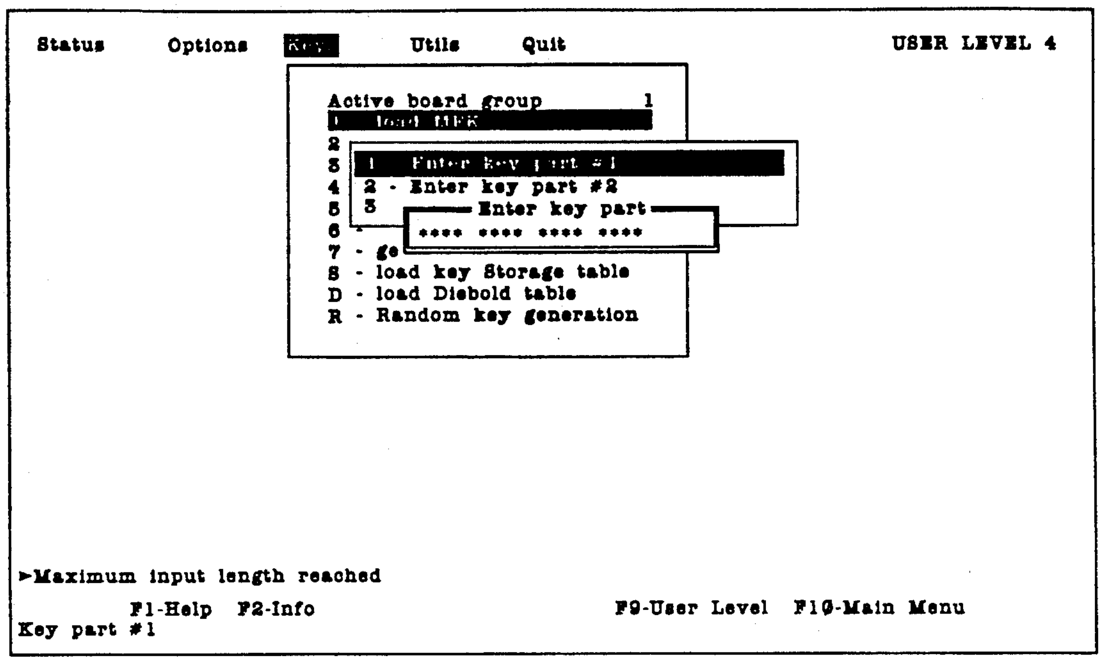
Figure 75:
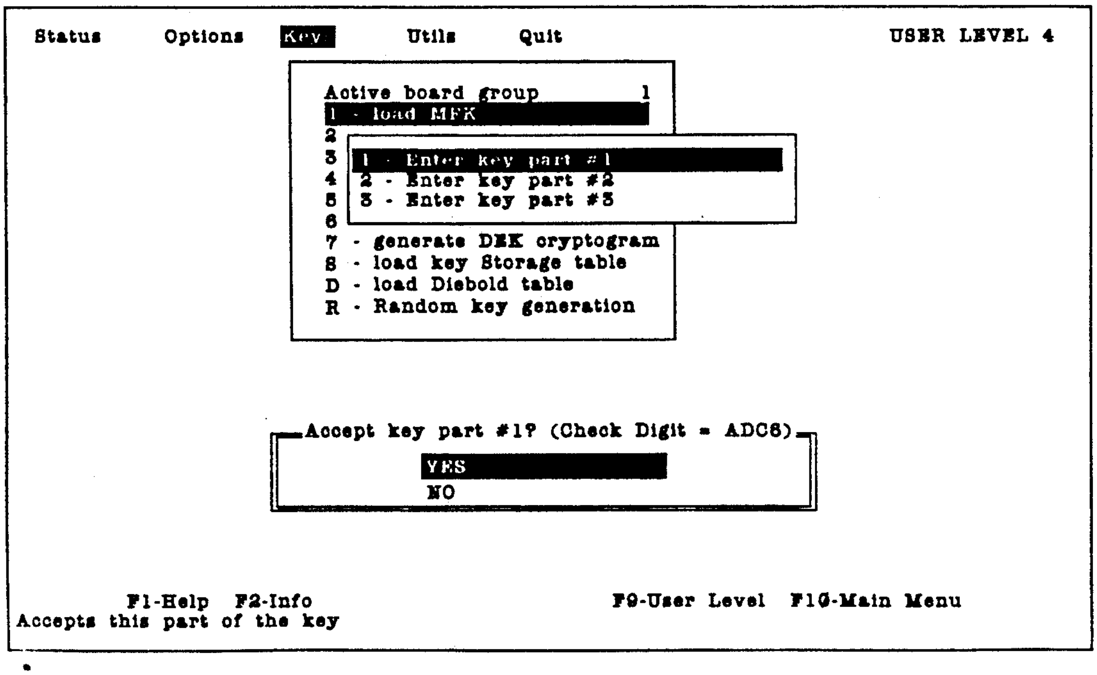

FIG. 74 is a diagram of the screen displayed to the user when "Load MFK" is selected at a first level and "ENTER_KEY Part #1" is displayed at a second level. In the preferred practice of the present invention, each key may be divided into several parts. When ENTER_KEY part is selected, each key part is requested sequentially. Each key part comprises a 16-character field. The entry field starts as blank, and an "*" asterisk is displayed for each key position entered. A space is inserted after every four "*"s for ease of viewing. Once the complete key part is entered and the user enters "return", the check digit for the key part is displayed along with a window requesting key part verification as shown in FIG. 75. The key part check digit is typically stored in a secure location, such as a vault, and used at a later time for reviewing stored key data. The check digit may also be used when entering a key part for the first time wherein a key part is entered twice; if identical check digits are returned, the user is assured that the key part was correctly entered. Once a key part is accepted, a window requesting the next key part is displayed and an identical procedure is performed until all key parts are entered. When the final key part is entered, check digits for the overall key parts are generated, and the user is prompted to accept that the key parts are correct.

Figure 76:
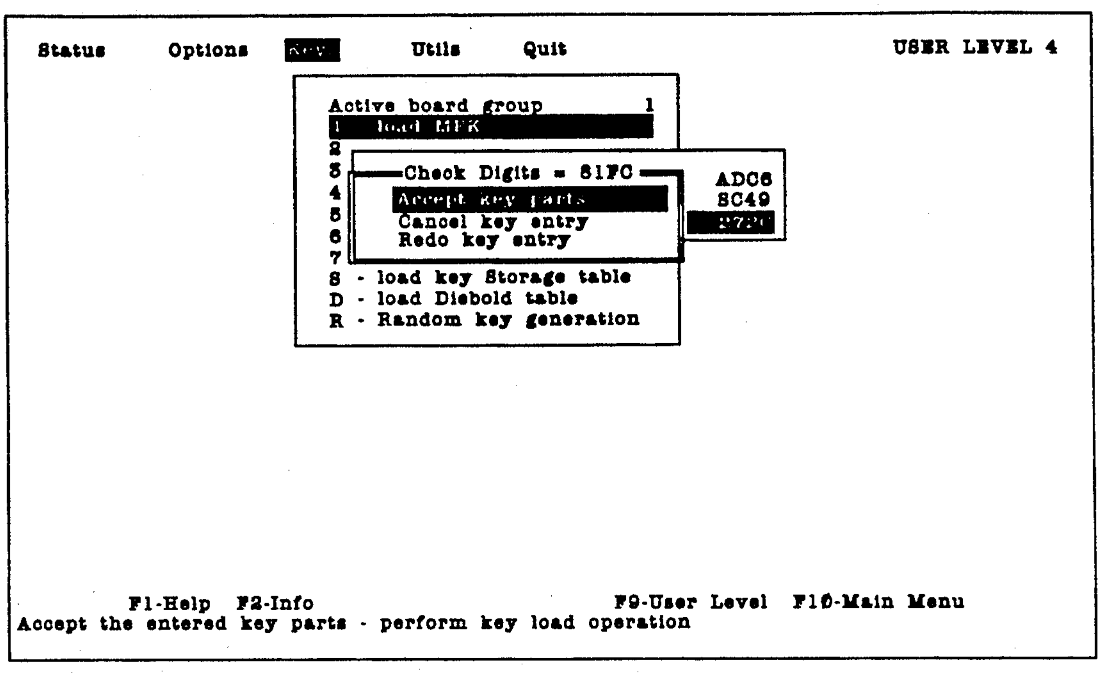

FIG. 76 is a diagram of the screen displayed to the user when "Load MFK" is selected at a first level, all key parts have been selected at a second level, all key parts have been entered, and the system is requesting acceptance of the key parts. Once the key part has been accepted, the system reverts to the main KEYS_MENU and an identical procedure may be used to load the KEK, PVK, PEK, MAK and DEK, wherein each of these keys comprises a 16-digit number.

Figure 77:
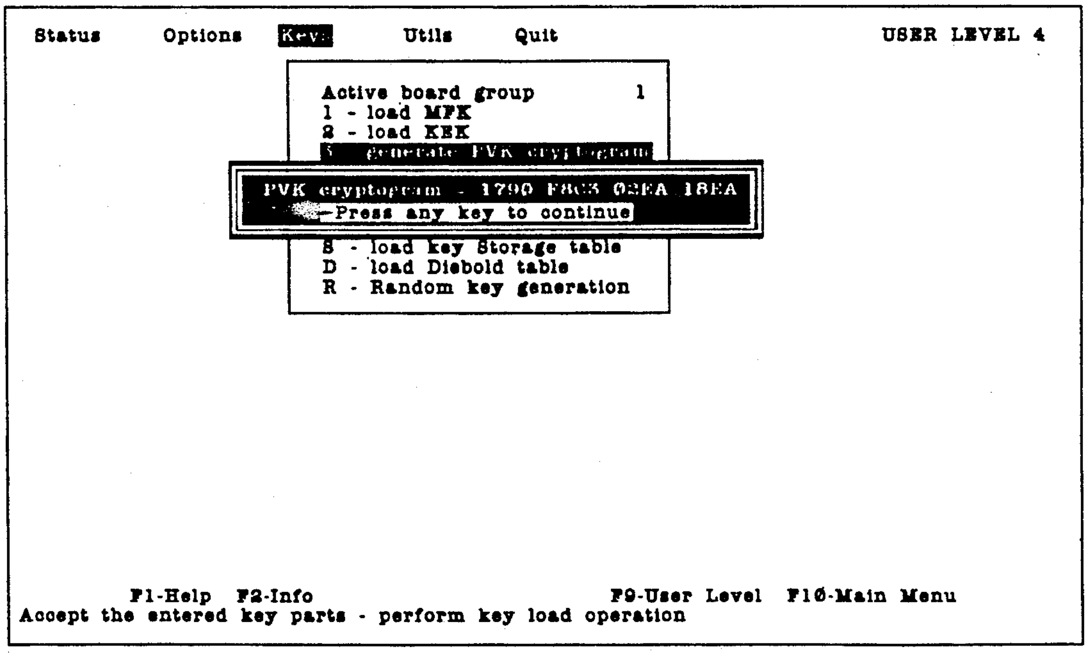
Figure 78:
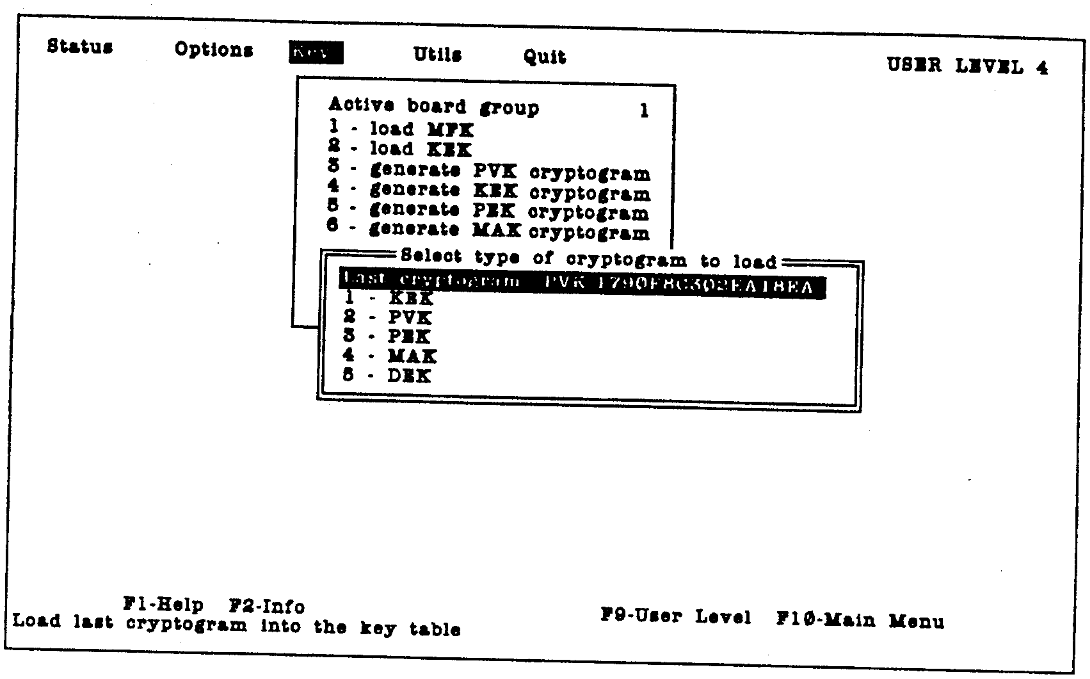
Figure 79:
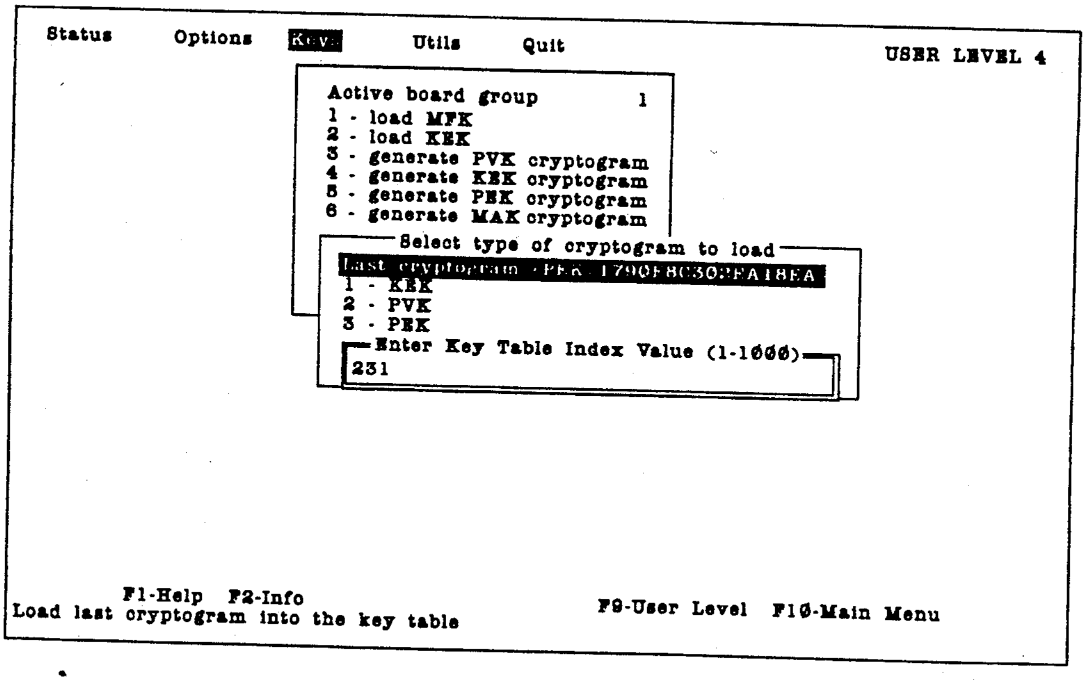
Figure 80:
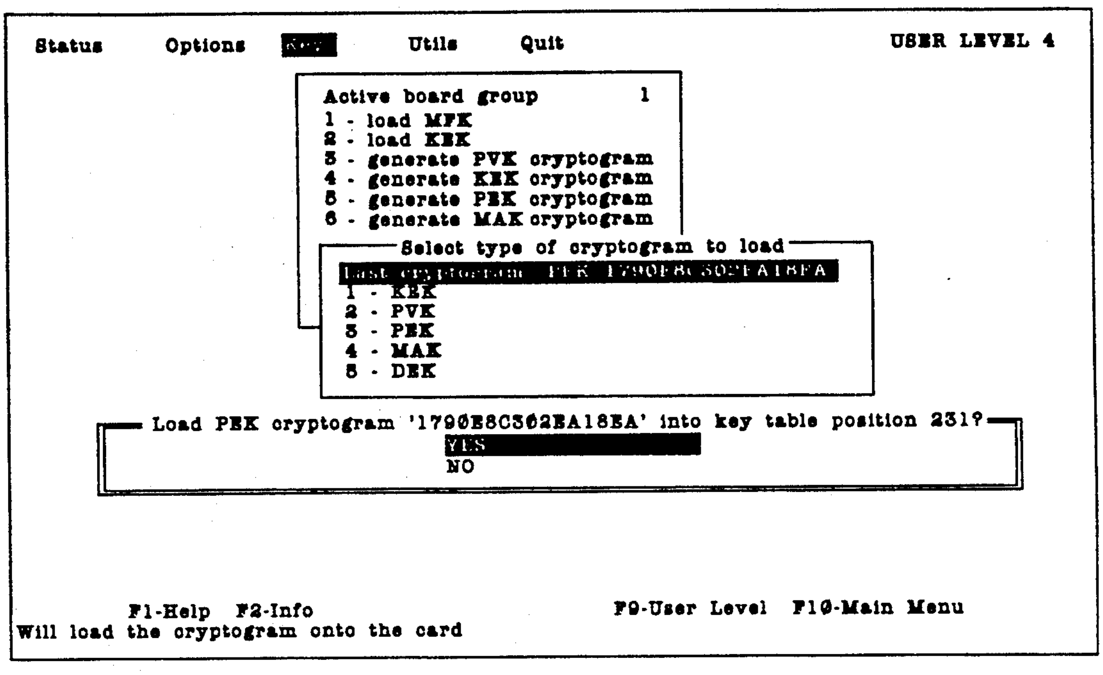
Figure 81:
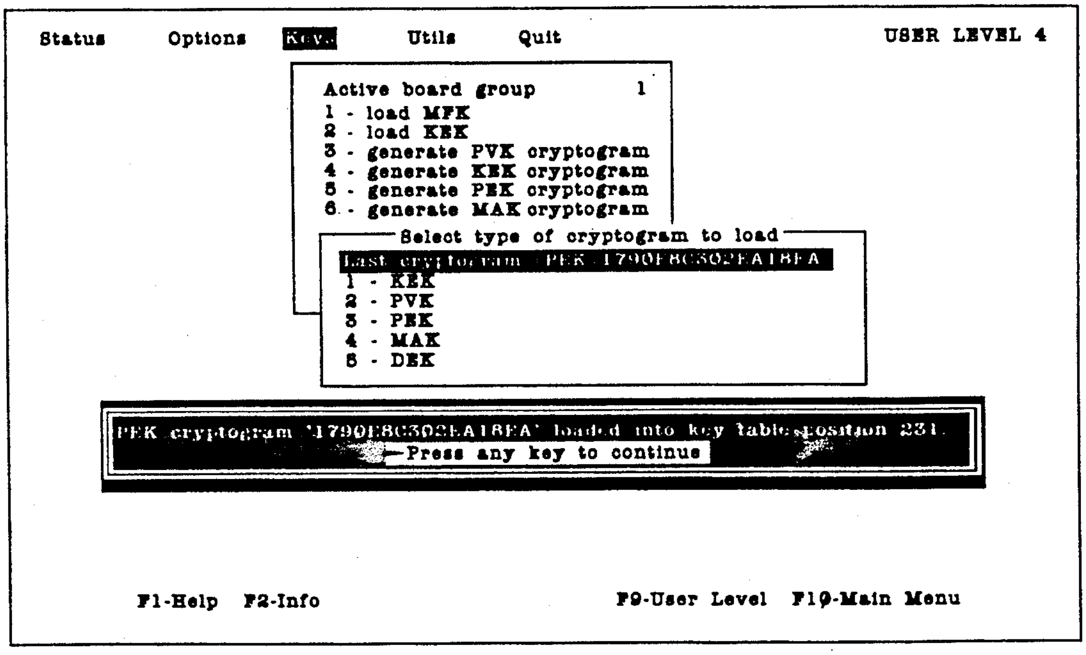

FIG. 77 is a diagram of the screen displayed to the user when "Generate PVK Cryptogram" is selected at a first level. In this mode, a window is displayed indicating the cryptogram generated by the system. When a user depresses any key on the keyboard, another window is displayed, prompting the user to select a type of cryptogram to load, as shown in FIG. 78. At this level, the user can select numerals 1 through 5 corresponding to the keys of the KEK, PVK, PEP, MAK and DEK, respectively. This window also contains a field which displays the last cryptogram generated under the "Generate PVK Cryptogram" option. To load this cryptogram into a selected board, the user simply types "L" from the keyboard. Once the user has instructed the system to load the cryptogram into the Key Table, the display of FIG. 79 is generated, prompting the user to enter a Key Table index value of between 1 and 1,000. The Key Table Index value indicates the location in the Key Table where a particular cryptogram is stored. For example, in the display shown in FIG. 79, the cryptogram will be entered in slot 231 of the Key Table. The Key Table Index values are typically configured by the operator of the system wherein certain numbers or blocks of numbers may be reserved for certain institutions or certain types of keys. Thus, the Key Table Index could be stored in a separate location and any time communications with a particular institution are desired, this information could be sent to the encryption device to access the cryptogram for that institution. In prior systems, the Key Table management is handled automatically by the host computer system and the user has no control over the locations in which the Key Table individual cryptograms are stored. The present invention allows the user to define specific Key Table locations such that when multiple encryption devices are incorporated in the same unit, the user can ensure that each encryption device has identical cryptograms. Once a Key Table Index value is entered, the display of FIG. 80 is generated to prompt the user to verify the entered Key Table position value. Once the Key Table position value is verified by the user, the display of FIG. 81 is generated to indicate that the cryptogram has been loaded into the requested Key Table position of the encryption device.

Figure 82:
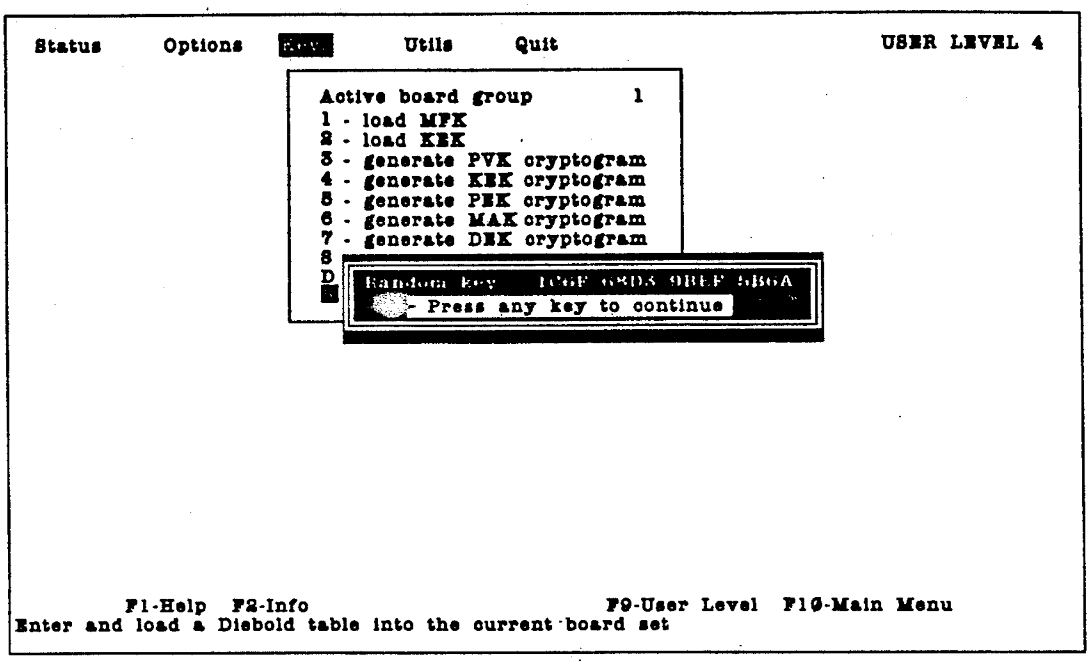

FIG. 82 is a diagram of the screen displayed when the menu option "RANDOM KEY" is selected by the user. In this mode, the system accesses a designated encryption device which is provided with a random key generator. Once the encryption device generates a random key, this value is returned and displayed to the user. This random key can then be used as a key part to create any of the cryptograms used in the system.

Figure 83:
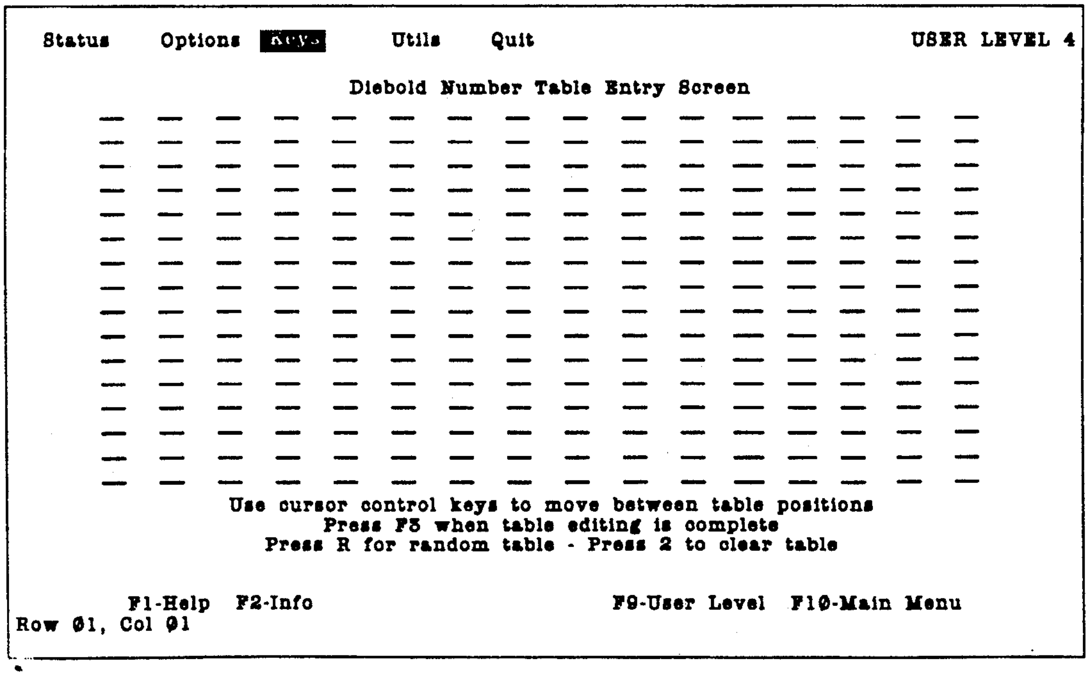
Figure 86:
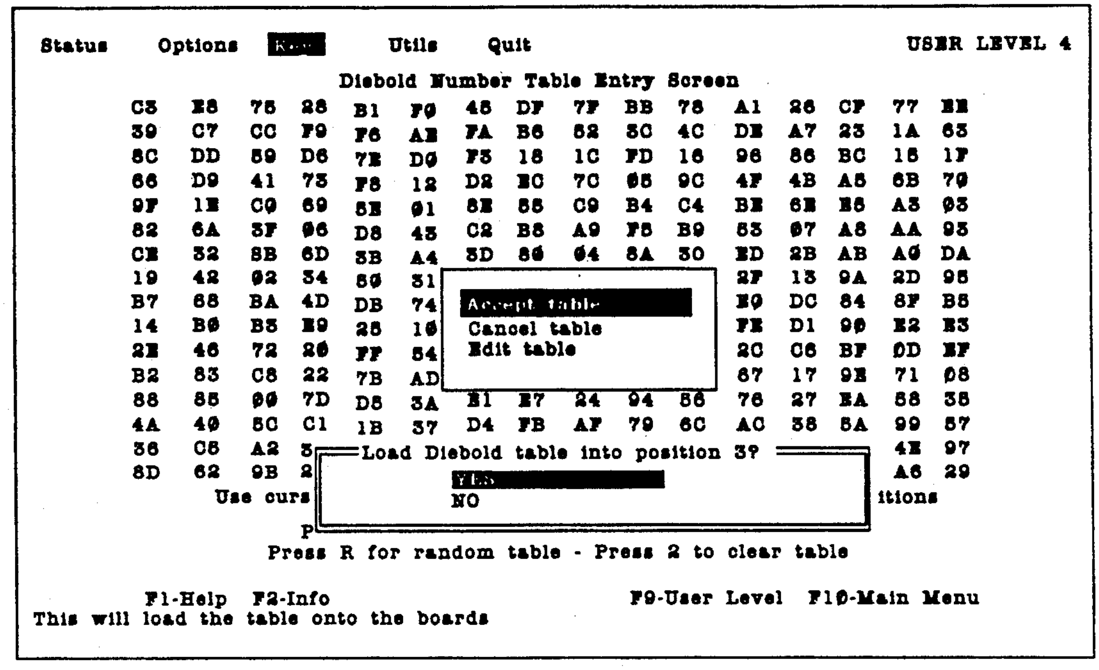
Figure 87:
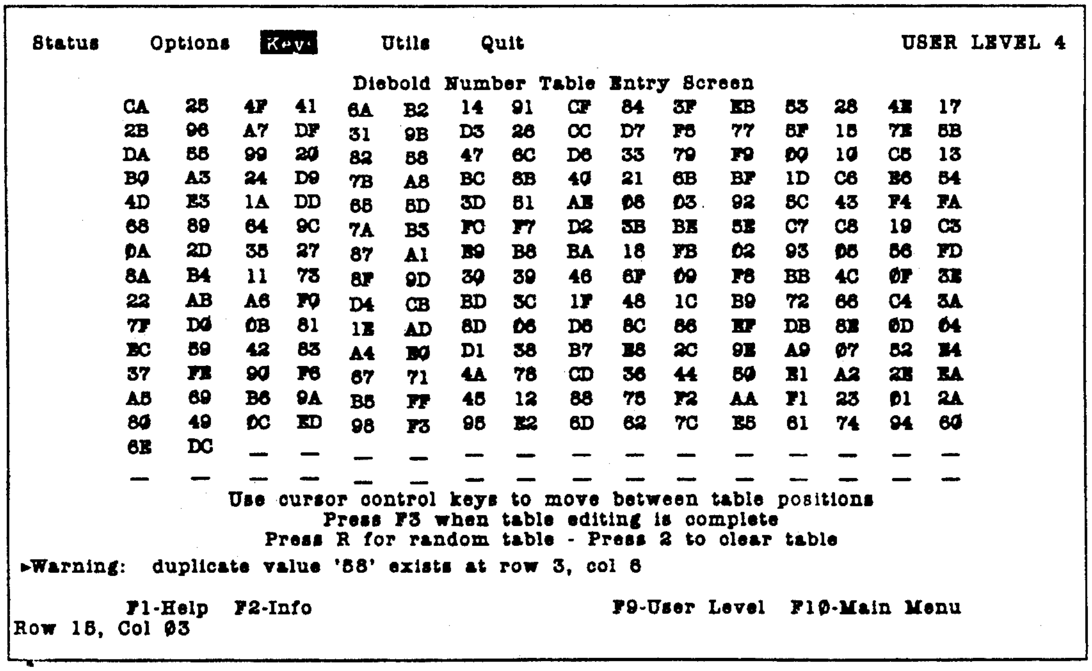

FIG. 83 is a diagram of the opening screen displayed to the user when the Keys Menu option "LOAD_DIEBOLD_TABLE" is selected. The Diebold number table is a table of numbers used for encrypting data under the Diebold data encryption scheme. When this menu option is selected, the values for the Diebold number table may be entered manually by using cursor control keys to move between table positions or may be generated automatically. To automatically generate a Diebold number table, the user presses "R" on the keyboard, and the system will automatically insert random numbers in each of the table positions, as shown in FIG. 84. When the table editing is complete, the user depresses the "F3" function key, and the screen of FIG. 85 is displayed, which prompts the user to either accept or cancel the table or return to the edit mode. In the preferred practice of the present invention, each encryption device is provided with a plurality of table positions wherein alternate Diebold number tables may be stored. Therefore, once the user has accepted the table from the display of FIG. 85, the display of FIG. 86 is generated to prompt the user to enter a Diebold table position number. The Diebold table may be loaded into any one of ten predefined table positions. Since the present invention is designed to communicate with a variety of encryption schemes, encryption keys and Diebold number tables are stored in distinct portions of the memory of the encryption device. Once the Diebold table position has been entered and verified by the user, the display of FIG. 87 is generated, showing the values of the Diebold number table along with a warning field indicating whether any duplicate values exist within the table.

Figure 88:
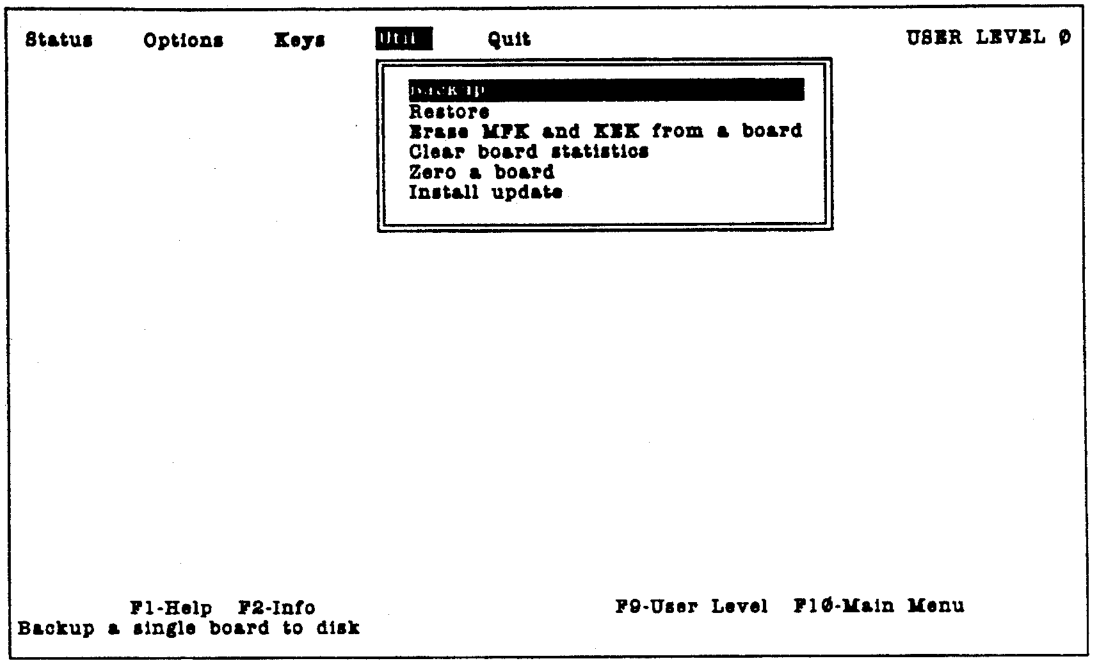

FIG. 88 is a diagram of the master screen displayed to the user when "Utils" is selected on the menu bar. The first three options under the Utils menu, backup, restore, and erase MFK and KEK from a board, are options which would be used in a disk-based system. In ROM-based systems, these menu items would not be displayed to the user. The option "Clear Board Statistics" is used whenever a user wishes to reset the statistics displayed under the status menu. The "Zero A Board" option is used to erase all of the information retained in a particular encryption device and would be typically used if a particular encryption device were to be removed from a system and transported to a remote location for servicing. The "Install Update" menu option is used to perform field upgrades of system software, and may be used in either disk-based or ROM-based systems.

Figure 89:
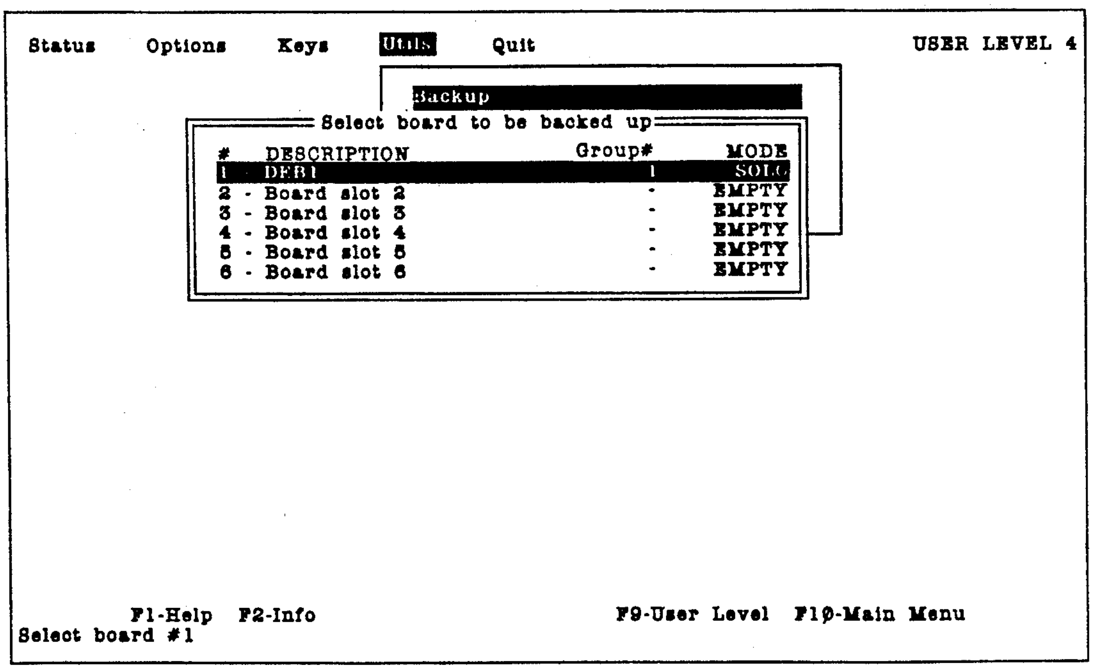
Figure 90:
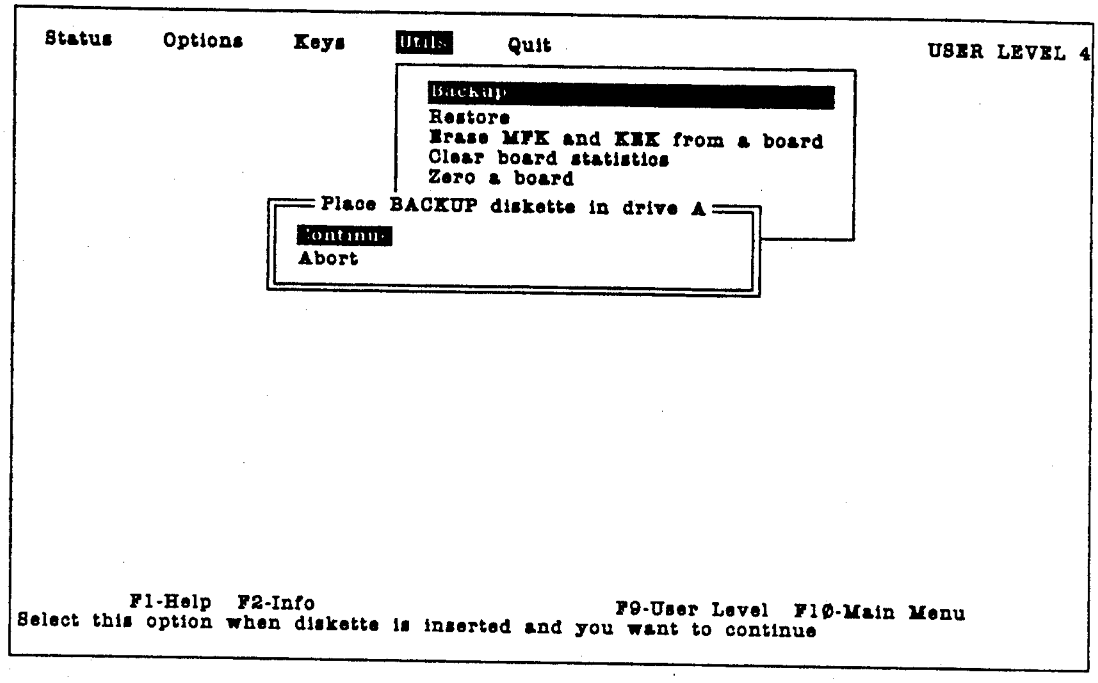
Figure 91:
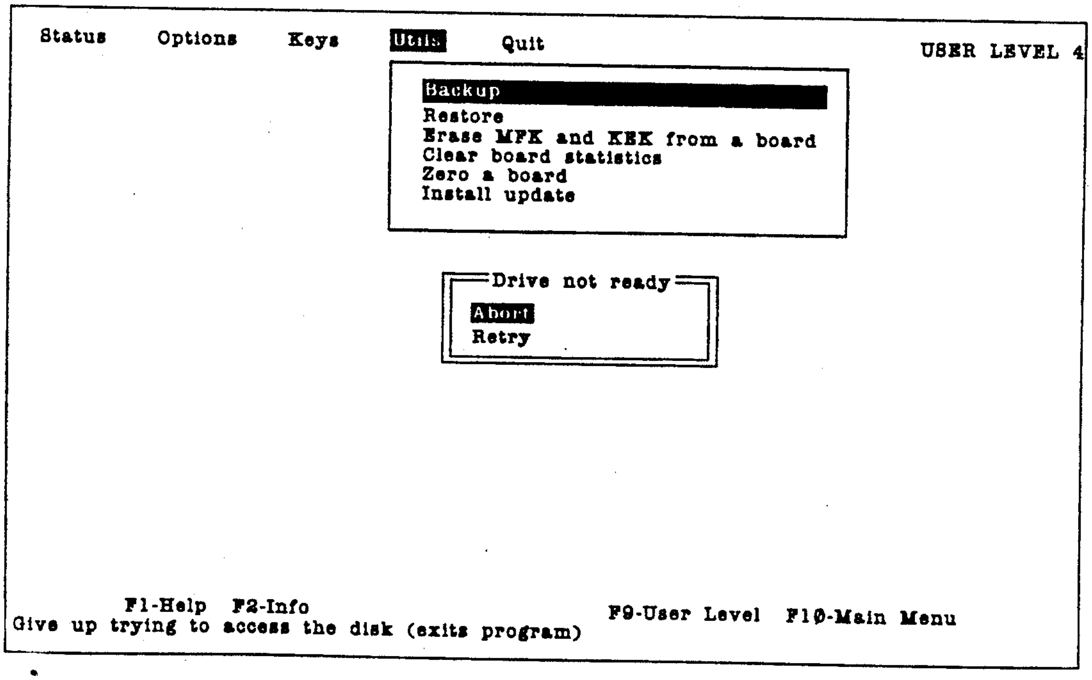
Figure 92:
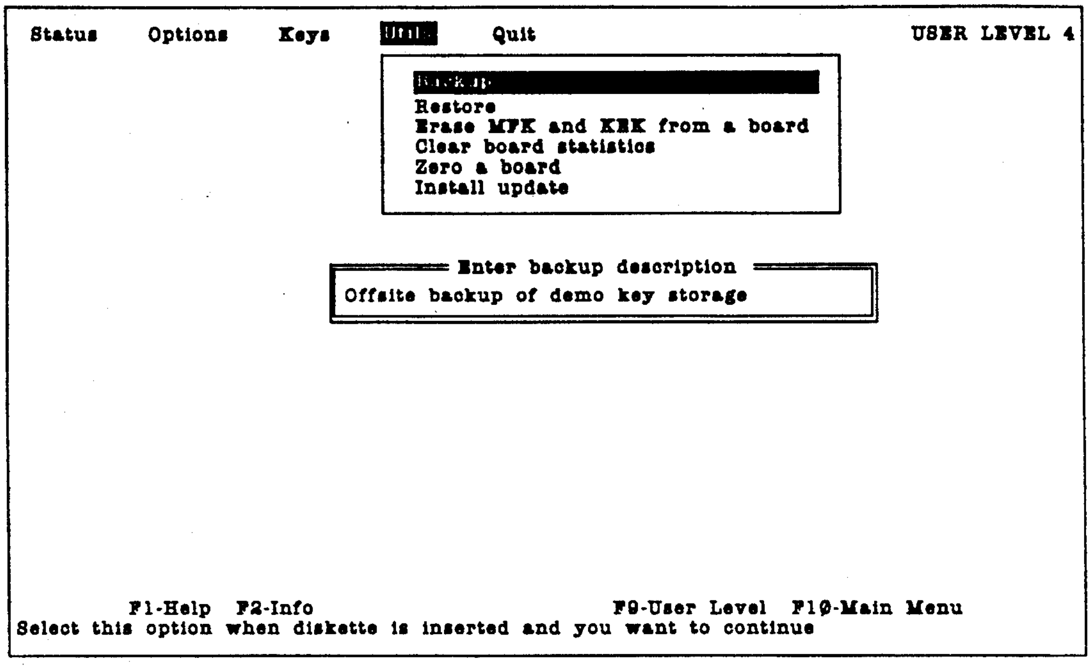

Referring now to FIG. 89, when the "Backup" option has been selected, the system generates a window prompting the user to select a board to be backed up. As above, the individual encryption devices may be selected by cursor control or by entering the digit in the left-hand column of the window corresponding to the individual board description. This window also displays the group number associated with particular encryption devices and the mode in which each encryption device is operating. Once a particular encryption device has been selected to back up, the display of FIG. 90 is generated, prompting the user to insert a backup diskette in the associated disk drive unit. In ROM-based systems, the prompt would be changed to place backup ROM in port. Once the appropriate ROM or diskette has been inserted in the system, the user selects "Continue" or "Abort." If the "Continue" option is selected, the system will transfer the data from the selected board onto the diskette or other backup device. FIG. 91 is a display generated by the system whenever the "Continue" option is selected under "Backup" and the appropriate disk drive unit has not been loaded with a backup diskette. Once the system backup has been performed, the system prompts the user to enter a backup description, as shown in FIG. 92. This backup description can be any type of text entry and would typically be used for documentation purposes.

Figure 93:
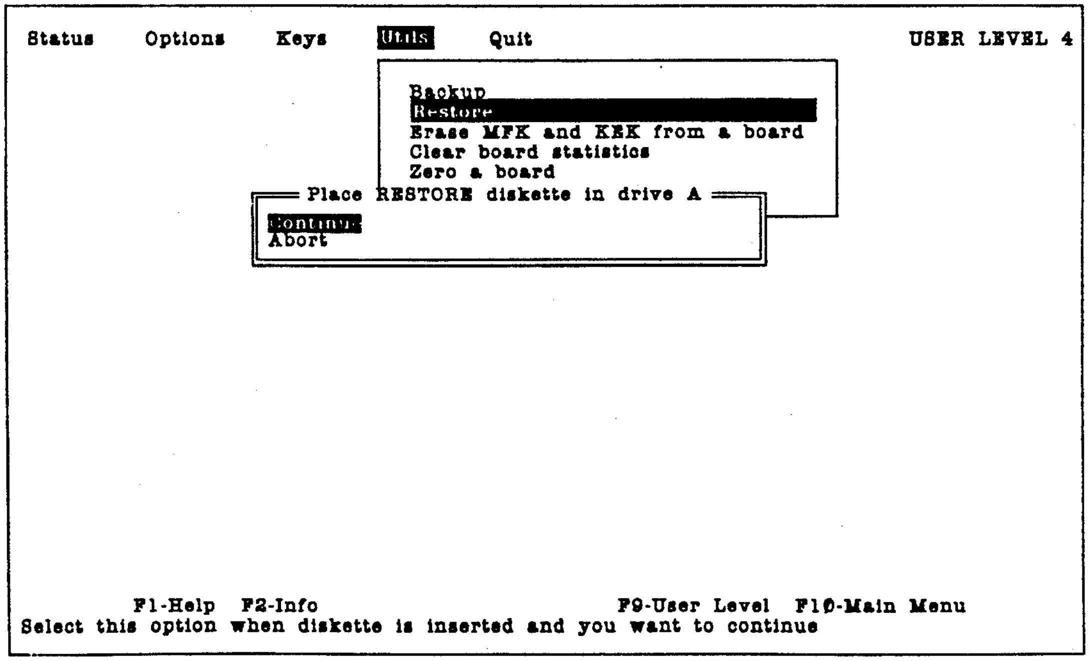
Figure 94:
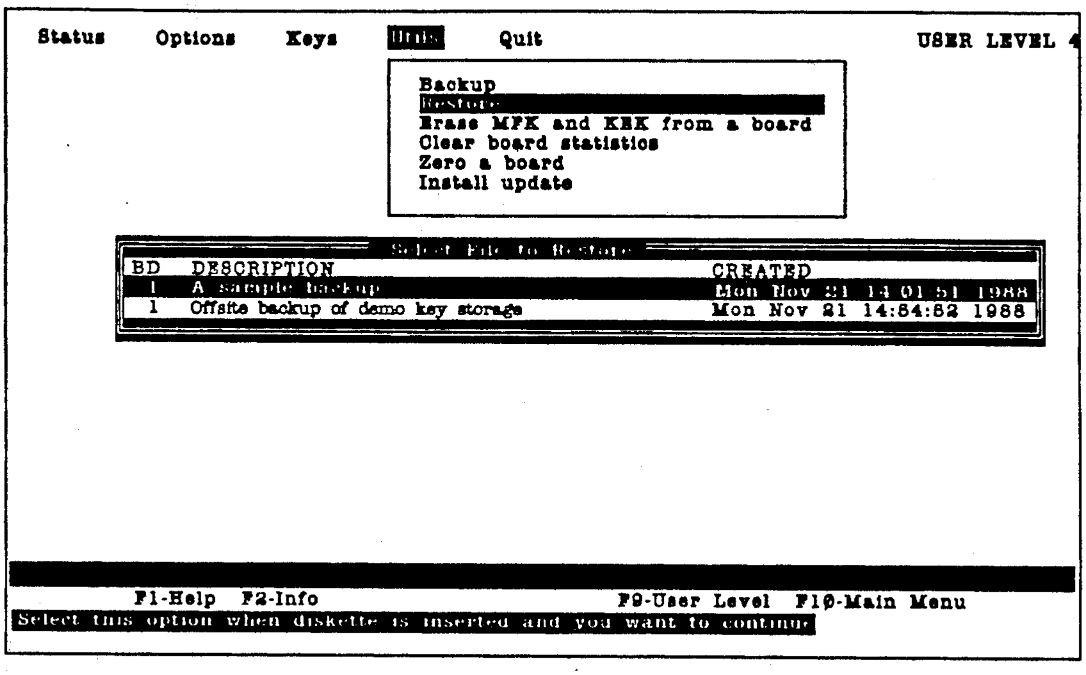
Figure 95:
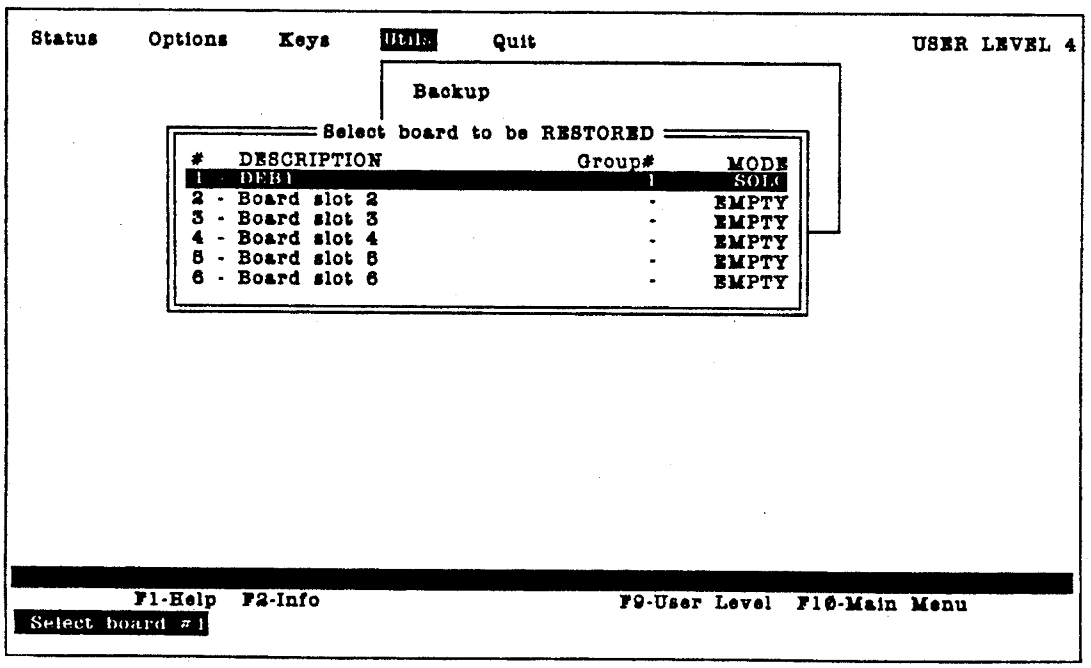

FIG. 93 is a diagram of the display generated by the system when the "Restore" option is selected under the "Utils" menu. Under the "Restore" option, data is transferred from either a diskette or a ROM cartridge to update the system software. When "Restore" is selected, the system prompts the user to insert a diskette or ROM in the appropriate device, as shown in FIG. 93. Once the appropriate ROM or diskette has been inserted in the system, the user proceeds by selecting "Continue" and entering a carriage return. Once "Continue" has been selected, the display of FIG. 94 is generated, prompting the user to select a file to restore. Once a file has been selected by the user, the display of FIG. 95 is generated, prompting the user to select a particular encryption device to be restored. Once the particular encryption device has been restored, the system returns to the main "Utils" menu. One important feature of the present invention incorporates the use of the backup and restore functions wherein when a new encryption device is added to the system, the user simply backs up an existing board and restores the information recovered from the existing board to the new encryption device, thereby allowing the new encryption device to become operational without the manual entry of program and key data.

Figure 96:
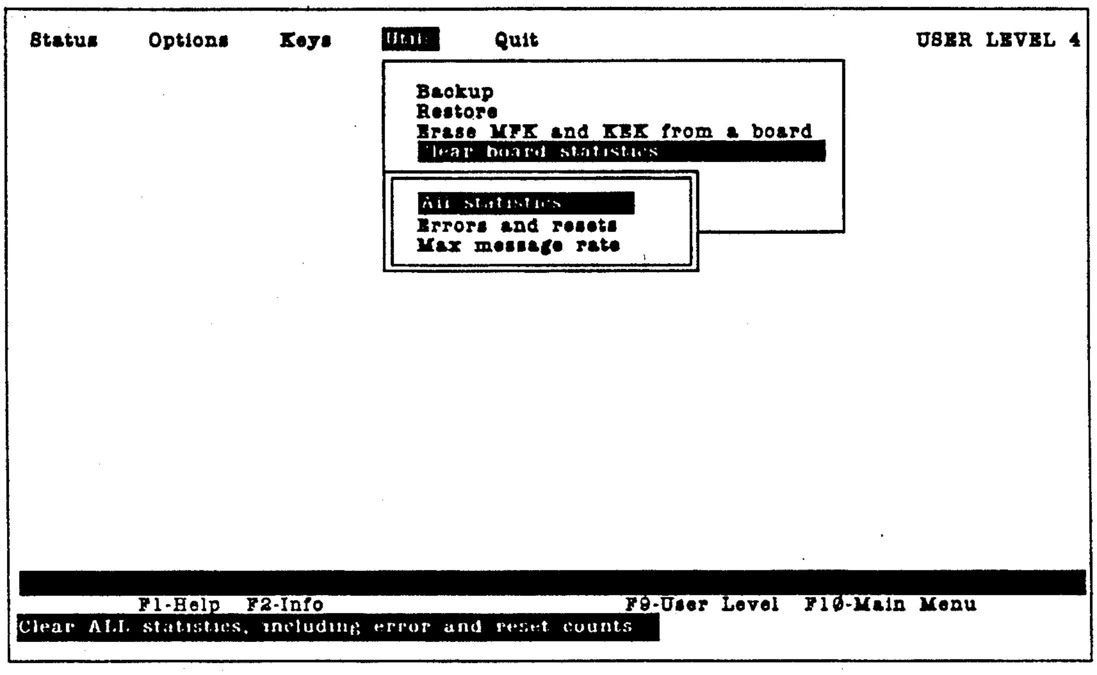

FIG. 96 is a diagram of the display generated when the "Clear Board Statistics" menu option has been selected by the user under the "Utils" menu. When the "Clear Board Statistics" option has been selected, the user is prompted to select either "All Statistics", "Errors and Resets", or "Max Message Rate." These individual items may be selected by cursor control or by entering the first letter of each option. Once the appropriate option has been selected and the user enters this option with a carriage return, the system returns to the main "Utils" menu.

Figure 97:
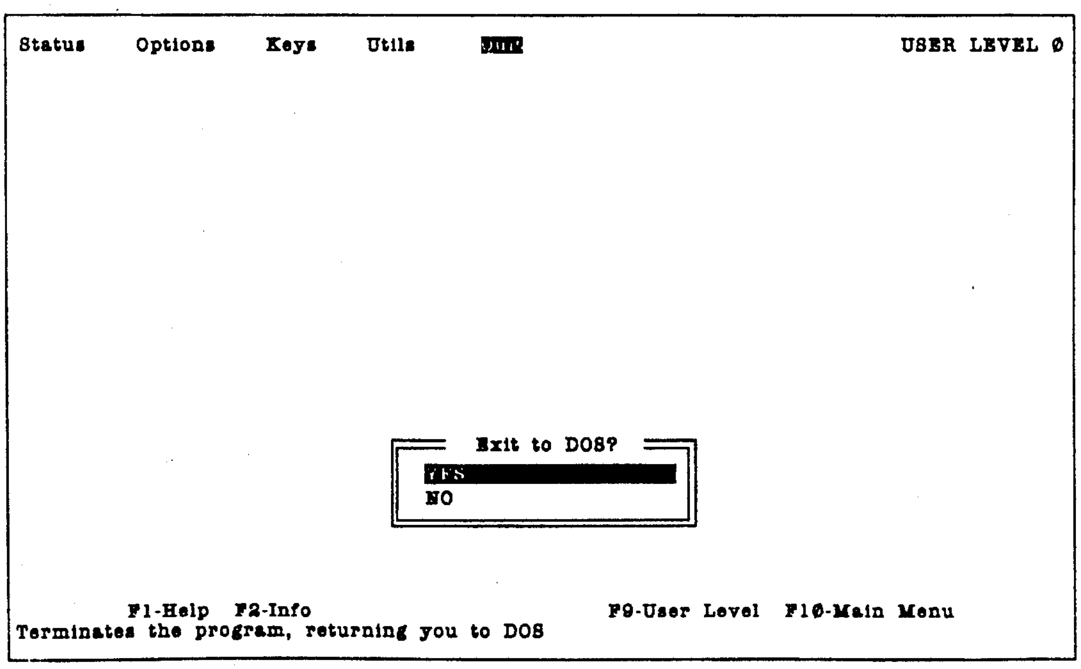
Figure 98:
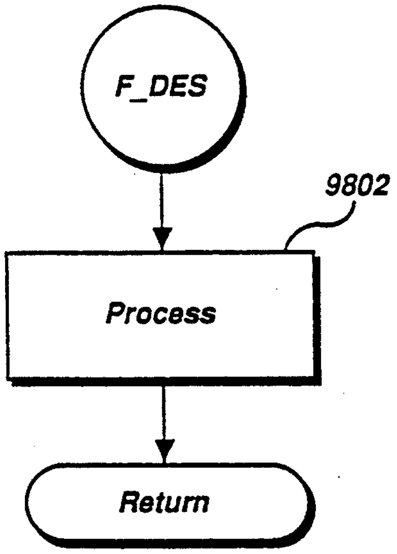

Referring now to FIG. 97, systems that are provided with a disk drive have an operating system typically incorporated along with the software of the present invention. In these types of systems, the "Quit" option on the menu bar allows the user to exit the application software of the present invention and return to the disk operating system.

The system of the present invention is provided with a plurality of encryption devices which communicate with a host computer via a serial port and which communicate with a control and display unit via a parallel bus configuration. The operation of the encryption devices is independent of the control and display unit wherein the control and display unit provides an interface between the user and various encryption devices, as well as gathering statistics on the operation of encryption devices and displaying those statistics to the user. FIGS. 99-206 are a plurality of flow diagrams which detail the operation of the control and display unit of the present invention.

FIG. 99 is a flow diagram of the executive function logic portion of the control and display device of the present invention. Upon system power-up, the routine of FIG. 99 enters item 9902 to save the name of the program for use by the options logic. Under the program structure of the present invention, options are not stored as a separate file, but rather, are appended to the executable portion of the software of the present invention. Therefore, it is essential to know the location of the executable file upon start-up, and this function is provided by item 9902. Process control then passes to item 9904 to save the contents of the entry screen, refresh the display, and set the video mode for the system. Process control then passes to item 9906, which installs the critical error handling function in the system. The critical error handler controls what happens in the system whenever a component in the system was addressed but was not present or did not respond. In this state, the critical error handler controls which system messages are passed to the user to indicate this condition. Process control then passes to process 9908, INIT, which performs various housekeeping chores, such as initializing the video attributes, initializing the help function, and other functions which will be described in further detail in conjunction with FIG. 99. Once the INIT or initialization routine is complete, process control passes to 9910, OPEN_DEBS, which opens the date encryption devices so that the system can read and write to the devices. Once the data encryption devices are open, process control passes to process 9912, MAIN_MENU, which is a routine which controls the menus displayed to the user and displays the system for user input. Whenever process 9912 is exited, process control passes to process 9914, CLOSE_DEBS, which closes the data encryption devices. Once the data encryption devices are closed, process control passes to process 9916, PUT_OPTIONS, which stores the options modified during the last interval. These options may include the status interval or sample interval or any of the variables which are modified by the user. Once process 9916 is complete, process controls passes to item 9918, which restores video to the state it was in prior to being modified by the system software of the present invention. Once the video has been restored by item 9918, process control returns to the operating system level.

Referring now to FIG. 100A, the main menu routine 9912 is shown in detail. The function of the main menu routine is to display user inputs, to update the user interface displays, and to send user-generated commands to the appropriate portions of the system. The main menu routine begins with I/O block 10002, which outputs the main menu to the display. It should be noted that several aspects of the present invention are implemented in the "C" computer language, and many of the process steps disclosed below are unique to that language. Once the main menu has been displayed, process control passes to item 10004, which saves the state of the machine in a buffer designated JB_MAIN_MENU by setting the value SJ = "set jump." This step is necessary to perform what is known in C programming as a "long jump," which enables process control to go to a specific portion of the program. The SJ variable corresponds to the value returned by set jump, and the value stored in the buffer corresponds to the address of the program currently being executed. The long jump feature enables the present process to display for entry of so-called "hot keys" wherein pressing a specific function key or single alphanumeric key causes the menu to advance to a predefined location. It is therefore desirable that the program control be able to interpret each of the hot keys and then return to that portion of the program that was executing when the hot key was first depressed. When executed, item 10004 causes a set jump to return a value which is evaluated in decision 10006. If set jump is not equal to zero, process control passes to item 10008. If set jump is not equal to zero, this point is arrived at as a result of a long jump call wherein set jump contains the desired menu option. Therefore, item 10008 sets the return value equal to set jump and highlights the main menu item corresponding to the value of set jump. If set jump is equal to zero, process 10010 is selected. If SJ is equal to zero, this state indicates that a function key was not depressed since the last cycle and the routine is continuing through a normal flow and therefore item 10010 sets the return value equal to the previously set options values. RV is a local variable used to hold current option values. Once RV has been updated by either item 10008 or 10010, decision 10012, in FIG. 100B, determines whether the options structure has changed. If the options structure has changed, process control passes to item 10014 to close the data encryption devices, to open the data encryption devices, to store the options to disk, and to copy the option structure into a temporary storage location designated "temptopt." In ROM-based systems, instead of copying the options to disk, the options would be copied to battery backed-up RAM. Process control then passes to item 10016, which sets the value stored in the variable last RV equal to the current RV.

Figure 100C:
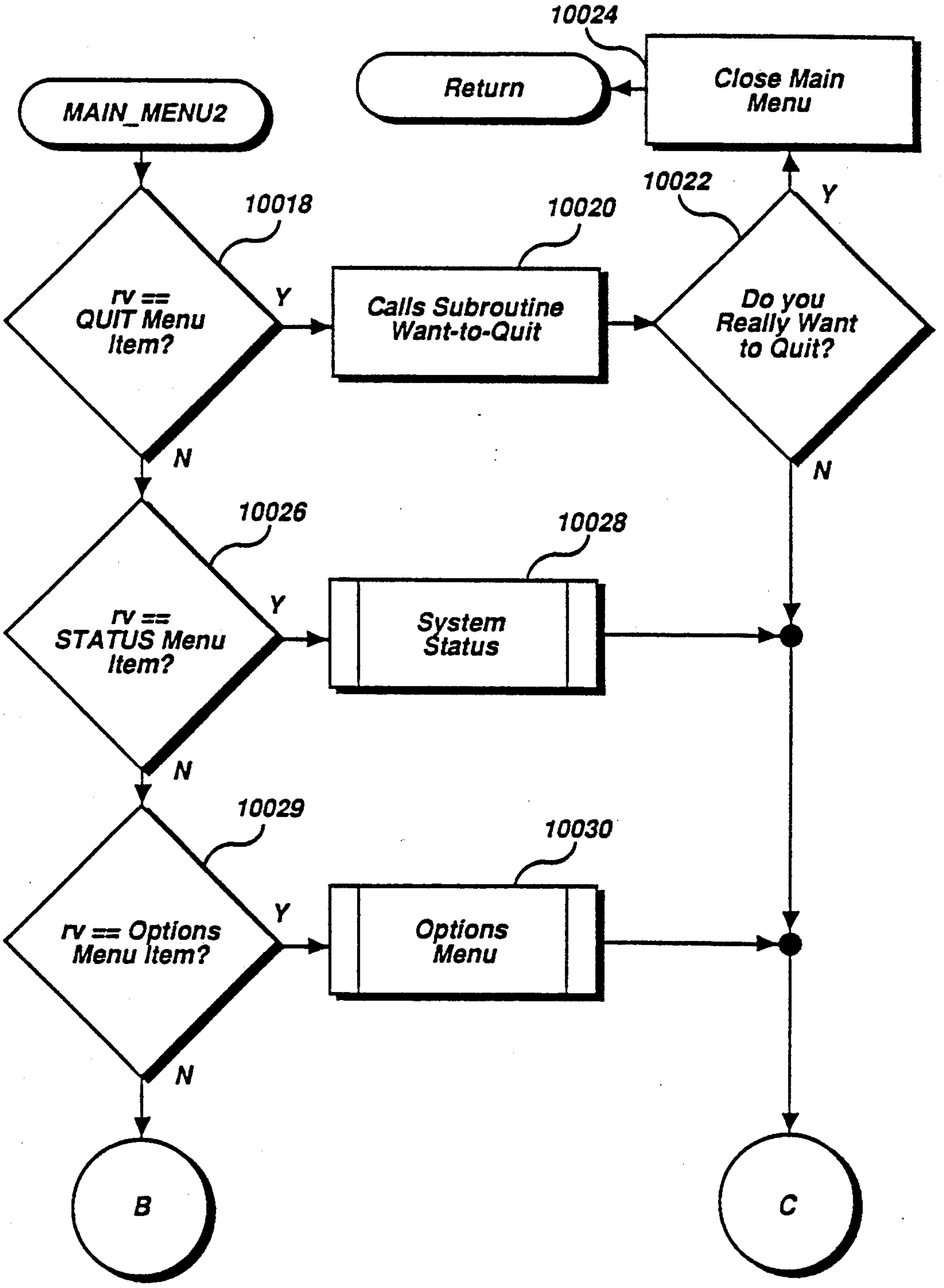
Figure 100D:
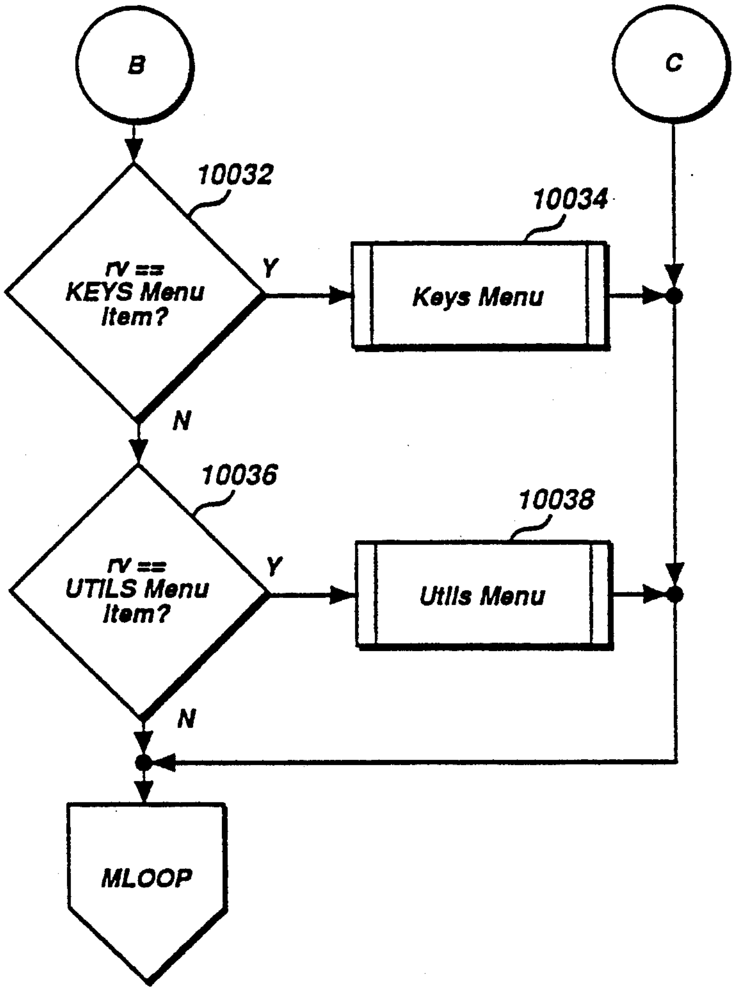

Referring now to FIG. 100C, once item 10016 has set, process control flows to decision 10018, which tests rv to determine whether it indicates the user has entered the "quit" option. If "quit" was entered, process control passes to item 10020, which prompts the user to determine whether the "quit" option was properly entered. Decision 10022 tests the user response; if the "quit" option is verified, program control passes to item 10024, which closes the main menu and returns program control to the operating system, if an operating system is used. In ROM-based systems, the "quit" option is not offered. If the "quit" option is not verified, process control returns to item 10004. If the "quit" option was not detected by decision 10018, program control passes to decision 10026, which determines whether rv indicates the "status" option has been selected. If the "status" option has been selected, program control passes to the SYSTEM_STATUS process 10028, which processes the system status request and returns to the main loop at 10004. If the "status" option is not indicated in rv, program control passes to decision 10029, which tests rv to determine whether the "options" option was selected from the menu. If so, program control passes to OPTIONS_MENU process 10030. If rv does not indicate the "options" option, program control passes to decision 10032. to determine whether the 37 keys" option has been selected. If so, program control passes to keys menu process 10036. If rv does not indicate the "keys" option has been selected, program control passes to decision 10036 to determine whether the "Utils" option has been selected. If rv does not indicate the "Utils" option has been selected, program control returns to decision 10004.

FIG. 101 is a flow diagram of the "INIT" subroutine 9908 called by the routine of FIG. 99. The "INIT" subroutine performs several basic "housekeeping" tasks, many of which are provided under the DOS environment. Whenever "INIT" is activated, process control passes to process 10102, which initializes the screen display, sets video attributes such as EGA, CGA, monochrome, etc., and creates the proper windows for display based on the window library used in accordance with the present invention. Program control then passes to process 10104, which gets options from disk in a disk-based system. For example, options include key parts, table parts, current check digit length, and active group. These options are recalled from disk since upon program startup, rather than requiring the user to reenter the configuration of the encryption devices. Program control then passes to process 10106, which initializes the help file and loads the help key word into memory. Program control then passes to I/O step 10108, which displays the Function key legend at the bottom of the screen, and program control passes to item 10110, which copies the options structure to the tempopt structure in memory. Program control then returns to the routine of FIG. 99.

Figure 102A:
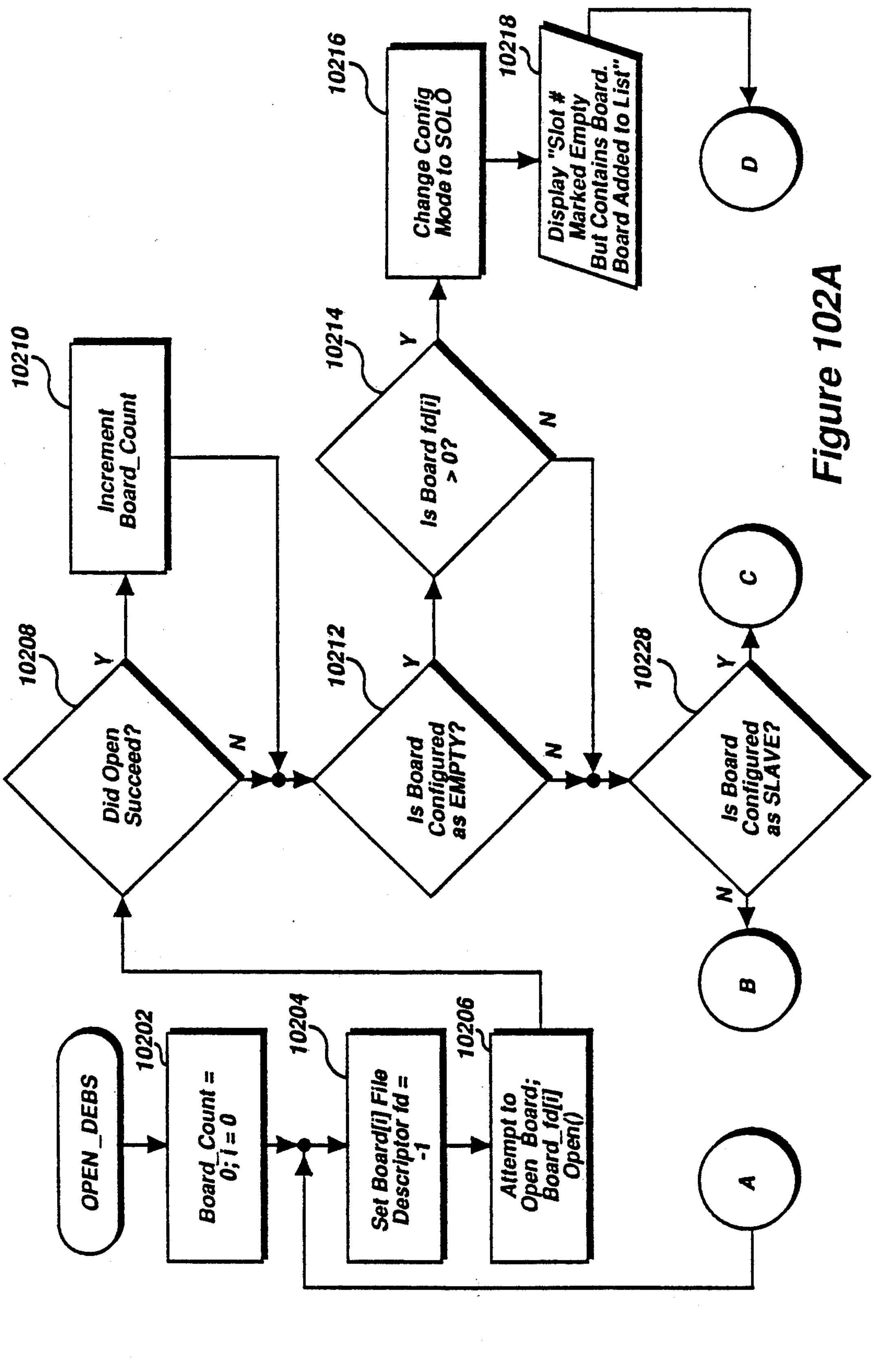
Figure 102B:
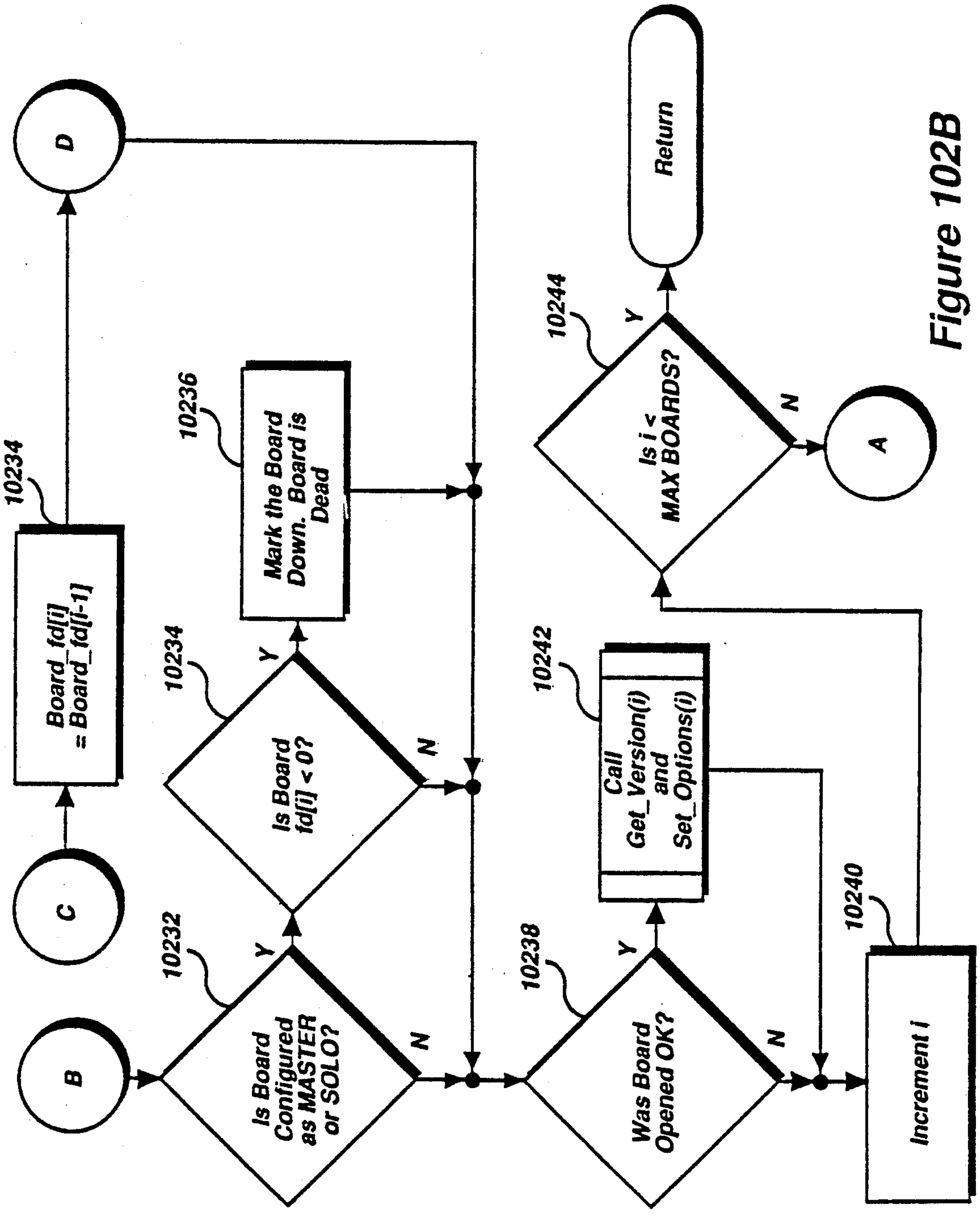

FIG. 102A is a flow diagram of the "OPEN_DEBS" subroutine called by numerous subroutines of the present invention. The "OPEN_DEBS" or open data encryption device subroutine opens the data encryption devices and enables reading and writing to the devices, as well as maintaining mode settings for individual boards (devices). When invoked, item 10202 initializes the board count variable equal to zero and the variable i to zero, which is an index into the board file description structure. The board count variable is used as an indicator of the number of currently open data encryption devices. Item 10204 then sets the device file description fd indexed by i to $-1$ to indicate that the device is not open. Item 10206 then attempts to open the device using a standard "C" routine. If the board open is successful, the device file description is set to the file handle returned from DOS. Program control then passes to decision 10208, which examines the device file description to determine whether the device was successfully opened. If the device was successfully opened, item 10210 increments the board count. If the device was not successfully opened, decision 10212 tests the device to determine whether the device is configured as empty. If the device is configured as empty, decision 10214 tests the device file description to determine whether it is greater than zero, thus indicating that a device is present. If a device is present, item 10216 changes the configuration of the board to solo. Program control then passes to I/O step 10218, which displays the message "Slot # marked empty but contains board—Board added to list." Program control then flows to decision 10238. If a board was not opened and was not configured as empty, decision 10228 tests the board file description to determine whether the board is configured as a slave. If the board is configured as a slave, item 10230 modifies the file description to be the same as that for the board preceding it.

If the board was not configured as a slave, decision 10232 determines whether the board is configured as a master. If the board is configured as a master or solo, decision 10234 determines whether the file description is less than zero. If so, the board is not functioning and item 10236 marks the board down by setting the down bit of the board parameters description to remove it from the system. Once item 10236 is complete or if decision 10234 determines that the file description is not less than 1, program control passes to 10238.

Decision 10238 tests the board to determine whether it was properly opened. If the board was properly opened, decision 10238 passes program control to process 10242 to send a message to the board, to get the version of software installed on the board, and to send options, such as communication parameters, and any other options which need to be sent to a board. Once process 10242 is complete, or if the board was not properly opened, item 10240 increments variable i to access the next board. Decision 10244 then tests variable i to determine whether all the boards in the system have been tested, and program control returns to the routine of FIG. 99. If all the boards have not been tested, program control returns to the calling routine.

Figure 103:
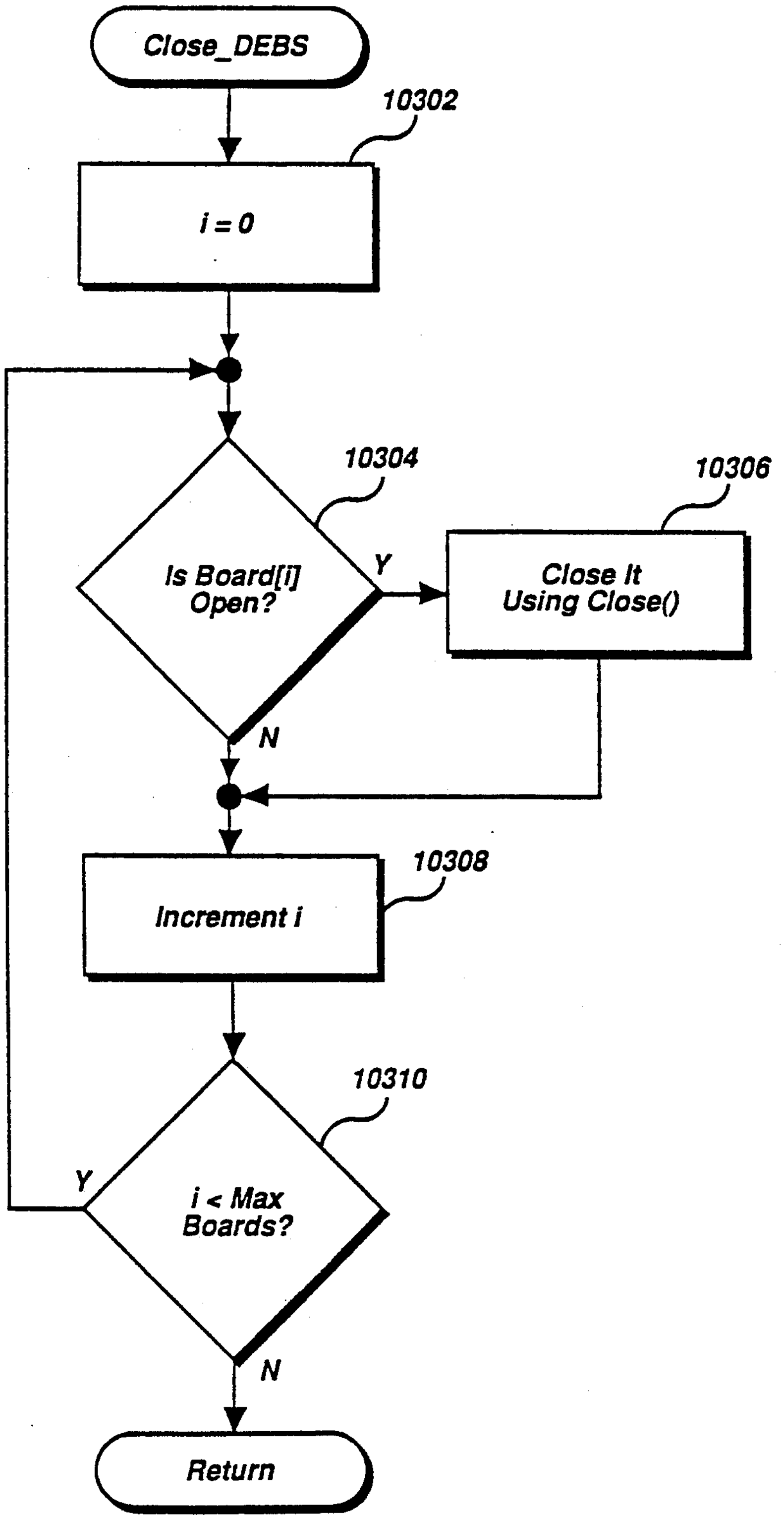

FIG. 103 is a flow diagram of the "CLOSE_DEBS" subroutine called by numerous subroutines of the present invention. The "CLOSE_DEBS" or close data encryption devices subroutine is a simple loop for closing all open boards in a system. When invoked, item 10302 initializes the variable i counter to zero. Decision 10304 then determines whether the currently selected board or board[i]is open. If the currently selected board is open, item 10306 closes the board with the standard "C" function close(). If the currently selected board is not open, item 10308 increments the variable i to point to the next board. Decision 10310 then tests the variable i to determine whether the value equals the maximum number of boards (MAXBOARDS) in the system. If MAXBOARDS has not been reached, program control passes to decision 10304. Otherwise, program control returns to the calling routine. The opening of a board provides a "handle" for communicating with the device handler of the system. Since the configuration of the present invention only allows 20 handles to be open at any one time, it is desirable to close any unneeded devices, providing room for further devices.

FIG. 104A is a flow diagram of the "SYSTEM_STATUS" subroutine called by the subroutine of FIG. 100B and is activated from the main menu by selecting status on the menu bar. This subroutine generates and displays the SYSTEM_STATUS screens described in conjunction with FIGS. 55 through 56. When invoked, item 10402 sets all screen statistics and variables to zero. Item 10404 then enables the function key F4 flag and redisplays the FKEY legend on the screen so that the screen only displays the function keys which are valid for this screen. When the FKEY legend has been redisplayed, item 10406 initializes a number of variables wherein K is a variable used to retain values of depressed keys and is set to zero, First is a variable used to indicate whether it is the first time the subroutine completed its loop and is set to 1, OLD_DET (old detail) is a variable that indicates the previous board detail was retained on and is set to −1, and RETRY_TIME is a time stamp variable that specifies the last time communications were attempted with a particular board. In the normal operation of the system, occasionally a board will not be available to the system. The RETRY_TIME value is used to indicate a predetermined interval in which to reattempt communications with the board which did not respond earlier. STATUS_TIME is a variable that contains the last time status information was received for a board and is set to zero, and IN_STATUS is a flag set to 1 to let other portions of the system know that the system is currently in the status mode.

Once these variables are initialized, process control passes to process 10408, which calls subroutine NEXT_BOARD, with a parameter of −1, to scan the boards and to find the first open board in the system. Item 10410 then opens the status display windows. Once the status windows are open, item 10412 sets the variable Now equal to the current time of day with a standard time function so that the current time can be displayed on the status window and time-sensitive functions can be enabled. Process 10414 then calls RESET-S_STATS (statistics) with a parameter of zero, which sets all statistics to zero if the current time is greater than the starting time of the last sample interval plus the sample interval. This, in effect, causes the statistics to be reset once every sample interval. If the RESETS_STATS process 10414 is called with a parameter of one, all statistics are reset unconditionally.

When process 10414 is complete, program control passes to decision 10416, which determines whether the status interval has elapsed; and if so, subroutine 10418 calls STATUS3 to get current statistics and display them on the screen. If the status interval has not elapsed, decision 10419 determines whether a key has been pressed. If a key has been not been pressed, program control loops to item 10412. If a key has been pressed, I/O step 10421 gets the value of the key that was pressed. Decision 10423 then determines whether the F4 function key was pressed. If the F4 function key was pressed, indicating that a user wants to clear statistics, decision 10424 confirms whether the user wants to clear sample interval statistics. If decision 10424 confirms that the user wants to clear sample interval statistics, item 10426 sets the interval time equal to the current time and calls RESET_STATS with a parameter of to reset all statistics. If the user indicates statistics are not to be cleared, decision 10424 passes program control to item 10412.

If decision 10423 determines that the F4 function key was not pressed, program control passes to decision 10430, which determines whether the escape key has been pressed. The escape key causes the system to revert to the previous menu when pressed. Therefore, program control passes to item 10432 to set IN_STATUS equal to zero, to close the status window, and to copy the option structure to the tempopt structure. Program control then returns.

If decision 10430 determines the escape key was not depressed, program control passes to decision 10434 to determine whether the space bar was pressed. From the status screen, pressing the spacebar freezes the display if the screen is active or reactivates the screen if the screen is frozen. Therefore, if decision 10434 determines the spacebar has been pressed, program control passes to item 10436 to toggle the Freeze variable and to call the function WRITE_FREEZE, which is further described below. When item 10436 has finished, program control loops to item 10412. If decision 10434 determines the spacebar was not pressed, program control passes to decision 10438 to determine whether the down arrow has been pressed. If so, program control passes to item 10440 to move the board cursor to the next board location on the screen and to set STATUS_TIME equal to zero, and program control loops to 10412. If decision 10438 determines a down arrow was not pressed, program control passes to decision 10442 to determine whether an up arrow was pressed. If so, program control passes to item 10444 to move the board cursor to the previous board location on the screen and to set STATUS_TIME equal to zero. If decision 10442 determines a up arrow was not pressed, program control loops to item 10412.

When the STATUS3 subroutine 10418 returns, program control passes to decision 10420 to determine whether the retry interval has elapsed. If not, program control passes to decision 10418. If the retry interval has elapsed, program control passes to item 10422, which attempts to communicate with any board which has been marked down using the GET_VERSION function. Program control then passes to decision 10419.

FIG. 105 is a flow diagram of the STATUS3 subroutine called by the routine of FIG. 104B. When invoked, item 10502 copies the current board statistics to the last board statistics data structure. Decision 10504 then checks the board statistics to determine whether the Freeze variable is set. If Freeze is not set, item 10506 sets OLD_DETAIL equal to DETAIL_BOARD and sets DETAIL_BOARD equal to NEXT_ACTIVE BOARD.

When item 10506 is complete or if decision 10504 determines that Freeze is set, item 10508 converts the value of Now to an ASCII string and displays the time at the top of the screen. The Now variable is continually updated by the SYSTEM_STATUS subroutine. Process control then passes to the DISPLAY_STATS subroutine 10510, which is further discussed below. Program control then returns.

Figure 106:
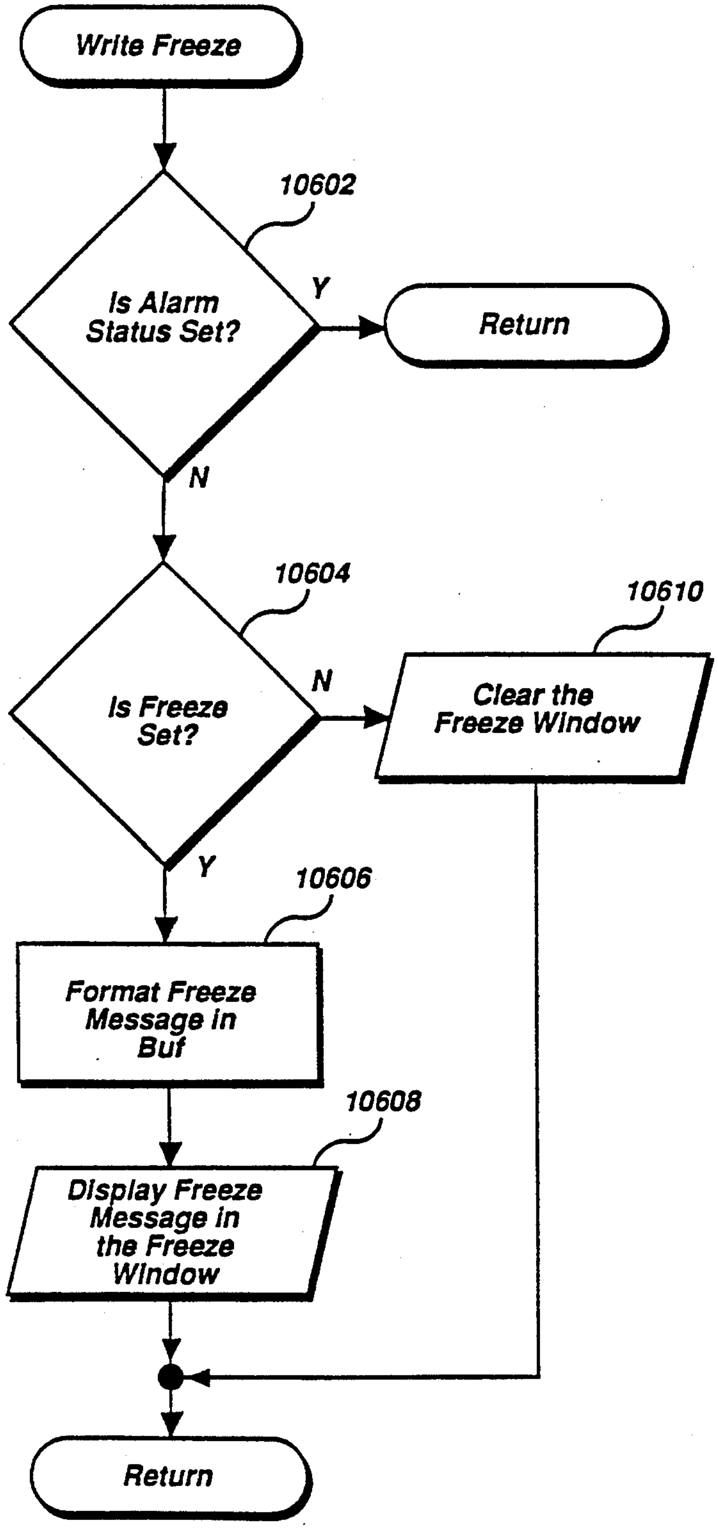

FIG. 106 is a flow diagram of the WRITE_FREEZE subroutine called in item 10436. When the WRITE_FREEZE subroutine is invoked, decision 10602 checks to determine whether the alarm status is set. If the alarm status is set, the subroutine returns immediately because Freeze is effected under an alarm condition. If the alarm status is not set, decision 0604 determines whether Freeze is set. If Freeze is not set, I/O step 10610 clears the freeze window. Program control then returns to the calling routine. If Freeze is set, item 10606 formats the freeze message in a temporary buffer, I/O step 10608 displays the freeze message in the freeze window, and program control returns to the calling routine.

Figure 107:
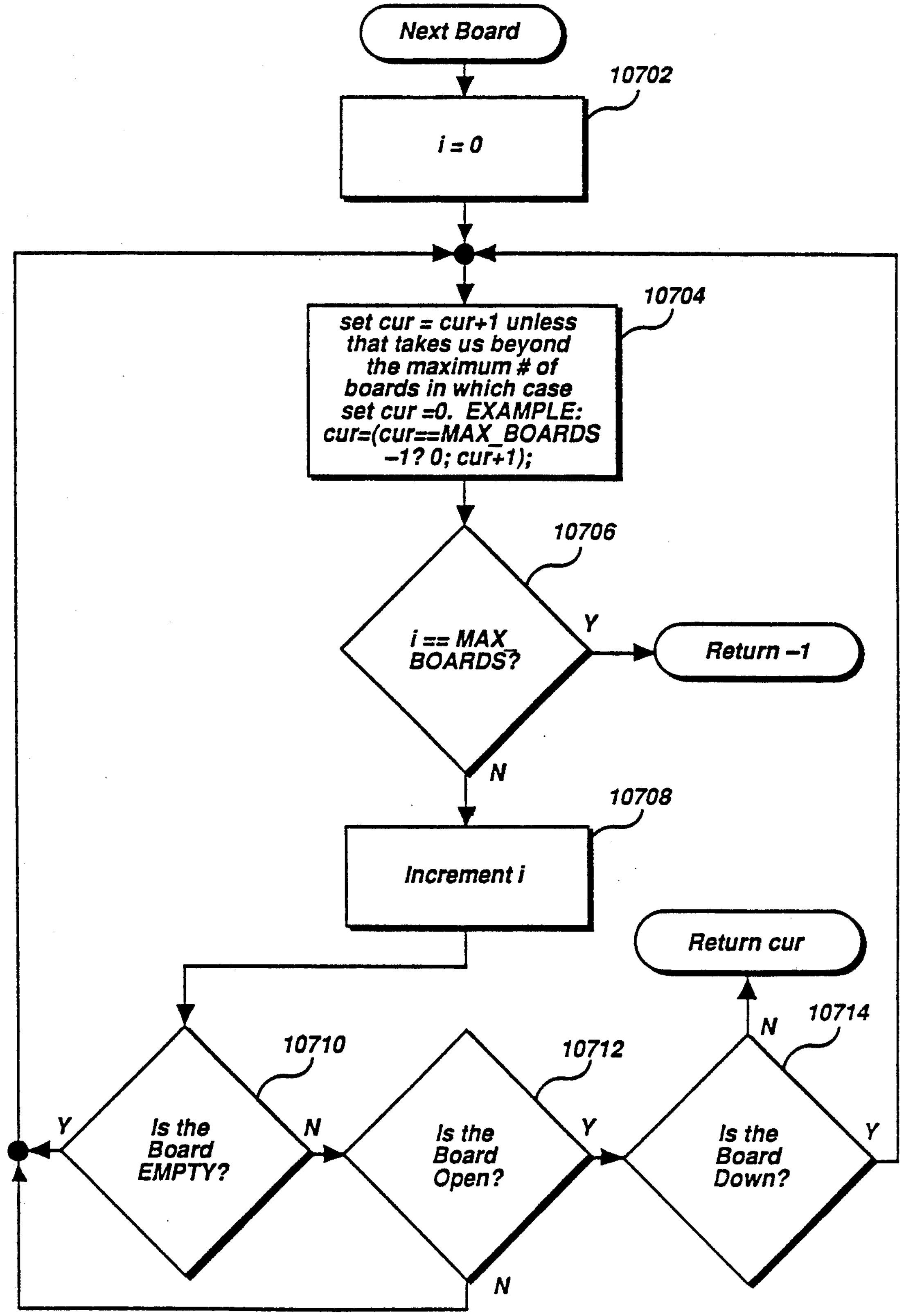

FIG. 107 is a flow diagram of the NEXT_BOARD subroutine. The NEXT_BOARD subroutine determines the next board to scroll, either automatically or under cursor control. When invoked, item 10702 sets variable i equal to zero. Program control then passes to item 10704, which sets Cur equal to Cur+1, unless current already contains the number of maximum boards in the system, in which case Cur is set to zero. Decision 10706 then determines whether variable i is equal to MAXBOARDS. If variable i is equal to MAXBOARDS, program control returns with −1 to indicate there is no next board. Otherwise, item 10708 is selected to increment variable i. Decision 10710 then determines whether the current board is empty. If so, program control loops to item 10704. If not, program control loops to decision 10712 to determine whether the current board is open. If not, program control loops to item 10704. If decision 10714 determines that the current board is open, program control passes to decision 10714 to determine whether the current board is down. If so, program control loops to item 10704. If not, the subroutine returns the variable Cur, which shows the next board which is open and marked up.

FIG. 108 is a flow diagram of the PREV_BOARD subroutine called by the subroutine of FIG. 104A, as well as other subroutines of the present invention. The PREV_BOARD subroutine determines the previous board to scroll to, either automatically or under cursor control. When invoked, item 10802 initializes variable i equal to zero. Program control then passes to item 10804, which sets the value in Cur equal to the Cur-1, unless current already contains zero, in which case current is set to MAXBOARDS minus one. Decision 10806 then determines whether variable i is equal to MAXBOARDS. If variable i is equal to MAXBOARDS, program control returns with a −1 to indicate there is no previous board. Otherwise, item 10808 is selected to increment variable i. Decision 10810 then determines whether the current board is empty. If so, program control loops to item 10804. If not, program control passes to decision 10812 to determine whether the current board is open. If not, program control loops to item 10804. If decision 10812 determines the current board is open, program control passes to decision 10814 to determine whether the current board is down. If so, program control loops to item 10804. If not, the subroutine returns the variable Cur, which shows the previous board which is open and marked up.

FIG. 109A is a flow diagram of the DISPLAY_STAT or display statistics subroutine called by the subroutine of FIG. 105. When invoked, I/O step 10902 displays board status headings. Item 10904 sets ALARM_STATUS equal to zero and variable i equal to zero. Program control then passes to process 10906 to get the statistics for the board [i]. When complete, item 10908 adds the board statistics to the current sample interval statistics being accumulated by adding the difference between the current sample and the previous sample. Program control then passes to decision 10910, which determines whether board[i]is marked down. If not, item 10912 formats board[i]summary line in a temporary buffer. If board[i]is marked down, item 10914 formats an abbreviated status line for board[i]in a temporary buffer. After either item 10912 or 10914 is complete, decision 10915 determines whether board is equal to the variable Detail_Board. If so, decision 10916 determines whether Freeze Bit is set. If so, item 10918 sets the video attribute equal to Sts_Fdata_Video, which is a value which indicates a particular video attribute such as color to highlight the cursor line wherein each cursor line may be one of several colors in a color system and the currently selected board is highlighted in a different color than the remaining lines. If Freeze is set, then board[i]is highlighted in yet another color. Normally, the system checks currently selected boards to determine whether they are frozen or highlighted. For other boards, the system displays a third color. The cursor lines are then displayed based on the assigned video values. Therefore, if decision 10915 determines the current board[i]is not a detail board, item 10922 sets the video variable equal to sts_data_video. If decision 10916 determines the freeze bit is not set, item 10920 sets the video variable equal to sts_h-data_video. Once the video variable is set, I/O step 10924 displays the contents of the temporary buffer with video attributes indicated by the video variable.

Referring now to FIG. 109C, once I/O step 10924 displays the contents of the temporary buffer, program control passes to decision 10926 to determine whether board[i]is currently marked down. If so, item 10928 increments Alarm Status and sets the video attributes to red, bold and blinking in color systems. In monochrome systems, the video attribute may be set to bold and blinking. I/O step 10930 displays the board status, i.e., solo, slave, etc., using the new video attributes.

If decision 10926 determines board[i]is not currently marked down, program control passes to process 10932 to check the alarm status and draw the alarm display, if necessary. When process 10932 is complete, program control passes to decision 10934 to determine whether Detail_Board variable is equal to −1. If so, decision 10936 determines whether the variable Old_Detail_Board also equals −1, which indicates there are no boards in the system. If decision 10936 determines variable Old_Detail_Board also equals −1, I/O step 10940 displays the message, "No Boards Operational". If decision 10936 determines Old_Detail_Board did not equal −1, I/O step 10938 clears the status detail window and I/O step 10940 displays the message "No Boards Operational". When I/O step 10940 is complete, process control returns to process 10510.

Figure 109D:
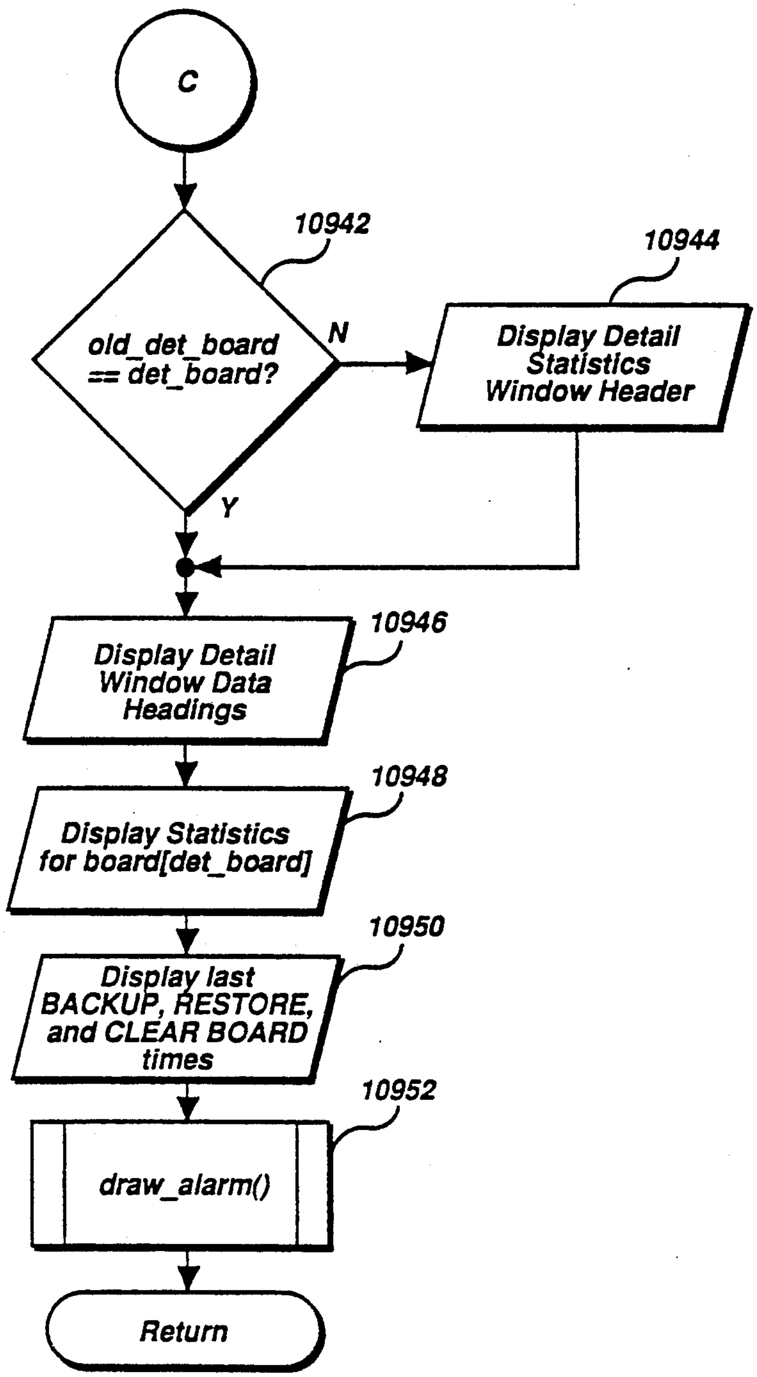

Referring now to FIG. 109D, if decision 10934 determines Det_Board does not equal −1, program control passes to decision 10942 to determine whether the variable Old_Det_Board equals Det_Board. If not, I/O step 10944 displays the detail statistics window header. When I/O step 10944 is complete, or if decision 10942 indicates that Old_Det_Board does not equal Det_Board, program control passes to I/O step 10946 to display the detail window data headings. I/O step 10948 then displays the statistics for board[Det_Board]. I/O step 10950 then displays the last backup, restore, and clear board times. When I/O step 10950 is complete, program control then passes to draw alarm process 10952, which is identical to draw alarm process 10932. Program control then passes to process 10510.

FIG. 110 is a flow diagram of the "DRAWALARM" subroutine called by the subroutine of FIG. 109B and FIG. 109C. When invoked, decision 11002 determines whether Alarm_Status equals Last_Alarm Status, which indicates that nothing has changed since the last alarm cycle. If so, the subroutine immediately returns to the calling subroutine. If Alarm_Status does not equal Last_Alarm_Bit, program control passes to decision 11004 to determine whether Alarm_Status is not equal to zero. If not, the WRITE_FREEZE process 11006 is invoked. WRITE_FREEZE process 11006 is identical to WRITE_FREEZE process 10436. If the Alarm_Status is equal to zero, I/O step 11008 is invoked to clear the Freeze window. Program control then passes to I/O step 11010 to display the alarm banner on the screen in blinking red video. Item 11012 then sets Last_Alarm equal to Alarm_Status. Program control then passes to the calling subroutine.

FIG. 111 is a flow diagram of the "GETVER" subroutine called by several subroutines of the present invention. The "GETVER" subroutine gets the current software version number of the various boards with the present invention wherein this version number is displayed in the SYSTEM_STATUS window. When invoked, item 11102 formats an echo message and stores the message in a temporary variable buffer. Item 11104 then marks the board up. If the message fails, the critical error handler will mark the board down. Process 11106 then sends an echo message to the board by calling WRITE_DEB while passing the parameters Board, Buf, and Strlen(Buf) wherein Board is the board messages are sent to, Buf is a pointer to the buffer to write out to, and Strlen(Buf) is a function that returns the number of bytes to be written out. Program control then passes to process 11108, which calls the process prodeb, which writes the result in variable rc. Program control then passes to decision 11110, which determines whether the variable rc is equal to zero. If so, program control returns to the calling subroutine. If the variable rc is not equal to zero, program control passes to process 11112 to look for the BC-token in the response. This is done with the subroutine FIND_TOKEN, which returns the token that was found, along with a pointer which points to the position where data starts, and is described in further detail below. The format of messages incorporating the BC-token is shown in the Appendix. Program control then passes to decision 11114 to determine whether the BC-token was found. If so, item 11118 copies the data associated with the BC-token to the Board_Version variable. When complete, program controls returns to the subroutine which called GETVER. If decision 11114 determines that the BC-token is not present, item copies "???" to the Board-Version variable to indicate the BC-token is not present and program control passes to the subroutine which called GETVER.

FIG. 112A is a flow diagram of the OPTIONS_MENU subroutine called by the subroutine of FIG. 100B. The OPTIONS_MENU subroutine controls the system display when options is selected from the main menu. This subroutine allows a user to scroll through the OPTIONS_MENU and returns the value of the menu item when one is selected. When invoked, I/O step 11202 displays the options available under the OPTIONS_MENU. I/O step 11204 then displays the current setting of options in the menu. Program control then passes to process 11206 to get the next menu item and set rv equal to the next menu item selected. Program control then passes to decision 11208, which tests rv to determine whether it contains the value 99, which corresponds to the escape key. If so, program control passes to I/O step 11210 to close the OPTIONS_MENU. Program control then returns to the subroutine of FIG. 100B. If decision 11208 determines that the escape key was not pressed, program control passes to decision 11212 to determine whether the rv equals 1. If so, program control passes to the configure menu process 11214. If decision 11212 determines that rv does not equal 1, decision 11216 determines whether the rv equals 2. If rv equals 2, program control passes to process 11218 to set the status interval. If rv does not equal 2, program control passes to decision 11220 to determine whether rv equals 3. If so, program control passes to process 11222 to set the sample interval. When processes 11214, 11218 or 11222 are complete program control passes to I/O step 11204. If decision 11220 determines that rv does not equal 3, program control passes to decision 11224 to determine whether rv equals 4. If so, program control passes to process 11226 to set threshold limits. If decision 11224 determines that rv does not equal 4, program control passes to decision 11228 which determines whether rv equals 5. If rv equals 5, program control passes to process 11230 to SET_IDLE_TIMEOUT. If decision 11228 determines that rv does not equal 5, program control passes to decision 11232 to determine whether rv equals 6. If so, program control passes to process 11234 to SET_CHECK_DIGIT_LENGTH. If decision 11232 determines that rv does not equal 6, program control passes to decision 11236 which determines whether rv equals 7. If so, program control passes to process 11238 to set the number of key parts. At the completion of processes 11226, 11230, 11234, and 11238, program control returns to I/O step 11204. If decision 11236 determines that rv does not equal 7, program control passes to decision 11240 which determines whether rv equals 8. If so, program control passes to process 11242 to set the number of Diebold table parts. If decision 11240 determines that rv does not equal 8, program control passes to decision 11244, which determines whether rv equals 9. If so, program control passes to process 11246 to toggle password protection. If decision 11244 determines that rv does not equal 9, program control passes to decision 11248, which determines whether rv equals 10. If so, program control passes to process 11250 to change passwords. If decision 11248 determines that rv does not equal 10, program control passes to decision 11252, which determines whether rv equals 11. If so, program control passes to process 11254 to toggle ability to quit. At the completion of processes 11242, 11246, 11250, or 11254, or if decision 11248 determines that rv does not equal 10, program control returns to I/O step 11204.

FIG. 113 is a flow diagram of the SET_STATUS INTERVAL subroutine called by the subroutine of FIG. 112A. In some system configurations, where the status interval option may be deleted, the SET_STATUS_INTERVAL subroutine is not required. When invoked, process 11302 sets variable i equal to the value returned by function GET_VALUE. Function GET_VALUE displays a prompt supplied by the calling routine to the user and returns the entered value. Program control then passes to decision 11304, which determines whether all boards are marked down by checking whether the Board_Count variable from the OPEN_DEBS subroutine is greater than zero. If decision 11304 is yes, then time 11306 sets sts_interval = 1 and returns to the subroutine that invoked set_status_interval. If not, decision 11308 determines whether variable i times Board_Count is greater than the minimum cycle interval. If it is, item 11306 sets Status_Interval equal to variable i and program control returns to the subroutine which called SET_STATUS INTERVAL. If decision 11308 determines that variable i times Board_Count is not greater than the minimum cycle interval, item 11310 sets variable i equal to the minimum cycle interval divided by Board_Count. Process control then passes to decision 11312 to determine whether variable i times Board_Count is less than the minimum cycle interval. If so, item 11314 increments variable i. When item 11314 is complete or when decision 11312 determines that variable i times Board_Count is not less than the minimum cycle interval, program control passes to I/O step 11316, which displays the message "The status interval must be at least (i) seconds." Program control then returns to the subroutine which invoked SET_STATUS_INTERVAL.

FIG. 114 is a flow diagram of the SET_SAMPLE_INTERVAL subroutine called by the subroutine of FIG. 112A. When invoked, process 11402 sets Sample_Interval equal to the value returned by function GET_VALUE. Program control then returns to the subroutine which called SET_SAMPLE_INTERVAL.

FIG. 115 is a flow diagram of the SET_THRESHOLDS subroutine. When invoked, process 11502 opens the threshold windows and process 11504 displays the threshold titles on the window. Item 11506 then formats the threshold items based on the current threshold settings. When complete, process 11508 sets rv equal to the value returned by function GET_MENU_OPTION to check the value of the menu option entered by the user. When process 11508 is complete, decision 11510 determines whether rv equals 1. If rv equals 1, program control passes to process 11512 to set the baud rate. If rv does not equal 1, program control passes to decision 11514. If rv equals 2, program control passes to process 11516 to set Minimum_Pin_Ok equal to the value returned by GET_VALUE. If rv does not equal 2, program control passes to decision 11518 to determine whether rv equals 3. If so, program control passes to process 11520 to set Maximum_Pin_Fail equal to the value returned by GET_VALUE. If rv does not equal 3, program control passes to decision 11522 to determine whether rv equals 99 or escape. If so, program control passes to process 11524 to close the threshold window and return program control to the subroutine which called the SET_THRESHOLDS subroutine. If not, program control loops to 11506.

FIG. 116 is u flow diagram of the SET_IDLE_TIMEOUT subroutine called by the subroutine of FIG. 112A. When invoked, item 11602 sets the variable i equal to the value returned by the function GET_VALUE. Program control then pass<s to decision 11604 to determine whether the value-variable i is greater than zero. If so, item 11606 sets Idle_Timeout equal to variable i. If Idle_Timeout is not set equal to variable i or if decision 11604 determines that variable i is not greater than zero, program control returns to the calling subroutine.

FIG. 117 is flow diagram of the SET_CHECK_DIGIT_LENGTH subroutine called by the subroutine of FIG. 112A. This subroutine inputs a check digit length from the user and displays a message if not in the range of 4 through 8. When invoked, item 11702 sets variable i equal to the value returned by function GET_VALUE. Program control then passes to decision 11704 to determine whether variable i is equal to or greater than 4. If so, program control passes to decision 11706 to determine whether variable i is less than or equal to 8. If so, item 11708 sets Check_Digit_Length equal to variable i. If decision 11704 determines that variable i is not greater than or equal to 4 or if decision 11706 determines that variable i is not less than or equal to 8, program control passes to 1/0 step 11710 to display the message "Invalid check digit length specified." Once I/O step 11710 or item 11708 are complete, process control returns to the subroutine which called the calling subroutine.

FIG. 118 is a flow diagram of the SET_KEY_PARTS subroutine. This subroutine inputs key parts from the user and displays a message if not in the range of zero through 10. When invoked, item 11802 sets variable i equal to the value returned by function GET_VALUE. Program control then passes to decision 11804 to determine whether variable i is equal to or greater than 0. If so, program control passes to decision 11806 to determine whether variable i is less than or equal to 10. If so, item 11808 sets Key_Parts equal to variable i. If decision 11804 determines that variable i is not greater than or equal to zero or if decision 11806 determines that variable i is not less than 10, program control passes to I/O step 11810 to display the message "Invalid Key Parts Specified." Once I/O step 11810 or item 11808 are complete, process control returns to the calling subroutine.

FIG. 119 is a flow diagram of the SET_TABLE_PARTS subroutine called by the subroutine of FIG. 112A. This subroutine inputs the table parts number from the user and displays a message if not in the range of 1 through 9. When invoked, item 11902 sets the variable i equal to the value returned by function GET_VALUE. Program control then passes to decision 11904 to determine whether variable i is greater than zero. If so, program control passes to decision 11906 to determine whether variable i is less than 10. If so, item 11908 sets Table_Parts equal to variable i. If decision 11904 determines that variable i is not greater than zero or if decision 11906 determines that variable i is not less than 10, program control passes to I/O step 11910 to display the message "Invalid Table parts # specified." Once I/O step 11910 or item 11908 are complete, process control returns to the calling subroutine.

FIG. 120 is a flow diagram of the ENABLE_PASSWORDS subroutine called by the subroutine of FIG. 112C. When invoked, item 12002 toggles the password protection by performing an Exclusive-Or on the password protection bit. Program control then returns to the calling subroutine.

FIG. 121 is a flow diagram of the SET_PASSWORDS subroutine called by the subroutine of FIG. 112A. When invoked, process 12102 sets the variable Level equal to the value returned by the GET_LEVEL subroutine. Decision 12104 then determines whether the Level is greater than zero. If so, program control passes to the change password subroutine 12106, which is passed the variable Level as a parameter. If decision 12104 determines that Level is not greater than zero or when process 12106 completes, program control returns to the calling subroutine. The CHANGE_PASSWORD subroutine and the GET_LEVEL subroutine are discussed in more detail below.

FIG. 122 is a flow diagram of the GET_LEVEL subroutine called by the subroutine of FIG. 122. When invoked, process 12202 opens the user level screen display. Process 12204 then titles the window and process 12206 sets the variable rv equal to the value returned by GET_MENU_OPTION. Decision 12208 then determines whether rv is less than 1. If so, item 12210 sets rv equal to zero. If not, decision 12212 determines whether rv is greater than the maximum number of user levels (which is four in the preferred practice of the present invention). If so, item 12214 sets rv equal to zero. Once items 12210 or 12214 have set rv equal to zero, or if decision 12212 determines that rv is not greater than the maximum number of user values, program control passes to subroutine 12216 to close the user levels window. The subroutine then returns rv (which now contains the current user level) to the subroutine of FIG. 121.

FIGS. 123A and 123B are a flow diagram of the GET_PASSWORD subroutine called by the subroutine of FIG. 121. This subroutine is passed the user level variable returned by the subroutine of FIG. 122. When invoked, subroutine 12302 sets the variable Password1 equal to the text returned by the GET_TEXT subroutine. The GET_TEXT subroutine prompts the user to enter a test string corresponding to the new password and stores this text in a string buffer. Decision 12304 then determines whether the length of Password1 is greater than zero. If not, the subroutine immediately returns to the subroutine of FIG. 121. If so, decision 12306 determines whether the length of Password1 is less than 8 characters. If so, item 12308 forms a loop with decision 12306 to concatenate spaces onto the end of Password1 until it equals 8 characters in length. Once Password1 equals 8 characters, program control passes to subroutine 12310, which sets the variable Password2 equal to the text value returned by the GET_TEXT subroutine. Decision 12312 then determines whether the length of Password2 is greater than 0 characters. If not, the subroutine immediately returns to the subroutine of FIG. 121. If so, decision 12314 determines whether the length of Password1 is less than 8 characters. If so, item 12316 forms a loop wit decision 12314 to concatenate spaces on to the end of Password2 until it equals 8 characters in length. Once Password2 equals 8 characters, program control passes to decision 12318 to determine whether Password1 equals Password2. This is done because, in the practice of the present invention, the user must correctly enter his password twice. If Password1 is not the same as Password2, I/O block 12320 displays the message "Password must be entered the same both times" and loops to subroutine 12302. If the password was correctly entered both times, subroutine 12322 encryptes the password for this level using a predefined encryption algorithm. Passwords are stored in the system in an encrypted form to prevent an adversary from discovering the password and compromising the system. The encrypted password is then stored and program control returns to the subroutine of FIG. 121.

FIG. 124A is a flow diagram of the PUT_OPTIONS subroutine, which stores the options on disk when the OPTIONS_MENU is exited. In some system configurations, a disk is not included with the system, and the system software is stored in nonvolatile memory. In these systems, the options may be stored in an EEPROM or battery backed-up RAM. In disk-based systems, the options are appended at the end of the executable file which contains the system software followed by a checksum variable. A normal DOS executable file has a checksum loaded in the file which the executable loader verifies. Since the options are appended to the executable file, the normal executable file checksum would be altered. Therefore, the present invention generates a negative checksum to cancel the effect of the options file on the checksum of the file. This file structure is shown in FIG. 124B. When invoked, item 12402 sets the Checksum variable equal to zero. Item 12404 then sets an integer pointer p to the address of the beginning of the options structure. Item 12406 sets variable i equal to the value equal to one-half the size of the options structure to determine the number of integer values in the options structure wherein integer values are 2 bytes long. The loop formed by item 12408, item 12410, and decision 12412 then sets Checksum equal to the value of Checksum minus the value of the item pointed by pointer p for all integers in the options structure. In other words, whatever pointer p points to is subtracted from Checksum. Once variable i has been decremented to zero, decision 12414 determines whether the checksum in the options structure is equal to the newly generated Checksum. If so, program control returns to the menu control subroutine. If not, item 12416 sets the options checksum equal to the newly generated checksum. I/O block 12418 then opens the options file on disk and I/O block 12420 seeks backwards from the end of the file by the length of the options segment and I/O block 12422 writes the options file to disk. I/O block 12424 then closes the options file and program control returns to the calling routine.

FIG. 125 is a flow diagram of the GET_OPTIONS subroutine, which is called whenever a system backup is performed, whenever the system is first initialized, or whenever called by the main menu subroutine. When invoked, I/O blocked 12502 opens the options file and decision 12504 determines whether the options file was opened successfully. If not, I/O block 12506 displays the message "Error opening options" and the subroutine returns. If the options file was opened successfully, I/O block 12508 reads the options segment by seeking from the end of file by the size of the options structure. The first part contains an identifier which indicates the option structure is present. Decision 12510 tests the option file to locate the identifier. If the identifier is not found, I/O block 12512 displays the message "Options missing" and the subroutine returns. If the identifier is found, decision 12514 determines whether the identifier is correct. If not, I/O block 12516 displays the message "Options version invalid" and the subroutine returns. If the options file identifier is correct, I/O block 12518 closes the options file and the subroutine returns. The PUT_OPTIONS and GET_OPTIONS subroutines both assume the options structure is already present on disk. The options structure is initially created by a separate utility used when configurating a new system.

FIG. 126 is a flow diagram of the CONFIGURE_MENU subroutine called by the subroutine of FIG. 112A. When invoked, item 12602 opens the configure window and I/O block 12604 writes the configure menu heading into the window. Item 12606 then sets the variable i equal to zero. The loop formed by items 12608 and 12610 and decision 12612 then formats the menu option with the particular information associated with each board and displays each boards respective information until variable i equals the maximum number of boards in the system. When each board in the system has been formatted, subroutine 12614 sets the variable rv equal to the value returned by subroutine GET_MENU_OPTION. Decision 12616 determines whether rv equals 99 or escape. If not, the CONFIGURE_BOARD subroutine 12618 is invoked to configure the selected board. The Configure Board subroutine is passed the value of rv. If rv equals 99, subroutine 12620 closes the options window. CLOSE_DEBS subroutine 12622 is then called to save new configuration data and OPEN_DEBS subroutine 12624 reopens the boards for later access. If the result of decision 12616 is negative, subroutine 16226 CONFIG_BOARD is called passing it the value in rv, which is the number of the board to configure. The CONFIGURE_MENU subroutine then returns.

FIG. 127 is a flow diagram of the CONFIGURE_BOARD subroutine called by the subroutine of FIG. 126. The CONFIGURE BOARD subroutine is passed the variable bd which indicates board number by the subroutine of FIG. 125. When invoked, subroutine 12702 opens the configure board menu and I/O block 12704 displays the window title. Item 12706 then formats the window items for the selected board and subroutine 12708 sets the variable rv equal to the value returned by the GET_MENU_OPTION subroutine. Decision 12710 determines whether rv equals one. If so, program control exits to subroutine A. If not, decision 12714 determines whether rv is equal to 2. If so, program control exits to subroutine B. If not, decision 12718 determines whether rv is equal to 3. If so, program control exits to subroutine C. If not, decision 12722 determines whether rv is equal to 4. If so, program control exits to subroutine D. If not, decision 12726 determines whether rv is equal to 5. If so, program control exits to subroutine E. If not, decision 12730 determines whether rv is equal to 99. If so, program control program control passes to subroutine 12732 to close the menu window and the subroutine returns. If not, or when subroutines A, B, C, D or E return, program control loops to item 12706 to format the display window.

FIG. 128 is a flow diagram of subroutine A called by the subroutine of FIG. 127. This subroutine is invoked to modify the board description. When invoked, decision 12802 determines whether the user mode is greater than or equal to 2. If not, the subroutine returns because a user with a user level lower than 2 cannot change the board description. If the user mode is greater than or equal to 2, item 12804 gets the description string entered by the user using the GET_TEXT subroutine described above. Item 12806 then pads the board description to 20 characters using spaces and the subroutine returns.

FIG. 129 is a flow diagram of subroutine B called by the subroutine of FIG. 127. This subroutine is invoked to modify the board group. When invoked, decision 12902 determines whether the user mode is greater than or equal to 2. If not, the subroutine returns because a user with a user level lower than 2 cannot change the board group. If the user mode is greater than or equal to 2, item 12904 gets the board group entered by the user using the GET_TEXT subroutine described above. Decision 12906 determines whether the group value is greater than zero and less than 9. The upper limit of board groups is limited by the number of boards supported by the system and this number may increase if additional boards are added to the system. If a valid board group value was not entered, I/O block 12908 displays the message "Invalid Board Group Specified" and the subroutine returns. If a valid board group was entered, item 12910 stores the new value in the board options file and the subroutine returns.

FIG. 130 is a flow diagram of subroutine C called by the subroutine of FIG. 127. This subroutine is invoked to modify the board mode. When invoked, decision 13002 determines whether the user mode is greater than or equal to 2. If not, the subroutine returns because a user with a user level lower than 2 cannot change the board mode. If the user level is greater than or equal to 2, subroutine 13004 sets the variable i equal to board mode. The present invention includes a means of ensuring that board modes are correctly entered. For example, a slave board cannot be connected to another slave board. Furthermore, every slave board must have a master. Decision 13006 determines whether variable i indicates the selected board is configured as a slave and the board number equals 1 or if the selected board is configured as a slave and the previous board is not configured as a master. If so, I/O block 13008 displays the message "SLAVE Boards must be preceded by a MASTER board." If the result of decision 13006 is negative, decision 13010 determines whether the selected board is configured as a master and the board number equals the maximum number of boards in the system. If so, I/O block 13012 displays the message "Last board should not be configured as MASTER." If the result of decision 13010 is negative, decision 13014 determines whether the selected board is configured as a master and the board number is less than the maximum number of boards in the system and the configuration mode for the next board (bd + 1) indicates slave. If so, I/O block 13016 displays the message "MASTER board must precede a SLAVE board." If the result of decision 13014 is negative, decision 13018 determines whether rv equals 99 or escape. If so, the subroutine returns. If not, item 13020 sets the configuration mode for the selected board equal to the value indicated by variable i.

FIG. 131 is a flow diagram of subroutine D called by the subroutine of FIG. 127. When invoked, subroutine 13102 updates the communication parameters for the board indicated by the variable bd. Subroutine 13102 then returns.

FIG. 132 is a flow diagram of subroutine E called by the subroutine of FIG. 127. When invoked, subroutine 13202 updates the SERIAL_SUPPORT parameters for the board indicated by the variable bd. Subroutine 13202 then returns.

FIG. 133 is a flow diagram of the COMMUNICATION_PARAMETERS subroutine called by the subroutine of FIG. 131. When invoked, subroutine 13302 opens the COMMUNICATION_PARAMETERS menu window. Item 13304 then formats the menu items for the board indicated by the variable bd. Subroutine 13306 then sets rv equal to the value returned by the GET_MENU_ITEM subroutine. Decision 13308 then determines whether rv is equal to 99 or escape. If so, subroutine 13310 closes the menu window and the subroutine returns. If the result of decision 13308 is negative, decision 13312 determines whether rv is equal to 1. If so, program control passes to BAUD_RATE subroutine 13314. If not, decision 13316 determines whether rv is equal to 2. If so, program control passes to PARITY_PARAMETER subroutine 13318. If not, decision 13320 determines whether rv is equal to 3. If so, program control passes to DATA_BITS subroutine 13322. If not, decision 13324 determines whether rv is equal to 4. If so, program control passes to STOP_BITS subroutine 13328. If not, decision 13330 determines whether rv is equal to 5. If so, program control passes to TRANSMIT_DELAY subroutine 13332. If not, decision 13334 determines whether rv is equal to 6. If so, program control passes to FRAME_TIMER subroutine 13336. If not, decision 13338 determines whether rv is equal to 7. If so, program control passes to HARDWARE_FLOW_CONTROL subroutine 13340. If not, the subroutine returns. When subroutines 13314, 13318, 13322, 13326, 13332, 13336, or 13340 return, program control returns to subroutine 13306. &

FIG. 134 is a flow diagram of the BAUD_RATE subroutine, which is called to update the BAUD_RATE communication parameters. When invoked, subroutine 13402 opens the BAUD_RATE window. Subroutine 13404 then sets the variable rv equal to the value returned by the GET_MENU_OPTION subroutine. Subroutine 13406 then closes the BAUD_RATE window and the subroutine returns the variable rv.

FIG. 135A is a flow diagram of the PARITY_PARAMETER subroutine, which is called to update the parity communications parameters. When invoked, subroutine 13502 opens the PARITY_PARAMETER window. Subroutine 13504 then sets the variable rv equal to the value returned by the GET_MENU_OPTION subroutine. Subroutine 13506 then closes the PARITY_PARAMETER window and the subroutine returns the variable rv.

FIG. 135B is a flow diagram of the DATA_BITS subroutine, which is called to update the DATA_BITS communications parameterS. When invoked, subroutine 13508 opens the DATA_BITS window. Subroutine 13510 then sets the variable rv equal to the value returned by the GET_MENU_OPTION subroutine. Subroutine 13512 then closes the PARITY_PARAMETER window and the subroutine returns the variable rv.

FIG. 136 is a flow diagram of the STOP_BITS subroutine, which is called to update the STOP_BITS communications parameters. When invoked, subroutine 13602 opens the STOP_BITS window. Subroutine 13604 then sets the variable rv equal to the value returned by the GET_MENU_OPTION subroutine. Subroutine 13606 then closes the STOP_BITS window and the subroutine returns the variable rv.

FIG. 137 is a flow diagram of the TRANSMIT_DELAY subroutine, which is called to update the TRANSMIT_DELAY communications parameter. When invoked, subroutine 13702 opens the STOP_BITS window. Subroutine 13704 then sets the variable rv equal to the value returned by the Get Menu Option subroutine. Subroutine 13706 then closes the TRANSMIT_DELAY window and the subroutine returns the variable rv.

FIG. 138 is a flow diagram of the FRAME_TIMER subroutine, which is called to update the frame timer communications value. When invoked, subroutine 13802 sets the variable equal to the value returned by the GET_MENU_OPTION subroutine. The subroutine then returns.

FIG. 139 is a flow diagram of the HARDWARE_FLOW_CONTROL subroutine, which is called to enable or disable hardware flow control. When invoked, item 13902 toggles the flow control bit between zero and one. The Hardware control subroutine then returns.

FIG. 140A is a flow diagram of the SERIAL_SUPPORT subroutine called by the subroutine of FIG. 132. The serial supported functions are displayed on the SERIAL_SUPPORT window and are enabled or disabled under cursor control. When invoked, subroutine 14002 opens the SERIAL_SUPPORT window. I/O block 14004 then outputs a title on the window. I/O block 14006 outputs a legend to the bottom of the displayed window. Once displayed, item 14008 sets the integer variable Cursor equal to zero wherein zero corresponds to the first position displayed in the table. I/O step 14010 then displays the serial function names in the window wherein the serial functions are maintained in list form in the function table. When complete, item 14012 highlights the cursor selected item on the display.

Subroutine 14014 then sets the variable k equal to the value returned by the GET_KEY subroutine. Decision 14016 determines whether the value of k equals escape. If so, subroutine 14018 closes the SERIAL_SUPPORT window and the subroutine returns. If the result of decision 14016 is negative, decision 14020 determines whether variable k equals the value of the return key. The return key is used to toggle the user input from yes to no on the SERIAL_SUPPORT display. If the return key was entered, item 14022 calculates the table entry to toggle. In the context of the present invention, each table value is a 32-bit entry. Serial mask is a 32-bit value. Therefore item 14022 processes a 32-bit value and divides it by 32 to determine which 32-bit value to toggle. The bit value for the location, is determined by taking the value of the entry in the position and left shifting it by the modulo or remainder of it and performing an Exclusive-Or on the value of the mask which corresponds to the respective serial functions displayed. The cursor is then set to the next value. If the capital "Y" key is entered, all table values are set to one. If the capital "N" key is entered, all table values are set to zero. When complete, program control returns to I/O step 14010.

If the result of decision 14020 is negative, decision 14024 determines whether variable k equals "N". If so, item 14026 sets all serial mask bits to zero. If not, decision 14028 determines whether variable k equals "Y". If so, item 14030 sets all serial mask bits to 1. If not, decision 14032 determines whether variable k equals "HOME". If so, item 14034 sets Cursor to zero to move it to the top of the list. If not, decision 14036 determines whether variable k equals "END". If so, item 14038 sets Cursor equal to the number of items on the list minus one to move the cursor to the last item on the list. If not, decision 14044 determines whether variable k equals "DOWN ARROW". If so, item 14042 sets the cursor to the next item in the column. If not, decision 14045 determines whether variable k equals "UP ARROW". If so, item 14046 sets Cursor to the previous item in the column. If not, decision 14048 determines whether variable k equals "RIGHT ARROW". If so, item 14050 sets Cursor to the next item in the row. If not, decision 14052 determines whether variable k equals "LEFT ARROW". If so, item 14054 sets Cursor to the previous item in the row. If not, program control returns to I/O step 14010. Program control also returns to I/O step 14010 whenever items 14026, 14030, 14034, 14038, 14042, 14046, 14050, or 14054 are completed.

FIG. 141 is a flow diagram of the FIRST_CONFIG subroutine, which is called to locate the first board of a particular group. The FIRST_CONFIG subroutine is passed an integer (gp) corresponding to a desired board group. The FIRST_CONFIG subroutine then returns the board number of the first board in the group. When invoked, item 14102 sets a variable i equal to zero. Decision 14104 then determines whether variable i is less than MAXBOARDS. If not, the subroutine returns the value −1, indicating the subroutine did not locate a board. If variable i is less than MAXBOARDS, decision 14106 determines whether the board pointed to by variable i is in the group of interest. If not, item 14108 increments variable i and program control returns to decision 14104. If so, decision 14110 determines whether the board indexed by variable i is empty. If so, item 14108 increments variable i and program control returns to decision 14104. If not, decision 14112 determines whether the board indexed by variable i is marked down. If so, item 14108 increments variable i and program control returns to decision 14104. If not, the subroutine returns variable i, which is the integer value of the first board in the group.

FIG. 142 is a flow diagram of the NEXT_CONFIG subroutine. Once the current board in a group is known, the NEXT_CONFIG subroutine finds the next board in the group. Therefore, when called, the NEXT_CONFIG subroutine is passed the value of the current board in the group in variable bd. When invoked, item 14202 sets the variable i equal to variable bd + 1. Decision 14204 then determines whether variable i is less than MAXBOARDS. If not, the subroutine returns the value −1. indicating the subroutine did not locate another board in the group. If variable i is less than MAXBOARDS, decision 14206 determines whether the board pointed to by variable i is in the group of interest. If not, item 14208 increments variable i and program control returns to decision 14204. If so, decision 14210 determines whether the board indexed by variable i is empty. If so, item 14208 increments variable i and program control returns to decision 14204. If not, decision 14212 determines whether the board indexed by variable i is marked down. If so, item 14208 increments variable i and program control returns to decision 14204. If not, the subroutine returns the variable i, which is the integer value of the next board in the group.

FIG. 143A is a flow diagram of the KEYS_MENU routine which is called from the main menu when KEYS is selected on the menu bar. When invoked, subroutine 14302 opens the main menu and subroutine 14304 sets rv equal to the value returned by the Get Menu Option subroutine. Decision 14306 then tests rv to determine whether rv equals 1. If so, program control passes to the "D" subroutine. If not, decision 14308 determines whether rv equals two. If so, program control passes to the "E" subroutine. If not, decision 14310 determines whether rv equals three. If so, program control passes to the "F" subroutine. If not, decision 14312 determines whether rv equals four. If so, program control passes to the "G" subroutine. If not, decision 14314 determines whether rv equals five, as shown in FIG. 143B. If so, program control passes to the "H" subroutine. If not, decision 14316 determines whether rv equals six. If so, program control passes to the "I" subroutine. If not, decision 14318 determines whether rv equals seven. If so, program control passes to the "J" subroutine. If not, decision 14320 determines whether rv equals eight. If so, program control passes to the "K" subroutine. If not, decision 14322 determines whether rv equals nine. If so, program control passes to the "L" subroutine. If not, decision 14324 determines whether rv equals ten, as shown in FIG. 143C. If so, program control passes to the "M" subroutine. If not, decision 14326 determines whether rv equals eleven. If so, program control passes to the "N" subroutine. If not, decision 143281 determines whether rv = 99. If not, program control returns to subroutine 14304. If so, subroutine 14330 closes the Keys Window and the subroutine returns.

FIG. 144 is a flow diagram of the WARN_NOBOARDS subroutine, which is a utility called in several subroutines below to warn the user that an active group has no boards assigned to it. When invoked, subroutine 14402 calls the FIRST_CONFIG subroutine to set rv equal to the currently active group. Decision 14404 then determines whether rv equal minus one. If not, the subroutine returns zero. If so, I/O step 14406 displays the message "No boards available in active group", and the subroutine returns one.

FIG. 145A is a flow diagram of the GET_KEY subroutine, which is called for getting DES keyparts entry from a user. When invoked, subroutine 14502 opens the key entry window. Item 14504 then sets the variable kmap equal to zeros. The variable keymap is a variable of up to nine digits and it is used to keep track of which keyparts have been entered. Item 14506 then sets the variable i equal to zero wherein variable i is used as a counter. Decision 14508 tests variable i to determine whether it less than the number of keyparts designated under the configure function. If variable i is not less than the number of keyparts, process control passes to item 14518 of FIG. 145B. If variable i is less than the number of keyparts, decision 14510 determines whether kmap bit variable i is greater than zero. If so, item 14512 formats the menu item showing the check digits for the keypart. If not, item 14514 formats the menu item showing "ENTER_KEY part #i". When items 14512 or 14514 are completed and #16 increments variable i. Program control then returns to decision 14508, and the loop continues until variable i is greater than or equal to the number of keyparts indicating that all keyparts have been entered.

When the result of decision 14508 is negative, item 14518 sets variable i equal to zero. Decision 14520 then determines whether variable i is less than the number of keyparts. If so, decision 14522 determines whether keymap bit variable i is greater than zero. If so, Item 14524 increments variable i and program control passes to decision 14520. If the result of either decision 14520 or 14522 is negative, decision 14526 determines whether variable i is equal to the value of keyparts. If not, program control passes subroutine 14548. Otherwise, I/O step 14528 displays the message "ACCEPT, CANCEL, RETRY". Subroutine 14530 then sets rv equal to the value returned by the Get_Menu Option subroutine. Decision 14532 then determines whether rv is equal to one. If so, subroutine 14534 closes the keypart menu and the subroutine returns "ACCEPT_KEY". If not, decision 14536 determines whether rv equal two. If so, subroutine 14538 closes the keypart menu and the subroutine returns CANCEL_KEY. If not, decision 14536 determines lines whether rv equal three. If so, subroutine 14542 closes the keypart menu and the program control passes to subroutine 14502 through kloop. If not, I/O step 14546 displays the message "You must select one of the menu options" and program control passes to subroutine 14530.

If the result of decision 14526 is negative, program control passes to subroutine 14548, which sets rv equal to the value returned by the GET_KEY part Menu Option subroutine. Decision 14550 then determines whether rv equals 99. If so, subroutine 14552 closes the key part window and returns a value indicating CANCEL_KEY. If not, decision 14554 determines whether kmap [rv-1]equals zero to determine whether the key part has been entered. If not, program control passes to item 14506 through Top of Do loop. If so, subroutine 14556 loads a buffer designated with the string returned by the ENTER_KEY subroutine. Decision 14558 then determines whether the length of the string in keybuf is greater than zero. If not, program control returns to subroutine 14552.

If keyback contains a valid key part, then it is necessary to load the key part into each board in the group. In the preferred practice of the present invention, subsequent key parts are Exclusive-Ored with previous key parts entered in the boards. Therefore, the system tracks whether the key part is the first keypart entered, in which case previous key information is erased, or whether the key part is a subsequent key part which is Exclusive-Ored with the key parts in the system. In practice, subroutine 14560 sets the variable bd equal to the value returned by the FIRST_CONFIG subroutine to locate the first board in the active group. Decision 14562 then determines whether bd is not equal to minus one, which indicates there are no boards. If bd does not equal −1, indicating that the last board in the group has not been found, subroutine 14564 loads the key into the board and subroutine 14566 calls the NEXT_CONFIG subroutine to find the next board in the group. Program control then returns to decision 14562 and the loop continues until all boards in the group have been loaded with the key part. When the last board in the group has been loaded with the keypart, I/O step 14558 displays the "ACCEPT_KEY part" window. Decision 14560 then determines whether the user entered "Yes" or "No". If the user entered yes, item 14562 sets the bit in kmap corresponding to the key part to indicate the key part is loaded and the variable current parts is incremented. Program control then passes to item 14506 through Top of Do loop. If the result of decision 14560 is negative, program control passes to subroutine 14564, in FIG. 146 to set bd equal to the value returned by FIRST_CONFIG to initialize the loop which will cancel key part if the user indicates the key part was not accepted. A key part is canceled by Exclusive-Oring it with itself. When the loop is entered, decision 14566 tests bd to determine whether it is equal to minus one. If so, the last board in the group has been processed and program control passes to item 14506. If the result of decision 14566 is negative, subroutine 14568 calls the Load_Key subroutine to load the same key part into the current board. Subroutine 14570 then sets bd equal to the value returned by the NEXT_CONFIG subroutine. Program control then returns to decision 14566 and the loop continues until all boards in the group have been processed.

FIG. 147D through 147C are flow diagrams of the Load Keytable subroutine which is called to inject a cyptogram in a board and store the cryptogram in the keytable of the board. When invoked, subroutine 14702 opens the load keytable window, subroutine 14704 titles the window and item 14706 formats the first menu item with the last cryptogram created which is stored as a global variable. Subroutine 14708 then sets rv equal to the value returned by the Get Menu Option subroutine. Decision 14710 tests rv to determine whether it is equal to 99. If so, subroutine 14712 closes the Load Keytable window and the subroutine returns rv. If not, decision 14714 determines whether rv equals 1, which indicates the user would like to use the last cryptogram created by the system. Keytype is a global variable which indicates the type of cryptogram stored in the last cryptogram global variable. If rv equals 1, decision 14716 determines whether the keytype equals zero. If so, I/O step 14718 displays the message "Last cryptogram does not exist." If not, program control passes to subroutine 14752. If the result of decision 14714 is negative, decision 14720 determines whether rv equals 2. If so, item 14722 sets keytype equal to a value indicating KEYTYPE KEK and subroutine 14724 calls the ENTER_CRYPTOGRAM subroutine and sets the variable rc equal to the value returned by the ENTER_CRYPTOGRAM subroutine. If not, decision 14726 determines whether rv equals 3. If so, item 14728 sets keytype equal to a value indicating a value indicating KEYTYPE_PVK and subroutine 14730 calls the ENTER_CRYPTOGRAM subroutine and sets the variable rc equal to the value returned by the ENTER_CRYPTOGRAM subroutine. If not, decision 14732 determines whether rv equals 4. If so, item 14734 sets keytype equal to a value indicating KEYTYPE_PEK and subroutine 14736 calls the ENTER_CRYPTOGRAM subroutine and sets the variable rc equal to the value returned by the ENTER_CRYPTOGRAM subroutine. If not, decision 14738 determines whether rv equals 5. If so, item 14740 sets keytype equal to a value indicating KEYTYPE_MAK and subroutine 14742 calls the ENTER_CRYPTOGRAM subroutine and sets the variable rc equal to the value returned by the ENTER_CRYPTOGRAM subroutine. If not, decision 14744 determines whether rv equals 6. If so, item 14746 sets keytype equal to a value indicating KEYTYPE_DEK and subroutine 14748 calls the ENTER_CRYPTOGRAM subroutine and sets the variable rc equal to the value returned by the ENTER_CRYPTOGRAM subroutine. When subroutines 14724, 14730, 14736, 14742, or 14748 return, decision 14750 determines whether rc equals zero. If so, the subroutine returns rv. If not, program control passes to subroutine 14752, which calls the subroutine GET_INT, which prompts the user for the key table index and returns the value in the variable idx. Decision 14754 determines whether the variable idx equals minus one. If so, program control passes to subroutine 14712. Otherwise, decision 14756 determines whether idx is between 1 and 4000. If not, I/O step 14758 displays the message "Index must be between 1 and 4000." Otherwise, I/O step 14760 displays the message "Load X cryptogram x..x into table position 0?". Subroutine 14762 then gets the user's response, either yes or no. If the user responds no, program control passes to decision 14712. If the user responds yes, program control passes to decision 14766, which determines whether the keytype variable equals a value indicating KEYTYPE_KEK. If so, item 14768 sets the variable modifier equal to zero. If not, decision 14770 determines whether the keytype variable equals a value indicating KEYTYPE_PVK. If so, item 14772 sets the variable modifier equal to 4. If not, decision 14774 determines whether the keytype variable equals a value indicating KEYTYPE_PEK. If so, item 14776 sets the variable modifier equal to 1. If not, decision 14778 determines whether the keytype variable equals a value indicating KEYTYPE_MAK. If so, item 14780 sets the variable modifier equal to 3. If not, decision 14782 determines whether the keytype variable equals a value indicating KEYTYPE_DEK. If so, item 14784 sets the variable modifier equal to 2. The result of decision 14782 is negative or when items 14768, 14772, 14776, 14780, or 14784, are completed, program control passes to process 14785, which calls the FIRST_CONFIG subroutine and sets the value bd equal to the value returned. Decision 14786 then tests bd to determine whether the last board in the group has been loaded. If not, subroutine 14788 loads the key into the current board and subroutine 14790 calls the NEXT_CONFIG subroutine and sets bd equal to the value returned. Program control then passes to decision 14786 and the loop continues until all boards in the group have been loaded. When all boards have been loaded, I/O block 14792 displays the message "XXX cryptogram xxx... loaded into keytable position 0." Program control then returns to process 14712.

FIG. 148 is a flow diagram of the ACCEPT_KEY subroutine called by the subroutine of FIG. 145A. This subroutine returns the check digits for a loaded key. When invoked, subroutine 14802 opens the ACCEPT_KEY window. Subroutine 14804 then calls the FIRST_CONFIG and Load Key subroutine to locate the key for the first board in the group. I/O block 14806 then displays the message "Check Digits = XXXX". Once the message is displayed, subroutine 14808 sets rv equal to the value returned by the Get Menu Option subroutine and subroutine 14810 closes the window. The subroutine then returns rv.

FIG. 149 is a flow diagram of the ENTER_KEY subroutine which is called by the subroutine of FIG. 145A. When invoked, process 14902 opens the ENTER_KEY window and subroutine 14904 titles the window. Subroutine 14906 then sets the variable buf equal to the text returned by the Get Text subroutine. Subroutine 14908 then closes the window and decision 14910 determines whether the string length in buf is greater than zero. If not, the subroutine returns. If so, subroutine 14912 upshifts the contents of buf and the subroutine returns.

FIG. 150 is a flow diagram of the ENTER_CRYPTOGRAM subroutine which is called by the subroutine of FIG. 145A. When invoked, item 15002 moves "ENTER_CRYPTOGRAM" into the help keyword to support the context sensitive help function of the present invention. Subroutine 15004 then opens the ENTER_CRYPTOGRAM window and subroutine 15006 titles the window. Subroutine 15008 then sets the variable buf equal to the text returned by the Get Text subroutine. Subroutine 15010 then closes the window and decision 15012 determines whether the string length in buf is greater than zero if not, the subroutine returns. If so, subroutine 15014 copies the contents of buf into the cryptogram global variable and the subroutine returns the entered cryptogram.

FIG. 151A is a flow diagram of the LOAD_DIEBOLD_TABLE subroutine called from the main KEYS_MENU. When invoked, subroutine 15102 opens the Diebold table window and I/O block displays special or function key text at the bottom of the screen. Item 15106 moves "Diebold" into the help keyword. I/O block 15108 then displays the contents of table DT. DT is a global variable which is an array. Item 115110 then sets the variables dr and dc equal to zero wherein dr indicates row and dc indicates column. Item 15112 sets the cursor equal to zero and the not done flag equal to true. I/O step 15114 then highlights the table item at position dr,dc and I/O step 15116 displays the current row and column at the bottom of the screen. Subroutine 15118 then sets the variable key equal to the value returned by the GET_KEY subroutine. Decision 15120 determines whether the key variable equals a cursor control character. If so, item 15122 adjusts dr and dc to reflect cursor movement. If not, decision 15124 determines whether the key variable is equal to the insert key. If so, program control exits to "B". If not, decision 15128 determines whether the key variable is equal to the delete key. If so, program control exits to "C". If not, decision 15132 determines whether the key variable is equal to the space key. If so, program control exits to "D". If not, decision 15136 determines whether the key variable is equal to the F3 function key. If so, program control exits to "E". If not, decision 15138 determines whether the key variable is equal to the "R" key which indicates random key generation. If so, program control exits to "F". If not, decision 15142 determines whether the key variable is equal to the "Z" key. If so, program control exits to "G". If not, decision 15146 determines whether the key variable is equal to the escape key. If so, program control exits to "H". If not, decision 15150 determines whether the key variable is equal to a Hexadecimal digit key. If so, program control exits to "I". If not, decision 15154 determines whether the not done variable is equal to a value indicating "TRUE". If so, program control exits to I/O step 15114. If not, program control exits to "J".

FIG. 151C is a continuation of the flow diagram of FIGS. 151A and 151B and indicates program flow when the subroutine branches to "B". This subroutine is used whenever the insert key was pressed in the Diebold table mode. When invoked, item 15102 sets the variable spos equal to a value equivalent to (dr*16) +dc to locate a position in a table. Item 15104 then sets the Pos variable equal to 254. Decision 15106 then determines whether Pos is greater than or equal to spos. If so, subroutine 15108 sets DT[Pos +1]equal to DT[Pos]to copy the table location into the adjacent location. Item 15110 then decrements Pos and program control returns to decision 15106. If the result of decision 15106 is negative, subroutine 15112 writes "_" into the position to create a table position. Position is then set equal to zero by item 15114 and decision 15116 determines whether Pos is less than 255. If so, I/O block 15118 displays the table entry at the position and item 15120 increments Pos. Program control then returns to decision 15116 and the loop continues until Pos is incremented to 255. The subroutine then returns.

FIG. 152 is a continuation of the flow diagram of FIGS. 151A and 151B and indicates program flow when the subroutine branches to "C". This occurs when the delete key is pressed when in the Diebold table mode. When invoked, item 15202 sets the Spos variable equal to the value of (dr*16) +dc and item 15204 sets the variable Pos equal to the variable Spos. Decision 15206 then determines whether Pos is less than 255. If so, subroutine 15208 sets DT[Pos]equal to DT[Pos +1]to copy the table position into the next table position. Item 15210 increments the variable Pos and program control returns to decision 15206. The loop continues until Pos equals 255. When the loop is complete, subroutine 15212 writes "_" into table position DT[255]. I/O block 15214 then displays all table positions and the subroutine returns.

FIG. 153 is a continuation of the flow diagram of FIGS. 151A and 151B and indicates program flow when the subroutine branches to "D", which occurs when the user enters a spacebar to open a position in the table. When invoked, subroutine 15302 writes "_" into the position selected on the table. Item 15304 then sets the cursor equal to zero and the subroutine returns.

FIG. 154 is a continuation of the flow diagram of FIGS. 151A and 151B and indicates program flow when the subroutine branches to "E", which occurs when the user enters accept. When invoked, item 15402 sets the flag not done to false and the subroutine returns.

FIG. 155 is a continuation of the flow diagram of FIGS. 151A and 151B and indicates program flow when the subroutine branches to "F" to generate a random table. When invoked, I/O block displays the message "Overwrite Table?" The present invention allows a user to overwrite an entire table or generate random values for specific table entries. Therefore, subroutine 15504 sets the variable rv equal to the value entered by the user: either yes, no or abort. Decision 15506 then determines whether the user entered yes and if so, subroutine 15508 generates a random diebold table. When subroutine 15508 returns or if the result of decision 15506 is negative, the subroutine returns.

FIG. 156 is a continuation of the flow diagram of FIGS. 151A and 151B and indicates program flow when the subroutine branches to "G" which occurs when the user presses "Z". When invoked, I/O block 15602 displays the message "Clear Diebold Table" and subroutine 15604 sets the variable rv equal to the value entered by the user: either yes or no. Decision 15606 then determines whether rv equals yes. If not, the subroutine returns. If so, subroutine 15608 initializes the Diebold table and I/O block 15610 redisplays the Diebold table. Item 15612 then sets dr and dc to zero and reinitializes the cursor to zero. The subroutine then returns.

FIG. 157 is a continuation of the flow diagram of FIGS. 151A and 151B and indicates program flow when the subroutine branches to "H" which occurs whenever a user presses the escape key in the Diebold table mode. When invoked, item 15702 sets the variable not done equal to false and the subroutine routine returns.

FIG. 158 is a continuation of the flow diagram of FIGS. 151A and 151B and indicates program flow when the subroutine branches to "I" which occurs when a hexadecimal digit is entered. When invoked item 15802 calculates the current position in the table by setting the [cur]value of DT[(dr*16) +dc]. Cur is then incremented. Decision 15804 then determines whether cur equals 1. If so, item 15806 forces the other position in the table entry to display the symbol "_". This forces the user to enter two new digits each time he modifies a table position.

If not, subroutine 15808 invokes CHECK_DT_DUP() to determine whether the two-digit value just entered is a duplicate of another entry in the Diebold table. Decision 16910 determines whether a duplicate entry exists. If so, item 15812 sets DT[(dr*16) +dc]equal to "_" and sets cur equal to zero. This affects the display two underscores to indicate that a duplicate entry has been made. The subroutine then returns. If not, item 16914 sets key equal to the Return Key and jumps and branches to kloop.

FIG. 159 is a continuation of the flow diagram of FIGS. 151A and 151B and indicates program flow when the subroutine branches to "J". Decision 16902 determines whether key equals F3. If so, then the subroutine continues at subroutine 15904. If not, then the subroutine continues at subroutine 15908. Subroutine 15904 calls STORE_DIEBOLD, which returns a value in rc. Decision 15906 determines whether the value in rc is a 2 or a 3. If so, the subroutine branches to either. If not, the subroutine branches to subroutine 15908. Subroutine 15908 calls CLOSE_WINDOW. The subroutine then returns.

FIGS. 160A and 160B are flow diagrams of the CHECK_DT_DUP subroutine. This subroutine determines whether there is a duplicate entry in the Diebold table. This subroutine is passed an index into the table, parameter Pos, which indicates the Diebold entry to check for duplication, a passed parameter, Silent, to indicate whether or not to beep. FIG. 160A is a flow diagram of the code that checks the entries in the Diebold table below Pos. FIG. 160B is a flow diagram of the code that checks the entries in the Diebold table above Pos. Item 16002 sets variable i equal to zero. Variable i is an index used for stepping through the Diebold table. Decision 16004 determines whether variable i is less than Pos. If so, the routine continues at item 16006. If not, the routine continues at item 16020. Item 16006 compares DT[i](which is the i-th entry in the Diebold table) with DT[Pos]. Decision 16008 determines whether these values are the same. If not, then item 16010 increments variable i and continues at decision 16004. If so, item 16012 formats a duplicate entry warning message and places it into a buffer. Decision 16016 determines whether parameter Silent is greater than zero. If so, I/O block 16014 displays the message in the buffer without a beep and the subroutine returns a value of 1. If not, I/O block 16018 displays the message in the buffer with a beep and the subroutine returns a value of 1.

FIG. 160B a continuation of the description of subroutine CHECK_DT_DUP. Item 16020 sets variable i equal to 255. Decision 16022 determines whether variable i is greater than Pos. If not, the subroutine returns a value zero to indicate that are no duplicates in the table. If so, item 16024 compares DT[i]with DT[Pos]. Decision 16026 determines whether the entries are the same. If not, item 16028 decrements variable i and continues at decision 16022. If so, then item 16030 places a message indicating a duplicate entry into a buffer. Decision 16032 determines whether the passed parameter Silent is greater than zero. If so, I/O block 16034 displays the message in the buffer without a beep and the subroutine returns a value of 1. If not, I/O block 16036 displays the message in the buffer with a beep and the subroutine returns a value of 1.

FIGS. 161, 162A, 162B, and 163 are flow diagrams of the STORE_DIEBOLD subroutine. This subroutine prompts the user for determination of whether to accept, cancel, or redo the Diebold table entry and processes the request. Subroutine 16102 calls the OPEN_WINDOW subroutine. Subroutine 16104 calls GET_MENU_OPTION, which returns the option in rv. Decision 16106 determines whether rv equals 1. If so, the subroutine continues at 16202. If not, decision 16108 determines whether rv equals 2. If so, then the subroutine continues at 16302. If not, decision 16110 determines whether rv equals 3. If not, item 16112 sets rv equal to 3. Subroutine 16114 calls subroutine CLOSE WINDOW. The subroutine then returns the value rv.

FIG. 162A is a flow diagram of the routine that is executed when the user indicates that the Diebold table is to be accepted. Subroutine 16202 calls subroutine VALID_DIEBOLD_TABLE, which returns a value of zero in rc if valid. Decision 16204 determines whether rc is greater than zero. If not, item 16224 set rv equal to 3 and the subroutine continues at subroutine 16114. If so, subroutine 16206 calls subroutine GET_INT, which sets the variable idx. Decision 16208 determines whether variable idx equals 1. If so, the subroutine branches to 16114. If not, decision 16210 determines whether variable idx is less than 1 or is greater than 10. If so, I/O block 16212 outputs the message "Index value must be between 1 and 10" and branches to subroutine 16206. If not, I/O block 16214 outputs the message "LOAD_DIEBOLD_TABLE into position idx." Subroutine 16216 calls subroutine ASK_YES_NO, inputs a yes or no response, and returns a value in variable rc. Decision 16218 determines whether rc equals yes. If so, item 16222 places all the Diebold table entries into a single a buffer and the subroutine continues at item 16232. If not, item 16220 sets rv equal to 3 and the subroutine continues at 16114.

FIG. 162B is a flow diagram of a routine which loads the Diebold table into the encryption boards. Item 16232 sets variable bd equal to the first configured board of the active group. Decision 16232 determines whether variable bd equals a −1. If so, output 16240 displays the message that the Diebold table is loaded and the routine continues at subroutine 16114. If not, subroutine 16236 calls subroutine DO_LCDT. Subroutine 16238 then calls subroutine NEXT_CONFIG and returns a value in variable bd, and the subroutine continues at decision 16234 until all boards have been configured.

FIG. 163 is a flow diagram of the routine which initializes the Diebold table when the cancel option has been specified. Subroutine 16302 calls subroutine INIT_DIEBOLD_TABLE. The subroutine continues at subroutine 16114.

FIG. 164 is a flow diagram of the subroutine VALID_DIEBOLD_TABLE. This subroutine validates the contents of the Diebold table and returns a zero if an error is detected and a 1 if no error is detected. Item 16402 converts the first entry in the Diebold table into a binary value. Decision 16404 determines if the entry is greater than 192 and less than 207. If not, I/O block 16406 displays the message "first table entry must be between CO and CF," and the subroutine returns the value zero. If so, blocks 16408 through 16414 initialize the Map array to contain an "N" in each of its 256 positions. Item 16408 sets variable i equal to zero. Decision 16410 determines whether variable i is less than 256. If so, item 16412 sets Map[i]equal to "N" and item 16414 increments variable i and loops to decision 16410. If not, then blocks 16416 through 16422 loop through the Diebold table, retrieving values and using the values as indexes into the Map array. the entries in the Map array are set to "Y". Item 16416 sets variable i equal to zero, decision 16418 determines whether variable i is less than 256. If so, item 16420 sets map[DT[i]]equal to "Y" and item 16422 increments variable i and loops to decision 16418. If not, blocks 16424 through 16432 determine whether each of the entries in the Map array contain a "Y". If there is an "N" present in the array, then a duplicate entry has been made in the Diebold table. Item 16424 sets variable i equal to zero; decision 16426 determines whether Variable i is less than 256. If not, then the subroutine returns with a value of 1. If so, decision 16428 determines whether Map[i]is equal to "N". If so, a duplicate entry is detected and I/O block 16430 outputs the message "incomplete table detected" and returns a value zero. If not, then item 16432 increments variable i and loops to decision 16426.

FIG. 165 is a flow diagram of the INIT_DIEBOLD_TABLE subroutine. This subroutine places two underscores in each Diebold table entry. Item 16502 sets variable i equal to zero. Decision 16501 determines if variable i is less than 256. If not, the subroutine returns. If so, subroutine 16506 sets entry DT[i]equal to "_". Item 16508 increments variable i and loops to decision 16504.

FIGS. 166A and 166B are a flow diagram of the GEN_RANDOM_DIEBOLD_TABLE subroutine. This subroutine generates a Diebold table filled in a random set of values. This subroutine is passed the parameter Fill, which indicates whether INIT_DIEBOLD_TABLE is called. By definition, the Diebold table has 256 unique entries. The present invention generates these 256 unique random values in a particularly efficient manner. The invention uses the Choices array and the NIX subroutine. Recall that the Choices array initially was filed with sequential values. When a random number is generated, the invention uses that number as an index into the Choices array. The invention retrieves the value at that index and stores it in the Diebold table. The subroutine NIX then removes that value from the Choices table by shifting all entries at higher indexes one entry position lower. This removal guarantees the uniqueness of the Diebold table entries. The random number generator, when called, generates a number less than or equal to the number of entries left in Choices to ensure proper indexing. Item 16602 sets Count equal to 256. Decision 16604 determines if Fill is greater than zero. If so, subroutine 16606 calls INIT_DIEBOLD_TABLE and continues at subroutine 16607. If not, the subroutine continues at subroutine 16607. Blocks 16608 through 16614 initialize the Choices array, which is 256 entries long. The array is initialized so that entry 1 of the array equals 1, entry 2 of the array equals 2, etc. Item 16608 sets variable i equal to zero. Decision 16610 determines whether variable i is less than 256. If so, 16612 sets Choices[i]equal to variable i and item 16614 increments variable i and loops to decision 16610. If not, blocks 16616 through 16626 initialize the first entry in the table, which must be between CO and CF. Item 16616 sets variable x equal to a random number modulo 16. Item 16618 sets variable x equal to variable x plus 192. Decision 16620 determines whether the first entry in the Diebold table is equal to "_". If not, the subroutine continues at item 16628. If so, subroutine 16622 calls subroutine NIX. Item 16624 places the variable x into DT[0]. I/O block 16626 displays the variable x and continues at item 16628. Blocks 16628 through 16636 initialize the remainder of the Diebold table with random numbers. Item 16628 sets variable i equal to one. Decision 16630 determines if variable i is less than 256. If not, the subroutine returns. If so, item 16632 sets variable x equal to a random number between 1 and Count. Item 16634 sets DT[i]equal to Choices[x]. Subroutine 16636 calls subroutine NIX. I/O block 16638 displays the value of DT[i]. Item 16640 increments variable i and loops to decision 16630.

FIG. 167 is a flow diagram of the NIX subroutine. This subroutine is passed parameters: Array, Element, and Count. This subroutine searches for the Array entry that equals Element and then removes that entry by each entry at a higher entry location to the next lower location. Parameter Count contains the number of entries in the Array. In an alternate embodiment, this subroutine removes the entry at that Index, rather than search for the entry equal to Element. Item 16702 sets variable i equal to zero. Decision 16704 determines whether variable i is greater than Count. If not, the subroutine returns. If so, decision 16706 determines whether Array[i]equals Element. If not, then item 16708 increments variable i and loops to item 16704. If so, then item 16710 decrements Count and decision 16712 determines whether Count equals variable i. If not, then subroutine 16714 shifts the Array entries above the i-index down one entry location and continues at item 16708. If not, the routine continues at 16708.

FIGS. 168A and 168B are flow diagrams of the Utilities Menu routine. This routine displays the Utility Menu items, inputs the user selection and calls the appropriate utility function. Subroutine 16802 calls OPEN_LTILS_MENU_WINDOW to open the Utility window. Subroutine 16804 calls subroutine GET_MENU_OPTION and returns the option in rv. Decision 16806 determines whether rv is equal to 99. If so, subroutine 16808 calls subroutine CLOSE_MENU_WINDOW and the subroutine returns. If not, decision 16812 determines whether rv is equal to 1. If not, the subroutine continues at decision 16822. If so, decision 16814 determines whether the user level is greater than or equal to 1. If so, subroutine 16816 calls BACKUP and continues at subroutine 16804. If not, the subroutine continues at 16804.

Decision 16822 determines whether rv equals 2. If not, the subroutine continues at decision 16832. If so, decision 16824 determines whether the user level is greater than or equal to 3. If so, subroutine 16826 calls RESTORE and continues at subroutine 16804. If not, the subroutine continues at subroutine 16804.

Decision 16832 determines if rv equals 3. If not, the subroutine continues at 16842. If so, decision 16834 determines whether the user level is greater than or equal to 4. If so, subroutine 16836 calls ERASE_BOARD and continues at subroutine 16804. If not, the subroutine continues at 16804.

Decision 16842 determines whether rv is equal to 4. If not, the subroutine continues at decision 16852. If so, decision 16844 determines whether the user level is greater than or equal to 1. If so, subroutine 16846 calls CLEAR_BOARD and continues at subroutine 16804. If not, the subroutine continues at subroutine 16804.

Decision 16852 determines whether rv is equal to 5. If not, the subroutine continues at decision 16862. If so, decision 16854 determines whether the user level is greater than or equal to 4. If so subroutine 16856 calls ZERO_BOARD and continues at subroutine 16804. If not, the subroutine continues at 16804.

Decision 16862 determines whether rv is equal to 6. If not, the subroutine continues at subroutine 16804. If so, decision 16864 determines whether the user level is greater than or equal to 4. If so, subroutine 16866 calls INSTALL_UPDATE and continues at 16804. (f not, the subroutine continues at 16804.

FIGS. 169A, 169B, 169C and 169D are a flow diagram of the BACKUP subroutine. The subroutine prompts the user for the number of the board to backup and then proceeds to backup the board to a disk file. Subroutine 16902 calls subroutine SELECT_BOARD, which returns a board number in bd. Decision 16904 determines whether bd is equal to 99. If so, the subroutine returns. If not, subroutine 16906 calls PROMPT_DISKETTE, which prompts the user to insert a diskette and returns a value in rc. Decision 16908 determines whether rc is equal to 99. If so, output 16914 displays "backup aborted by user" and returns. If not, subroutine 16910 calls subroutine CHDIR to determine whether the diskette has been inserted and CHDIR returns a value in rc. Decision 16912 determines whether rc is greater than zero. If so, the subroutine loops to subroutine 16906. If not, the subroutine continues at item 16916 on FIG. 169B.

In blocks 16916 through 16930, the subroutine generates a file name for the backup file that is unique. The file name is an eight-character hexadecimal representation of the current system time. The file is given an extension of ".BKP". Item 16916 sets the variable Tries equal to zero. Decision 16918 determines whether Tries is greater than 10. If so, I/O block 16920 displays the message "cannot create backup file; backup aborted" and returns. If not, item 16922 increments Tries. Item 16924 creates a file name using the current time. Block 16926 is a built-in one-second delay. Subroutine 16928 calls subroutine ACCESS, which attempts to access a file with the newly created name and ACCESS returns a value in error. Decision 16930 determines whether the file exists. If the file exists, the subroutine loops to decision 16918. If the file does not exist, the subroutine continues at subroutine 16932 on FIG. 169C.

In blocks 16932 through 16948, the subroutine opens the file and writes out a header. Subroutine 16932 calls FOPEN, which opens the file and returns a value in variable fp. Decision 16936 determines whether the open was successful. If not, I/O block 16938 displays an error message and returns. In blocks 16942 through 16946, the subroutine initializes the header of the file. Item 16940 sets the header to indicate that it is a backup-type file. Subroutine 16942 calls GET_TEXT, which returns a description from the user and puts in into the header. Subroutine 16944 calls the TIME subroutine and stores that time in the header. Item 16946 stores the board number in the header. I/O block 16948 writes the header to the file. The routine then continues to subroutine 16950 on FIG. 169D.

In blocks 16950 through 16958, the subroutine retrieves the backup information from the selected board. The subroutine DO_BACK is called successively to return portions of the backup information, which is then written to disk. Subroutine 16950 calls DO_BACK, which returns a value in bno. Decision 16952 determines whether bno is greater than zero. If not, the subroutine continues at item 16960. If so, I/O block 16954 writes the buffer returned by DO_BACK to disk. Subroutine 16956 calls DO_BACK, which returns a value in bnO. I/O block 16958 displays a message and loops to decision 16952. Item 16960 retrieves the current time to be stored in the file when closed. I/O block 16962 closes the file. I/O block 16968 displays a backup complete message and returns.

FIGS. 170A, 170B, 170C, 170D and 170E are a flow diagram of the RESTORE subroutine. This subroutine retrieves a backup file from the diskette and restores the data on that file onto the selected board. Subroutine 17002 calls PROMPT_DISKETTE, which prompts the user to enter a diskette and returns a value in rc. Decision 17004 determines whether rc equals 99. If so, I/O block 17006 displays a message indicating that the restore has been aborted and returns. If not, subroutine 17008 calls subroutine CHDIR, which checks the directory of the diskette and returns a value in rc. Decision 17010 determines whether rc equals zero, that is, whether any backup-type files are on the diskette. If not, the subroutine loops to subroutine 17002. If so, the subroutine continues at 17012 on FIG. 170B.

In blocks 17012 through 17022, the subroutine calculates the number of backup files on the diskette and allocates an appropriate amount of memory to hold the header of each file. Subroutine 17012 calls DOS_FINDFIRST, which finds the first backup file on the diskette, and DOS_FINDFIRST returns a value in rc indicating whether a backup-type file exists. Item 17014 sets Fcount equal to zero; Fcount will contain the count of the number of backup files on the diskette. Decision 17016 determines whether rc equals zero. If so, item 17018 increments Fcount and subroutine 17020 calls DOS_FINDNEXT, which finds the next backup file on the diskette and returns a value in rc, and the subroutine loops to decision 17016. If not, subroutine 17021 calls MALLOC, which allocates memory for the header of each file. The subroutine then continues to item 17022 on FIG. 170C.

In blocks 17022 through 17034, the subroutine loads the header of each backup file on the diskette into memory. Item 17022 sets Fcount equal to zero. Subroutine 17024 calls DOS_FINDFIRST, which returns a value in rc. Decision 17026 determines whether rc is equal to zero. If not, the subroutine continues at decision 17036 on FIG. 170D. If so, subroutine 17028 calls OPEN-FILE, to open the backup file. I/O block 17030 reads in the header from the open file. I/O block 17031 closes the open file. Item 17032 increments Fcount. Subroutine 17034 calls DOS_FINDNEXT, which returns in rc, and the subroutine loops to decision 17026.

In blocks 17036 through 17072, the subroutine displays the list of backup files on the screen to allow the selection of the backup file to restore. Decision 17036 determines whether Fcount equals zero. If so, I/O block 17038 displays a message that no backup files were found on the diskette and returns. If not, subroutine 17040 calls OPEN_RESTORE_WINDOW. I/O block 17042 displays the list of the files on the screen. Subroutine 17044 calls GET_KEY, which returns the key in variable k. Decision 17046 determines whether the key is a cursor control key. If so, item 17060 adjusts the cursor on the screen and loops to I/O block 17042. If not, decision 17062 determines whether the Escape Key was entered. If so, subroutine 17066 calls CLOSE_WINDOW and I/O block 17068 displays a message that the restore was aborted and returns. If not, decision 17070 determines whether the Return Key was entered. If not, the subroutine loops to I/O block 17042. If so, subroutine 17072 calls CLOSE_WINDOW and continues at subroutine 17074 on FIG. 170E.

In blocks 17074 through 170110, the subroutine inputs the board number of the board to be restored and actually restores the information to the board. Subroutine 17074 calls SELECT_BOARD, which returns the selected board in bd. Decision 17076 determines whether bd equals 99. If so, I/O block 17078 displays a message that the restore has been aborted and subroutine 17088 calls FREE to free-up the allocated memory and returns. If not, I/O block 17090 opens the restore file. I/O block 17092 reads in a record from the restore file. Decision 17098 determines whether the end of the file has been reached. If not, subroutine 170100 calls DO_REST, which restores the record to the selected board and I/O block 170102 displays a restore in progress message and loops to I/O block 17092. If so, item 17094 updates the restore time value in the board statistics. I/O block 170106 closes the restore file. I/O block 170108 displays a restore message. Subroutine 170110 calls FREE, which frees the allocated memory and returns.

FIG. 171 is a flow diagram of the PROMPT_DISKETTE subroutine. This subroutine displays a message on the screen to the effect that the user should insert a diskette. Subroutine 17152 calls OPEN_WINDOW. Subroutine 17154 calls TITLE_WINDOW. Subroutine 17160 calls GET_MENU_OPTION, which returns the option in rv. Subroutine 17162 calls CLOSE_WINDOW. The subroutine then returns the value of rv.

FIG. 172 is a flow diagram of subroutine SELECT_BOARD. The subroutine displays a window and inputs a board number from the user. Subroutine 17202 calls OPEN_WINDOW Subroutine 17204 calls TITLE WINDOW. Subroutine 17206 calls GET_MENU_OPTION, which inputs the board number and returns it in rv. Subroutine 17208 calls CLOSE_WINDOW. The subroutine then returns the board number in rv.

FIG. 173 is a flow diagram of the ERASE_BOARD subroutine. The subroutine inputs a board number from the user and erases the MFK and the KEK from that board. Subroutine 17302 calls GET_BOARD, which returns the board number in bd. Decision 17304 determines whether bd equals zero. If so, the subroutine returns. If not, subroutine 17306 calls ARE_YOU_SURE, which double-checks with the user to ensure the correctness of the board number and returns a value in rv. Decision 17308 determines whether rv equals 99. If so, the subroutine returns. If not, subroutine 17310 calls DO_RESET to reset the keys on the selected board. I/O block 17312 displays a message that the MFK and the KEK have been erased from the selected board and the subroutine returns.

FIG. 174 is a flow diagram of subroutine DO_CWKS. This subroutine performs the CWKS function. The input parameters are board number and key type; the output parameter is cryptogram. Item 17402 formats the CWKS message into a buffer. Subroutine 17404 calls WRITE_DEB, which outputs the buffer to the selected board. The subroutine 17406 calls PRO_DEB, which inputs the response from the selected board. Decision 17408 determines whether an error occurred in the response, from the board. If so, the subroutine returns. If not, subroutine 17410 copies the AH-token into cryptogram. The subroutine returns the cryptogram.

FIG. 175 is a flow diagram of subroutine DO_DESE. This subroutine performs the DESE function. The input parameter is board number, key, and data, and the subroutine returns the encrypted result. Item 17502 formats the DESE message into a buffer. Subroutine 17504 calls WRITE_DEB, which outputs the buffer to the selected board. Subroutine 17506 calls PRO_DEB, which inputs the response from the selected board. Decision 17508 determines whether an error occurred in the response from the board. If so, the subroutine returns. If not, subroutine 17510 copies the AK-token to variable Result. The subroutine returns Result.

FIG. 176 is a flow diagram of subroutine DO_IKEY. This subroutine performs the IKEY function. The input parameters are board number and key type; the output parameter is cryptogram. Item 17602 formats the IKEY message into a buffer. Subroutine 17604 calls WRITE_DEB, which outputs the buffer to the selected board. Subroutine 17606 calls PRO_DEB, which inputs the response from the selected board. Decision 17608 determines whether an error occurred in the response from the board. If so, the subroutine returns. If not, subroutine 17610 copies the AH-token into the variable Cryptogram. The subroutine returns Cryptogram.

FIG. 177 is a flow diagram of subroutine DO_LCDT. This subroutine performs the LCDT function. The input parameters are board number and index number; the output parameter is table. Item 17702 formats the LCDT message into a buffer. Subroutine 17704 calls WRITE_DEB, which outputs the buffer to the selected board. Item 17708 delays two seconds. Subroutine 17710 calls PRO_DEB, which inputs the response from the selected board. Decision 17712 determines whether an error occurred in the response from the board. If so, the subroutine returns a value of 1. If not, the subroutine returns.

FIG. 178 is a flow diagram of subroutine DO_LENT. This subroutine performs the LENT function. The input parameters are board number, index number, key and table. Item 17802 formats the LENT message into a buffer. In blocks 17804 through 17812, the subroutine outputs the buffer, 50 bytes at a time, to the board. Item 17804 initializes the pointer p to point to the buffer and the variable i equal to 1. Item 17806 sets Wlen equal to the maximum of either 50 or the number of bytes left in the buffer. Subroutine 17808 calls WRITE_DEB to output the number of bytes specified by Wlen to the board. Item 17810 increases the pointer p by Wlen. Decision 17812 determines whether the pointer p points to a null character, which indicates the end of the message. If not, the subroutine continues to item 17806. If so, item 17814 delays for three seconds to allow the write to the board to complete. Subroutine 17816 calls PRO_DEB, which inputs the response from the selected board. Decision 17818 determines whether an error occured in the response from the board. If so, the subroutine returns a 1. If not, the subroutine returns a zero.

FIG. 179 is a flow diagram of subroutine DO_LKEY. This subroutine performs the LKEY function. The input parameters are board number, part number and the data to be loaded; the output parameter is the check digits. Item 17902 formats the LKEY message into a buffer. Subroutine 17904 calls WRITE_DEB, which outputs the buffer to the selected board. Subroutine 17906 calls PRO_DEB, which inputs the response from the selected board. Decision 17908 determines whether an error occurred in the response from the board. If so, the subroutine returns. If not, subroutine 17910 copies the AE token into the variable Check_Digits. The subroutine returns Check_Digits.

FIG. 180 is a flow diagram of subroutine DO_LMKT. This subroutine performs the LMKT function. The input parameters are board number, index number, modifier, and cryptogram. Item 18002 formats the LMKT message into a buffer. Subroutine 18004 calls WRITE_DEB, which outputs the buffer to the selected board. Subroutine 18006 calls PRO_DEB, which inputs the response from the selected board. Decision 18008 determines whether an error occurred in the response from the board. If so, the subroutine returns a 1. If not, the subroutine returns a zero.

FIG. 181 is a flow diagram of subroutine DO_RESET. This subroutine performs the reset of the MFK and KEK. The input parameter is the board number. Item 18102 formats a CLWA message into a buffer and sets the BJ-token data equal to a 3 to clear the MFK and KEK. Subroutine 18104 calls WRITE_DEB, which outputs the buffer to the selected board. Item 18108 delays two seconds to allow the board to complete the clearing of the MFK and KEK. Subroutine 18110 calls PRO_DEB, which inputs the response from the selected board. Decision 18112 determines whether an error occurred in response from the board. If so, the subroutine returns a 1. If not, the subroutine returns a zero.

FIG. 182 is a flow diagram of subroutine DO_RKEY. This subroutine performs the RKEY function. The input parameter is board number; the output parameter is RKEY. Item 18202 formats the RKEY message into a buffer. Subroutine 18204 calls WRITE-DEB, which outputs the buffer to the selected board. Subroutine 18206 calls PRO_DEB, which inputs the response from the selected board. Subroutine 18208 finds whether the AK-token is in the response message. Decision 18210 determines whether the token exists. If so, item 18212 copies the AK-token data into RKEY and returns. If not, the subroutine returns.

FIG. 183 is a flow diagram of subroutine DO_S-KEY. This subroutine performs the SKEY function. The input parameter is board number. Item 18302 formats the SKEY message into a buffer. Subroutine 18304 calls WRITE_DEB, which outputs the buffer to the selected board. Item 18306 sets the MFK and KEK check digits to a null value. Subroutine 18308 calls PRO_DEB, which inputs the response from the board. Subroutine 18310 finds the AK-token in the response message. Decision 18312 determines whether such a token exists. If not, the subroutine returns a value zero. If so, subroutine 18314 determines whether an AE-token exists in the response message. Decision 18316 determines whether such a token exists. If not, the subroutine returns a value zero. If so, decision 18318 determines whether the AK-TOKEN data is a 3. If so, item 18320 copies the MFK and the KEK check digits from the AE-TOKEN data and returns a value zero. If not, decision 18322 determines whether the AK-TOKEN data is equal to a 2. If so, item 18324 copies the KEK check digit from the AE-token data and returns a value zero. If not, decision 18326 determines whether the AK-TOKEN data is equal to a 1. If so, item 18328 copies the MFK check digit from the AE-TOKEN data and returns a value of zero. If not, decision 18330 determines whether the AK-TOKEN data is zero. If so, it returns a zero. If not, it returns a zero.

FIGS. 184A, 184B, 184C, 184D, 184D, 184E, and 184F are a flow diagram of the subroutine DO_STAT. This subroutine performs the STAT function. The input parameters are board numbers and reset flag. Decision 18402 determines whether the board is up and running. If not, the subroutine returns. If so, item 18404 sets all the board statistics to zero. Item 18406 sets the board type based on the configuration. Decision 18408 determines whether the variable Reset equals 1. If so, 18410 formats a STAT message with all tokens set to zero and continues at subroutine 18418. If not, decision 18412 determines whether Reset is equal to a 2. If so, item 18414 formats a STAT message with just the ZL-token and ZP-token and continues at subroutine 18418. If not, item 18416 formats a STAT message with all tokens present and none set to zero. Subroutine 18418 calls WRITE_DEB, which outputs the buffer to the selected board and continues at subroutine 18420 in FIG. 184B.

Subroutine 18420 calls PRO_DEB, which inputs the response from the selected board. Decision 18424 determines whether an error occurred in the response from the board. If so, the subroutine returns. If not, subroutine 18426 finds the ZA-token. Decision 18428 determines whether the ZA-token exists. If so, the subroutine continues at 184120 on FIG. 184H. If not, subroutine 18430 finds the ZB-token. Decision 18432 determines whether the ZB-token exists. If so, item 18434 sets the data checksum value to the ZB-token data. If not, subroutine 18436 finds the ZC-token. Decision 18438 determines whether the ZC-token exists. If so, item 18440 sets the program checksum to the ZC-token data Subroutine 18442 finds the ZK-token. Decision 18444 determines whether the ZK-token exists. If so, item 18446 sets the control function count to the ZK-token data. The subroutine continues at subroutine 18448 on FIG. 184C.

Subroutine 18448 finds the ZD-token. Decision 18450 determines whether the ZD-token exists. If so, item 18452 sets the total transaction count to a ZD-token data. Subroutine 18454 finds the ZE-token. Decision 18456 determines whether the ZE-token exists. If so, item 18458 sets the PIN encrypt total to the ZE-token data. Subroutine 18460 finds the ZF-token. Decision 18462 determines whether the ZF-token exists. If so, item 18464 sets the PIN translate count to a ZF-token data. Subroutine 18466 finds the ZG-token. Decision 18468 determines whether the ZG-token exists. If so, item 18470 sets the PIN verify count to the ZG-value. Subroutine 18472 finds the ZH-token. Decision 18474 determines whether the ZH-token exists. If so, item 18476 sets the data function count to the ZH-token data.

Subroutine 18478 finds the ZI-token. Decision 18480 determines whether the ZI-token exists. If so, item 18482 sets the Key Table function count to the ZI-token data. Subroutine 18484 finds the ZJ-token. Decision 18486 determines whether the ZJ-token exists. If so, item 18488 sets the Working Key function count to the ZJ-token data. Subroutine 18490 finds the ZL-token. Decision 18492 determines whether the ZL-token exists. If so, item 18494 sets the error totals to the ZL-token data. Subroutine 18496 finds the ZM-token. Decision 18498 determines whether the ZM-token exists. If so, item 184100 sets the PIN format error count to the ZM-token data. Subroutine 184102 finds the ZN-token. Decision 184104 determines whether the ZN-token exists. If so, item 184106 sets the PIN verifies "Y" count to the ZN-token data. The subroutine then continues to subroutine 184108 on FIG. 184E.

Subroutine 184108 finds the ZO-token. Decision 184110 determines whether the ZO-token exists. If so, item 184112 sets the PIN verifies "N" count to the ZO-token data. Subroutine finds the ZP-token. Decision 184116 determines whether the ZP-token exists. If so, item 184118 sets the time out error count to the ZP-token data. The subroutine then returns.

Referring to FIG. 184H, decision 184120 determines whether the ZA-token data equals zero. If so, item 184122 sets the current mode to solo and returns. If not, decision 184124 determines whether the ZA-token data is equal to 1. If so, item 184126 sets the current mode to master and returns. If not, decision 184128 determines whether the ZA-token data is equal to 2. If so, item 184130 sets the current mode to slave and returns.

FIG. 185 is a flow diagram of subroutine PRO_DEB. This subroutine inputs data from a board. Item 18502 sets variable i equal to zero. Decision 18504 determines whether the board is up. If not, the subroutine returns a zero value. If so, item 18506 sets the board to up. I/O block 18508 reads a character from the board and stores it into a buffer. Decision 18510 determines whether the character just read is the "]". If not, item 18516 increments variable i and loops to I/O block 18508. If so, item 18512 checks to see if an error has occurred. Decision 18514 determines whether an error occurred. If so, the subroutine returns a value zero. If not, the subroutine returns a value of 1.

FIG. 186 is a flow diagram of subroutine CHKERR. This subroutine determines whether an AO-token has been received indicating an error. Item 18602 sets DEB_Error_Code equal to zero. Subroutine 18606 calls FIND_TOKEN to find the AO-token. Decision 18608 determines whether the AO-token exists. If not, the subroutine returns a value of 1. If so, decision 18610 determines whether the AO-token data is equal to "ERROR". If not, the, subroutine returns a zero value. If so, function 18612 calls subroutine FIND TOKEN to find the AM-token, and sets DEB_Error_Code to the return value. Subroutine 18614 calls FIND_TOKEN to find the AN-token and sets DEB_Error_Tok to the return value. Subroutine 18618 calls FIND_TOKEN to find the BB-token and sets DEB_ERROR_MSG to the return value. I/O block 18616 displays an error message indicating that the error-token has been received and returns a value of 1.

FIG. 187 is a flow diagram of subroutine of FIND_TOKEN. This subroutine finds a particular token in the input message. The input parameter is the token to find. Item 18702 sets the pointer to the beginning of the input message buffer. Item 18704 retrieves the first character from the input message. Decision 18706 determines whether the first character is a "[". If not, the subroutine returns a value of 1. If so, subroutine 18708 calls NEXT_TOKEN to retrieve the next token in the input string. Item 18710 compares that next token with the token passed as a parameter to find. Decision 18712 determines whether those tokens are the same. If so, the subroutine, continues at decision 18716. If not, decision 18614 determines whether the next-token is a non-null character; if so, the subroutine loops to subroutine 18708; if not, the subroutine continues at decision 18716. Decision 18716 determines whether the next-token is a non-null character. If so, the subroutine returns a value of 1. If not, the subroutine returns a value of zero.

FIG. 188 is a flow diagram of subroutine NEXT_TOKEN. This subroutine locates the next-token in the input message. The input parameter is a pointer to the input message buffer. Decision 18802 determines whether the pointer points a null value. If so, the subroutine returns a null value. If not, Decision 18804 determines wheher the pointer points to a "]". If so, the subroutine returns a null value. If not, item 18806 sets global variable, which points at current token T_STR, equal to the pointer. Item 18808 set T_DATA, a global variable which points at token data equal to a pointer plus 2. Item 18810 sets T_LEN, a global integer variable is set to the length of token data equal to zero. Decision 18812 determines whether the pointer points to a ";". If not, item 18814 increments the pointer and T_LEN and loops to decision 18812. If so, the subroutine returns the pointer plus 1.

FIGS. 189, 190 and 191 are flow diagrams of the window management subroutines. The subroutines invoke the utility routines of the "Window Boss" system by Star Guidance Consulting. Referring to FIG. 189, subroutine 18902 calls WN OPEN, which is a Window Boss routine that opens a window and returns the pointer to the window in WN. Decision 18904 determines whether WN is equal to null. If so, the subroutine returns with the value WN. If not, decision 18906 determines if window count is greater than zero. Window count indicates the number of windows currently open. Window count is also an index into an array named Open_Windows. Open_Windows contains the pointer to each window that is currently open in the system. The subroutine uses Open_Windows as a stack. If the result of decision 18906 is yes, subroutine 18908 calls WN_SINGLE_BORDER, pointing to the top window in the stack. This is a window boss subroutine which puts a single border around the window. Subroutine 18910 calls WN_RETITLE, pointing to the top window in the stack, which is a window boss subroutine which retitles the window and subroutine continues at item 18912. If the result of decision 18906 is no, item 18912 pushes the pointer to the newly opened window onto the stack. Subroutine 18914 calls WN_DOUBLE_BORDER, with the pointer pointing to the newly opened window. This is a Window Boss subroutine which puts a double border around the window. Item 18916 increments the window count and returns with the value of the WN.

FIG. 190 is a flow diagram of subroutine CLOSE_WINDOW. This subroutine closes the last open window. The input parameter is the pointer to the last open window. Decision 19002 determines whether WINDOW_COUNT is equal to zero. If so, an internal error has occurred and I/O block 19004 outputs a message and exits the program. If not, decision 19006 determines whether the passed window pointer is equal to the window pointer at the top of the stack. If not, there is an internal error and I/O block 19004 outputs the message and exits the program. If so, subroutine 19008 calls WN_CLOSE, which is a Window Boss routine to close the window. Item 19010 decrements WINDOW_COUNT. Decision 19012 determines whether the WINDOW_COUNT is greater than zero. If not, the subroutine returns. If so, subroutine 19014 calls DOUBLE_BORDER with the pointer of the top window in the stack. This is a Window Boss subroutine which puts a double border on the window. Subroutine 19016 calls RETITLE_WINDOW pointing to the top window in the stack. This is a Window Boss routine which retitles the window. The subroutine then returns.

FIG. 191 is a flow diagram of subroutine CLOSE_WINDOWS. This subroutine closes all the windows that are currently open. Item 19102 sets the variable In_Help to false. Decision 19104 determines whether WINDOW_COUNT is greater than zero. If not, the subroutine returns. If so, subroutine 19106 calls WN_CLOSE, with a parameter pointing to the top window in the stack. Item 19108 decrements WINDOW_COUNT and loops to decision 19104.

FIG. 192 is a flow diagram of subroutine SHOW_MODE. This subroutine displays the user level on the screen. Item 19202 formats a message with the user level in it. I/O block 19204 outputs the buffer to the screen and returns.

FIG. 193 is a flow diagram of subroutine CHANGE_MODES. This subroutine allows the user to change the user level. 19302 determines if the current user level is greater than zero. If so, item 19304 sets user level equal to zero and subroutine 19308 calls SHOW_MODE and returns. If not, item 19310 sets variable Nohot equal to 1. Item 19312 copies the string "Login" to the Help Key word. I/O block 19314 displays a message to please enter the password. Subroutine 19316 calls GET_TEXT to input the password. Decision 19118 determines whether the password has a length equal to zero. If so, the subroutine continues at item 19346. If not, item 19320 pads the password with blank spaces. Subroutine 19322 calls an encryption routine to encrypt the password. Item 19324 sets variable i equal to the maximum number of user levels. Decision 19326 determines whether the encrypted password is equal to the encrypted password for variable i minus 1. If so, the subroutine continues at item 19342. If not, item 19328 decrements variable i. Decision 19330 determining whether variable i is greater than zero. If so, the subroutine loops to decision 19326. If not, I/O block 19332 outputs an invalid password message. Item 19334 increments Bad_Tries. Decision 19346 determines whether Bad_Tries is greater than 2. If so, I/O block 19338 outputs a message indicating that there will be a delay due to repeated invalid password entries and item 19340 delays for 30 seconds before looping back to subroutine 19316. If not, the subroutine loops back to 19316.

Item 19342 sets user level equal to variable i. Item 19344 sets Bad_Tries equal to zero. Item 19346 sets Nohot equal to zero. I/O block 19348 clears the description at the bottom of the screen. Subroutine 19350 calls SHOW_MODE and returns.

FIGS. 194A, 194B, 194C, 194D and 194E are a flow diagram of subroutine GETKEY. This subroutine inputs a key from the keyboard and returns the key. This subroutine determines whether the key was a special function key and takes appropriate action. This subroutine is passed a wait flag as an input parameter. The wait flag indicates that this subroutine should not wait for a key to be depressed, should wait a brief period for a key to be depressed, or should wait a long period for a key to be depressed. Decision 19402 determines whether a key has been pressed. If so, the routine continues at subroutine 19406. If not, decision 19404 determines whether the wait flag indicates no wait. If so, the subroutine returns a value zero. If not, the subroutine continues at subroutine 19406. Subroutine 19406 sets the variable Now equal to the current time. Decision 19408 determines whether a key has been pressed. If so, the subroutine continues at subroutine 19418 on FIG. 194B. If not, decision 19410 determines whether the wait flag indicates a brief wait. If not, the subroutine continues at decision 19414. If so, decision 19412 determines whether 10 seconds have elapsed since the subroutine was entered. If so, the subroutine returns a value of zero. If not, the subroutine continues at decision 19414. Decision 19414 determines whether the subroutine has been waiting for a key to be pressed that is longer than the system idle time-out parameter. If not, the subroutine continues at decision 19408. If so, the subroutine jumps to the Status Option of the Main Menu.

Referring now to FIG. 194B, subroutine 19418 reads the key into the variable Key. Subroutine 19420 reads a keyboard modifier into the Key_Mode variable. Ttem 19422 sets Alt_Flag to the status of the Alt Key. Decision 19424 determines if In_Help equals zero and In_Status equals zero. If so, item 19426 calls CLEAR_STS. Item 19428 sets the Scan_Code variable to the scan code of the key pressed and continues at decision 19430 of FIG. 194C.

Referring to FIG. 194C, decision 19430 determines whether the Alt_Flag is greater than zero. If not, the subroutine continues at 19464 on FIG. 194D. If so, decision 19432 determines whether Nohot equals 1. If so, the subroutine loops to decision 19408 on FIG. 194A. If not, decision 19434 determines whether the scan code indicates a "K". If so, subroutine 19436 calls CLOSE_WINDOWS and subroutine 19438 jumps to the Keys section of the Main Menu. If not, decision 19440 determines whether the scan code indicates a zero was pressed. If so, 19442 calls CLOSE_WINDOWS, and subroutine 19444 jumps to the Opttions section of the Main Menu. If not, 19446 determines whether the scan code indicates a "U" was pressed. If so, subroutine 19448 calls CLOSE_WINDOWS and subroutine 19450 jumps to the Utilities section of the Main Menu. If not, decision 19452 determines whether the scan code indicates that an "S" was pressed. If so, subroutine 19454 calls CLOSE_WINDOWS and subroutine 19456 jumps to the Status section of the Main Menu. If not, decision 19458 determines whether the scan code indicates a "Q" was pressed. If so, subroutine 19460 calls CLOSE_WINDOWS and subroutine 19462 jumps to the Quit section of the Main Menu. If not, the subroutine continues at decision 19464 on FIG. 194D.

Referring to FIG. 194D, decision 19464 determines whether scan code indicates the Fl-key was pressed. If not, the subroutine continues at decision 19478. If so, decision 19466 determines whether In_Help is greater than zero. If so, the subroutine jumps to decision 19408 on FIG. 194A. If not, item 19468 sets In_Help equal to 1. Item 19470 initializes the help buffer. Subroutine 19472 calls HELP. I/O block 19474 empties the keyboard buffer. Item 19476 sets In_Help equal to zero and loops to decision 19408 on FIG. 194A. Decision 19478 determines whether the scan code indicates the F2 key was pressed. If not, then subroutine continues at decision 19488 on FIG. 194E. If so, decision 19480 determines whether In_Info is greater than zero. If so, the subroutine loops to decision 19408 on FIG. 194A. If not, item 19482 sets In_Info equal to 1. Subroutine 19484 calls subroutine INFO. Item 19486 sets In_Info equal to zero and continues at decision 19488 on FIG. 194E.

Referring to FIG. 194E, decision 19488 determines whether the scan code indicates that the F9-key was pressed. If not, the subroutine continues at decision 19498. If so, decision 19490 determines whether In_Changemode is greater than zero. If so, the subroutine loops to decision 19408 on FIG. 194A. If not, item 19492 sets In_Changemode equal to 1. Subroutine 19494 calls CHANGE MODES. Item 19496 sets In_Changemode equal to zero and loops to decision 19408 on FIG. 194A. Decision 19498 determines whether the scan code indicates that the F10-key was pressed. If so, subroutine !94100 calls CLOSE_WINDOWS and subroutine 194102 jumps to the Main Menu. If not, decision 194104 determines whether Shift_Flag is equal to a 1. If so, subroutine 194106 calls TOLOWER to downshift the key and returns the key. If not, decision 194108 determines whether Shift_Flag equals 2. If so, subroutine 194110 calls TOUPPER to upshift the key. If not, the subroutine returns the key.

FIGS. 143A, 143B, 143C and 195 through 206 are a flow diagram of the KEYSMENU subroutine. This subroutine inputs the Keys Option and performs that option. FIGS. 143A, 143B and 143C are a flow diagram of the portion of the subroutine which decodes the option selected. Referring to FIG. 143A, subroutine 14302 calls OPEN_MENU_WINDOW. Subroutine 14304 calls GET_MENU_OPTION, which returns the user input in rv. Decision 14306 determines whether rv equals 1. If so, the subroutine continues at decision 19502 of FIG. 195. If not, decision 14308 determines whether rv equals 2. If so, the subroutine continues at decision 19602 on FIG. 192. If not, decision 14310 determines whether rv equals 3. If so, the subroutine continues at decision 19702 on FIG. 19702. If not, decision 14212 determines whether rv equals 4. If so, the subroutine continues at decision 19802 on FIG. 198. If not, the subroutine continues at decision 14314 of FIG. 143B.

Referring to FIG. 143B, decision 14314 determines whether rv equals 5. If so, the subroutine jumps to decision 19202 on FIG. 199. If not, decision 14316 determines whether rv equals 6. If so, the subroutine jumps to decision 20002 on FIG. 200. If not, decision 14318 determines whether rv equals 7. If so, the subroutine jumps to decision 20102 on FIG. 201. If not, decision 14320 determines whether rv equals 8. If so, the subroutine jumps to decision 20202 on FIG. 202. If not, decision 14322 determines whether rv equals 9. If so, the subroutine jumps to subroutine 20302 on FIG. 203. If not, the subroutine continues at decision 14324 on FIG. 143C.

Referring to FIG. 143, decision 14324 determines whether rv equals 10. If so, the subroutine jumps to subroutine 20402 on FIG. 204. If not, decision 14326 determines whether rv equals 11. If so, the subroutine jumps to subroutine 20502 on FIG. 205. If not, the subroutine determines whether rv equals 99. If not, the subroutine jumps to subroutine 14304 on FIG. 143A. If so, subroutine 14330 calls CLOSE_WINDOW and returns.

Referring now to FIG. 195, decision 19502 determines whether user level is less than 1. If so, subroutine 19504 calls CLOSE_WINDOW and the subroutine returns. If not, subroutine 19506 calls a subroutine to prompt the user for the active group and returns the value in variable i. Decision 19508 determines whether the active group is less than 1 or greater than the maximum number of boards. If so, I/O block 19510 displays an invalid group message and the subroutine returns. If not, item 19512 sets variable j equal to zero. Decision 19514 determines whether variable j is less than MAX_BOARDS. If not, the subroutine continues at decision 19522. If so, decision 19516 determines whether the indicated by variable j is in the group indicated by variable i. If not, item 14518 increments variable j and loops to decision 19514. If so, item 19520 sets Active_Group equal to variable i and sets variable i equal to zero. Decision 19522 determines whether variable i is greater than zero. If so, I/O block 19524 displays a message indicating that there are no boards configured for the specified group and the subroutine returns. If not, the subroutine returns.

Referring now to FIGS. 196 through 202, these routines work in a similar manner, except that there is one routine for each key type. Specifically, the routine of FIG. 196 processes MFK; the routine of FIG. 197 processes KEK; the routine of FIG. 198 processes PVK; the routine of FIG. 199 processes KEK; the routine of FIG. 200 processes PEK; the routine of FIG. 201 processes MAK; the routine of FIG. 202 processes DEK.

Referring to FIG. 196, decision 19602 determines whether the user level is less than 4. If so, subroutine 19604 calls CLOSE_WINDOW and the subroutine returns. If not, subroutine 19606 calls WARN_NOBOARDS. Decision 19608 determines whether any boards are up. If not, subroutine 19604 calls CLOSE_WINDOW and the subroutine returns. If so, item 19610 sets key type equal to MFK and the routine continues at subroutine 20602 in FIG. 206.

Referring now to FIG. 203, subroutine 20302 calls WARN_NOBOARDS. Decision 20304 determines whether any boards are up. If so, subroutine 20406 calls LOAD_KEYTABLE. The subroutine then continues at subroutine 14304 on FIG. 143A.

Referring now to FIG. 204, subroutine 20402 calls WARN_NOBOARDS. Decision 20404 determines whether any boards are up. If so, subroutine 20406 calls LOAD_DIEBOLD_TABLE_. The subroutine then continues at subroutine 14304 in FIG. 143A.

Referring now to FIG. 205, subroutine 20502 calls WARN_NOBOARDS. Decision 20504 determines whether any boards are up. If so, subroutine 20506 calls DO_RKEY and I/O block 20508 displays the resulting random value. The subroutine then continues at subroutine 14304 on FIG. 143A.

Referring now to FIG. 206, subroutine 20602 calls GET_KEY, which returns the key in rc. Decision 20604 determines whether rc indicates the Accept Key. If not, the subroutine continues at subroutine 14304 on FIG. 143A. If so, decision 20606 determines whether rv equals 2. If not, the subroutine continues at decision 20610. If so, subroutine 20608 calls DO_IKEY for each board in the active group. I/O block 20616 then displays the resulting cryptogram and the subroutine loops to subroutine 14304 on FIG. 143A. Decision 20610 determines whether rv equals 3. If not, subroutine 20614 calls DO_CWKS for each active board in the group and I/O block 20616 displays the resulting cryptogram and loops to subroutine 14304 in FIG. 143A. If so, subroutine 20612 calls DO_IKEY with key type equal to each active board in the group and I/O block 20616 displays the results of the encryptogram and loops to subroutine 14304 in FIG. 143A.

In summary, an improved multi-channel, fault-tolerant data encryption device having a menu-driven, user-friendly interface and improved tokenized message format has been described. Accordingly, other uses and modifications will be apparent to a person of ordinary skill in the art and all of such uses and modifications are intended to fall within the scope of the appended claims.

APPENDIX 1
CONTROL FUNCTIONS

ECHO-Echo Test

This command performs an echo test to verify that the Data Encryption Board's communication lines are functioning. When the board is working properly, ECHO messages you send to the board are returned intact, with a version number appended to the end.

REQUEST FORMAT

| Token | Length | Char | Definition |
|---|---|---|---|
| AO | 4 | ECHO | Function number |
| AG | variable | xx | Message to be echoed |

RESPONSE FORMAT

| Token | Length | Char | Definition |
|---|---|---|---|
| AO | 4 | ECHO | Response ID |
| BC | 4 | xx | Revision number (e.g., "v1.0") |
| AG | variable | xx | Message echoed |

Syntax:

REQUEST: [AOECHO;AGMESSAGE TEST;]
REPLY: [AOECHO;BCvx.x;AGMESSAGE TEST;]

Examples:

[AOECHO;AGThis message is testing the ECHO function;]
[AOECHO;BCV2.0;AGThis message is testing the ECHO function;]

Comments:

A maximum of 255 characters allowed for token AG.

All characters allowed except for delimiter (semicolon).

TDLY-Transmit Delay

The Data Encryption Board can usually respond to a host computer faster than the host can receive information. Because of this, when the host receives messages from the board it can lose characters. This command sets a fixed delay before messages are transmitted from the Data Encryption Board to the host computer, assuring that the host can keep up with the messages. Since the best delay time for your system must be found by trial and error, the ECHO function is a useful tool for experimenting with delay times.

REQUEST FORMAT

| Token | Length | Char | Definition |
|---|---|---|---|
| AO | 4 | TDLY | Function number |
| BA | 3 | 0-9 | Delay time in milliseconds. |

RESPONSE FORMAT

| Token | Length | Char | Definition |
|---|---|---|---|
| AO | 4 | TDLY | Response ID |
| BA | 3 | 0-9 | Delay time in milliseconds. |

Syntax:

REQUEST: [AOTDLY;BAxxx;]
REPLY: [AOTDLY;BAxxx;]

REQUEST: [AOTDLY;BAxxx;AGContext Field;]
REPLY: [AOTDLY;BAxxx;AGContext Field;]

Comments:

Delay time remains in effect until changed, and stays in memory during a power-down.

The default delay time is 1 millisecond.

The maximum delay time is 255 milliseconds.

CCDL-Change Check Digit Length

This command changes the number of check digits returned in the check digit field of the response message. You can set the check digit length to any number of characters from 1 to 8.

REQUEST FORMAT

| Token | Length | Char | Definition |
|---|---|---|---|
| AO | 4 | CCDL | Function |
| AD | 3 | 1-8 | Check digit length |

RESPONSE FORMAT

| Token | Length | Char | Definition |
|---|---|---|---|
| AO | 4 | CCDL | Function |
| AD | 3 | 1-8 | Check digit length |

Syntax:

REQUEST: [AOCCDL;ADx;]
REPLY: [AOCCDL;ADx;]

REQUEST: [AOCCDL;ADx;AGContext Field;]
REPLY: [AOCCDL;ADx;AGContext Field;]

Comments:

Check digit length defaults to 4.

CLWA-Clear MFK or KEK Work Area

If you ever need to send your encryption board out of a secure environment (for example, if it needs servicing) you should not leave important keys in the board. This function clears the MFK and/or KEK keys in the Data Encryption Board.

REQUEST FORMAT

| Token | Length | Char | Definition |
|---|---|---|---|
| AO | 4 | CLWA | Function |
| BJ | 1 | 1-3 | MFK = 1<br>KEK = 2<br>Both = 3 |

RESPONSE FORMAT

| Token | Length | Char | Definition |
|---|---|---|---|
| AO | 4 | CLWA | Function |
| BJ | 1 | 1-3 | MFK = 1<br>KEK = 2<br>Both = 3 |

Syntax:

REQUEST: [AOCLWA;BJx;]
REPLY: [AOCLWA;BJx;]

Examples:

[AOCLWA;BJ3;]
[AOCLWA;BJ3;]

Comments:

This function only works with the KIS software.

IKEY-Inject MFK or KEK

This function injects the MFK or KEK into the Data Encryption Board. It loads the entire key, unlike LKEY, the function that loads key parts into the board.

REQUEST FORMAT

| Token | Length | Char | Definition |
|---|---|---|---|
| AO | 4 | IKEY | Function |
| BJ | 1 | 1,2 | MFK = 1<br>KEK = 2 |
| AK | 10 | 0-9 | Date |

RESPONSE FORMAT

| Token | Length | Char | Definition |
|---|---|---|---|
| AO | 4 | IKEY | Function |
| BJ | 1 | 1,2 | MFK = 1<br>KEK = 2 |
| AH | 16 | 0-F | Cryptogram of injected Key |
| AK | 10 | 0-9 | Date |

Syntax:

```
REQUEST:  [AOIKEY;BJx;AKxxxxxxxxxx;]
REPLY:    [AOIKEY;BJx;AHxxxxxxxxxxxxxxxx;AKxxxxxxxxxx;]
```

Examples:

```
[AOIKEY;BJ1;AK0525881122;]
[AOIKEY;BJ1;AH36A124F0EC665866;AK1115881122;]

[AOIKEY;BJ2;AK0525881122;]
[AOIKEY;BJ2;AHBE85067E9AE4C049;AK1129881122;]
```

Comments:

This function only works with KIS software.

SKEY-Status of MFK and KEK

This function returns the status of the MFK and KEK, so that You can determine whether they are in the board or if they have been changed.

REQUEST FORMAT

| Token | Length | Char | Definition |
|---|---|---|---|
| AO | 4 | SKEY | Function |

RESPONSE FORMAT

| Token | Length | Char | Definition |
|---|---|---|---|
| AO | 4 | IKEY | Function |
| AK | 1 | 0-3 | 0 = MFK and KEK cleared<br>1 = MFK present<br>2 = KEK present<br>3 = MFK & KEK present |
| AE | 4-8 | 0-F | Check digits of MFK and/or KEK if present |

Syntax:

REQUEST: [AOSKEY;]
REPLY: [AOSKEY;AKx;AExxxxxxxx;]

Examples:

[AOSKEY;]
[AOSKEY;AK3;AE0C7FC133;]

RKEY-Random Key Generation

This function creates pseudo-random data.

REQUEST FORMAT

| Token | Length | Char | Definition |
|---|---|---|---|
| AO | 4 | RKEY | Function |

RESPONSE FORMAT

| Token | Length | Char | Definition |
|---|---|---|---|
| AO | 4 | RKEY | Function |
| AK | 16 | 0-F | Random data |

Syntax:

REQUEST: [AORKEY;]
REPLY: [AORKEY;AKxxxxxxxxxxxxxxxx;]

Examples:

[AORKEY;]
[AORKEY;AK26C1A3206BBA6AF2;]

DESE-DES Encryption

This function encrypts data under the Data Encryption Standard (DES) data algorithm. Results from a DESE function can be reversed by using DESD, the decrypt function.

REQUEST FORMAT

| Token | Length | Char | Definition |
|---|---|---|---|
| AO | 4 | DESE | Function |
| BS | 16 | 0-F | Encryption Key |
| AK | 6 | 0-F | Data to be encrypted |

RESPONSE FORMAT

| Token | Length | Char | Definition |
|---|---|---|---|
| AO | 4 | DESE | Function |
| BS | 16 | 0-F | Encryption Key |
| AK | 16 | 0-F | Encrypted data |

Syntax:

REQUEST: [AODESE;BSxxxxxxxxxxxxxxxx;AKxxxxxxxxxxxxxxxx;]
REPLY: [AODESE;BSxxxxxxxxxxxxxxxx;AKxxxxxxxxxxxxxxxx;]

Examples:

[AODESE;BSD768C70F203C8D01;AKBF967CF18C518527;]
[AODESE;BSD768C70F203C8D01;AK16858891B8D7AA57;]

Comments:

You can also use DESE to verify that a board is properly executing the DES algorithm. Using prepared test data available from The National Bureau of Standards, compare test results to predicted results to analyze board performance.

DESD-DES Decryption

This function decrypts data under the 'DES' data algorithm. results from the encrypt function, DESE, sent through the DESD function should yield the original clear text.

REQUEST FORMAT

| Token | Length | Char | Definition |
|---|---|---|---|
| AO | 4 | DESD | Function |

| | | | |
|---|---|---|---|
| BS | 16 | 0-F | Decryption Key |
| AK | 16 | 0-F | Data to be decrypted |

RESPONSE FORMAT

| Token | Length | Char | Definition |
|---|---|---|---|
| AO | 4 | DESD | Function |
| BS | 16 | 0-F | Decryption Key |
| AK | 16 | 0-F | Decrypted data |

Syntax:

REQUEST: [AODESD;BSxxxxxxxxxxxxxxxx;AKxxxxxxxxxxxxxxxx;]
REPLY: [AODESD;BSxxxxxxxxxxxxxxxx;AKxxxxxxxxxxxxxxxx;]

Examples:

[AODESD;BSBF967CF18C518527;AKD768C70F203C8D01;]
[AODESD;BSBF967CF18C518527;AK4BB4B5B0D9F8CBD1;]

LKEY-Load Key

This function loads key parts into the Data Encryption Board.

REQUEST FORMAT

| Token | Length | Char | Definition |
|---|---|---|---|
| AO | 4 | LKEY | Function |
| BJ | 1 | 1-9 | Part number |
| AK | 16 | 0-F | Data to be loaded |

RESPONSE FORMAT

| Token | Length | Char | Definition |
|---|---|---|---|
| AO | 4 | LKEY | Function |
| BJ | 1 | 0-F | Part number |
| AE | 4 | 0-F | Check digits |

Syntax:

REQUEST: [AOLKEY;BJx;AKxxxxxxxxxxxxxxxx;]
REPLY: [AOLKEY;BJx;AExxxx;]

Examples:

[AOLKEY;BJ1;AK1111AAAA1111AAAA;]
[AOLKEY;BJ1;AE0C7F;]

[AOLKEY;BJ1;AK2222BBBB2222BBBB;]
[AOLKEY;BJ1;AEC133;]

Comments:

This function works only with the KIS software.

A BJ of 1 (defining keys as only having one part) initializes the LKEY area.

REQUEST FORMAT

| Token | Length | Char | Definition |
|---|---|---|---|
| AO | 4 | CWKS | Function |
| AS | 1 | 0-F | Specified Modifier<br>0 = KEK<br>1 = KPE<br>2 = KC<br>3 = KMAC<br>4 = KPV<br>5 = ATM |

RESPONSE FORMAT

| Token | Length | Char | Definition |
|---|---|---|---|
| AO | 4 | CWKS | Function |
| AH | 16 | 0-F | Cryptogram |

Syntax:

REQUEST: [AOCWKS;ASx;]
REPLY: [AOCWKS;AHxxxxxxxxxxxxxxxx;]

Examples:

[AOCWKS;AS4;]
[AOCWKS;AH2D048A8DE0CFFDAE;]

Comments:

Before you can execute a CWKS, you must first load the working area by doing the LKEY function.

This function works only with the KIS software.

STAT-Status of Data Encryption Board

This function returns the status of different parameters in the DEB.

REQUEST FORMAT

| Token | Length | Char | Definition |
|---|---|---|---|
| AO | 4 | STAT | Function |
| ZA** | 1 | 0-2 | DEB type<br>0 = Alone<br>1 = Master<br>2 = Slave |

** Optional

RESPONSE FORMAT

| Token | Length | Char | Definition |
|---|---|---|---|
| AO | 4 | STAT | Function |
| ZA | 1 | 0-2 | DEB type<br>0 = Alone<br>1 = Master<br>2 = Slave |
| ZB | 4 | 0-F | 2 byte checksum data area,MFK,KEK,Index, Diebold |
| ZC | 4 | 0-F | 2 byte checksum program area |
| ZD | 8 | 0-F | Total number of Requests |
| ZE | 8 | 0-F | PIN encrypts |
| ZF | 8 | 0-F | PIN translate |
| ZG | 8 | 0-F | PIN verification |
| ZH | 8 | 0-F | Data Functions |
| ZI | 8 | 0-F | Key Table Functions |
| ZJ | 8 | 0-F | Working Key Functions |
| ZK | 8 | 0-F | Control Functions |
| ZL | 8 | 0-F | Error Totals |
| ZM | 8 | 0-F | IN Sanity Errors |
| ZN | 8 | 0-F | presently not defined |
| ZO | 8 | 0-F | PIN 'N' |
| ZP | 8 | 0-F | Timeout Errors |

Syntax:

REQUEST: [AOSTAT;ZA;ZD;ZB;]
REPLY: [AOSTAT;ZA0;ZDxxxxxxxx;ZBxxxx;]

Examples:

[AOSTAT;ZA;ZB;ZC;ZD;ZE;ZF;ZG;ZH;ZI;ZJ;ZK;ZL;ZM;ZN;ZO;ZP;]
[AOSTAT;ZA0;ZB6E44;ZC3321;ZD94123;ZE5602;ZF16ABE;ZG1A027;
ZH0;ZI0;ZJ0;ZKC;ZL56;ZMC0E;ZN0;ZOFCB;ZP0;]

CRYP-Cryptogram of Last Key

This function gives you the cryptogram of the last key injected. CRYP proves especially useful if you haven't loaded any keys in a while and are unsure of what key is in the board now. It also helps you verify that no one else has been trying to load key parts.

REQUEST FORMAT

| Token | Length | Char | Definition |
|---|---|---|---|
| AO | 4 | CRYP | Function |

RESPONSE FORMAT

| Token | Length | Char | Definition |
|---|---|---|---|
| AO | 4 | CRYP | Function |
| AH | 16 | 0-F | Cryptogram of last key injected |
| AK | 10 | 0-9 | Date |

Syntax:

REQUEST: [AOCRYP;]
REPLY: [AOCRYP;AHxxxxxxxxxxxxxxxx;AKxxxxxxxxxx;]

Examples:

[AOCRYP;]
[AOCRYP;AHBE85067E9AE4C049;AK0525881122;]

Comments:

This function works only with the KIS software.

LCDT-Load Clear Diebold Number Table

(Need some explanatory text here, Mike!)

REQUEST FORMAT

| Token | Length | Char | Definition |
|---|---|---|---|
| AO | 4 | LCDT | Function |
| BR | 1-3 | 0-F | Table Index |
| AK | 512 | 0-F | Diebold Number Table |

RESPONSE FORMAT

| Token | Length | Char | Definition |
|---|---|---|---|
| AO | 4 | 86 | Response ID |
| BR | 1-3 | 0-9 | Last Internal Table Index used for the Diebold Number Table |

Syntax:

REQUEST: [AOLCDT;BRxxx;AKxxxx....xxxx;]
REPLY: [AOLCDT;BRxxx;]

REQUEST: [AOLCDT;BRxxx;AKxxxx....xxxx;]-Table Index
REPLY: [AOLCDT;BRxxx;]

REQUEST: [AOLCDT;BRxxx;AKxxxx....xxxx;AGContext Field;]
REPLY: [AOLCDT;BRxxx;AGContext Field;]

Examples:

[AOLCDT;BR1;BOCB2A218EFAA6975311D6BE732647BCF04E2D89EE62F4B
85FDDD0AB3564EB9A0B3A6DC933AD41FBD87987385714A967FF5A28DB24
05DFC4C0EA3E037B0994CC4618759BB44AC8AF4200F6A2E2398DB088783
6DC8659A7F95C1681A0FD319F7008E8CF56931AC7E499CAA41CE6C36AD4
B585E396451FCB190DE19206B6F73284803F729D1DDE22B16E2F5DBBE0E
FF1837D8B90C148B22CAE2002F337A32555ECAC6C98430AD5AA4CBA44D7
3C8FBF491227A568F2652E9CD3BD63507EF560B730E99E7754DAC51034D
97FEDA1661EB9D117C23DF8C682E50E404F1571FE91230151E72BA8077C
586B3BCE6F4D8DFCD27A5E29951352CD76046169B31B5B740C8A0F;]
[AOLCDT;BR01;]

[AOLCDT;BR5;BOCB2A218EFAA6975311D6BE732647BCF04E2D89EE62F4B
85FDDD0AB3564EB9A0B3A6DC933AD41FBD87987385714A967FF5A28DB24
05DFC4C0EA3E037B0994CC4618759BB44AC8AF4200F6A2E2398DB088783
6DC8659A7F95C1681A0FD319F7008E8CF56931AC7E499CAA41CE6C36AD4
B585E396451FCB190DE19206B6F73284803F729D1DDE22B16E2F5DBBE0E
FF1837D8B90C148B22CAE2002F337A32555ECAC6C98430AD5AA4CBA44D7
3C8FBF491227A568F2652E9CD3BD63507EF560B730E99E7754DAC51034D
97FEDA1661EB9D117C23DF8C682E50E404F1571FE91230151E72BA8077C
586B3BCE6F4D8DFCD27A5E29951352CD76046169B31B5B740C8A0F;]
[AOLCDT;BR05;]

[AOLCDT;BR09;BOCB2A218EFAA6975311D6BE732647BCF04E2D89EE62F4
B85FDDD0AB3564EB9A0B3A6DC933AD41FBD87987385714A967FF5A28DB2
405DFC4C0EA3E037B0994CC4618759BB44AC8AF4200F6A2E2398DB08878
36DC8659A7F95C1681A0FD319F7008E8CF56931AC7E499CAA41CE6C36AD
4B585E396451FCB190DE19206B6F73284803F729D1DDE22B16E2F5DBBE0
EFF1837D8B90C148B22CAE2002F337A32555ECAC6C98430AD5AA4CBA44D
73C8FBF491227A568F2652E9CD3BD63507EF560B730E99E7754DAC51034
D97FEDA1661EB9D117C23DF8C682E50E404F1571FE91230151E72BA8077
C586B3BCE6F4D8DFCD27A5E29951352CD76046169B31B5B740C8A0F;AG
Authorized by Carrington;]
[AOLCDT;BR09;AGAuthorized by Carrington;]

WORKING KEY FUNCTIONS

GWKS-Generate Working Key

GWKS generates a random key, then presents it in cryptogram form.

REQUEST FORMAT

| Token | Length | Char | Definition |
|---|---|---|---|
| AO | 4 | GWKS | Function |
| AS | 1 | 0-F | The modifier of the MFK and KEK to use. |
| AP | *16 | 0-F | The KEK of the network node which has been encrypted under modifier 0 of the MFK. |

RESPONSE FORMAT

| Token | Length | Char | Definition |
|---|---|---|---|
| AO | 6 | GWKS- | Function |
| B | 16 | 0-F | The created working key encrypted under specified modifier of MFK. |
| BH | 16 | 0-F | The created working key encrypted under specified modifier of KEK. |
| AE | 4 | 0-F | Check digits |

Syntax:

REQUEST: [AOGWKS;ASx;APxxxxxxxxxxxxxxxx;]
REPLY: [AOGWKS;BGxxxxxxxxxxxx|xxxx;BHxxxxxxxxxxxxxxxx;
AExxxx;]

REQUEST: [AOGWKS;ASx;APBDxxx;]
REPLY: [AOGWKS;BGxxxxxxxxxxxxxxxx;BHxxxxxxxxxxxxxxxx;
AExxxx;]

REQUEST: [AOGWKS;ASx;APxxxxxxxxxxxxxxxx;AGContext Field;]
REPLY: [AOGWKS;BGxxxxxxxxxxxxxxxx;BHxxxxxxxxxxxxxxxx;
AExxxx;AGContext Field;]

Examples:

[AOGWKS;AS1;APD768C70F203C8D01;]
[AOGWKS;BG7F3B6B93B09DAAA5;BH36E5C4DA9A2E7EFB;AEBA8C;]

Comments:

Token AS must precede token AP in all uses of GWKS, since the DEB board should know what modifier to use before it encrypts the key you pass it. For maximum security, keys should be separated according to their intended use. Therefore, each type of key is encrypted under a different modifier of the MFK or KEK, fixed as follows: No modifier = MFK; 0 = Key Exchange Key (KEK); 1 = PIN Encryption Key (PEK); 2 = Data Encryption Key (DEK); 3 = Message Authentication Key (MAK); 4 = PIN Verification Key (PVK); and 5 = ATM Key.

TWKD-Translate Working Key for Distribution

By changing the modifier under which a key is encrypted, this command translates a working key from encryption under the MFK to encryption under a KEK for transmission to another network.

REQUEST FORMAT

| Token | Length | Char | Definition |
|---|---|---|---|
| AO | 4 | TWKD | Function |
| AS | 1 | 0-F | The modifier of the MFK and KEK to use. |
| AP | *16 | 0-F | The KEK of the network node which has been encrypted under modifier 0 of the MFK. |
| BG | *16 | 0-F | Working key encrypted under specified modifier of the MFK. |

RESPONSE FORMAT

| Token | Length | Char | Definition |
|---|---|---|---|
| AO | 6 | TWKD | Function |
| BH | 16 | 0-F | The created working key encrypted under specified modifier of KEK. |
| AE | 4 | 0-F | Check digits |

Syntax:

REQUEST: [AOTWKD;ASx;APxxxxxxxxxxxxxxxx;
BGxxxxxxxxxxxxxxxx;]
REPLY: [AOTWKD;BHxxxxxxxxxxxxxxxx;AExxxx;]

REQUEST: [AOTWKD;ASx;APBDxxxx;BGBDxxxx;]-Table Index
REPLY: [AOTWKD;BHxxxxxxxxxxxxxxxx;AExxxx;]

REQUEST: [AOTWKD;ASx;APxxxxxxxxxxxxxxxx;
BGxxxxxxxxxxxxxxxx;AGContext Field;]
REPLY: [AOTWKD;BHxxxxxxxxxxxxxxxx;AExxxx;
AGContext Field;]

Examples:

[AOTWKD;AS5;AP5B039B70514113C6;BGC7F3674F3ED10D00;]
[AOTWKD;BHCEE9CD2EB6CFEE34;AE61C9;]

Comments:

Token AS must precede token AP, since the DEB board should know what modifier to use before encrypting the key you pass it. For maximum security, each type of key is encrypted under a different modifier of the MFK or KEK, fixed as follows: No modifier = MFK; 0 = Key Exchange Key (KEK); 1 = PIN Encryption Key (PEK); 2 = Data Encryption Key (DEK); 3 = Message Authentication Key (MAK); 4 = PIN Verification Key (PVK); and 5 = ATM Key.

TWKL-Translate Working Key for Local Storage

Translates a working key from encryption under the KEK stored in the Data Encryption Board to encryption under the MFK. TWKL is similar to TWKD, but has some difference in message length~~s~~.

REQUEST FORMAT

| Token | Length | Char | Definition |
|---|---|---|---|
| AO | 4 | TWKL | Function |
| AS | 1 | 0-F | The specified modifier to use. |
| BH | *16 | 0-F | The working key encrypted under specified modifier of the KEK. |

RESPONSE FORMAT

| Token | Length | Char | Definition |
|---|---|---|---|
| AO | 4 | TWKL | Function |
| BG | 16 | 0-F | The working key encrypted under specified modifier of MFK. |
| AE | 4 | 0-F | Check digits |

Syntax:

REQUEST: [AOTWKL;ASx;BHxxxxxxxxxxxxxxxx;]
REPLY: [AOTWKL;BGxxxxxxxxxxxxxxxx;AExxxx;]

REQUEST: [AOTWKL;ASx;BHBDxxxx;]-Table Index
REPLY: [AOTWKL;BGxxxxxxxxxxxxxxxx;AExxxx;]

REQUEST: [AOTWKL;ASx;BHxxxxxxxxxxxxxxxx;AGContext Field;]
REPLY: [AOTWKL;BGxxxxxxxxxxxxxxxx;AExxxx;AGContext Field;]

Examples:

[AOTWKL;AS3;BHBC8767E0C48B5507;]
[AOTWKL;BGC7F3674F3ED10D00;AEDAA0;]

Comments:

Token AS must precede token AP, since the DEB board should know what modifier to use before encrypting the key you pass it. For maximum security, each type of key is encrypted under a different modifier of the MFK or KEK, fixed as follows: No modifier = MFK; 0 = Key Exchange Key (KEK); 1 = PIN Encryption Key (PEK); 2 = Data Encryption Key (DEK); 3 = Message Authentication Key (MAK); 4 = PIN Verification Key (PVK); and 5 = ATM Key.

TWKS-Translate Working Key for Local Storage-(Switch to Switch)

This function translates a working key from encryption under any KEK to encryption under the MFK for local storage, or for transmission to a remote location using the same MFK.

REQUEST FORMAT

| Token | Length | Char | Definition |
|---|---|---|---|
| AO | 4 | TWKS | Function |
| AS | 1 | 0-F | The specified modifier to use. |
| AP | *16 | 0-F | The KEK encrypted under under modifier 0 of the MFK. |
| BH | *16 | 0-F | The working key encrypted under specified modifier of KEK. |

RESPONSE FORMAT

| Token | Length | Char | Definition |
|---|---|---|---|
| AO | 4 | TWKS | Function |
| BG | 16 | 0-F | The working key encrypted under specified modifier of MFK. |
| AE | 4 | 0-F | Check digits |

Syntax:

REQUEST: [AOTWKS;ASx;APxxxxxxxxxxxxxxxx;
BHxxxxxxxxxxxxxxxx;]

```
REPLY:     [AOTWKS;BGxxxxxxxxxxxxxxxx;AExxxx;]

REQUEST:   [AOTWKS;ASx;APBDxxx;BHBDxxx;]-Table Index
REPLY:     [AOTWKS;BGxxxxxxxxxxxxxxxx;AExxxx;]

REQUEST:   [AOTWKS;ASx;APxxxxxxxxxxxxxxxx;
           BHxxxxxxxxxxxxxxxx;AGContext Field;]
REPLY:     [AOTWKS;BGxxxxxxxxxxxxxxxx;AExxxx;AGContext
           Field;]
```

Examples:

LATM-Load ATM Master Key (Diebold)

This function encrypts the master key your ATM uses to verify PINs so that you can download the PIN to a Diebold ATM.

REQUEST FORMAT

| Token | Length | Char | Definition |
|---|---|---|---|
| AO | 4 | LATM | Function |
| BJ | 1 | 1 | The ATM type |
| AS | 2 | 0-F | The specified modifier to use. |
| AQ | *16 | 0-F | The Master Key encrypted under specified modifier. |
| AK | *16 | 0-F | Cryptogram representing the key under which Master Key is to be encrypted under appropriate modifier. |

RESPONSE FORMAT

| Token | Length | Char | Definition |
|---|---|---|---|
| AO | 4 | LATM | Function |
| BJ | 1 | 0-F | ATM type |
| AC | 16 | 0-F | The ATM Master Key encrypted under specified modifier. |
| AE | 4 | 0-F | Check digits |

Syntax:

```
REQUEST:   [AOLATM;BJx;ASxx;AQxxxxxxxxxxxxxxxx;
           AKxxxxxxxxxxxxxxxx;]
REPLY:     [AOLATM;BJx;ACxxxxxxxxxxxxxxxx;AExxxx;]

REQUEST:   [AOLATM;BJx;ASxx;AQBDxxx;AKBDxxx;]-Table Index
REPLY:     [AOLATM;BJx;ACxxxxxxxxxxxxxxxx;AExxxx;]
```

REQUEST: [AOLATM;BJx;ASxx;AQxxxxxxxxxxxxxxxx;
AKxxxxxxxxxxxxxxxx;AGContext Field;]
REPLY: [AOLATM;BJx;ACxxxxxxxxxxxxxxxx;AExxxx;AGContext Field;]

Examples:

[AOLATM;BJ1;AS2;AQ9521A6FEE29AFA22;AKD1528482395C18F6;]
[AOLATM;BJ1;AC60A53E441F515D9B;AE466A;]

LATM-Load ATM Master Key (IBM 3624)

This function encrypts and prepares a new IBM Master Key for downloading to the IBM ATM. Unlike the Diebold version of LATM, the IBM format uses two keys and makes a double encryption.

REQUEST FORMAT

| Token | Length | Char | Definition |
|---|---|---|---|
| AO | 4 | LATM | Function |
| BJ | 1 | 3 | The ATM type |
| AC | *16 | 0-F | The ATM Master Key encrypted under modifier 5 of the MFK. |
| AA | *16 | 0-F | The ATM A Key encrypted under modifier 1 of the MFK. |
| BK | *16 | 0-F | The ATM C Key encrypted under modifier 2 of the MFK. |
| BL | 8 | 0-F | Bytes 5-8 in the IBM 3624 Request Message. |

RESPONSE FORMAT

| Token | Length | Char | Definition |
|---|---|---|---|
| AO | 4 | LATM | Function |
| BJ | 1 | 0-F | ATM type |
| AC | 24 | 0-F | The ATM Master Key encrypted under specified modifier. |

Syntax:

REQUEST: [AOLATM;BJx;ACxxxxxxxxxxxxxxxx;
AAxxxxxxxxxxxxxxxx;BKxxxxxxxxxxxxxxxx;BLxxxxxxxx]
REPLY: [AOLATM;BJx;ACxxxxxxxxxxxxxxxxxxxxxxxx;]

REQUEST: [AOLATM;BJx;ACBDxxx;AABDxxx;BKBDxxx;BLxxxxxxxx]
REPLY: [AOLATM;BJx;ACxxxxxxxxxxxxxxxxxxxxxxxx;]

REQUEST: [AOLATM;BJx;ACxxxxxxxxxxxxxxxx;
BKxxxxxxxxxxxxxxxx;AAxxxxxxxxxxxxxxxx;
BLxxxxxxxx;AGContext Field;]
REPLY: [AOLATM;BJx;ACxxxxxxxxxxxxxxxxxxxxxxxx;
AGContext Field;]

Examples:

[AOLATM;BJ3;AC92B038D02E0AFDB0;AAEE4C4FB19FB2CE6D;BKFFCC4B3
425B6AD0C; BLC4FB19FB;]
[AOLATM;BJ3;ACEBE0C450B8DDEBD214C0DBF3;]

[AOLATM;BJ3;AC90231E949CF1676A;AAEF77AD7865D41B01;BK77BE72A
243794F0B;BL7AD7865D;AGFri Nov. 18, 1988 15:32:47;]
[AOLATM;BJ3;AC8757B618F7745F40970C06BF;AGFri Nov. 18, 1988
15:32:47;]

CATC-Change ATM Comm Key (Diebold)

This function encrypts the ATM Communication Key for downloading to a Diebold ATM.

REQUEST FORMAT

| Token | Length | Char | Definition |
|---|---|---|---|
| AO | 4 | CATC | Function |
| BJ | 1 | 0-F | The ATM type |
| AS | 1 | 0-F | The specified modifier to use. |
| AX | 16* | 0-F | The Comm Key encrypted under modifier 5 of the MFK. |
| AJ | 16* | 0-F | The Data Encryption Key. |

RESPONSE FORMAT

| Token | Length | Char | Definition |
|---|---|---|---|
| AO | 4 | CATC | Function |
| BJ | 1 | 0-F | ATM type |
| BK | 16 | 0-F | The ATM Comm Key encrypted under the encryption key. |
| AE | 4 | 0-F | Check digits |

Syntax:

REQUEST: [AOCATC;BJ1;ASxx;AXxxxxxxxxxxxxxxxx;
AJxxxxxxxxxxxxxxxx;]
REPLY: [AOCATC;BJ1;BKxxxxxxxxxxxxxxxx;AExxx;]

REQUEST: [AOCATC;BJ1;ASxx;AXBDxxx;AJBDxxx;]-Table Index
REPLY: [AOCATC;BJ1;BKxxxxxxxxxxxxxxxx;AExxx;]

```
REQUEST:  [AOCATC;BJ1;ASxx;AXxxxxxxxxxxxxxxxx;
          AJxxxxxxxxxxxxxxxx;AGContext Field;]
REPLY:    [AOCATC;BJ1;BKxxxxxxxxxxxxxxxx;AExxx;
          AGContext Field;]
```

Examples:

```
[AOCATC;BJ1;AS3;AX834CB0303170A396;AJE93F5B68C5794D84;]
[AOCATC;BJ1;BK2F431A8E86B98F43;AEA5BE;]

[AOCATC;BJ1;AS3;AX834CB0303170A396;AJE93F5B68C5794D84;
AGEffective 12:01am Dec. 1, 1988;]
[AOCATC;BJ1;BK2F431A8E86B98F43;AEA5BE;AGEffective 12:01am
Dec. 1, 1988;]
```

CATC-Change ATM Comm Key (IBM 3624)

CATC encrypts the ATM Communication Key for downloading to an IBM 3624 ATM. The 24-character replies in the syntax represent the Data and Pad fields of the 3624 Request Message.

REQUEST FORMAT

| Token | Length | Char | Definition |
|---|---|---|---|
| AO | 4 | CATC | Function number |
| BJ | 1 | 0-F | The ATM type |
| AI | *16 | 0-F | The Comm Key encrypted under modifier 2 of the MFK. |
| AK | *16 | 0-F | The ATM Master Key encrypted under specified modifier. |
| BK | *16 | 0-F | Current Communication Key encrypted under modifier 2 of MFK |
| BL | 8 | 0-F | IBM Request Message bytes 5-8 |
| AS | 1 | 1,2 | Specified Modifier |

RESPONSE FORMAT

| Token | Length | Char | Definition |
|---|---|---|---|
| AO | 4 | CATC | Response ID |
| BJ | 1 | 0-F | ATM type |
| BK | 24 | 0-F | ATM Comm Key encrypted under the partial double encryption method. |

Syntax:

REQUEST: [AOCATC;BJ3;AIxxxxxxxxxxxxxxxx;
AKxxxxxxxxxxxxxxxx;BKxxxxxxxxxxxxxxxx;
BLxxxxxxxx;ASx;]
REPLY: [AOCATC;BJ3;BKxxxxxxxxxxxxxxxxxxxxxxxxxx;]

REQUEST: [AOCATC;BJ3;AIBDxxx;AKBDxxx;BKBDxxx;BLxxxxxxxx;
ASx;]-Table Index
REPLY: [AOCATC;BJ3;BKxxxxxxxxxxxxxxxxxxxxxxxxxx;]

REQUEST: [AOCATC;BJ3;AIxxxxxxxxxxxxxxxx;
AKxxxxxxxxxxxxxxxx;BKxxxxxxxxxxxxxxxx;
BLxxxxxxxx;ASx;AGContext Field;]

REPLY: [AOCATC;BJ3;BKxxxxxxxxxxxxxxxxxxxxxxxxxx;
AGContext Field;]

Examples:

[AOCATC;BJ3;AI2AF6B038FA70ACE6;AKE63F7C68C8A94D84;
BK80D5C173317AE5E2;BL9FB859D4;AS2;]
[AOCATC;BJ3;BKFE4380A65E943D3BD8BD4F5A;]

[AOCATC;BJ3;AI2AF6B038FA70ACE6;AKE63F7C68C8A94D84;
BK80D5C173317AE5E2;BL9FB859D4;AS2;AGEffective 12:01am
Dec. 1, 1988;]
[AOCATC;BJ3;BKFE4380A65E943D3BD8BD4F5A;AGEffective
12:01am Dec. 1, 1988;]

TWKN-Translate Working Key for Network Transfer

This functions translates a working key from encryption under the MFK to encryption under the KEK resident in the Data Encryption Board.

REQUEST FORMAT

| Token | Length | Char | Definition |
|---|---|---|---|
| AO | 4 | TWKN | Function number |
| AS | 1 | 0-F | Specified Modifier |
| BG | *16 | 0-F | Working key encrypted under specified modifier of the MFK |

RESPONSE FORMAT

| Token | Length | Char | Definition |
|---|---|---|---|
| AO | 4 | TWKN | Response ID |
| BH | 16 | 0-F | Working Key encrypted under specified modifier of KEK |
| AE | 4 | 0-F | Check digits |

Syntax:

```
REQUEST:  [AOTWKN;ASx;BGxxxxxxxxxxxxxxxx;]
REPLY:    [AOTWKN;BHxxxxxxxxxxxxxxxx;AExxxx;]

REQUEST:  [AOTWKN;ASx;BGBDxxx;]-Table Index
REPLY:    [AOTWKN;BHxxxxxxxxxxxxxxxx;AExxxx;]

REQUEST:  [AOTWKN;ASx;BGxxxxxxxxxxxxxxxx;AGContext Field;]
REPLY:    [AOTWKN;BHxxxxxxxxxxxxxxxx;AExxxx;AGContext
          Field;]
```

Examples:

GVWK-Generate Visa Working Key

This function generates a pseudo-random DES key for use in the VISA Network.

REQUEST FORMAT

| Token | Length | Char | Definition |
|---|---|---|---|
| AO | 4 | GVWK | Function number |
| BM | *16 | 0-F | VISA Zone Control Master Key |

RESPONSE FORMAT

| Token | Length | Char | Definition |
|---|---|---|---|
| A0 | 4 | GVWK | Response ID |
| BI | 16 | 0-F | Working Key encrypted under Zone Control Master Key |
| AX | 16 | 0-F | Working Key encrypted under modifier 1 of MFK |
| AE | 4 | 0-F | Check digits |

Syntax:

```
REQUEST:  [AOGVWK;BMxxxxxxxxxxxxxxxx;]
REPLY:    [AOGVWK;BIxxxxxxxxxxxxxxxx;AXxxxxxxxxxxxxxxxx;
          AExxxx;]

REQUEST:  [AOGVWK;BMBDxxx;]-Table Index
REPLY:    [AOGVWK;BIxxxxxxxxxxxxxxxx;AXxxxxxxxxxxxxxxxx;
          AExxxx;]

REQUEST:  [AOGVWK;BMxxxxxxxxxxxxxxxx;AGContext Field;]
REPLY:    [AOGVWK;BIxxxxxxxxxxxxxxxx;AXxxxxxxxxxxxxxxxx;
          AExxxx;AGContext Field;]
```

Examples:

PIN FUNCTIONS

EPIN-PIN Encrypt

This functions encrypts a clear PIN for transmission to the network.

REQUEST FORMAT

| Token | Length | Char | Definition |
|---|---|---|---|
| AO | 4 | EPIN | Function |
| AX | *16 | 0-F | PIN Encryption Key encrypted under modifier 1 of the MFK |
| AF | 4-12 | 0-9 | Clear PIN to be encrypted |
| AV | 12 | 0-F | 12 Rightmost PAN digits |

RESPONSE FORMAT

| Token | Length | Char | Definition |
|---|---|---|---|
| AO | 4 | EPIN | Response ID |
| AL | 16 | 0-F | PIN block encrypted under the KPE |

Syntax:

REQUEST: [AOEPIN;AXxxxxxxxxxxxxxxxx;
AFxxxxxxxxxxxx;AVxxxxxxxxxxxx;]
REPLY: [AOEPIN;ALxxxxxxxxxxxxxxxx;]

REQUEST: [AOEPIN;AXBDxxx;AFxxxxxxxxxxxx;
AVxxxxxxxxxxxx;]-Table Index
REPLY: [AOEPIN;ALxxxxxxxxxxxxxxxx;]

REQUEST: [AOEPIN;AXxxxxxxxxxxxxxxxx;AFxxxxxxxxxxxx;
AVxxxxxxxxxxxx;AGContext Field;]
REPLY: [AOEPIN;ALxxxxxxxxxxxxxxxx;AGContext Field;]

Examples:

[AOEPIN;AX8C87F909F35D1EAC;AF7425;AV756505312216;]
[AOEPIN;ALAFBC3932D7A2A02A;]

[AOEPIN;AX8C87F909F35D1EAC;AF7425;AV756505312216;
AGEffective 12:01am Dec. 1, 1988;]
[AOEPIN;ALAFBC3932D7A2A02A;AGEffective 12:01am
Dec. 1, 1988;]

TPIN-PIN Translate

This function translates PINs from one encryption key to another encryption key and optionally from one PIN block format to ANSI alternate format.

REQUEST FORMAT

| Token | Length | Char | Definition |
|---|---|---|---|
| AO | 4 | TPIN | Function number |
| AW | 1 | 1-5 | Input PIN block<br>1 = ANSI<br>2 = IBM 3624<br>3 = PIN Pad<br>4 = IBM Encrypting PIN Pad format<br>5 = Burroughs format |
| AX | *16 | 0-F | PIN Encryption Key (Incoming) |
| BT | *16 | 0-F | PIN Encryption Key (Outgoing) |
| AL | 16-18 | 0-F | Encrypted PIN |
| AK | var | 0-F | Additional PIN block data |
| AG | 1 | 0 | Alternate Format 1 |
| | | A-F | Output PAD character |

RESPONSE FORMAT

| Token | Length | Char | Definition |
|---|---|---|---|
| AO | 4 | TPIN | Response ID |
| AL | 16 | 0-F | PIN block encrypted under the outgoing KPE |
| BB | 1 | Y,N | Indicator whether PIN block format is valid |
| AG | 1 | 0 | Alternate format |
| | 1 | 0-F | Output PAD character |

Syntax:

REQUEST: [AOTPIN;AWx;AXxxxxxxxxxxxxxxxx;
BTxxxxxxxxxxxxxxxx;ALxxxxxxxxxxxxxxxxxx;
AKxxxx....xxxx;AG0x;]
REPLY: [AOTPIN;ALxxxxxxxxxxxxxxxx;BBY;AG0x;]

REQUEST: [AOPIN;AWx;AXBDxxx;BTBDxxx;ALxxxxxxxxxxxxxxxxxx;
AKxxxx....xxxx;AG0x;]-Table Index
REPLY: [AOTPIN;ALxxxxxxxxxxxxxxxx;BBY;AG;0x;]

Examples:

[AOTPIN;AW1;AX2DD4F011AF743C15;BT545E2DA629656371;
ALA248E10FA1047A8C;AK505413713492;]
[AOTPIN;AL9ECBB9B16BB4F578;BBY;]

[AOTPIN;AW1;AX98ED248067056577;BT1F104EF0B9CCE4A4;
AL9219115CCE7B4129;AK013986960105;AG0B;]
[AOTPIN;AL737A70C7C4705DE0;BBY;AG0B;]

[AOTPIN;AW3;AXAF013560ED422A98;BT5FBAD3A5FDFB722E;
AL3A0F685D45293213;

AKC;184498103394;AG0C;]
[AOTPIN;AL8926B4F9A7316AFD;BBY;AG0C;]

[AOTPIN;AW3;AX2C704A2A54B8C4BE;BT5008D16FE18641F4;
ALC23C2A66897C9AEC;AKD;976470135455;]
[AOTPIN;AL6AE3CCB83F63AF0A;BBY;]

Comments:

In TPIN token AG, normally a context field, determines what alternate ANSI format is used for the PIN block. AG requires 0 (zero) as the first character in order to interpret subsequent characters as formatting instructions, rather than interpreting them as a context message or description. You can use AG for message text as long as your message does not begin with a zero.

If you want to use AG both to express a format and to add a context field, you can do so by inserting a delimiter. In this case, the syntax is: AG0;F; tag field message.

VPIN-PIN Verification-IBM 3624

VPIN decrypts and verifies incoming PIN blocks, using the IBM 3624 PIN verification algorithm.

REQUEST FORMAT

| Token | Length | Char | Definition |
|---|---|---|---|
| AO | 4 | VPIN | Function |
| BF | 1 | 2 | Verification Method |
| AW | 1 | 1-5 | Input PIN block type<br>1 = ANSI<br>2 = IBM 3624<br>3 = PIN Pad<br>4 = IBM Encrypting PIN Pad format<br>5 = Burroughs Format |
| AL | 16-18 | 0-F | Encrypted PIN (PIN Block) |
| AX | *16 | 0-F | PIN Encryption Key (Incoming) |
| BS | *16 | 0-F | Decimalization table mapping |
| AY | 4-16 | 0-9 | Offset applied to generated PIN |
| BE | 4-16 | 0-9 | Validation Data |
| AT | 1 | A-F | Pad character for the PAN or incoming PIN PIN block |
| AD | 1 | 4-C | Check Length |
| AZ | *16 | 0-F | PIN verification Key |
| AK | var | 0-F | Additional PIN Block Data |

RESPONSE FORMAT

| Token | Length | Char | Definition |
|---|---|---|---|
| AO | 4 | VPIN | Response ID |
| BB | 1 | Y,N,S | Indicator whether PIN is verified<br>Y = verified<br>N = not verified<br>S = sanity (formatting) error. |

Syntax:

```
REQUEST:  [AOVPIN;BFx;AWx;ALxxxxxxxxxxxxxxxxxx;
          AXxxxxxxxxxxxxxxxx;BSxxxxxxxxxxxxxxxx;
          AYxxxxxxxxxxxxxxxx;BExxxxxxxxxxxxxxxx;ATx;
          ADx;AZxxxxxxxxxxxxxxxx;AKxxxx....xxxx;]
REPLY:    [AOVPIN;BB?;]

REQUEST:  [AOVPIN;BFx;AWx;ALxxxxxxxxxxxxxxxxxx;AXBDxxx;
          BSBDxxx;AYxxxxxxxxxxxxxxxx;BExxxxxxxxxxxxxxxx;
          ATx;ADx;AZBDxxx;AKxxxx....xxxx;]-Table Index
REPLY:    [AOVPIN;BB?;]

REQUEST:  [AOVPIN;BFx;AWx;ALxxxxxxxxxxxxxxxxxx;
          AXxxxxxxxxxxxxxxxx;BSxxxxxxxxxxxxxxxx;
          AYxxxxxxxxxxxxxxxx;BExxxxxxxxxxxxxxxx;
          ATx;ADx;AZxxxxxxxxxxxxxxxx;AKxxxx....xxxx;
          AGContext Field;]
REPLY:    [AOVPIN;BB?;AGContext Field;]
```

VPIN 3624 Examples:

```
[AOVPIN;BF2;AW1;ALE3413D41CE1D2A8C;AXE332CA365425C276;
BS5684666775032955;AY7909;BE9458;ATA;AD4;
AZ8D148B4C0E6D975D;AK023369824723;]
[AOVPIN;BBY;]
[AOVPIN;BF2;AW1;ALE3413D41CE1D2A8C;AXE332CA365425C276;
BS5684666775032955;AY7909;BE9458;ATA;AD4;
AZ8D148B4C0E6D975D;AK023369824723;
AGFriday, November 25, 1988 14:35:58;]
[AOVPIN;BBY;AGFriday, November 25, 1988 14:35:58;]
```

VPIN-PIN Verification-DIEBOLD

REQUEST FORMAT

| Token | Length | Char | Definition |
|---|---|---|---|
| AO | 4 | VPIN | Function |
| BF | 1 | 5 | Verification Method |
| AW | 1 | 1-5 | Input PIN block type |

| | | | |
|---|---|---|---|
| | | | 1 = ANSI,<br>2 = IBM 3624<br>3 = PIN Pad<br>4 = IBM Encrypting PIN Pad format<br>5 = Burroughs format |
| AL | 16 | 0-F | Encrypted PIN (PIN Block) |
| AX | *16 | 0-F | PIN Encryption Key (Incoming) |
| AV | 4-16 | 0-F | account number |
| AY | 4-16 | 0-9 | Offset applied to generated PIN |
| BU | 2 | 0-9 | Diebold algorithm |
| BR | 2 | 0-9 | Diebold Table Index number |
| AK | var | 0-F | Additional PIN Block Data |

RESPONSE FORMAT

| Token | Length | Char | Definition |
|---|---|---|---|
| AO | 4 | VPIN | Response ID |
| BB | 1 | Y,N,S | Indicator whether PIN is verified<br>Y = verified<br>N = not verified<br>S = sanity error. |

Syntax:

REQUEST: [AOVPIN;BFx;AWx;ALxxxxxxxxxxxxxxxx;
AXxxxxxxxxxxxxxxxx;AVxxxxxxxxxxxxxxxx;
AYxxxxxxxxxxxxxxxx;BUxx;BRxx;AKxxxx....xxxx;]
REPLY: [AOVPIN;BB?;]

REQUEST: [AOVPIN;BFx;AWx;ALxxxxxxxxxxxxxxxx;AXBDxxx;
AVxxxxxxxxxxxxxxxx;AYxxxxxxxxxxxxxxxx;BUxx;BRxx;
AKxxxx....xxxx;]-Table Index
REPLY: [AOVPIN;BB?;]

REQUEST: [AOVPIN;BFx;AWx;ALxxxxxxxxxxxxxxxx;
AXxxxxxxxxxxxxxxxx;AVxxxxxxxxxxxxxxxx;
AYxxxxxxxxxxxxxxxx;BUxx;BRxx; AKxxxx....xxxx;
AGContext Field;]
REPLY: [AOVPIN;BB?;AGContext Field;]

VPIN Diebold Examples:

[AOVPIN;BF2;AW3;ALB401536D423A5179;AXAA34613DB1507BCC;
BS2571307377290783;AY6702;BE4411680595014110;ATA;AD4;
AZ402BBF5E97495925;AKA;000000000000;]
[AOVPIN;BBY;]

[AOVPIN;BF2;AW3;ALB401536D423A5179;AXAA34613DB1507BCC;
BS2571307377290783;AY6702;BE4411680595014110;ATA;AD4;
AZ402BBF5E97495925;AKA;000000000000;AGFriday, November 25,
1988 14:36:00;]
[AOVPIN;BBY;AGFriday, November 25, 1988 14:36:00;]

DATA FUNCTIONS

EDAT-Encrypt Data

This function encrypts data for subsequent secure transmission.

REQUEST FORMAT

| Token | Length | Char | Definition |
|---|---|---|---|
| AO | 4 | EDAT | Function |
| AI | *16 | 0-F | KC encrypted under modifier 2 of the MFK |
| AK | 16 | 0-F | Data to be encrypted |

RESPONSE FORMAT

| Token | Length | Char | Definition |
|---|---|---|---|
| AO | 4 | EDAT | Response ID |
| AK | 16 | 0-F | Encrypted data |

Syntax:

REQUEST: [AOEDAT;AIxxxxxxxxxxxxxxxx;AKxxxxxxxxxxxxxxxx;]
REPLY: [AOEDAT;AKxxxxxxxxxxxxxxxx;]

REQUEST: [AOEDAT;AIBDxxx;AKxxxxxxxxxxxxxxxx;]-Table Index
REPLY: [AOEDAT;AKxxxxxxxxxxxxxxxx;]

REQUEST: [AOEDAT;AIxxxxxxxxxxxxxxxx;AKxxxxxxxxxxxxxxxx;
AGContext Field;]
REPLY: [AOEDAT;AKxxxxxxxxxxxxxxxx;AGContext Field;]

Examples:

[AOEDAT;AI54CB448FCF15ADB6;AKEE858EC8BF75F7E2;]
[AOEDAT;AK404C429076E70E5B;]

[AOEDAT;AI54CB448FCF15ADB6;AKEA44B2934F72325B;AGReplacement for January key;]
[AOEDAT;AKBA37546A729A30DB;AGReplacement for January key;]

DDAT-Decrypt Data

This function decrypts data.

RESPONSE FORMAT

| Token | Length | Char | Definition |
|---|---|---|---|
| AO | 4 | DDAT | Function |
| AI | *16 | 0-F | KC encrypted under modifier 2 of the MFK |
| AK | 16 | 0-F | Data to be decrypted |

RESPONSE FORMAT

| Token | Length | Char | Definition |
|---|---|---|---|
| AO | 4 | DDAT | Response ID |
| AK | 16 | 0-F | Decrypted data |

Syntax:

REQUEST: [AODDAT;AIxxxxxxxxxxxxxxxx;AKxxxxxxxxxxxxxxxx;]
REPLY: [AODDAT;AKxxxxxxxxxxxxxxxx;]

REQUEST: [AODDAT;AIBDxxx;AKxxxxxxxxxxxxxxxx;]-Table Index
REPLY: [AODDAT;AKxxxxxxxxxxxxxxxx;]

REQUEST: [AODDAT;AIxxxxxxxxxxxxxxxx;AKxxxxxxxxxxxxxxxx;
AGContext Field;]
REPLY: [AODDAT;AKxxxxxxxxxxxxxxxx;AGContext Field;]

Examples:

[AODDAT;AI54CB448FCF15ADB6;AK89AD95F1544BAEA3;]
[AODDAT;AKFB2DAD0B926CE736;]

DTRA-Data Translate

This function translates data from encryption under KCI to encryption under KCJ.

REQUEST FORMAT

| Token | Length | Char | Definition |
|---|---|---|---|
| AO | 4 | DTRA | Function number |
| AI | *16 | 0-F | KC encrypted under modifier 2 of the MFK (Incoming) |
| AJ | *16 | 0-F | KC encrypted under modifier 2 of the MFK (Outgoing) |
| AK | 16 | 0-F | Data encrypted under KCI |

RESPONSE FORMAT

| Token | Length | Char | Definition |
|---|---|---|---|
| AO | 4 | DTRA | Response ID |
| AK | 16 | 0-F | Encrypted data under new key |

Syntax:

REQUEST: [AODTRA;AIxxxxxxxxxxxxxxxx;AJxxxxxxxxxxxxxxxx;
AKxxxxxxxxxxxxxxxx;]
REPLY: [AODTRA;AKxxxxxxxxxxxxxxxx;]

REQUEST: [AODTRA;AIBDxxx;AJBDxxx;AKxxxxxxxxxxxxxxxx;]-
Table Index
REPLY: [AODTRA;AKxxxxxxxxxxxxxxxx;]

REQUEST: [AODTRA;AIxxxxxxxxxxxxxxxx;AJxxxxxxxxxxxxxxxx;
AKxxxxxxxxxxxxxxxx;AGContext Field;]
REPLY: [AODTRA;AKxxxxxxxxxxxxxxxx;AGContext Field;]

Examples:

GMAC-Generate MAC

This function generates a Message Authentication Code (MAC), for the entered message.

REQUEST FORMAT

| Token | Length | Char | Definition |
|---|---|---|---|
| AO | 4 | GMAC | Function |
| BN | 1 | 0,1 | Continuation flag = 1 |
| AR | *16 | 0-F | KMAC encrypted under modifier 3 of the MFK |
| BO | 1-1024 | A-Z<br>0-9<br>comma<br>period<br>space | Data for Authentication |

RESPONSE FORMAT

| Token | Length | Char | Definition |
|---|---|---|---|
| AO | 4 | GMAC | Response ID |
| BP | 8 | 0-F | MAC or 'CONTINUE' |
| AE | 4 | 0-F | Check digits of KMAC |

Syntax:

REQUEST: [AOGMAC;BNx;ARxxxxxxxxxxxxxxxx;BOxxx....xxxx;]
REPLY: [AOGMAC;BPxxxxxxxx;AExxxx;]

REQUEST: [AOGMAC;BNx;ARBDxxx;BOxxx....xxxx;]
REPLY: [AOGMAC;BPxxxxxxxx;AExxxx;]

REQUEST: [AOGMAC;BNx;ARxxxxxxxxxxxxxxxx;BOxxx....xxxx;
AGContext Field;]
REPLY: [AOGMAC;BPxxxxxxxx;AExxxx;AGContext Field;]

Examples:

Comments:

Do not use any semicolons in your messages, since semicolons signify delimiters.

If your message is longer than 1.024 characters, enabling token BN's continuation flag (BN1) alerts the system that there is more message coming in the next transaction.

GMAC-Generate MAC Continuation

This function generates a Message Authentication Code (MAC) for messages greater than 1024 characters.

REQUEST FORMAT

| Token | Length | Char | Definition |
|---|---|---|---|
| AO | 4 | GMAC | Function |
| BO | 1-1024 | A-Z<br>0-9<br>comma<br>period<br>space | Data for Authentication |
| BN | 1 | 0,1 | Continuation flag = 1 |

RESPONSE FORMAT

| Token | Length | Char | Definition |
|---|---|---|---|
| AO | 2 | GMAC | Response ID |
| BP | 8 | 0-F | MAC or 'CONTINUE' |
| AE | 4 | 0-F | Check digits of KMAC |

Syntax:

REQUEST: [AOGMAC;BOxxx....xxxx;BNx;]
REPLY: [AOGMAC;BPxxxxxxxx;AExxxx;]

REQUEST: [AOGMAC;BOxxx....xxxx;BNx;AGContext Field;]
REPLY: [AOGMAC;BPxxxxxxxx;AExxxx;AGContext Field;]

Examples:

VMAC-Verify MAC

This function generates a Message Authentication Code (MAC) for a message you enter, and compares it against the entered MAC. (Needs clarifying!)

REQUEST FORMAT

| Token | Length | Char | Definition |
|---|---|---|---|
| AO | 4 | VMAC | Function number |
| BN | 1 | 0,1 | Continuation flag = 1 |
| AR | *16 | 0-F | KMAC encrypted under modifier 3 of the MFK |
| BO | 1-1024 | A-Z<br>0-9<br>comma<br>period<br>space | Data for authentication |
| BP | 0,8 | 0-F | MAC to be verified |

RESPONSE FORMAT

| Token | Length | Char | Definition |
|---|---|---|---|
| AO | 4 | VMAC | Response ID |
| AE | 4 | 0-F | Check digits of KMAC |
| BB | 0,1 | Y,N | Indicator if MAC is authenticated |

Syntax:

REQUEST: [AOVMAC;BNx;ARxxxxxxxxxxxxxxxx;BOxxx....xxxx;
BPxxxxxxxx;]
REPLY: [AOVMAC;AExxxx;BBx;]

REQUEST: [AOVMAC;BNx;ARBDxxx;BOxxx....xxxx;]-Index Table
REPLY: [AOVMAC;AExxxx;BBx;]

REQUEST: [AOVMAC;BNx;ARxxxxxxxxxxxxxxxx;BOxxx....xxxx;
AGContext Field;]
REPLY: [AOVMAC;AExxxx;BBx;AGContext Field;]

Examples:

VMAC-Verify MAC Continuation

This function accepts additional message data following the Verify MAC Command.

REQUEST FORMAT

| Token | Length | Char | Definition |
|---|---|---|---|
| AO | 4 | VMAC | Function |
| BO | 1-1024 | A-Z<br>0-9<br>comma<br>period<br>space | Data for Authentication |
| BN | 1 | 0,1 | Continuation flag = 1 |

RESPONSE FORMAT

| Token | Length | Char | Definition |
|---|---|---|---|
| AO | 4 | VMAC | Response ID |
| AE | 4 | 0-F | Check digits of KMAC |
| BB | 0,1 | Y,N | Indicator if MAC is authenticated |

Syntax:

REQUEST: [AOVMAC;BOxxx....xxxx;BNx;]
REPLY: [AOVMAC;AExxxx;BBx;]

REQUEST: [AOVMAC;BOxxx....xxxx;BNx;AGContext Field;]
REPLY: [AOVMAC;AExxxx;BBx;AGContext Field;]

Examples:

APPENDIXES

Alphabetic List of Tokens

| Tkn | Valid in These Functions | Meaning | Length |
|---|---|---|---|
| **AA** | LATM | ATM manually loaded 'A' key | 16 |
| **AC** | LATM | ATM Master Key | 16-24 |
| **AD** | CCDL, VPIN | Check digit length | 1 |
| **AE** | CATC, GMAC, GVWK, GWKS, LATM, LKEY, LMKT, SKEY, TWKD, TWKL, TWKN, TWKS, VKTE, VMAC | Check digits | 4-8 |
| **AF** | EPIN | Clear PIN | 4-12 |
| **AG** | ECHO, TPIN | Context field or description | 1-255 |
| **AH** | CRYP, IKEY | Cryptogram | 16 |
| **AI** | DDAT, DTRA, EDAT, EDNT, LENT | Data Encrypting Key Incoming (KCI) | 16 |
| **AJ** | CATC, DTRA | Data Encrypting Key Outgoing (KCJ) | 16 |
| **AK** | CRYP, DDAT, DESD, DESE, DTRA, EDAT, EDNT, IKEY, LATM, LDNT, LENT, LKEY, RKEY, SKEY, TPIN, VPIN | General use; often stands for data to be encrypted, including PINs, messages, or Diebold tables | 10-512 |
| **AL** | EPIN, TPIN, VPIN | Encrypted PIN | 16-18 |
| **AM** | ERRO | Error code (used in error messages) | 2 |
| **AN** | ERRO | Field number (used in error messages) | 2-4 |
| **AO** | Valid in all functions | Function | 4 |

| | | | |
|---|---|---|---|
| AP | GWKS, LDNT, TWKD, TWKS | Key Exchange Key (KEK) | 16 |
| AQ | LATM | Master File Key (MFK) | 16 |
| AR | GMAC, VMAC | Message Authentication Key (KMAC) | 16 |
| AS | CATC, GWKS, LATM, LMKT, TWKD, TWKL, TWKN, TWKS | Modifier | 1 |
| AT | VPIN | Pad character for incoming PIN block | 1 |
| AU | | Pad character for outgoing PIN block | 1 |
| AV | EPIN | PAN digits | 12 |
| AW | TPIN, VPIN | PIN block type | 1 |
| AX | CATC, EPIN, GVWK, TPIN, VPIN, | PIN Encrypting Key (KPE) | 16 |
| AY | VPIN | PIN offset | 4-16 |
| AZ | VPIN | PIN Verification Key | 16 |
| BA | TDLY | Pre-transmit delay | 3 |
| BB | CKTA, TPIN, VMAC, VPIN | Response literal | 1-2 |
| BC | ECHO | Revision number | 4 |
| BD | CATC, DDAT, DKTE, DTRA, EDAT, EDNT, EPIN, GMAC, GVWK, GWKS, LATM, LENT, LMKT, TPIN, TWKD, TWKL, TWKN, TWKS, VKTE, VMAC, VPIN | Table Index number | 1-3 |
| BE | VPIN | Verification data | 4-16 |
| BF | VPIN | Verification technique | 1 |
| BG | GWKS, LMKT, TWKD, TWKL, TWKN, TWKS | Working Key EMFK.J | 16 |
| BH | GWKS, TWKD, TWKL, TWKN, TWKS | Working Key EKEK.J | 16 |
| BI | GVWK | Zone Control Working Key | 16 |
| BJ | CATC, CLWA, IKEY, LATM, LKEY | ATM type, or key part | 1 |
| BK | CATC, LATM ATM | Comm key | 16 |
| BL | LATM | IBM request message | 8 |
| BM | GVWK | Zone Control Master Key | 16 |
| BN | GMAC, VMAC | Data continuation flag | 1 |
| BO | GMAC, VMAC | Character data MAC | 1-1024 |
| BP | GMAC, VMAC | Message Authentication Code | 8 |
| BQ | LMKT | Table Index location | 1-3 |
| BR | LDNT, LENT | Diebold Table Index | 1-3 |
| BS | DESD, DESE, VPIN | Working key in clear | 16 |
| BT | TPIN | PIN Encryption Key outgoing (KPE) | 16 |
| ZA | STAT | Data Encryption Board mode | 1 |

| | | | |
|---|---|---|---|
| ZB | STAT | Checksum data area | 4 |
| ZC | STAT | Checksum program area | 4 |
| ZD | STAT | Total number of requests | 8 |
| ZF | STAT | PIN translate | 8 |
| ZG | STAT | PIN verification | 8 |
| ZH | STAT | Data functions | 8 |
| ZI | STAT | Key table functions | 8 |
| ZJ | STAT | Working Key functions.. | 8 |
| ZK | STAT | Control functions | 8 |
| ZL | STAT | Error totals | 8 |
| ZM | STAT | IN sanity errors | 8 |
| ZN | STAT | (presently not defined) | 8 |
| ZO | STAT | PIN 'N' | 8 |
| ZP | STAT | Timeout errors | 8 |

Alphabetic List of Functions

| Funct. | Meaning | Valid Tokens |
|---|---|---|
| CATC | Change ATM Comm Key (Diebold) | AE, AJ, AO, AS, AX, BD, BJ, BK |
| CCDL | Change Check Digit Length | AD, AO |
| CKTA | Clear Key Table | AO, BB |
| CLWA | Clear MFK or KEK Work Area | AO, BJ |
| CRYP | Cryptogram of Last Key | AH, AK, AO |
| DDAT | Decrypt Data | AI, AK, AO, BD |
| DESD | DES Decryption | AK, AO, BS |
| DESE | DES Encryption | AK, AO, BS |
| DKTE | Delete Key Table Entry | AO, BD |
| DTRA | Data Translate | AI, AJ, AK, AO, BD |
| ECHO | Echo Test | AG, AO, BC |
| EDAT | Encrypt Data for Transmission | AI, AK, AO, BD |
| EDNT | Encrypt Diebold Number Table | AI, AK, AO, BD |
| EPIN | PIN Encrypt | AF, AL, AO, AV, AX, BD |
| ERRO | Error message | AM, AN, AO, BB |
| GMAC | Generate MAC | AE, AO, AR, BN, BO, BP |
| GMAC | Generate MAC Continuation | AE, AO, BD, BO, BP |
| GVWK | Generate Visa Working Key | AE, AO, AX, BD, BI, BM |
| GWKS | Generate Working Key | AE, AO, AP, AS, BD, BG, BH |
| IKEY | Inject MFK or KEK | AH, AK, AO, BJ |
| LATM | Load ATM Master Key (Diebold) | AC, AE, AK, AO, AQ, AS, BJ |
| LATM | Load ATM Master Key (IBM 3624) | AA, AC, AO, BD, BJ BL |
| LDNT | Load Diebold Number Table | AK, AO, AP, BR |
| LENT | Load Entire Diebold Number Table | AI, AK, AO, BD, BR |
| LKEY | Loads Key | AE, AK, AO, BJ |
| LMKT | Load Module Key Table | AE, AO, AS, BD, BG, BQ |

| | | |
|---|---|---|
| RKEY | Random Key Generation | AK, AO |
| SKEY | Status of MFK and KEK | AE, AK, AO |
| STAT | Status of Data Encryption Board | AO, ZA, ZB, ZC, ZD, ZE, ZF, ZG, ZH, ZI, ZJ, ZK, ZL, ZM, ZN, ZO, ZP |
| TDLY | Transmit Delay | AO, BA |
| TPIN | PIN Translate | AG, AK, AL, AO, AW, AX, BB, BD, BT |
| TWKD | Translate Working Key for Distribution | AE, AO, AP, AS, BD, BG, BH |
| TWKL | Translate Working Key for Local Storage | AE, AO, AS, BD, BG, BH |
| TWKN | Translate Working Key for Network Transfer | AE, AO, AS, BD, BG, BH |
| TWKS | Translate Working Key for Local Storage (Switch to Switch) | AE, AO, AS, BD, BG, BH |
| VKTE | Verify Key Table Entry | AE, AO, BD |
| VMAC | Verify MAC | AE, AO, AR, BB, BN, BO, BP |
| VMAC | Verify MAC Continuation | AE, AO, BB, BD, BN, BO |
| VPIN | PIN Verification | AD, AK, AL, AO, AT, AW, AX, AY, AZ, BB, BD, BE, BF, BS |

<u>Error Messages</u>

RESPONSE FORMAT

| Token | Length | Char | Definition |
|---|---|---|---|
| AO | 4 | ERRO | Response ID |
| AM | 2 | 0-9 | Error Code |
| AN | 2-4 | var | Offending Token or Funct |
| BB | var | var | Response literal |

Syntax:

REPLY: [AOERRO;AM01;ANAO;BBFIELD OUT OF RANGE;]

REPLY: [AOERRO;AM19;ANTWKS;BB FUNCTION NOT SUPPORTED;]

| Error Code | Response Literal |
|---|---|
| 00 | |
| 01 | FIELD OUT OF RANGE |
| 02 | INVALID CHARACTER |
| 03 | VALUE OUT OF RANGE |
| 04 | TOKEN MISSING |
| 05 | PARITY ERROR |
| 06 | MAJOR KEY MISSING |
| 07 | INDEXED KEY MISSING |
| 08 | HARDWARE FAILURE |

| | |
|---|---|
| 09 | INVALID MESSAGE FORMAT |
| 10 | INDEX TABLE FULL |
| 11 | |
| 12 | PIN TYPE NOT SUPPORTED |
| 13 | INVALID MESSAGE LENGTH |
| 14 | COMMUNICATION ERROR |
| 15 | COMMUNICATION TIMEOUT |
| 16 | LOADING DIEBOLD TABLE |
| 17 | MAC ERROR |
| 18 | |
| 19 | FUNCTION NOT SUPPORTED |

| Debug Error Code | Response Literal |
|---|---|
| 30 | PARALLEL BUFFER OVERFLOW |
| 31 | SERIAL BUFFER OVERFLOW |
| 32 | PROGRAM LOAD ERROR |
| 33 | DATA RAM ERROR |
| 34 | INVALID TO KEN |
| 35 | FUNCTION PRESENTLY NOT IMPLEMENTED |

What is claimed is:

1. A method of configuring a data encryption devices in a data encryption system, said method comprising the steps of:
   - coupling a plurality of data encryption devices with a data bus;
   - configuring individual data encryption devices in predefined groups;
   - and loading encryption key data into each of said data encryption devices in one of said predefined groups through said data bus.

2. The method of claim 1, further including the steps of:
   - receiving data from a host processor through a dedicated port of one of said data encryption devices;
   - encrypting or decrypting said data with said loaded encryption key data based on predefined encryption algorithms; and
   - outputting said encrypted or decrypted data through said dedicated port.

3. The method of claim 2 wherein said receiving data from said host processor is independent of loading said encryption key data through said data bus.

4. The method of claim 2 wherein said encrypting or decrypting of said data is performed in accordance with the DES encryption standard.

5. An improved multi-channel encryption system comprising:
   - a plurality of encryption devices for encrypting or decrypting data based on predefined encryption functions;
   - means for coupling said plurality of data encryption devices with a data bus;
   - means for assigning individual data encryption devices to predefined groups; and
   - means for loading encryption key data into each of said data encryption devices in one of said predefined groups through said data bus.

6. The encryption apparatus of claim 5 wherein said encryption devices are adapted for encrypting and decrypting data in accordance with the DES encryption standard under any of a number of predefined encryption keys.

7. An improved multi-channel data encryption system comprising:
   - a plurality of data encryption devices, each of said data encryption devices for receiving a data stream, for processing said data stream in accordance with a desired encryption function, and for outputting said processed data stream, said data encryption devices including means for inputting and storing a plurality of encryption keys, said data encryption devices including a data bus interface coupled to said inputting and storing means for communicating encryption key information from said data bus interface to said inputting and storing means;
   - a data bus coupled to said data bus interface of each of said plurality of data encryption devices;
   - controller means for communicating with said data encryption devices through said data bus; and
   - means for grouping said data encryption devices in predefined groups wherein said controller means communicates encryption key information to all of said data encryption devices in one of said predefined groups.

* * * * *